United States Patent [19]

Erickson

[11] Patent Number: 4,914,659

[45] Date of Patent: Apr. 3, 1990

[54] METHOD AND APPARATUS FOR SOFTWARE BRANCH ANALYSIS

[75] Inventor: Bruce A. Erickson, Colorado Springs, Colo.

[73] Assignee: Hewlett-Packard Company, Palo Alto, Calif.

[21] Appl. No.: 154,684

[22] Filed: Feb. 10, 1988

[51] Int. Cl.[4] .............................................. G06F 11/00

[52] U.S. Cl. ........................................ 371/19; 364/200

[58] Field of Search ........................ 371/19, 16, 18, 17, 371/15.1, 16.1, 16.2, 16.5; 364/200, 900

[56] References Cited

U.S. PATENT DOCUMENTS

| | | | |
|---|---|---|---|
| T939,010 | 10/1985 | Bender . | |
| 4,709,341 | 11/1987 | Matsuda | 371/16 |
| 4,789,924 | 12/1988 | Fukuta | 371/16 |
| 4,796,258 | 1/1989 | Boyce | 371/16 |
| 4,797,885 | 1/1989 | Orimo | 371/16 |

OTHER PUBLICATIONS

Software Research, Inc., M-TEST TM, Fact sheet for Multi-User System Test Control Facility.
Software Research, Inc.,—SPEC TEST TM, Fact sheet for Specification Based Test Manager.
Software Research, Inc., TDGEN TM, Fact sheet for Test Data Generator System (Rev. 3/88).
Software Research, Inc., SMARTS TM, Fact sheet for Software Maintenance and Regression Test System.
Software Research, Inc., S-TCAT/C TM, Fact sheet for System Test Coverage Analysis Tool for 'C.'
Software Research, Inc., TCAT/C TM, Fact sheet for Test Coverage Analysis Tool for 'C.' (Rev. 3/88).
Software Research, Inc., TCAT/C User'Manual, DOS version for Microsoft C.
Software Research, Inc., S-TCAT/C 5.4 S-TCAT/C User's manual-DOS version for Microsoft C.
Howard Falk, Contributing Editor, NEW TOOLS HELP EXTERMINATE SOFTWARE BUGS, Computer Design, Oct. 1, 1987, pp. 52-55, 57-58.
Software Research, Inc., SOFTWARE QUALITY ASSURANCE, Diagram of tools and their functions.
Alfred V. Aho, Ravi Sethi and Jeffrey D. Ullman, "Compilers Principles, Techniques and Tools", 1986, Sections, 2, 4, 7, 7.6, 9.1.
Brian W. Kernighan, Dennis M. Ritchie, "The C Programming Language," 1978, pp. 86, 207, Chapter 4.
Draft Proposed American National Standard Programming Language C, Section 3.8.
Stephen C. Johnson, Computing Science Technical Report #32, "YACC: Yet Another Compiler-Compiler".

*Primary Examiner*—Michael R. Fleming
*Attorney, Agent, or Firm*—Christopher J. Byrne

[57] ABSTRACT

Disclosed is a software development tool for testing software on embedded microprocessor-based systems. A microprocessor emulator is used to provide the embedded system with access to external mass storage and other systems. The software development tool includes a software branch analyzer which is used to report whether branches in software under test were executed.

2 Claims, 18 Drawing Sheets

```
/* Testing if statements with macros and BBA comment....*/

#define MAC1(a) if (a == 0) j = j+1; else j = j+a
#define MAC2(a) if (a == 0) j = j+1
#define MACTEST(a,b) ((a == b) || (a == b + 1))
#define MAC3(b) if (b == a1) /* BBA_IGNORE */ b=!a1;

temp()
{
   int a1, b2, c3, d4;

   if (a1 == 0)
   {
#pragma  BBA_ALERT BBA_IGNORE
      b2 = 4;
   }

   if (MACTEST(a1, b2))
   {
#pragma   BBA_IGNORE
      c3 = 5;
   }

   if (a1 == b2)
   {
      c2 = a1 + 1;
   }
   else
   {
#pragma  BBA_IGNORE BBA_ALERT
      c2 = a1;
   }

   if (0)
   {
#pragma  BBA_ALERT
   }

   MAC1(d4);
   MAC2(c3);
   MAC3(d4)
}
```

SHEET 1

```
#pragma CURRENT_DATE  ,1988,02,04,11,10,56
# 1 "cond02.c",1987,10,23,15,43,43
/* Testing if statements with macros and BBA comments.... */

# 8
temp()
{
   int a1, b2, c3, d4;

   if (a1 == 0)
   {
#pragma  BBA_ALERT BBA_IGNORE
      b2 = 4;
   }

   if (\001((a1 == b2) || (a1 == b2 + 1))\002MACTEST(a1, b2)\003)
   {
#pragma   BBA_IGNORE
      c3 = 5;
   }
```

TO SHEET 2

TO SHEET 2

FROM SHEET 1

FROM SHEET 1

```
    if (a1 == b2)
    {
       c2 = a1 + 1;
    }
    else
    {
#pragma  BBA_IGNORE BBA_ALERT
       c2 = a1;
    }

    if (0)
    {
#pragma  BBA_ALERT
    }

    \001if (d4 == 0) j = j+1; else j = j + d4\002MAC1(d4)\003;
    \001if (c3 == 0) j = j+1\002MAC2(c3)\003;
    \001if (d4 == a1) d4 = !a1;\002MAC3(d4)\003
}
```

FIG 4B
SHEET 2

```
# 1 "cond02.c"

# 8
temp()
{
   int a1, b2, c3, d4;

   if (a1 == 0)
   {
#pragma  BBA_ALERT BBA_IGNORE
      b2 = 4;
   }

   if (((a1 == b2) || (a1 == b2 + 1)))
   {
#pragma   BBA_IGNORE
      c3 = 5;
   }

   if (a1 == b2)
   {
      c2 = a1 + 1;
   }
   else
   {
#pragma  BBA_IGNORE BBA_ALERT
      c2 = a1;
   }

   if (0)
   {
#pragma  BBA_ALERT
   }

   if (d4 == 0) j = j+1; else j = j + d4;
   if (c3 == 0) j = j+1;
   if (d4 == a1) d4 = !a1;
}
```

FIG 4C

FIG 4D SHEET 1

```
# 1 "cond02.c"
static unsigned char _bA_array[10        ] = {0};
# 1 "cond02.c"


# 8
temp()
{
   int a1, b2, c3, d4;

   _bA_array[0]=1;if (a1 == 0)
   {
#pragma  BBA_ALERT BBA_IGNORE
      _bA_array[1]=1;b2 = 4;
   }

   if (((a1 == b2) || (a1 == b2 + 1)))
   {
#pragma   BBA_IGNORE
      _bA_array[2]=1;c3 = 5;
   }

   if (a1 == b2)
   {
      _bA_array[3]=1;c2 = a1 + 1;
   }
   else
   {
#pragma  BBA_IGNORE BBA_ALERT
      _bA_array[4]=1;c2 = a1;
   }
```

TO SHEET 2

FROM SHEET 1

```
   if (0)
   {
#pragma  BBA_ALERT
   _bA_array[5]=1;}

   if (d4 == 0) {_bA_array[6]=1;j = j+1;} else {_bA_array[7]=1;j = j + d4;
   if (c3 == 0) {_bA_array[8]=1;j = j+1;}
   if (d4 == a1) {_bA_array[9]=1;d4 = !a1;}
}
struct _bA_probe_struct_   {
      unsigned char insertprotocol;
      char mapsuffix;
      char sourcemodtime[9];
      unsigned char options[4];
      int numentries;
   };
const struct _bA_probe_struct_ _bA_C0dnoc_1pp_tsoh_003s_tset_abb_ph_ =
{  6,
   'M',
   {'B', 'w', '|', 'p', 'n', 'g', '~', 'G', 'p'},
   {0xa7, 0x05, 0x02, 0x00},
   10,
};
```

FIG 4D
SHEET 2

TO SHEET 2

```
:id Basis Branch Analysis Source Mapping File
:protocol 6
:options 3FFFF :cppver @Unreleased(1)@
:source 0 /hp/bba/test/s300/host/pp1/cond02.c :modtime Bw|png~Gp
:probe    1  1    3  0  2  15  2  16  1 :ctl  0  12  1  12 12
:probe    2  3    0  0  2  16  2  16  2 :ctl  0  12  1  12 12
:probe    3  1    1  0  2  21  2  22  1 :ctl  0  18  1  18 20
:probe    4  3    0  0  2  22  2  22  2 :ctl  0  18  1  18 20
:probe    5  1    0  0  2  26  2  27  1 :ctl  0  24  1  24 13
:probe    6  2    3  0  2  31  2  32  1 :ctl  0  24  1  24 13
:probe    7  1    2  0  2  37  1  37  1 :ctl  0  34  1  34  6
:probe    8  3    0  0  2  37  2  37  2 :ctl  0  34  1  34  6
:probe    9  1    0  0  2  39  1  39  8 :ctl  0  39  1  39  8
:probe   10  2    0  0  2  39  1  39  9 :ctl  0  39  1  39  8
:probe   11  1    0  0  2  40  1  40  9 :ctl  0  40  1  40  8
:probe   12  3    0  0  2  40 10  40 10 :ctl  0  40  1  40  8
:probe   13  1    0  0  2  41  1  41  8 :ctl  0  41  1  41  8
:probe   14  3    0  0  2  41  9  41  9 :ctl  0  41  1  41  8
:probe    0  0    0  0  1  12  1  42  0 :fname  0   8  0   8
```

FIG 4E

SHEET 1

FROM SHEET 1

```
@if (a1 == 0)@
@if (a1 == 0)@
@if (MACTEST(a1, b2))@ :ctlmac @if (((a1 == b2) || (a1 == b2 + 1)))@
@if (MACTEST(a1, b2))@ :ctlmac @if (((a1 == b2) || (a1 == b2 + 1)))@
@if (a1 == b2)@
@if (a1 == b2)@
@if (0)@
@if (0)@
@MAC1(d4)@ :ctlmac @if (d4 == 0)@
@MAC1(d4)@ :ctlmac @if (d4 == 0)@
@MAC2(c3)@ :ctlmac @if (c3 == 0)@
@MAC2(c3)@ :ctlmac @if (c3 == 0)@
@MAC3(d4)@ :ctlmac @if (d4 == a1)@
@MAC3(d4)@ :ctlmac @if (d4 == a1)@
5 @temp@
```

FIG 4E

SHEET 2

```
range_of_code____#_explanation___________________________

bonzo         globals.c
  12 -> 345     300 function was never called

keyconvert   convert.c
  37 -> 37          1 'then' part of 'if' was never executed
  44 -> 44     c    1 conditional of 'if' was never FALSE (no 'else' statement)
  49 -> 49     c    1 conditional of 'do while' was never TRUE
  49 -> 52     ***    code with BBA_ALERT was executed

bitpos    convert.c
  77 -> 87          5 'case' code was never executed
 194 -> 198         2 'then' part of 'if' was never executed
```

FIG 9

METHOD AND APPARATUS FOR SOFTWARE BRANCH ANALYSIS

BACKGROUND OF THE INVENTION

This invention deals with software branch analysis tools used in testing computer programs. Generally, a well written program undergoes four distinct phases of development: specification, design, coding and test. In the specification phase, the problem which the program is meant to solve, or the task which the program is meant to perform, is specified. In the design phase, a solution to the specified problem, or a method of accomplishing the specified task, is designed. In the coding phase, the design solution or the design method is implemented in writing in a particular computer language, such as FORTRAN, C, PASCAL, or assembly language. Finally, in the test phase the computer program is tested to determine if it meets the specification and design requirements. The purpose of testing is to verify that the program behaves as desired for all possible inputs.

Branch analysis is a test procedure which seeks to determine which sections of a program's code are executed during a run. A computer program consists of a sequence of computer instructions. Generally, the computer executes a program's instructions in the sequential order in which the instructions appear in the program. A branch occurs when an instruction requires jumping, that is, branching, to an instruction other than the next succeeding instruction. A program may branch to a subroutine, or to the top of a nested loop, or to the conditional part of an IF-THEN-ELSE statement, and so forth. For instance, the accessibility of a given branch determined from the branch analysis test phase may lead to a re-design of the program. In particular, branch analysis may reveal coding errors such as branches which are never executed (and are therefore unnecessary).

Prior art branch analysis tools are currently available in either hardware or software implementations. Generally, software implementations offer greater flexibility and ease of use, while hardware tools may offer greater speed. Software tools generally deal with the highest level of code, that is, the source code version of a program, and will actually add new source code to the programs under test. Hardware tools, on the other hand, deal with the lower level assembly language version of a program, and do not add code to the program under test. In its software version, the branch analysis tool is first invoked when a program is compiled.

Prior art software branch analysis tools include the so-called TCAT/C and S-TCAT/C tools provided by Software Research Associates (SRA), P.O. Box 2432, San Francisco, Calif. 94126. The SRA tools are designed for branch analysis of computer programs written in syntactically correct C language. The SRA tools analyze a target C program while the program is running and generate tubular reports which list, among other things, (a) the program modules which were tested, (b) the number of branches in each module, (c) the number of times the module was invoked during the test, (d) the number of branches executed during invocation of the module, and (e) a percent-coverage figure which is the ratio of (d) to (b).

Prior art software branch analysis tools are dependent upon the data input/output (I/O) capability of the host system on which the program under test is running.

For instance, when performing branch analysis on a program being run on a personal computer (PC), the prior art tools must use the PC's I/O to store the branch analysis test data on an external mass storage device, such as a disc. This dependency on I/O prohibits branch analysis of programs which run on *embedded* microprocessor-based systems, that is, microprocessor based systems that do not have access to external mass storage such as the software systems in a microwave oven or in a modern automobile.

SUMMARY OF THE INVENTION

The present invention, known as a basis branch analyzer (BBA), is an emulator-based software tool which performs branch analysis tests on programs which run on embedded systems. (The invention is known as a basis branch analyzer because it only tests for branches which are based, that is, written, in the program code and are therefore detectable prior to compilation of the program.) The present invention uses an emulator to read and store branch analysis test data without requiring use of the I/O of the system under test. (In the design and testing of a microprocessor-based target system, an emulator, such as the Hewlett-Packard Company Series 64416 emulator, will replace and emulate a target system's microprocessor.) Thus, with the present invention, branch analysis tests may be performed on embedded systems which do not have access to external mass storage.

Generally, the present invention implements a three step process comprising three major routines: preprocess, unload, and report. The preprocessing routine, referred to as "bbacpp", is invoked just before a program is compiled or assembled by the computer: bbacpp inserts a preprocessing statement at the beginning of each potential branch in the program, that is, at each section of code that may be independently executed. The preprocessing statement corresponding to a given branch will be executed if and only if that branch is executed. The preprocessing statements are indexed linearly in an array data structure. The preprocessing statements, when executed, set a boolean value to TRUE. The unload routine, referred to as "bbaunload", is executed after the program is run but before the program's data area is cleared from memory. The bbaunload routine reads the boolean data in the array data structure corresponding to the preprocessing statements which were inserted during preprocessing and then copies the boolean values to non-volatile memory, such as a disk. The report routine, known as "bbareport", reads and analyses a bbaunload dump file and generates a report indicating which sections of program code were executed and which were not.

The present invention provides the following advantages:

(1) BBA can perform testing of programs from a wide range of computers and systems, including embedded systems such as the programs which are embedded in microwave ovens or aviation controls systems or other systems which do not have convenient access to mass storage.

(2) BBA does not require I/O, such as writing to a disk, while the program under test is running, thereby significantly increasing the speed of branch analysis tests.

(3) BBA will automatically detect changes to source code versions of the program under test.

(4) BBA minimizes the possibility of corrupting test results through an inadvertent merge of data from two different source code versions of the program under test.

(5) BBA allows the user to define branches that are to be ignored during the test, allowing for defensive coding without poor test coverage.

(6) BBA allows the user to generate test results on a program-module basis such that a program which is being developed in modules can be analyzed for coverage by modules.

(7) BBA presents no logical differences in the execution of the program under test, for example, no additional prompts are issued to the user and no I/O channels are preempted by the test.

BRIEF DESCRIPTION OF THE DRAWINGS

FIG. 4A shows an example of C-program 5 of FIG. 4.

FIG. 4B shows an examle of modified original text 210 of FIG. 4.

FIG. 4C shows an example of normal cpp output 220 of FIG. 4.

FIG. 4D shows an example of cpp output and inserted bba statements 240 of FIG. 4.

FIG. 4E shows an example of mapfile 250 of FIG. 4.

FIG. 9 shows a sample branch analysis report.

DESCRIPTION OF THE PREFERRED EMBODIMENT

Figure 1:
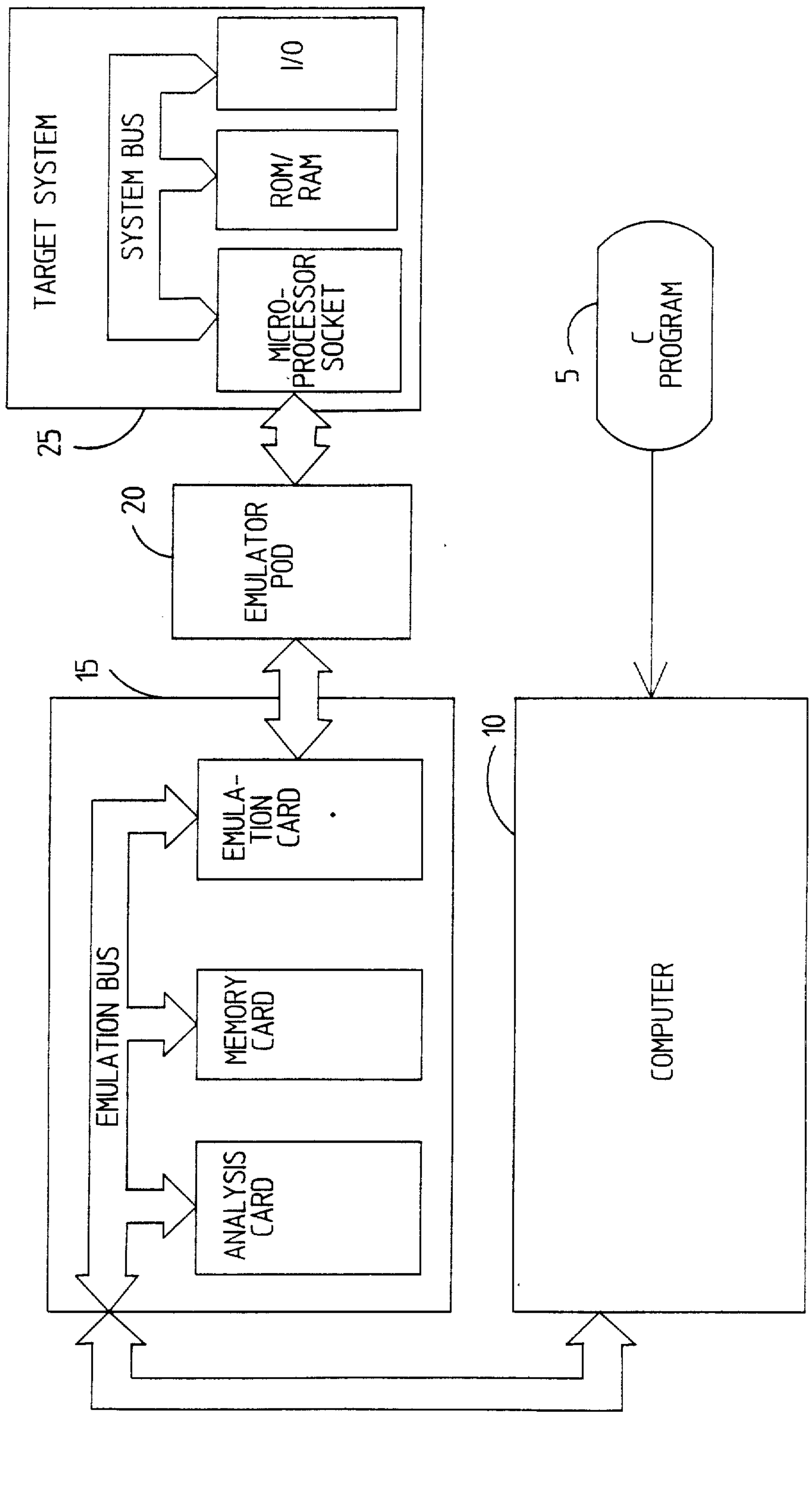
FIG. 1 shows a diagram of the emulator-based implementation of the present invention.

FIG. 1 is a diagram of the emulator-based implementation of the present invention. Target system 25 is an embedded system, that is, a microprocessor-based system lacking access to external mass storage, such as the control board in a microwave oven or in a modern automobile. Program 5 is a C-language program which is to be executed on target system 25. Normally, program 5 would be compiled, linked and programmed into the ROM of target system 25 and then executed. However, in such a case it would be difficult to perform a branch analysis test of program 5 while it is running because target system 25, an embedded system, lacks access to external mass storage which is needed to store branch analysis data. The present invention overcomes this difficulty through the use of emulator 15, including pod 20. In the preferred embodiment of the present invention, the microprocessor in target system 25 is removed and replaced by emulator 15 via pod 20. Emulator 15 interfaces with target system 25 via emulator pod 20 which plugs into the microprocessor socket in target system 25. Emulator 15 has its own microprocessor located in its emulation pod 20. (Emulator 15 and emulator pod 20 are well known in the prior art, such as in the Hewlett-Packard Company 64000 series of emulator products.) Operation of emulator 15 is controlled by computer 10. In the preferred embodiment of the present invention, program 5 is compiled and linked on computer 10. Emulator 15 then downloads program 5 from computer 10 to target system 25 via emulator pod 20. Program 5 is then executed on target system 25. Use of emulator 15 in the present invention allows for branch analysis of program 5 as executed on target system 25. As discussed in connection with FIGS. 3 through 9 below, the present invention inserts branch analysis preprocessing statements in program 5 prior to compilation and linking on computer 10. Following compilation and linking of program 5 (including the preprocessing statements), computer 10 then downloads program 5 into target system 25 and/or memory in emulator 15. Emulator 15 controls execution of program 5 on target system 25 and collects branch analysis data resulting from inclusion of the preprocessing statements. The branch analysis data is then presented to the user in the form of a report on which branches in program 5 were or were not executed during the run.

Figure 2:
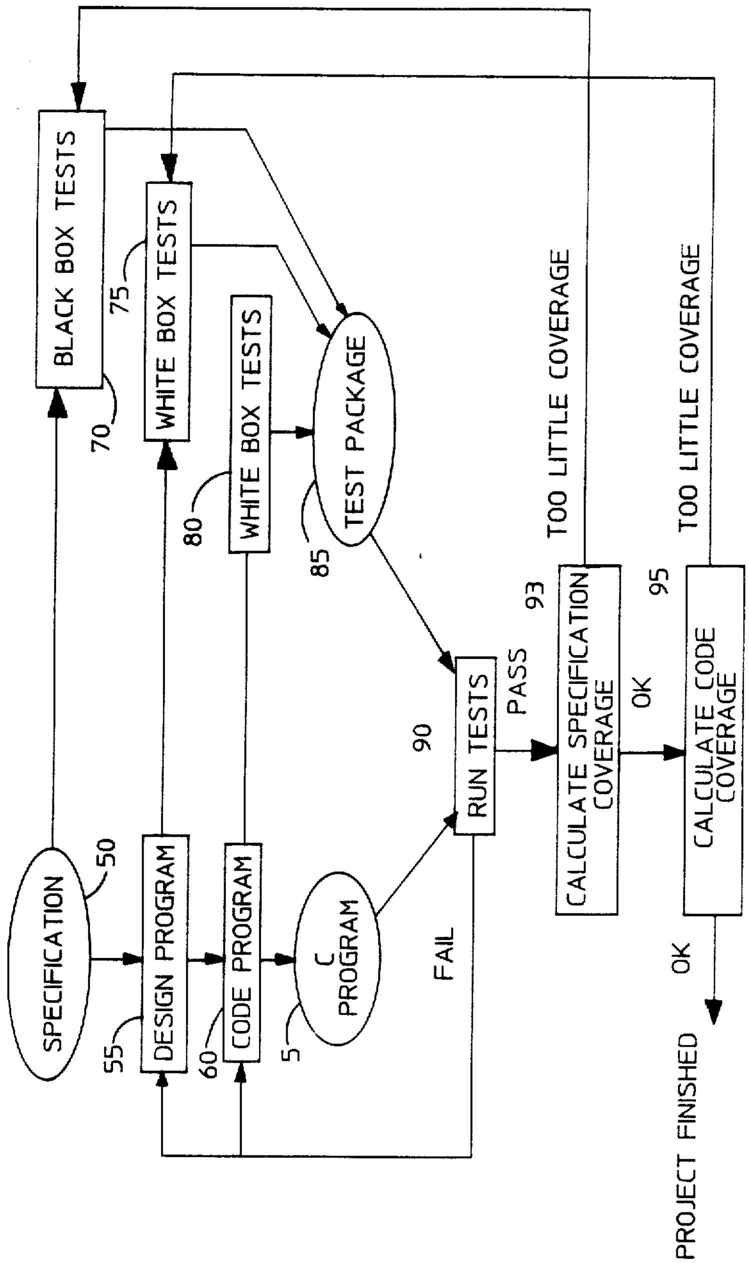
FIG. 2 shows the phases of development of a computer program.

FIG. 2 shows the phases of development of a computer program. In FIG. 2, bubbles represent input or output information while rectangles represent processes which receive or produce the information in the bubbles. Specification 50 is the first phase in the development of a computer program. The specification specifies the problem which the program is meant to solve or the task which the program is meant to perform. The next phase, design phase 55, is to design a program which meets the requirements of specification 50. The next phase, code phase 60, is to code the program which was designed in design phase 55. During code phase 60, the program is actually written in a particular computer language such as C, PASCAL, FORTRAN, assembly language, etc. The result of code phase 60 is computer program 5. Parallel to the specification, design and coding of program 5 are a series of test phases 70, 75, and 80 which result in test package 85. Tests 70, 75 and 80 are designed to test specification 50, design phase 55, and code phase 60, respectively, to produce an effective test package 85. Test 70 is a black box test meaning that it is written without knowledge of the actual program 5, but only with knowledge of specification 50. Tests 75 and 80 are white box tests, meaning that they are written with knowledge of both design 55 and code 60. Program 5 then undergoes the tests in test package 85 as indicated by run-tests phase 90. Failure to pass run-test phase 90 may result in either a re-design or a re-coding of program 5. Passing run-test phase 90 leads to specification coverage test 93 where it is determined whether all of the elements of specification 50 were adequately covered, that is tested, in the previous phases. If all the elements of specification 50 are not adequately covered, then black box tests 70 may be re-written. Final phase 95 is a determination of whether all of the program code was adequately covered, that is tested, in the previous phases. If code coverage is adequate then the program is finished; otherwise, test 75 will typically be lengthened to cover more of program 5. It should be noted that branch analysis takes place solely within phases 90 and 95; in fact, it is the branch analysis test data which allows the user to decide whether there was adequate or inadequate code coverage.

Figure 3:
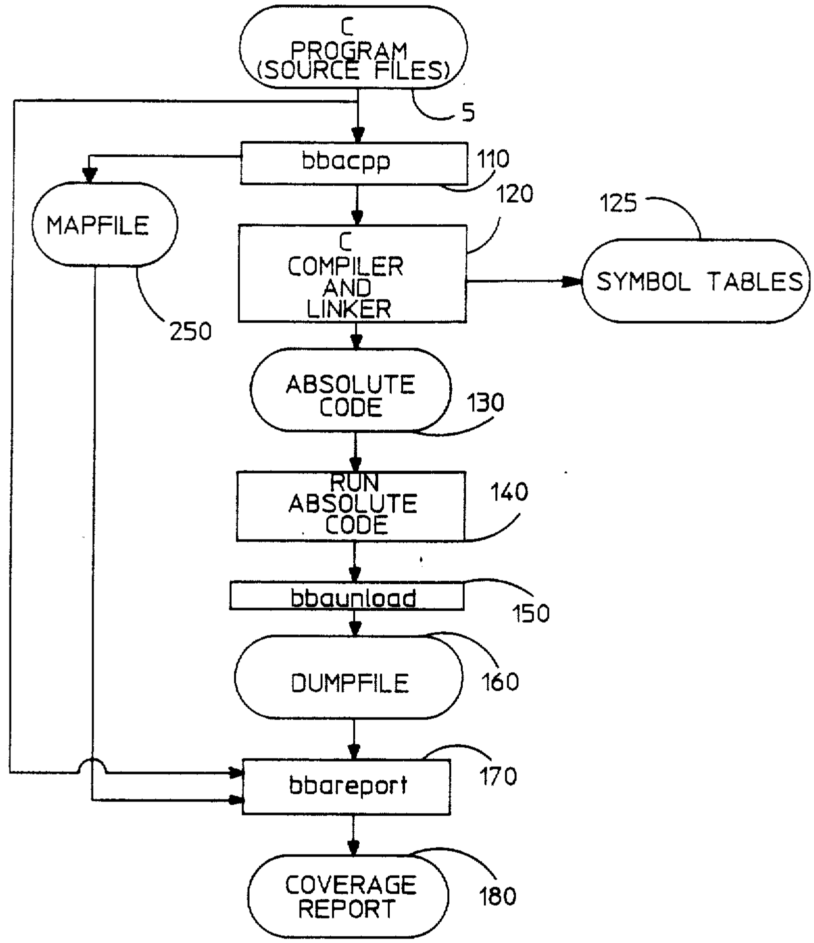
FIG. 3 shows the steps in the method of the present invention.

FIG. 3 shows the steps in the method of the present invention. In FIG. 3, bubbles represent input or output information while rectangles represent processes which receive or produce the information in the bubbles. The present invention starts with a computer program 5 written in C-language source code, indicated by C-program 5 in FIG. 3. (The preferred embodiment of the present invention is designed to perform branch analysis on programs written in C-language source code, but the present invention could be modified to perform branch analysis on programs written in any computer language, including assembly language.) As noted in the Summary, C-program 5 undergoes three major processes in the steps of the present invention: preprocess, unload and report. In FIG. 3, these three major processes are represented by bbacpp 110, bbaunload 150 and bbareport 170, respectively. In step 110, the bbacpp 110 (basis branch analysis C pre-processor) pre-processes the C-program 5 and generates a mapfile 250 corresponding to C-program 5; it then passes the pre-processed C-program onto C-compiler-and-linker 120. (Bbacpp 100 and mapfile 250 are more fully described in connection with FIG. 4, below.) C-compiler-and-linker 120 generates symbol-tables 125 and absolute-code 130 corresponding to C-program 5. Symbol tables and absolute code are well known in the prior art as output of compilers and linkers. (See, *Compilers—Principles, Techniques, and Tools*, sections 2.7, 7.6 and 9.1, Alfred V. Aho, Ravi Sethi, Jeffrey D. Ullman, Addison-Wesley Publishing Company, June 1987.) Symbol-tables 125 identifies where each variable name and/or function name defined in the C-program 5 resides in the absolute-code 130. Absolute-code 130 is the binary code version of C-program 5 as produced by C-compiler-and-linker 120. In step 140, the C-program 5, in its absolute-code 130 form, is executed by computer 10, undergoing the tests which would have been specified in test package 85 of FIG. 2. The executed program and symbol-tables 125 are then processed by bbaunload 150. Step 150 is more fully described in connection with FIG. 5. The output of bbaunload 150 is dumpfile 160. Dumpfile 160 contains information indicating which branches in C-source-file-100 were or were not executed in step 140. Finally, bbareport 170 processes the original C-program 5 together with its corresponding dumpfile 160 and mapfile 250 to produce a coverage report 180. Coverage report 180 is a written report to the user indicating, among other things, which branches in C-program 5 were or were not executed. Coverage report 180 is more fully described in connection with FIG. 9.

Figure 4:
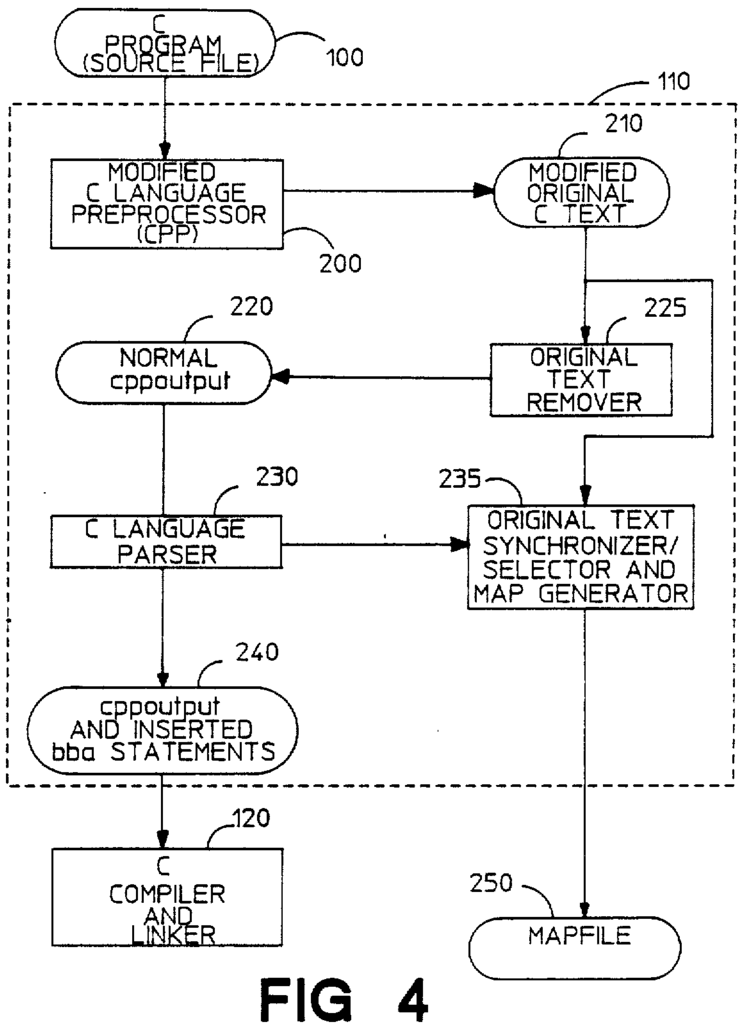
FIG. 4 shows the sub-steps of step 110 of FIG. 3.

FIG. 4 shows the sub-steps of step 110 of FIG. 3. In FIG. 4, bubbles represent input or output information while rectangles represent processes which receive or produce the information in the bubbles. The processes are implemented in C language source code. C-program 5 is first pre-processed by the modified C language preprocessor (cpp) 200. As a function of the C language, a C source code program will undergo preprocessing by a C language preprocessor when the program is compiled. (See, *The C Programming Language*, Brian W. Kernighan and Dennis M. Richtie, Prentice Hall Software Series, 1978, page 86, 207. See also, *Draft Proposed American National Standard for Information Systems-Programming Language C*, Section 3.8, Oct. 1, 1986. This latter reference, including but not limited to Section 3.8, is commonly referred to as the "ANSI standard for C programming".) In the preferred embodiment of the present invention, cpp 200 is modified to produce modified-original-C-text 210. The output of the modified cpp 200 is different from a normal cpp in that macro substitutions are marked as follows: The beginning of a macro substitution output is marked by a control-A (octal 001) and the end of a macro substitution is marked by a control-B (octal 002). (Macros are discussed in connection with FIG. 4E, below.) The original text of the macro, that is, the macro invocation, follows control-B, and the invocation is terminated by a control-C (octal 003). (Modified cpp 200 is listed in Appendix A in the following files: cpp/define.c (pp. 523–532), cpp/define.h (pp. 533), cpp/error.c (pp. 534–535), cpp/file.c (536–543), cpp/file.h (pp. 544), cpp/if.c (pp. 545–548), cpp/if.h (pp.549), cpp/ifgram.y (pp. 550–553), cpp/iflex.c (pp. 554–559), cpp/main.c (pp. 560), cpp/readline.c (pp. 561–567), cpp/startup.c (pp. 568–570), cpp/substitute.c (pp. 571–585), cpp/support.c (pp. 586–590), and cpp/support.h (pp. 591–592). Macro substitutions are implemented in file cpp/substitute.c. (pp. 571–585); see especially, references to the variable 'GenerateColoInfo'.) Modified-original-C-text 210 is then processed by original-text-remover 225 which removes the modified original test to produce normal-cpp-output 220. Modified-original-C-text 210 is also sent directly to original-text-synchronizer/selector-and-map-generator 235. The normal-cpp-output 220 is processed by C language parser 230. (C language parsers, as a function of the C language, are well known in the prior art. See, *Compilers—Principles, Techniques, and Tools*, as referenced above, Section 4; see also, *YACC—Yet Another Compiler-Compiler*, Programming Environment HP-UX Concepts and Tutorials, product # 97089-90042, August 1986. The C langauge parser implemented in the present invention is implemented with the following Appendix A files: pp/gram/gactions.c (PP. 186–212), pp/gram/gram.y (pp. 213–248), pp/gram/lex.c (pp. 249–273), pp/gram/lexinter.c (pp. 274–275), pp/gram/prcpptext.c (pp. 276–280).) One output of parser 230 is the normal cpp-output together with inserted bba statements 240. This output 240 is then compiled and linked by C-compiler-and-linker 120. A second output from parser 230 includes character position information and branch-type information; this second output is processed by synchronizer/selector 235 together with modified-original-C-text 210. Synchronizer/selector 235 uses the modified-original-C-text 210 and the character-position/branch-type information from the parser 230 to create mapfile 250, which corresponds to C-program 5. The character position information defines the position of characters in the modified original C text 210. The character position information includes the starting and ending characters of branch control statements (for example, the "i" in an "if" statement and the closing parenthesis of the "if"'s expression) and the first and last character of the statements which the branch controls. This character position information is used by synchronizer/selector 235 to recreate the position of original text in C-program 5 before macro substitution. Synchronizer/selector 235 relates each character position of normal cpp output 220 to a specific character (or character range) in the C source file 5. The method used assumes that if a character in modified original C text 210 is not the result of macro substitution, then there is a one-to-one correspondence between C source file 5 characters and cpp output 220. If, however, a character in the normal cpp output 220 is the result of a macro substitution, that character's original position is mapped to the range of characters in the C program 5 that the macro invocation originally occupied. This information is stored in the mapfile 250 so that the report generator 170 can accurately show what source statements in the C source program were not executed. In addition to the character position information, the synchronizer/selector 235 stores branch-type information for each branch whih parser 230 detects. This is further discussed in relation to FIG. 4E. (Synchronizer/selector 235 is implemented in the following Appendix A files: pp/gram/cpplines.c (pp. 149-164), pp/gram/cread.c (pp. 165—172), pp/gram/csource.c (p. 173-177), pp/gram/gactions.c (pp. 186-212), pp/gram/prcpptext.c (pp. 276-280), pp/gram/probe.c (pp. 281-294).)

FIG. 4A shows an example of C-program 5. C-program 5 as shown in FIG. 4A is an example of source code that would be written by a C programmer. (C syntax is completely defined in the ANSI standard for C programming, cited above.) At the top of C-program 5 are four #define macro definitions. The macros are followed by a single function, temp. The function temp declares four integer variables: a1, b2, c3 and d4. The function temp includes four if statements with the third if statement also having an else statement. The third macro defined at the top of FIG. 4A is invoked in the second if statement, while the remaining macros are invoked after the last if statement. Normally, any characters between /* and */ in a C source program are recognized as inexecutable comments and ignored by the C compiler. FIG. 4A includes five comments: the one at the top between the /* and */ characters and the one following the #pragma statements. The #pragma statements are much like to comment lines. (According to the ANSI standard for C programming, #pragma statements are to be treated like comments by C compilers and preprocessors if a compiler or preprocessor does not understand the pragma.) The BBA_IGNORE and BBA_ALERT pragmas determine the type of report the user will receive regarding the branch in which the pragma is embedded. (Branch reports are discussed in detail in connection with FIG. 9. BBA_ALERT and BBA_IGNORE are discussed in detail in Appendix B, pages 3-21 through 3-24.) The BBA_ALERT and BBA_IGNORE pragmas are inserted by the author of the source code program. The present invention allows the source code program authoer to embed these pragmas in any branch of the program.

FIG. 4B shows how C-program 5 (FIG. 4A) is modified by cpp 200 to produce modified original C text 210. As discussed in connection with FIG. 4, cpp 200 receives C-program 5 and processes it to produce modified original C-text 210. Comparing FIG. 4A with FIG. 4B, we see that cpp 200 produces modified original C text 210 from C-program 5 by doing the following: removing the macro definition statements, removing the comments, inserting the macro definitions where invoked in the original source text and surrounding them with control characters. (In FIG. 4B, the characters 001, 002 and 003 represent the ASCII control characters control-A, control-B and control-C, respectively. The text between 001 and 002 is the normal cpp output while the text between 002 and 003 is the modified original text.)

FIG. 4C shows how modified-original-C-text 210 (FIG. 4B) is modified by original-text-remover 225 to produce normal-cpp-output 220. Comparing FIG. 4C with FIG. 4B, we see that original-text-remover 225 produces normal-cpp-output 220 from modified-original-text 210 by doing the following: removing the characters control-A, control-B, control-C and all text between control-B and control-C.

FIG. 4D shows how normal cpp output 220 (FIG. 4C) is modified by C language parser 230 to produce cpp-output-and-inserted-bba-statements 240. FIG. 4D shows the inserted BBA statements which parser 230 inserted in the branches of normal cpp output 220. In FIG. 4D, there are fifteen inserted BBA statements, _bA_array[0]=1 through _bA_array[14]=1. Note that at each branch of output 220, a BBA statement has been inserted. The first statement is inserted inside the temp subroutine itself, just below the variable declaration statement. The second BBA statement is inserted inside the first if branch; the third BBA statement is inserted inside the first else branch; the fourth BBA statement is inserted in the second if branch; and so on. Note that each inserted BBA statement is in the form of an assignment statement where the statement, if executed, sets an array value to 1. For instance, the first BBA statement is "_bA_array[0]=1" which is inerted just below the variable declaration section of the subroutine temp such that if temp is invoked, the array value _bA_array[0] is set to 1. Thus, if a branch containing an inserted BBA statement is executed, the BBA statement will also be executed and its corresponding boolean array element will be set to 1. The information following the last BBA statement, _bA_array[14], is used by bbaunload 150 of FIG. 3; the information is discussed in connection with FIG. 5.

FIG. 4E shows an example of mapfile 250 of FIG. 4. The mapfile 250 is used by the report generator 170 of FIG. 3 to associate _bA_array_array entries to specific source code lines in C-program 5. The mapfile consists of five types of lines:

Type 1: the ":id" line: This line is of the form ":id Basis Branch Analysis Source Mapping File" and is always the first line of a mapfile. It is used to identify the rest of the file as a mapfile.

Type 2: the ":protocol" line: This line is of the form ":protocol <mapprotocol>" where <mapprotocol> is an integer. It is used to define what version (or protocol) the file was ritten with, and defines what other types of lines will be valid in the rest of the file. The preferred embodiment of the present invention uses a mapprotocol of "6".

Type 3: the ":options" line: This line is of the form ":options <types>:cppver <cppversion>" where <types> is a hexadecimal integer specifying what types of branches (or "probes") bbacpp 110 was enabled to identify. The file "probe.h" in Appendix A (pp.8-10) contains definitions (e.g., PT_IF, PT_ELSE) mapping a bit to each type of probe. In addition, <cppversion> is the version of bbacpp 110 that created the mapfile; it is quoted by '@' signs.

Type 4: the ":source" line: This line is of the form ":source <snum> <spath> <smodtime>" where <snum> is a "source reference number" which is used in the ":probe" lines to refer to this <spath>. The <spath> is a string quoted by '@' signs which defines which HP-UX source file <snum> refers to. The <smodtime> is the modification date of <spath>, encoded into a "smithdate". (See file smithdate/smithdate.c, Appendix A, pp. 60-82, for a complete description of this encoding).

Type 5: the ":probe" line: This line is of the form ":probe <index> <ptype> <pflags> <snum> <escope> <sline> <scol> <ecline> <ecol> [other]" where <index> is the index number of the array that is associated with this probe point. The <ptype> is a number indicating what type of probe this is. The <pflags> is a (hex) number which indicates various flags. These flags are defined in the Appendix A file probe.h (pp. 8-10), e.g., PF_IGNORE and PF_ALERT. The <snum> is the C- program 5 source file's symbol number, the same as in ":source" lines. The <e-scope> is the execution scope level of the probe point; 1= function, 2=scope of first branch within a function, and so on. The <sline> is the first line (in <snum>) that is executed if array [<index>] is a 1. The <scol> is the first column that was executed. The <eline> is the last line that was executed. The <ecol> is the last column that was executed. Finally, "other" information may include one or more of the following:

:fname <snum> <sline> <scol> <eline> <ecol> <fname>

<index> was inserted as the first statement in function <fname> (string). The function's declaration started in source snum at sline/scol through eline/ecol.

: ctl <snum> <sline> <scol> <eline> <ecol> <ctlstring>

<index> was inserted as the first statement after this (conditional) statement (string). The location of the conditional is sline/scol through eline/ecol in source file snum.

: ctlmac <mstring>

<index> was within a generated macro. The source is <ctlstring>; the expanded string is <mstring>.

Figure 5:
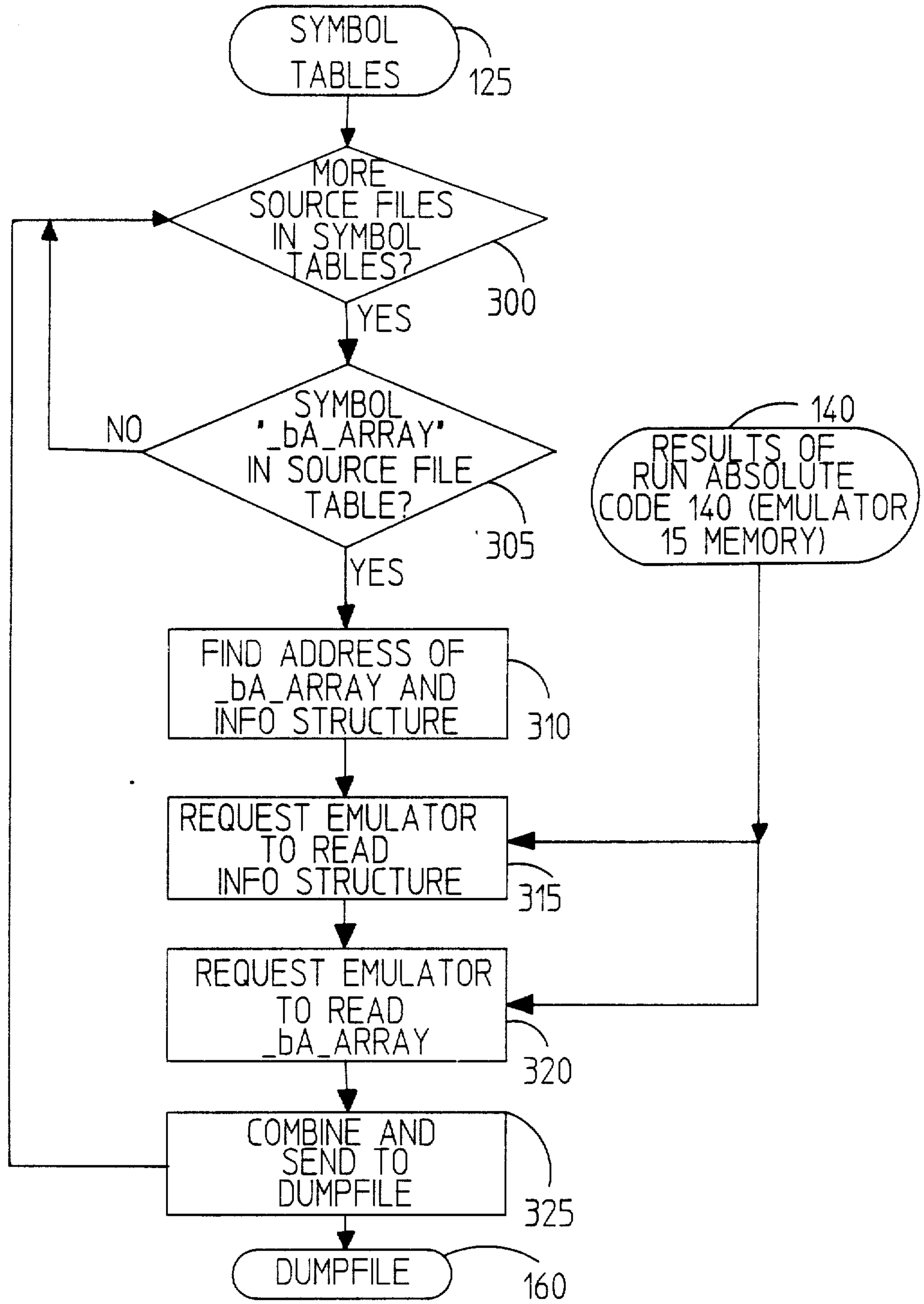
FIG. 5 shows a blow-up of bbaunload 150 of FIG. 3.

FIG. 5 shows a blow-up of bbaunload 150 of FIG. 3. In step 300, the bbaunload 150 routine scans through the symbol table 125 to find symbols associated with a the C-program 5 source file. (An absolute code 130 file can contain more than one C-program 5 source file preprocessed with bbacpp 110.) If there is no more data on any source files, the unload is finished. If there was another source file, there is a check to see if there is a symbol "_bA_array" (step 305) in that source file. If not, then it is known that the source file was not compiled with bbacpp 110, and there is a search for another source file. If the symbol "_bA_array" does exist, step 310 looks for another symbol that starts with _bA_ in that source file's symbol table 125. This other symbol (called the "info structure") is the symbol generated by the text that bbacpp 110 added at the end of the C-program 5 source code; an example of such text is the text in FIG. 4D starting with the line "struct_bA_probe_struct_{.In FIG. 4D, the symbol "_bA_C0dnoc_1pp_t-soh_tset_abb_ph_" will be in the symbol table} The addresses of the _bA_array symbol and the info structure symbol are then passed on to step 315. Step 315 requests emulator 15 of FIG. 1 to read the first address associated with the info structure symbol plus 16 successive bytes. (Note that these "addresses" refer to memory in emulator 15 and/or target system 25.) The first byte will contain the version (or protocol) of the structure that was inserted into the source code by bbacpp 110. The second byte contains the character which was appended to the name of the file to form the name of the mapfile 250 relating to the source file. The third through eleventh bytes contain the modification date of the source file at the time bbacpp 110 read it. The data is encoded by the same method used in generating the mapfile's <smodtime> (see, Type 4 in the discussion of FIG. 4E above). Bytes 12 through 15 contain a 32-bit integer which defines what types of branches bbacpp 110 was enabled to identify (see, Type 3, ":options" line definition, in the discussion of FIG. 4E above). The last byte contains an integer defining how many entries are in the _bA_array. Step 315 then requests emulator 15 to read the first address associated with the _bA_array through that address plus 1 byte per entry (obtained from the last byte of the info structure, above). The data read from the emulator is then appended to the dumpfile 160.

Figure 4F:
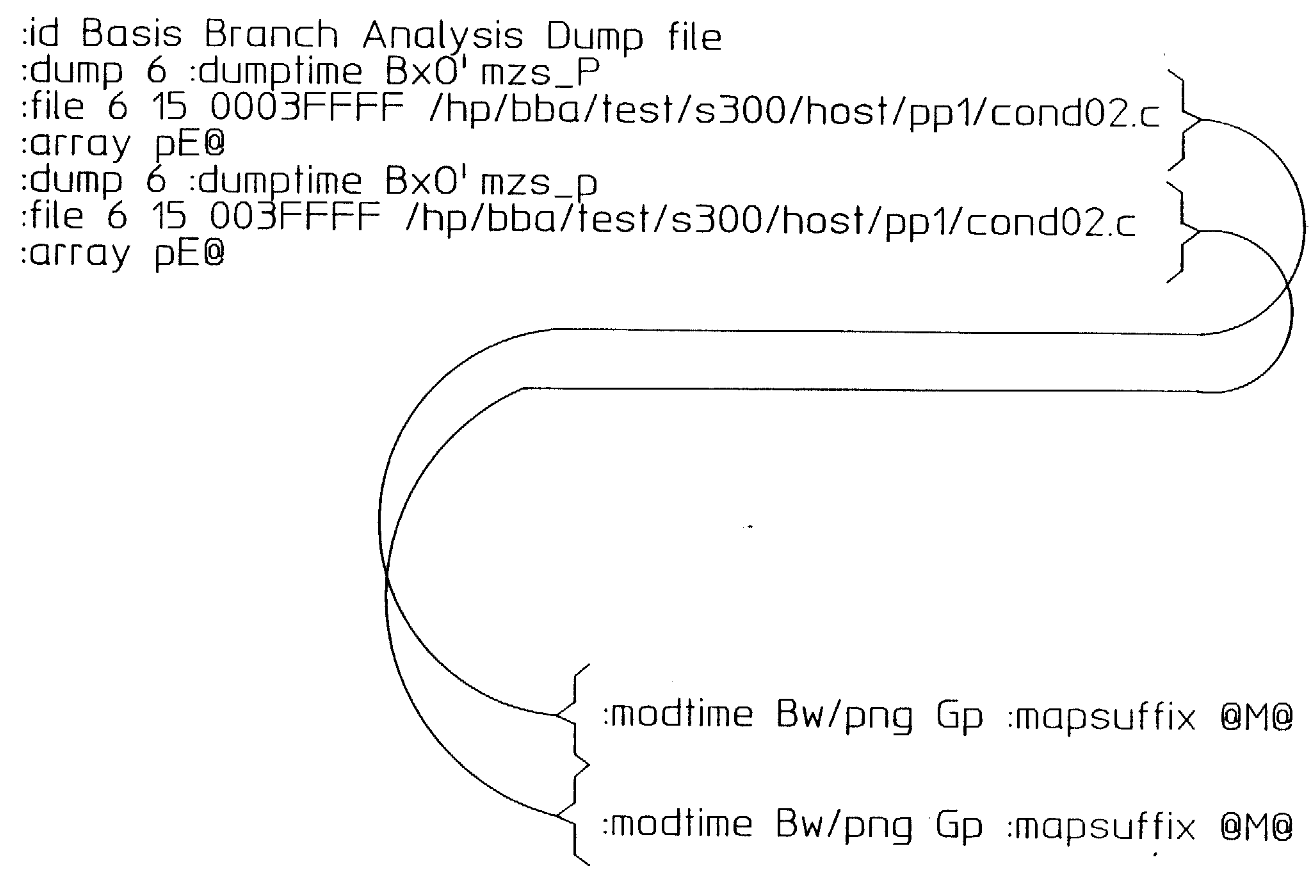
FIG. 4F shows an example of dumpfile 160 of FIG. 3.

FIG. 4F shows an example of dumpfile 160. The format for dumpfile 160 is as follows:

(1) The first line is always the same, and may be used to identify the file. The first line appears as follows:

:id Basis Branch Analysis Dump File.

This first line may appear elsewhere in the file as well.

(2) The rest of the lines consist of one or more 'dump records'. The dump record consists of a dump header and a set of zero or more 'dump by file' records (described below).

(A) The 'dump header' consists of a line of the form ":dump <dumpprotocol> [<dump_time>]" where <dump_protocol> is an integer describing the protocol for this dump file; in the preferred embodiment of the present invention, the value is 6. The <dump_time> is the date/time that this dump record was generated (either via a bbadump( ) call or bbaunload program). It is stored as ":dumptime <smithtime>".

(B) The 'dump by file' record, which follows the dump header, consists of a line of the form ":file <insert_protocol> <numentries> <options> <source_path> [<mod_time>] [<mapsuffix>]" where <insert_protocol> is an integer defining the protocol under which the data was inserted. The <numentries> is the number of entries in the data array. The <options> is a bit map of probe types (PT_* variables) that could be generated. It is formatted as a hex number. This hex number changes when the user enables or disables options using the "-DBBA_OPTO= command-line" option. The <source_path> is the path of the source file to which the following data relates: The <mod_time>, if present, is the modification date/time of the source file at the time it was run through bbacpp 110. If present, it is of the form: ":modtime <smithtime>" where <smithtime> is 9 ASCII bytes. The <mapsuffix>, if present, is the suffix of the map file. If present, it is of the form: ":mapsuffix @<suffix>@" where suffix is a single ASCII character.

(C) Following the 'dump by file' record there is one or more lines of array data. The lines are of the form: ":array <characters>" where <characters> are up to 72 ASCII characters. The array values are packed 6 bits per character. Thus, up to 432 entries may be specified per line. When writing, bit-7 is always a 0, and bit-6 is always a 1. When reading, there is no check to see if bit-7 is a 0, but there is a check to determine if bit-6 is a 1. Bits 5-0 are significant. If a character is only partially used, the unused bits will be set to 0. For example, if there are 9 bits in the data array, and entries 0, 1, 4, 5, & 8 were set to '1' during execution, the array line would look like:

| | | | | |
|---|---|---|---|---|
| :array sH | | | | |
| array[] | | 012345 | | 678 |
| array value | | 110011 | | 001 |
| charbit | | 76543210 | | 76543210 |
| char (hex) | 7 | 3 | 4 | 8 |
| char (ASCII) | | s | | H |

Finally, the user can choose to compress the data in the dumfile via a merge command (see Appendix B, page 1-2) which is implemented in the following Appendix A files: report/report.c (pp. 423-431), report/parray.c (pp. 421–422), report/dmctl.c (pp. 336–347) and report/merge.c (pp. 384–389). If compression has been done, there may be two or more "dump header" records with no "dump by file" records. In this case, all dump header information is taken to apply to all the "dump by file" data between the last one and the next one. For example, after a compression, there may be:

```
:dump (#1)

:dump (#2)

:file

:array
```

which means that both dump #1 and dump #2 apply to the :file/:array lines.

Figure 6:
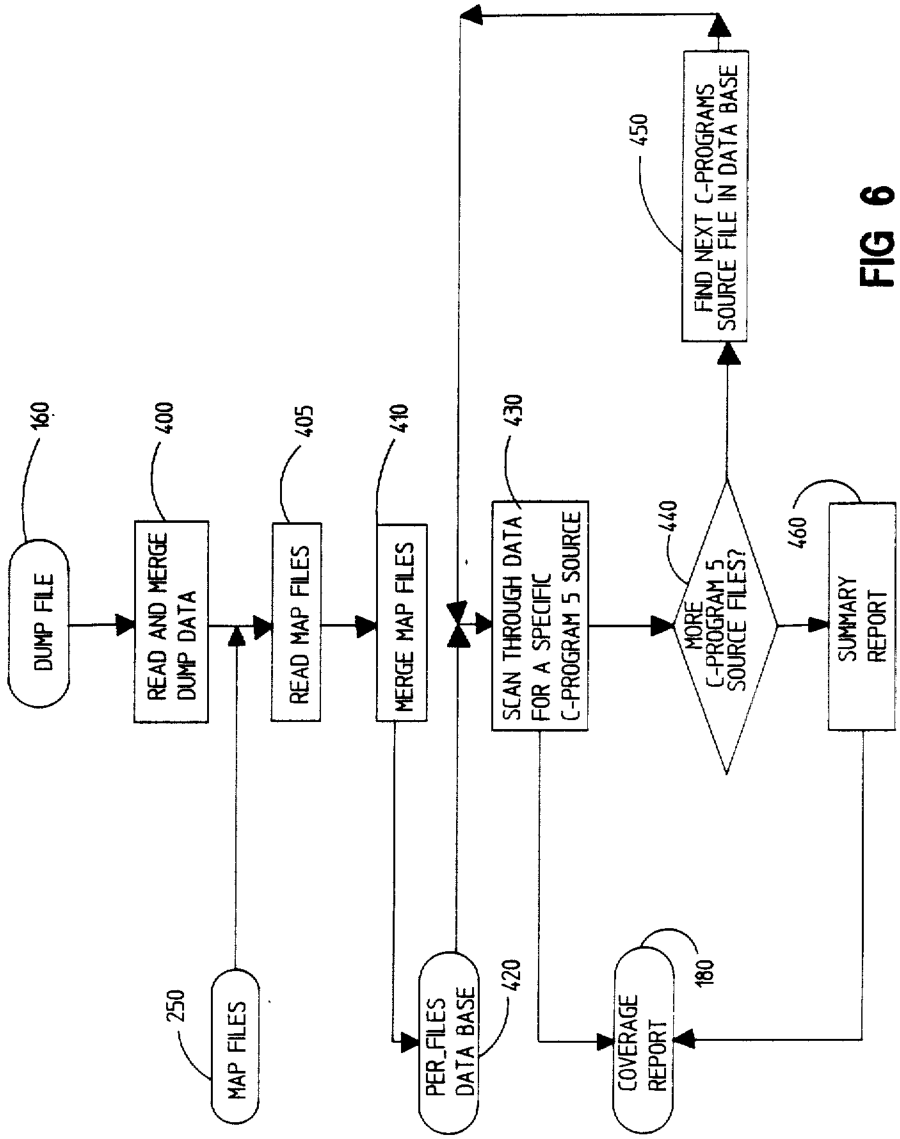
FIG. 6 shows a blow-up of bbareport 170 of FIG. 3.

FIG. 6 shows a blow-up of bbareport 170 of FIG. 3. Step 400 reads in the dumpfile which was written by the unload routine 150. Since there may be more than one set of data for each source file, the data from each source file is logically ORed together. This results in a single _bA_array for each source file, where an entry is TRUE if any of the sets of data for the source file was TRUE, and FALSE only if all of the sets of data for the source file had FALSE for that entry. (See Appendix A files report/darray.c (pp. 331–335), report/dmctl.c (pp. 336–347) and report/drinput.c (pp. 348–371)). Step 405 then reads in the mapfiles for each of the source files, which results in a data structure which relates each entry in all _bA_array's to a ":probe" line in the mapfiles 250. Since there may be several map files for a single source file (see Appendix B, pages 3–19 and 3–20), step 410 detects identical ":probe" lines and logical ORs the data associated with them, and puts unique ":probe" lines in order of line/column number. This results in a "per-file database" 420 which is used by step 430. (See Appendix A files report/merge.c (pp. 384–389) and report/mrinput.c (pp. 393–412).) Step 430 then scans through each of the source file's per-file database as described more completely in the discussion of FIG. 7. Step 430 is repeated until there are no more source files in the per-file database 420. When there are no more files, a summary of all branches and all executed branches is reported (step 460) if the user requested it (see Appendix B, pages 5-1 through 5-12).

Figure 7:
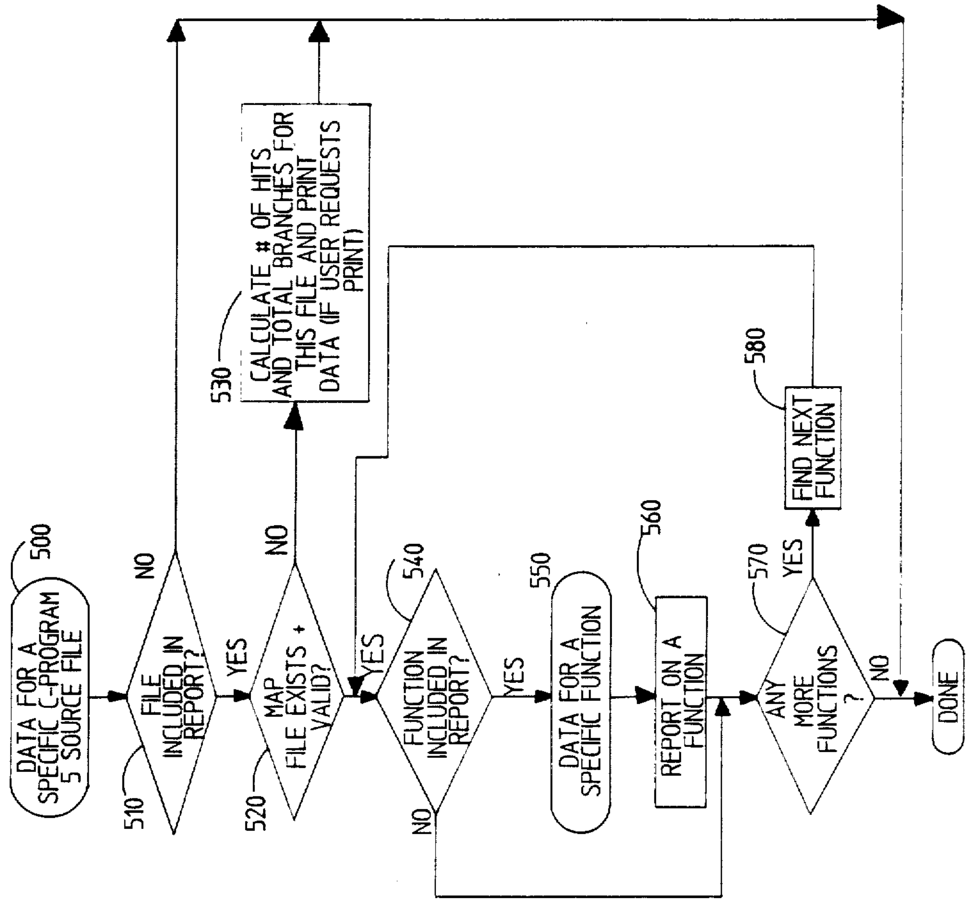
FIG. 7 shows a blow-up of step 430 of FIG. 6.

FIG. 7 shows a blow-up of step 430 of FIG. 6, which is executed for each C-program 5 source file in the per-file database 420. Step 510 examines a C-program 5 source file and decides if the user requested the source file in his output. (See Appendix B, pages 5-1 through 5-3 for ways the user can invoke bbareport 170.) If the source file is selected for output, the per-file database 420 is queried to see if the mapfile 250 associated with the C-program 5 source file existed and was valid. If not, then the only printout that bbareport 170 can give is a listing of the total branches and the number of branches executed for this source file (step 530). If the mapfile 250 existed, a loop (steps 540, 550, 560, 570, and 580) is executed for each function. (A "function" is defined in *The C Programming Language*, Kernighan and Richtie, Prentice Hall Software Series, 1978, chapter 4, "Functions and Program Structure".) The mapfile 250 has at least one ":probe" line for each function in the file. Since the mapfile 250 (and hence the per-file database 420) has the name of the function, a check can be made to see if the user selected this function for output (step 540). If the user did select this function for output, a report is generated (step 560; explained more fully in relation to FIG. 8). The per-file database 420 is then checked to see if there are any more functions in this source file. If so, the loop is repeated. If not, continue to step 440 in FIG. 6.

Figure 8:
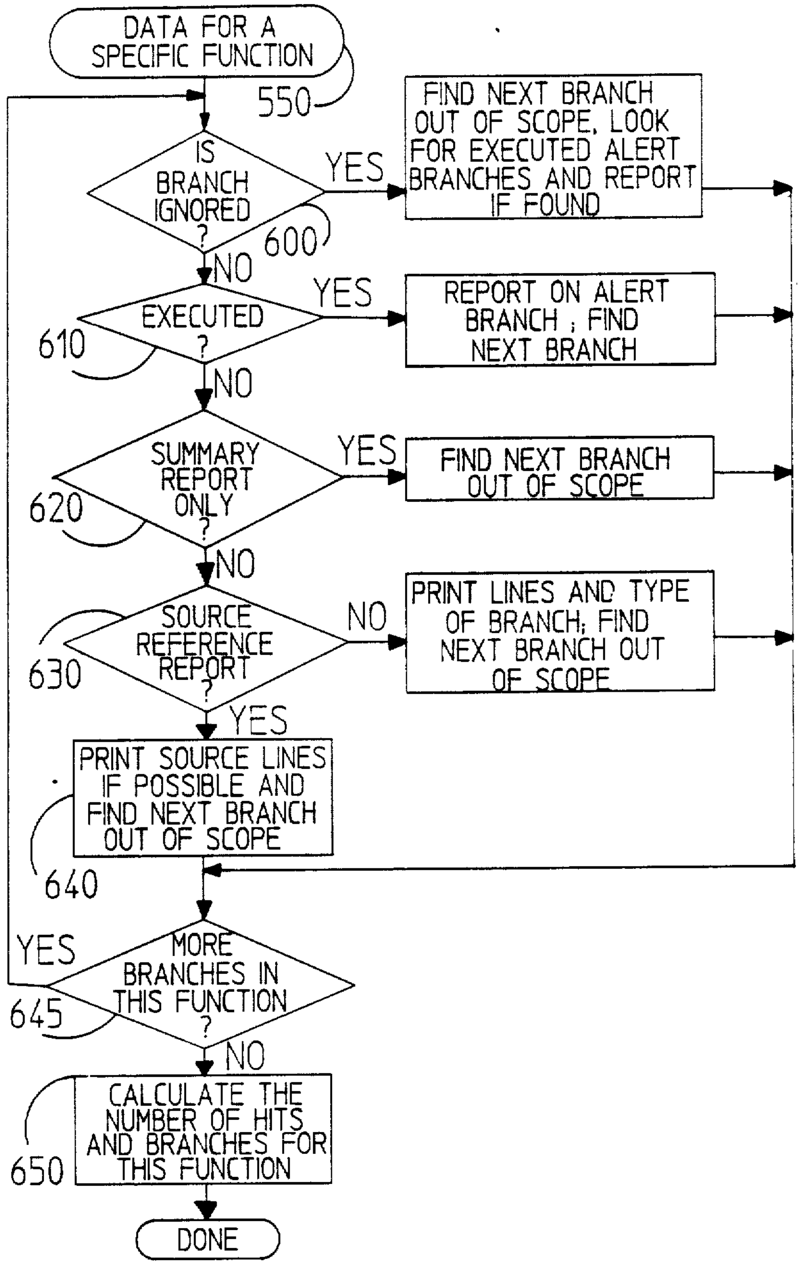
FIG. 8 shows a blow-up of step 560 of FIG. 7.

FIG. 8 shows a blow-up of step 560 of FIG. 7. This step is executed whenever a function is selected for output. It is a loop (steps 600 through 645) which is executed for each branch (":probe" line in the mapfile 250) for a given function. For each branch, the per-file database 420 is queried to see if the branch was 'ignored'. (See Appendix B, pages 3-21 through 3-23, and 5-13 through 5-16 for details on ignoring branches.) If the branch was ignored, there is a forward scan (step 605) for the next branch which is outside of the scope of the ignored branch. (See Appendix B, pages 3-21 through 3-23 and 5-13 through 5-16 for more information about the 'scope' of an ignored branch.) The branches within the ignored scope are not counted in the 'total' nor the 'branches executed' count, but will be reported at the end of the report. Also, there is a check for branches that are marked as 'BBA_ALERT' branches (see Appendix B, pages 3-24 and 3-24 for more information about 'alert' branches); if one is found, the per-file database 420 is queried to see if its _bA_array entry was TRUE. If it was TRUE, the report will include the fact that the alert branch was executed. The form of that report is shown in Appendix B, pages 5-4 through 5-13. If the branch was not 'ignored', then the 'total' number of branches is incremented. There is also a check to see if the non-ignored branch was executed (step 610). If it was executed, there is a check to see if it was an 'alert' branch; if it was an 'alert' branch it will be reported as such as noted above. Then, the number of 'branches executed' is incremented and there is a search for the next branch. If the branch was not executed, there is a check to see what kind of report the user requested. If the user only requested a summary report (see Appendix B, pages 5-4, option '-S'), the process finds the next branch outside of the unexecuted branch's scope (step 625) and continues, because the 'total' and number of 'branches executed' will be reported at the end of all files. If the user did not request a 'source reference' report, then he must have requested a 'line numbers' report (See, Appendix B, page 5-5, '-l' option). The per-file database 420 is queried for the line numbers and source file name associated with the _bA_array entry, and that information is printed out. Then there is a search for the next branch out of scope of the unexecuted branch and another continue. If the user requested a 'source reference' report (Appendix B, pages 5-9 through 5-12), the per-file database 420 is queried for the source file and associated lines. Then the source file is read and the lines associated with the unexecuted branch are printed (step 640). Then there is a search for the next branch out of scope of the unexecuted branch and a continue.

When there is a 'search for the next branch out of scope' (used several times above), the 'total' number of branches executed for each branch within the scope is incremented. Also, the _bA_array entry for each branch is checked to see if it is TRUE. If it is, then a 'goto' is executed and there is a jump into the middle of a scope; when this happens the scan for the next branch out of scope is aborted and step 600 is immediately executed.

After the loop has examined all the branches in a function (step 650), the 'total' and 'number executed' is reported for the function (if requested by the user; see Appendix B, pages 5-1 through 5-12).

The physical coding which implements the design of FIGS. 7 and 8 can be found in the following files in Apendix A: report/dmctl.c (pp. 336-347), report/prarray.c (pp. 421-422), report/report.c (pp. 423-431), report/rfiles.c (pp. 432-437), report/funcs.c (pp. 440-443), report/use.c (pp. 444-451), report/rscan.c (pp. 452-458), report/footnotes.c (pp. 459-461), report/ignctl.c (pp. 462-465), report/prctl.c (pp. 466-480), report/src.c (pp. 487-504), report/explain.c (pp. 505-510).

FIG. 9 shows a sample branch analysis coverage report 180. A complete description of the coverage report capabilities of the present invention is contained in Appendix B, chapter 5.

APPENDIX A

Page 1 Appendix A - Table of Contents

| Filename | Pages |
|---|---|
| ba.h | 1 |
| faddmod.c | 2-3 |
| fileid.c | 4-7 |
| probe.h | 8-10 |
| qstrw.c | 11-17 |
| readline.c | 18-19 |
| report.h | 20-24 |
| smithdate.h | 25-27 |
| targetspec.h | 28-29 |
| cquote.c | 30-31 |
| map.h | 32 |
| dumpfile.h | 33 |
| readspec.c | 34-52 |
| wstruct.c | 53-54 |
| spaces.c | 55-59 |
| smithdate/smithdate.c | 60-82 |
| pp/main.c | 83-106 |
| pp/mapwrite.c | 107-113 |
| pp/abort.c | 114 |
| pp/cppout.h | 115-116 |
| pp/csym.h | 117-118 |
| pp/errors.c | 119-121 |
| pp/getmodtime.c | 122-124 |
| pp/myexit.c | 125-126 |
| pp/nls.h | 127 |
| pp/scan.h | 128-130 |
| pp/strdup.c | 131 |
| pp/strexp.c | 132-133 |
| pp/targetspec.c | 134-141 |
| pp/uniquename.c | 142-144 |
| pp/yystype.h | 145 |
| pp/domail.c | 146-148 |
| pp/gram/cpplines.c | 149-164 |
| pp/gram/cread | 165-172 |
| pp/gram/csource.c | 173-177 |
| pp/gram/cutgram | 178-183 |
| pp/gram/cvtlex | 184-185 |

BEST AVAILABLE COPY

Appendix A - Table of Contents

| | |
|---|---|
| pp/gram/gactions.c | 186-212 |
| pp/gram/gram.y | 213-248 |
| pp/gram/lex.c | 249-273 |
| pp/gram/lexinter.c | 274-275 |
| pp/gram/prcpptext.c | 276-280 |
| pp/gram/probe.c | 281-294 |
| pp/gram/sym.c | 295-305 |
| pp/gram/tempuar.c | 306-308 |
| unload/bbaunload.c | 309-322 |
| unload/bbakey.c | 323-326 |
| unload/prarray.c | 327-328 |
| unload/emulator.h | 329-330 |
| report/darray.c | 331-335 |
| report/dmctl.c | 336-347 |
| report/drinput.c | 348-371 |
| report/drtest.c | 372-377 |
| report/genprobemap | 378-380 |
| report/mapdb.c | 381-383 |
| report/merge.c | 384-389 |
| report/miscread.c | 390-392 |
| report/mrinput | 393-412 |
| report/mrtest.c | 413-420 |
| report/prarray.c | 421-422 |
| report/report.c | 423-431 |
| report/rfiles.c | 432-437 |
| report/strcheck.c | 438-439 |
| report/funcs.c | 440-443 |
| report/use.c | 444-451 |
| report/rscan.c | 452-458 |
| report/footnotes.c | 459-461 |
| report/ignctl.c | 462-465 |
| report/prctl.c | 466-480 |
| report/qstrtok.c | 481-482 |
| report/expand.c | 483-486 |
| report/src.c | 487-504 |
| report/explain.c | 505-510 |
| report/docu.c | 511-519 |
| report/mrfree.c | 520-522 |
| cpp/define.c | 523-532 |
| cpp/define.h | 533 |
| cpp/error.c | 534-535 |
| cpp/file.c | 536-543 |
| cpp/file.h | 544 |
| cpp/if.c | 545-548 |
| cpp/ifih | 549 |
| cpp/ifgram.y | 550-553 |
| cpp/iflex.c | 554-559 |
| cpp/main.c | 560 |
| cpp/readline.c | 561-567 |
| cpp/startup.cf | 568-570 |
| cpp/substitute.c | 571-585 |
| cpp/support.c | 586-590 |
| cpp/support.h | 591-592 |

BEST AVAILABLE COPY

Feb 03 15:45 1988 b.. Page 1

```
/*      FILE       ba.h  ($Header: ba.h,v 1.11 87/05/12 13:08:06 bae Exp $)
 *      AUTHOR     Bruce Erickson
 *
 *         This is a header file used by all ba routines.
 *      it is mostly used to define interface information
 *
 * ONELINER header for all ba routines
 *
 * CHANGE LOG:    (operational on dd-mm-yy)
 *
 * dd-mm-yy     name     what .
 *
 *
 * RCS $Log:   ba.h,v $
 * Revision 1.11  87/05/12  13:08:06  13:08:06  bae
 * Updated for bba from ba
 *
 * Revision 1.10  86/09/12  10:41:47  10:41:47  bae (Bruce Erickson)
 * moved mapsuffix to end of structure, so that
 * old structues can still be read
 *
 * Revision 1.9  86/09/11  11:08:29  11:08:29  bae (Bruce Erickson)
 * upgraded to protocol 5
 *
 * Revision 1.8  86/03/29  17:34:29  17:34:29  bae (Bruce Erickson)
 * Added baforwarding capibility
 *
 * Revision 1.7  86/03/18  13:21:18  13:21:18  bae (Bruce Erickson)
 * changed name of userdump to execdump
 *
 * Revision 1.6  86/03/13  18:44:18  18:44:18  bae (Bruce Erickson)
 * Added bacompress
 *
 * Revision 1.5  85/09/03  11:04:16  bae
 * conversion of dataarray from int to unsigned int
 *
 * Revision 1.4  85/08/28  11:20:26  bae
 * modified protocol; up to 4 now
 *
 * Revision 1.3  85/08/19  08:34:26  bae
 * prior to first QA release
 *
 * Revision 1.2  85/08/05  18:12:07  bae
 * Combined, protocol 1
 *
 * Revision 1.1  85/08/02  12:59:13  bae
 * This version works well to protocol 1
 *
 */
```

BEST AVAILABLE COPY

```
#define MAXPATH 1024     /* maximum directory length */
#define MAXFNAME 100     /* maximum length of file names */

/* LINEINC is a reasonably large allocation for keeping a line around.  It
   is used in several places, so that if fragmentation occurrs, we have
   a reasonable chance of using isolated blocks.  This should not be
   so large that we waste a lot of space, nor so small that we keep
   having to call malloc() over and over... */
#define LINEINC 120
```

Feb 03 15:45 1988  faddmod.c Page 1

```
/*
 * FILE      $Header: faddmod.c,v 1.1 87/06/04 12:00:35 bae Exp $
 *
 * AUTHOR        Bruce Erickson
 *
 * ONELINER Routine to change mode of a file
 *
 *     Specifically, this routine ADDS permission bits
 *     to a file's permissions.  Used to simulate
 *     "chmod u+rw" command.
 *
 * TABSTOPS 3
 *
 * CONDCOMP TEST      - creates a main routine for testing
 *
 * INSPECTED   date      - inspectors
 *
 * RCS       $Log: faddmod.c,v $
 * Revision 1.1  87/06/04  12:00:35  12:00:35  bae
 * Initial revision
 *
 *
 */
static char rcsid[] = "$Header: faddmod.c,v 1.1 87/06/04 12:00:35 bae Exp $";
#include <stdio.h>
#include <sys/types.h>
#include <sys/stat.h>

/* GLOBALS */

/* STATICS */

/* EXTERNALS */

/* FORWARD */


/**************************************************************************/
```

BEST AVAILABLE COPY

```
/* FUNCTION */
void
faddmod(fd, mode)
int fd;       /* file descriptor of file */
int mode;     /* bits to or-in to current st_mode */

/*
 *     Simply or's in 'mode' to current status of file.
 *
 *     If failure, just return.
 */
{
    struct stat statbuf;

    if (fstat(fd, &statbuf) != 0)
        return;        /* error.... */

    /* Or-in requested bits */
    mode |= statbuf.st_mode;

    fchmod(fd, mode);     /* no error check */
}

#ifdef TEST
main(argc, argv)
int argc;
char *argv[];
/*
 *     Usage:
 *         faddmod <mode, in octal> <filename>
 */
{
    FILE *stream;
    int mode;
    char *ptr;
    char c;

    if (argc != 3)
    {
        fprintf(stderr, "Usage: %s <mode, in octal> <filename>\n", argv[0]);
        exit(1);
    }

    stream = fopen(argv[2], "r");
    if (stream == NULL)
    {
        perror("Cannot open file");
        exit(2);
    }

    mode = 0;
    ptr = argv[1];
```

BEST AVAILABLE COPY

```
   while ((c = *ptr++) != '\0')
   {
      mode *= 8;
      if ((c < '0') && (c > '7'))
      {
         fprintf(stderr, "'%s' is not octal!\n", argv[1]);
         exit(3);
      }
      mode += c - '0';
   }

   faddmod(fileno(stream), mode);
}
#endif
```

Feb 03 15:45 1988  fileid.c Page 1

```
/*
 * FILE      $Header: fileid.c,v 1.2 87/06/01 12:14:19 bae Exp $
 *
 * AUTHOR        Bruce Erickson
 *
 * ONELINER Check for :id field in file
 *
 * CONDCOMP TEST      - creates a main() to test this routine
 * TABSTOPS 3
 *
 * RCS       $Log: fileid.c,v $
 * Revision 1.2  87/06/01  12:14:19  12:14:19  bae
 * Allow a TRUE return if file exists but is empty.
 *
 * Revision 1.1  87/05/12  13:03:33  13:03:33  bae (Bruce Erickson)
 * Initial revision
 *
 *
 */
static char rcsid[] = "$Header: fileid.c,v 1.2 87/06/01 12:14:19 bae Exp $";
#include <stdio.h>
#include <boolean.h>

/* GLOBALS */

/* STATICS */

/* EXTERNALS */
extern char *freadline();

/* FORWARD */


/*****************************************************************************/
```

BEST AVAILABLE COPY

```
/* FUNCTION */
boolean
fileid(fname, emptyok, openmode, idstring, rstream, rlinenum)
char *fname;        /* name of file */
boolean emptyok;    /* if TRUE, if the file is empty return TRUE */
char *openmode;     /* Mode to open file with - "r" or "r+" */
char *idstring;     /* id string to look for, minus the ":id " */
FILE **rstream;     /* if non-NULL, return file stream of file to here */
int *rlinenum;      /* if non-NULL, return line we found id on.  First line
                       of file is line 1 */

/*
 *    This routine is called when we want to know if the specified
 *    file has the specified id string.
 *
 *    If the file does not exist or we can't open it with
 *       mode 'openmode', this returns FALSE
 *    If there are no lines that start with a ':', return FALSE
 *    If the first line that starts with a colon is not :id,
 *       this returns FALSE
 *    If the string which follows the ":id " does not exactly
 *       match the id string, this returns FALSE
 *    else, this returns TRUE.
 *
 *    If rstream is non-NULL, and if this returns TRUE, rstream is
 *       set to be the stream we had to open to check the id, positioned
 *       to read the next line after the :id line.
 *    else
 *       the file is closed.
 *
 */
{
   FILE *instream;
   char *line;
   char *ptr;
   int linenum = 0;

   if ((instream = fopen(fname, openmode)) == NULL)
      return(FALSE);

   /* Search forward for the first line with a ':' */
   do
   {
      if ((line = freadline(instream)) == NULL)
      {
         /* Never found a line beginning with a ':' */
         if (emptyok && (linenum == 0))
         {
            if (rstream == NULL)
               fclose(instream);
            else
               *rstream = instream;
```

BEST AVAILABLE COPY

```

                return(TRUE);
            }

            fclose(instream);

            return(FALSE);
        }
        linenum++;      /* just read in this line number */
        /* Read a line in.  If it does not begin with a ':',
            try again... */
    }
    while (*line != ':');

    /* Line starts with a ':'.  Is it the id line? */
    if (strncmp(line, ":id ", 4) != 0)
    {
        /* First non-comment is *not* the id! */
        fclose(instream);
        return(FALSE);
    }

    ptr = line + 4;       /* Point at what should be the ID string */
    if (strcmp(ptr, idstring) != 0)
    {
        /* Wrong ID */
        fclose(instream);
        return(FALSE);
    }

    /* This is the correct file! */
    if (rstream == NULL)
    {
        fclose(instream);     /* user doesn't want the stream returned */
    }
    else
    {
        *rstream = instream;
    }

    if (rlinenum != NULL)
        *rlinenum = linenum;     /* return line number of :id */

    return(TRUE);
}

#ifdef TEST


/**************************************************************************/

/* FUNCTION */
```

BEST AVAILABLE COPY

```
int
main(argc, argv)
int argc;
char *argv[];

/*
 *     This is a main routien to test the 'fileid' routine.
 *
 *     usage:
 *        [-re] file 'id string'
 *
 *     -r asks to print the rest of the file after the :id line
 *     -e says that 'emptyok' should be TRUE
 *
 */
{
   extern int optind;
   char *fname;
   char *idstring;
   boolean doread = FALSE;
   boolean emptyok = FALSE;
   char *line;
   char c;              /* option */
   FILE *stream;
   int linenum;

   while ((c = getopt(argc, argv, "er")) != EOF)
   {
      switch(c)
      {
      case 'e' :  emptyok = TRUE;
                  break;
      case 'r' :  doread = TRUE;
                  break;
      }
   }

   if ((optind + 1) >= argc)
   {
      fprintf(stderr, "usage: %s [-r] file 'id string'\n", argv[0]);
      exit(20);
   }
   fname = argv[optind];
   idstring = argv[optind + 1];

   if (fileid(fname, emptyok, "r", idstring, doread ? &stream : NULL, &linenum))
   {
      printf("%s is type '%s' (line %d)\n", fname, idstring, linenum);

      if (doread)
      {
         while ((line = freadline(stream)) != NULL)
```

BEST AVAILABLE COPY

```
                  printf("%s\n", line);
            }
      }
      else
      {
         printf("%s is not type '%s'\n", fname, idstring);
      }
      exit(0);
   }
   #endif TEST
Feb 03 15:45 1988  probe.h Page 1

   /*
    * FILE       $Header: probe.h,v 1.10 88/01/02 10:05:24 hmgr Exp $
    *
    * AUTHOR          Bruce Erickson
    *
    * ONELINER header to describe probe point information
    *
    * TABSTOPS 3
    *
    * INSPECTED    date       - inspectors
    *
    * RCS        $Log: probe.h,v $
    * Revision 1.10  88/01/02  10:05:24  10:05:24  hmgr ()
    * Author: bae@hplsdlc.hp.com
    * added PF_INNERCASE flag
    *
    * Revision 1.9  87/09/18  09:54:31  09:54:31  hmgr ()
    * Author: bae@hplsdlc.hp.com
    * Upgrade to set PF_FIRST for first case in a switch statement
    *
    * Revision 1.8  87/08/27  15:25:11  15:25:11  hmgr ()
    * Author: bae@hplsdlc.hp.com
    * added PT_LABEL
    *
    * Revision 1.7  87/07/28  15:35:32  15:35:32  hmgr ()
    * Author: bae@hplsdlc.hp.com
    * changed PF_NOCODE to PF_NOBREAK
    *
    * Revision 1.6  87/07/25  18:30:36  18:30:36  hmgr ()
    * Author: bae@hplsdlc.hp.com
    * added PF_NOCODE
    *
    * Revision 1.5  87/06/17  17:09:47  17:09:47  bae (Bruce Erickson)
    * added warning about increasing PROBETYPE beyond 32 bits
    *
    * Revision 1.4  87/06/04  15:55:33  15:55:33  bae (Bruce Erickson)
    * Corrected comment for EMPTYDEFAULT
    *
    * Revision 1.3  87/06/01  16:31:55  16:31:55  bae (Bruce Erickson)
```

BEST AVAILABLE COPY

```
 * added PT_EMPTYDEFAULT
 *
 * Revision 1.2  87/06/01  12:14:25  12:14:25  bae (Bruce Erickson)
 * added document that 'EMPTYCASE' was no statement or only a break.
 *
 * Revision 1.1  87/04/16  13:54:40  13:54:40  bae (Bruce Erickson)
 * Initial revision
 *
 *
 */
/* 'PROBETYPE' is something that can hold the PT_* symbols */
/* Note that if PROBETYPE gets larger than 32 bits (4 characters),
   You will need to increment protocol numbers and modify the
   structure that targetspec.h defines!!!
*/
typedef u_int32 PROBETYPE;

/* The following define the types of probe points we can handle.
   NB: These values are stored in map files, so while you may
   add values, YOU MAY NOT CHANGE WHAT ALREADY EXISTS!
   If you add something, go to pp/main.c and add it to the appropriate
   place in the options switch statement
*/
#define PT_FUNCTION  ((PROBETYPE) 0x0001) /* start of a function */
#define PT_IF        ((PROBETYPE) 0x0002) /* statement of an if */
#define PT_ELSE      ((PROBETYPE) 0x0004) /* else statement */
#define PT_IELSE     ((PROBETYPE) 0x0008) /* inserted else for an elseless if */
#define PT_EMPTYCASE ((PROBETYPE) 0x0010) /* case with no statement (or only break) after it */
#define PT_WHILE     ((PROBETYPE) 0x0020) /* statement w/in while loop */
#define PT_3FOR      ((PROBETYPE) 0x0040) /* Third expression in for definition */
#define PT_FOR       ((PROBETYPE) 0x0080) /* statement w/in for loop */
#define PT_DEFAULT   ((PROBETYPE) 0x0100) /* user supplied default */
#define PT_IDEFAULT  ((PROBETYPE) 0x0200) /* inserted default statement */
#define PT_CASE      ((PROBETYPE) 0x0400) /* case statement with statements */
#define PT_CATRUE    ((PROBETYPE) 0x0800) /* true part of conditional assignment */
#define PT_CAFALSE   ((PROBETYPE) 0x1000) /* false part of conditional assignment */
#define PT_DOTRUE    ((PROBETYPE) 0x2000) /* conditional of do is TRUE */
#define PT_DOFALSE   ((PROBETYPE) 0x4000) /* conditional of do is FALSE */
#define PT_WHILENOT  ((PROBETYPE) 0x8000) /* while loop not executed */
#define PT_EMPTYDEFAULT ((PROBETYPE) 0x10000)   /* default with no statement (or only break) */
#define PT_LABEL     ((PROBETYPE)0x20000) /* inserted after a label */

/* The following definitions combine types for ease of use */

/* PT_NONFUNCTION is anything that is not a function */
#define PT_NONFUNCTION (~PT_FUNCTION)

/* Macros to use.... */

/* ISPTYPE(var,sym)  returns TRUE if variable 'var' is of type 'sym', where
   sym is a PT_* symbol and 'var' is of type 'PROBETYPE' */

```

BEST AVAILABLE COPY

```
#define ISPTYPE(var, sym) ((var & (sym)) != (PROBETYPE) 0)

/* PTTOINT(ptype, intval) sets intval to be the bit position which represents
   the PT_*.  For example, PTTOINT(PT_ELSE, r) sets r to 2. */

#define PTTOINT(ptype, intval)   ( register PROBETYPE bit; register int count; \
                                   for (count = 0, bit = ptype >> 1; bit != (PROBETYPE) 0;bit = bit >> 1,count++) ; \
                                   intval = count; \
                                 )

/* PTINTTOPT(intval, ptype) sets ptype to have a '1' in the bit position specified
   by intval.  For example:

       PTTOINT(PT_CASE, intval);
       PTINTTOPT(intval, val2);
       val2 == PT_CASE
*/

#define PTINTTOPT(intval, ptype) ( register PROBETYPE bit; register int count; \
                                   for (count = intval, bit = 1; count > 0; bit = bit << 1, count--) ; \
                                   ptype = bit; \
                                 )

/*************************************************************************/
/*     Flag information                                                  */
/*************************************************************************/
typedef u_int16 PFLAGTYPE;

#define PF_IGNORE     0x0001       /* if we are to ignore this probe */
#define PF_ALERT      0x0002       /* if we are to alert the user when probe is hit */
#define PF_HIDDEN     0x0004       /* This branch was physically added by the
                                      bbacpp, but should never be reported.  All
                                      reporting routines should completely
                                      hide it (i.e., it doesn't even show
                                      up in list of ignored branches)
                                      Used with PT_LABEL, primarily... */
#define PF_NOBREAK    0x0008       /* no break between this case
                                      statement and the next
                                   */
#define PF_FIRST      0x0010       /* Different depending on probetype:
                                      PT_CASE, PT_EMPTYCASE, PT_DEFAULT:
                                         this is the first case/default in
                                         the switch statement
                                   */
#define PF_INNERCASE 0x0020        /* A case statement which is not at the scope
                                      it should be (i.e., not at swinfo->casescope)
                                      This case will not have a range....
                                   */

/* ISPFLAG(var,sym)  returns TRUE if variable 'var' has flag 'sym' set, where
   sym is a PF_* symbol and 'var' is of type 'PFLAGTYPE' */

#define ISPFLAG(var, sym) ((var & (sym)) != (PFLAGTYPE) 0)
```

BEST AVAILABLE COPY

Feb 03 15:45 1988 qstrw.c Page 1

```
/*
 * FILE      $Header: qstrw.c,v 1.6 87/08/31 10:57:28 hmgr Exp $
 *
 * AUTHOR       Bruce Erickson
 *
 * ONELINER Safe String read/write
 *
 * TABSTOPS 3
 *
 *    These routines implement a string reading/writing
 *    routine.  It quotes the string with a unique character (QC), and
 *    if QC occurrs anywhere in the string to be quoted it is inserted twice.
 *
 * CONDCOMP TEST      - if defined, create a main() for testing
 *
 * RCS       $Log: qstrw.c,v $
 * Revision 1.6  87/08/31  10:57:28  10:57:28  hmgr ()
 * Author: bae@hplsdlc.hp.com
 * fixed subtle malloc bug
 *
 * Revision 1.5  87/07/17  10:19:19  10:19:19  hmgr ()
 * Author: bae@hplsdlc.hp.com
 * no comment
 *
 * Revision 1.4  87/05/15  15:47:27  15:47:27  bae (Bruce Erickson)
 * Changed names of things to 'qstr' to make it
 * more explicit that these are quoted-string read/write
 * routines
 *
 * Revision 1.3  87/05/15  15:44:18  15:44:18  bae (Bruce Erickson)
 * changed qstringread so that it can have multiple-line reads
 *
 * Revision 1.2  87/05/15  13:49:50  13:49:50  bae (Bruce Erickson)
 * added qstringread() function
 *
 * Revision 1.1  87/03/26  14:17:50  14:17:50  bae (Bruce Erickson)
 * Initial revision
 *
 *
 */
static char rcsid[] = "$Header: qstrw.c,v 1.6 87/08/31 10:57:28 hmgr Exp $";
#include <stdio.h>
#include <boolean.h>

#define QC '@'

/* Number of bytes to allocate string in */
#define LINEINC 120

```

BEST AVAILABLE COPY

```
/* GLOBALS */

/* STATICS */
static char doubleqc[3] = { QC, QC, '\0'};

/* EXTERNALS */
extern char *malloc(), *realloc();

/* FORWARD */


/************************************************************************/

/* FUNCTION */
qstringwrite(fp, string)
FILE *fp;              /* file pointer to write to */
register char *string;  /* string to write out */

/*
 *    This writes the specified string out to fp.
 *    It preceeds the string with QC, adds it if QC occurrs
 *    anywhere in string so that it occurrs twice, then
 *    follows the string with QC.
 *
 */
{
   register char *nextout;
   register char *ptr;
   register char c;

   fputc(QC,fp);
   nextout = string;

   for (ptr = string; (c = *ptr) != '\0'; ptr++)
   {
      if (c == QC)
      {
         /* ptr is pointing at a QC instance in the string.
            Print from 'nextout' thru ptr, two QCs and continue
         */
         *ptr = '\0';
         fputs(nextout, fp);
         fputs(doubleqc, fp);
         *ptr = QC;
         nextout = ptr + 1;      /* start output just after the instance */
      }
   }
   fputs(nextout, fp);
   fputc(QC, fp);
}
```

BEST AVAILABLE COPY

```
/****************************************************************************/

/* FUNCTION */
char *
qstringread(inptr, tryagain, rnextptr)
char *inptr;          /* place in string to start/continue reading */
boolean *tryagain;    /* See below */
char **rnextptr;      /* when finished, set this to the first character
                         after the trailing QC */

/*
 *    This routine can be used in two ways:
 *    1) read a QC-style string that must be in this string (or error)
 *       This mode is invoked when tryagain is NULL
 *    2) read a QC-style string that may or may not be in this string.
 *       This is invoked when tryagain is non-NULL.
 *
 *    Action:
 *       mode 1:
 *           if we find do not find a leading QC, return error (see below).
 *           if we find a leading QC, but not a trailing QC, return error.
 *           else, compress multiple QC's to one, replace the trailing
 *           QC with a \0, and return a pointer to the first character
 *           after the leading QC.
 *
 *       mode 2:
 *           if tryagain is FALSE, start looking for leading QC.
 *           (if tryagain is TRUE, tryagain looking for whatever we
 *           were looking for in our previous invocation).
 *           We will look for a leading QC, text, and trailing QC.
 *           If we hit \0 before finding what we are looking for,
 *           we will set *tryagain to TRUE and return.
 *           The string is compiled in a malloc'd area, which you must free
 *
 * RETURNS  mode 1: return value is NULL on error; rnextptr is undefined
 *                  else, points to \0 terminated string, and rnextptr
 *                  points to first character after trailing QC.  Note that
 *                  physically this is the same string that was passed.
 *
 *             mode 2: error: return value is NULL and tryagain is set to FALSE
 *                        rnextptr is undefined.
 *                  pass another line: tryagain is set to TRUE
 *                        returnvalue and rnextptr are undefined
 *                  finished: return value is non-NULL and tryagain is set
 *                        to FALSE.  In this case, the return value is set to a
 *                        malloc'd string which you, the caller, must free, and
 *                        rnextptr points to the first character after the
 *                        trailing QC.
 *
 * WARNING: do *not* mix calls to qstringread()!  That is, if you are using
 *          mode 2, you must continue the same mode 2 invocation until
 *          this returns an error or until this finishes...
```

BEST AVAILABLE COPY

```
 *
 */
{
#define  MODE1()  (tryagain == NULL)
#define  MODE2()  (tryagain != NULL)
#define  LEADSEARCH  1      /* looking for leading QC */
#define  TRAILSEARCH 2      /* looking for trailing QC */

    static char *mstring;   /* if mode 2, this is the malloc'd string */
    static unsigned int allocbytes;  /* number of bytes allocated to mstring */
    static char *dest;      /* put characters here */
    static int numbytes;    /* number of bytes in mstring */
    static int search;      /* either LEADSEARCH or TRAILSEARCH */
    char *start;            /* starting character of string in mode 1 */
    register char *src;     /* source pointer */
    register char c;

    /* Initialization, if mode 1 or mode 2 and tryagain is FALSE. */
    if (MODE1() || (*tryagain == FALSE))
    {
        src = inptr;      /* Start search for QC here */
        search = LEADSEARCH;
        if (MODE2())
        {
            /* Put data in malloc'd area.  Note that we always have
               one more byte in the allocated string than allocbyates
               claims, so that we can insert the \0 without having
               to check.... */
            mstring = dest = malloc((allocbytes = LINEINC) + 1);
            numbytes = 0;
        }
    }
    else
    {
        /* Continueing in mode 2.... set up src to be start of this string */
        src = inptr;
    }

    /* search for leading quoted character */
    if(search == LEADSEARCH)
    {
        /* Scanning forward for leading QC.  Do not copy
           data, yet... */

        while ((c = *src++) != QC)
        {
            if (c == '\0')
            {
                if (MODE2())
                    *tryagain = TRUE;     /* Give me another string! */
                return(NULL);             /* Not found ... */
            }
```

```
        }
    }

    search = TRAILSEARCH;
    /* At this point, 'dest' points to the next character
       to copy a character to, src points to the next
       character which (may be) in the quoted string...
    */

    if (MODE1())
    {
       /* Set up the destination ponter, now that we know where it is */
       start = dest = src;
    }

    do
    {
       /* Fetch & examine the next character in this string */
       if ((c = *src++) == '\0')
       {
          /* End of string, but not end of QC.... */
          if (MODE2())
          {
             *tryagain = TRUE;
          }
          return(NULL);
       }

       if (c == QC)
       {
          /* If the next character is not another QC,
             we have finished with this string */
          if (*src++ != QC)
          {
             /* Yes,.this is the end of the string... */
             *rnextptr = src - 1;     /* start from here */
             *dest = '\0';
             if (MODE1())
                return(start);
             *tryagain = FALSE;
             return(mstring);
          }

          /* This is a quoted QC.  Insert a single QC into the output
             string.... */
       }

       if (MODE2())
       {
          /* Will this overflow the string? */
          if (++numbytes >= allocbytes)
          {
```

BEST AVAILABLE COPY

BEST AVAILABLE COPY

```
                mstring = realloc(mstring, (allocbytes += LINEINC) + 1);
                dest = mstring + numbytes - 1;
            }
        }
        *dest++ = c;        /* Store the character */

        /* Try the next character... */
    }
    while(TRUE);

    /* NOTREACHED */
}

#ifdef TEST

extern char *gets();

/*************************************************************************/

/* FUNCTION */
main(argc, argv)
int argc;
char *argv[];

/*
 *    Included for interactive testing...
 *
 *    usage:
 *       strw -r|w [-c]
 *    -r: test qstringread
 *    -w: test qstringwrite
 *    -c: only makes sense wiht -r - allows continuing reads...
 *
 */
{
    char instring[400];
    char *next;
    char *recv;
    boolean docont = FALSE;
    boolean doread = FALSE;
    boolean dowrite = FALSE;
    boolean tryagain;
    extern int optind;
    int c;

    while ((c = getopt(argc, argv, "crw")) != EOF)
    {
        switch(c)
        {
        case 'c' :  docont = TRUE; break;
        case 'r' :  doread = TRUE; break;
        case 'w' :  dowrite = TRUE; break;
```

BEST AVAILABLE COPY

```
        }
    }

    if (!doread && !dowrite)
    {
        fprintf(stderr, "Usage: %s -r|-w [-c]\n", argv[0]);
        exit(1);
    }

    if (dowrite)
    {
        printf("QC = '%c'\n\nString: ", QC);
        fflush(stdout);
        while (gets(instring) != NULL)
        {
            fprintf(stderr, "Input = '%s', output = '",
                    instring);
            qstringwrite(stderr, instring);
            fprintf(stderr, "'\n");

            printf("String: ");
            fflush(stdout);
        }
        exit(0);
    }

    /* test qstringread */
    printf("QC = '%c'\n\nInstring: ", QC);
    fflush(stdout);
    tryagain = FALSE;
    while (gets(instring) != NULL)
    {
        fprintf(stderr, "Input = '%s', ", instring);
        recv = qstringread(instring, (docont) ? &tryagain : (boolean *) NULL, &next);
        if (recv == NULL)
        {
            if (docont)
                fprintf(stderr, " returned NULL; continue = %s\n", tryagain ? "TRUE" : "FALSE");
            else
                fprintf(stderr, " returned NULL\n");
        }
        else
        {
            fprintf(stderr, " returned '%s', next = '%s'\n",
                    recv, next);

            if (docont && !tryagain)
                free(recv);

        }
        printf("Instring: ");
```

BEST AVAILABLE COPY

```
        fflush(stdout);
    }
    exit(0);
}
#endif
```

Feb 03 15:45 1988 readline.c Page 1

```
/*
 * FILE      $Header: readline.c,v 1.3 87/08/31 10:57:14 hmgr Exp $
 *
 * AUTHOR       Bruce Erickson
 *
 * ONELINER Read a unknown-length line
 *
 * TABSTOPS 3
 *
 * RCS       $Log: readline.c,v $
 * Revision 1.3  87/08/31  10:57:14  10:57:14  hmgr ()
 * Author: bae@hplsdlc.hp.com
 * fixed setting of numbytes
 *
 * Revision 1.2  87/07/17  10:19:31  10:19:31  hmgr ()
 * Author: bae@hplsdlc.hp.com
 * no comment
 *
 * Revision 1.1  87/05/12  13:03:35  13:03:35  bae (Bruce Erickson)
 * Initial revision
 *
 *
 */
static char rcsid[] = "$Header: readline.c,v 1.3 87/08/31 10:57:14 hmgr Exp $";
#include <stdio.h>
#include <boolean.h>
#include "ba.h"

/* GLOBALS */

/* STATICS */
static char *line;
static int numbytes = 0;      /* number of bytes in line */

/* EXTERNALS */
extern char *malloc();
extern char *realloc();

/* FORWARD */


/**********************************************************************/

```

BEST AVAILABLE COPY

```
/* FUNCTION */
char *
freadline(stream)
FILE *stream;       /* stream to read from */

/*
 *    This routine will read a line from stream regardless
 *    of length.  The string returned must be regarded as a
 *    static, although it is implemented as a malloc'd.
 *
 *    Versions of this routine have been modified and replicated
 *    all over these routines - but they all do something slightly
 *    different...
 *
 *    RETURN NULL if EOF or read error; else ptr to start of line
 *           Note that if we return non-NULL, the line does *not*
 *           end in a \n!
 */
{
    char *readptr;      /* start reading here */
    int readbytes;      /* number of bytes to try to read */
    int gotbytes;       /* number of bytes we read in */

    if (numbytes == 0)
    {
        line = readptr = malloc(LINEINC);
        readbytes = numbytes = LINEINC;
    }
    else
    {
        readptr = line;
        readbytes = numbytes;
    }

    /* Read from file until we find a \n */
    do
    {
        if (fgets(readptr, readbytes, stream) == NULL)
        {
            if (readptr == line)
            {
                /* First attempt to read a line - must be EOF */
                return(NULL);
            }
            return(line);
        }

        /* Are we finished? (i.e., do we have the new-line?) */
        gotbytes = strlen(readptr);       /* Note that this is not from
                                             the start of the string! */
        if (readptr[gotbytes - 1] == '\n')
        {
```

BEST AVAILABLE COPY

```
            /* Finished! - delete the new-line and return */
            readptr[gotbytes - 1] = '\0';
            return(line);
         }

         /* Line to read in is larger than our string.  Expand it and
            try again */

         numbytes += (readbytes = LINEINC);
         line = realloc(line, numbytes);
         readptr = line + strlen(line);
      }
      while(TRUE);

      /* NOTREACHED */
   }
```

Feb 03 15:45 1988  report.h Page 1

```
/*
 * FILE      $Header: report.h,v 1.13 87/12/17 14:39:05 hmgr Exp $
 *
 * AUTHOR       Bruce Erickson
 *
 * ONELINER structures used by the report routines
 *
 * TABSTOPS 3
 *
 * INSPECTED   date      - inspectors
 *
 * RCS       $Log: report.h,v $
 * Revision 1.13  87/12/17  14:39:05  14:39:05  hmgr ()
 * Author: bae@hplsdlc.hp.com
 * no comment
 *
 * Revision 1.12  87/11/06  08:49:12  08:49:12  hmgr ()
 * Author: bae@hplsdlc.hp.com
 * added the OLDTIMES structure, so that the report generator
 * can know if a given time's data was used or not.
 * added cppver so we can tell what version of bbacpp was used
 * to compile a file with.
 *
 * Revision 1.11  87/10/27  12:21:42  12:21:42  hmgr ()
 * Author: bae@hplsdlc.hp.com
 * changed 'procedure' to 'function' at mkting's request
 *
 * Revision 1.10  87/10/08  16:55:59  16:55:59  hmgr ()
 * Author: bae@hplsdlc.hp.com
 * corrected some comments
 *
 * Revision 1.9  87/10/06  12:06:39  12:06:39  hmgr ()
 * Author: bae@hplsdlc.hp.com
```

BEST AVAILABLE COPY

```
 * added cannotread...
 *
 * Revision 1.8  87/08/14  11:08:49  11:08:49  hmgr ()
 * Author: bae@hplsdlc.hp.com
 * change format so that ignores are noted
 *
 * Revision 1.7  87/07/30  09:27:49  09:27:49  hmgr ()
 * Author: bae@hplsdlc.hp.com
 * no comment
 *
 * Revision 1.6  87/07/02  09:12:59  09:12:59  bae (Bruce Erickson)
 * *** empty log message ***
 *
 * Revision 1.5  87/06/17  17:11:17  17:11:17  bae (Bruce Erickson)
 * Changed RP_FILE structure to maintain multiple DR_ANAL's per
 * source file..
 *
 * Revision 1.4  87/06/15  10:06:56  10:06:56  bae (Bruce Erickson)
 * incremental checkin
 *
 * Revision 1.3  87/06/04  15:57:28  15:57:28  bae (Bruce Erickson)
 * Added stuff for reading the dumpfile
 *
 * Revision 1.2  87/06/01  12:14:29  12:14:29  bae (Bruce Erickson)
 * changed mastersnum to int32's
 *
 * Revision 1.1  87/05/21  14:31:22  14:31:22  bae (Bruce Erickson)
 * Initial revision
 *
 *
 */

/* The report generatore routines keep around a list of
   functions as well as files.  There are two access methods
   to getting to the functions:
   - via a hash table (hash on function name)
   - via file (there is a linked list of them)

   The MR_FUNC structure defines the function
*/
typedef struct mr_func
{
   char *funcname;          /* function's name */
   int firstprobe;          /* first probe number */
   int32 dsnum;             /* master source number that has data on this */
   int numignores;          /* number of ignores in this function */
   int numprobes;           /* number of probes in this function (not
                               including ignores or hiddens) */
   int numhit;              /* number of probes hit (not including ignored
                               or hidden probes that were hit) */
   int numalerts;           /* number of alert probes that were hit */
   struct mr_func *next;    /* next function in file */
```

BEST AVAILABLE COPY

```
} MR_FUNC;

/* The following structure is used in MR_SOURCE when the probetype
   is PT_FUNCTION.  It contains information about the function
   declaration (but not the scope of the function)
*/

typedef struct
{
   int mastersnum;        /* (master) sourcenum that fname was defined in */
   int sline, scol;       /* starting line/column of function declaration */
   int eline, ecol;       /* ending line/column of function declaration */
   char *fname;           /* function name, \0 terminated (malloc'd string) */
} MR_FNAME;


/* The following structure is used in MR_SOURCE for most PROBETYPES.
   The exact meanings of the information are dependant on the
   probetype, but in general they contain information about the
   statement that controls this probe
*/
typedef struct
{
   int mastersnum;        /* (master) sourcenum that sline/scol was defined in */
   int sline, scol;       /* starting line/column of control string */
   int eline, ecol;       /* ending line/column of control string */
   char *ctlstring;       /* the control code, \0 terminated (malloc'd string) */
} MR_CTL;


/* This structure is used in MR_PROBE.  Each probe point has one
   of these, but the data may not be valid (if we did not take
   the time to fill it in)
*/
typedef struct
{
   int32 mastersnum;      /* (master) source number this probe is in
                             (i.e., that sline/scol is in) */

   int escope;            /* execution scope ofthis probe */
   int sline, scol;       /* starting line/column */
   int eline, ecol;       /* endline line/column */
   MR_FNAME fname;        /* only if type is PT_FUNCTION */
   MR_CTL ctl;            /* different meanings based on type */
   char *ctlmac;          /* if not NULL, this points to a string
                             which is the expanded result of a macro.
                             The user's original string is in ctlstring.
                          */
} MR_SOURCE;


/* Each probe has one of these unless the .M file does not exist */
typedef struct
```

BEST AVAILABLE COPY

```
{
   PROBETYPE probetype; /* type of probe this is */
   PFLAGTYPE pflags;    /* any flags */
   boolean sourcevalid; /* if TRUE, source information is filled in */
   MR_SOURCE source;    /* the source information for this probe point */
} MR_PROBE;


/* Each analyzed file has one of these.  The MR_PROBES information may be
   NULL if the .M file does not exist, or if we did not need to
   read the .M file yet
*/
typedef struct
{
   int protocol;          /* protocol of this map file */
   int masterfile;        /* (master) source number that is this file */
   int maxprobe;          /* highest probe number in this file */
   PROBETYPE options;     /* options this file was processed with */
   MR_PROBE **probes;     /* pointer to array of pointers to probes for this file */
   MR_FUNC *funcs;        /* if not NULL, point to (head of) linked list
                             of functions in this file */

   char *cppver;          /* if not NULL, this is the cpp version of this file/dump */
} MR_FILE;

/* The following structure is created on a per-dump basis.  It contains
   information about each dump (such as the time of the dump, etc).
   Each file's dump record contains an pointer to an array of pointers
   to these structures */

typedef struct
{
   int protocol;          /* dump's protocol */
   boolean timevalid;     /* if FALSE, dumptime is invalid; else is OK */
   SMITHTIME dumptime;    /* date/time the dump occurred */
} DR_DUMP;

/* The following is used to create a linked-list of arrays of DR_DUMPs.  Basically,
   DR_DARRAYs are allocated in blocks (arrays).  The first entry is a
   pointer to the next array (unless NULL, in which case there is no
   'next array').  The following entries are pointers to DR_DUMP
   structures.
   This combines the expandibility of linked lists with the space-
   and access-efficiency of arrays.
*/
typedef union dr_drarray
{
   DR_DUMP *data;               /* real data.  All but first entry in array is this */
   union dr_drarray *next;      /* forward pointer to next DR_DARRAY block.  */
} DR_DARRAY;

/* This structure holds "old modification dates" (dates that are for the same
   file, but are older than sourcemodtime).  The data associated with the
```

BEST AVAILABLE COPY

```
   dates not are used when (a) -o was not specified, or (b) number of entries
   was not the same
*/
typedef struct
{
   SMITHTIME modtime;       /* the old mod time */
   boolean dataused;        /* if TRUE, the data from this time was merged
                               in with newer data (-o only, and # branches same) */
} OLDTIMES;

typedef struct
{
   PROBETYPE options;    /* bit map of possible probes */
   int protocol;         /* (insert) protocol of this data */
   boolean modvalid;     /* if TRUE, sourcemodtime has valid info in it */
   SMITHTIME sourcemodtime;   /* (most recent) .c-file mod time when info inserted */
   int numentries;       /* number of entries in array.  May not be
                            the same as MR_FILE->maxprobel (file out of date) */
   boolean *array;       /* array of (accumulated) data */
   int numdumps;         /* number of valid entries in dumpinfo */
   DR_DARRAY *dumpinfo;  /* array of pointers to dumpinformation, and (possible) fwd link */


   boolean suffixvalid;  /* if TRUE, the mapsuffix is known to be good.  If
                            FALSE, we don't really know, but mapsuffix
                            will be set to a 'M' */
   char mapsuffix;       /* mapsuffix */
   boolean mapexists;    /* if TRUE, mapfile exists for this file (which
                            implies that mapinfo is valid) */
   char *mappath;        /* path for mapfile relating to this file.  If this
                            is NULL, and mapexists is TRUE, this data is the
                            result of a 'merge' (i.e., there is no direct
                            correlation between mapinfo and any one mapfile)
                         */
   MR_FILE *mapinfo;     /* map with same <options> and mapsuffix */


   int numoldmodtimes;          /* number of entrise in oldmodtimes array */
   OLDTIMES *oldmodtimes;       /* array of older times we have found reading
                                   the dumpfile (times of .c files only; not
                                   of included files) */
   int numoldnumentries;        /* number of entries in oldnumentries array */
   int *oldnumentries;          /* array of old 'numentries' that we found in
                                   the dumpfile and tossed out */
} DR_ANAL;

/* The following structure is used not only by the report
   generator proper, but also by the mapreader.  It contains
   information about all source files encountered (.h as well
   as .c).  The routines in the 'rfiles.c' program administer
   a system which maps 'mastersourcenums' to one of these
```

BEST AVAILABLE COPY

```
   structures.
*/

typedef struct
{
   char *path;              /* path of this file */
   boolean modvalid;           /* if TRUE, filemodtime is valid */
   SMITHTIME filemodtime;   /* file's modification time */
   boolean cannotread;  /* default is FALSE.  If TRUE, we have attempted to
                           open this file & failed (for some reason) - it implies
                           that some warning has already been printed for this
                           file
                        */
   boolean isanalyzed;  /* if TRUE, this path represents a .c file which was
                           analyzed with bba, and the rest of the information
                           is valid.
                           If FALSE, this is an anicillary file
                           (.h file), and the rest of the information is
                           invalid, or there was an error in merging
                           different options, and we decided to not
                           analyze this file as a result....
                        */
   DR_ANAL *analinfo;   /* if not NULL, this points to a merged DR_ANAL
                           structure.  If numanal is 1, this will be
                           a pointer to *anal; else this is a seperate
                           one which is the result of merging all of
                           the DR_ANAL structures in anal
                        */
   int numanal;         /* number of entries in analinfo that are valid */
   DR_ANAL **anal;      /* array of pointers to DR_ANAL structures.  There
                           may be more than one when we read in :file
                           lines and get different <options>
                           (or numprobes/modtimes if we are compressing)
                        */
} RP_FILE;


/* When we need to print out a date (like report that a file is
   out of date), use this format
*/
#define DATEFORMAT   SMITH_DATEFILL | SMITH_DATEMDY | SMITH_TIMEHRMN |  SMITH_TIME24 | SMITH_TIMEFILL

/* This is the format of the function summary... */
#define RP_FUNCFMT "%4d / %4d (%6.2f) %c%c%-24s %s\n"

#define RP_FUNCHDR "_hit___total____%____IA____function____________file ___________________________\n"

/* RP FUNCFMTFS is the column that file names start in...*/
#define RP_FUNCFMTFS 48
```

BEST AVAILABLE COPY

Feb 03 15:45 1988 smithdate.h Page 1

```
/*
 * FILE      $Header: smithdate.h,v 1.5 87/08/03 16:28:09 hmgr Exp $
 *
 * AUTHOR       Bruce Erickson
 *
 * ONELINER Header file for smithdate routines
 *
 * TABSTOPS 3
 *
 * CONDCOMP UNIX          - host is UNIX machine
 *
 * INSPECTED   date      - inspectors
 *
 * RCS       $Log: smithdate.h,v $
 * Revision 1.5  87/08/03  16:28:09  16:28:09  hmgr ()
 * Author: bae@hplsdlc.hp.com
 * defined some new things
 *
 * Revision 1.4  87/07/17  10:20:44  10:20:44  hmgr ()
 * Author: bae@hplsdlc.hp.com
 * no comment
 *
 * Revision 1.3  87/06/10  16:12:36  16:12:36  bae (Bruce Erickson)
 * added defines for the smithtoascii() stuff
 *
 * Revision 1.2  87/04/22  12:31:05  12:31:05  bae (Bruce Erickson)
 * *** empty log message ***
 *
 * Revision 1.1  87/04/20  16:55:18  16:55:18  bae (Bruce Erickson)
 * Initial revision
 *
 *
 */


/****************** start of style parameter definitions ********************/
/* The following defines are used as the 'style' parameter
   for the smithtoascii() call.  One value from each group
   (as defined below) may be or'd in with one value from any/all
   of the other groups.  Defaults have an asterisk in the
   comment next to them
*/

/*    the time conversion control group: */
#define SMITH_TIMEOFF      0x0001   /* do not include time in conversion */
#define  SMITH_TIMEHR      0x0002   /* only the hour */
#define  SMITH_TIMEHRMN    0x0006   /* only hour and minute */
#define  SMITH_TIMEHRMNSC  0x000E   /* *hour, minute, and second */
#define  SMITH_TIMEALL     0x001E   /* fullest possible precision (include ms) */
```

BEST AVAILABLE COPY

```
#define  SMITH_TIMEFILL     0x0020   /* if set, use leading zeros to fill in units */
#define  SMITH_TIME24       0x0000   /* *time in 24-hour period */
#define  SMITH_TIME12       0x0040   /* time in 12-hour period, no am/pm indication */
#define  SMITH_TIMEAMPM     0x0060   /* time in 12-hour period, append 'am' or 'pm' */

/*    The date conversion control group */
#define  SMITH_DATEOFF      0x0200   /* do not include date in conversion */
#define  SMITH_DATEMDY      0x0000   /* *date is month/day/year */
#define  SMITH_DATEYMD      0x0400   /* date is year/month/day */
#define  SMITH_DATEFILL     0x0800   /* if set, fill month/day to 2 characters, and
                                        year to 4 characters */

/*    The date/time order conversion control group */
#define  SMITH_DATETIME     0x0000   /* *date then time. */
#define  SMITH_TIMEDATE     0x1000   /*  time then date */


/******************* end of style parameter definitions ********************/

#define  SMITH_YEAR      1858     /* base year */
#define  SMITH_MONTH       11     /* base month */
#define  SMITH_DAY         17     /* base day */

/* Maximum year/month/day we can handle, based on a 20 bit SMITH_DAYS */
#define  SMITH_MAX_YEAR 4727
#define  SMITH_MAX_MONTH  12
#define  SMITH_MAX_DAY    31

/* The base units are 100's of micro-seconds, AKA .1 milliseconds */
#define  SMITH_UNITS_PER_SECOND      10000
#define  SMITH_SECONDS_PER_MINUTE       60
#define  SMITH_MINUTES_PER_HOUR         60
#define  SMITH_HOURS_PER_DAY            24
#define  SMITH_UNITS_PER_DAY     (SMITH_UNITS_PER_SECOND * SMITH_SECONDS_PER_MINUTE * \
                                  SMITH_MINUTES_PER_HOUR * SMITH_HOURS_PER_DAY)
#define  SMITH_SECONDS_PER_DAY   (SMITH_SECONDS_PER_MINUTE * SMITH_MINUTES_PER_HOUR * \
                                  SMITH_HOURS_PER_DAY)

#define  SMITH_MAX_DAYS    ((SMITH_DAYS) 1047924)     /* max value for smithtime->days */
#define  SMITH_MAX_UNITS   ((SMITH_UNITS) 863999999)  /* max value for smithtime->units */


/* The following define is for efficiency.  It is the result of a
   smdaystoday(SMITH_YEAR, SMITH_MONTH, SMITH_DAY) call.
*/
#define SMITH_DAYS_VALUE 320


/* The following type must be large enough to hold SMITH_UNITS_PER_DAY,
   which is 0x337F97FF : 30 bits */
typedef  u_int32 SMITH_UNITS;
```

BEST AVAILABLE COPY

```
   [illegible]
      maximum year of 4728 AD.  That should be plenty!!!! */
   typedef  u_int32 SMITH_DAYS;


   typedef struct
   {
      SMITH_DAYS days;      /* days since 11/17/1858 */
      SMITH_UNITS units;    /* units since 00:00:00 GMT */
   } SMITHTIME;

   /* 'smithillegal' is a date/time which is not possible.
      It is used to flag 'unknown date/time'
   */
   extern SMITHTIME smithillegal;

   extern boolean smithfromunix();
   extern boolean smithfromdate();
   extern boolean smithtodate();
   extern SMITH_DAYS smdays();
   extern char *smithtostore();
   extern boolean smithfromstore();
   extern smithcmp();
   extern char *smithtoascii();
```

Feb 03 15:45 1988  targetspec.h Page 1

```
   /*
    * FILE      $Header: targetspec.h,v 1.10 87/08/21 16:16:42 hmgr Exp $
    *
    * AUTHOR       Bruce Erickson
    *
    * ONELINER extern definitions of target specific information
    *
    * TABSTOPS 3
    *
    * EXCEPTIONS  description
    *
    * INSPECTED   date     - inspectors
    *
    * RCS       $Log: targetspec.h,v $
    * Revision 1.10  87/08/21  16:16:42  16:16:42  hmgr ()
    * Author: bae@hplsdlc.hp.com
    * removed lengths; added some variables, too
    *
    * Revision 1.9  87/08/17  18:21:44  18:21:44  hmgr ()
    * Author: bae@hplsdlc.hp.com
    * Changed so that target specific information is
    * decided at runtime.
    *
    *
    */
```

BEST AVAILABLE COPY

```
/* Maximum protocols we can deal with */
#define MAXINSERTPROTOCOL  6
#define MAXMAPPROTOCOL     6
#define MAXDUMPPROTOCOL    6


/***************************************************************************/
/*     See the PROTOCOL document for full information on the meanings     */
/*                                                                         */
/* global name & default              token                                */
/***************************************************************************/

extern int bbappversion;          /* preprocessor version to run */
extern int bbainsertprotocol;     /* ins_prot <level> */
extern int bbainsprotlength;      /* ins_prot <bytes> */
extern int bbainsprotusedbytes;   /* ins_prot <used-bytes> */
extern char *bbainsprottype;      /* ins_prot <string> */

extern int bbamapprotocol;        /* map_prot <level> */
extern int bbadumpprotocol;       /* dump_prot <level> */
extern boolean bbamapmodtime;     /* map_modtime */

extern char *bbaarraytype;        /* arraytype <string> */
extern int bbaarraybits;          /* arraytype <bits> */

extern char *bbaarrayname;        /* arrayname <string> */

extern char *bbaswitchlbl;        /* switchlbl <string> */

extern char *bbatmpvar;           /* tempvar <string> */

extern int bbainsnumentries;      /* ins_numentries <bytes>; -1 if not present */
extern int bbainsnumusedbytes;    /* ins_numentries <used-bytes> */
extern char *bbainsnumtype;       /* ins_numentries <string> */

extern boolean bbaunderscores;    /* underscores */
extern boolean bbaupsegmented;    /* up_segmented */
extern int bbaupaddrsize;         /* up_addrsize <bits> */
extern boolean bbauphifirst;      /* up_hifirst */
extern boolean bbauplofirst;      /* up_lofirst */

extern int bbainsmodtime;         /* ins_modtime <bytes> ; -1 if not present */
extern int bbainsmodusedbytes;    /* ins_modtime <used-bytes> */

extern int bbainsdataarray;       /* ins_dataarray <bytes>; -1 if not present */
extern int bbainsdatausedbytes;   /* ins_dataarray <used-bytes> */

extern int bbainsoptions;         /* ins_options <bytes>; -1 if not present */
extern int bbainsoptusedbytes;    /* ins_options <used-bytes> */

extern int bbainssourcepath;      /* ins_sourcepath <bytes>; -1 if not present */
```

BEST AVAILABLE COPY

```
extern int bbainssourceusedbytes;/* ins_sourcepath <used-bytes> */

extern boolean bbainsmapsuffix;  /* ins_mapsuffix */
extern int bbainsmapsufusedbytes;/* ins_mapsuffix <used-bytes> */

extern char *bbagencc;           /* gen_cc <string1> */
extern char *bbagenccargs;       /* gen_cc <string2> */

extern char *bbagenar;           /* gen_ar <string1> */
extern char *bbagenarargs;       /* gen_ar <string2> */

extern char *bbagennm;           /* gen_nm <string1> */
extern char *bbagennmargs;       /* gen_nm <string2> */

extern boolean bbagenhost;       /* gen_host */
extern boolean bbagendumptime;   /* gen_dumptime */

/* The following variables are only used by the preprocessor..... */
/* They are terminated by a NULL entry */
extern char *bbaincldirs[];      /* list of include directories */
extern char *bbapredefs[];       /* list of predefined symbols */
```

Feb 03 15:45 1988 cquote.c Page 1

```
/*
 * FILE      $Header: cquote.c,v 1.1 87/07/10 16:41:52 hmgr Exp $
 *
 * AUTHOR       Bruce Erickson
 *
 * ONELINER Prepare strings to be inserted into a C file
 *
 *    This routine is used to take a smithstring which will
 *    be inserted into a C file (as a string) and will:
 *       double backslashes  (as this is the only sensitive
 *       character that smithtostore can generate...
 *
 *    This returns a ponter to a 'static' string
 *    (actually malloc'd, but you better not touch it!)
 *
 * TABSTOPS 3
 *
 * CONDCOMP TEST  - creates a main routine to test this.
 *
 * INSPECTED   date     - inspectors
 *
 * RCS      $Log: cquote.c,v $
 * Revision 1.1  87/07/10  16:41:52  16:41:52  hmgr ()
 * Initial revision
 *
 *
 */
```

BEST AVAILABLE COPY

```c
static char rcsid[] = "$Header: cquote.c,v 1.1 87/07/10 16:41:52 hmgr Exp $";
#include <stdio.h>
#include <boolean.h>

/* GLOBALS */

/* STATICS */

/* EXTERNALS */
extern char *malloc();
extern void free();
extern char *fgets();

/* FORWARD */


/*************************************************************************/

/* FUNCTION */
char *
cquote(in)
char *in;          /* input string .. */

/*
 *    See file header, above...
 *
 */
{
   static char *out;        /* output string */
   static int numchars;     /* number of characters allocated to 'out' */
   int numin;               /* number of characters in 'in' string */
   register char *src;      /* source pointer */
   register char *dest;     /* destination pointer */
   register char c;         /* character in question */

   numin = strlen(in);

   /* Verify that we have room in our allocated string for the worst
      case expansion, i.e., every character is either a '\' or a
      '"'
   */
   if (numchars < (2 * numin))
   {
      if (numchars != 0)
         free(out);
      numchars = 2 * numin;
      out = malloc(numchars + 1);       /* always reserve room for \0 at end! */
   }

   /* Copy characters from 'in' to 'out' */

   src = in;
```

BEST AVAILABLE COPY

```
   dest = out;

   while ((c = *src++) != '\0')
   {
      if (c == '\\')
         *dest++ = '\\';
      *dest++ = c;
   }
   *dest = '\0';

   return(out);
}

#ifdef TEST

main()
{
   char instring[100];
   char *outstring;

   while (fgets(instring, sizeof(instring), stdin) != NULL)
   {
      outstring = cquote(instring);
      printf("'%s' -> '%s'\n", instring, outstring);
      fflush(stdout);
   }
}
#endif
```

Feb 03 15:45 1988  map.h Page 1

```
/*
 * FILE     $Header: map.h,v 1.2 87/08/17 18:21:31 hmgr Exp $
 *
 * AUTHOR       Bruce Erickson
 *
 * ONELINER Header file for routines dealing with map files
 *
 * TABSTOPS 3
 *
 * RCS      $Log: map.h,v $
 * Revision 1.2  87/08/17  18:21:31  18:21:31  hmgr ()
 * Author: bae@hplsdlc.hp.com
 * no comment
 *
 * Revision 1.1  87/07/10  17:39:48  17:39:48  hmgr ()
 * Initial revision
 *
 *
 */

#define MAPID "Basis Branch Analysis Source Mapping File"
```

BEST AVAILABLE COPY

Feb 03 15:45 1988  dumpfile.h Page 1

```
/*
 * FILE      $Header: dumpfile.h,v 1.1 87/07/16 10:43:17 hmgr Exp $
 *
 * AUTHOR       Bruce Erickson
 *
 *
 * ONELINER header for dumpfiles stuff
 *
 * TABSTOPS 3
 *
 * INSPECTED   date      - inspectors
 *
 * RCS       $Log: dumpfile.h,v $
 * Revision 1.1  87/07/16  10:43:17  10:43:17  hmgr ()
 * Initial revision
 *
 *
 */

#define DUMPID "Basis Branch Analysis Dump File"

```

Feb 03 15:45 1988  readspec.c Page 1

```
/*
 * FILE      $Header: readspec.c,v 1.13 87/11/06 08:45:53 hmgr Exp $
 *
 * AUTHOR       Bruce Erickson
 *
 * ONELINER Read bba specification files
 *
 * TABSTOPS 3
 *
 * CONDCOMP WRITESPEC    - if defined, create a main for testing & writing
 *
 * INSPECTED   date      - inspectors
 *
 * RCS       $Log: readspec.c,v $
 * Revision 1.13  87/11/06  08:45:53  08:45:53  hmgr ()
 * Author: bae@hplsdlc.hp.com
 * added 'noansii', and 'nopragmas' so that it works correctly
 * with the s300 compiler's -g option
 *
 * Revision 1.12  87/10/21  15:18:04  15:18:04  hmgr ()
 * Author: bae@hplsdlc.hp.com
 * Added nofiletimes and nofirstline; converted
 * to pragmas for ignoring things
 *
```

BEST AVAILABLE COPY

```
 * Revision 1.11  87/09/01  14:49:20  14:49:20  hmgr ()
 * Author: bae@hplsdlc.hp.com
 * added nosection option, for host compilers
 *
 * Revision 1.10  87/08/31  15:22:35  15:22:35  hmgr ()
 * Author: bae@hplsdlc.hp.com
 * added bbanoconst
 *
 * Revision 1.9  87/08/24  19:54:15  19:54:15  hmgr ()
 * Author: bae@hplsdlc.hp.com
 * changes to make lint happy
 *
 * Revision 1.8  87/08/21  16:24:21  16:24:21  hmgr ()
 * Author: bae@hplsdlc.hp.com
 * Sped up looking for entries in the array by using a
 * binary search method instead of the linear method we
 * had been using...
 *
 * Revision 1.7  87/08/20  09:08:42  09:08:42  hmgr ()
 * Author: bae@hplsdlc.hp.com
 * another incremental check-in
 *
 * Revision 1.6  87/08/20  08:39:07  08:39:07  hmgr ()
 * Author: bae@hplsdlc.hp.com
 * incremental check-in, so I dont do something foolish
 *
 * Revision 1.5  87/08/19  16:30:55  16:30:55  hmgr ()
 * Author: bae@hplsdlc.hp.com
 * Before changing to deal with '<use-bytes>'
 *
 * Revision 1.4  87/08/18  15:56:45  15:56:45  hmgr ()
 * Author: bae@hplsdlc.hp.com
 * added bbafreespec() for bbaunload command
 *
 * Revision 1.3  87/08/17  18:25:56  18:25:56  hmgr ()
 * Author: bae@hplsdlc.hp.com
 * Changed a whole host of things....
 *
 * Revision 1.2  87/08/14  11:09:05  11:09:05  hmgr ()
 * Author: bae@hplsdlc.hp.com
 * major changes.
 *
 * Revision 1.1  87/08/13  15:19:31  15:19:31  hmgr ()
 * Initial revision
 *
 * Revision 1.1  87/08/13  15:10:45  15:10:45  bae (Bruce Erickson)
 * Initial revision
 *
 *
 */
static char rcsid[] = "$Header: readspec.c,v 1.13 87/11/06 08:45:53 hmgr Exp $";
#include <stdio.h>
```

BEST AVAILABLE COPY

```
#include <boolean.h>
#include <sys/types.h>
#include <sys/stat.h>
#include <fcntl.h>
#include <model.h>
#include "targetspec.h"

#define CHECKSUM(sum, c) sum = (sum << 5) ^ (sum >> 28); sum += c;

/* GLOBALS */
/***************************************************************************/
/*      See the PROTOCOL document for full information on the meanings    */
/*                                                                         */
/* global name & default           token                                   */
/***************************************************************************/

int bbappversion = -1;              /* preprocessor version to run */
int bbainsertprotocol = -1;         /* ins_prot <level> */
int bbainsprotlength = 0;           /* ins_prot <bytes> */
int bbainsprotusedbytes = 0;        /* ins_prot <used-bytes> */
char *bbainsprottype = NULL;        /* ins_prot <string> */

int bbamapprotocol = -1;            /* map_prot <level> */
int bbadumpprotocol = -1;           /* dump_prot <level> */
boolean bbamapmodtime = FALSE;      /* map_modtime */

char *bbaarraytype = "int";         /* arraytype <string> */
int bbaarraybits = 0;               /* arraytype <bits> */


char *bbaarrayname = "_bA_array";    /* arrayname <string> */

char *bbaswitchlbl = "_bA_switch_label_%d_%d";  /* switchlbl <string> */

char *bbatmpvar = "_bA_temp_";      /* tempvar <string> */

int bbainsnumentries = -1;          /* ins_numentries <bytes>; -1 if not present */
int bbainsnumusedbytes = 0;         /* ins_numentries <used-bytes> */
char *bbainsnumtype = NULL;         /* ins_numentries <string> */

boolean bbaunderscores = FALSE;     /* underscores */
boolean bbanoansii = FALSE;         /* noansii */
boolean bbanoconst = FALSE;         /* noconst */
boolean bbanofiletimes = FALSE;     /* nofiletimes */
boolean bbanofirstline = FALSE;     /* nofirstline */
boolean bbanopragmas = FALSE;       /* nopragmas */
boolean bbanosection = FALSE;       /* nosection */
boolean bbanowarnings = FALSE;      /* nowarnings */

boolean bbaupsegmented = FALSE;     /* up_segmented */
int bbaupaddrsize = 8;              /* up_addrsize <bits> */
boolean bbauphifirst = FALSE;       /* up_hifirst */
```

BEST AVAILABLE COPY

```
boolean bbauplofirst = FALSE;    /* up_lofirst */

int bbainsmodtime = -1;          /* ins_modtime <bytes> ; -1 if not present */
int bbainsmodusedbytes = 0;      /* ins_modtime <used-bytes> */

int bbainsdataarray = -1;        /* ins_dataarray <bytes>; -1 if not present */
int bbainsdatausedbytes = 0;     /* ins_dataarray <used-bytes> */

int bbainsoptions = -1;          /* ins_options <bytes>; -1 if not present */
int bbainsoptusedbytes = 0;      /* ins_options <used-bytes> */

int bbainssourcepath = -1;       /* ins_sourcepath <bytes>; -1 if not present */
int bbainssourceusedbytes = 0;   /* ins_sourcepath <used-bytes> */

boolean bbainsmapsuffix = FALSE; /* ins_mapsuffix */
int bbainsmapsufusedbytes = 0;   /* ins_mapsuffix <used-bytes> */

char *bbagencc = NULL;           /* gen_cc <string1> */
char *bbagenccargs = NULL;       /* gen_cc <string2> */

char *bbagenar = NULL;           /* gen_ar <string1> */
char *bbagenarargs = NULL;       /* gen_ar <string2> */

char *bbagennm = NULL;           /* gen_nm <string1> */
char *bbagennmargs = NULL;       /* gen_nm <string2> */

boolean bbagenhost = FALSE;      /* gen_host */
boolean bbagendumptime = FALSE;  /* gen_dumptime */

/* The following variables are only used by the preprocessor..... */
/* They are terminated by a NULL entry */
char *bbaincldirs[10];           /* list of include directories */
char *bbapredefs[20];            /* list of predefined symbols */


/* STATICS */
static int numincldirs = 0;   /* number of include directories */
static int numpredefs = 0;    /* number of predefined symbols */
static char *data = NULL;     /* the data file */
static char *next;       /* byte to read next */
static char sep[] = " \t\n";     /* seperators we recognize */
static char ppidirstring[] = "pp_idir";
static char ppdefinestring[] = "pp_define";


/***************************************************************************/
/*     The following create a structure that is used to read in a file    */
/***************************************************************************/

#define SPEC_INTEGER 1      /* expect integer */
#define SPEC_STRING  2      /* expect string */
#define SPEC_TOKEN   3      /* Accept any blank-terminated token; write to string */
```

BEST AVAILABLE COPY

```
#define SPEC_END      4      /* end of line? */

typedef struct
{
   unsigned char type;      /* SPEC_INTEGER, SPEC_STRING, etc. */
   /* Note: these aren't in a union because I want to do a static
      initialization!
   */
   int *iptr;             /* if type is SPEC_INTEGER */
   char **cptr;           /* if type is SPEC_STRING or SPEC_TOKEN */
} SPEC_TYPE;

typedef SPEC_TYPE SPEC_RULE[];      /* a 'rule' is an array of these structures */

/* ins_prot <bytes> <bytes-used> <level> <string> */
static SPEC_RULE rule_insprot =
{
   {SPEC_INTEGER, &bbainsprotusedbytes},
   {SPEC_INTEGER, &bbainsprotlength},
   {SPEC_INTEGER, &bbainsertprotocol},
   {SPEC_STRING, NULL, &bbainsprottype},
   {SPEC_END}
};

/* map_prot <level> */
static SPEC_RULE rule_mapprotocol =
{
   {SPEC_INTEGER, &bbamapprotocol },
   {SPEC_END}
};

/* dump_prot <level> */
static SPEC_RULE rule_dumpprotocol =
{
   {SPEC_INTEGER, &bbadumpprotocol },
   {SPEC_END }
};

/* arraytype <bits> <string> */
static SPEC_RULE rule_arraytype =
{
   {SPEC_INTEGER, &bbaarraybits},
   {SPEC_STRING, NULL, &bbaarraytype},
   {SPEC_END}
};

/* arrayname  <string> */
static SPEC_RULE rule_arrayname =
{
   {SPEC STRING, NULL, &bbaarrayname},
   {SPEC END}
};
```

BEST AVAILABLE COPY

```
/* switchlbl  <string> */
static SPEC_RULE rule_switchlbl =
{
   (SPEC_STRING, NULL, &bbaswitchlbl),
   (SPEC_END)
};

/* tempvar  <string> */
static SPEC_RULE rule_tempvar =
{
   (SPEC_STRING, NULL, &bbatmpvar),
   (SPEC_END)
};

/* ins_modtime <bytes-in-array> <bytes-used> */
static SPEC_RULE rule_insmodtime =
{
   (SPEC_INTEGER, &bbainsmodtime),
   (SPEC_INTEGER, &bbainsmodusedbytes),
   (SPEC_END)
};

/* ins_numentries <bytes> <bytes-used> <string> */
static SPEC_RULE rule_insnumentries =
{
   (SPEC_INTEGER, &bbainsnumentries ),
   (SPEC_INTEGER, &bbainsnumusedbytes ),
   (SPEC_STRING, NULL, &bbainsnumtype ),
   (SPEC_END )
};

/* ins_dataarray <bytes> <bytes-used> */
static SPEC_RULE rule_insdataarray =
{
   (SPEC_INTEGER, &bbainsdataarray ),
   (SPEC_INTEGER, &bbainsdatausedbytes ),
   (SPEC_END )
};

/* ins_options <bytes> <bytes-used> */
static SPEC_RULE rule_insoptions =
{
   (SPEC_INTEGER, &bbainsoptions ),
   (SPEC_INTEGER, &bbainsoptusedbytes ),
   (SPEC_END )
};

/* ins_sourcepath <bytes> <byates-used> */
static SPEC_RULE rule_inssourcepath =
{
   (SPEC_INTEGER, &bbainssourcepath ),
```

BEST AVAILABLE COPY

```
    {SPEC_INTEGER, &bbainssourceusedbytes },
    {SPEC_END }
};

/* SPECIAL: WHEN THIS IS FOUND, ALSO SET BBAINSMAPSUFFIX TO TRUE!!!!! */
/* ins_mapsuffix <bytes-used> */
static SPEC_RULE rule_insmapsuffix =
{
    {SPEC_INTEGER, &bbainsmapsufusedbytes },
    {SPEC_END }
};

/* up_addrsize <bits> */
static SPEC_RULE rule_upaddrsize =
{
    {SPEC_INTEGER, &bbaupaddrsize},
    {SPEC_END}
};


/* pp_version <number> */
static SPEC_RULE rule_ppversion =
{
    {SPEC_INTEGER, &bbappversion},
    {SPEC_END}
};

/* gen_cc <string1> <string2> */
static SPEC_RULE rule_gencc =
{
    {SPEC_TOKEN, NULL, &bbagencc},
    {SPEC_STRING, NULL, &bbagenccargs},
    {SPEC_END}
};

/* gen_ar <string1> <string2> */
static SPEC_RULE rule_genar =
{
    {SPEC_TOKEN, NULL, &bbagenar},
    {SPEC_STRING, NULL, &bbagenarargs},
    {SPEC_END}
};

/* gen_nm <string1> <string2> */
static SPEC_RULE rule_gennm =
{
    {SPEC_TOKEN, NULL, &bbagennm},
    {SPEC_STRING, NULL, &bbagennmargs},
    {SPEC_END}
};

typedef struct
```

BEST AVAILABLE COPY

```
{
    char *token;            /* token to start this rule */
    SPEC_TYPE *rule;        /* if NULL, this is a boolean flag */
    boolean *bptr;          /* and this is the boolean pointer... */
} SPEC_RULES;

/* ATTENTION: THIS ARRAY IS ORDERED BY ASCII VALUES OF TOKENS */
static SPEC_RULES rules[] =
{
    {"arrayname",  rule_arrayname},
    {"arraytype",  rule_arraytype},
    {"dump_prot",  rule_dumpprotocol},
    {"gen_ar", rule_genar},
    {"gen_cc", rule_gencc},
    {"gen_dumptime", NULL, &bbagendumptime},
    {"gen_host", NULL, &bbagenhost},
    {"gen_nm", rule_gennm},
    {"ins_dataarray", rule_insdataarray},
    {"ins_mapsuffix", rule_insmapsuffix},
    {"ins_modtime", rule_insmodtime},
    {"ins_numentries", rule_insnumentries},
    {"ins_options", rule_insoptions},
    {"ins_prot", rule_insprot},
    {"ins_sourcepath", rule_inssourcepath},
    {"map_modtime", NULL, &bbamapmodtime},
    {"map_prot", rule_mapprotocol},
    {"noansii", NULL, &bbanoansii},
    {"noconst", NULL, &bbanoconst},
    {"nofiletimes", NULL, &bbanofiletimes},
    {"nofirstline", NULL, &bbanofirstline},
    {"nopragmas", NULL, &bbanopragmas},
    {"nosection", NULL, &bbanosection},
    {"nowarnings", NULL, &bbanowarnings},
    {ppdefinestring, NULL, NULL},               /* special! */
    {ppidirstring, NULL, NULL},                 /* special! */
    {"pp_version", rule_ppversion},
    {"switchlbl",  rule_switchlbl},
    {"tempvar",  rule_tempvar},
    {"underscores", NULL, &bbaunderscores},
    {"up_addrsize", rule_upaddrsize},
    {"up_hifirst", NULL, &bbauphifirst},
    {"up_lofirst", NULL, &bbauplofirst},
    {"up_segmented", NULL, &bbaupsegmented},
};

/* EXTERNALS */
extern void wprobestruct();
extern char *strchr();
extern char *strtok();
extern char *malloc();
extern void free();
extern char *fhpname();
```

BEST AVAILABLE COPY

```
/* FORWARD */
extern char *findrol();
extern void bbadospec();


/****************************************************************************/

/* FUNCTION */
boolean
bbareadspec(base, giveerror, secstring)
char *base;       /* base of name; e.g., "68020", "" (host) */
boolean giveerror;/* if TRUE, print error message to stderr; else be silent */
char *secstring;  /* if not NULL (or ""), this string was passed down by the
                     parent. It is used in creating the checksum... */

/*
 *    This routine will open the file:
 *       $HP64000/lib/<base>/bbacpp.spec
 *
 *    It will then read the file into memory, and
 *    verify the checksum.  If the checksum failes, or it cannot
 *    open the file, this returns FALSE.  Otherwise the
 *    data is read and the globals (above) filled in...
 *
 *    Note that if we return TRUE we cannot have free'd the data,
 *    because if we do that then strings may go away...
 *
 */
{
   char c;
   char *path;    /* path of file name */
   char localpath[50];
   char *line;    /* start of line */
   char *eol;     /* end of line */
   char *token;   /* start of token */
   char *restofline;
   char *ptr;     /* generic pointer */

   if (*base != '/')
   {
      /* User did not pass an absolute file name */
      if (*base != '\0')
         sprintf(localpath, "lib/%s/bbacpp.spec", base);
      else
         strcpy(localpath, "lib/bbacpp.spec");

      path = fhpname(localpath, NULL);
   }
   else
   {
      /* User passed an absolute file name (testing?) */
      path = base;
```

BEST AVAILABLE COPY

```
    }

    if (!doread(path, secstring, giveerror))
    {
       free(path);     /* fhpname malloc'd this! */
       return(FALSE);
    }

    /* OK, we can scan the file ... */
    eol = data - 1;
    while (*(line = eol + 1) != '\0')
    {
       /* Find the end of this line */
       eol = strchr(line, '\n');
       *eol = '\0';

       token = strtok(line, sep);

       /* Analyze the line and set the variables */
       bbadospec(token, eol);
    }

    /* Filled everything in... return TRUE */
    return(TRUE);
}


/**************************************************************************/

/* FUNCTION */
bbafreespec()

/*
 *     This routine will free the data we malloc'd.
 *     It is only called in emulation - never anyplace
 *     else.
 *
 *     Note that the data, after this call, is total garbage!
 *
 */
{
#pragma BBA_IGNORE /* only used in bbaunload command */

    /* Simple test - avoid core dumping if a slight logic error occurs... */
    if (data != NULL)
    {
       free(data);
       data = NULL;
    }
}


/**************************************************************************/
```

BEST AVAILABLE COPY

```
/* FUNCTION */
static boolean
doread(path, secstring, giveerror)
char *path;         /* file name */
char *secstring;  /* if not NULL, include this string in the checksum */
boolean giveerror;   /* if TRUE, print error messages to stderr */

/*
 *    This routine will (attempt to) open and read the
 *    file.  Then we calculate the checksum, and verify it
 *    against what the file shows.
 *
 *    If this returns FALSE, the file is closed (or never open)
 *    and the data freed.
 *
 *    If this returns TRUE, the file has a good checksum and
 *    the data is in 'data'; the file is closed.
 */
{
   struct stat statbuf;
   int bytes;              /* number of bits in the file */
   int fd;                 /* file descriptor */
   register char *ptr;
   int32 readsum;          /* the checksum we read in */
   register int32 calcsum;       /* the checksum we calculated */
   register char c;

   /* We will open the file first.  If it doesn't exist, the user
      will get a 'cannot open' message, which is a little easier
      to understand than 'cannot stat'
   */
   fd = open(path, O_RDONLY);
   if (fd == -1)
   {
      if (giveerror)
      {
         fprintf(stderr, "cannot open %s", path);
         perror(" ");
      }
      return(FALSE);
   }

   /* Use fstat - it is a little quicker */
   if (fstat(fd, &statbuf) != 0)
   {
      if (giveerror)
      {
         fprintf(stderr, "cannot stat %s", path);
         perror(" ");
      }
      return(FALSE);
```

BEST AVAILABLE COPY

```
    }

    /* Reserve enough room to read the file in all at once */
    bytes = statbuf.st_size;    /* convert to integer */

    data = malloc(bytes);
    if (data == NULL)
       return(FALSE);



    if (read(fd, data, bytes) != bytes)
    {
       if (giveerror)
       {
          fprintf(stderr, "cannot read %s", path);
          perror(" ");
       }
       free(data);
       return(FALSE);     /* Oh well.... */
    }

    close(fd);

    /* OK, we have read the data and it is ours.  Let's find the next-to-the
       last line (the one prior to the checksum) and mark it with a \0,
       so that we can easily calculate the checksum...
    */

    ptr = data + bytes - 1;     /* This is the last \n, presumably */

    *ptr = '\0';       /* change \n to end-of-string */

    while (--ptr > data)
    {
       if (*ptr == '\n')
          break;       /* found the \n prior to the checksum */
    }

    if (ptr <= data)
    {
       if (giveerror)
       {
          fprintf(stderr, "file %s is corrupt\n", path);
       }
       free(data);
       return(FALSE);     /* Illegal to have a file that has only the checksum */
    }

    ptr++;       /* point to first character after \n */
    sscanf(ptr, "%08x", &readsum);       /* convert to checksum */

    *ptr = '\0';       /* and pretend that the file ended at the checksum */
```

BEST AVAILABLE COPY

```
    for (calcsum = 0, ptr = data; (c = *ptr) != '\0'; ptr++)
    {
       /* do a bizarre checksum to defeat somebody else doing this. */
       CHECKSUM(calcsum, c);
    }

    if (secstring != NULL)
    {
       /* Add in the security's string contribution */
       for (ptr = secstring; (c = *ptr) != '\0'; ptr++)
       {
          /* do a bizarre checksum to defeat somebody else doing this. */
          CHECKSUM(calcsum, c);
       }
    }

    if (calcsum != readsum)
    {
       if (giveerror)
       {
          fprintf(stderr, "file %s is corrupt\n", path);
       }
       free(data);
       return(FALSE);
    }
    return(TRUE);
}


/*************************************************************************/

/* FUNCTION */
static void
bbadospec(token, eol)
char *token;           /* token at start of line */
char *eol;             /* last character in line */

/*
 *     This routine gets a token and scans thru the array of rules
 *     looking for the one which token represents.  Then it goes
 *     thru the rule for this token, analyzing the line & setting
 *     variables accordingly.
 *
 *     If WRITESPEC is defined, we will output approprate error messages
 *     if we can't figure a line out; else we will be silent...
 *
 *     We will find out what token this is by doing a binary search
 *     of the SPEC_RULES array....
 */
{
    char *restofline;
    int minrule, maxrule;    /* used in binary search */
```

BEST AVAILABLE COPY

```
    int rule;               /* the rule we are considering */
    int compare;            /* results of strcmp */
    register SPEC_TYPE *tptr;
    register SPEC_RULES *ruleptr;
#   ifdef WRITESPEC
       char *basetoken;         /* main token - used in error messages */
#   endif

#   ifdef WRITESPEC
       basetoken = token;          /* keep this around for warnings, etc */
#   endif

    /* find the rest of the line --- i.e., the stuff
       following the whitespace(s) after the token
    */
    restofline = findrol(token, eol);

    /*****************************************************/
    /* OK, now let's find what rule this token represents */
    /*****************************************************/

    minrule = 0;
    maxrule = sizeof(rules) / sizeof(SPEC_RULES);
    while (minrule != maxrule)
    {
       rule = (minrule + maxrule) >> 1;    /* take middle position */

       ruleptr = &rules[rule];
       compare = strcmp(ruleptr->token, token);

       if (compare != 0)
       {
          if (compare > 0)
             maxrule = rule;
          else
          {
             /* The truncation (rule = minrule + maxrule / 2)
                is such that we could get stuck if minrule == maxrule - 1
             */
             if (minrule == rule)
                minrule++;      /* try the next one up */
             else
                minrule = rule;
          }
          continue;          /* Try the next one... */
       }

       if (ruleptr->rule == NULL)
       {
          /* If the boolean pointer is NULL, then we have a special case */
          if (ruleptr->bptr == NULL)
          {
```

BEST AVAILABLE COPY

```
            /* ... yup, a special case here! */
            if (strcmp(token, ppdefinestring) == 0)
            {
               /* This is a predefined symbol */
               bbapredefs[numpredefs++] = restofline;
               bbapredefs[numpredefs] = NULL;      /* Force null termination of list */
               return;
            }

            if (strcmp(token, ppidirstring) == 0)
            {
               /* This is a request to add a directory to the search path */
               bbaincldirs[numincldirs++] = restofline;
               bbaincldirs[numincldirs] = NULL;    /* Force null termination of list */
               return;
            }
#           ifdef WRITESPEC
               fprintf(stderr, "ERROR: table error for token %s!\n", basetoken);
#           endif
         }

         /* This is a boolean pointer ONLY */
         *ruleptr->bptr = TRUE;
#        ifdef WRITESPEC
            if (restofline != NULL)
            {
               fprintf(stderr, "Warning: token %s should not be followed by anything!\n",
                     basetoken);
            }
#        endif
         return;
      }

      /* Special: also set boolean when 'ins_mapsuffix' is found ... */
      if (ruleptr->rule == rule_insmapsuffix)
         bbainsmapsuffix = TRUE;

      /* This contained a set of rules to follow (i.e., this was not
         simply setting a boolean value...
      */
      for (tptr = ruleptr->rule; tptr->type != SPEC_END; tptr++)
      {
         switch(tptr->type)
         {
         case SPEC_INTEGER :
            /* Get the integer as a single token; set restofline
               to whatever follows
            */
            token = strtok(restofline, sep);
            if (token == NULL)
            {
               /* Unexpected! */
```

BEST AVAILABLE COPY

```
#               ifdef WRITESPEC
                    fprintf(stderr, "Warning: unexpected eol for token %s (wanted integer)\n",
                            basetoken);
#               endif
                return;
            }

#           ifdef WRITESPEC
                /* Check to see if token is an integer */
                if ((*token < '0') || (*token > '9'))
                {
                    fprintf(stderr, "Warning: '%s' for token %s is not an integer!\n",
                            token, basetoken);
                }
#           endif

            restofline = findrol(token, eol);

            /* Got a token!  Convert to integer and continue... */
            *(tptr->iptr) = atoi(token);      /* set the value */
            break;

        case SPEC_TOKEN :
            /* Set the string to token.  Continue. */
            token = strtok(restofline, sep);
#           ifdef WRITESPEC
                if (token == NULL)
                {
                    fprintf(stderr, "Warning: unexpected eol for token %s (wanted token)\n",
                            basetoken);
                }
#           endif
            *(tptr->cptr) = token;
            restofline = findrol(token, eol);
            break;

        case SPEC_STRING :
            /* Set the string to restofline.  Give warning if necessary. */
#           ifdef WRITESPEC
                if (restofline == NULL)
                {
                    fprintf(stderr, "Warning: unexpected eol for token %s (wanted string)\n",
                            basetoken);
                }
#           endif
            *(tptr->cptr) = restofline;

            /* This *must* be the end of the line, so..... */
            return;
        }
        /* Continue parsing line... */
    }
```

BEST AVAILABLE COPY

```
        /* Finished with line! */
#       ifdef WRITESPEC
           if (restofline != NULL)
              fprintf(stderr, "Warning: extra characters at end of token %s\n",
                    basetoken);
#       endif
        return;
    }

    /* Fell thru loop - token not found... */
#   ifdef WRITESPEC
        fprintf(stderr, "Warning: token %s not understood\n", basetoken);
#   endif
}


/***********************************************************************/

/* FUNCTION */
static char *
findrol(token, eol)
char *token;        /* previous token */
char *eol;          /* end of current line */

/*
 *     This routine will return a pointer to the
 *     first non-whitespace following the end of the
 *     specified token...
 *
 *     If there was nothing beyond the line, this
 *     will return NULL
 */
{
    register char *restofline;
    register char c;

    restofline = token + strlen(token) + 1;

    while (restofline < eol)
    {
       if (((c = *restofline) != ' ') && (c != '\t'))
          break;
       restofline++;
    }

    return((restofline < eol) ? restofline : (char *) NULL);
}

#ifdef WRITESPEC


/***********************************************************************/
```

BEST AVAILABLE COPY

```
/* FUNCTION */
main(argc, argv)
char *argv[];

/*
 *     Usage:
 *         -w <file> < <specifications>
 *         -v <file>
 *         -s <string>
 *         -V
 *         -S <file>
 *
 *     -w : read stdin, and create specifications file
 *     -v : verify that <file> meets specifications
 *     -s : security string
 *     -V : verbose output
 *     -S : write structure declaration to <file>
 *
 */
{
   extern char *pathtofname();
   extern int optind;
   extern char *optarg;
   int c;
   boolean error = FALSE;      /* command line error? */
   boolean write = FALSE;      /* -w */
   boolean verify = FALSE;     /* -v */
   boolean verbose = FALSE;    /* -V */
   char *structfile = NULL;    /* -S */
   FILE *structstream;         /* file pointer for -S option */
   char *fname;
   char *secstring = NULL;
   FILE *stream;
   char instring[100];         /* input string */
   char *ptr;
   int32 checksum;
   char currentdirectory[1024];

   getcwd(currentdirectory, sizeof(currentdirectory));

   while ((c = getopt(argc, argv, "S:Vs:w:v:")) != EOF)
   {
      switch(c)
      {
      case 'S' :
         structfile = optarg;
         break;
      case 'V' :
         verbose = TRUE;
         break;
      case 's'    :
```

BEST AVAILABLE COPY

```
            secstring = optarg;
            break;
         case 'w' :
            write = TRUE;
            fname = optarg;
            break;
         case 'v' :
            verify = TRUE;
            fname = optarg;
            break;
         default :
            error = TRUE;
         }
      }

      if (error || !(write ^ verify))
      {
         fprintf(stderr, "Usage: %s [-V] (-w file | -v file [-S <structfile>]) [-s <secstring>]\n", argv[0]);
         exit(1);
      }

      if (verify)
      {
         if (!bbareadspec(fname, verbose, secstring))
         {
            fprintf(stderr, "%s NOT OK\n", pathtofname(currentdirectory, fname, 0));
            exit(1);
         }
         fprintf(stderr, "%s OK\n", pathtofname(currentdirectory, fname, 0));

         if (verbose)
         {
            /* print values out */
            prvalues();
         }

         if (structfile != NULL)
         {
            structstream = fopen(structfile, "w");
            if (structstream == NULL)
            {
               perror("Cannot open file for writing");
               exit(2);
            }
            wprobestruct(structstream);
            fclose(structstream);
         }
         exit(0);
      }


      /* Use wants to write a file ... */
```

BEST AVAILABLE COPY

```
    if ((stream = fopen(fname, "w")) == NULL)
    {
        fprintf(stderr, "Could not open %s", pathtofname(currentdirectory, fname, 0));
        perror(" ");
        exit(1);
    }

    checksum = 0;

    /* Use fgets instead of instring to retain \n's */
    while (fgets(instring, sizeof(instring), stdin) != NULL)
    {
        for (ptr = instring; (c = *ptr) != '\0'; ptr++)
        {
            CHECKSUM(checksum, c);
        }
        fputs(instring, stream);
    }

    if (secstring != NULL)
    {
        /* Add in the security's string contribution */
        for (ptr = secstring; (c = *ptr) != '\0'; ptr++)
        {
            /* do a bizarre checksum to defeat somebody else doing this. */
            CHECKSUM(checksum, c);
        }
    }

    fprintf(stream, "%08x\n", checksum);
    fclose(stream);
    exit(0);

}



/*************************************************************************/

/* FUNCTION */
static
prvalues()

/*
 *     This routine is used to print out all the values of the globals.
 *     To create this, run the list of globals (above) thru the following
 *     script:
 *     #!/bin/sh
 *     #      convert a list of globals to a list of printf statements....
 *      sed -e 's-char[  ]*\*-char -' |
 *      awk '   /^int /  {  printf "\tprintf(\"%s = %%d\\n\",%s);\n", $2, $2 }
 *                /^char / {  printf "\tprintf(\"%s = %%s\\n\",%s);\n", $2, $2 }
```

BEST AVAILABLE COPY

```
 *              /^boolean / {  printf "\tprintf(\"%s = %%s\\n\",%s ? \"TRUE\" : \"FALSE\");\n", $2, $2 }'
 *
 *    exit 0
 *
 */
{
   int index;

   if (bbainsertprotocol > MAXINSERTPROTOCOL)
      printf("WARNING: bbainsertprotocol > MAX (%d)\n", MAXINSERTPROTOCOL);

   if (bbamapprotocol > MAXMAPPROTOCOL)
      printf("WARNING: bbamapprotocol > MAX (%d)\n", MAXMAPPROTOCOL);

   if (bbadumpprotocol > MAXDUMPPROTOCOL)
      printf("WARNING: bbadumpprotocol > MAX (%d)\n", MAXDUMPPROTOCOL);

   if (numincldirs > (sizeof(bbaincldirs) / sizeof(char *)))
      printf("WARNING: too many include directories defined!\n");

   if (numpredefs > (sizeof(bbapredefs) / sizeof(char *)))
      printf("WARNING: too many predefined symbols defined!\n");

   printf("bbappversion = %d\n",bbappversion);
   printf("bbainsertprotocol = %d\n",bbainsertprotocol);
   printf("bbainsprotlength = %d\n",bbainsprotlength);
   printf("bbainsprotusedbytes = %d\n",bbainsprotusedbytes);
   printf("bbainsprottype = %s\n",bbainsprottype);
   printf("bbamapprotocol = %d\n",bbamapprotocol);
   printf("bbadumpprotocol = %d\n",bbadumpprotocol);
   printf("bbamapmodtime = %s\n",bbamapmodtime ? "TRUE" : "FALSE");
   printf("bbaarraytype = %s\n",bbaarraytype);
   printf("bbaarraybits = %d\n",bbaarraybits);
   printf("bbaarrayname = %s\n",bbaarrayname);
   printf("bbaswitchlbl = %s\n",bbaswitchlbl);
   printf("bbatmpvar = %s\n",bbatmpvar);
   printf("bbainsnumentries = %d\n",bbainsnumentries);
   printf("bbainsnumusedbytes = %d\n",bbainsnumusedbytes);
   printf("bbainsnumtype = %s\n",bbainsnumtype);
   printf("bbaunderscores = %s\n",bbaunderscores ? "TRUE" : "FALSE");
   printf("bbanoansii = %s\n",bbanoansii ? "TRUE" : "FALSE");
   printf("bbanoconst = %s\n",bbanoconst ? "TRUE" : "FALSE");
   printf("bbanosection = %s\n",bbanosection ? "TRUE" : "FALSE");
   printf("bbanowarnings = %s\n",bbanowarnings ? "TRUE" : "FALSE");
   printf("bbanofiletimes = %s\n",bbanofiletimes ? "TRUE" : "FALSE");
   printf("bbanofirstline = %s\n",bbanofirstline ? "TRUE" : "FALSE");
   printf("bbanopragmas = %s\n",bbanopragmas ? "TRUE" : "FALSE");
   printf("bbaupsegmented = %s\n",bbaupsegmented ? "TRUE" : "FALSE");
   printf("bbaupaddrsize = %d\n",bbaupaddrsize);
   printf("bbauphifirst = %s\n",bbauphifirst ? "TRUE" : "FALSE");
   printf("bbauplofirst = %s\n",bbauplofirst ? "TRUE" : "FALSE");
   printf("bbainsmodtime = %d\n",bbainsmodtime);
```

BEST AVAILABLE COPY

```
    printf("bbainsmodusedbytes = %d\n",bbainsmodusedbytes);
    printf("bbainsdataarray = %d\n",bbainsdataarray);
    printf("bbainsdatausedbytes = %d\n",bbainsdatausedbytes);
    printf("bbainsoptions = %d\n",bbainsoptions);
    printf("bbainsoptusedbytes = %d\n",bbainsoptusedbytes);
    printf("bbainssourcepath = %d\n",bbainssourcepath);
    printf("bbainssourcusedbytes = %d\n",bbainssourceusedbytes);
    printf("bbainsmapsuffix = %s\n",bbainsmapsuffix ? "TRUE" : "FALSE");
    printf("bbainsmapsufusedbytes = %d\n",bbainsmapsufusedbytes);
    printf("bbagencc = %s\n",bbagencc);
    printf("bbagenccargs = %s\n",bbagenccargs);
    printf("bbagenar = %s\n",bbagenar);
    printf("bbagenarargs = %s\n",bbagenarargs);
    printf("bbagennm = %s\n",bbagennm);
    printf("bbagennmargs = %s\n",bbagennmargs);
    printf("bbagenhost = %s\n",bbagenhost ? "TRUE" : "FALSE");
    printf("bbagendumptime = %s\n",bbagendumptime ? "TRUE" : "FALSE");

    for (index = 0; index < numincldirs; index++)
       printf("bbaincldirs[%d] = %s\n", index, bbaincldirs[index]);

    for (index = 0; index < numpredefs; index++)
       printf("bbapredefs[%d] = %s\n", index, bbapredefs[index]);

 )

 #endif
```

Feb 03 15:45 1988 wstruct.c Page 1

```
 /*
  * FILE      $Header: wstruct.c,v 1.2 87/08/21 16:24:57 hmgr Exp $
  *
  * AUTHOR       Bruce Erickson
  *
  * ONELINER Write a _bA_probe_struct based on data in spec file
  *
  * TABSTOPS 3
  *
  * INSPECTED   date     - inspectors
  *
  * RCS      $Log: wstruct.c,v $
  * Revision 1.2  87/08/21  16:24:57  16:24:57  hmgr ()
  * Author: bae@hplsdlc.hp.com
  * Changed order of structure to minimize automatically-inserted
  * pads (inserted by compilers)
  *
  * Revision 1.1  87/08/18  10:27:27  10:27:27  hmgr ()
  * Initial revision
  *
  *
```

BEST AVAILABLE COPY

```
 */
static char rcsid[] = "$Header: wstruct.c,v 1.2 87/08/21 16:24:57 hmgr Exp $";
#include <stdio.h>
#include <boolean.h>
#include "targetspec.h"

/* GLOBALS */

/* STATICS */

/* EXTERNALS */

/* FORWARD */


/*************************************************************************/

/* FUNCTION */
void
wprobestruct(fp)
FILE *fp;             /* print output to here */


/*
 *    This writes out the definition of a structure based
 *    on data read from the appropriabe bba.spec
 *
 *    NOTE: if this changes, many regression tests die...
 */
{
   fprintf(fp, "struct _bA_probe_struct_ \t{\n");

   if (bbainsertprotocol != -1)
   {
      fprintf(fp, "\t\t%s insertprotocol;\n", bbainsprottype);
   }

   if (bbainsmapsuffix)
   {
      fprintf(fp, "\t\tchar mapsuffix;\n");
   }

   if (bbainsmodtime != -1)
   {
      fprintf(fp, "\t\tchar sourcemodtime[%d];\n", bbainsmodtime);
   }

   if (bbainsoptions != -1)
   {
      fprintf(fp, "\t\tunsigned char options[%d];\n", bbainsoptions);
   }

```

BEST AVAILABLE COPY

```
	if (bbainsnumentries != -1)
	{
		fprintf(fp, "\t\t%s numentries;\n", bbainsnumtype);
	}

	if (bbainsdataarray != -1)
	{
		fprintf(fp, "\t\t%s *dataarray;\n", bbaarraytype);
	}

	if (bbainssourcepath != -1)
	{
		fprintf(fp, "\t\tchar *sourcepath;\n");
	}

	fprintf(fp, "\t};\n");
}
```

Feb 03 15:46 1988  spaces.c Page 1

```
/*
 * FILE      $Header: spaces.c,v 1.2 87/11/03 08:45:37 hmgr Exp $
 *
 * AUTHOR       Bruce Erickson
 *
 * ONELINER spacesrm - deal with space-insensitive compares
 *
 * CONDCOMP TEST  - create a main() to do testing with
 *
 * TABSTOPS 3
 *
 * INSPECTED   date     - inspectors
 *
 * RCS       $Log: spaces.c,v $
 * Revision 1.2  87/11/03  08:45:37  08:45:37  hmgr ()
 * Author: bae@hplsdlc.hp.com
 * updated to pragmas
 *
 * Revision 1.1  87/08/31  11:08:55  11:08:55  hmgr ()
 * Initial revision
 *
 * Revision 1.2  87/08/21  16:23:02  16:23:02  hmgr ()
 * Author: bae@hplsdlc.hp.com
 * no comment
 *
 * Revision 1.1  87/07/28  13:06:08  13:06:08  hmgr ()
 * Initial revision
 *
 *
 */
```

```
static char rcsid[] = "$Header: spaces.c,v 1.2 87/11/03 08:45:37 hmgr Exp $";
#include <stdio.h>
#include <boolean.h>

/* GLOBALS */

/* STATICS */

/* EXTERNALS */

/* FORWARD */


/***********************************************************************/

/* FUNCTION */
void
spacesrm(string)
char *string;              /* string to remove spaces from */

/*
 *     This routine will traverse the string removin white spaces
 *     (" ", "\n", "\t") and C comments
 *
 *     White spaces within double quotes and single quotes are
 *     not removed, in case he wants to ignore ' ' but not '<tab>' ....
 *
 *     The space-removed string is in the same physical location
 *     that string is, but perhaps a little smaller...
 *
 *     In order to not remove comments that are within quotes, we
 *     will have to parse quotes, too...
 */
{
   register char *dest, *src;
   register char c;            /* current character we are looking at */
   register char prevc;        /* previous character we saw */
   register char quote;        /* the character that is the active quote */

   prevc = '\0';

   dest = src = string;

   /* Loop until end-of-comment */
   while ((c = *src++) != '\0')
   {
      /* When we reach here, we know
         1) not at end-of-string
         2) not in a comment
         3) not in a quote
      */
      if ((c == ' ') || (c == '\t') || (c == '\n'))
```

BEST AVAILABLE COPY

```
        {
            /* Do not increment&store dest; this is a space */
            prevc = c;      /* save c */
            continue;       /* try next one */
        }

        /* High-speed check:  If c is not a ", ', nor a *, just copy it
            to the destination
        */
        if ((c != '"') && (c != '*') && (c != '\''))
        {
            *dest++ = c;        /* DO copy this over */
            prevc = c;
            continue;           /* go to start of loop */
        }

        /* Is this a quote? */
        if (c != '*')
        {
            /* Yup, this is a quote.  Scan forward, NOT removing spaces,
                until we find the closing quote */
            *dest++ = quote = c;        /* store what quote we are waiting for */
            prevc = c;
            while ((c = *src++) != '\0')
            {
                if (c == quote)
                {

                    /* Unless prevc was a backslash, we are finished */
                    if (prevc != '\\')
                    {
                        *dest++ = c;    /* copy trailing quote to string */
                        break;      /* found end-of-quote! start at top of outer loop */
                    }
                }
                /* Still in quotes.  Copy c to destination string */
                *dest++ = c;
                prevc = c;
            }

            /* At here either because of end-of-string or end-of-quote... */
            if (c == '\0')
                break;      /* break out of loop; end-of-string */
            continue;       /* go to top of loop */
        }

        /* We are here because c is a '*'.  If prevc was not a '/', copy
            c and continue */

        if (prevc != '/')
        {
            *dest++ = c;
```

BEST AVAILABLE COPY

```
            prevc = c;
            continue;
        }

        /* Start of a comment!  We already copied the '/' over; back dest
            up by one so when we start we do not have the extraneous slash
        */
        dest--;

        /* Scan forward until a '*' '/' is found */
        prevc = '\0';      /* prevent '/' '*' '/' being considered a close-comment */
        while ((c = *src++) != '\0')
        {
            if ((c != '/') || (prevc != '*'))
            {
                /* Not at end-of-comment */
                prevc = c;
                continue;
            }

            /* At end-of-comment.. */
            break;
        }
        if (c == '\0')
        {
            /* If we reach here (which we should never do!), we have found an
                end-of-string in the middle of a comment.... */
            break;
        }
    }

    *dest = '\0';
}


/* NOTE: spacescmp is no longer used! */
/* /*************************************************************************/
/*
/* /* FUNCTION */
/* boolean
/* spacescmp(str1, str2)
/* register char *str1, *str2;
/*
/* /*
/*  *      Compare two strings, irrespective of spaces..
/*  *
/*  *      String1 has no white spaces in it.  String2 may.
/*  *
/*  *      The macro ISWHITE returns TRUE if c is a whitespace.
/*  *      The macro NEXT(s,c) sets 'c' to the next non-whitespace
/*  *      in s; s is post-incremented...
/*  *
```

BEST AVAILABLE COPY

```
/*  */
/* {
/* #define ISWHITE(c) ((c == ' ') || (c == '\t') || (c == '\n'))
/* #define NEXT(s, c) do { c = *s++; } while (ISWHITE(c));
/*
/*    register char c1, c2;
/*
/*    /* "master" is str1, just for convenience... */
/*    c1 = *str1++;
/*    while (c1 != '\0')
/*    {
/*       /* Find the next character in str2, and compare with
/*          current character in str1 */
/*       NEXT(str2, c2);
/*       if (c1 != c2)
/*          return(FALSE);
/*
/*       /* Go on to next charatér in str1 */
/*       c1 = *str1++;
/*    }
/*
/*    /* So far, the two strings have compared equal.  They will
/*       only truly be equal if the next non-whitespace in
/*       str2 is a \0
/*    */
/*    NEXT(str2, c2);
/*    if (c2 != c1)
/*       return(FALSE);
/*    return(TRUE);
/* } */


#ifdef TEST

/*****************************************************************************/

/* FUNCTION */
main()

/*
 *    For interactive testing
 *
 */
{
   char string[100];

#pragma BBA_IGNORE

   while (gets(string) != NULL)
   {
      printf("'%s' -> ", string);
      spacesrm(string);
```

BEST AVAILABLE COPY

```
      printf("'%s'\n", string);
   }
   return(0);
}
#endif TEST
```

Feb 03 15:52 1988  smithdate/smithdate.c Page 1

```
/*
 * FILE      $Header: smithdate.c,v 1.10 87/11/03 08:41:37 hmgr Exp $
 *
 * AUTHOR       Bruce Erickson
 *
 * ONELINER Routines for dealing with dates in the smithsonian calendar
 *
 *    These routines can be used on any computer.
 *    They will calculate the number of days since November 17, 1858
 *    (the Smithsonian base date and time for the astronomical
 *    calendar - and the base date for VAX/VMS systems).
 *    and 100-ns's since midnight, and do comparisions
 *    based on that data.
 *
 *    Further, routines are provided to store this information
 *    in a host-independant way.
 *
 *    CONDCOMP TEST      - compile in a special main for testing
 *
***********************************************************************
 *    Routine provided:
 *       smithfromunix()    - take data from unix time(2) call and convert
 *                             to SMITHTIME
 *       smithtounix()      - convert SMITHTIME to unix time(2)
 *       smithtostore()     - convert SMITHTIME to portable storage format
 *       smithfromstore()   - convert from portable storage format to SMITHTIME
 *       smithfromdate()    - convert from year/month/day HH:MM:SS:mm:uu form
 *                             to SMITHTIME.  Assumes date is in GMT
 *       smithtodate        - convert from SMITHTIME to year/month/day.  Will
 *                             attempt to convert using TZ.
 *       smithcmp()         - compare two SMITHTIME values; return 0, 1, -1
 *       smithtoascii()     - return an ascii representation of SMITHTIME.
 *
***********************************************************************
 *    The 'store' routines store the date as 9 ascii bytes + \0.
 *
 * TABSTOPS 3
 *
 * RCS       $Log: smithdate.c,v $
 * Revision 1.10  87/11/03  08:41:37  08:41:37  hmgr ()
 * Author: bae@hplsdlc.hp.com
 * Force and to not truncate!
```

BEST AVAILABLE COPY

```
 *
 * Revision 1.9  87/08/05  17:21:58  17:21:58  hmgr ()
 * Author: bae@hplsdlc.hp.com
 * Made smithfromstore use register variables
 *
 * Revision 1.8  87/08/03  15:15:50  15:15:50  hmgr ()
 * Author: bae@hplsdlc.hp.com
 * 1) updated docu to warn that smithfromdate (which is not used
 *      except internally) does not use TZ
 * 2) changead smithtodate and smithtoascii so they use TZ if possible.
 * 3) added -f flag to testing program (stat & print dates of files)
 *
 * Revision 1.7  87/06/10  16:12:08  16:12:08  bae (Bruce Erickson)
 * added smithtoascii() and test routines
 *
 * Revision 1.6  87/06/09  12:51:29  12:51:29  bae (Bruce Erickson)
 * added smithcmp() routine
 *
 * Revision 1.5  87/06/04  15:56:40  15:56:40  bae (Bruce Erickson)
 * Changed things to make lint happy
 *
 * Revision 1.4  87/04/22  16:37:08  16:37:08  bae (Bruce Erickson)
 * Changed store method to save 4 bytes.  This may be
 * important in the embedded environment!
 *
 * Revision 1.3  87/04/22  15:26:39  15:26:39  bae (Bruce Erickson)
 * smithfromunix() is working;
 * the time part of smithtodate() is working
 *
 * Revision 1.2  87/04/22  12:30:50  12:30:50  bae (Bruce Erickson)
 * *** empty log message ***
 *
 * Revision 1.1  87/04/20  16:55:16  16:55:16  bae (Bruce Erickson)
 * Initial revision
 *
 *
 */
static char rcsid[] = "$Header: smithdate.c,v 1.10 87/11/03 08:41:37 hmgr Exp $";
#include <stdio.h>
#include <boolean.h>
#include <model.h>
#include <time.h>
#include <sys/types.h>
#include <sys/stat.h>
#include "smithdate.h"

#define ISLEAP(y) ((y <= 1752) ? ((y % 4 ) == 0) : ((y % 4 == 0 ) && !((y % 100 == 0) && !(y % 400 == 0))))

/* GLOBALS */
SMITHTIME smithillegal = {0, 0};

/* STATICS */
```

BEST AVAILABLE COPY

```
/* daysinmonth tells how many days are in each month.
   Note that this starts with january as 0, not 1.
   Note that this is incorrect for a leap year
*/
static int daysinmonth[] =
   {  31, 28, 31, 30, 31, 30, 31, 31, 30, 31, 30, 31};

/* EXTERNALS */
extern boolean smithdateok();
extern boolean smithtimeok();
extern char *tzname[];

/* FORWARD */
extern SMITH_DAYS smdays();
extern char *dtoa();


/**************************************************************************/

/* FUNCTION */
boolean
smithfromunix(time, smptr)
long *time;           /* pointer to time from unix time(2) call */
SMITHTIME *smptr;     /* pointer to area to fill in */

/*
 *    This routine fills in the SMITHTIME data structure
 *    with correct data, given a unix time.
 *
 *    Note that milliseconds and microseconds will be set to 0.
 *
 *    Note that this uses the knowledge that there are 40587
 *    days from the beginning of smithtime to 1/1/1970
 *
 * RETURNS     FALSE if conversion failed; TRUE if it was OK.
 *
 */
{
   struct tm *tmptr;    /* returned by gmtime() call */
   long days;

   /* We can extract hours, minutes, and seconds directly from
      the long, since we also have our origin on 1/1/???? */

   smptr->units = (*time % (long) SMITH_SECONDS_PER_DAY) * SMITH_UNITS_PER_SECOND;

   days = *time / (long) SMITH_SECONDS_PER_DAY;    /* time is now in days since 1/1/9070 */
   smptr->days = days + 40587L;

   return(TRUE);
}
```

BEST AVAILABLE COPY

```
/******************************************************************************/

/* FUNCTION */
boolean
smithfromdate(year, month, day, hour, minute, second, millisecond, microsecond, smptr)
int year, month, day;
int hour, minute, second;
int millisecond, microsecond;
SMITHTIME *smptr;              /* fill in this structure */

/*
 *    This routine takes the specified data and converts it to
 *    the SMITHTIME type.
 *
 *    NOTE: ASSUMES THAT INPUT IS IN GMT!
 *
 *    RETURNS TRUE if conversion OK; FALSE otherwise
 */
{
   SMITH_UNITS numunits;   /* number of units */

   /* Check to see if the date specified is OK */
   if (!smithdateok(year, month, day))
      return(FALSE);

   /* Check to see if time is incorrect */
   if (!smithtimeok(hour, minute, second, millisecond, microsecond))
      return(FALSE);

   smptr->days = smdays(year, month, day);

   /* Convert time */
   numunits = microsecond / 100;    /* convert microseconds to units */
   numunits += millisecond * 10;    /* milliseconds to units */
   numunits += second * SMITH_UNITS_PER_SECOND;
   numunits += minute * (SMITH_SECONDS_PER_MINUTE * SMITH_UNITS_PER_SECOND);
   numunits += hour * (SMITH_MINUTES_PER_HOUR * SMITH_SECONDS_PER_MINUTE * SMITH_UNITS_PER_SECOND);
   smptr->units = numunits;

   return(TRUE);
}


/******************************************************************************/

/* FUNCTION */
boolean
smithtodate(smptr, pyear, pmonth, pday, phour, pminute, psecond, pmillisecond, pmicrosecond,
      tz)
SMITHTIME *smptr;        /* smith information to transform to day */
int *pyear, *pmonth, *pday;
```

BEST AVAILABLE COPY

```
int *phour, *pminute, *psecond, *pmillisecond, *pmicrosecond;
char **tz;              /* return the time zone used to here */

/*
 *    This routine is called to convert a SMITHTIME array to year/month/day/etc...
 *
 *    If it is in range of unixtime, it will convert to unixtime and
 *    use localtime to convert to local time; else it will
 *    assume GMT...
 *
 */
{
   int year1;              /* first guess at year */
   SMITH_DAYS eoydays;     /* number of days at 12/31/year1 */
   int monthdays;          /* number of days in month mscan */
   SMITH_DAYS bomdays;     /* days at beginnin of month */
   SMITH_UNITS units;
   int mscan;
   long time;
   struct tm *tmptr;

   if ((smptr->days < 40587) || (smptr->days > ((-(unsigned long) 0) / SMITH_SECONDS_PER_DAY)))
   {
      /* Day is less than unixtime, or would overflow a long ... */
      /* Calculate a lower-bound on the year.  This is done by assuming
         that all years are leap years.. */
      year1 = (smptr->days + SMITH_DAYS_VALUE - 1) /
               366 + SMITH_YEAR;     /* first guess at a year */

      while (smptr->days > (eoydays = smdays(year1, 12, 31)))
         year1++;

      /* Year1 is, in fact, the year that smptr->days belongs to */
      *pyear = year1;

      /* We will now scan backwards thru the months to find what
         month this is in.
      */

      mscan = 13;    /* loop is pre-decrement */
      bomdays =+eoydays + 1;     /* so when we subtract number-of-days in month
                                    we get mscan/1/year1 */
      do
      {
         mscan--;    /* decrement month */

         /* Calculate the number of days in this month */
         if ((mscan != 2) || (!ISLEAP(year1)))
            monthdays = daysinmonth[mscan - 1];
         else
            monthdays = 29;

```

BEST AVAILABLE COPY

```
            /* bomdays is unsigned.  We will therefore need to use caution
               here, in the case that year1 == 1858
            */
            if (bomdays < monthdays)
            {
               bomdays -= monthdays;
               break;
            }
            bomdays -= monthdays;
         }
         while (bomdays > smptr->days);

         *pmonth = mscan;
         *pday = smptr->days - bomdays + 1;

         /* Convert time */

         units = smptr->units;
         *pmicrosecond = (units % 10) * 100;
         units /= 10;              /* units now in terms of milliseconds */
         *pmillisecond = units % 1000;
         units /= 1000;            /* units now in terms of seconds */
         *psecond = units % 60;
         units /= 60;              /* units now in terms of minutes */
         *pminute = units % 60;
         units /= 60;              /* units now in terms of hours */
         *phour = units;
         *tz = "GMT";
         return(TRUE);
      }

      /* Time is within unix time - i.e., we can use localtime to do
         conversion! */

      time = (smptr->days - 40587) * SMITH_SECONDS_PER_DAY + smptr->units / SMITH_UNITS_PER_SECOND;
      tmptr = localtime(&time);
      *pyear = tmptr->tm_year + 1900;
      *pmonth = tmptr->tm_mon + 1;
      *pday = tmptr->tm_mday;
      *phour = tmptr->tm_hour;
      *pminute = tmptr->tm_min;
      *psecond = tmptr->tm_sec;

      units = smptr->units;
      units = smptr->units;
      *pmicrosecond = (units % 10) * 100;
      units /= 10;              /* units now in terms of milliseconds */
      *pmillisecond = units % 1000;

      *tz = tzname[tmptr->tm_isdst];       /* ??? */
```

BEST AVAILABLE COPY

```
    return(TRUE);


}


/*************************************************************************/

/* FUNCTION */
SMITH_DAYS
smdays(year, month, day)
int year, month, day;           /* date to convert to days */
/*
 *    This routine converts month/day/year to the number
 *    of days since SMITH_MONTH/SMITH_DAY/SMITH_YEAR
 *
 */
{
    SMITH_DAYS numdays;      /* accumulator for number of days */
    int leap1;               /* first guess at number of leap years */
    int centuries;           /* number of centuries between base date &
                                current */
    int leapyears;           /* correct number of leap years from base to
                                1/1 of year */

    numdays = 365 * (year - SMITH_YEAR);      /* no leap years added */
    leap1 = (year - SMITH_YEAR + 2) / 4;      /* number of leap years - does
                                                 not correct for centuries */

    /* Correct for centuries.  You subtract one leap year per
       century *except* for centuries that are divisible by 400 */
    centuries = (year / 100) - (SMITH_YEAR / 100);
    leapyears = leap1 - centuries + ((centuries + 2) / 4);

    if (ISLEAP(year))
       leapyears--;             /* this must be dealt with later */
    numdays += leapyears;

    /* numdays is now the number of days from 1/1/SMITH_YEAR to
       1/1/year */

    numdays += smdaystoday(year, month, day);

    /* numdays is now the number of days from 1/1/SMITH_YEAR to
       month/day/year */

    numdays -= SMITH_DAYS_VALUE;

    return(numdays);
}


/*************************************************************************/
```

BEST AVAILABLE

```
/* FUNCTION */
static boolean
smithdateok(year, month, day)
int year, month, day;

/*
 *     This routine returns FALSE if the year/month/day does
 *     not meet specifications:
 *         -  year/month/day >= SMITH_YEAR/SMITH_MONTH/SMITH_DAY
 *         -  year/month/day <= SMITH_MAX_YEAR/SMITH_MAX_MONTH/SMITH_MAX/DAY
 *         -  year/month/day not impossible (i.e., 2/30/???)
 *
 */
{

   /* Lower bounds check */
   if (year < SMITH_YEAR)
      return(FALSE);
   if (year == SMITH_YEAR)
   {
      if (month < SMITH_MONTH)
         return(FALSE);
      if (month == SMITH_MONTH)
      {
         if (day < SMITH_DAY)
            return(FALSE);
      }
   }

   /* Upper bounds check */
   if (year > SMITH_MAX_YEAR)
      return(FALSE);
   if (year == SMITH_MAX_YEAR)
   {
      if (month > SMITH_MAX_MONTH)
         return(FALSE);
      if (month == SMITH_MAX_MONTH)
      {
         if (day > SMITH_MAX_DAY)
            return(FALSE);
      }
   }

   /* impossible day check */
   if ((month < 1) || (month > 12))
      return(FALSE);

   if (day < 1)
      return(FALSE);

   /* The end day varies with the month.... */
```

BEST AVAILABLE COPY

```
    if (month != 2)
    {
        if (day > daysinmonth[month - 1])
            return(FALSE);
    }
    else
    {
        /* Could be a leap year... */
        if (!ISLEAP(year))
        {
            if (day > 28)
                return(FALSE);
        }
        else
        {
            if (day > 29)
                return(FALSE);
        }
    }
    return(TRUE);
}


/*************************************************************************/

/* FUNCTION */
static boolean
smithtimeok(hour, minute, second, millisecond, microsecond)
int hour, minute, second, millisecond, microsecond;

/*
 *     Check bounds on all of the parameters.  return TRUE if
 *     all parameters w/in bounds; else return FALSE.
 *
 */
{
#   define WITHIN(lower, value, upper) ((lower <= value) && (value <= upper))
    if (!WITHIN(0, hour, 23))
        return(FALSE);

    if (!WITHIN(0, minute, 59))
        return(FALSE);

    if (!WITHIN(0, second, 59))
        return(FALSE);

    if (!WITHIN(0, millisecond, 999))
        return(FALSE);

    if (!WITHIN(0, microsecond, 999))
        return(FALSE);

```

BEST AVAILABLE COPY

```
    return(TRUE);
}


/**************************************************************************/

/* FUNCTION */
static int
smdaystoday(year, month, day)
int year, month, day;

/*
 *    This routine returns the number of days from
 *    1/1/year to month/day/year
 *
 */
{
    int accumdays;
    int monthindex;

    /* Accumulate days up to but not including the
       first day of the specified month */

    accumdays = 0;
    for (monthindex = 1; monthindex < month; monthindex++)
    {
       if ((monthindex != 2) || (!ISLEAP(year)))
          accumdays += daysinmonth[monthindex - 1];
       else
          accumdays += 29;
    }

    /* Add in the number of days for this month */
    accumdays += day;
    return(accumdays - 1);
}


/**************************************************************************/

/* FUNCTION */
char *
smithtostore(smptr)
SMITHTIME *smptr;     /* pointer to smithdate to store */

/*
 *    This routine returns a pointer to a \0-terminated
 *    character string which stores the time.
 *
 *    The format of the string is 9 ascii characters:
 *    The range of the charaters is 0400 -> 0477; the
 *    data is packed 6 bits to a character and bit 6 is
```

BEST AVAILABLE COPY

```
 *     always set to one (so that the character is always ascii)
 *
 *     The days is 20 bits; the units is 30 bits.
 *     The first 4 characters are 'days' with the
 *     last 4 bits of the 4th character set to 0.
 *     The last 5 characters are 'units'
 */
{
   static char string[14];
   char day4, day3, day2, day1;
   char t5, t4, t3, t2, t1;

   /* The date is 20 bits.  It is stored as 4 ascii characaters */
   day4 = (smptr->days >> 14) & 0x3f | 0x40;
   day3 = (smptr->days >> 8) & 0x3f | 0x40;
   day2 = (smptr->days >> 2) & 0x3f | 0x40;
   day1 = (smptr->days << 4) & 0x30 | 0x40;


   /* The time is 30 bits.  It is stored as 5 ascii characters */
   t5 = (smptr->units >> 24) & 0x3f | 0x40;
   t4 = (smptr->units >> 18) & 0x3f | 0x40;
   t3 = (smptr->units >> 12) & 0x3f | 0x40;
   t2 = (smptr->units >> 6) & 0x3f | 0x40;
   t1 = smptr->units & 0x3f | 0x40;

   sprintf(string, "%c%c%c%c%c%c%c%c%c",
         day4, day3, day2, day1,
         t5, t4, t3, t2, t1);
   return(string);

}


/****************************************************************************/

/* FUNCTION */
boolean
smithfromstore(string, smptr)
char *string;         /* \0-terminated string from smithtostore */
SMITHTIME *smptr;     /* pointer to smithdate which will be filled in */

/*
 *     This routine fills in a SMITHTIME structure given
 *     the string which smithtostore() created.  Bounds checking
 *     will occur.
 *
 *     The format of the string is described in 'smithtostore()'
 *
 *     RETURNS FALSE if string not from smithstore(); else TRUE
 */
{
```

BEST AVAILABLE COPY

```
    /* NOTE: register declarations in order of importance... */
    register char *ptr;
    register int index;
    register SMITH_UNITS units;
    register SMITH_DAYS days;
    register SMITH_DAYS c;
    register SMITH_UNITS c2;
    char character;

    ptr = string;
    /* scan thru the pointer, looking for bad data */
    for (index = 0; index < 9; index++)
    {
       character = *ptr++;
       if ((character < 0x40) || (character > 0x7f))
          return(FALSE);
    }

    /* String is A-OK! */
    ptr = string;
    days = 0;
    for (index = 0; index < 3; index++)
    {
       days = days << 6;
       c = *ptr++;
       days |= c & 0x3f;
    }
    c = *ptr++ & 0x30;
    c = c >> 4;
    days = days << 2;
    days |= c;
    smptr->days = days;

    if (smptr->days > SMITH_MAX_DAYS)
       return(FALSE);    /* exceeded max days */

    units = 0;
    for (index = 0; index < 5; index++)
    {
       units = units << 6;
       c2 = *ptr++;
       units |= c2 & (SMITH_UNITS) 0x3f;
    }

    smptr->units = units;

    if (smptr->units > SMITH_MAX_UNITS)
       return(FALSE);    /* number too big */

    return(TRUE);
}
```

BEST AVAILABLE COPY

```

/***************************************************************************/

/* FUNCTION */
smithcmp(a, b)
register SMITHTIME *a;
register SMITHTIME *b;

/*
 *    This compares two smithtime structures.  If a == b, this
 *    returns 0.  If a is 'earlier' than b, this returns -1, else
 *    this returns +1.
 *
 */
{
    if (a->days < b->days)
       return(-1);

    if (a->days > b->days)
       return(1);

    if (a->units < b->units)
       return(-1);

    if (a->units > b->units)
       return(1);

    return(0);
}


/***************************************************************************/

/* FUNCTION */
char *
smithtoascii(smptr, style)
SMITHTIME *smptr;          /* pointer to smithtime structure */
int style;                 /* style of conversion, see below */

/*
 *    This routine converts the passed SMITHTIME value to
 *    an ascii representation.  This returns a pointer to
 *    the static string which contains the ascii.
 *
 *    Exactly how this is done depends on the variable 'style':
 *
 *    the time is converted as:
 *        SMITH_TIMEOFF      - do not include time in conversion
 *        SMITH_TIMEHR       - only the hour
 *        SMITH_TIMEHRMN     - only hour and minute
 *       *SMITH_TIMEHRMNSC   - hour, minute, and second
 *        SMITH_TIMEALL      - fullest possible precision (include ms)
```

BEST AVAILABLE COPY

```
 *       If the time is not SMITH_TIMEOFF, the following arguments may
 *       be or'd in:
 *         *SMITH_TIME24       - time in 24-hour period
 *          SMITH_TIME12       - time in 12-hour period, no am/pm indication
 *          SMITH_TIMEAMPM     - time in 12-hour period, append 'am' or 'pm'
 *
 *    The date is converted as:
 *      *SMITH_DATEMDY      - date is month/day/year
 *       SMITH_DATEYMD      - date is year/month/day
 *       SMITH_DATEFILL     - fill month/day to 2 characters, and year to 4
 *
 *    The order of date/time vs time/date is defined as:
 *       SMITH_TIMEDATE     - time then date
 *      *SMITH_DATETIME     - date then time.
 *
 *    RETURNS NULL pointer if error in SMITHDATE; else the
 *    requested conversion
 *
 */
{
   static char string[100];
   int year, month, day;
   int hour, minute, second, millisecond, microsecond;
   char *tz;

   string[0] = '\0';    /* Other routines do appends */
   if (!smithtodate(smptr, &year, &month, &day, &hour, &minute, &second, &millisecond, &microsecond,
         &tz))
   {
      return(NULL);
   }
   if ((style & SMITH_TIMEDATE) == SMITH_TIMEDATE)
   {
      smasctime(string, style, hour, minute, second, millisecond, microsecond);
      smascdate(string, style, year, month, day);
   }
   else
   {
      smascdate(string, style, year, month, day);
      smasctime(string, style, hour, minute, second, millisecond, microsecond);
   }

   return(string);
}


/***************************************************************************/

/* FUNCTION */
static
smascdate(string, style, year, month, day)
char *string;          /* string to append to */
```

BEST AVAILABLE COPY

```
int style;              /* ho to do conversion */
int year, month, day;


/*
 *    This routine converts according to style the date...
 *
 */
{
   boolean fill;         /* if TRUE, need to fill dates... */

   if ((style & SMITH_DATEOFF) == SMITH_DATEOFF)
      return;

   if (*string != '\0')
      strcat(string, " ");

   if ((style & SMITH_DATEFILL) != 0)
      fill = TRUE;
   else
      fill = FALSE;

   if ((style & SMITH_DATEYMD) == SMITH_DATEYMD)
   {
      strcat(string, dtoa(fill, 4, year));
      strcat(string, "/");
      strcat(string, dtoa(fill, 2, month));
      strcat(string, "/");
      strcat(string, dtoa(fill, 2, day));
   }
   else
   {
      strcat(string, dtoa(fill, 2, month));
      strcat(string, "/");
      strcat(string, dtoa(fill, 2, day));
      strcat(string, "/");
      strcat(string, dtoa(fill, 4, year));
   }
}


/***********************************************************************/

/* FUNCTION */
static
smasctime(string, style, hour, minute, second, millisecond, microsecond)
char *string;            /* string to append to */
int style;               /* style of conversion */
int hour, minute, second, millisecond, microsecond;

/*
 *    Append a string based on style and the time parameters to
```

BEST AVAILABLE COPY

```
 *     'string'.  If string has a non-zero length, prefix our string
 *     with a space.
 *
 */
{
    char *hourstr;
    boolean fill;

    if ((style & SMITH_TIMEOFF) == SMITH_TIMEOFF)
        return;      /* Do nothing */

    if (*string != '\0')
        strcat(string, " ");

    if ((style & SMITH_TIMEFILL) == 0)
        fill = FALSE;
    else
        fill = TRUE;


    if ((style & SMITH_TIMEALL) == 0)
        style = SMITH_TIMEHRMNSC;     /* Set up the default */

    if ((style & SMITH_TIME12) != 0)
    {
        /* 12-hour time */
        hourstr = dtoa(fill, 2, hour % 12);
    }
    else
    {
        /* 24-hour time */
        hourstr = dtoa(fill, 2, hour);
    }

    switch(style & SMITH_TIMEALL)
    {
    case SMITH_TIMEHR:
        strcat(string, hourstr);
        break;

    case SMITH_TIMEHRMN:
        strcat(string, hourstr);
        strcat(string, ":");
        strcat(string, dtoa(fill, 2, minute));
        break;

    case SMITH_TIMEHRMNSC:
        strcat(string, hourstr);
        strcat(string, ":");
        strcat(string, dtoa(fill, 2, minute));
        strcat(string, ":");
        strcat(string, dtoa(fill, 2, second));
```

BEST AVAILABLE COPY

```
            break;

        case SMITH_TIMEALL:
            strcat(string, hourstr);
            strcat(string, ":");
            strcat(string, dtoa(fill, 2, minute));
            strcat(string, ":");
            strcat(string, dtoa(fill, 2, second));
            strcat(string, ":");
            strcat(string, dtoa(fill, 3, millisecond));
            strcat(string, ":");
            strcat(string, dtoa(fill, 3, microsecond));
            break;
        }

        if ((style & SMITH_TIMEAMPM) == SMITH_TIMEAMPM)
        {
            /* Append the am/pm indicator */
            if (hour >= 12)
                strcat(string, " pm");
            else
                strcat(string, " am");
        }
    }


    /***********************************************************************/

    /* FUNCTION */
    static char *
    dtoa(fill, numdigits, num)
    boolean fill;           /* if true, we need to fill the string with leading zeroes */
    int numdigits;          /* number of digits needed */
    register int num;       /* number to convert */

    /*
     *    This is a quick conversion of a positive number to a static string.
     *
     * RETURNS      pointer to the static string
     *
     */
    {
        static char string[100];
        register char *ptr;
        register int havedigits = 0;        /* number of digits we have */

        ptr = string + sizeof(string) - 1;
        *ptr-- = '\0';
        do
        {
            *ptr-- = num % 10 + '0';
            num = num / 10;
```

BEST AVAILABLE COPY

```
         havedigits++;
      }
      while (num > 0);

      if (!fill)
         return(ptr + 1);

      /* Need to fill... */
      while (havedigits++ < numdigits)
         *ptr-- = '0';

      return(ptr + 1);
   }


   #ifdef TEST
   /**************************************************************************/

   /* FUNCTION */
   main(argc, argv)
   int argc;
   char *argv[];

   /*
    *    Interactive test of smithisonian routiens
    *
    *    If number of arguments is not zero, we will assume arguments
    *    are smithstore() values and will convert to ascii date...
    *
    *    If there is one argument whose value is '-a', we will convert
    *    interactively-read values using smithtoascii() instead of
    *    internal routines....
    *
    *    If the flag is '-f', the following arguments are file names
    *    to get the access date of & print out
    */
   {
      extern char *strtok();
      int i;
      boolean useascii = FALSE;     /* Default to using internal version */
      int style;
      char specstring[100];
      char *tz;
      struct tm *tmptr;

      static char *dow[] = {"Sunday", "Monday", "Tuesday", "Wednesday", "Thursday",
      "Friday", "Saturday"};

      int year, month, day;
      int hour, minute, second, millisecond, microsecond;
      int year2, month2, day2;
      int hour2, minute2, second2, millisecond2, microsecond2;
```

BEST AVAILABLE COPY

```
    char instring[500];
    char *ptr;
    int doy;    /* day of year */
    SMITHTIME smtime, smtime2, prevtime;
    boolean rval;
    int dayofweek;
    boolean hastime;
    char *store;
    boolean firsttime = TRUE;

    if ((argc == 2) && (strcmp(argv[1], "-a") == 0))
    {
       argc = 0;
       useascii = TRUE;
    }

    if (argc > 1)
    {
       struct stat statbuf;

       if (strcmp(argv[1], "-f") == 0)
       {
          /* List of files - return date of the files */
          for (i = 2; i < argc; i++)
          {
             if (stat(argv[i], &statbuf) != 0)
             {
                perror("Cannot stat file");
                continue;
             }
             smithfromunix(&statbuf.st_mtime, &smtime);
             tmptr = localtime(&statbuf.st_mtime);
             fprintf(stderr, "%s: %s vs %s\n",
                   argv[i],
                   nl asctime(tmptr, "%D %T", 0),
                   smithtoascii(&smtime, SMITH_TIMEHRMNSC | SMITH_TIMEFILL | SMITH_TIME24 |
                   SMITH_DATEMDY | SMITH_DATEFILL));
          }
          exit(0);
       }


       for (i = 1; i < argc; i++)
       {
          if (!smithfromstore(argv[i], &smtime))
          {
             fprintf(stderr, "Conversion of '%s' to smithtime failed\n",
                   argv[i]);
          }
          else
          {
             if (!smithtodate(&smtime, &year2, &month2, &day2, &hour2, &minute2, &second2, &millisecond2,
                   &microsecond2, &tz))
```

BEST AVAILABLE COPY

```
            {
               fprintf(stderr, "smithtodate() failed for %s\n", argv[i]);
            }
            else
            {
               fprintf(stderr, "%02d/%02d/%04d %02d:%02d:%02d (%03d:%03d) %s\n",
                     month2, day2, year2, hour2, minute2, second2, microsecond2, millisecond2,
                     tz);
            }
         }
      }
      exit(0);
   }

   /* Interactive tests... */
   printf("SMITH_MONTH/SMITH_DAY/SMITH_YEAR = %02d/%02d/%04d (%d)\n",
         SMITH_MONTH, SMITH_DAY, SMITH_YEAR, smdaystoday(SMITH_YEAR, SMITH_MONTH, SMITH_DAY));
   if (smdaystoday(SMITH_YEAR, SMITH_MONTH, SMITH_DAY) != SMITH_DAYS_VALUE)
      fprintf(stderr, "ERROR: SMITH_DAYS_VALUE is incorrect!!!!!\n");

   do
   {
      printf("MM/DD/YY [HH:MM:SS:mm:uu]: ");
      fflush(stdout);
      if (gets(instring) == NULL)
      {
         printf("\n");
         exit(0);
      }
      ptr = strtok(instring, " \t/,.");
      if (ptr == NULL)
         continue;
      month = atoi(ptr);

      ptr = strtok(NULL, " \t/,.");
      if (ptr == NULL)
         continue;
      day = atoi(ptr);

      ptr = strtok(NULL, " \t/,.");
      if (ptr == NULL)
         continue;
      year = atoi(ptr);

      hastime = TRUE;

      ptr = strtok(NULL, " \t/,.:");
      if (ptr == NULL)
         goto notime;
      hour = atoi(ptr);

      ptr = strtok(NULL, " \t/,.:");
```

BEST AVAILABLE COPY

```
      if (ptr == NULL)
         goto notime;
      minute = atoi(ptr);

      ptr = strtok(NULL, " \t/,.:");
      if (ptr == NULL)
         goto notime;
      second = atoi(ptr);

      ptr = strtok(NULL, " \t/,.:");
      if (ptr == NULL)
         goto notime;
      millisecond = atoi(ptr);

      ptr = strtok(NULL, " \t/,.:");
      if (ptr == NULL)
         goto notime;
      microsecond = atoi(ptr);

      goto calculate;

   notime:
      hastime = FALSE;
      hour = minute = second = millisecond = microsecond = 0;
      goto calculate;

   calculate:
      doy = smdaystoday(year, month, day) + 1;
      rval = smithfromdate(year, month, day, hour, minute, second, millisecond, microsecond, &smtime);

      if (rval)
      {
         store = smithtostore(&smtime);
         if (!firsttime)
         {
            fprintf(stderr, "Comparison with previous date returns %d\n",
                  smithcmp(&prevtime, &smtime));
         }
         prevtime = smtime;
         firsttime = FALSE;
      }

      dayofweek = (smtime.days + 3) % 7;
      if (useascii)
      {
         while (TRUE)
         {
            printf("Style? (in hex; FFFF to exit loop): ");
            fflush(stdout);
            gets(specstring);
```

BEST AVAILABLE COPY

```
            style = aotoi(specstring);
            if (style == 0xffff)
               break;
            fprintf(stderr, "%X -> '%s'\n", style, smithtoascii(&smtime, style));
         }
         continue;      /* Ask for another day */
      }


      fprintf(stderr, "%02d/%02d/%04d", month, day, year);
      if (hastime)
         fprintf(stderr, " %02d:%02d:%02d:%03d:%03d",
               hour, minute, second, millisecond, microsecond);
      fprintf(stderr, ":\n");
      fprintf(stderr, "   doy = %d\n", doy);
      if (rval)
      {
         fprintf(stderr, "   days= %ld\n", smtime.days);
         fprintf(stderr, "   %s\n", dow[dayofweek]);
         if (hastime)
         {
            fprintf(stderr, "   time = %ld\n", smtime.units);
         }
         fprintf(stderr, "   '%s'\n", store);
         if (!smithfromstore(store, &smtime2))
            fprintf(stderr, "   smithfromstore failed\n");
         else
         {
            if ((smtime.days != smtime2.days) || (smtime.units != smtime2.units))
               fprintf(stderr, "   smithfromstore returned different values\n");
         }
         if (smithtodate(&smtime, &year2, &month2, &day2, &hour2, &minute2, &second2, &millisecond2,
               &microsecond2,  &tz))
         {
            if ((year != year2) || (month != month2) || (day != day2))
            {
               fprintf(stderr, "   ERROR - smithtodate = %02d/%02d/%04d (%s)\n",
                     month2, day2, year2, tz);
            }
            if (hastime)
            {
               if ((hour != hour2) || (minute != minute2) || (second != second2) ||
                     (millisecond != millisecond2) || (microsecond != microsecond2))
               {
                  fprintf(stderr, "   ERROR - smithtodate = %02d:%02d:%02d:%03d:%03d\n",
                        hour2, minute2, second2, millisecond2, microsecond2);
               }
            }
         }
         else
            fprintf(stderr, "   (smithtodate call failed)\n");
      }
```

BEST AVAILABLE COPY

```
         else
            fprintf(stderr, "   (smithfromdate call failed)\n");
      }
      while(TRUE);

   }

   int
   aotoi(ptr)
   register char *ptr;      /* string to convert from hex */
   {
      register int acc = 0;
      register char c;

      while ((c = *ptr++) != '\0')
      {
         acc *= 16;
         if ((c >= '0') && (c <= '9'))
            acc += c - '0';

         if ((c >= 'a') && (c <= 'f'))
            acc += c - 'a' + 10;

         if ((c >= 'A') && (c <= 'F'))
            acc += c - 'A' + 10;
      }
      return(acc);
   }
   #endif TEST
```

Feb 03 15:52 1988  smithdate/stepper.c Page 1

```
   /*
    * FILE     $Header: stepper.c,v 1.1 87/04/22 12:31:10 bae Exp $
    *
    * AUTHOR      Bruce Erickson
    *
    * ONELINER Simpler stepper routine to check out smithfromdate()
    *
    * TABSTOPS 3
    *
    * EXCEPTIONS  For testing purposes only
    *
    * INSPECTED   date     - inspectors
    *
    * RCS      $Log: stepper.c,v $
    * Revision 1.1  87/04/22  12:31:10  12:31:10  bae
    * Initial revision
    *
    *
```

BEST AVAILABLE COPY

```
 */
static char rcsid[] = "$Header: stepper.c,v 1.1 87/04/22 12:31:10 bae Exp $";
#include <stdio.h>
#include <boolean.h>
#include <model.h>
#include "smithdate.h"

#define ISLEAP(y) ((y <= 1752) ? ((y % 4 ) == 0) : ((y % 4 == 0 ) && !((y % 100 == 0) && !(y % 400 == 0))))

/* GLOBALS */

/* STATICS */
static int daysinmonth[] =
   {  31, 28, 31, 30, 31, 30, 31, 31, 30, 31, 30, 31};

/* EXTERNALS */

/* FORWARD */


/*************************************************************************/

/* FUNCTION */
main()

/*
 */
{
   SMITH_DAYS expected, actual;
   SMITHTIME smithtime;
   int errors = 0;
   int year, month, day;
   int year2, month2, day2;
   int t;

   year = SMITH_YEAR;
   month = SMITH_MONTH;
   day = SMITH_DAY;
   expected = 0;

   while(errors < 10)
   {
      /* Calculate the next day */
      day++;

      if (day > dim(year, month))
      {
         day = 1;
         month++;
         if (month > 12)
         {
            month = 1;
```

BEST AVAILABLE COPY

```
                year++;
                if ((year % 10) == 0)
                {
                   printf("Starting %d\n", year);
                   fflush(stdout);
                }
             }
          }
          expected++;

          if (!smithfromdate(year, month, day, 0, 0, 0, 0, 0, &smithtime))
          {
             fprintf(stderr, "smithfromdate() failed at %d/%d/%d\n",
                   month, day, year);
             errors++;
          }

          actual = smithtime.days;

          if (expected != actual)
          {
             fprintf(stderr, "Expected %ld got %ld at %d/%d/%d\n",
                   expected, actual, month, day, year);
             errors++;
          }

          if (!smithtodate(&smithtime, &year2, &month2, &day2, &t, &t, &t, &t, &t))
          {
             fprintf(stderr, "smithtodate() failed at %d/%d/%d\n",
                   month, day, year);
             errors++;
          }

          if ((year2 != year) || (month2 != month) || (day2 != day))
          {
             fprintf(stderr, "Incorrect results from smithtodate.  Expected %d/%d/%d, got %d/%d/%d\n",
                   month, day, year, month2, day2, year2);
             errors++;
          }

       }
    }


    /***************************************************************************/

    /* FUNCTION */
    int
    dim(year, month)
    int year, month;
```

BEST AVAILABLE COPY

```
/*
 *    returns the number of days in this month;
 *
 */
{
   if (month != 2)
      return(daysinmonth[month - 1]);

   if (ISLEAP(year))
      return(29);
   return(28);
}
```

Feb 03 15:53 1988 pp/main.c Page 1

```
/*    FILE      main.c   ($Header: main.c,v 1.51 88/01/27 18:20:19 hmgr Exp $)
 *    AUTHOR    Bruce Erickson
 *
 *       this is the main program for the C official bba program
 *
 * ONELINER main program for C analysis program
 *
 * CONDCOMP INSERTDUMP  if defined, the -DBBA_OPTA nad -DBBA_OPTB options
 *                      are valid (which permit adding -bA_dump() calls)
 *          DOMAIL      if defined we will mail statistics to 'bbacpp'
 *
 * CHANGE LOG:    (operational on dd-mm-yy)
 *
 * dd-mm-yy    name     what
 *
 *
 * RCS $Log:   main.c,v $
 * Revision 1.51  88/01/27  18:20:19  18:20:19  hmgr ()
 * Author: bae@hplsdlc.hp.com
 * Fix the -P and -E problems....
 *
 * Revision 1.50  88/01/25  15:43:30  15:43:30  hmgr ()
 * Author: bae@hplsdlc.hp.com
 * Respond to cc68000 problem with double dollar-signs
 *
 * Revision 1.49  88/01/15  15:18:44  15:18:44  hmgr ()
 * Author: bae@hplsdlc.hp.com
 * If no -g, do not emit CURRENT_DATA pragma
 *
 * Revision 1.48  87/11/30  09:14:29  09:14:29  hmgr ()
 * Author: bae@hplsdlc.hp.com
 * no comment
 *
 * Revision 1.47  87/11/24  13:01:26  13:01:26  hmgr ()
```

BEST AVAILABLE COPY

```
 * Author: bae@hplsdlc.hp.com
 * no longer default to 'bbaconst' and 'bbadata' for
 * sections; if user wants them, he must specify with -DBBA_OPT[cd]
 *
 * Revision 1.46  87/11/23  09:46:07  09:46:07  hmgr ()
 * Author: bae@hplsdlc.hp.com
 * removed unused function 'addquotes'
 *
 * Revision 1.45  87/11/18  17:13:11  17:13:11  hmgr ()
 * Author: bae@hplsdlc.hp.com
 * Catch SIGSEGV and exit with syntax error...
 *
 * Revision 1.44  87/11/18  10:37:51  10:37:51  hmgr ()
 * Author: bae@hplsdlc.hp.com
 * added -C debug option
 *
 * Revision 1.43  87/11/06  08:49:58  08:49:58  hmgr ()
 * Author: bae@hplsdlc.hp.com
 * added AxLS's options (-Wn, -ghw).
 *
 * Revision 1.42  87/11/03  08:47:24  08:47:24  hmgr ()
 * Author: bae@hplsdlc.hp.com
 * update to AxLS's cpp
 *
 * Revision 1.40  87/10/14  15:07:33  15:07:33  hmgr ()
 * Author: bae@hplsdlc.hp.com
 * Cleaned up cppoptions & associated junk.  Removed hidden ability
 * to add -I. via a #define
 *
 * Revision 1.39  87/09/01  14:38:15  14:38:15  hmgr ()
 * Author: bae@hplsdlc.hp.com
 * changed default sections from uppercase to lowercase
 *
 * Revision 1.38  87/08/31  14:25:59  14:25:59  hmgr ()
 * Author: bae@hplsdlc.hp.com
 * added debug system to permit security string specification
 *
 * Revision 1.37  87/08/28  17:31:52  17:31:52  hmgr ()
 * Author: bae@hplsdlc.hp.com
 * allow stdout to be a stream
 *
 * Revision 1.36  87/08/28  17:08:57  17:08:57  hmgr ()
 * Author: bae@hplsdlc.hp.com
 * added sections for AXLS stuff
 *
 * Revision 1.35  87/08/27  15:39:39  15:39:39  hmgr ()
 * Author: bae@hplsdlc.hp.com
 * Corrected the way specreceive is used to reflect reality...
 *
 * Revision 1.34  87/08/24  19:53:00  19:53:00  hmgr ()
 * Author: bae@hplsdlc.hp.com
 * change circular buffer from being fixed length to being variable length
```

BEST AVAILABLE COPY

```
 *
 * Revision 1.33  87/08/17  16:25:25  16:25:25  hmgr ()
 * Author: bae@hplsdlc.hp.com
 * depend on run-time selection of processor specifics instead of compile time
 *
 * Revision 1.32  87/07/30  13:00:29  13:00:29  hmgr ()
 * Author: bae@hplsdlc.hp.com
 * when illegal flag used, error message was messed up
 *
 * Revision 1.31  87/07/29  13:36:17  13:36:17  hmgr ()
 * Author: bae@hplsdlc.hp.com
 * Changed error return from getopt to be a warning, in keeping
 * with what cpp(1) does for unknown options
 *
 * Revision 1.30  87/07/10  10:29:55  10:29:55  hmgr ()
 * Author: bae@hplsdlc.hp.com
 * no comment
 *
 * Revision 1.30  87/07/01  12:42:12  12:42:12  bae (Bruce Erickson)
 * Undo the brfinput stuff
 *
 * Revision 1.29  87/05/08  10:22:03  10:22:03  bae (Bruce Erickson)
 * added the -O=a option
 *
 * Revision 1.28  87/05/06  11:59:01  11:59:01  bae (Bruce Erickson)
 * Passes Plum Hall conformance test
 *
 * Revision 1.27  87/04/30  16:47:47  16:47:47  bae (Bruce Erickson)
 * added BBA_OPT and BA_OPT both for option setting
 *
 * Revision 1.26  87/04/16  15:29:17  15:29:17  bae (Bruce Erickson)
 * added flags for -O options.
 * call tsprintdecl() after the end of yyparse()
 *
 * Revision 1.25  87/04/14  16:09:36  16:09:36  bae (Bruce Erickson)
 * Added control for options 'adddefault' and 'doemptycases'
 * Also added -OA option
 * Changed all exit calls to myexit calls
 * Save path name before we call cpp, because cpp mangles it and we
 * need it for error reporting later.
 * Beefed up the usage message
 *
 * Revision 1.24  87/04/01  16:17:54  16:17:54  bae (Bruce Erickson)
 * works with 'if', 'else', 'else-less-if', 'while', 'for'
 *
 * Revision 1.23  87/03/26  11:25:44  11:25:44  bae (Bruce Erickson)
 * Completely removed all remnants of 'analc' stuff.
 * added some debug flags.
 * fixed docppswap() routine, which failed on the line bbacpp infile outfile -DD
 * invoke cpp with the file name the user requested, instead of
 * the absolute path name.
 * added call to target specific initiailzation and map initialization.
```

BEST AVAILABLE COPY

```
 *
 *
 * Revision 1.1  85/04/16  08:14:22  bae
 * Initial revision
 *
 */
static char *rcsid = "$Header: main.c,v 1.51 88/01/27 18:20:19 hmgr Exp $";
#include <stdio.h>
#include <boolean.h>
#include <ctype.h>
#include <signal.h>
#include <model.h>
#include "ba.h"
#include "csym.h"
#include "probe.h"
#include "targetspec.h"

/* EXTERNALS */
extern char *fhpname();
extern boolean spreceive();
extern void printcpptext();
extern u_int32 clastcppbyte();
extern char *strdup();
extern void tsinit();
extern char *strcpy();
extern char *strchr();
extern char *strcat();
extern void perror();
extern char *strpbrk();
extern char *strncpy();
extern char *malloc();
extern char *realloc();
extern void free();
extern FILE *popen();
extern char *getenv();
extern char *fnametopath();
extern boolean bbanoansii;
extern boolean bbanowarnings;

#ifdef DOMAIL
   extern boolean testmail();
#endif

extern char *strappend();
extern char *strrchr();

extern cleanup();    /* signal catching routine and general cleanup */
extern mscleanup();


char homedir[MAXPATH];     /* directory we were invoked in */

```

BEST AVAILABLE COPY

```
/* GLOBALS */
char invokedname[MAXFNAME];/* The name we are invoked with, i.e. "cpp" or "bacpp" */

char sourcedir[MAXPATH];          /* directory that the program we are analyzing
                                     is in */
char sourcepath[MAXPATH];         /* full path of the program we are analyzing */
static char sourcebase[MAXFNAME];   /* base of file name */
int sourcenum;                    /* symbol number of the source file */

FILE *finput = NULL;        /* the post-process version of the C program */
char *ninput;               /* name of the post-process output */

char ntempcpp[MAXPATH];     /* the name of the cpp output */

FILE *fba;                  /* output branch analysis stream */
char *nba;                  /* name of branch analysis output file */

FILE *fmap;                 /* map file's stream pointer */
char nmap[MAXPATH];         /* name of the map file */

char **cppargv;          /* accumulation of cpp arguments */
int cppargc = 0;         /* number of strings in cppargv - actually,
                            the number of ENTRIES in cppargv + 1,
                            because one is for a NULL entry... */

char mapsuffix = 'M';       /* the suffix for map files.... normally 'm' */

/* Stuff dealing with the AXLS compiler stuff directly */
char *datasection = "";       /* default data section (i.e., use file's data section) */
char *constsection = "";      /* default constant section (i.e., use file's const section) */

/* switches for options */
boolean passcomments = FALSE; /* if TRUE, and if wantbfa, we will pass comments
                                 to the output (i.e., the user wanted -C) */
boolean nolinedirectives = FALSE;   /* if TRUE, -P was used - do not insert
                                       # <line> directives */
boolean docomments = FALSE;   /* if TRUE, we must parse comments */
boolean genmapfile = TRUE;    /* if TRUE, generate map file ... */
int tabs = 8;                 /* tabs should be.... */
boolean adddefault = FALSE;   /* add defaults if no defaults yet */
boolean doemptycases = FALSE;    /* handle cases with no executable statements */
boolean do3for = FALSE;       /* handle the 3rd expression of a for loop */
boolean doelses = FALSE;      /* handle else-less if statements */
boolean dodo = FALSE;         /* check conditional's of do loops */
boolean docondassign = FALSE; /* check conditional assignments */
boolean dowhile = FALSE;      /* check if while loop not executed */
boolean usetempvars = FALSE;  /* set to TRUE when an option is chosen
                                 that may generate temporary variables */
boolean allowbavars = FALSE;  /* if TRUE, allow the user to specify _bA_*
                                 variables without warnings */
```

BEST AVAILABLE COPY

```
boolean insertdump = FALSE;    /* if TRUE, insert _bA_dump() calls */
char *moreinsert[20] = { NULL};  /* list of more insertion requests via
                                    the -DBBA_OPTB<funcname> option */
boolean keepfiletimes = FALSE;   /* if TRUE, user specified -g option */


PROBETYPE probemask = (PROBETYPE) 0;    /* mask of all possible probe types */
boolean exitwitherror = FALSE;          /* set to TRUE when we want to exit with
                                           an error */

/* debug flags */
boolean debuginput = FALSE;
boolean debugsym = FALSE;
boolean debugcppread = FALSE;
boolean debugnoinsertion = FALSE;
boolean debugmapcol = FALSE;
boolean debugislabeldef = FALSE;
boolean debugprobes = FALSE;
int startdebug = -1;        /* if > 0, start debug when master file = this
                               line */
boolean startyy = FALSE;    /* if TRUE, yydebug will start up when startdebug
                               occurs */
boolean debugfind = FALSE;
/* ENDGLOBALS */

/* STATICS */
static char *testspec = NULL;    /* if the user has defined a specification
                                    file to be used instead of the system
                                    spec file
                                 */
static char *testsecstring = NULL;
static char ntmpout[MAXPATH] = {'\0'};     /* if user invokes use wanting output to
                                    stdout, we will write to this file then
                                    copy this file to stdout
                                    Otherwise, this is named '', and we write
                                    directly to what he specified
                                 */
static boolean nodefaultsearch = FALSE;   /* only if -J option; don't search /usr/include */
static boolean debugcpp = FALSE;          /* debug cpp itself */


/******************************************************************************/


/* FUNCTION */
int
main(argc, argv)
int argc;
char *argv[];

/* Parameters: - usual meanings
 *
```

BEST AVAILABLE COPY

```
 *     This routine handles the command line.  Then, the rest
 *     of the line is a list of files to preprocess
 *
 *     Any options recognized as being cpp options are accumulated in
 *     "cppargv"
 *
 *     Because sometimes cpp is invoked as
 *        cpp infile [outfile] [options]
 *     we will check to see if the first one or two "options"
 *     do not have dashes ("cc" sends cpp the arguments "ifile" "ofile" "options"
 *     - what a pain!)
 *
 *     If a -DBA_OPTxxxxx string is found, we will act as if xxxxxx is a
 *     regular option... (omit the leading "-".  For example, to set the
 *     -V option using this as a C preprocessor, add
 *        -DBA_OPTV
 *
 *     Debug options are set via the Ba_debuG shell variable as:
 *        "[sicnmpl] [S='<file>'] y=%d"
 *           s -> debugsym
 *           i -> debuginput
 *           c -> debugcppread
 *           n -> debugnoinsertion
 *           m -> debugmapcol (only if debugcppread)
 *           p -> debugprobes
 *           l -> debugislabeldef
 *           y= -> set startyy to TRUE, and set startdebug to %d
 *        (see function 'setdebug', below)
 *           S -> specification file is <file> (<file> must be a full path)
 *
 * RETURN    0 if all went smoothly
 *
 */
{
    /* externals that only this routine will use */
    extern int optind;        /* argv[optind] is the NEXT option to be
                                 processed */
    extern char *optarg;      /* start of the option argument (character) */
    int c;                    /* return from getopt() */
    char invokeddir[MAXPATH];
    boolean repeatcheck;      /* set to TRUE when a -DBA_OPT is found */
    int i;                    /* general index */
    boolean verboseoptions;   /* set with the -V option, this tells how
                                 cpp will be initialized */
    static char optstring[] = "AB:CD:EH:I:JM:N:O:PSTU:Vbc:d:ghp:s:vw";
    boolean alloptions;       /* if -O=A is used ... */
    char *ptr;
    char *specbase;           /* specification base file name */
    static int lineskeep = -1; /* default number of lines to keep (-1 -> use default) */
    boolean nowarnrequested = FALSE; /* set to TRUE if -w requested */
    boolean noansiirequested = FALSE;    /* set to TRUE if -h found */
    boolean forcestdout = FALSE;         /* set to TRUE if -E option */
```

BEST AVAILABLE COPY

```
#   ifdef DOMAIL
       if (!testmail("bbacpp", TRUE))
          exit(1);
#   endif

    verboseoptions = FALSE;

    /* Set any debug options */
    setdebug();

    /* Set probemask to all of the default probes */
    probemask = PT_FUNCTION | PT_IF | PT_ELSE | PT_WHILE | PT_FOR | PT_DEFAULT |
                PT_CASE | PT_LABEL;

    /* find out invoked name and directory */
    splitfname(argv[0], invokeddir, invokedname);
    argv[0] = invokedname;      /* force getopt to not use a path */

    /* And also the curren working directory... */
    getcwd(homedir, sizeof(homedir));

    /* In case the bozo who invoked us uses the form
          cpp infile outfile options
       swap the stuff around...
    */
    docppswap(argc, argv);

    /* Generate the first parts of the arguments for cppmain.  Do it
       before parsing options so that if the user specified any
       options they can be added to AFTER these options */
    addcppoption("cpp");

    /* always force the -C to retain column information */
    addcppoption("-C");
    addcppoption("-g");      /* add debug info (including macro expansions) */


    while ((c = getopt(argc, argv, optstring)) != EOF)
    {
       do
       {
          repeatcheck = FALSE;
          switch(c)
          {
#         ifdef INSERTDUMP
             case 'A' :  insertdump = TRUE;
                         break;
             case 'B' :  /* Find place in 'moreinsert' array */
                         for (i = 0; i < (sizeof(moreinsert) / sizeof (char *)) - 1; i++)
                         {
```

BEST AVAILABLE COPY

```
                    if (moreinsert[i] == NULL)
                    {
                       moreinsert[i] = optarg;
                       break;      /* It is a shame I can't also break
                                        out of the switch tool */
                    }
                 }
                 if (i >= (sizeof(moreinsert) / sizeof(char *)) - 1)
                 {
                    fprintf(stderr, "%s: too many -B options (%s ignored)\n",
                          invokedname, optarg);
                 }
                 break;
#        endif

         case 'c'    :   constsection = optarg;
                         break;

         case 'd'    :   datasection = optarg;
                         break;

         case 'M'    :   mapsuffix = *optarg;
                         break;

         case 'O'    :   ptr = optarg;
                         if (*ptr == '=')
                            ptr++;          /* don't need it, so toss it */

                         alloptions = FALSE;
                         while ((c = *ptr++) != '\0')
                         {
                            switch(c)
                            {
                            /* The following options are non public */
                            case 'K' :     /* Turn off warnings about use of
                                                branch analysis variables */
                               allowbavars = TRUE;
                               break;

                            /* The options from here down are public */
                            case 'A' :     /* Turn on all options */
                               alloptions = TRUE;
                               /* Fall thru */
                            case 'a' :     /* Deal with conditional assignments */
                               docondassign = TRUE;
                               probemask |= PT_CATRUE | PT_CAFALSE;
                               if (!alloptions)
                                  break;
                               /* Fall thru if -O=A used */
                            case 'd' :
                               dodo = TRUE;
                               probemask |= PT_DOTRUE | PT_DOFALSE;
```

BEST AVAILABLE COPY

```
                    if (!alloptions)
                        break;
                    /* Fall thru if -O=A used */
                case 'e' :      /* Handle empty case statements */
                    doemptycases = TRUE;
                    probemask |= PT_EMPTYCASE | PT_EMPTYDEFAULT;
                    if (!alloptions)
                        break;
                    /* Fall thru if -O=A used */
                case 'f' :      /* handle 3rd expression in for loop */
                    do3for = TRUE;
                    probemask |= PT_3FOR;
                    if (!alloptions)
                        break;
                    /* Fall thru if -O=A used */
                case 'i' :      /* handle else-less if statements */
                    doelses = TRUE;
                    probemask |= PT_IELSE;
                    if (!alloptions)
                        break;
                    /* Fall thru if -O=A used */
                case 's' :      /* put in default if not already there */
                    adddefault = TRUE;
                    probemask |= PT_IDEFAULT;
                    if (!alloptions)
                        break;
                    /* Fall thru if -O=A used */
                case 'w' :      /* check for while loops not executed */
                    dowhile = TRUE;
                    probemask |= PT_WHILENOT;
                    usetempvars = TRUE;
                    break;

                    /* Don't fall thru, even if -O=A was used */
                default :
                    usage();
                    myexit(1);
                }
            }
            break;

case 'p'    :   lineskeep = atoi(optarg);
                break;

case 'S'    :   genmapfile = FALSE;
                break;

case 'V'    :   verboseoptions = TRUE;
                break;

/* cpp options */
case 'E'    :   /* Same as -P, but cc68020 will force '-' as the output */
```

BEST AVAILABLE COPY

```
                                forcestdout = TRUE;
                                /* FALL THRU */

                case 'P'    :   addcppoption("-P");
                                nolinedirectives = TRUE;
                                break;

                case 'C'    :   passcomments = TRUE; /* we want to preserve comments */
                                break;      /* already included */

        /*      case 'H'    :
        /*                      addcppoption(strappend(strdup("-H"), optarg));
        /*                      break; */

                case 'N'    :   /* AxLS: set maxline */
                                addcppoption(strappend(strdup("-N"), optarg));
                                break;

                case 'U'    :
                                addcppoption(strappend(strdup("-U"), optarg));
                                break;

                case 'D'    :   /* is this a -DBA_OPT string? */
                                if (strncmp(optarg, "BBA_OPT", 7) == 0)
                                {
                                   c = *(optarg + 7);
                                   optarg += 8;
                                   repeatcheck = TRUE;
                                }
                                else
                                {
                                   /* Check the alternate invocation */
                                   if (strncmp(optarg, "BA_OPT", 6) == 0)
                                   {
                                      c = *(optarg + 6);
                                      optarg += 7;
                                      repeatcheck = TRUE;
                                   }
                                   else
                                      addcppoption(strappend(strdup("-D"), optarg));
                                }
                                break;

                case 'I'    :
                                addcppoption(strappend(strdup("-I"), optarg));
                                break;

                /* The cpp code has a -J flag which prevents "/usr/include" from
                   being searched.  We will quietly do the same thing...
                */
                case 'J'    :   nodefaultsearch = TRUE;
                                break;
```

```
/*        case 'T'    :  addcppoption("-T");
/*                       break; */

          case 'g'    :  keepfiletimes = TRUE;   /* AxLS: add date/time information & CURRENT_DATE */
                         /* addcppoption("-g"); (this is forced) */
                         break;

          case 'h'    :  noansiirequested = TRUE;      /* AxLS: host equilavence option */
                         break;

          case 'w'    :  nowarnrequested = TRUE;    /* AxLS: suppress warnings */
                         break;

          /* NOTE: cpp just complains w/o failing when a bad flag is found */
          default     :  fprintf(stderr, "%s: unknown flag %s\n",
                                invokedname, argv[optind - 1]);
                         break;
          }
      }
      /* need to repeat switch if -DBA_OPTxxxx was found */
      while (repeatcheck);
   }

   /* Read in the specification file.
      To understand which one it is, read the security string
      and (if it is available) us it as the basename...
      The exception to this rule is if the string
      "testspec" is defined, open the file specified there
   */
   if (testspec == NULL)
   {
      /* Not doing testing.... */
      if (!spreceive(&specbase))
      {
         /* We are not running from an AXLS compiler....  Assume it is
            host
         */
         specbase = "";
      }
      else
      {
         /* 1/25/88:
            The currently shipping 68000 compiler sends down
               $$a\002\03368000
            This will be fixed in the next release... but for now,
            let's kludge this in order to ship the bba68000 w/o shipping
            a re-realesed 68000 complier...
         */
         if (strncmp(specbase, "$$", 2) == 0)
            specbase++;    /* show only 1 dollar-sign */
```

BEST AVAILABLE COPY

BEST AVAILABLE COPY

```
            /* Check that the first 4 characters are the bizarre stuff... */
            if (strncmp(specbase, "$a\002\033", 4) != 0)
            {
               fprintf(stderr, "%s: incorrect parent process\n", invokedname);
               exit(1);
            }
            specbase += 4;     /* point at processor name */
         }
      }
      else
      {
         /* testing.... */
         specbase = testspec;
      }

      /* And do the actual reading of the specification file */
      if (!bbareadspec(specbase, TRUE, (testspec == NULL) ? specbase : testsecstring))
      {
         /* Sorry! */
         exit(1);
      }

      /* If bbanoansii or noansiirequested, go ahead and add the -h option */
      if (bbanoansii || noansiirequested)
         addcppoption("-h");

      /* If bbanowarnings or nowarnrequested, go ahead and add the -w option */
      if (bbanowarnings || nowarnrequested)
         addcppoption("-w");


      if (verboseoptions)
      {
         for (i = 0; i < cppargc; i++)
            fprintf(stderr,"%s ", cppargv[i]);
         fprintf(stderr, "\n");
      }

      /* set up to catch signals */
      if (signal(SIGINT, cleanup) == SIG_IGN)
         signal(SIGINT, SIG_IGN);
      if (signal(SIGHUP, cleanup) == SIG_IGN)
         signal(SIGHUP, SIG_IGN);

      /* There are some bizarre syntax errors that will cause
         us to simply croak.... */
      signal(SIGSEGV, mscleanup);

      /* always respond to a SIGTERM */
      signal(SIGTERM, cleanup);

      /* Initialize the cpplines buffer stuff (with the value of lineskeep) */
```

BEST AVAILABLE COPY

```
    cpplinesinit(lineskeep);

    /* If no output file specified, output file to stdout.
       If he specified an output file, ship to that...
    */

    if (forcestdout || ((optind + 1) == argc) || (strcmp(argv[optind + 1], "-") == 0))
    {
       /* Only specified an input name, used "-E', or output is "-".  Stdout goes to yet-another-temporary
          file, whose output is then going to be copied to stdout
       */
       gentempfile('S', ntmpout, &fba);
       nba = NULL;
    }
    else
    {
       /* Must have specified an output file */
       nba = argv[optind + 1];
       fba = fopen(nba, "w");
       if (fba == NULL)
       {
          fprintf(stderr, "%s: could not open %s for output\n",
                invokedname, nba);
          cleanup(1);
       }

       /* Set the output name to NULL in the argv list, so that
          the processfiles routine does not attempt to use it
          for input! */
       argv[optind + 1] = NULL;
       argc--;
    }

    /* Start the process.... */
    doanal(argv[optind]);

    if (ntmpout[0] != '\0')
    {
       /* OK, copy this file to stdout now */
       copyoutput();
    }

    if (debugsym || debugcppread)
    {
       cdumpsym(TRUE);
    }

    /* Everything must have been A-OK */
    cleanup(0);
}
```

BEST AVAILABLE COPY

```
/****************************************************************************/

/* FUNCTION */
docppswap(argc, argv)
int argc;
char *argv[];

/*
 *    This routine is called when we are doing a cpp.
 *    There are two ways cpp is called:
 *
 *       cpp [options] [infile [outfile]] (approved)
 *       cpp [infile [outfile]] [options] (ugh - but often used)
 *
 *    This routine will force infile/outfile to be the last
 *    one or two arguments...
 */
{
#  define SWAPARGV(i,j) temp = argv[j]; argv[j] = argv[i]; argv[i] = temp
   register char **argscan;
   char *temp;

   /* First test:  If none of the arguments have a "-", do nothing */
   for (argscan = argv + 1; *argscan != NULL; argscan++)
      if (**argscan == '-')
         break;

   if (*argscan == NULL)
   {
      /* Found absolutely no arguments with dashes... */
      return;
   }

   /* Some arguments had dashes... */
   if (*argv[1] != '-')
   {
      /* At least the first argument is a file name... */
      if ((*argv[2] != '-') || (argv[2][1] == '\0'))
      {
         /* First two arguments are file names!  ("-" means stdout)... Move them over */
         /* Subtlety note:  You *must* swap #2 & last, then #1 and second-to-last.
            Consider the following cases:
               ifile ofile option1 option2 option3
               ifile ofile option1 option2
               ifile ofile option

               Correct method:
                  i o o1 o2 o3 -> i o3 o1 o2 o -> o2 o3 o1 i o  (OK)
                  i o o1 o2    -> i o2 o1 o    -> o1 o2 i o     (OK)
                  i o o1       -> i o1 o       -> o1 i o        (OK)

               If you try "#1 and second-to-last, then #2 and last:
```

BEST AVAILABLE COPY

```
                        i o o1 o2 o3 -> o2 o o1 i o3 -> o2 o3 o1 i o  (OK)
                        i o o1 o2    -> o1 o i o2    -> o1 o2 i o     (OK)
                        i o o1       -> o i o1       -> o o1 i        (BAD)
            */
            SWAPARGV(2, argc - 1);
            SWAPARGV(1, argc - 2);
        }
        else
        {
            /* Only the first argument is a file name */
            SWAPARGV(1, argc - 1);
        }
    }
#   undef SWAPARGV
}



/*************************************************************************/


/* FUNCTION */
/* NO RETURN VALUE */
doanal(fname)
char *fname;        /* program to analyze; the filename the user used */

/*
 *      This routine:
 *          generates the path name of 'fname', and copies that to
 *          sourcepath.  Then it is re-split into sourcedir and sourcebase.
 *
 *          Then cpp is run; if it returns with a non-zero return code,
 *          we will exit (unless in debufcppread mode).
 *
 *          We then open cpp's output file as "finput", calls
 *          some initilization routines,
 *          and calls the parser (which takes control from there).
 *
 */
{
    char path[MAXPATH];  /* absolute path of file */
    char savefname[MAXFNAME];  /* fname - saved because cpp destroyes it */
    int cpprvalue;        /* cpp's return value */

    /* file of input is "fname" */
    ninput = fname;

    /* Copy fname to savefname, because cpp will destroy it */
    strcpy(savefname, fname);

    /* Get the full path of the file into "path" */
    if (*fname != '/')
```

BEST AVAILABLE COPY

```
        strcpy(path, fnametopath(homedir, fname));
    else
        strcpy(path, fname);

    strcpy(sourcepath, path);          /* get global copy of C file */
    splitfname(path, sourcedir, sourcebase);

    /* Execute cpp.  Pass it the user's fname */
    if ((cpprvalue = runcpp(fname)) != 0)
    {
        if (!debugcppread)
            cleanup(cpprvalue);
        fprintf(stderr, "CPP EXITED WITH VALUE %d\n", cpprvalue);
        exitwitherror = TRUE;
    }

    /* Open cpp's output file as finput */
    finput = fopen(ntempcpp, "r");
    if (finput == NULL)
    {
        fprintf(stderr, "%s: pass2 could not open pass1's output file\n",
                invokedname);
        cleanup(1);
    }

    cinitsyms();

    tsinit(savefname);          /* initialize any target-specific stuff */

    wmapinit();

    /* put the master file into the symbol table.  Note that we will use
       the full path name for this! */
    sourcenum = caddsym(FALSE, sourcepath, M_FILE);
    wmapsource(sourcenum, sourcepath);      /* add to map file */

    /* If we are checking/debugging cpp & reading, simply run it.. */
    if (debugcppread || debugnoinsertion)
    {
        while(yylex() != -1)
            /* empty statement */;
        if (debugnoinsertion)
        {
            printcpptext(clastcppbyte());
        }
        return;
    }

    /* NOTE:
       If -P was passed to the pre-processor, it will not give us the
       'First_Line_Directive'.
       Therefore, put the array declaration out now!
```

BEST AVAILABLE COPY

```
    */
    if (nolinedirectives)
    {
       tsinsertarraytype("", NULL);
    }


    /**************************************************************************/
    /*    Parse the cpp output and add branch information                    */
    /**************************************************************************/

    if ((yyparse() != 0) || exitwitherror)
    {
       /* fprintf(stderr,"%s: Error in parsing file %s\n", invokedname, savefname); */
       cleanup(1);
    }
    fclose(finput);

    /* Append the actual storage for the analysis arrays and structure decl.
       Note that no output to fba should occurr after this is called...
    */
    tsprintdecl();

    /* clearsyms(); - only needed when we do more than one file at a time */

    return;
}


/**************************************************************************/

/* FUNCTION */
static
addcppoption(newopt)
char *newopt;

/*
 *     This routine adds the string "newopt" to
 *     the options for cpp.  It allocates more room as necessary,
 *     and increments cppargc.  It does *not* create
 *     a copy of the string newopt, so you must make certain
 *     it is not destroyed nor modified
 *
 *     WARNING to users:  cpp (as it stands now) cannot deal
 *     with spaces between -I and <dir>, etc.  This is because
 *     it does not use getopt(3)
 */
{
#  define INCCPP 10     /* allocate cppargv in these chunks */

    if ((cppargc % INCCPP) == 0)
    {
```

BEST AVAILABLE COPY

```
      if (cppargc == 0)
      {
         /* First one! */
         cppargv = (char **) malloc(sizeof(char *) * (INCCPP + 1));
      }
      else
      {
         cppargv = (char **) realloc(cppargv, sizeof(char *) * (cppargc + INCCPP + 1));
      }
   }

   cppargv[cppargc++] = newopt;
   cppargv[cppargc] = NULL;
}


/***************************************************************************/

/* FUNCTION */
runcpp(fname)
char *fname;              /* program to run cpp on */

/*
 *    This routine packages up a command for cpp, and then
 *    executes the cpp routine.  It will open the input file,
 *    and place the output in a temporary file.
 *    The name of the temorary file will be placed in ntempcpp[]
 *
 *    Package up argv[] for the cpp
 *    cppargv[0] is already "cpp"
 *    cppargv[...] are options (like -C, etc)
 *             [cppargc+1] should be the inputfile
 *             [cppargc+2] should be the outputfile
 *
 *    return: the return value of cpp....
 */
{
   static char *dirinc = NULL;      /* the "-I<dirname" */
   int cpprvalue;
   extern FILE *outfile;            /* cpp will open this */
   extern boolean is_error;         /* cpp sets this to TRUE */
   extern char *get_output_line();
   char *line;
   int index;
   char *path;

   /* Generate the temporary file name */
   gentempfile('P', ntempcpp, (FILE **) NULL);

   addcppoption(fname);        /* input file */
   addcppoption(ntempcpp);     /* output file */
```

BEST AVAILABLE COPY

```
    /* Add in the paths... */
    if (!nodefaultsearch)
    {
       for (index = 0; (path = bbaincldirs[index]) != NULL; index++)
       {
          /* If the path is not absolute, use fhpname to convert */
          if (*path != '/')
             path = fhpname(path, NULL);
          add_search_path(path);
       }
    }

    for (index = 0; bbapredefs[index] != NULL; index++)
    {
       add_define(bbapredefs[index], "1", FALSE, 0);
    }

    optind = 1;     /* restart getopt */

    startup(cppargc, cppargv);     /* Do the preprocessing */
    while ((line = get_output_line()) != NULL)
    {
       if (debugcpp)
          fprintf(stderr, "CPP: %s", line);
       fputs(line, outfile);
    }

    fclose(outfile);

    if (is_error)
       return(1);
    return(0);
 }


 /***********************************************************************/

 /* FUNCTION */
 mscleanup()

 /*
  *    Called when we get a segment violation...
  *
  */
 {
    cerror("Too many syntax errors");
    cleanup(1);
 }



 /***********************************************************************/
```

BEST AVAILABLE COPY

```


/* FUNCTION */
/* NO RETURN VALUE */
cleanup(reason)
int reason;    /* if 0, end of program.  If non-zero, we caught a signal */

/*
 *    This routine is called after all routines are finished
 *    executing.  It:
 *       if a cpp temp file exists, it will be deleted
 *       exit with reason
 *
 */
{
   if (ntempcpp[0] != '\0')
      unlink(ntempcpp);

   if (ntmpout[0] != '\0')
      unlink(ntmpout);

   myexit(reason);
}



/**********************************************************************/


/* FUNCTION */
char *
strappend(s1, s2)
char *s1;         /* string to append s2 to */
char *s2;         /* the second string */

/*
 *    this routine will append string s2 to string s1, after first
 *    expanding s1 appropriately with realloc.
 *
 * RETURN   address of concated string
 */
{
   int length;
   length = strlen(s1) + strlen(s2) + 1;
   s1 = realloc(s1, length);
   strcat(s1, s2);
   return(s1);
}



/**********************************************************************/
```

BEST AVAILABLE COPY

```
/* FUNCTION */
/* NO RETURN VALUE */
splitfname(fname, path, base)
char *fname;       /* full file name */
char *path;        /* place to put path-part of file.  */
char *base;        /* place to put file-name part of file */

/*
 *    This routine will split fname into a path and a base.
 *    If no path is given, path will be a zero-length string
 *
 */
{
   char *ptr1;

   /* get the path */
   if ((ptr1 = strrchr(fname, '/')) == NULL)
   {
      *path = '\0';     /* 'taint no path */
      strcpy(base, fname);
   }
   else
   {
      strncpy(path, fname, ptr1 - fname);
      path[ptr1 - fname] = '\0';
      strcpy(base, ptr1 + 1);
   }
   return;
}


/***********************************************************************/


/* FUNCTION */
/* NO RETURN VALUE */
gentempfile(character, name, fptr)
char character;      /* character seperating this temp file from the
                        others */
char *name;          /* address to put full name of this temp file */
FILE **fptr;         /* address to put file pointer.  If NULL, do not
                        attempt to open the file. */

/*
 *    This creates a file name of the type
 *       /usr/tmp/analct[character][pid]
 *    and copies it to the user-supplied string "name".
 *
 *    The user must be cautious about the [character]!!!.
```

BEST AVAILABLE COPY

```
 *
 *     If fptr is non-NULL, we will
 *     try to open it for writing.  If it fails, this prints
 *     an error message and exits with a value of 2.  Else, this
 *     sets up fptr and returns.
 *
 */
{
   sprintf(name, "/usr/tmp/analct%c%05d", character, getpid());

   if (fptr != NULL)
   {
      *fptr = fopen(name, "w");
      if (*fptr == NULL)
      {
         perror("Could not open temporary file");
         myexit(2);
      }
   }
}


/* /***********************************************************************/
/*
/*
/* /* FUNCTION */
/* static char *
/* addquotes(string)
/* char *string;
/*
/* /* Parameters:
/*  *     string   -  This is assumed to be a string which will be
/*  *                 sent to a shell.  This routine will quote any
/*  *                 ofthe following characters:
/*  *                    \ " ' $
/*  *
/*  * RETURN   address of new string, with quotes added correctly
/*  *
/*  */
/* {
/*    char *newstring;
/*    register char *src;
/*    register char *dest;
/*
/*    if (strpbrk(string, "\\\"\'\$") == NULL)
/*       return(string);      /* no substitutions necessary */
/*
/*    /* maximum length of new string is 2 * number of characters in string
/*       + 1 for \0 */
/*    newstring = malloc((2 * strlen(string)) + 1);
/*    src = string;
/*    dest = newstring;
```

BEST AVAILABLE COPY

```
/*
/*     while (*src != '\0')
/*     {
/*        if (strchr("\\\"\'\$", *src) != NULL)
/*           *dest++ = '\\';
/*        *dest = *src;
/*        dest++;
/*        src++;
/*     }
/*     *dest = '\0';
/*
/*     free(string);
/*     return(newstring);
/* } */


/***********************************************************************/


/* FUNCTION */
/* NO RETURN VALUE */
usage()

/*
 *     simply print usage message for this
 *
 */
{
   fprintf(stderr,
      "usage: %s [options] infile [outfile]\n", invokedname);
   fprintf(stderr, "\t-P -C -Uname -Dname -T -Idir -Hnnn\n");
   fprintf(stderr, "\t-Bfuncname -E -Mc -plines\n");
   fprintf(stderr, "\t-cconstname -ddataname\n");
   fprintf(stderr, "\t-O=adefiswA\n");
   fprintf(stderr, "\t   A: all of the options below\n");
   fprintf(stderr, "\t   a: monitor conditional assignment statements\n");
   fprintf(stderr, "\t   d: monitor 'do' statements\n");
   fprintf(stderr, "\t   e: monitor empty case statements\n");
   fprintf(stderr, "\t   f: monitor third expression in 'for' statement\n");
   fprintf(stderr, "\t   i: monitor 'else-less if' statements\n");
   fprintf(stderr, "\t   s: add default statements\n");
   fprintf(stderr, "\t   w: monitor 'while' statements\n");
}


/***********************************************************************/

/* FUNCTION */
setdebug()

/*
 *     This sets debug variables as described by the
```

BEST AVAILABLE COPY

```
 *     Ba_debuG shell variable...
 *
 *     This is silent about any errors, and ignores any unknown flags...
 */
{
   char *ptr;
   char c;
   char *start;
   int length;
   char temp[1024];
   char vname[20];          /* decoded variable name */

   /* Because of possible problems, I have encoded Ba_debuG in a kind of
      code that will make life difficult for any one using the object
      to find the name of the special environment variable
   */
   static char varname[] =
   {
      /* B + 0x80 */     0xc2,
      /* a + 0x81 */     0xe2,
      /* _ + 0x82 */     0xe1,
      /* d + 0x83 */     0xe7,
      /* e + 0x84 */     0xe9,
      /* b + 0x85 */     0xe7,
      /* u + 0x86 */     0xfb,
      /* G + 0x87 */     0xce,
      /* \0+ 0x88 */     0x88,
   };

#pragma BBA_IGNORE /* not for production */
   /* decode varname into vname */
   for (c = 0; c < sizeof(varname) / sizeof(char); c++)
      vname[c] = varname[c] - 0x80 - c;
   );

   /* check to see if vname exists in the environment */
   ptr = getenv(vname);

   if (ptr == NULL)
      return;


   while ((c = *ptr++) != '\0')
   {
      switch(c)
      {
      case 'S' :  /* Scan forward until we find the leading single
                     quote
                  */
                  for (start = ptr; *start != '\''; start++)
                  {
                     if (*start == '\0')
```

BEST AVAILABLE COPY

```
                return;                 /* error, but be quiet about it */
            }
            start++;    /* point at character after leading quote */

            /* Find the trailing quote or pipe */
            for (ptr = start; (*ptr != '\'') && (*ptr != '|'); ptr++)
            {
               if (*ptr == '\0')
                  return;               /* error, but be quiet about it */
            }
            /* Replace trailing quote with a \0 */
            if (*ptr == '\'')
            {
               /* No security string specified */
               *ptr = '\0';
               testspec = start;            /* put name into here */
               testsecstring = NULL;        /* test security string is NULL */
               ptr++;                       /* and go beyond the trailing quote */
               break;
            }

            /* Else, a security string was defined here ....
               Scan forward for trailing quote */
            *ptr++ = '\0';              /* terminate name */
            testspec = start;
            start = ptr;                /* set ptr to the beginning of the secstring */
            for (ptr = start; *ptr != '\''; ptr++)
            {
               if (*ptr == '\0')
                  return;               /* error, but be quiet about it */
            }
            *ptr = '\0';
            testsecstring = start;
            ptr++;
            break;

      case 'c' :  debugcppread = TRUE;
            break;

      case 'C' :  debugcpp = TRUE;
            break;

      case 'i' :  debuginput = TRUE;
            break;

      case 'l' :  debugislabeldef = TRUE;
            break;

      case 'm' :  debugmapcol = TRUE;
            break;

      case 'M' :  /* cause malloc to fail sometime soon .... */
```

BEST AVAILABLE COPY

```
                    while (TRUE)
                    {
                       /* Allocate 1 Mbytes at a time; be sure to write to
                          them, or else you can use up all internal pointers
                          and never use physical memory */
                       printf("allocating a megabyte!\n");
                       start = malloc(1048576);
                       for (ptr = start + 1048576 - 1 ; ptr > start; ptr-= 256)
                       {
                          *ptr = ptr - start;
                       }
                    }
                    break;

        case 'n' :  debugnoinsertion = TRUE;
                    break;

        case 'p' :  debugprobes = TRUE;
                    break;

        case 's' :  debugsym = TRUE;
                    break;

        case 'y' :  if (*ptr++ == '=')
                    {
                       start = ptr;      /* start of the number */
                       /* Scan forward until we hit a non-numeric */

                       while ((c = *ptr++) != '\0')
                       {
                          if ((c < '0') || (c > '9'))
                             break;
                       }

                       /* Number is from start thru ptr - 1 */
                       length = ptr - start;
                       strncpy(temp, start, length);
                       temp[length] = '\0';
                       startyy = TRUE;
                       startdebug = atoi(temp);
                       return;     /* Already read in the \0 */
                    }
                    break;
        /* default is to simply try the next character.... */
        }
    }
  }


/*************************************************************************/

/* FUNCTION */
```

BEST AVAILABLE COPY

```
static
copyoutput()

/*
 *    This is called when we were putting output to
 *    a temporary file and need to copy it to stdout
 *
 */
{
   char buffer[1024];
   int numread;
   int numwrote;

   fclose(fba);
   fba = fopen(ntmpout, "r");
   if (fba == NULL)
   {
      fprintf(stderr, "%s: cannot access temporary file %s\n",
            invokedname, ntmpout);
      exit(2);
   }

   numread = sizeof(buffer);
   while (numread > 0)
   {
      numread = fread(buffer, sizeof(char), sizeof(buffer), fba);
      if (numread > 0)
      {
         numwrote = fwrite(buffer, sizeof(char), numread, stdout);
         if (numwrote != numread)
         {
            fprintf(stderr, "%s: unable to write output file\n", invokedname);
            exit(1);
         }
      }
   }
   fclose(fba);
}
```

feb 03 15:53 1988  pp/mapwrite.c Page 1

```
/*
 * FILE      $Header: mapwrite.c,v 1.14 87/11/30 09:14:19 hmgr Exp $
 *
 * AUTHOR       Bruce Erickson
 *
 * ONELINER Routines to write to the mapping file.
 *
 * TABSTOPS 3
```

BEST AVAILABLE COPY

```
 *
 * INSPECTED   date     - inspectors
 *
 * RCS       $Log: mapwrite.c,v $
 * Revision 1.14  87/11/30  09:14:19  09:14:19  hmgr ()
 * Author: bae@hplsdlc.hp.com
 * no comment
 *
 * Revision 1.13  87/11/04  15:35:24  15:35:24  hmgr ()
 * Author: bae@hplsdlc.hp.com
 * Added storing of cpp version in map files
 *
 * Revision 1.12  87/11/03  09:28:02  09:28:02  hmgr ()
 * Author: bae@hplsdlc.hp.com
 * Use getmodtime() instead of AxLS's time because their time
 * does not deal correctly with timezones
 *
 * Revision 1.11  87/11/03  08:46:26  08:46:26  hmgr ()
 * Author: bae@hplsdlc.hp.com
 * update to AxLS's cpp
 *
 * Revision 1.9  87/09/29  16:13:59  16:13:59  hmgr ()
 * Author: bae@hplsdlc.hp.com
 * Fixed problem with printing wrong name when a .M file
 * is of an unknown type
 *
 * Revision 1.8  87/09/18  09:55:22  09:55:22  hmgr ()
 * Author: bae@hplsdlc.hp.com
 * Fix so that probe flags are written out in hex
 *
 * Revision 1.7  87/08/17  16:24:10  16:24:10  hmgr ()
 * Author: bae@hplsdlc.hp.com
 * depend on run-time selection of processor specifics instead of compile time
 *
 * Revision 1.6  87/07/10  10:24:42  10:24:42  hmgr ()
 * Author: bae@hplsdlc.hp.com
 * no comment
 *
 * Revision 1.5  87/05/08  10:05:23  10:05:23  bae (Bruce Erickson)
 * *** empty log message ***
 *
 * Revision 1.5  87/05/08  10:05:23  10:05:23  bae (Bruce Erickson)
 * Now check the fileid of the mapfile before overwriting.
 * In wmapwrite(), check to see if the strings (funcname, ctlstring,
 * and ctlmstring) are not "" in addition to being non-NULL.
 * This is because in the probe system if a string was *ever* used
 * it will pass a non-NULL - but if it should not be twigged, the string
 * will be "".
 *
 * Revision 1.4  87/05/06  12:01:45  12:01:45  bae (Bruce Erickson)
 * Passes Plum Hall conformance test
 *
```

BEST AVAILABLE COPY

```
 * Revision 1.3  87/04/14  16:15:52  16:15:52  bae (Bruce Erickson)
 * changed format to make it more readable
 *
 * Revision 1.2  87/04/01  16:18:05  16:18:05  bae (Bruce Erickson)
 * works with 'if', 'else', 'else-less-if', 'while', 'for'
 *
 * Revision 1.1  87/03/26  12:45:10  12:45:10  bae (Bruce Erickson)
 * Initial revision
 *
 *
 */
static char rcsid[] = "$Header: mapwrite.c,v 1.14 87/11/30 09:14:19 hmgr Exp $";
#include <stdio.h>
#include <boolean.h>
#include <model.h>
#include "targetspec.h"
#include "map.h"
#include "probe.h"

/* GLOBALS */

/* STATICS */

/* EXTERNALS */
extern char *sourcemodtime;
extern void faddmod();
extern boolean fileid();
extern char *getmktrev();
extern void getmodtime();
extern PROBETYPE probemask;
extern FILE *fmap;
extern char nmap[];
extern boolean genmapfile;
extern char mapsuffix;
extern char *strrchr();
extern FILE *fopen();
extern char invokedname[];
extern char sourcepath[];
extern int sourcenum;

/* FORWARD */


/*************************************************************************/

/* FUNCTION */
wmapinit()

/*
 *
 *    This routine is called in order to open the map file.
 *    If it fails, this issues a warning and sets 'genmapfile'
```

```
 *     to false; if it succeeds, 'fmap' is opened for writing the
 *     map file and nmap is the path of the map file.
 *     Also, the id, protocol and the options are written to the map file.
 */
{
   int slength;      /* length of the path */
   char *lastslash;  /* last slash in the path */

   /* If we are to generate the map file, open it */
   if (!genmapfile)
      return;           /* do nothing */


   /* First thing to do is to copy the name of the source file
      to the name of the map file */
   strcpy(nmap, sourcepath);

   /* Then replace it's extension with 'mapsuffix' */
   slength = strlen(sourcepath);
   if (nmap[slength - 2] == '.')
   {
      /* Oh goody - this is a <fname>.<ext> style file.  Verify
         that we won't stomp on the source if we replace the
         <ext> with <mapsuffix> */

      if (nmap[slength - 1] == mapsuffix)
      {
         fprintf(stderr, "%s: cannot generate map file '%s' because that would overwrite the\n",
               invokedname, sourcepath);
         fprintf(stderr, "   source file (use the -DBBA_OPTM<suffix> to choose a suffix different from '%c')\n",
               mapsuffix);
         genmapfile = FALSE;
         return;
      }

      /* Suffix will be different */
      nmap[slength - 1] = mapsuffix;

      if (access(nmap, 00) == 0)
      {
         /* The file exists.  Is it a mapping file, or is it something else? */

         if (!fileid(nmap, TRUE, "r", MAPID, NULL, NULL))
         {
            fprintf(stderr, "%s: cannot generate map file '%s' because that would overwrite an\n",
                  invokedname, nmap);
            fprintf(stderr, "   unknown-type file (use the -DBBA_OPTM<suffix> to choose a suffix different from
                  '%c')\n"
                  mapsuffix);
            genmapfile = FALSE;
            return;
         }
```

BEST AVAILABLE COPY

```
      }
   }
   else
   {
      /* The input file has no extension.  Is there enough room to
         add a .<mapsuffix>? */

      if ((lastslash = strrchr(nmap, '/')) == NULL)
      {
         lastslash = nmap;     /* no slashes.... */
      }

      if ((slength - (lastslash - nmap)) - 1 > 12)
      {
         fprintf(stderr, "%s: cannot generate map file because file name '%s'\n",
               invokedname, sourcepath);
         fprintf(stderr, "   is too long to append .%c\n", mapsuffix);
         genmapfile = FALSE;
         return;
      }

      /* We *can* append a .%c! */
      sprintf(nmap, "%s.%c", sourcepath, mapsuffix);
      if (access(nmap, 00) == 0)
      {
         /* The file exists.  Is it a mapping file, or is it something else? */
         if (!fileid(nmap, TRUE, "r", MAPID, NULL, NULL))
         {
            fprintf(stderr, "%s: cannot generate map file '%s' because that would overwrite an\n",
                  invokedname, sourcepath);
            fprintf(stderr, "   unknown-type file (use the -DBBA_OPTM<suffix> to choose a suffix different from
                  '%c')\n"
                  mapsuffix);
            genmapfile = FALSE;
            return;
         }
      }
   }

   /* At this point, "nmap" is the name of the map file...  Attempt to
      open it */
   fmap = fopen(nmap, "w");

   if (fmap == NULL)
   {
      fprintf(stderr, "%s: cannot open map file %s for output", invokedname, nmap);
      perror(" ");
      genmapfile = FALSE;
      return;
   }

   /* We have opened the map file!  Make certain we can read and delete
```

BEST AVAILABLE COPY

```
      it later... */

   faddmod(fileno(fmap), 0600);  /* set rw bits for owner */

   /* Write the first few lines to it */
   fprintf(fmap, ":id %s\n:protocol %d\n", MAPID, bbamapprotocol);
   fprintf(fmap, ":options %X :cppver ", probemask);
   qstringwrite(fmap, getmktrev(NULL, 0));
   fprintf(fmap, "\n");
}


/*************************************************************************/

/* FUNCTION */
wmapsource(num, path, datestring)
int num;        /* path's symbol number */
char *path;     /* path of the source file */
char *datestring; /* smithstore-style date string of the path's mod time */

/*
 *    This routine will append a source reference line to the
 *    map file.
 *    If bbamapmodtime is TRUE
 *       if num is sourcenum, print the text of sourcemodtime
 *       else, write out datestring
 * NOTE: because AxLS has not yet got their 'datestring' to deal
 * with different timezones, we will use getmodtime....
 *
 */
{
   char buffer[20];

   if (!genmapfile)
      return;

   fprintf(fmap, ":source %d %s", num, path);

   /* If we should not have the modtime in the map files, just
      resturn... */
   if (!bbamapmodtime)
   {
      fprintf(fmap, "\n");
      return;
   }

   /* We will print out the modification date/time */
   if (num == sourcenum)
   {
      fprintf(fmap, " :modtime %s\n", sourcemodtime);
      return;
   }
```

BEST AVAILABLE COPY

```
    getmodtime(path, buffer);
    fprintf(fmap, " :modtime %s\n", buffer);
}


/***********************************************************************/

/* FUNCTION */
wmapprobe(index, type, flags, snum, execscope, sline, scol, eline, ecol,
      s2num, s2line, s2col, e2line, e2col, funcname, ctlstring, ctlmstring)
int index;              /* index number of this probe */
PROBETYPE type;         /* type of probe this is */
PFLAGTYPE flags;        /* probe flags */
int snum;               /* probe inserted in source file symnum snum;
                           sline/scol is in file snum */
int execscope;          /* scope of probe */
int sline, scol;        /* starting line,column of code that was executed
                           if array[index] is non-zero */
int eline, ecol;        /* ending line,column of code */
int s2num;              /* file that s2line/s2col is in */
int s2line, s2col;      /* starting line,column of code of either function
                           declaration or control string */
int e2line, e2col;      /* ending line,column that match s2line/s2col */
char *funcname;         /* if non-NULL (and not ""), array[index] is first statement of
                           function funcname */
char *ctlstring;        /* if non-NULL (and not ""), array[index] depends on this statement */
char *ctlmstring;       /* if non-NULL (and not ""), ctlstring contained a macro, and this is
                           the expansion of the macro */

/*
 *    This routine is called to write an entry into the map file.
 *    If genmapfile is false, this simply returns.  Else, it writes the
 *    mapfile according to the highest defined bbamapprotocol
 *
 */
{
    int ptint;              /* type translated to a bit position */

    if (!genmapfile)
        return;

    PTTOINT(type, ptint);

    /* First part of line is well defined */
    fprintf(fmap, ":probe %3d %2d %4X %2d %2d %3d %2d %3d %2d",
          index, ptint, flags, snum, execscope, sline, scol, eline, ecol);

    /* The rest depends on what parameters are valid */
    if ((funcname != NULL) && (*funcname != '\0'))
    {
        fprintf(fmap, " :fname %2d %3d %2d %3d %2d ", s2num, s2line, s2col, e2line, e2col);
```

BEST AVAILABLE COPY

```
         qstringwrite(fmap, funcname);
      }

      if ((ctlstring != NULL) && (*ctlstring != '\0'))
      {
         fprintf(fmap, " :ctl %2d %3d %2d %3d %2d ", s2num, s2line, s2col, e2line, e2col);
         qstringwrite(fmap, ctlstring);
      }

      if ((ctlmstring != NULL) && (*ctlmstring != '\0'))
      {
         fputs(" :ctlmac ", fmap);
         qstringwrite(fmap, ctlmstring);
      }
      fputc('\n', fmap);
   }


   /**************************************************************************/

   /* FUNCTION */
   void
   wmapremove()

   /*
    *    This routine is called when we have detected a
    *    syntax error in the pre-processing.  In this case,
    *    we do not want to generate a .M file.
    *
    *    When this routine is called, if we are currently generating
    *    a mapping file, we will:
    *       - close the file
    *       - unlink the file
    *       - set 'genmapfile' to FALSE (i.e., turn of generation)
    *
    */
   {
      if (!genmapfile)
         return;         /* not generating a file! */

      fclose(fmap);
      unlink(nmap);
      genmapfile = FALSE;
   }
```

Feb 03 15:53 1988  pp/abort.c Page 1

```
   /*
    * FILE     $Header: abort.c,v 1.2 87/07/10 10:30:52 hmgr Exp $
    *
```

BEST AVAILABLE COPY

```
 * AUTHOR       Bruce Erickson
 *
 * ONELINER debug file - abort after info dump
 *
 * TABSTOPS 3
 *
 * INSPECTED   date     - inspectors
 *
 * RCS      $Log: abort.c,v $
 * Revision 1.2  87/07/10  10:30:52  10:30:52  hmgr ()
 * Author: bae@hplsdlc.hp.com
 * no comment
 *
 * Revision 1.1  87/03/26  12:45:07  12:45:07  bae (Bruce Erickson)
 * Initial revision
 *
 * Revision 1.1  87/03/26  12:45:07  12:45:07  bae (Bruce Erickson)
 * Initial revision
 *
 * Revision 1.1  87/03/26  12:45:07  12:45:07  bae (Bruce Erickson)
 * Initial revision
 *
 *
 */
static char rcsid[] = "$Header: abort.c,v 1.2 87/07/10 10:30:52 hmgr Exp $";
#include <stdio.h>
#include <model.h>
#include <boolean.h>

/* GLOBALS */

/* STATICS */

/* EXTERNALS */

/* FORWARD */


/*************************************************************************/

/* FUNCTION */
myabort()

/*
 *    called when we have found a programming error
 *
 */
{

   fflush(stdout);
   fprintf(stderr, "\nDumping data to stderr\n");
   cdumpsym(FALSE);
```

BEST AVAILABLE COPY

```
        abort();

    }
```

Feb 03 15:53 1988  pp/cppout.h Page 1

```
/*
 * FILE      $Header: cppout.h,v 1.3 87/11/10 10:19:54 hmgr Exp $
 *
 * AUTHOR       Bruce Erickson
 *
 * ONELINER defines how we read from cpp
 *
 * TABSTOPS 3
 *
 * RCS       $Log: cppout.h,v $
 * Revision 1.3  87/11/10  10:19:54  10:19:54  hmgr ()
 * Author: bae@hplsdlc.hp.com
 * Deal with any size of original text (instead of core dumping when
 * it exceeds MAX_LINE)
 *
 * Revision 1.2  87/07/10  10:28:54  10:28:54  hmgr ()
 * Author: bae@hplsdlc.hp.com
 * no comment
 *
 * Revision 1.1  87/04/16  16:17:13  16:17:13  bae (Bruce Erickson)
 * Initial revision
 *
 * Revision 1.1  87/04/16  16:17:13  16:17:13  bae (Bruce Erickson)
 * Initial revision
 *
 *
 */

/* The following structure is used when cpp tells us that
   it did a replacement....  This is a linked list, where
   the head is in the post-cpp line structure (see below)

   Note that if endbyte < startbyte, the macro resulted in
   no characters at all....
*/
typedef struct origtext
{
   u_int32 startbyte;       /* this represents data that the ba grammar
                               sees as starting at this byte */
   u_int32 endbyte;         /* ba grammar sees this as ending at endbyte */
   char *origtext;          /* original text that generated bytes
                               startbyte thru endbyte (inclusive) */
   int numbytes;            /* number of bytes allocated to origtext - 1 (so we don't
                               have to worry about the trailing \0) */
```

BEST AVAILABLE COPY

```
   struct origtext *next;  /* if not NULL, there is another replacement
                              for this line */
} ORIGTEXT;


/* There is (at least) one of the following structures
   for each line we read from the pre processor.  In the case
   where the preprocessor fills this in, there may be more
   than one per line (when a macro expansion is done)
*/

typedef struct
{
   u_int32 startbyte;   /* this structure starts at this byte (of
                           the strings sent to the ba grammar */
   u_int32 endbyte;     /* last text byte of this string.  I.e.,
```

feb 03 15:53 1988  pp/csym.h Page 1

```
/*     FILE      sym.h ($Header: csym.h,v 1.2 87/07/10 10:24:20 hmgr Exp $)
 *     AUTHOR    Bruce Erickson
 *
 * ONELINER Header file for symbols in the C grammar
 *
 ****************************************************************************
 * How symbols are stored:
 *
 * scopes[varscope] is a pointer to a hash table for that scope. (htable)
 * htable[hashnumber] is a pointer to a linked list of SYMINFO's.  Traversing
 *     this will find the symbol, or end-of-list.
 * Also, numtable[symnum] will return the address of a particular symbol's
 *     SYMINFO
 *
 *
 * GLOBALS  if not here, then imbeded in the variable declaration section
 *
 * CHANGE LOG:    (operational on dd-mm-yy)
 *
 * dd-mm-yy    name     what
 *
 *
 * RCS $Log:   csym.h,v $
 * Revision 1.2  87/07/10  10:24:20  10:24:20  hmgr ()
 * Author: bae@hplsdlc.hp.com
 * no comment
 *
 * Revision 1.1  87/04/16  16:17:10  16:17:10  bae (Bruce Erickson)
 * Initial revision
 *
 * Revision 1.1  87/04/16  16:17:10  16:17:10  bae (Bruce Erickson)
```

BEST AVAILABLE COPY

```
 * Initial revision
 *
 *
 */

#define HASHNUM 89       /* number of hash indices */
#define MAXSCOPES 130    /* maximum level of scoping */

/* type of C variables */
#define T_MASK    0xfff
#define T_INT       0x1
#define T_CHAR      0x2
#define T_FLOAT     0x3
#define T_DOUBLE    0x4
#define T_LONG      0x8
#define T_SHORT    0x10
#define T_UNSIGN   0x20
#define T_STRUCT   0x40
#define T_UNION    0x80
#define T_DEF     0x100         /* typedef */
#define T_TAG     0x200         /* struct or union tag */
#define T_VOID    0x800

/* storage class of identifier */
#define S_MASK     0xf000
#define S_AUTO     0x1000
#define S_EXTERN   0x2000
#define S_STATIC   0x3000
#define S_REG      0x4000
#define S_DEF      0x5000       /* typedef */
#define S_CONST    0x6000
#define S_VOLATILE 0x7000


/* misc. information */
#define M_MASK  0xf00000        /* mask */
#define M_NORM  0x000000        /* normal */
#define M_PROC  0x100000        /* procedure */
#define M_FILE  0x200000        /* file */


/* typemask parameters for getsym */
#define S_ALLTYPES 0xffffff
#define S_TYPESPEC S_DEF

/* information about a specific symbol */
typedef struct syminfostruct
{
   struct syminfostruct *next;   /* next in list or NULL */
   struct syminfostruct *prev;   /* previous in list or NULL */
   char *symbol;          /* The actual symbol's string */
   int symnum;            /* the symbol number of this symbol */
```

BEST AVAILABLE COPY

```
   u_int32 type;          /* type of variable: T_INT, T_CHAR, etc. ord
                             with storage class */
   long time;             /* used only by batell, this is the modification
                             time of the source file "symbol" */
} SYMINFO;


/* this is the hash table */
typedef SYMINFO *HTABLE[HASHNUM];

typedef HTABLE SCOPES[MAXSCOPES];

/* numtable is dynamically allocated - initialized in initsyms */

typedef SYMINFO **NUMTABLE;
```

Feb 03 15:53 1988  pp/errors.c Page 1

```
/*
 * FILE      $Header: errors.c,v 1.8 88/01/06 18:48:13 hmgr Exp $
 *
 * AUTHOR       Bruce Erickson
 *
 * ONELINER Handle errors & warnings...
 *
 * TABSTOPS 3
 *
 * RCS       $Log: errors.c,v $
 * Revision 1.8  88/01/06  18:48:13  18:48:13  hmgr ()
 * Author: bae@hplsdlc.hp.com
 * got rid of some unused functions
 *
 * Revision 1.7  87/10/22  08:41:29  08:41:29  hmgr ()
 * Author: bae@hplsdlc.hp.com
 * Changed error messages so they accurately show
 * #file names in syntax errors
 *
 * Revision 1.6  87/07/29  15:15:18  15:15:18  hmgr ()
 * Author: bae@hplsdlc.hp.com
 * removed incorrect references to invokedname
 *
 * Revision 1.5  87/07/29  13:37:02  13:37:02  hmgr ()
 * Author: bae@hplsdlc.hp.com
 * Changed error so they are not preceeded by invokedname
 * (standard is better than better)
 *
 * Revision 1.4  87/07/10  10:30:21  10:30:21  hmgr ()
 * Author: bae@hplsdlc.hp.com
 * no comment
 *
```

BEST AVAILABLE COPY

```
 * Revision 1.3  87/05/06  11:58:17  11:58:17  bae (Bruce Erickson)
 * *** empty log message ***
 *
 * Revision 1.3  87/05/06  11:58:17  11:58:17  bae (Bruce Erickson)
 * Passes Plum Hall conformance test
 *
 * Revision 1.2  87/04/14  16:15:48  16:15:48  bae (Bruce Erickson)
 * Changed format of errors to meet those of cpp, but with the
 * inclusion of 'invokedname' as the first string printed
 *
 * Revision 1.1  87/03/26  12;45:08  12:45:08  bae (Bruce Erickson)
 * Initial revision
 *
 *
 */
static char rcsid[] = "$Header: errors.c,v 1.8 88/01/06 18:48:13 hmgr Exp $";
#include <stdio.h>
#include <model.h>
#include <boolean.h>

/* GLOBALS */

/* STATICS */

/* EXTERNALS */
extern void wmapremove();
extern char *cgetfilename();
extern char invokedname[];
extern char homedir[];
extern char *pathtofname();
extern boolean exitwitherror;

/* FORWARD */


/***************************************************************************/

/* FUNCTION */
void
cerror(msg)
char *msg;          /* ascii string explaining the error or NULL */

/*
 *    This routine is called from the lexical analyzer when an
 *    error occurrs.  When this happens, we should:
 *       print the name we were invoked with
 *       print the line number we are currently reading
 *       set 'exitwitherror' to TRUE
 *       call wmapremove() to cause the .M file to not be generated
 *       if msg != NULL
 *          print the error & \n
 *       (else, caller will print error & \n)
```

BEST AVAILABLE COPY

```
 *
 */
{
   int line;
   char *file;

   exitwitherror = TRUE;
   line = cgetline();
   file = pathtofname(homedir, cgetfilename(), 0);
   wmapremove();

   if (msg != NULL)
      fprintf(stderr, "%s: %d: %s\n", file, line, msg);
   else
      fprintf(stderr, "%s: %d: ", file, line);
}
/*
/*
/* /***************************************************************************/
/*
/* /* FUNCTION */
/* void
/* cwarning(msg)
/* char *msg;        /* ascii string explaining the warning */
/*
/* /*
/*  *    This routine is called from the lexical analyzer when an
/*  *    warning occurrs.  When this happens, we should:
/*  *       print the warning
/*  *       print the line number it happened on
/*  *
/*  */
/* {
/*    int line;
/*    char *file;
/*
/*    line = cgetline();
/*    file = pathtofname(homedir, cgetfilename(), 0);
/*
/*    fprintf(stderr, "%s: %d: %s\n", file, line, msg);
/* } */
```

Feb 03 15:53 1988  pp/getmodtime.c Page 1

```
/*
 * FILE      $Header: getmodtime.c,v 1.6 87/10/14 15:08:01 hmgr Exp $
 *
 * AUTHOR       Bruce Erickson
 *
```

BEST AVAILABLE COPY

```
 * ONELINER The 'getmodtime' routine
 *
 * CONDCOMP TEST     - if defined, create a main program to test this
 *
 * TABSTOPS 3
 *
 * RCS      $Log: getmodtime.c,v $
 * Revision 1.6  87/10/14  15:08:01  15:08:01  hmgr ()
 * Author: bae@hplsdlc.hp.com
 * Convert to pragmas for ignore & alerts...
 *
 * Revision 1.5  87/08/05  17:53:19  17:53:19  hmgr ()
 * Author: bae@hplsdlc.hp.com
 * no comment
 *
 * Revision 1.4  87/07/17  10:25:26  10:25:26  hmgr ()
 * Author: bae@hplsdlc.hp.com
 *
 *
 * Revision 1.3  87/07/10  10:29:20  10:29:20  hmgr ()
 * Author: bae@hplsdlc.hp.com
 * no comment
 *
 * Revision 1.2  87/05/06  11:58:33  11:58:33  bae (Bruce Erickson)
 * *** empty log message ***
 *
 * Revision 1.2  87/05/06  11:58:33  11:58:33  bae (Bruce Erickson)
 * Passes Plum Hall conformance test
 *
 * Revision 1.1  87/03/26  12:45:09  12:45:09  bae (Bruce Erickson)
 * Initial revision
 *
 *
 */
static char rcsid[] = "$Header: getmodtime.c,v 1.6 87/10/14 15:08:01 hmgr Exp $";
#include <stdio.h>
#include <time.h>
#include <sys/types.h>
#include <sys/stat.h>
#include <model.h>
#include <boolean.h>
#include "smithdate.h"

/* GLOBALS */

/* STATICS */

/* EXTERNALS */
extern struct tm *localtime();
extern char *smithtostore();

/* FORWARD */
```

BEST AVAILABLE COPY

```
/****************************************************************************/

/* FUNCTION */
void
getmodtime(file, buffer)
char *file;             /* file name to find mod time of */
char *buffer;           /* buffer to write date/time to */

/*
 *    This routine is called to get the source modification
 *    date/time.  It will format the date into ascii in the
 *    passed buffer.
 *
 *    If we cannot stat the file, we will set time to be
 *    the earliest date possible
 *
 *    The buffer should be at least 14 characters long
 */
{
   unsigned long itime;
   struct stat statbuf;
   SMITHTIME smtime;
   char *ptr;

   if (stat(file, &statbuf) != 0)
   {
#     ifdef TEST
         fprintf(stderr, "stat(%s) failed", file);
         perror(" ");
#     endif TEST

      smtime = smithillegal;
   }
   else
   {
      itime = (long) statbuf.st_mtime;
      if (!smithfromunix(&itime, &smtime))
      {
#pragma  BBA_IGNORE /* this should never happen, but... */
#        ifdef TEST
            fprintf(stderr, "smithfromunix(%ld) failed\n", itime);
#        endif TEST
         smtime = smithillegal;
      }
   }

   ptr = smithtostore(&smtime);
   strcpy(buffer, ptr);
}
```

BEST AVAILABLE COPY

```
#ifdef TEST

main(argc, argv)
int argc;
char *argv[];
{
   char buffer[100];
   char *fname;
   int i;

   for (i = 1; i < argc; i++)
   {
      fname = argv[i];
      getmodtime(fname, buffer);

      printf("%s\n", buffer);
   }
}
#endif TEST
```

Feb 03 15:53 1988  pp/myexit.c Page 1

```
/*
 * FILE     $Header: myexit.c,v 1.3 87/07/10 10:30:40 hmgr Exp $
 *
 * AUTHOR      Bruce Erickson
 *
 * ONELINER implements the myexit() call
 *
 * CONDCOMP INSTRUMENTED   if TRUE, call badump prior to exit...
 *          DOMAIL         if defined, mail stats to 'bbacpp'
 *
 * TABSTOPS 3
 *
 * RCS      $Log: myexit.c,v $
 * Revision 1.3  87/07/10  10:30:40  10:30:40  hmgr ()
 * Author: bae@hplsdlc.hp.com
 * no comment
 *
 * Revision 1.2  87/03/26  12:30:14  12:30:14  bae (Bruce Erickson)
 * *** empty log message ***
 *
 * Revision 1.2  87/03/26  12:30:14  12:30:14  bae (Bruce Erickson)
 * call badump with a file name instead of NULL.....
 *
 * Revision 1.1  86/06/29  14:12:25  14:12:25  bae (Bruce Erickson)
 * Just before the baprof release
 *
 *
 */
```

BEST AVAILABLE COPY

```
static char rcsid[] = "$Header: myexit.c,v 1.3 87/07/10 10:30:40 hmgr Exp $";
#include <stdio.h>
#include <boolean.h>

/* GLOBALS */

/* STATICS */

/* EXTERNALS */

/* FORWARD */

/* FUNCTION */

/***************************************************/

/* NO RETURN VALUE */
myexit(val)
int val;        /* value to exit with */

/*
 *    This routine is called when we want to exit.  It may or
 *    may not do a badump depending on compilation.
 *    At any rate, we will exit with "val"
 */
{
#  ifdef INSTRUMENTED
      badump("badump.data", FALSE, NULL, NULL, NULL, NULL);
#  endif

#  ifdef DOMAIL
      domail("bbacpp", NULL, TRUE);
#  endif

   exit(val);
}
```

Feb 03 15:53 1988  pp/nls.h Page 1

```
/*
 * FILE     $Header: nls.h,v 1.2 87/07/10 10:30:31 hmgr Exp $
 *
 * AUTHOR      Bruce Erickson
 *
 * ONELINER various stuff to hook into NLS grammar/scanner
 *
 * TABSTOPS 3
 *
 * RCS      $Log: nls.h,v $
 * Revision 1.2  87/07/10  10:30:31  10:30:31  hmgr ()
```

BEST AVAILABLE COPY

```
 * Author: bae@hplsdlc.hp.com
 * no comment
 *
 * Revision 1.1  87/05/06  12:05:14  12:05:14  bae (Bruce Erickson)
 * Initial revision
 *
 * Revision 1.1  87/05/06  12:05:14  12:05:14  bae (Bruce Erickson)
 * Initial revision
 *
 *
 */

/*    We need to define MAX_LINE..... */
#define MAX_LINE 1025
```

Feb 03 15:53 1988  pp/scan.h Page 1

```
/*    FILE     scan.h   ($Header: scan.h,v 1.8 87/07/10 10:24:10 hmgr Exp $)
 *    AUTHOR   Bruce Erickson
 *
 *        Header file for lexical analyzer
 *
 ***************************************************************************
 * How symbols are stored:
 *
 * scopes[varscope] is a pointer to a hash table for that scope. (htable)
 * htable[hashnumber] is a pointer to a linked list of SYMINFO's.  Traversing
 *    this will find the symbol, or end-of-list.
 * Also, numtable[symnum] will return the address of a particular symbol's
 *    SYMINFO
 *
 *
 * ONELINER description of file
 * ROUTINES any neat routines
 *
 * CONDCOMP conditional compilation information
 *
 * EXCEPTIONS  software standards execptions
 *
 * GLOBALS  if not here, then imbeded in the variable declaration section
 *
 * CHANGE LOG:    (operational on dd-mm-yy)
 *
 * dd-mm-yy    name     what
 *
 *
 * RCS $Log:   scan.h,v $
 * Revision 1.8  87/07/10  10:24:10  10:24:10  hmgr ()
 * Author: bae@hplsdlc.hp.com
 * no comment
```

BEST AVAILABLE COPY

```
 *
 * Revision 1.7  87/04/01  16:18:15  16:18:15  bae (Bruce Erickson)
 * *** empty log message ***
 *
 * Revision 1.7  87/04/01  16:18:15  16:18:15  bae (Bruce Erickson)
 * works with 'if', 'else', 'else-less-if', 'while', 'for'
 *
 * Revision 1.6  87/03/09  16:19:42  16:19:42  bae (Bruce Erickson)
 * Before merging in new version of NXLS grammar & lex
 *
 * Revision 1.5  86/03/13  18:44:56  18:44:56  bae (Bruce Erickson)
 * Added bacompress
 *
 * Revision 1.4  85/08/19  08:34:34  bae
 * prior to first QA release
 *
 * Revision 1.3  85/08/05  18:12:16  bae
 * Combined, protocol 1
 *
 * Revision 1.2  85/08/02  12:59:16  bae
 * This version works well to protocol 1
 *
 * Revision 1.1  85/04/17  09|28:12  bae
 * Initial revision
 *
 */

#define HASHNUM 27       /* number of hash indices */
#define MAXSCOPES 400    /* maximum level of scoping */

/* type of variables */
#define T_MASK    0xfff
#define T_INT       0x1
#define T_CHAR      0x2
#define T_FLOAT     0x3
#define T_DOUBLE    0x4
#define T_LONG      0x8
#define T_SHORT    0x10
#define T_UNSIGN   0x20
#define T_STRUCT   0x40
#define T_UNION    0x80
#define T_DEF     0x100         /* typedef */
#define T_TAG     0x200         /* struct or union tag */

/* storage class of identifier */
#define S_MASK     0xf000
#define S_AUTO     0x1000
#define S_EXTERN   0x2000
#define S_STATIC   0x3000
#define S_REG      0x4000
#define S_DEF      0x5000       /* typedef */
```

BEST AVAILABLE COPY

```
/* misc. information */
#define M_MASK  0xf00000      /* mask */
#define M_NORM  0x000000      /* normal */
#define M_PROC  0x100000      /* procedure */
#define M_FILE  0x200000      /* file */


/* typemask parameters for getsym */
#define S_ALLTYPES 0xffffff
#define S_TYPESPEC S_DEF

/* information about a specific symbol */
typedef struct syminfostruct
{
   struct syminfostruct *next;   /* next in list or NULL */
   struct syminfostruct *prev;   /* parevious in list or NULL */
   char *symbol;         /* The actual symbol's string */
   int symnum;           /* the symbol number of this symbol */
   u_int32 type;         /* type of variable: T_INT, T_CHAR, etc. ord
                            with storage class */
   long time;            /* used only by batell, this is the modification
                            time of the source file "symbol" */
} SYMINFO;


/* this is the hash table */
typedef SYMINFO *HTABLE[HASHNUM];

typedef HTABLE SCOPES[MAXSCOPES];

/* numtable is dynamically allocated - initialized in initsyms */

typedef SYMINFO **NUMTABLE;

/*********************************************************************/
/* This is the yystack type.  Although it is defined as a union,     */
/* only the type "string" is used                                    */
typedef struct
{
   int general;
   int symnum;        /* symbol number - optional */
   int startline;
   int startcol;
   int endline;
   int endcol;
   int filenum;       /* file number at start of block */
   char *optstring;   /* perhaps an optional string */
} YYSTRING;

typedef union
{
   int general;    /* general value.... */
```

BEST AVAILABLE COPY

```
   YYSTRING string;
} YYSTYPE;

/* each line read is stored in an array of these structures */
typedef struct
{
   int file;       /* file symnum of this line */
   int line;       /* the line number */
   char *string;   /* the actual line */
} LINE;

/***********************************************************************/

/* types of comments (whole comment blocks, not merely comment lines) */
#define COM_FILE  1     /* file header */
#define COM_FUN1  2     /* function decl. line */
#define COM_FUN2  4     /* function header */
```

Feb 03 15:53 1988  pp/strdup.c Page 1

```
/*
 *    FILE  strdup.c
 *
 * ONELINER duplicate the string passed as a malloc'd string
 *
 * CHANGE LOG:    (operational on dd-mm-yy)
 * dd-mm-yy    name     what
 *
 * RCS $Log:   strdup.c,v $
 * Revision 1.2  87/07/10  10:31:38  10:31:38  hmgr ()
 * Author: bae@hplsdlc.hp.com
 * no comment
 *
 * Revision 1.1  87/07/01  12:37:55  12:37:55  bae (Bruce Erickson)
 * Initial revision
 *
 * Revision 1.1  86/07/12  17:53:10  17:53:10  bae (Bruce Erickson)
 * Initial revision
 *
 *
 */
#include <stdio.h>

extern char *malloc();

char *
strdup(string)
char *string;
{
   char *newstring;
```

BEST AVAILABLE COPY

```

      newstring = malloc(strlen(string) + 1);
      strcpy(newstring, string);
      return(newstring);
   }
```

Feb 03 15:53 1988  pp/strexp.c Page 1

```
/*
 * FILE      $Header: strexp.c,v 1.2 87/07/10 10:29:30 hmgr Exp $
 *
 * AUTHOR       Bruce Erickson
 *
 * ONELINER Copy string to malloc'd area, expanding as necessary
 *
 * TABSTOPS 3
 *
 * INSPECTED   date     - inspectors
 *
 * RCS       $Log: strexp.c,v $
 * Revision 1.2  87/07/10  10:29:30  10:29:30  hmgr ()
 * Author: bae@hplsdlc.hp.com
 * no comment
 *
 * Revision 1.1  87/04/16  13:04:12  13:04:12  bae (Bruce Erickson)
 * Initial revision
 *
 * Revision 1.1  87/04/16  13:04:12  13:04:12  bae (Bruce Erickson)
 * Initial revision
 *
 *
 */
static char rcsid[] = "$Header: strexp.c,v 1.2 87/07/10 10:29:30 hmgr Exp $";
#include <stdio.h>
#include <boolean.h>
#include "ba.h"

/* GLOBALS */

/* STATICS */

/* EXTERNALS */
extern char *malloc();
extern void free();

/* FORWARD */


/***************************************************************************/

```

BEST AVAILABLE COPY

```
/* FUNCTION */
strexpand(src, dest, sizeptr)
char *src;          /* pointer to string to be copied */
char **dest;        /* pointer to malloc'd area to copy src to.  If we
                       have to realloc, this will be changed... */
int *sizeptr;       /* pointer to number of bytes already allocated
                       for string */

/*
 *    This routine is used to copy a string to a malloc'd & kept
 *    array.  If the string 'src' is smaller than *sizeptr, then
 *    we just copy it.  Otherwise, we will free *dest and malloc
 *    a larger area, large enough to hold src... allocation is
 *    in increments of LINEINC.
 *
 */
{
   int length;     /* length of src */
   int numbytes;

   if ((length = strlen(src) + 1) > *sizeptr)
   {
      /* Must allocate more room!!!!! */
      if (*sizeptr != 0)
         free(*dest);      /* Toss out old space */

      *sizeptr = numbytes = LINEINC * ((length / LINEINC) + 1);
      *dest = malloc(numbytes);
   }
   strcpy(*dest, src);
}
```

Feb 03 15:54 1988  pp/targetspec.c Page 1

```
/*
 * FILE      $Header: targetspec.c,v 1.14 87/11/06 08:49:38 hmgr Exp $
 *
 * AUTHOR       Bruce Erickson
 *
 * ONELINER target-specific routines
 *
 *    NOTE: we attempt to put all target-specific routines here!
 *    That may cause some small routines (implying inefficiency), but
 *    if we will move this stuff around only if necessary.  There just
 *    seems something nice about only having to recompile one file
 *    to change targets!
 *
 * TABSTOPS 3
 *
 * CONDCOMP define        - description
```

BEST AVAILABLE COPY

```
 *
 * INSPECTED   date      - inspectors
 *
 * RCS       $Log: targetspec.c,v $
 * Revision 1.14  87/11/06  08:49:38  08:49:38  hmgr ()
 * Author: bae@hplsdlc.hp.com
 * Force an array initialization, so that if the guy used the option to
 * prevent initialization he will get a warning....
 * Also, use 'keepfiletimes' to decide if the file times will be printed
 * to the output.
 *
 * Revision 1.13  87/11/03  08:46:05  08:46:05  hmgr ()
 * Author: bae@hplsdlc.hp.com
 * update to AxLS's cpp
 *
 * Revision 1.11  87/10/14  15:04:57  15:04:57  hmgr ()
 * Author: bae@hplsdlc.hp.com
 * Convert to pragmas for ignore & alerts...
 *
 * Revision 1.10  87/09/01  14:48:48  14:48:48  hmgr ()
 * Author: bae@hplsdlc.hp.com
 * added sensetivity to bbanosection variable (for s300 compiler)
 *
 * Revision 1.9  87/09/01  14:35:44  14:35:44  hmgr ()
 * Author: bae@hplsdlc.hp.com
 * Fix problem when no code (erased leading # of pragma)
 *
 * Revision 1.8  87/08/31  14:26:33  14:26:33  hmgr ()
 * Author: bae@hplsdlc.hp.com
 * added 'noconst' (bbanoconst)
 * Fixed up the #pragme SECTION commands
 *
 * Revision 1.7  87/08/28  17:10:35  17:10:35  hmgr ()
 * Author: bae@hplsdlc.hp.com
 * Now do backpatching of the array declaration, because
 * ANSI standard says that an extern <variable> is not a forward, but
 * a declaration that the variable is global...
 *
 * Revision 1.6  87/08/21  16:19:38  16:19:38  hmgr ()
 * Author: bae@hplsdlc.hp.com
 * Changed order of structure to minimize automatically-inserted
 * pads (inserted by compilers)
 *
 * Revision 1.5  87/08/17  18:22:13  18:22:13  hmgr ()
 * Author: bae@hplsdlc.hp.com
 * Changed so that target specific information is
 * decided at runtime.
 *
 * Revision 1.4  87/07/10  10:29:07  10:29:07  hmgr ()
 * Author: bae@hplsdlc.hp.com
 * no comment
 *
```

BEST AVAILABLE COPY

```
 * Revision 1.3  87/04/16  15:29:06  15:29:06  bae (Bruce Erickson)
 * *** empty log message ***
 *
 * Revision 1.3  87/04/16  15:29:06  15:29:06  bae (Bruce Erickson)
 * added tsprintdecl()
 *
 * Revision 1.2  87/04/14  16:15:58  16:15:58  bae (Bruce Erickson)
 * Specify the name that we were given as the file name in
 * the fake line-definition line.  We used to use the full
 * path name, which might cause confusion to the compiler.
 *
 * Revision 1.1  87/03/26  12:45:12  12:45:12  bae (Bruce Erickson)
 * Initial revision
 *
 *
 */
static char rcsid[] = "$Header: targetspec.c,v 1.14 87/11/06 08:49:38 hmgr Exp $";
#include <stdio.h>
#include <model.h>
#include <time.h>
#include <boolean.h>
#include "targetspec.h"
#include "probe.h"

/* This structure keeps track of where (in the file) we are
   placing our leading declarations, assuming output is a file.
*/
typedef struct
{
   long start;    /* start of declaration (i.e., 's' in 'static') */
   long end;      /* end of declaration (i.e., ';') */
   long length;   /* first character after [ for array declaration */
} LOCATION;

/* GLOBALS */
char *sourcemodtime;          /* sourcemodtime of C source file */

/* STATICS */
static char *cfile;           /* C file's name; same as passed to cpp */
static LOCATION bool;         /* the boolean assignment array */
static LOCATION temp;         /* the temporary array */

/* EXTERNALS */
extern boolean keepfiletimes;
extern boolean debugcppread;
extern boolean bbanosection;
extern boolean bbanoconst;
extern char *datasection;
extern char *constsection;
extern void wprobestruct();
extern PROBETYPE probemask;
extern char *cquote();
```

BEST AVAILABLE COPY

```
extern boolean usetempvars;
extern void getmodtime();
extern char mapsuffix;
extern long time();
extern struct tm *localtime();
extern FILE *fba;
extern char sourcepath[];
extern char *uniquename();
extern boolean nolinedirectives;

/* FORWARD */
extern void setsection();


/***********************************************************************/

/* FUNCTION */
void
tsinit(fname)
char *fname;        /* file name of C file.  Different from sourcepath,
                       this is the same string we passed cpp */

/*
 *    This routine is used to initialize any target-specific things.
 *
 *    It:
 *       initializes INITSTRUCT
 *
 */
{
   static char asciitime[20];    /* time converted to ascii */

   cfile = fname;
   /***********************************************************************/
   /*    Initialize initstruct                                            */
   /***********************************************************************/
   if (bbainsmodtime != -1)
   {
      getmodtime(sourcepath, asciitime);
      sourcemodtime = asciitime;
   }
}


/***********************************************************************/

/* FUNCTION */
void
tsinsertarraytype(linedir, startofdate)
char *linedir;              /* the line directive to print after decl */
char *startofdate;          /* may be the date */
```

BEST AVAILABLE COPY

```
/*
 *    This writes the static statement (which defines what the
 *    data array is) to fba.  It inserts a '# <n> "filename"'
 *    (which is passed)
 *    after the extern statement so that the lines are re-synched
 *    (assuming we weren't invoked with the -P
 *    option, which suppresses ALL # <line> information)
 *
 *    If 'usetempvars' is defined to be TRUE, we will also
 *    insert an extern statement defining those, too...
 *
 *    This initializes bool (and temp) to the locations, and
 *    leaves 10 spaces for the actual sizes...
 *
 */
{
   char c1, c2;

   if (debugcppread)
   {
      /* if debugging cppread, do not print this out */
#     pragma BBA_IGNORE /* for testing only */
      return;
   }

   setsection(TRUE);

   bool.start = ftell(fba);       /* start of this declaration */
   fprintf(fba, "static %s %s[", bbaarraytype, bbaarrayname);
   bool.length = ftell(fba);      /* start of array length */
   fputs("          ] = {0};\n", fba);
   bool.end = ftell(fba) - 2L;    /* ';' in array declaration */

   if (usetempvars)
   {
      temp.start = ftell(fba);
      fprintf(fba, "static %s %s[", bbaarraytype, bbatmpvar);
      temp.length = ftell(fba);
      fputs("          ] = {0};\n", fba);
      temp.end = ftell(fba) - 2L;    /* ';' in array declaration */
   }

   setsection(FALSE);

   if (!nolinedirectives)
   {
      /* If we are asked to not emit dates, and we had a date, go
         ahead and strip it out  However, do not permanently modify
         the string since it is used to recover original text from...
      */

      if ((!keepfiletimes) && (*startofdate != '\n') && (*startofdate != '\0'))
```

BEST AVAILABLE COPY

```
        {
           /* replace whatever was there with \n\0 */
           c1 = *startofdate;
           *startofdate++ = '\n';
           c2 = *startofdate;
           *startofdate = '\0';
           fprintf(fba, "%s", linedir);

           /* Restore dates to the string */
           *startofdate-- = c2;
           *startofdate = c1;
        }
        else
        {
           /* Either we are allowed to emit dates, or there were no dates
              from cpp
           */
           fprintf(fba, "%s", linedir);
        }
    }

}


/**************************************************************************/

/* FUNCTION */
void
tsprintassign(index)
int index;             /* index of array */

/*
 *     This routine prints out the assignment statement.
 *     It does *not* put in the terminating ";" because
 *     the calling routine does that..
 *
 */
{
    fprintf(fba, "%s[%d]=1", bbaarrayname, index);
}


/**************************************************************************/

/* FUNCTION */
tsprintdecl()

/*
 *     This routine is called when we have finished parsing the
 *     entire file.  It will insert structure declarations, and
 *     backpatch the number of entries in the arrays (and possibly
 *     enter the number of entries in the tempvar array, or perhaps
```

BEST AVAILABLE COPY

```
 *     delete that declaration entirely)
 *
 *     If no indices were created, this routine does nothing.
 *
 *     NO MORE OUTPUT SHOULD OCCUR TO FBA AFTER THIS IS CALLED...
 */
{
    int numprobes;          /* number of indices used */
    int numtempvars;        /* number of temporary variables used */
    char *ptr;              /* point at a specific value in sourcemodtime */
    char string[2];         /* convert to a string, so cquote doesn't croak */
    long position;          /* byte position in file */

    /* First, print the declaration of the index array */
    numprobes = probenumprobes();

    if (numprobes == 0)
    {
        /* wipe out the declarations at the top of the file */
        fseek(fba, bool.start, 0);
        for(position = bool.start; position <= bool.end; position++)
            fputc(' ', fba);

        if (usetempvars)
        {
            fseek(fba, temp.start, 0);
            for(position = temp.start; position <= temp.end; position++)
                fputc(' ', fba);
        }

        return;
    }

    /* Unless user specified no constant type, set up section for that */
    setsection(TRUE);

    /* Now we need to define the structure type */
    wprobestruct(fba);

    /* And now we will fill it full of values */
    fprintf(fba, "%sstruct _bA_probe_struct_ _bA_%s =\n{",
            (bbanoconst) ? "" : "const ",
            uniquename(sourcepath));

    if (bbainsertprotocol != -1)
    {
        fprintf(fba, "\t%d,\n", bbainsertprotocol);
    }

    if (bbainsmapsuffix)
    {
        fprintf(fba, "\t'%c',\n", mapsuffix);
```

BEST AVAILABLE COPY

```
    }

    if (bbainsmodtime != -1)
    {
       fprintf(fba, "\t{");
       string[1] = '\0';
       for (ptr = sourcemodtime; *ptr != '\0'; ptr++)
       {
          string[0] = *ptr;
          if (ptr != sourcemodtime)
          {
             /* not first character */
             fprintf(fba, ", '%s'", cquote(string));
          }
          else
          {
             /* First character */
             fprintf(fba, "'%s'", cquote(string));
          }
       }
       fprintf(fba, "},\n");
    }

    if (bbainsoptions != -1)
    {
       fprintf(fba, "\t{0x%02x, 0x%02x, 0x%02x, 0x%02x},\n",
             probemask & 0xff,
             (probemask >> 8) & 0xff,
             (probemask >> 16) & 0xff,
             (probemask >> 24) & 0xff);
    }

    if (bbainsnumentries != -1)
    {
       fprintf(fba, "\t%d,\n", numprobes);
    }

    if (bbainsdataarray != -1)
    {
       fprintf(fba, "\t%s,\n", bbaarrayname);
    }


    if (bbainssourcepath != -1)
    {
       fprintf(fba, "\t\"%s\",\n", sourcepath);
    }

    fprintf(fba, "};\n");

    setsection(FALSE);
```

BEST AVAILABLE COPY

```
    /* Now go to the top of the file and insert the real values of
       the arrays */

    fseek(fba, bool.length, 0);
    fprintf(fba, "%d", numprobes);

    numtempvars = tempvarnumvars();
    if (numtempvars > 0)
    {
       fseek(fba, temp.length, 0);
       fprintf(fba, "%d", numtempvars);
    }
    else
    {
       if (usetempvars)
       {
          /* Wipe the declaration completely out */
          fseek(fba, temp.start, 0);
          for(position = temp.start; position <= temp.end; position++)
             fputc(' ', fba);
       }
    }
}


/***************************************************************************/

/* FUNCTION */
static void
setsection(start)
boolean start;    /* if TRUE, this is the start of the bba section; else this is the end */

/*
 *    This routine is used prior to the declaration of any data
 *    bba inserts.  It puts things into sections...
 *
 */
{
    if (bbanosection)
    {
#pragma BBA_IGNORE /* no supported compiler has this!  However, the s300 does... */
       return;
    }

    if (start)
    {
       if ((*datasection != '\0') || (*constsection != '\0'))
       {
          fputs("#pragma SECTION ", fba);
          if (*datasection != '\0')
             fprintf(fba, "DATA=%s ", datasection);
          if (*constsection != '\0')
```

BEST AVAILABLE COPY

```
            fprintf(fba, "CONST=%s ", constsection);
         fputs("\n", fba);
      }
   }
   else
   {
      if ((*datasection != '\0') || (*constsection != '\0'))
         fprintf(fba, "#pragma SECTION UNDO\n");
   }
}
```

Feb 03 15:54 1988  pp/uniquename.c Page 1

```
/*
 * FILE      $Header: uniquename.c,v 1.3 87/08/31 14:27:26 hmgr Exp $
 *
 * AUTHOR       Bruce Erickson
 *
 * ONELINER Generate name of structure so it is unique
 *
 *    This generates a name (which will be used as the name of
 *    a structure or array) which is unique, because it
 *    maps directly to the sourcepath variable.
 *
 *    The name is reversed so that the most significant
 *    parts of the name come first (so that we don't create
 *    problems when the compiler only sees the first X
 *    characters of a variable name).
 *
 * CONDCOMP TEST     - compile a main for interactive testing
 *
 * TABSTOPS 3
 *
 * RCS      $Log: uniquename.c,v $
 * Revision 1.3  87/08/31  14:27:26  14:27:26  hmgr ()
 * Author: bae@hplsdlc.hp.com
 * changed algorithm to remove ".c" trailer
 *
 * Revision 1.2  87/07/10  10:31:06  10:31:06  hmgr ()
 * Author: bae@hplsdlc.hp.com
 * no comment
 *
 * Revision 1.1  87/04/16  13:04:15  13:04:15  bae (Bruce Erickson)
 * Initial revision
 *
 * Revision 1.1  87/04/16  13:04:15  13:04:15  bae (Bruce Erickson)
 * Initial revision
 *
 *
 */
```

BEST AVAILABLE COPY

```
static char rcsid[] = "$Header: uniquename.c,v 1.3 87/08/31 14:27:26 hmgr Exp $";
#include <stdio.h>
#include <boolean.h>

/* GLOBALS */

/* STATICS */

/* EXTERNALS */

/* FORWARD */


/*************************************************************************/


/* FUNCTION */
char *
uniquename(istring)
char *istring;

/*
 *    This takes the input string (istring) and converts it
 *    to an internal static that will be a legal C variable name.
 *    It is intended to make variables from path names
 *
 *    It will reverse the string as it goes...
 *
 *    \001-\037 add 0100
 *    (now char in range 040 thru 177)
 *    040-057 -> "_"
 *    072-100 -> "_"
 *    133-177 -> "_"
 *    if first character, "0" thru "9" will be converted to "a" thru "j"
 *
 *    If the file ends in ".c", the leading "c_" will be removed, which
 *    should give more significance in the first few bytes...
 *
 */
{
    static char mystring[1024];
    register char *iptr;           /* Scan thru istring (in reverse) */
    register char *optr;           /* Scan thru mystring (forwards) */
    register char ichar;           /* a specific character */
    register int bytecount = 0;    /* byte counter */

    optr = mystring;
    iptr = istring + strlen(istring) - 1;      /* start at end */

    if ((*iptr == 'c') && (*(iptr - 1) == '.'))
    {
       /* This ends in .c */
```

BEST AVAILABLE COPY

```
        iptr -= 2;      /* start before the ".c" */
    }

    do
    {
        ichar = *iptr--;
        if ((ichar >= '\001') && (ichar <= '\037'))
            ichar += '\100';
        if ((ichar >= ' ') && (ichar <= '/'))
            ichar = '_';
        if ((ichar >= ':') && (ichar <= '@'))
            ichar = '_';
        if ((ichar >= '[') && (ichar <= '`'))
            ichar = '_';
        if (ichar >= '{')
            ichar = '_';

        *optr++ = ichar;
    }
    while ((iptr >= istring) && (++bytecount < sizeof(mystring) - 1));

    *optr = '\0';      /* null terminate my string */

    /* Can't permit the first character to be numeric, so */
    ichar = mystring[0];
    if ((ichar >= '0') && (ichar <= '9'))
    {
        ichar += 'A' - '0';
        mystring[0] = ichar;
    }
    return(mystring);
}

#ifdef TEST

/***************************************************************************/

/* FUNCTION */
main()

/*
 *      Interactive testing of uniquename function.
 *
 */
{
    char input[2048];
    char *ptr;

    do
    {
        printf("string: ");
        fflush(stdout);
```

```
      if (gets(input) == NULL)
         exit(0);

      ptr = uniquename(input);
      fprintf(stderr, "input:  '%s'\n", input);
      fprintf(stderr, "output: '%s'\n", ptr);
   }
   while(TRUE);
}
#endif
```

Feb 03 15:54 1988  pp/yystype.h Page 1

```
/*
 * FILE      $Header: yystype.h,v 1.2 87/07/10 10:31:29 hmgr Exp $
 *
 * AUTHOR       Bruce Erickson
 *
 * ONELINER Definition of YYSTYPE
 *
 * TABSTOPS 3
 *
 * RCS       $Log: yystype.h,v $
 * Revision 1.2  87/07/10  10:31:29  10:31:29  hmgr ()
 * Author: bae@hplsdlc.hp.com
 * no comment
 *
 * Revision 1.1  87/04/16  16:17:14  16:17:14  bae (Bruce Erickson)
 * Initial revision
 *
 * Revision 1.1  87/04/16  16:17:14  16:17:14  bae (Bruce Erickson)
 * Initial revision
 *
 *
 */

typedef struct
{
   u_int32 general;
   int symnum;              /* symbol number - optional */
   u_int32 startbyte;       /* byte number of first byte in string */
   u_int32 endbyte;         /* byte number of last byte in string */
   char *optstring;         /* perhaps an optional string */
} YYSTRING;

/*************************************************************************/
/* This is the yystack type.  Although it is defined as a union,         */
/* usually only the type "string" is used                                */
/*************************************************************************/

```

BEST AVAILABLE COPY

BEST AVAILABLE COPY

```
typedef union
{
   int general;   /* general value.... */
   YYSTRING string;
} YYSTYPE;

#define SETSTRING(start, end, sym) yyval.string.startbyte = start.startbyte; \
                                   yyval.string.endbyte = end.endbyte; \
                                   yyval.string.symnum = sym.symnum;
```

Feb 03 15:54 1988  pp/domail.c Page 1

```
/*
 * FILE     $Header: domail.c,v 1.4 87/07/15 10:45:33 hmgr Exp $
 *
 * AUTHOR      Bruce Erickson
 *
 * ONELINER Mail data to 'bbacpp' mbox
 *
 * TABSTOPS 3
 *
 * CONDCOMP DOMAIL - if not defined, this file emits nothing.
 *
 * INSPECTED   date     - inspectors
 *
 * RCS      $Log: domail.c,v $
 * Revision 1.4  87/07/15  10:45:33  10:45:33  hmgr ()
 * Author: bae@hplsdlc.hp.com
 * Set up SIGPIPE to be ignored when running
 *
 * Revision 1.3  87/07/13  16:55:41  16:55:41  hmgr ()
 * Author: bae@hplsdlc.hp.com
 * Send stdout and stderr of mail command to /dev/null
 * (else problems with regression tests)
 *
 * Revision 1.2  87/07/10  10:24:32  10:24:32  hmgr ()
 * Author: bae@hplsdlc.hp.com
 * no comment
 *
 * Revision 1.1  87/07/01  12:36:20  12:36:20  bae (Bruce Erickson)
 * Initial revision
 *
 *
 */

#ifdef DOMAIL
   static char rcsid[] = "$Header: domail.c,v 1.4 87/07/15 10:45:33 hmgr Exp $";
   static char warning[] = "WARNING: THIS IS NOT PRODUCTION CODE";
#  include <stdio.h>
```

BEST AVAILABLE COPY

```
#   include <boolean.h>
#   include <pwd.h>
#   include <model.h>
#   include <signal.h>
#   include "probe.h"

    /* GLOBALS */

    /* STATICS */

    /* EXTERNALS */
    extern PROBETYPE probemask;
    extern char sourcepath[];
    extern u_int32 cbytenum;
    extern struct passwd *getpwnam();

    /* FORWARD */


    /*************************************************************************/

    /* FUNCTION */
    boolean
    testmail(user, givemsg)
    char *user;            /* user to mail to */
    boolean givemsg;       /* if TRUE, send a message to stderr on error */

    /*
     *     This checks to see if it is possible to send mail
     *     to user 'bbacpp'.  If not, this returns FALSE; else
     *     this returns TRUE.
     *
     *     The test is:
     *        1) TRUE if /usr/mail/bbacpp exists
     *        2) TRUE if /etc/passwd contains an entry for bbacpp
     *        3) FALSE otherwise
     *
     */
    {
       char mbox[100];
       struct passwd *pwent;

       sprintf(mbox, "/usr/mail/%s", user);

       if (access(mbox, 00) == 0)
          return(TRUE);            /* Mail box exists, so.... */

       /* Must check /etc/passwd..... */
       pwent = getpwnam(user);
       endpwent();         /* close file descriptor */
       if (pwent != NULL)
          return(TRUE);            /* We do have a user... */
```

BEST AVAILABLE COPY

```

    /* Ok.  USER is not in /usr/mail and is not in /etc/passwd. */
    if (givemsg)
    {
       fprintf(stderr, "Please set up the file %s to forward data\n", mbox);
       fprintf(stderr, "as described in the test-site documentation\n");
    }
    return(FALSE);
 }

 /*************************************************************************/

 /* FUNCTION */
 boolean
 domail(user, string, givemsg)
 char *user;           /* user to mail to */
 char *string;         /* unused */

 /*
  *    This routine will do it's level best to mail the
  *    specified string to 'user'.
  *
  *    If it can't, and givmsg is TRUE, send warning to stderr....
  *
  *    RETURNS TRUE if mail apparently worked, FALSE otherwise
  */
 {
    FILE *mail;
    char command[100];
    int (*prevfunc)();       /* previous SIGPIPE signal */


    sprintf(command, "/bin/mail %s >/dev/null 2>&1", user);

    mail = popen(command, "w");
    if (mail == NULL)
    {
       if (givemsg)
       {
          fprintf(stderr, "The command '%s' failed; please fix.\n", command);
       }
       return(FALSE);
    }

    /* Set up SIGPIPE to be ignored */
    prevfunc = signal(SIGPIPE, SIG_IGN);

    fprintf(mail, ":path %s\n", sourcepath);
    fprintf(mail, ":post-cpp-bytes %ld\n", cbytenum);
    fprintf(mail, ":numprobes %d\n", probenumprobes());
    fprintf(mail, ":options 0x%02X%02X%02X%02X\n",
             (probemask >> 24) & 0xff,
```

BEST AVAILABLE COPY

```
                    (probemask >> 16) & 0xff,
                    (probemask >> 8) & 0xff,
                    probemask & 0xff);

        pclose(mail);
        signal(SIGPIPE, prevfunc);    /* restore SIGPIPE */
        return(TRUE);
    }

#endif
```

Feb 03 15:54 1988  pp/gram/cpplines.c Page 1

```
/*
 * FILE     $Header: cpplines.c,v 1.12 88/01/06 18:47:49 hmgr Exp $
 *
 * AUTHOR       Bruce Erickson
 *
 * ONELINER Deal with the cpplines information...
 *
 *    These routines deal with information taken from the C PreProcessor.
 *    They are used by the grammar when we want to find out what text
 *    the compiler will read (like to get variable names, etc).
 *
 * TABSTOPS 3
 *
 * INSPECTED   date      - inspectors
 *
 * RCS      $Log: cpplines.c,v $
 * Revision 1.12  88/01/06  18:47:49  18:47:49  hmgr ()
 * Author: bae@hplsdlc.hp.com
 * got rid of some unused functions
 *
 * Revision 1.11  87/11/03  08:47:10  08:47:10  hmgr ()
 * Author: bae@hplsdlc.hp.com
 * If a previous syntax error has occurred, do not print
 * Out of push-back-line memory message (it might have been caused
 * by the previous syntax error)
 *
 * Revision 1.10  87/08/31  10:56:26  10:56:26  hmgr ()
 * Author: bae@hplsdlc.hp.com
 * initialize cpptext when we malloc areas
 *
 * Revision 1.9  87/08/24  19:52:22  19:52:22  hmgr ()
 * Author: bae@hplsdlc.hp.com
 * change circular buffer from being fixed length to being variable length
 *
 * Revision 1.8  87/07/29  13:34:47  13:34:47  hmgr ()
 * Author: bae@hplsdlc.hp.com
 * removed debug printf statements
```

BEST AVAILABLE COPY

```
 *
 * Revision 1.7  87/07/10  10:27:34  10:27:34  hmgr ()
 * Author: bae@hplsdlc.hp.com
 * no comment
 *
 * Revision 1.9  87/06/03  16:07:51  16:07:51  bae (Bruce Erickson)
 * Translated myabort()'s to syntax errors
 *
 * Revision 1.8  87/06/01  15:33:38  15:33:38  bae (Bruce Erickson)
 * LSDqf00328
 * Removed optimization in cgetoriglines() when cppstart == append -
 * that way, if the single character was generated by a macro we
 * get the correct column numbers....
 *
 * Revision 1.7  87/05/19  16:33:47  16:33:47  bae (Bruce Erickson)
 * 00233LSDqf
 * Fixed problem with inadvertant wrapping....
 *
 * Revision 1.6  87/04/01  16:15:51  16:15:51  bae (Bruce Erickson)
 * works with 'if', 'else', 'else-less-if', 'while', 'for'
 *
 * Revision 1.5  87/03/26  12:14:54  12:14:54  bae (Bruce Erickson)
 * added debugging output for cgetorignumbers()
 * added check in cgetorigstring() to see if the requested
 * bytes are in the "last" entry in the buffer.
 * added cfindentry() routine, since it was used in two places.
 * added cgetorignumbers()
 * added cmapcolumn()
 *
 * Revision 1.4  87/03/16  08:49:46  08:49:46  bae (Bruce Erickson)
 * default action (pass cpptext to output) works.
 * Removing comments when !passcomments works.
 *
 * Revision 1.3  87/03/09  16:21:47  16:21:47  bae (Bruce Erickson)
 * Before merging in new version of NXLS grammar & lex
 *
 * Revision 1.2  87/03/05  17:34:31  17:34:31  bae (Bruce Erickson)
 * Recovery of original text seems to work!
 *
 * Revision 1.1  87/02/17  16:15:49  16:15:49  bae (Bruce Erickson)
 * This seems to parse typedefs OK now
 *
 *
 */
static char rcsid[] = "$Header: cpplines.c,v 1.12 88/01/06 18:47:49 hmgr Exp $";
#include <stdio.h>
#include <model.h>
#include <boolean.h>
#include "nls.h"
#include "cppout.h"
#include "ba.h"
```

BEST AVAILABLE COPY

```
/*
 *     For now, the output from cpp is kept in a circular buffer of default length
 *     LINESKEEP.  The pointer 'addnext' is where the next line should
 *     be added.  if the boolean 'wrapped' is TRUE, data is valid from
 *     (addnext - 1) thru addnext (wrapped appropriately); if wrapped is FALSE,
 *     data is valid from (addnext - 1) thru 0
 *
 *     The memory 'cpptext' is allocated in the 'doreadline()' routine and
 *     never deallocated - only expanded as necessary.  The lexical analyzer
 *     reads from cpptext, too!
 *
 *     LINESKEEP is the default size of the buffer; it can be changed by using
 *     the -DBBA_OPTp<value> argument....
 */
#define LINESKEEP 64
#define MAXSTRING 1025      /* maximum string returned by 'cget*string()' routines */

/* GLOBALS */

/* STATICS */
static int lineskeep;          /* actual size of buffer */
static CPPLINE *buffer;
static CPPLINE *addnext;
static CPPLINE *addthis;
static boolean wrapped = FALSE;

/* EXTERNALS */
extern boolean exitwitherror;
extern char *malloc();
extern char *realloc();
extern void free();
extern boolean debugcppread;
extern boolean debugmapcol;
extern void printcpptext();

/* FORWARD */
extern void cgeterror();
extern CPPLINE *cfindentry();
extern char *cgetorigstring();


/****************************************************************************/

/* FUNCTION */
cpplinesinit(newlines)
int newlines;          /* if not -1, this is the default lines to keep */


/*
 *     This routine is called from main() to set up the
 *     buffer.  If newlines is -1, we will use LINESKEEP as the
 *     size of the buffer; else we will use whatever value the
```

BEST AVAILABLE COPY

```
 *      user specified.
 *
 */
{
    register int i;              /* count of buffer places initialized */
    register CPPLINE *cpptr;     /* buffer we are initializing */

    if (newlines == -1)
       lineskeep = LINESKEEP;
    else
       lineskeep = newlines;

    /* Allocate the buffer */
    buffer = (CPPLINE *) malloc(sizeof(CPPLINE) * lineskeep);

    /* Initialize the buffer */
    for (i = lineskeep, cpptr = buffer; i > 0; i--, cpptr++)
    {
       cpptr->cppbytes = 0;
       cpptr->cpptext = NULL;
       cpptr->origtext = NULL;
    }

    /* Add the first thing at buffer[0] */
    addnext = buffer;
}


/************************************************************************/

/* FUNCTION */
/* NO RETURN VALUE */
cgetnextcppline(text, numbytes)
char **text;            /* return text pointer to here */
int *numbytes;          /* return number of bytes in text to here */

/*
 *      This routine is called prior to calling caddcppline.
 *      In fact, you *must* call caddcppline after calling this!
 *      This will allocate an entry in the buffer for use -
 *      if none is unused, we will printcpptext() the oldest data and
 *      take it's place.
 *
 *      This will set the variable 'addthis' to the area we are
 *      allocating, and set 'addnext' to the next available entry.
 *
 *      Remember, the goal of these two routines is to keep the "cpp"
 *      text around for a while.  Another goal is to minimize allocations/
 *      reallocations, so the same data area is used over & over....
 *
 */
{
```

BEST AVAILABLE COPY

```
   /* The next available is "addnext" */

   if (wrapped)
   {
      /* We need to free a previously-occupied entry... */
      /* If the previous occupant had a origtext set, free up those resources */
      if (addnext->origtext != NULL)
      {
         freeorigtext(addnext->origtext);
      }

      if (!debugcppread)
      {
         /* If we haven't yet printed this line, do so now */
         printcpptext(addnext->endbyte);
      }
   }

   addthis = addnext;

   /* Increment addnext - wrap if necessary */
   if (++addnext >= &buffer[lineskeep])
   {
      wrapped = TRUE;
      addnext = &buffer[0];
   }

   *text = addthis->cpptext;
   *numbytes = addthis->cppbytes;
}


/****************************************************************************/

/* FUNCTION */
/* NO RETURN VALUE */
caddcppline(startbyte, fnum, origline, cpptext, cppbytes, origptr, cppend)
u_int32 startbyte;      /* data to stuff in the buffer */
int fnum;
int origline;
char *cpptext;          /* the malloc'd line */
int cppbytes;           /* number of bytes in cpptext */
ORIGTEXT *origptr;      /* NULL if no replacements done... */
char *cppend;           /* last character of cpptext */

/*
 *     This routine will add the passed data to 'addthis' (which
 *     is set by cgetnextcppline())
 *
 */
{
   /* Copy the necessary data to the current buffer */
```

BEST AVAILABLE COPY

```
      addthis->startbyte = startbyte;
      addthis->endbyte = startbyte + cppend - cpptext - 1;
      addthis->fname = fnum;
      addthis->origline = origline;
      addthis->cpptext = cpptext;
      addthis->cppbytes = cppbytes;
      addthis->origtext = origptr;

      if (debugcppread)
      {
         /* This code is to help test the cpp & cppread functions */
         ORIGTEXT *optr;      /* to scan thru list */
         char *original, *cppversion;
         char *nl;

         nl = cppend - 1;
         *nl = '\0';
         fprintf(stderr, "caddcppline: cpptext (%2d, %3d, %4ld) '%s'\n", fnum,
               origline, startbyte, cpptext);
         *nl = '\n';
         optr = addthis->origtext;
         while (optr != NULL)
         {
            fprintf(stderr, "                 %ld-%ld: '%s'\n",
                  optr->startbyte, optr->endbyte, optr->origtext);
            optr = optr->next;
         }

         original = cgetorigstring(startbyte, startbyte + (u_int32) strlen(cpptext) - (u_int32) 1,
               NULL, &cppversion);
         if (strcmp(original, cpptext) != 0)
         {
            nl = strlen(original) + original - 1;
            *nl = '\0';
            fprintf(stderr, "Original = '%s'\n", original);
            *nl = '\n';

            if (cppversion != NULL)
            {
               nl = strlen(cppversion) + cppversion - 1;
               *nl = '\0';
               fprintf(stderr, "cpp      = '%s'\n", cppversion);
               *nl = '\n';
            }
         }

         if (debugmapcol)
         {
            /* Debug mapping bytes to lines/columns in original text */
            u_int32 byte;
            u_int32 lastbyte;
            int sline, scol;
```

BEST AVAILABLE COPY

```
        int eline, ecol;
        int fnum2;

        for (byte = addthis->startbyte; byte <= addthis->endbyte; byte += 2)
        {
           lastbyte = byte + 1;
           if (lastbyte > addthis->endbyte)
              lastbyte = byte;
           cgetorignumbers(byte, lastbyte, &fnum2, &sline, &scol,
                 &eline, &ecol);
           original = cgetorigstring(byte, lastbyte, NULL, &cppversion);
           fprintf(stderr, "%4ld: %d, (%3d, %2d)->(%3d, %2d) '%s'\n", byte, fnum2,
                 sline, scol, eline, ecol, original);
        }
     }
   }
   return;
}


/*************************************************************************/

/* FUNCTION */
char *
cgetcppstring(startbyte, endbyte)
u_int32 startbyte;      /* first byte of string to get */
u_int32 endbyte;        /* last byte of string to get */

/*
 *    This routine will return the string that cpp sent us which
 *    starts at 'startbyte' and ends at 'endbyte'
 *    The returned string may be any size as it is a malloc'd area...
 *
 *    This routine is called to return:
 *       tokens
 *
 *    RETURN a pointer to a static string.
 */
{
   static char *rstring;                /* returned string */
   static int stringbytes = 0;          /* number of bytes allocated to rstring */
   register CPPLINE *cppptr;
   register char *dest;                 /* points to returned string */
   register char *src;                  /* points to source */
   register int numbytes;               /* so we can detect string overflow */
   register char c;                     /* a character from src */

   cppptr = cfindentry(startbyte);

   /* OK - cppptr now has the string with the startbyte in it... */
   src = (startbyte - cppptr->startbyte) + cppptr->cpptext;

```

BEST AVAILABLE COPY

```
    /* Set numbytes to the total number of bytes to copy.  This does
       not include the trailing \0 */
    numbytes = endbyte - startbyte + 1;

    /* If the string needs more room, allocate it! */
    if (numbytes >= stringbytes)
    {
       if (stringbytes != 0)
       {
          free(rstring);
       }
       stringbytes = LINEINC * ((numbytes / LINEINC) + 1);
       rstring = malloc(stringbytes * sizeof(char));
    }

    dest = rstring;

    /* Outer loop:  until we have all of the bytes, copy text
       from increasing lines */
    while (numbytes > 0)
    {
       /* src points to first byte in cpptext to copy from.
          numbytes is the number of bytes remaining to be copied.
          dest points to next byte to copy to.
          Do the byte copy here, to avoid doing a strlen.
       */

       while (((c = *src++) != '\0') && (numbytes-- != 0))
       {
          *dest++ = c;
       }

       /* Here if numbytes reached 0 or if we hit the end of the
          cpp text */
       if (numbytes <= 0)
          break;              /* Finished copying! */

       /* Need to move on to the next line */

       if (++cppptr == addnext)
       {
          cgeterror(TRUE);     /* fatal error; don't return */
       }
       if (cppptr >= &buffer[lineskeep])
          cppptr = &buffer[0];

       src = cppptr->cpptext;     /* start copying at start of line */
    }

    /* At this point, we have copied all of the data to the rstring... */
    *dest = '\0';      /* null terminate it */
    return(rstring);  /* rturn it's address */
```

BEST AVAILABLE COPY

```
.
}


/***********************************************************************/

/* FUNCTION */
static CPPLINE *
cfindentry(byte)
u_int32 byte;          /* byte to look for */

/*
 *    This routine is used to find the buffer entry that contains
 *    the specified byte ...
 *
 */
{
   register CPPLINE *cppptr;
   boolean wrapedonce = FALSE;          /* set to true first time we wrap looking
                                           for the start of data */

   cppptr = addnext;

   if (!wrapped)
   {
      /* In the bizarre case where there were less than LINESKEEP lines
         in the cppoutput, back up until we hit non-zero data */
      while (*cppptr->cpptext == NULL)
      {
         if (cppptr == &buffer[0])
         {
            cgeterror(FALSE);
         }
         cppptr--;
      }
      /* OK, found first line of data.  Increment cppptr so that the first
         decrement in the loop looks at the last data... */
      cppptr++;
   }
   else
   {
      /* We are often called to get rid of the oldest data.  Check if
         this is true in this case: */
      if (byte <= cppptr->endbyte)
      {
         /* yup.  Increment cppptr so that the in the following loop
            the first decrement points at the oldest line */
         cppptr++;
      }
   }

   /* Loop until
```

BEST AVAILABLE COPY

```
        1) find line that has the byte requested in it
        2) no more data (if !wrapped)
        3) the second wrap (if wrapped)
    */
    do
    {
        /* OK - didn't find it last time.  Decrement to next-most-recent
           line and try again */
        if (--cppptr < &buffer[0])
        {
            /* Wrap forward if wrapped is TRUE */
            if (!wrapped || wrapedonce)
            {
                /* woops - hit end of data... */
                cgeterror(TRUE);      /* fatal error; don't return */
            }
            wrapedonce = TRUE;        /* detect second wrap... */
            cppptr = &buffer[lineskeep - 1];
        }

        /* cppptr now points to a valid entry.... */
    }
    while ((cppptr->startbyte > byte) || (byte > cppptr->endbyte));

    /* Found the entry that contains 'byte' */
    return(cppptr);
}


/************************************************************************/

/* FUNCTION */
static
freeorigtext(origtext)
register ORIGTEXT *origtext;      /* pointer to head of ORIGTEXT linked lists */

/*
 *    This routine is used to free up resources allocated
 *    in cseperate()
 *
 */
{
    register ORIGTEXT *lastorigtext;

    while (origtext != NULL)
    {
        lastorigtext = origtext;
        origtext = origtext->next;
        free(lastorigtext->origtext);
        free(lastorigtext);
    }
}
```

BEST AVAILABLE COPY

```
/*************************************************************************/

/* FUNCTION */
char *
cgetorigstring(startbyte, endbyte, startfile, rcppstring)
u_int32 startbyte;        /* first byte of string to get */
u_int32 endbyte;          /* last byte of string to get */
int *startfile;           /* if non-NULL, return source file number that generated
                             the startbyte */
char **rcppstring;        /* if non-NULL, and if any difference between
                             original string and
                             what the compiler will see, this will be
                             what the compiler sees.  Else, this is set
                             to NULL. */

/*
 *     This routine will return the string that was sent to cpp which
 *     starts at 'startbyte' and ends at 'endbyte' (from cpp).
 *     The string may be any length, as we deposit it in a never-deallocated
 *     malloc'd area.
 *
 *     The line sent to the compiler (which you could get from
 *     cgetcppstring()) is returned in rcppstring if there were any
 *     <origtext> definitions between startbyte & endbyte.
 *
 *     We will attempt to reconstruct the original string using the
 *     following rules:
 *        if <origtext> is completely contained within start/end,
 *           <origtext> will replace origstart/origend bytes.
 *        if <origtext> completely contains start/end (plus a little
 *           on either side), <origtext> will completly replace origstart/end bytes
 *        if the last part of <origtext> is contained within start/end,
 *           (which can only happen at the start),
 *           <origtext> will replace from start to origend.
 *        if the first part of <origtext> is contained within start/end,
 *           (which can only happen at the end),
 *           <origtext> will replace from origstart thru end.
 *
 *     This routine is called to return:
 *
 *     RETURN a pointer to a static string.
 */
{
   static char *rstring;              /* returned string */
   static int stringbytes = 0;        /* number of bytes allocated to rstring */
   register CPPLINE *cppptr;
   register ORIGTEXT *optr;
   register char c;                   /* a character from src */
   register char *dest;               /* points to returned string */
   register char *src;                /* points to source */
```

BEST AVAILABLE COPY

```
    register int overflow = 0;          /* so we can detect overflows.... */
    char *origsrc;
    int cppstrlen;                      /* length of the cpp string */
    int offset;                         /* temporary */
    u_int32 nextbytenum;                /* next byte copied is .... */
    boolean someexpansion = FALSE;      /* set to TRUE if any <origtext>
                                           inserted.... */
    boolean wrapcheck;

    /* Whenever we assign a character to the destination buffer, we need to
       check if we need to increase the buffer size...  This macro uses
       "dest" as the destination pointer, and automitcally increments it
       after each assignment... */

#define DESTSET(c)   {  if (++overflow >= stringbytes) \
                        {\
                           rstring = realloc(rstring, \
                              (stringbytes = stringbytes + LINEINC) * sizeof(char));\
                           dest = rstring + (stringbytes - LINEINC - 1);\
                        }\
                        *dest++ = c;\
                     }

    /* Do an initial allocation of the string if not already done */
    if (stringbytes == 0)
       rstring = malloc((stringbytes = LINEINC) * sizeof(char));

    /* Find the entry with the startbyte in it */
    cppptr = cfindentry(startbyte);

    /* Return the startfile if requested */
    if (startfile != NULL)
       *startfile = cppptr->fname;

    optr = cppptr->origtext;

    /* OK - cppptr now has the string with the startbyte in it... */

    dest = rstring;
    src = (startbyte - cppptr->startbyte) + cppptr->cpptext;
    cppstrlen = cppptr->endbyte - cppptr->startbyte + 1;

    nextbytenum = startbyte;

    /* Outer loop:  until nextbytenum == (endbyte + 1), copy text
       from increasing lines.  Also, the top of this loop is
       executed after we need to check the next optr... */

    while (nextbytenum <= endbyte)
    {
       /* src points to first byte in cpptext to copy from.
          Keep copying until nextbytenum == (endbyte + 1)
```

```
      dest points to next byte to copy to.
      Scan thru optr's to check if nextbytenum is w/in
         a <original> text.
      Do the byte copy here, to avoid doing a strlen.
   */

   /* Find the first optr->end that is greater than or equal
      to nextbytenum.  It may be the current *optr....
      For the case where optr points to a macro that generates
      an emptry string, also check startptr.  In normal cases,
      startbyte is always less than startbyte.... in the empty
      string case, it is not... */

   while ((optr != NULL) && (optr->endbyte < nextbytenum) &&
         (optr->startbyte < nextbytenum))
      optr = optr->next;


   if ((optr != NULL) && (optr->startbyte <= nextbytenum))
   {
      someexpansion = TRUE;      /* flag that cpptext and origtext not
                                    going to be identical */
      /* We are now "within" a macro expansion.  Copy the original
         text to the destination */
      origsrc = optr->origtext;
      while ((c = *origsrc++) != '\0')
      {
         DESTSET(c);
      }

      nextbytenum = optr->endbyte + 1;
      if (nextbytenum > endbyte)
         break;       /* Can stop copying.... */

      /* move 'src' to the appropriate location in cppstring.
         If this goes beyond cppstring, set src to point to
         the \0 to force consideration of the next line
      */
      offset = nextbytenum - cppptr->startbyte;
      if (offset < cppstrlen)
         src = cppptr->cpptext + offset;
      else
         src = cppptr->cpptext + cppstrlen;

      if (optr->endbyte > optr->startbyte)
         continue;

      /* endbyte >= startbyte, which means that a macro was the emptry
         string.... */
      optr = optr->next;
   }
```

BEST AVAILABLE COPY

BEST AVAILABLE COPY

```
        /* If here, there may be some bytes in cpptext that must be
           copied to dest before we start up in the origtext
        */

        /* copy from src until nextbytenum > endbyte, or nextbytenum
           is == optr->start or *src == \0 */

        while (((c = *src++) != '\0') && (nextbytenum <= endbyte) &&
              ((optr == NULL) || (nextbytenum != optr->startbyte)))
        {
           DESTSET(c);
           nextbytenum++;
        }

        if (nextbytenum > endbyte)
           break;         /* the copy (above) finished us out!!! */

        if ((optr != NULL) && (nextbytenum == optr->startbyte))
              continue;         /* go to top of loop and start copying from origtext */

        /* if we stopped becasue *src was == \0, go on to next cpptext line */
        if (c != '\0')
           continue;

        /* At this point, we need to find a source line again..... */
        /* Loop until
           1) find line that has the startbyte requested in it
           2) no more data
        */
        wrapcheck = FALSE;
        do
        {
           /* OK - didn't find it last time.  Move on to next
              line and try again */
           if (++cppptr > &buffer[lineskeep - 1])
           {
              /* Wrap backwards if we need to */
              if (wrapcheck)
              {
                 /* woops - hit end of data... */
                 cgeterror(TRUE);      /* fatal error; don't return */
              }
              cppptr = &buffer[0];
              wrapcheck = TRUE;     /* if we wrap again, give error */
           }

           /* cppptr now points to a valid entry.... */
        }
        while ((cppptr->startbyte > nextbytenum) || (cppptr->endbyte < nextbytenum));

        src = (nextbytenum - cppptr->startbyte) + cppptr->cpptext;
        cppstrlen = cppptr->endbyte - cppptr->startbyte + 1;
```

BEST AVAILABLE COPY

```
      optr = cppptr->origtext;
   }

   /* At this point, we have copied all of the data to the rstring... */

   DESTSET('\0');


   /* If caller desires the cpp version too... */
   if (rcppstring != NULL)
   {
      /* If there was some expansion, get the cppstring.... */
      if (someexpansion)
      {
         *rcppstring = cgetcppstring(startbyte, endbyte);
      }
      else
      {
         *rcppstring = NULL;
      }
   }

   return(rstring);  /* rturn it's address */

}


/**************************************************************************/

/* FUNCTION */
/* NO RETURN VALUE */
cgetorignumbers(cppstart, cppend, rfilenum, rstartline, rstartcol,
      rendline, rendcol)
u_int32 cppstart;        /* byte number at start */
u_int32 cppend;          /* byte number at end.  May be same as cppstart */
int *rfilenum;           /* file number the line(s) originated in */
int *rstartline;         /* line at the start of the text */
int *rstartcol;          /* column number of start of text.  0 = first column */
int *rendline;           /* line at the end of the text */
int *rendcol;            /* column number of end of text.  0 = first column */

/*
 *    This routine is called to translate the specifed text (start/end)
 *    byte numbers to the original file's start and end line/column information.
 *
 *    Note that even if cppstart and cppend are the same, we cannot simply
 *    copy the data over - consider the case where a macro generates
 *    a single character!
 */
{
   register CPPLINE *cppptr;     /* current cppline information */
   int numnewlines;              /* number of \n's between line start and column */
```

BEST AVAILABLE COPY

```

    /* find position of starting byte */
    cppptr = cfindentry(cppstart);
    *rfilenum = cppptr->fname;
    *rstartcol = cmapcolumn(cppptr, cppstart, TRUE, &numnewlines);
    *rstartline = cppptr->origline + numnewlines;

    /* find position of ending byte */
    cppptr = cfindentry(cppend);
    *rendcol = cmapcolumn(cppptr, cppend, FALSE, &numnewlines);
    *rendline = cppptr->origline + numnewlines;
}

/***********************************************************************/

/* FUNCTION */
int
cmapcolumn(cppline, byte, start, rnumlines)
register CPPLINE *cppline;          /* cppline that contains byte */
u_int32 byte;                       /* bytre number */
boolean start;                      /* if TRUE, byte is at beginning of a token;
                                       else it is at the end */
int *rnumlines;                     /* number of \n's we encounter */

/*
 *    This routine will return the original column number assocaited
 *    with 'byte'.  It will take into account any macro expansions
 *    between the beginning of the line and 'byte'.  There are some problems
 *    associated with macros, however:
 *
 *    if byte is not within a macro expansion
 *       we can know the mapping of origcolumn -> cppcolumn exactly.
 *    else
 *       there is no one-to-one mapping of original text with macro expansion.
 *       In this case, if 'start' is true:
 *          return the original column of the macro invocation's first character
 *       else
 *          return the original column of the macro invocation's last character
 *
 *    RETURN is the column number in the original text that generated 'byte'.
 */
{
   register int ccol;           /* current column */
   register ORIGTEXT *optr;     /* original text list */
   register char *ptr;
   u_int32 cbyte;               /* current byte */

   /* Assume we find no \n's */
   *rnumlines = 0;

   /* set 'cbyte' to the byte at the beginning of the line. */
   cbyte = cppline->startbyte;
```

BEST AVAILABLE COPY

```
    /* Set 'ccol' to zero (i.e., first column of a line is the zeroth column */
    ccol = 0;

    optr = cppline->origtext;

    while (TRUE)
    {
       /* If byte is between current byte and next output byte, we have it
          made in the shade... */
       if ((optr == NULL) || (byte < optr->startbyte))
       {
          /* 'byte' is in a section of text *not* generated by a macro */
          ccol += byte - cbyte;
          return(ccol);
       }

       /* At this point, we know that byte is 'beyond' the starting byte
          of a macro invocation.  If byte is <= end of the macro invocation
          we need to do something special: */

       if (byte <= optr->endbyte)
       {
          /* Special handling: if 'start' is TRUE, return the column
             offset of the beginning of the macro invocation; else
             return it's ending column
          */
          if (start)
          {
             ccol += optr->startbyte - cbyte;
          }
          else
          {
             /* Massive special handling!
                It is allowable to have \n's embeded into the macro invocation.
                To handle this, we need to scan thru looking for \n's.  When
                we find one, we need to increment rlinenum and reset ccol to 0
             */
             ccol += optr->startbyte - cbyte - 1;   /* value just before beginning of macro */
             for (ptr = optr->origtext; *ptr != '\0'; ptr++)
             {
                ccol++;
                if (*ptr == '\n')
                {
                   ccol = -1;
                   (*rnumlines)++;
                }
             }
          }
          return(ccol);
       }
```

BEST AVAILABLE COPY

```
        /* At this point, we know that byte is beyond a macro invocation.
           We need to 'move' ccol over to the end of the macro incovation
           and continue our scan.  Note that we still have to deal with new-lines
           embedded in macro invocations, so we still do a slow scan over the
           original text...
        */
        ccol += optr->startbyte - cbyte - 1;   /* value just before beginning of macro */
        for (ptr = optr->origtext; *ptr != '\0'; ptr++)
        {
           ccol++;
           if (*ptr == '\n')
           {
              ccol = -1;
              (*rnumlines)++;
           }
        }
        cbyte = optr->endbyte;      /* update cppbyte pointer */
        optr = optr->next;
    }
}


/* /************************************************************************/
/*
/* /* FUNCTION */
/* int
/* cgetsourcenum(byte)
/* u_int32 byte;          /* byte to look for */
/*
/* /*
/*  *     This routine is called to determine what source file
/*  *     emitted the specified byte.
/*  *
/*  */
/* {
/*    register CPPLINE *cppptr;     /* current cppline information */
/*    cppptr = cfindentry(byte);
/*    return(cppptr->fname);
/* } */


/*************************************************************************/

/* FUNCTION */
static void
cgeterror(outofbuf)
boolean outofbuf;    /* if TRUE, we are out of buffer; else unknown problem */

/*
 *    This routine is called when we are looking for a line
 *    and the line is not in the buffer.  This can hapen
 *    when there are more than LINESKEEP lines between the
```

BEST AVAILABLE COPY

```
 *     last line we read in the and line we need.
 *
 *     If we have had no previous errors, this will generate
 *     an error message and exit; else this just exits...
 *
 */
{

   if (outofbuf)
   {
      if (!exitwitherror)
      {
         /* No previous (syntax?) error.... */
         cerror(NULL);      /* generate the line number and set flags */
         fprintf(stderr,
               "Out of push-back-line memory; use -DBBA_OPTpNNN, where NNN is greater than %d\n",
               lineskeep);
      }
   }
   else
   {
      cerror("Syntax error");
   }
   exit(1);
}
```

Feb 03 15:54 1988 pp/gram/cread.c Page 1

```
/*
 * FILE      $Header: cread.c,v 1.10 87/11/18 10:39:21 hmgr Exp $
 *
 * AUTHOR       Bruce Erickson
 *
 * ONELINER Read-from-cpp routines for C grammar
 *
 * TABSTOPS 3
 *
 * INSPECTED   date     - inspectors
 *
 * RCS       $Log: cread.c,v $
 * Revision 1.10  87/11/18  10:39:21  10:39:21  hmgr ()
 * Author: bae@hplsdlc.hp.com
 * if error, use cerror to point it out!
 *
 * Revision 1.9  87/11/10  10:19:44  10:19:44  hmgr ()
 * Author: bae@hplsdlc.hp.com
 * Deal with any size of original text (instead of core dumping when
 * it exceeds MAX_LINE)
 *
 * Revision 1.8  87/10/26  13:12:21  13:12:21  hmgr ()
 * Author: bae@hplsdlc.hp.com
 * Fixed problem when subsequent reads to find the ^C needed to
```

BEST AVAILABLE COPY

```
extern char *realloc();
extern FILE *finput;     /* if reading from external cpp */
extern char **cppoptions;
extern int numcppoptions;

/* FORWARD */
extern char *doreadline();
extern boolean cseperate();


/**********************************************************************/

/* FUNCTION */
char *
cgets(line, ignored, instream)
char **line;            /* return address of line to here */
int ignored;            /* max. length of line - ignored! */
FILE *instream;            /* stream to read from */

/*
 *     This routine is called by the lexical analyzer
 *     for the C grammar to get input that has been
 *     preprocessed.
 *
 *     If we are using an internal cpp, we will:
 *        read from instream
 *        remove any <origtext> data from the line
 *        create a CPPLINE data structure for this line
 *
 *     For simplicity, we will read in a line all the way to the
 *     \n, regardless of it's length...
 *
 *     RETURN   pointer to line if successful
 *              NULL if end-of-file, or other error...
 */
{
   ORIGTEXT *origptr;
   u_int32 firstcppbyte;
   boolean firstline = TRUE;     /* false for calls to pick up \003 data */
   char *endofcpptext;           /* last character of cpptext */
   char *lineptr;
   int prevsize;                 /* size of line.... */

   /* Fetch a malloc'd area from cpplines buffer to read the line into */
   cgetnextcppline(&readline, &linebytes);

   /* Fetch (the first) cppline */
   if (doreadline(readline, instream) == NULL)
   {
      *line = readline;
      return(NULL);
   }
```

BEST AVAILABLE COPY

```
 * reallocate the readline - lineptr was not being updated!
 *
 * Revision 1.7  87/07/29  13:34:21  13:34:21  hmgr ()
 * Author: bae@hplsdlc.hp.com
 * Changed error statements to be preceeded by invokedname
 *
 * Revision 1.6  87/07/10  10:27:19  10:27:19  hmgr ()
 * Author: bae@hplsdlc.hp.com
 * no comment
 *
 * Revision 1.6  87/06/01  12:09:26  12:09:26  bae (Bruce Erickson)
 * *** empty log message ***
 *
 * Revision 1.5  87/04/01  16:16:04  16:16:04  bae (Bruce Erickson)
 * works with 'if', 'else', 'else-less-if', 'while', 'for'
 *
 * Revision 1.4  87/03/26  12:14:20  12:14:20  bae (Bruce Erickson)
 * added cread() routine
 *
 * Revision 1.3  87/03/16  08:49:56  08:49:56  bae (Bruce Erickson)
 * default action (pass cpptext to output) works.
 * Removing comments when !passcomments works.
 *
 * Revision 1.2  87/03/05  11:25:43  11:25:43  bae (Bruce Erickson)
 * This version correctly scans the input looking for
 * <original> texts, asking for more lines as necessary.
 * It also packs up <original> into ORIGTEXT linked lists
 * appropriately
 *
 * Revision 1.1  87/02/17  16:15:52  16:15:52  bae (Bruce Erickson)
 * This seems to parse typedefs OK now
 *
 *
 */
static char rcsid[] = "$Header: cread.c,v 1.10 87/11/18 10:39:21 hmgr Exp $";
#include <stdio.h>
#include <model.h>
#include <boolean.h>
#include "nls.h"
#include "cppout.h"
#include "ba.h"

/* GLOBALS */

/* STATICS */
static u_int32 nextcppbyte = 1;      /* Next byte to read from cpp */
static char *readline;               /* malloc'd area to read line into */
static int linebytes;                /* number of bytes in readline */

/* EXTERNALS */
extern char invokedname[];
extern char *malloc();
```

BEST AVAILABLE COPY

```
    /* Seperate the line into cpptext and original text */
    origptr = NULL;
    lineptr = readline;
    firstcppbyte = nextcppbyte;

    while (cseperate(&nextcppbyte, firstline, lineptr, &origptr,
          &endofcpptext))
    {
       /* Need more data (we read a \002 but not the corresponding
          \003)....  Append at end of current line */

       lineptr = (prevsize = strlen(readline)) + readline;
       if (doreadline(lineptr, instream) == NULL)
       {
          fprintf(stderr, "%s: ERROR: cgets: unexpected EOF while searching for a \\003\n",
                invokedname);
          abort();
       }
       firstline = FALSE;
       /* set lineptr to the start of the new text.  Note that since
          readline may have been realloc'd, we will need to recalculate
          lineptr */
       lineptr = readline + prevsize;
    }

    caddcppline(firstcppbyte, cgetfilesymnum(), cgetline(), readline, linebytes, origptr,
          endofcpptext);

    /* The lexical analyzer also wants a pointer to this malloc'd line */
    *line = readline;
    return(readline);
 }


 /**************************************************************************/

 /* FUNCTION */
 static char *
 doreadline(startptr, stream)
 register char *startptr;       /* start putting data at ... */
 FILE *stream;                  /* stream to read from */

 /*
  *    This routine will read an entire line (regardless of the
  *    size) into 'readline' starting at 'startptr'.  'readline'
  *    is a malloc'd area with 'linebytes' bytes current allocated
  *    to it.
  *
  *    The line returned is guaranteed to end in a \n, even if
  *    the file ended without one.
  *
```

BEST AVAILABLE COPY

```
 *      returns NULL if EOF found and no data read in;
 *              else returns readline
 */
{
   int numbytesleft;     /* number of bytes left we can read into */
   boolean firstread = TRUE;  /* set to FALSE after we have read something */

   if (linebytes == 0)
   {
      /* Never been called before... */
      startptr = readline = malloc((linebytes = LINEINC) * sizeof(char));
   }

   /* Calculate max line size we can read */
   numbytesleft = linebytes - (startptr - readline);

   while(TRUE)
   {
      if (fgets(startptr, numbytesleft, stream) == NULL)
      {
         if (firstread)
            return(FALSE);
         /* Not the first read, but haven't hit \n yet, either.
            In this case, append a \n \0 and return
         */
         *startptr++ = '\n';
         *startptr = '\0';
         return(readline);
      }
      firstread = FALSE;       /* We read some data OK */

      /* We don't know how many bytes were read in, so must scan
         to the end of the string and check if it was a \n */

      if (startptr[strlen(startptr) - 1] == '\n')
      {
         /* OK, we have read in the entire line.  Return */
         return(readline);
      }
      /* Failed to read in an entire line.  Increase size of line
         and read some more */

      readline = realloc(readline, (linebytes = (linebytes + LINEINC)) * sizeof(char));

      /* position startptr at the current \0, which the fgets put at
         readline[previous linebytes] */
      startptr = readline + (linebytes - LINEINC - 1);      /* faster than a strlen */

      /* Calculate number of bytes left as additional amount allocated + 1.
         The additional byte because we get to re-use the \0 from the previous allocation
      */
      numbytesleft = LINEINC + 1;
```

BEST AVAILABLE COPY

```
    }
}


/****************************************************************************/

/* FUNCTION */
boolean
cseperate(startbyte, initstate, cpptext, origptr, endofcpptext)
u_int32 *startbyte;     /* the text starts at startbyte.  When we return,
                           we will always set this to be the next startbyte. */
boolean initstate;      /* if TRUE, start looking for a \001; else
                           we are already looking for a \003 */
char *cpptext;          /* line from (maybe internal) cpp */
ORIGTEXT **origptr;     /* If we hit EOF before finding \003:
                              set to last ORIGTEXT generated.  Else
                           set to first ORIGTEXT generated.  It is
                           expected that the caller always calls us with
                           the last value we returned! */
char **endofcpptext; /* return pointer to last position in cpptext */

/*
 *    This will scan for "exceptions" of the form:
 *       \001<result>\002<original>\003
 *    which means that
 *       <result> is the result of a replacement operation
 *       <original> is the original text that generated the replacement.
 *
 *    This will remove the \001, and from \002 thru \003 from
 *    the 'cpptext'.
 *
 *    The data from \002 thru \003 will be added to a ORIGTEXT structure.
 *
 *    Note that <result> will always be on one line (cpp demands it),
 *    but that <original> may be more than one line.
 *    If <original> is more than one line, it will be immediately followed
 *    by a #line <number> directive....
 *
 *    If we hit EOF while looking for a \003, this returns TRUE.  Else,
 *    this returns FALSE.
 */
{
   register char *src;
   register char *dest;
   char c;
   register u_int32 nextbyte;     /* byte offset of the next byte that
                                     will be put in the cpptext */
   u_int32 firstorigbyte;         /* offset of the first original byte */

   register char *origtext;       /* copy next <original> character to here */
   register ORIGTEXT *neworig;
   ORIGTEXT *lastorig;
   static ORIGTEXT *firstorig;    /* Note that this is set only in initstate */
```

BEST AVAILABLE COPY

```
int offset;

src = dest = cpptext;
if (initstate)
{
   nextbyte = *startbyte;
   firstorig = lastorig = NULL;
}
else
{
   lastorig = neworig = *origptr;
   nextbyte = *startbyte;
   origtext = neworig->origtext + strlen(neworig->origtext);
}

while(TRUE)
{
   /* At the start of this loop, we are copying data from
      src to dest, and are looking for a \001
   */

   if (initstate)
   {
      if ((c = *src++) != '\001')
      {
         /* Note that if dest == start no damage is done by setting
            *dest to c.  On the other hand, we need to increment dest
            anyway, and checking to see if dest == src would waste time
         */
         *dest++ = c;
         if (c == '\0')
            break;
         nextbyte++;
         continue;
      }

      /*****************************************************************/
      /*    Found a \001                                               */
      /*****************************************************************/

      /* At this point, "src" points to the first <result> character, and
         "dest" points where the \001 would have been copied to (but wasn't)

         We will continue copying data over until the \002 is found
      */

      firstorigbyte = nextbyte;
      while ((c = *src++) != '\002')
      {
         *dest++ = c;

         if (c == '\0')
```

BEST AVAILABLE COPY

```
            {
               cerror(NULL);
               fprintf(stderr, "ERROR: cscanorigtext: unexpected \\0 when looking for \\002\n");
               abort();
            }
            nextbyte++;
         }

         /*******************************************************************/
         /*                                                                 */
         /*    Found a \002                                                 */
         /*******************************************************************/

         /* At this point, "src" points to the first <original> character */

         /* Generate an origtext structure */
         neworig = (ORIGTEXT *) malloc(sizeof(ORIGTEXT));
         if (firstorig == NULL)
            lastorig = firstorig = neworig;
         else
         {
            lastorig->next = neworig;     /* link this one up */
            lastorig = neworig;
         }

         neworig->startbyte = firstorigbyte;
         neworig->endbyte = nextbyte - (u_int32) 1;
         neworig->next = NULL;      /* this is the end of the list */

         neworig->origtext = origtext = malloc(LINEINC * sizeof(char));
         neworig->numbytes = LINEINC - 1;
      }

      while ((c = *src++) != '\003')
      {
         /* Note that this is *not* copied over to dest, but instead to
            origtext! */
         if ((origtext - neworig->origtext) >= neworig->numbytes)
         {
            /* Must increase size of original text */
            offset = origtext - neworig->origtext;    /* see below */

            neworig->origtext = realloc(neworig->origtext, sizeof(char) *
                  ((neworig->numbytes += LINEINC) + 1));
            origtext = neworig->origtext + offset;
         }

         *origtext++ = c;

         /* Note that nextbyte is not incremented here, because this data
            is never seen by the grammar */

         if (c == '\0')
```

BEST AVAILABLE COPY

```
            {
                /* OK - we need another line here... */
                *origptr = neworig;
                *startbyte = nextbyte;
                *dest = '\0';           /* start appending to here... */
                return(TRUE);
            }
        }

        /*******************************************************************/
        /*    Found a \003                                                 */
        /*******************************************************************/

        /* src is already pointing one character beyond the \003 */

        /* Create a string which will hold the original stuff */
        *origtext = '\0';     /* show end-of-line */

        initstate = TRUE;     /* Start looking for a \001 */
    }

    /* Reach here via 'break', at the end ofthe line */
    *startbyte = nextbyte;
    *origptr = firstorig;

    *endofcpptext = dest - 1;
    return(FALSE);     /* no need to get another line */
}


/**************************************************************************/

/* FUNCTION */
u_int32
clastcppbyte()

/*
 *    This routine returns the byte number of the last
 *    byte read from the cpp output.  It is called from
 *    the grammar when we want to finish flushing the file -
 *
 */
{
   return(nextcppbyte - 1);
}


/**************************************************************************/

/* FUNCTION */
char *
creadahead(instream)
```

BEST AVAILABLE COPY

```
FILE *instream;                  /* stream to read from */

/*
 *    This routine is used to "read ahead" of the normal input.
 *    It is called when we must read ahead to determine what type
 *    of token we should return, but do not want to enter the data
 *    we read into thebuffer yet.  It is assumed that the system that
 *    that calls this saved the stream pointer prior to the first call,
 *    and restored it after the last call!
 *
 */
{
   static char *myline;
   static int mylinebytes = 0;      /* number of bytes in 'myline' */

   readline = myline;
   linebytes = mylinebytes;

   myline = doreadline(myline, instream);
   mylinebytes = linebytes;

   return(myline);
}
```

Feb 03 15:54 1988  pp/gram/csource.c Page 1

```
/*
 * FILE     $Header: csource.c,v 1.8 88/01/06 18:47:41 hmgr Exp $
 *
 * AUTHOR      Bruce Erickson
 *
 *    This routine deals with sources from the compiler's standpoint.
 *    It wants a 'current line number' and a 'current source file'
 *
 * ONELINER routines dealing with sources - current line number & file, etc
 *
 * TABSTOPS 3
 *
 * RCS      $Log: csource.c,v $
 * Revision 1.8  88/01/06  18:47:41  18:47:41  hmgr ()
 * Author: bae@hplsdlc.hp.com
 * got rid of some unused functions
 *
 * Revision 1.7  87/11/03  08:47:02  08:47:02  hmgr ()
 * Author: bae@hplsdlc.hp.com
 * update to AxLS's cpp
 *
 * Revision 1.5  87/10/14  15:07:21  15:07:21  hmgr ()
 * Author: bae@hplsdlc.hp.com
 * Removed cinccolumn for speed reasons.
 *
 * Revision 1.4  87/08/24  19:52:08  19:52:08  hmgr ()
```

BEST AVAILABLE COPY

```
 * Author: bae@hplsdlc.hp.com
 * changes to make lint happy
 *
 * Revision 1.3  87/07/10  10:26:43  10:26:43  hmgr ()
 * Author: bae@hplsdlc.hp.com
 * no comment
 *
 * Revision 1.3  87/06/03  16:07:28  16:07:28  bae (Bruce Erickson)
 * Translated myabort()'s to syntax errors
 *
 * Revision 1.2  87/03/26  12:18:24  12:18:24  bae (Bruce Erickson)
 * call wmapsource() the first time a filename is read in.
 *
 * Revision 1.1  87/02/17  16:15:54  16:15:54  bae (Bruce Erickson)
 * This seems to parse typedefs OK now
 *
 *
 */
static char rcsid[] = "$Header: csource.c,v 1.8 88/01/06 18:47:41 hmgr Exp $";
#include <stdio.h>
#include <model.h>
#include <boolean.h>
#include "csym.h"
#include "smithdate.h"

/* GLOBALS */
int currentcolumn = -1; /* column we just read.  This is adjusted by lex.cl */

/* STATICS */
static int currentline = 0;             /* the line # we just read */
static char *currentpath = NULL;        /* path of the current file */
static int cpathsymnum;                 /* currentpath's symbol number */
static char dateseperators[] = " \t,"; /* seperators betwee yyyy and mm (etc) */

/* EXTERNALS */
extern char *strtok();
extern boolean smithfromdate();
extern void cerror();
extern void free();
extern char homedir[];
extern char *strapp();
extern char *fnametopath();
extern boolean startyy;
extern int startdebug;
extern int yydebug;

/* FORWARD */


/***************************************************************************/

/* FUNCTION */
```

BEST AVAILABLE COPY

```
void
csetfname(fname, datestr)
char *fname;              /* file name - may not be a path */
char *datestr;            /* possibly the date string, yyyy,mm,dd,hh,mm,ss */

/*
 *    This routine will convert fname to an absolute path (if necessary),
 *    and stash it in currentpath.  The previous path will be free'd
 *
 *    This will add the path to the csymbol table (if it's no already
 *    there), and set cpathsymnum to it's path value...
 *
 *    If this is the first time this filename is encountered,
 *    datestr is converted to a smithdate, which is passed
 *    to wmapsource
 *
 */
{
   char *newpath;      /* from fnametopath() routine */
   SYMINFO *junk;      /* only because cgetsym() call needs it */
   int scope;          /* who cares - only because cgetsym() call needs it */
   SMITHTIME smdate; /* if we need this */
   char smdateascii[20];   /* smith date converted to ascii */
   int units[8];       /* yy,mm,dd,hh,mm,ss,mm,uu (smithdate accepts these) */
   char *ptr;          /* pointer to a yy (etc) */
   int i;              /* index into units */

   newpath = fnametopath(homedir, fname);

   if (currentpath != NULL)
   {
      free(currentpath);
   }
   currentpath = strapp(NULL, newpath);

   if ((cpathsymnum = cgetsym(currentpath, &scope, &junk, M_FILE)) == -1)
   {
      /* First time this file has been found */
      cpathsymnum = caddsym(TRUE, currentpath, M_FILE);

      /* set all of 'units' to 0 */
      for (i = 0; i < sizeof(units) / sizeof(int); i++)
         units[i] = 0;

      /* Convert datestr to a smithdate.  Use as much precision as
         provided and smithdate will accept....
         If we cannot get any, we will call a different routine to fetch
         the date (i.e., retain the capibility of not *needing* to have
         it supplied by AxLS's cpp)
      */
      ptr = strtok(datestr, dateseperators);
      for (i = 0;
```

```
            (i < sizeof(units) / sizeof(int)) && (ptr != NULL) && ((*ptr >= '0') && (*ptr <= '9'));
            i++, ptr = strtok(NULL, dateseperators))
        {
            units[i] = atoi(ptr);
        }

        if (i != 0)
        {
            /* There was some date information available - convert to smithdate &
               fetch the buffer */

            if (!smithfromdate(units[0], units[1], units[2], units[3], units[4], units[5],
                    units[6], units[7], &smdate))
            {
#               pragma BBA_IGNORE
                /* Date failed conversion.  Notify ourselves of that */
                smdate = smithillegal;
            }
            strcpy(smdateascii, smithtostore(&smdate));
        }
        else
        {
            /* There was *no* date information available on the # <number> <file> line.... */
            /* Need to create that information */
            getmodtime(fname, smdateascii);
        }

        wmapsource(cpathsymnum, currentpath, smdateascii);    /* add to map file */
    }
}


/****************************************************************************/

/* FUNCTION */
char *
cgetfilename()

/*
 *    returns the current path name.
 *
 */
{
    if (currentpath == NULL)
        return("");
    return(currentpath);
}


/****************************************************************************/
```

BEST AVAILABLE COPY

BEST AVAILABLE COPY

```
/* FUNCTION */
int
cgetfilesymnum()

/*
 *     returns the symbol number of the current path name
 *
 */
{
   return(cpathsymnum);
}


/****************************************************************************/

/* FUNCTION */
void
csetline(lineno)
int lineno;            /* line number we just read */

/*
 *     This routine is called to set the compiler's line number.
 *     If a line of the form
 *        #[line] <number> "filename"
 *     is found, this routine is called with <number>-1... so that when
 *     the next line is found cincline() sets the line appropriately...
 *     (because <number> is the number of the line which FOLLOWS the #
 *
 *     This also sets column to '-1'
 *
 */
{
   currentline = lineno;
   currentcolumn = -1;
}


/****************************************************************************/

/* FUNCTION */
int
cincline()

/*
 *     This routine increments line - called when we read a line
 *     Also resets currentcolumn to -1
 *
 *     If we requested a yydebug, this will see if we have hit the
 *     requested line.  If we have, we will set yydebug to TRUE.
 */
{
```

BEST AVAILABLE COPY

```
    currentline++;
    currentcolumn = -1;

    if (startyy)
       if (startdebug <= currentline)
       {
          startyy = FALSE;
          yydebug = 1;
       }

    return(currentline);
}

/**************************************************************************/

/* FUNCTION */
int
cgetline()

/*
 *    Returnst he line number of the line we are processing.
 *
 */
{
   return(currentline);
}


/**************************************************************************/

/* FUNCTION */
void
cdeccolumn()

/*
 *    called when we just un-read a character.
 *
 */
{
   if (currentcolumn != -1)
      currentcolumn--;
   else
   {
      /* hmm.  This should not happen! */
      cerror("Attempt to decrement column too much");
      currentcolumn = -1;
   }
}
/*
/*
/* /**************************************************************************/
/*
```

BEST AVAILABLE COPY

```
/* /* FUNCTION */
/* int
/* cgetcolumn()
/*
/* /*
/*  *    returns the current column
/*  *
/*  */
/* {
/*    return(currentcolumn);
/* } */
Feb 05 15:54 1988  pp/gram/cvtgram Page 1
#!/bin/sh
#  Convert NLS grammar file to one for our use
#  usage:
#     cvtgram <nls_grammar> <outfile> <default_type> [<preamble> [<postamble>]
#        default_type is a string
#        preamble is a file to put at the beginning of the file
#        postamble is a file to put at the end of the file
#
#  example:
#     cvtgram nlsgram.y mygram.y "string" pre.dat post.dat
#
#  output:
#     [preamble]
#     %%
#     %token <default_type> <list of terminals>
#     %type <default_type> <list of non-terminals>
#     %%
#     [postamble]

#  WARNING:
#     assumes that all nonterminals begin in column 1!

if [ $# -lt 3 ]
then
   echo "Usage: $0 <nls_grammar> <output_file> <default_type> [<preamble> [postamble>]]"
   exit 1
fi

NLS=$1
OUT=$2
DEFAULTTYPE="$3"
PREAMBLE=""
POSTAMBLE=""
if [ $# -ge 4 ]
then
   PREAMBLE=$4
   if [ $# -ge 5 ]
   then
      POSTAMBLE=$5
```

BEST AVAILABLE COPY

```
    fi
fi


#  Temporary file definitions
STRIPPED=stripped        # grammar stripped of header, programs, and actions
NOCOMMENTS=nocomments    # STRIPPED, with comments removed
TOKENS=tokens            # list of all tokens
NONTERMINALS=nonterms    # list of non terminals
TERMINALS=terms          # list of terminals
ERRORS=errors            # any errors come here

#trap 'rm $T1 ; trap "" 0 1 2 3 ; exit ' 0 1 2 3

rm -f $ERRORS
#  First run thru yystrip, then
#  Remove references to tokens that NLS has but that we do not need...

yystrip < $1 |
awk ' /^source_ref/  {  # Eat lines until a semicolon is found, to remove
                        # the source_ref rule
                        while ($0 !~ /;/)
                           getline
                        next
                     }
                     {  print $0 }
   ' | sed -e 's/\([^   ]\) *source_ref/\1/' -e 's/source_ref *//' > $STRIPPED


#  Generate a list of tokens....
#  Create a version of the stripped grammar with no comments
awk '
      /\/\*/         {  #  start of a comment
                        start = index($0, "/*")
                        if (start != 1)
                           printf "%s", substr($0, 1, start - 1)

                        if ( $0 ~ /\*\// )
                        {
                           #  delete from start of comment thru end of comment
                           end = index($0, "*/")
                           if (end != (length($0) - 2))
                              printf " %s\n", substr($0, end + 2)
                           incomment = 0
                           next
                        }

                        #  Only the start of this comment is on this line
                        #  Read in lines until the end-of-comment is found

                        incomment = 1
                        next
```

BEST AVAILABLE COPY

```
                    }

                    {
                       if (incomment)
                       {
                          # Remain in the comment until a */ is found
                          if ($0 !~ /\*\//)
                          {
                             # print ""
                             next
                          }
                          else
                          {
                             # Yup, the end of the comment is on this line...
                             end = index($0, "*/")
                             if (end != (length($0) - 2))
                                printf " %s\n", substr($0, end + 2)
                             incomment = 0
                             next
                          }
                       }
                       print $0
                       next
                    }
    ' < $STRIPPED > $NOCOMMENTS

# Using the noncomented version, generate a list of tokens
awk '
      /^[   ]*$/  {  next  }

                  {  numtokens = split($0, tokens)
                     for (tnum = 1; tnum <= numtokens; tnum++)
                     {
                        t = tokens[tnum]
                        if (t == "|")
                           continue
                        if (t == ":")
                           continue
                        if (t == ";")
                           continue
                        print t
                     }
                  }
      ' < $NOCOMMENTS  | sort -u > $TOKENS


#  Generate list of non-terminals
grep '^[a-z]' $STRIPPED > $NONTERMINALS

#  Generate the list of terminals.  This consists of all tokens with
#  the nonterminals removed
sort $TOKENS $NONTERMINALS | uniq -u > $TERMINALS
```

```
##################################################################

rm -f $OUT

if [ "$PREAMBLE" != "" ]
then
   cat $PREAMBLE > $OUT
fi

#  print list of terminals
echo "/* Terminals */" >> $OUT
echo "/* These are listed one per line so that when one is added or removed
   only one line changes
   */\n" >> $OUT
sed -e "s/^/%token <$DEFAULTTYPE> /" < $TERMINALS >> $OUT

#  print list of nonterminals
echo "\n/*  Nonterminals */\n" >> $OUT
sed -e "s/^/%type <$DEFAULTTYPE> /" < $NONTERMINALS >> $OUT

#  Pick up any special rules
echo "\n\n/* special rules */\n" >>$OUT
egrep '%right|%left|%nonassoc|%start' <$NLS >>$OUT
echo "\n%%\n" >> $OUT

# OK, the grammar goes here
####################################################
#  We want to put the default action after every rule.
#  The default rule is:
#     a : b c d
#        { SETSTRING ($<fnum>, $<lnum>, $<lnum>);  }
#
#  for the rule enter_local_scope, we want a pushscope() call
#  Any errors accumulate in the file ERRORS

awk   '
   #  The variable interm is set to TRUE when a non-terminal is
   #  found, and set to FALSE when a ; is found...
   #  The variable inrule is set to TRUE when a : or | is found, and
   #  false when a :, |, or ; is found
   #  if incomment is TRUE, we are in a multi-line comment

   /^[   ]*\/\*/  {  #  Beginning of a comment that starts at beginning of line
                     if (index($0, "*/") == 0)
                     {
                        incomment = 1
                     }
                     print
                     next
                  }
```

BEST AVAILABLE COPY

BEST AVAILABLE COPY

```
                { # If we are in a multi-line comment, ignore it...
                  if (incomment)
                  {
                     if (index($0, "*/") != 0)
                        incomment = 0      # end of multiline comment
                     print
                     next
                  }
                }

/^[a-z]/        { # This line defines a non-terminal.  Right now,
                  # it should have no rules on it!
                  if (index($0, ":") != 0)
                  {
                     printf "adding default rules: cannot handle : on first line! (%s)\n", $0 >> "'$ERRORS'"
                  }
                  print $0
                  interm = 1
                  nontermname = $1
                  tokenlist = ""
                  next
                }
/:|\||;/        { # Start of a new rule, or end of
                  # a rule.  If tokens is non-null, figure out the output
                  if (inrule)
                  {
                     printf "    {"
                     if (nontermname ~ /enter_local_scope/)
                        printf " pushscope();"

                     if (nontermname ~ /exit_local_scope/)
                        printf " popscope();"

                     if (tokenlist !~ /^[     ]*$/ )
                     {
                        ntokens = split(tokenlist, a)
                        if (ntokens == 0)
                        {
                           # Special output for empty list
                           printf " SETSTRING($<string>0, $<string>0, $<string>0);"
                        }
                        else
                        {
                           # We need to put the number of the token which has the
                           # symbol information as the last parameter to the
                           # SETSTRING call.... Normally this is the last param,
                           # but if the token is function_or_array_declarator,
                           # use its number...

                           symtoken = ntokens
                           for (i = 1; i <= ntokens; i++)
```

BEST AVAILABLE COPY

```
                        {
                           if (a[i] == "function_or_array_declarator")
                              symtoken = i
                        }

                        printf " SETSTRING($1, $%d, $%d);", ntokens, symtoken
                     }
                  }
                  else
                  {
                     print " SETSTRING($<string>0, $<string>0, $<string>0);"
                  }
                  printf " )\n"
               }
               inrule = 0
            }
   /:|\|/   {  #Start of a new rule.
               stoken = index($0, ":")
               if (stoken == 0)
                  stoken = index($0, "|")

               inrule = 1
               if ($0 ~ /\/\*/)
               {
                  #  We allow two comments on a rule line...
                  if ($0 !~ /Empty|No sscSpecifier or type|empty|EMPTY/)
                  {
                     printf "error: comment on non-empty rule (%s)\n", $0 >> "'$ERRORS'"
                  }
                  tokenlist = ""
               }
               else
               {
                  tokenlist = substr($0, stoken + 1)
               }
            }
   /;/      {  # End of rules list
               interm = 0
            }
   $0 !~ /:|\||;/ {  # Normal line
                  if (interm)
                  {
                     tokenlist = tokenlist " " $0
                  }
               }

            {  print # Always print what we have
            }
   ' < $STRIPPED >> $OUT

echo "\n%%" >> $OUT

if [ "$POSTAMBLE" != "" ]
```

BEST AVAILABLE COPY

```
then
   echo "\n" >> $OUT
   cat $POSTAMBLE >> $OUT
fi

if [ -f $ERRORS ]
then
   echo "ERROR: some errors have occurred in conversion:"
   cat $ERRORS
   exit 1
fi

exit 0
```

Feb 03 15:54 1988  pp/gram/cvtlex Page 1

```
#!/bin/sh
#  Convert NLS lex.c to one for our use..
#  usage:
#     cvtlex <nls_lex> <outfile> [<preamble> [<postamble>]
#        preamble is a file to put at the beginning of the file
#        postamble is a file to put at the end of the file
#
#  example:
#     cvtlex lex.c mylex.c pre.dat post.dat
#
#  output:
#     [preamble]
#     lex.c
#     [postamble]

#  WARNING:

if [ $# -lt 2 ]
then
   echo "Usage: $0 <nls_lex.c> <output_file> [<preamble> [postamble>]]"
   exit 1
fi

NLS=$1
OUT=$2
PREAMBLE=""
POSTAMBLE=""
ERRORS=errors
if [ $# -ge 3 ]
then
   PREAMBLE=$3
   if [ $# -ge 4 ]
   then
      POSTAMBLE=$4
   fi
fi
```

BEST AVAILABLE COPY

```
rm -f $ERRORS $OUT

sed -e ' s/extern long yylval/extern YYSTYPE yylval/
        s/t_opaque/long/g
        s/unnextchar/UNNEXTCHAR/g
        s/nextchar/NEXTCHAR/g
        s/elsereturn/ELSERETURN/g
        s/checkequals/CHECKEQUALS/g
        s/checkident/CHECKIDENT/g
        s/CharSize/CHARSIZE/g
        /^#include/ d
        /SccsVersion/ d
        /#define[   ]*sp/ d
        /int lineno/ d
        s/error(ErrCharConstTooBig);/cerror("Character constant too big");/
        s/warning(ErrCharConstTooBig);/cwarning("Character constant too big");/
        s/error(ErrConstantTooBig);/cerror("Constant too big");/
        s/error(ErrEndComment);/cerror("Unexpected end of comment");/
        s/error(ErrIllegalCharacter);/cerror("Illegal Character");/
        s/error(ErrNoHexDigits);/cerror("No Digits after '0X'");/
        s/error(ErrPreprocessorDirective);/cerror("Unknown preprocessor directive");/
        s/error(ErrStringDelimiter);/cerror("No string delimiter");/
        s/error(ErrStringTooLong);/cerror("String too long");/
        s/error(ErrSyntax);/cerror("Syntax error");/
        s/error(ErrYaccOverflow);/cerror("Yacc stack overflow");/
        s/warning(ErrIllegalEscape);/cwarning("Illegal escape");/
        s/warning(ErrMultipleCharLiteral);/cwarning("Multiple character literal");/
        s/error(ErrEmptyCharLiteral);/cerror("Empty Character Literal");/
        s/warning(ErrUnknownPragma);/cwarning("Unknown Pragma");/
        s/error(ErrLineTooLong);/cerror("Line Too Long");/
        s/error(ErrBadOctalDigit);/cerror("Bad Octal Digit");/
        s/sourceSetLineNumber(lineno = \(.*\)));/csetline(\1) - 1);/
        /sourceSetLineNumber/ d
        /line_ptr = line/ a\
    cincline();
        s/sourceSetFileName.*$/csetfname(text);/
        s/symIdentInsert(.*$/csymadd(text);/
        s/symIdentIsType(\([^)]*\)/csymistype(\1)/
        s/sourceSetFileAndLine(0);/csetfname(text);/
        s/(stringMake.*$/(0);/
        s/stringMake.*$/0;/
        s/lineno[   ]*=[  ]*\([^;]*\);/csetline(\1 - 1);/
        ' < $NLS >> $OUT

if grep '[  ]error[  ]*(' $OUT >/dev/null
then
    echo "ERROR: unknown error calls" >> $ERRORS
    grep '[  ]error[  ]*(' $OUT >$ERRORS
fi

if grep '[  ]warning[   ]*(' $OUT >/dev/null
```

BEST AVAILABLE COPY

```
then
   echo "ERROR: unknown warning calls" >> $ERRORS
   grep '[  ]warning[    ]*(' $OUT >$ERRORS
fi



#  Report on any errors
if [ -f $ERRORS ]
then
   echo "ERROR: some errors occurred in conversion of lex program:"
   cat $ERRORS
   exit 1
fi
exit 0
```

Feb 03 15:54 1988 pp/gram/gactions.c Page 1

```
/*
 * FILE      $Header: gactions.c,v 1.17 88/01/02 10:07:00 hmgr Exp $
 *
 * AUTHOR       Bruce Erickson
 *
 * ONELINER actions called from the grammar
 *
 * WARNING: for efficiency, there are some target-specific
 *          routines in here!
 *
 *    This maintains several small state machines in conjunction with
 *    the grammar.
 *    The first state machine deals with functions and
 *    (most) statements.  The states are:
 *
 *    GS_GLOBAL       completely out of function.  Initial state.
 *    GS_FUNCHEAD     between function name and first statement in function
 *    GS_FUNCSTART    between first '{' in a function and first statement
 *                    (handle case of empty function in a special manner)
 *    GS_CONDSTART    found condstart; looking for the start of statements
 *    GS_FUNC         in a function; not waiting for a conditional stmnt start
 *    GS_CONDECL      in (compound) declarations, looking for conditional
 *                    assignment, first statement, or end of compound
 *    GS_DECL         in (compound) declarations, looking for conditional
 *                    assignment or end of compound
 *    GS_FHWAIT       found conditional assignment in declaration section of
 *                    function, and waiting for end of this expression
 *    GS_CDECLWAIT    found conditional assignment in declaration section of
 *                    compound (after a conditional), and waiting for end of
 *                    this expression.
 *    GS_CDECLWAIT    found conditional assignment in declaration section of
 *                    compound (not after a conditional), and waiting for end of
 *                    this expression.
 *
```

```
 *    The grammar controls this by:
 *       gstartfunction()     : when a function name is found
 *       gnextstatement(PT_?) : a conditional has been found
 *       ginitcompound()      : when an opening '{' is found
 *       gstartcompound()     : just prior to first statement after a '{'
 *          This is done because it is legal to have statements in a
 *          declaration (e.g., char buf[2 + 4]), and we don't want
 *          to use those as the starting point!
 *       gstartstatement()    : (possible) start of a statement or expression.
 *          Note that this is disabled while in CONDECL or DECL except for
 *          conditional assignments outside of []'s
 *       gendstatement()      : called when end of conditional statement
 *       gendfunction()       : closing '}' of function
 * (the following do not change states at all, but are important nevertheless)
 *       gendcompound()       : other closing '}'s
 *       gelselessif()        : called when we find the end of an 'if' and no else
 *       gstartdo()           : called at start of 'do' statement
 *
 *    The state machine is:
 * action            GLOBAL    FUNCHEAD  FUNCSTART CONDSTART FUNC      CONDECL   DECL CDECLWAIT DECLWAIT FHWAIT
 * gstartfunction()  FUNCHEAD  E         E         E         E         E         E    E         E        E
 *                   new
 * ginitcompound()   X         X         X         CONDECL   DECL      DECL      DECL E         E        E
 *
 * gnextstatement()  E         FUNCHEAD  E         E         CONDSTART CONDECL   DECL E         E        E
 *                             new                           new       new       new
 * gstartcompound()  X         FUNCSTART X         X         X         CONDSTART FUNC E         E        E
 *                             leadtrail
 * gstartstatement() E         FHWAIT    FUNC      FUNC      E         CDECLWAIT DECLWAIT E     E        E
 *                             start     start     start               start     start
 * gendfunction()    E         E         GLOBAL    E         GLOBAL    E         E    E         E        E
 *                                       end                 end
 * gendcompound()    X         X         X         FUNC      X         CONDSTART FUNC E         E        E
 *                                                 start
 * gendstatement()   X         X         X         X         X         X         X    CONDECL   DECL     FUNCHEAD
 *                   end       end       end       end       end       end       end  end       end      end
 *
 ***********************************************************************
 *
 *       (GS stands for Grammar State :-)
 ***********************************************************************
 *
 *    The second state machine deals with 'switch' statements.  The states
 *    are:
 *
 *    SS_NOSWITCH     not within any switch statements.  Note that the variable
 *                    'switchnest' tells how deeply we are nested in switch stmnts.
 *    SS_BETWEEN      waiting for a case statement or end of switch
 *    SS_ATCASE       after a case, waiting for a statement, break, or end of switch
 *    SS_ATSTMNT      after a non-break statement, waiting for a break, case,
 *                    or end of switch
 *    The boolean 'inswitch' is FALSE if we are in no switches at all;
```

BEST AVAILABLE COPY

BEST AVAILABLE COPY

```
 *     it is TRUE if we are in at least one switch statement.
 *
 *     The grammar controls this by:
 *        when a 'switch' is found, gstartswitch() is called.
 *        when the last statement of the switch is found, gendswitch() is called.
 *        when a 'case' statement is found, gcase() is called.
 *        when a regular statement is found, gstartstatement() is called.
 *        when a 'break' statement is found, gbreak() is called.  If the
 *           execscope of the 'break' is not the same as the execscope of the
 *           top-most switch, nothing is done....
 *
 *     The state machine is:
 *        current state      action called                   next state
 *        SS_NOSWITCH    gstartswitch()                  -> SS_BETWEEN
 *        SS_NOSWITCH    gbreak()                        -> SS_NOSWITCH
 *        SS_BETWEEN     gendswitch()                    -> SS_NOSWITCH
 *        SS_BETWEEN     gcase()                         -> SS_ATCASE
 *        SS_BETWEEN     gbreak()                        -> SS_BETWEEN
 *        SS_ATCASE      gendswitch()                    -> SS_NOSWITCH
 *        SS_ATCASE      gcase()                         -> SS_ATCASE
 *        SS_ATCASE      gstartstatement()               -> SS_ATSTMNT
 *        SS_ATCASE      gbreak()                        -> SS_BETWEEN
 *        SS_ATSTMNT     gendswitch()                    -> SS_NOSWITCH
 *        SS_ATSTMNT     gcase()                         -> SS_ATCASE
 *        SS_ATSTMNT     gbreak()                        -> SS_BETWEEN
 *
 *     Labels generated are of the form
 *        _BbA_switch_label_<switch depth>_<swdepth next label>
 *
***********************************************************************
 *
 *     Labels in the user's code are always followed by a probe
 *     of the type PT_LABEL, which always have PF_HIDDEN flag set.
 *
 *     When a label is found, the probe type PT_LABEL is pushed onto
 *     the probe stack, but the state machines (above) are not affected.
 *     At the next statement, the probe is inserted and the PT_LABEL is
 *     popped off of the stack.
 *
***********************************************************************
 *
 * TABSTOPS 3
 *
 * RCS      $Log: gactions.c,v $
 * Revision 1.17  88/01/02  10:07:00  10:07:00  hmgr ()
 * Author: bae@hplsdlc.hp.com
 * added clarification comments... added some code to deal with inner cases
 *
 * Revision 1.16  87/10/14  15:05:52  15:05:52  hmgr ()
 * Author: bae@hplsdlc.hp.com
 * Convert to pragmas for ignore & alerts...
 *
```

BEST AVAILABLE COPY

```
* Revision 1.15  87/10/01  17:27:24  17:27:24  hmgr ()
* Author: bae@hplsdlc.hp.com
* Fixed problem with incorrect scoping of
* do-while statements with -DBBA_OPTOA....
*
* Revision 1.14  87/09/18  09:53:41  09:53:41  hmgr ()
* Author: bae@hplsdlc.hp.com
* Upgrade to set PF_FIRST for first case in a switch statement
*
* Revision 1.13  87/09/15  12:32:40  12:32:40  hmgr ()
* Author: bae@hplsdlc.hp.com
* added code so that a IGNORE/ALERT comment
* outside of any procedure applies to the next procedure
*
* Revision 1.12  87/08/27  15:26:04  15:26:04  hmgr ()
* Author: bae@hplsdlc.hp.com
* Document how lables are dealt with; fix so that labels do not
* affect state machines.
*
* Revision 1.11  87/08/24  19:50:38  19:50:38  hmgr ()
* Author: bae@hplsdlc.hp.com
* changes to make lint happy
*
* Revision 1.10  87/08/17  16:24:32  16:24:32  hmgr ()
* Author: bae@hplsdlc.hp.com
* depend on run-time selection of processor specifics instead of compile time
*
* Revision 1.9  87/07/29  13:33:43  13:33:43  hmgr ()
* Author: bae@hplsdlc.hp.com
* removed debug printf statements
*
* Revision 1.8  87/07/28  13:18:12  13:18:12  hmgr ()
* Author: bae@hplsdlc.hp.com
* Added support for the PF_NOBREAK option (which replaces the
* PF_NOCODE option)
*
* Revision 1.7  87/07/25  18:29:36  18:29:36  hmgr ()
* Author: bae@hplsdlc.hp.com
* Added capibility to detect previous statement's end, so
* that a case statement w/o a break can correctly report
* the last cases' end.
* Also added PF_NOCODE in case where there is no statement (incl. break)
* between two cases.
*
* Revision 1.6  87/07/10  10:26:55  10:26:55  hmgr ()
* Author: bae@hplsdlc.hp.com
* no comment
*
* Revision 1.9  87/06/04  15:56:18  15:56:18  bae (Bruce Erickson)
* added stuff to insert _bA_dump() calls in appropriate places.
*
* Revision 1.8  87/06/04  08:07:14  08:07:14  bae (Bruce Erickson)
```

BEST AVAILABLE COPY

```
 * If we need to insert a default, and the previous case
 * ended with a break, do not insert another break...
 *
 * Revision 1.7  87/06/03  16:07:35  16:07:35  bae (Bruce Erickson)
 * Translated myabort()'s to syntax errors
 * Added states CONDECL DECL FNWAIT CDECLWAIT and CDECLWAIT to deal
 * with problem of initiailzers using conditional assignments.
 *
 * Revision 1.6  87/05/20  17:43:12  17:43:12  bae (Bruce Erickson)
 * LSDqf00218
 * Fixed problem with not initializing swinfo->swexpansion to NULL
 *
 * added extern statements to make lint happy
 * added stuff so that both PT_DEFAULT & PT_CASE could be inserted
 *
 * Revision 1.5  87/05/06  12:07:37  12:07:37  bae (Bruce Erickson)
 * Passes Plum Hall conformance test
 *
 * Revision 1.4  87/04/16  16:46:34  16:46:34  bae (Bruce Erickson)
 * make various options work.
 *
 * Revision 1.3  87/04/14  16:32:55  16:32:55  bae (Bruce Erickson)
 * The following probe points work:
 * if/else/else-less if
 * for
 * while
 * switch
 * conditional_expressions
 *
 * Revision 1.2  87/04/01  16:16:27  16:16:27  bae (Bruce Erickson)
 * works with 'if', 'else', 'else-less-if', 'while', 'for'
 *
 * Revision 1.1  87/03/26  12:45:51  12:45:51  bae (Bruce Erickson)
 * Initial revision
 *
 *
 */
static char rcsid[] = "$Header: gactions.c,v 1.17 88/01/02 10:07:00 hmgr Exp $";
#include <stdio.h>
#include <model.h>
#include <boolean.h>
#include "targetspec.h"
#include "probe.h"

typedef struct switchinfo
{
    int sstate;           /* switch state, SS_* */
    int nextlabel;        /* next label number for this one */
    int depth;            /* current switch depth (for conveniance) */
    boolean nodefault;    /* set to FALSE when a default statement is found */
```

BEST AVAILABLE COPY

```
    int casescope;          /* the casescope that the case statements are at (note that
                               the case itself bumps execscope) */
    boolean nocases;        /* set to FALSE when the first case/default is found */
    struct switchinfo *next;
    struct switchinfo *prev;

    /* The following are valid iff adddefault is true */
    int swsourcenum;        /* switch's source file */
    int swsline, swscol; /* switch's starting source line/column */
    int sweline, swecol; /* switch's ending line/column */
    char *sworigtext;       /* original text of switch */
    int sworigbytes;        /* number of bytes in origtext */
    char *swexpansion;      /* sworigtext contains a macro... */
    int swexpanbytes;       /* number of bytes in swexpansion */
} SWITCHINFO;

#define GS_GLOBAL     0
#define GS_FUNCHEAD   1
#define GS_FUNC       2
#define GS_CONDSTART  3
#define GS_FUNCSTART  4
#define GS_CONDECL    5
#define GS_DECL       6
#define GS_CDECLWAIT  7
#define GS_DECLWAIT   8
#define GS_FNWAIT     9

#define SS_NOSWITCH   0
#define SS_BETWEEN    1
#define SS_ATCASE     2
#define SS_ATSTMNT    3

/* GLOBALS */

/* STATICS */
static currentstate = GS_GLOBAL;         /* current state we are in */
static boolean inswitch = FALSE;         /* For quick checks.... */
static SWITCHINFO *switchinfo = NULL;    /* start stack here */
static SWITCHINFO *switchlast = NULL;    /* top of stack */
static boolean alertpending = FALSE;     /* For case when ALERT is found outside of a procedure,
                                            this is set....  This is checked in gstartstatement,
                                            and used/reset if TRUE. */
static boolean ignorepending = FALSE;    /* same as alertpending, but for IGNORE */

/* EXTERNALS */
extern void gchecklabel();
extern PROBETYPE probetop();
extern void cerror();
extern void probeaddflags();
extern void probeleadtrail();
extern void printcpptext();
extern int32 gprevstmntend;
```

BEST AVAILABLE COPY

```
extern boolean insertdump;
extern char *moreinsert[];
extern char *malloc();
extern char *tempvarget();
extern FILE *fba;
extern void probeabort();
extern void probenew();
extern void probenew2();
extern void probechangectl();
extern PROBETYPE probestart();
extern void probechangetype();
extern void probeend();
extern void probeelse();
extern char *csymstring();
extern int varscope;
extern char *cgetorigstring();
extern boolean adddefault;
extern boolean doemptycases;
extern boolean doelses;
extern boolean do3for;
extern boolean dodo;
extern boolean dowhile;

/* FORWARD */
extern void gswgoto();
extern char *gswlabel();


/***************************************************************************/

/* FUNCTION */
boolean
gstartfunction(funcnum, startbyte, endbyte)
int funcnum;          /* function's symbol number */
u_int32 startbyte;    /* start of function declaration (name or type) */
u_int32 endbyte;      /* end of function declaration (closing paren) */

/*
 *    This routine is called when we have detected the start
 *    of a function (actually, right when we find the closing
 *    paranthesis of the declaration...
 *
 *    It moves the state machine to state GS_FUNCHEAD
 *
 *    RETURN:
 *       if insertdump is TRUE, and if funcnum is "main", return TRUE.
 *       Else return FALSE.
 */
{
   char *name;

   /* Note: syntatically illegal to have a label pending at this point! */
```

BEST AVAILABLE COPY

```
   if (currentstate != GS_GLOBAL)
   {
      cerror("Syntax error");
      return;
   }
   probenew(PT_FUNCTION, varscope, NULL, ";", NULL, startbyte, endbyte, funcnum, TRUE);
   currentstate = GS_FUNCHEAD;

   if (insertdump)
   {
#pragma BBA_IGNORE /* not for production */
      name = csymstring(funcnum);
      if ((name != NULL) && (strcmp(name, "main") == 0))
         return(TRUE);
   }
   return(FALSE);

}

/*********************************************************************/

/* FUNCTION */
gnextstatement(type, startbyte, endbyte, leadstring, terminator, trailstring)
PROBETYPE type;          /* PT_* */
u_int32 startbyte;       /* start of control string */
u_int32 endbyte;         /* end of control string */
char *leadstring;        /* string to print prior to the assignment statement.
                            if NULL, print nothing */
char *terminator;        /* string to print after the assignment statement */
char *trailstring;       /* string to print after last statement in this block */

/*
 *    This routine is called when we want to do something
 *    at the beginning of the next statement.
 *
 *    Remember that CATRUE/CAFALSE is disabled in the grammar appropriately,
 *    so regardless of the state we should insert probe points for them!
 */
{
   if ((currentstate != GS_FUNC) && (currentstate != GS_CONDECL) &&
        (currentstate != GS_DECL) && (currentstate != GS_FUNCHEAD))
   {
      cerror("Syntax error");
      return;
   }

   /* If we are about to find the 3rd statement in a for loop, and if
      checking the 3rd statement is not enabled, do nothing */
   if (ISPTYPE(type, PT_3FOR))
   {
```

BEST AVAILABLE COPY

```
        if (!do3for)
            return;
    }

    /* NOTE: it is far easier to disallow conditional assignments in
        the grammar than it is here - therefore, the grammar
        is sensitive to the 'docondassign' variable */

    if (ISPTYPE(type, PT_ELSE | PT_CAFALSE))
        probeelse(type, varscope, leadstring, terminator, trailstring);
    else
    {
        /* Only PT_DO* want a non-leadinsert, so the check for that is here! */
        if (ISPTYPE(type, PT_DOTRUE | PT_DOFALSE))
            probenew(type, varscope, leadstring, terminator, trailstring, startbyte, endbyte, 0, FALSE);
        else
            probenew(type, varscope, leadstring, terminator, trailstring, startbyte, endbyte, 0, TRUE);
    }

    if(currentstate == GS_FUNC)
    {
        currentstate = GS_CONDSTART;
        /* All other states stay in the same state */
    }
}


/****************************************************************************/

/* FUNCTION */
gstartstatement(startbyte, endbyte)
u_int32 startbyte;          /* first byte of the statement's initial token */
u_int32 endbyte;            /* last byte of the statement's initial token */

/*
 *      This routine is called when the beginning of a statement is found.
 *      This does not include compound statements; that uses gstartcompound
 *
 */
{
    PROBETYPE ptype;


    gchecklabel(startbyte);     /* Deal with any pending labels */

    if (inswitch && switchlast->sstate == SS_ATCASE)
    {
        /* This is the first statement after a case.... */
        probestart(startbyte);
        if (doemptycases)
            gswlabel(TRUE, startbyte - (u_int32) 1);     /* insert assignment statement here */
        switchlast->sstate = SS_ATSTMNT;
```

BEST AVAILABLE COPY

```
      }

      if ((currentstate != GS_CONDSTART) && (currentstate != GS_FUNCSTART) &&
            (currentstate != GS_CONDECL) && (currentstate != GS_DECL) &&
            (currentstate != GS_FUNCHEAD))
      {
         /* If we are not waiting for the statement part of a conditional
            statement, just return */
         return;
      }

      ptype = probestart(startbyte);
      if (ISPTYPE(ptype, PT_WHILE) && dowhile)
      {
         /* Insert the temporary assignment statement */
         fprintf(fba, "%s=1;", tempvarget(FALSE));
      }

      switch(currentstate)
      {
      case GS_FUNCSTART :
         /* Special: if we are at the start of a function, and
            an alert or ignore is pending, set the probe flags for
            the entire procedure
         */
         if (ignorepending)
         {
            probeaddflags(PF_IGNORE);
            ignorepending = FALSE;      /* reset flag */
         }

         if (alertpending)
         {
            probeaddflags(PF_ALERT);
            alertpending = FALSE;       /* reset flag */
         }
      case GS_CONDSTART :
         currentstate = GS_FUNC;
         break;
      case GS_CONDECL    :
         currentstate = GS_CDECLWAIT;
         break;
      case GS_DECL       :
         currentstate = GS_DECLWAIT;
         break;
      case GS_FUNCHEAD   :
         currentstate = GS_FHWAIT;
         break;
         /* All other cases stay in same state */
      }
   }
```

BEST AVAILABLE COPY

```
/***************************************************************************/

/* FUNCTION */
gstartcompound(lastdecl)
u_int32 lastdecl;     /* byte position of the last character of a
                         declaration, or of the '{' */

/*
 *    This routine is called when we detect the first executable
 *    statement of a compound statement...
 *
 */
{

   /* If top is a label, that is handled by gstartstatement */
   switch(currentstate)
   {
   case GS_FUNCHEAD :
      probeleadtrail(NULL, NULL);
      currentstate = GS_FUNCSTART;
      break;

   case GS_CONDSTART :
      probeleadtrail(NULL, NULL);
      break;

   case GS_CONDECL    :
      currentstate = GS_CONDSTART;
      probeleadtrail(NULL, NULL);
      break;

   case GS_DECL    :
      currentstate = GS_FUNC;
      break;
   /* default : */
   }
   return;
}


/***************************************************************************/

/* FUNCTION */
ginitcompound(lbrace)
u_int32 lbrace;          /* starting brace of compound */

/*
 *    This routine is called when we have found
 *    the starting brace of a compound.
 *
 *    First, in the case of a switch statement, we need to
```

BEST AVAILABLE COPY

```
 *    place the (optional) label and assignment prior
 *    to the brace so that any initialization of automatics
 *    are done appropriately.
 *
 *    Then, if state is 'CONDSTART', change state to CONDECL;
 *    if state is FUNC, or CONDECL, change state to DECL
 */
{
   if (inswitch && switchlast->sstate == SS_ATCASE)
   {
      /* This is the first statement after a case.... */
      probestart(lbrace);
      if (doemptycases)
         gswlabel(TRUE, lbrace - (u_int32) 1);     /* insert assignment statement here */
      switchlast->sstate = SS_ATSTMNT;
   }

   switch(currentstate)
   {
   case GS_CONDSTART :
      currentstate = GS_CONDECL;
      break;
   case GS_CONDECL   :
   case GS_FUNC      :
      currentstate = GS_DECL;
      break;
   }
}


/**************************************************************************/

/* FUNCTION */
gendcompound(rbrace)
u_int32 rbrace;      /* byte position of the ')' */

/*
 *    This routine is called when we detect the closing brace
 *    of a compound statement.  This does nothing unless there
 *    is a pending conditional.  In this case, we will
 *    insert a probe start (and know that the conditional
 *    will insert a probe end) prior to the
 *    closing brace.
 *
 *    Note that the special case of an empty function is dealt
 *    with in gendfunction(), not here!
 *
 *    Note that this should not flush the buffer or else the
 *    insertdump system will not work on function 'main()'!
 */
{
   switch(currentstate)
```

BEST AVAILABLE COPY

```
   {
   case GS_CONDSTART :
      probestart(rbrace);
      currentstate = GS_FUNC;
      break;
   case GS_CONDECL   :
      currentstate = GS_CONDSTART;
      break;
   case GS_DECL   :
      currentstate = GS_FUNC;
   }
}


/*****************************************************************************/

/* FUNCTION */
gendfunction(endbyte, inmain)
u_int32 endbyte;         /* byte address of the closing brace */
boolean inmain;          /* if TRUE, this is function 'main'.  Not used
                            for production */

/*
 *    This routine is called when we have detected the closing
 *    brace of a function.
 *
 */
{
   if ((currentstate != GS_FUNC) && (currentstate != GS_FUNCSTART))
   {
      cerror("Syntax error");
      return;
   }

   if (currentstate == GS_FUNCSTART)
   {
      /* This is a function with no statements in it... */
      probestart(endbyte);
   }

   if (inmain)
   {
#pragma BBA_IGNORE /* not for production */
      /* Flush data up to the right brace */
      printcpptext(endbyte - (u_int32) 1);

      /* Insert the call to badump */
      fprintf(fba, "_bA_dump();");
   }

   probeend(endbyte);
   currentstate = GS_GLOBAL;
```

BEST AVAILABLE COPY

```
}


/******************************************************************************/

/* FUNCTION */
gendstatement(endbyte)
u_int32 endbyte;          /* last byte of statement */

/*
 *    This is called when the statement which is the object
 *    of a conditional is finished.  The endbyte is the last
 *    character of the statement.  Note that this is used
 *    even if the statement was a conditional.
 *
 */
{
   probeend(endbyte);
   switch(currentstate)
   {
   case GS_DECLWAIT  :
      currentstate = GS_DECL;
      break;
   case GS_CDECLWAIT :
      currentstate = GS_CONDECL;
      break;
   case GS_FHWAIT :
      currentstate = GS_FUNCHEAD;
      break;
   /* all other states remain in same state */
   }
}


/******************************************************************************/

/* FUNCTION */
gelselessif(ctlstart, ctlend, stmntend)
u_int32 ctlstart;            /* start of the if statement */
u_int32 ctlend;              /* end of the if statement */
u_int32 stmntend;            /* last byte of the if's statement */

/*
 *    This routine is called when we have detected that an if
 *    statement has no else statement.  It inserts an elseless-if
 *    after the if's statement if doelses is TRUE
 *
 */
{
   if (doelses)
   {
```

BEST AVAILABLE COPY

```
        probeelse(PT_IELSE, varscope, "else ", ";", NULL);
        probestart(stmntend + (u_int32) 1);     /* flush up to and including the ')' */
        probeend(stmntend + (u_int32) 1);
    }
}


/**************************************************************************/

/* FUNCTION */
gstartswitch(startbyte, endbyte)
u_int32 startbyte;          /* 's' in 'switch' */
u_int32 endbyte;            /* rparen in 'switch(expr)' */

/*
 *    This routine is called when we detect a switch
 *    statement.  It will
 *       'push' the switch stack, incrementing the depth.
 *       inswitch is set to TRUE
 *       switchlast->sstate is set to SS_BETWEEN.
 *       switchlast->nodefault is set to TRUE
 *       switchlast->nocases is set to TRUE
 *       If 'addefault', we will also store the
 *          start/end of the switch statement as well
 *          as the control text....  Because if we
 *          attempt to fetch the control text at theend
 *          we will have already flushed the swith
 *          statement out and not have the data...
 *
 *    Note that the 'nextlabel' integer is *not* reset if this
 *    is not the first time at this depth!
 *
 *    Note that if a label was pending prior to the switch statement,
 *    gstartstatement() was already called, and handled that!
 */
{
    register SWITCHINFO *swinfo;
    char *origtext, *expansion;

    /* 'Push' the switch stack... */
    if (((switchlast != NULL) && (switchlast->next != NULL)) ||
        ((switchlast == NULL) && (switchinfo != NULL)))
    {
        /* We have already malloc'd switches to this depth.
           All we have to do is to reset some information
        */
        if (switchlast != NULL)
           swinfo = switchlast = switchlast->next;
        else
           swinfo = switchlast = switchinfo;      /* start at top */
    }
    else
```

BEST AVAILABLE COPY

```
    {
        /* We will have to allocate space for this... */
        swinfo = (SWITCHINFO *) malloc(sizeof(SWITCHINFO));
        if (switchinfo == NULL)
        {
            /* Very first switch statement in this program! */
            switchinfo = switchlast = swinfo;
            swinfo->depth = 1;
            swinfo->prev = NULL;
        }
        else
        {
            /* Not the first, but this is the first time at this depth */
            swinfo->depth = switchlast->depth + 1;     /* Increment depth */
            swinfo->prev = switchlast;
            switchlast->next = swinfo;
            switchlast = swinfo;
        }
        swinfo->next = NULL;
        swinfo->sworigbytes = swinfo->swexpanbytes = 0;
        swinfo->nextlabel = 1;
        swinfo->sworigtext = swinfo->swexpansion = NULL;
    }
    swinfo->sstate = SS_BETWEEN;
    swinfo->nodefault = swinfo->nocases = TRUE;
    /* casescope is set when the first case is detected.... */

    if (swinfo->sworigbytes != 0)
        *swinfo->sworigtext = '\0';
    if (swinfo->swexpanbytes != 0)
        *swinfo->swexpansion = '\0';


    if (adddefault)
    {
        cgetorignumbers(startbyte, endbyte, &swinfo->swsourcenum,
                &swinfo->swsline, &swinfo->swscol,
                &swinfo->sweline, &swinfo->swecol);
        origtext = cgetorigstring(startbyte, endbyte,
                &swinfo->swsourcenum,
                &expansion);

        strexpand(origtext, &swinfo->sworigtext, &swinfo->sworigbytes);
        if (expansion != NULL)
        {
            strexpand(origtext, &swinfo->swexpansion, &swinfo->swexpanbytes);
        }
        else
        {
            if (swinfo->swexpanbytes != 0)
                *swinfo->swexpansion = '\0';
        }
```

BEST AVAILABLE COPY

```
    }
    inswitch = TRUE;
}


/*****************************************************************************/

/* FUNCTION */
gendswitch(endbyte)
u_int32 endbyte;          /* last character of switch's statement */

/*
 *    This routine is called when we detect the end
 *    of the switch's statement.  It will
 *        SS_ATCASE
 *           probeabort()
 *        SS_ATSTMNT
 *           probeend
 *
 *        if (adddefault)
 *           if no default statement in this switch
 *              insert default statement
 *        pop the switch stack
 *        if depth goes to zero, 'inswitch' is set to FALSE
 *
 */
{
    register SWITCHINFO *swinfo;
    char *leadstring;        /* leading string to use if adding a default */

    swinfo = switchlast;

    switch(swinfo->sstate)
    {
    case SS_ATCASE :
        /* Just finished a 'case'.  Unless doemptycases, abort the probe */
        if (doemptycases)
        {
            probechangetype(PT_EMPTYCASE);   /* change type to empty case */
            probeaddflags(PF_NOBREAK);       /* note that there is no code (not even
                                                a break statement) here */
            probestart(endbyte - (u_int32) 1);
            probeend(endbyte - (u_int32) 1);
            gswlabel(TRUE, endbyte);      /* insert a label here, in case previous one is looking
                                  for it.... */
        }
        else
        {
            probeabort();
        }
        break;
```

BEST AVAILABLE COPY

```
    case SS_ATSTMNT :
       /* Finish up the probe that was started */
       probeaddflags(PF_NOBREAK);        /* note that there is no break */
       probeend(gprevstmntend);
       break;
    }

    if (adddefault)
    {
       if (swinfo->nodefault)
       {
          if ((swinfo->sstate == SS_BETWEEN) || (swinfo->sstate == SS_NOSWITCH))
             leadstring = "default:";        /* do not add a break */
          else
             leadstring = "break;default:";/* add a break to seperate from previosu case */

          probenew2(PT_IDEFAULT, varscope, leadstring, ":", NULL,
                swinfo->swsourcenum, swinfo->swsline, swinfo->swscol,
                swinfo->sweline, swinfo->swecol, swinfo->sworigtext,
                swinfo->swexpansion, TRUE);
          probestart(endbyte - (u_int32) 1);
          probeend(endbyte - (u_int32) 1);
       }
    }

    /* Pop the switch stack */
    switchlast = switchlast->prev;        /* Note that this is NULL
                                              if at top of stack! */
    if (switchlast == NULL)
    {
       inswitch = FALSE;
    }
}


/*************************************************************************/

/* FUNCTION */
gcase(isdefault, startbyte, endbyte)
boolean isdefault;           /* if TRUE, this is the 'default' case.  Else,
                                 this is a regular 'case' statement */
u_int32 startbyte;           /* 'c' in 'case' */
u_int32 endbyte;             /* the colon following the expression */

/*
 *     This routine is called when the 'case' statement is
 *     found.
 *
 *     If the current exec scope is NOT swinfo->casescope, then this case
 *     is 'within' another case's scope.  In this case, the state of the switch is
 *     not changed, but a probe IS inserted.  At gchecklabel, this condition
 *     is tested for, and the probe finished.
```

BEST AVAILABLE COPY

```
 *
 *    Otherwise, the actions done depend on switchstate:
 *    SS_BETWEEN
 *       probenew
 *       if (swinfo->nocases), add flag PF_FIRST & set nocases to FALSE
 *       switchstate = SS_ATCASE
 *    SS_ATCASE
 *       if (!doemptycases)
 *          probeabort()
 *       else
 *          probestart/probeend
 *       probenew
 *       switchstate = SS_ATCASE
 *    SS_ATSTMNT
 *       probeend
 *       probenew
 *       switchstate = SS_ATCASE
 */
{
   register SWITCHINFO *swinfo;      /* For speed */
   PROBETYPE thistype;               /* either PT_CASE or PT_DEFAULT */
   boolean isinner;                  /* if TRUE, this case is an INNERCASE */


   gchecklabel(startbyte);    /* Deal with any pending labels */

   swinfo = switchlast;
   if (isdefault)
   {
      thistype = PT_DEFAULT;
      swinfo->nodefault = FALSE;    /* Found the default! */
   }
   else
      thistype = PT_CASE;

   /* Only reliable way to find scope of cases is to detect scope
      of first case.  Othwerwise,
         switch(a) {{ case 0:
      fools it!
   */
   if (swinfo->nocases)
   {
      swinfo->casescope = pexecscope(FALSE, FALSE);
   }
   else
   {
      /* non-outer cases can only happen for not-first cases! */

      switch(swinfo->sstate)
      {
      case SS_NOSWITCH   :  /* semantic error */
      case SS_BETWEEN    :  /* case must always be at outer level */
```

BEST AVAILABLE COPY

```
   case SS_ATCASE :     /* right after a previous case... must be at outer level */
      isinner = FALSE;
      break;
   case SS_ATSTMNT :    /* is an inner case if execscope == casescope + 1 */
      if (swinfo->casescope == (pexecscope(FALSE, FALSE) - 1))
         isinner = FALSE;
      else
         isinner = TRUE;
   }

   if (isinner)
   {
      /* This case is 'within' the scope of another case.  Legal, tho questionable,
         C....  We may be at the same varscope, for example, if we have a case
         right after an if w/o an opening brace.
      */
      /* In case this 'inner case' is right after a conditional... */
      gstartstatement(startbyte, endbyte);

      if (doemptycases)
      {
         gswgoto(startbyte - (u_int32) 1);      /* jump around this ... */
      }
      probenew(thistype, varscope, NULL, ";", NULL, startbyte, endbyte, 0, TRUE);
      /* Flag that this is the bozo type */
      probeaddflags(PF_INNERCASE);

      /* Start this wierd case right here */
      probestart(endbyte + (u_int32) 1);  /* insert probe right after the colon */
      if (doemptycases)
         gswlabel(TRUE, endbyte);      /* jump to here */
      probeend(endbyte);
      return;
   }
}

/* This case is at the 'outer' level.... i.e., directly under the
   switch statement
*/

switch(swinfo->sstate)
{
case SS_BETWEEN :
   probenew(thistype, varscope, NULL, ";", NULL, startbyte, endbyte, 0, TRUE);
   if (swinfo->nocases)
   {
      /* Flag that this is the first case statement */
      probeaddflags(PF_FIRST);
      swinfo->nocases = FALSE;
   }
   swinfo->sstate = SS_ATCASE;
   break;

case SS_ATCASE :
```

```
      /* No statement between this case and previous case.  Do not insert
         a probe point (by default) */
      if (doemptycases)
      {
         probechangetype(PT_EMPTYCASE);   /* change type to empty case */
         probeaddflags(PF_NOBREAK);       /* note that there is no code (not even
                                             a break statement) here */
         probestart(startbyte - (u_int32) 1);      /* start for previous case is prior to this 'case' */
         probeend(startbyte - (u_int32) 1);
         gswgoto(startbyte - (u_int32) 1);         /* Insert a goto to the next label */
      }
      else
      {
         probeabort();
      }
      probenew(thistype, varscope, NULL, ";", NULL, startbyte, endbyte, 0, TRUE);
      break;

   case SS_ATSTMNT :
      probeaddflags(PF_NOBREAK);    /* note that there is no break */
      probeend(gprevstmntend);      /* send end-of-statement to be previous one */
      if (doemptycases)
      {
         gswgoto(startbyte - (u_int32) 1);      /* if previous case, jump around assignment statement */
      }

      /* Start a new block */
      probenew(thistype, varscope, NULL, ";", NULL, startbyte, endbyte, 0, TRUE);
      swinfo->sstate = SS_ATCASE;
      break;

   default :
      cerror("Syntax error");
      return;
   }
}


/*************************************************************************/

/* FUNCTION */
static char *
gswlabel(insert, afterbyte)
boolean insert;      /* if TRUE, insert this label & increment label count.
                        if FALSE, just return ascii value of (next) label */
u_int32 afterbyte;   /* if insert, flush up to this byte and insert label
                        after it */

/*
 *    This is called to insert a label or to find the text of
 *    the next label that will be inserted.
 *
```

BEST AVAILABLE COPY

BEST AVAILABLE COPY

```
 *      The label is a 'switch' label, of the form
 *         bA_switch_label_<switch depth>_<swdepth next label>
 *
 *      <switch depth> is switchlast->depth
 *      <swdepth next label> is switchlast->nextlabel
 *
 *      This assumes that the just previous to this any pending
 *      output was flushed....
 *
 *      This will increment switchlast->nextlabel
 */
{
   static char label[50];
   static int fmtdepth = -1;          /* label is formatted with this */
   static int fmtnext = -1;           /* label is formatted with this */

   if ((fmtnext != switchlast->nextlabel) || (fmtdepth != switchlast->depth))
   {
      sprintf(label, bbaswitchlbl, switchlast->depth, switchlast->nextlabel);
      fmtnext = switchlast->nextlabel;
      fmtdepth = switchlast->depth;
   }

   if (insert)
   {
      printcpptext(afterbyte);      /* flush any pending output */
      fprintf(fba, "%s:", label);
      switchlast->nextlabel++;
   }
   return(label);
}


/************************************************************************/

/* FUNCTION */
static void
gswgoto(afterbyte)
u_int32 afterbyte;          /* insert goto after this byte */

/*
 *      This routine inserts a 'goto' to the next label.
 *
 */
{
   printcpptext(afterbyte);
   fprintf(fba, "goto %s;", gswlabel(FALSE, (u_int32) 0));
}


/************************************************************************/
```

BEST AVAILABLE COPY

```
/* FUNCTION */
gbreak(iscase, startbyte, endbyte)
boolean iscase;          /* if TRUE, thisis a 'break'; else is a statement
                            that prevents fall-thru (return, continue, ...) */
u_int32 startbyte;       /* 'b' in 'break' */
u_int32 endbyte;         /* semicolon following the break */

/*
 *     This routine is called when a 'break' is found.
 *     If the current 'varscope' is equal to switchlast->casescope,
 *     we know that no more statements can be reached...
 *
 */
{
    register SWITCHINFO *swinfo;
    PROBETYPE ptype;

    gchecklabel(startbyte);     /* Deal with any pending labels */

    swinfo = switchlast;
    if ((swinfo == NULL) || (pexecscope(FALSE, FALSE) - 1 != swinfo->casescope))
    {
       return;       /* Take no action */
    }

    if (!iscase)
    {
       /* Mode should not be 'ATCASE, but instead ATSTMNT' */
       if (switchlast->sstate == SS_ATCASE)
       {
#pragma  BBA_IGNORE BBA_ALERT
          /* This is the first statement after a case.... */
          probestart(startbyte);
          if (doemptycases)
             gswlabel(TRUE, startbyte - (u_int32) 1);     /* insert assignment statement here */
          switchlast->sstate = SS_ATSTMNT;
       }
    }


    switch(swinfo->sstate)
    {
    case SS_NOSWITCH  :     /* This is a semantic error to the compiler.. */
    case SS_BETWEEN   :     /* an a warning from the compiler */
       break;
    case SS_ATCASE    :     /* case whose only stmnt is 'break' */
       if (doemptycases)
       {
          /* Do not set PF_NOBREAK, because there was a 'break' */
          ptype = probestart(startbyte);          /* start for previous case is prior to this 'break' */

          /* If this is a 'case', change type to 'emptycase'.  We do not
```

BEST AVAILABLE COPY

```
                want to change type 'default' to 'emptycase', but rather
                make it 'emptydefault' */
             if (ISPTYPE(ptype, PT_CASE))
                probechangetype(PT_EMPTYCASE);      /* change type to empty case */
             else
                probechangetype(PT_EMPTYDEFAULT);   /* change type to empty case */

             gswlabel(TRUE, startbyte - (u_int32) 1);  /* Put a label here.  This is necessary in case previous
                                                     case did not have a break... */
             probeend(endbyte);
          }
          else
          {
             probeabort();
          }
          swinfo->sstate = SS_BETWEEN;
          break;

       case SS_ATSTMNT    :      /* we have had a statement.... then a break */
          probeend(endbyte);       /* end of block was the break */
          swinfo->sstate = SS_BETWEEN;
          break;
    }
}


/**************************************************************************/

/* FUNCTION */
gstartdo(startbyte, endbyte)
u_int32 startbyte;       /* the 'd' of 'do' */
u_int32 endbyte;         /* the 'o; of 'do' */

/*
 *     This is called when the 'do' statement is found.
 *
 *
 *     If dodo is true:
 *        we will set up to deal with the
 *        while condition being true/false
 *        We do not have to increment the execution scope
 *        because when we call gnextstatement it calls probenew
 *        which increments the execution scope...
 *     If dodo is false:
 *        It increments the 'execscope' so that if a break
 *        is within this it will be correlated with the correct scope
 */
{
   if (dodo)
   {
      /* Set the 'next statement' trap, so that the we can get the correct
         starting information....
```

BEST AVAILABLE COPY

```
            The startbyte/endbyte information is bogus at this point, and
            will be corrected later
         */
         gnextstatement(PT_DOTRUE, startbyte, endbyte, ")?(", ",1)", NULL);
      }
      else
         pexecscope(TRUE, TRUE);     /* push execscope */
}


/***************************************************************************/

/* FUNCTION */
gstartdocond(startbyte)
u_int32 startbyte;          /* the '(' in 'while (' */

/*
 *     This routine is called when the leading paren
 *     of the while condition in a do-while statement
 *     is found.
 *
 *     If dodo is not enabled, this does nothing.
 *
 *     If dodo IS enabled, this inserts the string '('
 *     after the parentheses...
 *
 */
{
   if (dodo)
   {
      printcpptext(startbyte);
      fprintf(fba, "(");
   }
}


/***************************************************************************/

/* FUNCTION */
genddocond(stmntstart, stmntend, startbyte, endbyte)
u_int32 stmntstart;          /* start of statement controlled by while */
u_int32 stmntend;            /* end of statement controlled by while */
u_int32 startbyte;           /* start of expression */
u_int32 endbyte;             /* end of expression */

/*
 *     This is called when we have detected the expression
 *     in the do-while statement.
 *
 *     If dodo is not enabled, this does nothing.
 *
 *     If dodo IS enabled, we will insert the following
```

BEST AVAILABLE COPY

```
 *     strings:
 *        )?(<array>[<index]=1,1):(<array>[index>]=1,0)
 *
 *     This creates two probe points, whose control is the ctl (startbyte/endbyte),
 *     and whose range is from stmntstart thru stmntend.
 *     Note that the regular system takes over and
 *     inserts the last paranthesis...
 *
 */
{
    if (dodo)
    {
        /* First we need to modify the controlling statement information,
           so it uses the while instead of the do
        */
        printcpptext(endbyte);      /* flush to end of conditional */
        probechangectl(startbyte, endbyte); /* change what the control statement was */
        probeend(stmntend);         /* show end of statement (regular system insertion) */

        /* Now insert the probeend */
        probeelse(PT_DOFALSE, varscope, ":(", ",", "0)");
        probestart(stmntend);
        probeend(stmntend);
    }
}


/***************************************************************************/

/* FUNCTION */
genddo(endbyte, wstartbyte, wendbyte)
u_int32 endbyte;            /* last character of last statement of do */
u_int32 wstartbyte;         /* 'w' in 'while' */
u_int32 wendbyte;           /* ';' */

/*
 *     This routine is called when we detect the 'while (cond);'
 *     of a do loop.
 *
 *     It simply decrements the execscope because the 'do' incremented it
 *
 */
{
    if (!dodo)
        pexecscope(TRUE, FALSE);
}


/***************************************************************************/

/* FUNCTION */
gend3for(exists, endbyte)
```

BEST AVAILABLE COPY

```
boolean exists;          /* if FALSE, there is no 3rd expression.
                            Else, it exists and endbyte is the expression's
                            last byte */
u_int32 endbyte;         /* see above */

/*
 *
 *    This routine is called when we find the expression for the
 *    3rd component of the for loop.  When we enter, currentstate
 *    is GS_CONDSTART or GS_FUNC; when we leave currentstate will be GS_FUNC.
 *
 *    If exists is TRUE, we will call probeend to show the end of the
 *    expression (the expression had already called probestart()).
 *    If exists is FALSE, we will call probeabort(), because there
 *    was no expression and we know that probestat() had not
 *    been called for this...
 *
 */
{
   if (do3for)
   {
      if (!exists)
         probeabort();
      else
         probeend(endbyte);
      currentstate = GS_FUNC;     /* go from GS_CONDSTART to GS_FUNC */
   }
}


/**************************************************************************/

/* FUNCTION */
gstartwhile(startbyte, endbyte)
u_int32 startbyte;       /* 'w' in 'while' */
u_int32 endbyte;         /* 'e' in 'while' */

/*
 *    This routine is called when the 'while' of
 *    a while loop is found.  If dowhile is FALSE,
 *    this does nothing.  If dowhile is TRUE, this
 *    will insert a statement like:
 *
 *       BATEMP=0;
 *
 *    prior to the while...
 *
 */
{
   if (dowhile)
   {
      printcpptext(startbyte - (u_int32) 1);    /* print up to the startbyte */
      fprintf(fba, "%s=0;", tempvarget(TRUE));
```

BEST AVAILABLE COPY

```
    }
}


/*************************************************************************/

/* FUNCTION */
gendwhile(startbyte, endbyte)
u_int32 startbyte;   /* first character of statement controlled by while loop */
u_int32 endbyte;     /* last character of statement controlled by while loop */

/*
 *    This routine is called when the last character of the statemnt
 *    controlled by the while loop is found, *after* gendstatement()
 *    was called for the statement...
 *
 *    If dowhile is FALSE, this does nothing...
 *
 *    Else, we will insert a statement that looks like
 *       if(BBATEMP == 0) <array> = 1;
 *
 */
{
   if (dowhile)
   {
      printcpptext(endbyte);     /* The probeend call normally does this,
                                    but won't if statement was a compound
                                    statement */
      fprintf(fba, "if(%s==0)", tempvarget(FALSE));

      /* Fetch ctl string from the while... */
      probeelse(PT_WHILENOT, varscope, NULL, ";", NULL);
      probestart(endbyte + (u_int32) 1);     /* stmnt controlled by while (insert just after it) */
      probeend(endbyte + (u_int32) 1);
      tempvartoss();             /* forget about temporary variable */
   }
}


/*************************************************************************/

/* FUNCTION */
gmainreturn(start, byte)
boolean start;    /* if TRUE, byte is first byte of 'return'.  If
                     false, byte is the ';' */
u_int32 byte;     /* see above */

/*
 *    This routine is only called when we are in the main routine,
 *    'insertdump' is true (never true for production), and
 *    a return statement has been found
 *
```

BEST AVAILABLE COPY

```
 *                        t a "( _bA_dump();" string prior to
 *                        ment, and a ")" after the return statement.
 */
{
#pragma BBA_IGNORE /* not for production */

   if (start)
   {
      printcpptext(byte - (u_int32) 1);
      fprintf(fba, "(_bA_dump();");
   }
   else
   {
      printcpptext(byte);
      fprintf(fba, ")");
   }
}


/**********************************************************************/

/* FUNCTION */
gcallingfunc(start, symnum, byte)
boolean start;     /* if TRUE, byte is first byte of function name; else
                      byte is the right parenthesis of call
                   */
int symnum;        /* symbol number of function we are calling */
u_int32 byte;      /* see 'start', above */

/*
 *    This is only called if 'insertdump' is TRUE.  This
 *    is not for production.
 *
 *    If symnum is the symbol of a function that we want to insert
 *    a _bA_dump() call prior to, this will insert a string depending
 *    on start:
 *       TRUE: "(_bA_dump(),"
 *       FALSE: ")"
 *
 */
{
   /* This is a list of functions that we will *always* insert stuff
      prior to

   */
#pragma BBA_IGNORE /* not for production */
   static char *alwaysinsert[] =
   {
      "exit",
      "_exit",
      NULL,
   };
```

BEST AVAILABLE COPY

```
    char **scan;        /* scan thru list of functions */
    char *thisfunc;     /* this function's name */
    boolean doinsert; /* if TRUE, we do indeed want to take action */

    doinsert = FALSE;
    thisfunc = csymstring(symnum);

    if (thisfunc == NULL)
       return;      /* Oh well... */

    /* Scan thru the list(s) to see if this function is one
       we want to insert a dump call prior to */

    for (scan = alwaysinsert; *scan != NULL; scan++)
    {
       if (strcmp(*scan, thisfunc) == 0)
       {
          doinsert = TRUE;      /* Yup, we are sensitive to this */
          break;
       }
    }

    /* Check any mentioned in the -B option */
    for (scan = moreinsert; *scan != NULL; scan++)
    {
       if (strcmp(*scan, thisfunc) == 0)
       {
          doinsert = TRUE;      /* Yup, we are sensitive to this */
          break;
       }
    }

    if (!doinsert)
       return;      /* What more can I say? */

    if (start)
    {
       printcpptext(byte - (u_int32) 1);      /* flush up to function name */
       fprintf(fba, "(_bA_dump(),");
    }
    else
    {
       printcpptext(byte);
       fprintf(fba, ")");
    }
 }


 /***********************************************************************/

 /* FUNCTION */
```

BEST AVAILABLE COPY

```
void
gstartlabel(startbyte, endbyte)
u_int32 startbyte;        /* first charactaer of label */
u_int32 endbyte;          /* the colon */

/*
 *    This routine is called when a label is found.
 *    It pushes PT_LABEL on the probe stack, and returns.
 *
 */
{
    probenew(PT_LABEL, varscope, NULL, ";", NULL, startbyte, endbyte, 0, TRUE);
    probeaddflags(PF_HIDDEN);
}


/**************************************************************************/

/* FUNCTION */
static void
gchecklabel(startbyte)
u_int32 startbyte;          /* starting byte of statement following the label */

/*
 *    This routine is called whenever a label may be pending.
 *    If it is, this will pop the label probe off from the stack,
 *    and insert an array assignment into the output stream...
 *
 *    This also checks to see if an innercase is pending.  If so,
 *    the appropriate actions are taken...
 */
{
    if (ISPTYPE(probetop(), PT_LABEL))
    {
        /* Yup, a label preceeded this statement.
           Pop off the label and insert the array assignment...
        */
        probestart(startbyte);
        probeend(startbyte);
    }
}


/**************************************************************************/

/* FUNCTION */
gpragma(flag)
PFLAGTYPE flag;       /* what flat to set (IGNORE or ALERT) */

/*
 *    This is called when either the #pragma BBA_ALERT or
 *    #pragma BBA_IGNORE are found...
```

BEST AVAILABLE COPY

```
 *
 */
{
   if (varscope > 0)
   {
      /* Already in a procedure - call probeaddflags myself */
      probeaddflags(flag);
   }
   else
   {
      /* Outside of any procedure.  Set the 'pending' flag
         so that it is added as soon as the next procedure
         is found
      */
      if (ISPFLAG(flag, PF_ALERT))
         alertpending = TRUE;

      if (ISPFLAG(flag, PF_IGNORE))
         ignorepending = TRUE;
   }
}
```

Feb 03 15:54 1988 pp/gram/gram.y Page 1

```
%{
/*
 * FILE      $Header: gram.y,v 1.30 87/11/18 10:38:28 hmgr Exp $
 *
 * AUTHOR       Bruce Erickson
 *
 * ONELINER Yacc specification of the C language
 *
 *    This is the yacc specification that bbacpp uses....
 *    It is basically ripped off from the NXLS grammar, and should
 *    be kept syntatically the same - *except* for enhancements...
 *
 *    ENHANCEMENTS:
 *       allow trailing commas in enumerator list.  The s300 compiler
 *          allows this, but ANSI standard does not.
 *          Change made in 'enum_list'
 *
 *    WARNING:
 *       When an action is inserted where there has not previously been
 *       an action, verify that the token immediatly after the inserted
 *       action does not need "$<string>0" information.  If it does, you
 *       must add a SETSTRING macro to the inserted action!
 *
 *       If there is any possibility of an indentifier preceeding a COLON,
 *       and you don't want the identifier to return LABELDEF, you had
 *       better call 'labeldefenable(FALSE)' prior to the place
 *       where the identifier may occur.  In practice, you should *always*
 *       disable label definitions where this is legal...  Also, you
```

BEST AVAILABLE COPY

```
 *        should inhibit_statement_start/inhibit_conditional_expression
 *        in the same places...
 *
 *     STYLE NOTE:
 *        The following style conventions *must* be observed to avoid
 *        breaking the cvtgram tool:
 *        - no ':' on the same line as the non-token name
 *        - no comments on the same line as a rule
 *
 * TABSTOPS 3
 *
 * INSPECTED   date     - inspectors
 *
 * RCS      $Log: gram.y,v $
 * Revision 1.30  87/11/18  10:38:28  10:38:28  hmgr ()
 * Author: bae@hplsdlc.hp.com
 * added function prototyping
 *
 * Revision 1.29  87/11/12  17:16:52  17:16:52  hmgr ()
 * Author: bae@hplsdlc.hp.com
 * Allow the external declaration 'funcname();', which
 * is illegal in ANSII, but which some compilers permit
 *
 * Revision 1.28  87/10/14  15:05:14  15:05:14  hmgr ()
 * Author: bae@hplsdlc.hp.com
 * Convert to pragmas for ignore & alerts...
 * (now ignore all pragmas except ASM in the grammar)
 *
 * Revision 1.27  87/09/03  09:59:51  09:59:51  hmgr ()
 * Author: bae@hplsdlc.hp.com
 * added stuff to deal correctly with the ASM pragma
 *
 * Revision 1.26  87/08/27  15:25:28  15:25:28  hmgr ()
 * Author: bae@hplsdlc.hp.com
 * Fixed grammar up to deal more pricisely with labels...
 *
 * Revision 1.25  87/08/21  16:17:30  16:17:30  hmgr ()
 * Author: bae@hplsdlc.hp.com
 * Changed the way 'do' loops are handled so that we never have problems
 * when the 'while' is far away from the 'do'.
 *
 * Revision 1.24  87/08/18  13:09:51  13:09:51  hmgr ()
 * Author: bae@hplsdlc.hp.com
 *
 *
 * Revision 1.23  87/08/18  12:45:44  12:45:44  hmgr ()
 * Author: bae@hplsdlc.hp.com
 * Removed unused rules
 *
 * Revision 1.22  87/07/28  13:16:49  13:16:49  hmgr ()
 * Author: bae@hplsdlc.hp.com
 * Added support for the PF_NOBREAK option (which replaces the
```

BEST AVAILABLE COPY

```
 * PF_NOCODE option)
 *
 * Revision 1.21  87/07/25  18:28:54  18:28:54  hmgr ()
 * Author: bae@hplsdlc.hp.com
 * Added capibility to detect previous statement's end, so
 * that a case statement w/o a break can correctly report
 * the last cases' end.
 *
 * Revision 1.20  87/07/10  10:24:57  10:24:57  hmgr ()
 * Author: bae@hplsdlc.hp.com
 * no comment
 *
 * Revision 1.24  87/07/09  17:39:05  17:39:05  bae (Bruce Erickson)
 * Changed grammar so that ANYTHING between OPTION_START and OPTION_STOP will
 * be accepted.
 * Up to date with NXLS version 4.41
 *
 * Revision 1.23  87/06/16  16:11:23  16:11:23  bae (Bruce Erickson)
 * Updated to NXLS grammar version 4.39
 *
 * Revision 1.22  87/06/04  15:55:45  15:55:45  bae (Bruce Erickson)
 * added stuff to insert _bA_dump() calls in appropriate places.
 *
 * Revision 1.21  87/06/03  16:06:41  16:06:41  bae (Bruce Erickson)
 * Added capibility to inhibit statement starts and conditional
 * assignment expressions seperately.
 * Enable conditional assignments during function headers and
 * other places where there might be initializers using conditional
 * assignments.
 *
 * Revision 1.20  87/06/01  15:25:45  15:25:45  bae (Bruce Erickson)
 * Really fixed empty case == break problem this timegram.y
 * LSDqf00223
 *
 * Revision 1.19  87/05/06  12:08:36  12:08:36  bae (Bruce Erickson)
 * Passes Plum Hall conformance test
 *
 * Revision 1.18  87/05/04  08:24:49  08:24:49  bae (Bruce Erickson)
 * Updated to NXLS grammar version 4.30
 *
 * Revision 1.17  87/04/27  08:26:01  08:26:01  bae (Bruce Erickson)
 * updated to NXLS grammar 4.29
 *
 * Revision 1.16  87/04/24  15:30:38  15:30:38  bae (Bruce Erickson)
 * Added the enhancement of trailing commas in enumerator lists.
 * Now inhibit statement starts after an '=' in a declaration,
 * so that if an expression follows the '=' and the declaration
 * is at a probe point we don't insert one incorrectly.
 *
 * Revision 1.15  87/04/16  16:46:04  16:46:04  bae (Bruce Erickson)
 * added while-loop stuff
 *
```

BEST AVAILABLE COPY

```
 * Revision 1.14  87/04/15  13:02:05  13:02:05  bae (Bruce Erickson)
 * the (optional) 'do' capibility has been added...
 *
 * Revision 1.13  87/04/14  16:33:06  16:33:06  bae (Bruce Erickson)
 * The following probe points work:
 * if/else/else-less if
 * for
 * while
 * switch
 * conditional_expressions
 *
 * Revision 1.12  87/04/01  16:16:32  16:16:32  bae (Bruce Erickson)
 * works with 'if', 'else', 'else-less-if', 'while', 'for'
 *
 * Revision 1.11  87/04/01  13:56:16  13:56:16  bae (Bruce Erickson)
 * Merged in NXLS version 4.21 - no changes at all!
 *
 * Revision 1.10  87/04/01  13:27:04  13:27:04  bae (Bruce Erickson)
 * the following insertions seem to work:
 * if
 * else
 * elseless-if
 * while
 * for
 *
 * Revision 1.9  87/03/26  10:32:44  10:32:44  bae (Bruce Erickson)
 * merged in NLS grammar version 4.20
 *
 * Revision 1.8  87/03/24  12:35:54  12:35:54  bae (Bruce Erickson)
 * before merge
 *
 * Revision 1.7  87/03/19  09:04:57  09:04:57  bae (Bruce Erickson)
 * This works, in that we correctly find function
 * starts.  Note that in order to do this a new token
 * LABELDEF was added, which is true when an identifier
 * is followed by a colon.
 *
 * Revision 1.6  87/03/17  15:47:58  15:47:58  bae (Bruce Erickson)
 * This version has 2 conflicts, which were introduced when we added
 * 'start_exec_stmnts' in order to find the first executed statement
 * of a compound.  This occurrs in the case where the first statement
 * in the block is a label which has the same text as a typedef'd
 * text....
 *
 * Revision 1.5  87/03/16  08:50:05  08:50:05  bae (Bruce Erickson)
 * default action (pass cpptext to output) works.
 * Removing comments when !passcomments works.
 *
 * Revision 1.4  87/03/10  09:53:13  09:53:13  bae (Bruce Erickson)
 * merged in cgram.y version 4.18 from Steve Young
 *
 * Revision 1.3  87/02/18  11:29:05  11:29:05  bae (Bruce Erickson)
```

BEST AVAILABLE COPY

```
 * After merging with Steve's new grammar & lexical analyzer
 *
 * Revision 1.2  87/02/17  16:15:56  16:15:56  bae (Bruce Erickson)
 * This seems to parse typedefs OK now
 *
 *
 */
static char rcsid[] = "$Header: gram.y,v 1.30 87/11/18 10:38:28 hmgr Exp $";
#include <stdio.h>
#include <model.h>
#include <boolean.h>
#include "yystype.h"
#include "csym.h"
#include "probe.h"

/* GLOBALS */
/* Inhibit_statement_start is used to prevent the calling of
   gstartstatement() in certain conditions.  It is a global here
   because it is checked so often I didn't want to make us call
   a subroutine to check it....
   When > 0, it is also impossible for an expression
   to be probed, since there can be expressions
   in declarations at probe points....
*/
static u_int32 inhibit_statement_start = 0;
#define INHIBIT_SS_ON()     inhibit_statement_start++
#define INHIBIT_SS_OFF()    inhibit_statement_start--

/* Inhibit_conditional_expr is used to prevent the insertion
   of probes in a conditional expression under certain conditions
   (primarily outside of functions, and insided array size declarations).
*/
static u_int32 inhibit_conditional_expression = 0;
#define INHIBIT_CA_ON()     inhibit_conditional_expression++
#define INHIBIT_CA_OFF()    inhibit_conditional_expression--

/* When we enter a conditional assignment, we will push the current value of
   inhibit_statement_start onto the inhibitlist stack... */
static u_int32 inhibitarray[200];
static int inhibitnest = 0;          /* inhibitnest is the post-increment
                                        stack pointer */

/* When we find a semicolon which is the end of a statement,
   this variable is set to it's byte count
   NOTE: this should be set *after* any actions associated with
   the statement!
*/
int32 gprevstmntend = 0;


/* STATICS */
static u int32 ctype;           /* common decl header type.  Since we only care
```

BEST AVAILABLE COPY

```
                                        about typedefs, this is used only to be set
                                        to T_DEFI */
static boolean inmain = FALSE;/* Only used if 'insertdump' is TRUE.  When this
                                        is TRUE, we are processing the function
                                        named 'main' - so insert dump calls on
                                        return's and end of function
                                    */

/* EXTERNALS */
extern int inasm;               /* Set this when ASM pragma found */
extern void gstartlabel();
extern boolean gstartfunction();
extern void printcpptext();
extern u_int32 clastcppbyte();
extern boolean docondassign;
extern boolean insertdump;

/* FORWARD */

%}
/* Terminals */
/* These are listed one per line so that when one is added or removed
   only one line changes
   */

%token <string> ALIAS
%token <string> AMPERSAND
%token <string> AMPERSAND_EQUALS
%token <string> AND
%token <string> ARROW
%token <string> ASM
%token <string> ASM_LINE
%token <string> AUTO
%token <string> BANG
%token <string> BAR
%token <string> BAR_EQUALS
%token <string> BASE_PAGE
%token <string> BREAK
%token <string> CARAT
%token <string> CARAT_EQUALS
%token <string> CASE
%token <string> CHAR
%token <string> COLON
%token <string> COMMA
%token <string> CONST
%token <string> CONTINUE
%token <string> DATA
%token <string> DECREMENT
%token <string> DEFAULT
%token <string> DO
%token <string> DOT
%token <string> DOUBLE
```

BEST AVAILABLE COPY

```
%token <string> DOUBLE_CONSTANT
%token <string> DOUBLE_EQUALS
%token <string> ELSE
%token <string> END_ASM
%token <string> ENUM
%token <string> EQUALS
%token <string> EXTERN
%token <string> FIRST_LINE_DIRECTIVE
%token <string> FLOAT
%token <string> FLOAT_CONSTANT
%token <string> FOR
%token <string> GOTO
%token <string> GREATER_THAN
%token <string> GREATER_THAN_OR_EQUAL
%token <string> IF
%token <string> INCREMENT
%token <string> INT
%token <string> INTERRUPT
%token <string> INT_CONSTANT
%token <string> LBRACE
%token <string> LBRACKET
%token <string> LESS_THAN
%token <string> LESS_THAN_OR_EQUAL
%token <string> LONG
%token <string> LONG_CONSTANT
%token <string> LPAREN
%token <string> LSHIFT
%token <string> LSHIFT_EQUALS
%token <string> MINUS
%token <string> MINUS_EQUALS
%token <string> NON_TYPE_ID
%token <string> NOT_EQUALS
%token <string> OPTION_STOP
%token <string> OPT_CONST
%token <string> OR
%token <string> PERCENT
%token <string> PERCENT_EQUALS
%token <string> PLUS
%token <string> PLUS_EQUALS
%token <string> PROG
%token <string> QUESTION
%token <string> RBRACE
%token <string> RBRACKET
%token <string> REGISTER
%token <string> RETURN
%token <string> RPAREN
%token <string> RSHIFT
%token <string> RSHIFT_EQUALS
%token <string> SEGMENT
%token <string> SEMICOLON
%token <string> SHORT
%token <string> SIGNED
```

BEST AVAILABLE COPY

```
%token <string> SIZEOF
%token <string> SLASH
%token <string> SLASH_EQUALS
%token <string> STAR
%token <string> STAR_EQUALS
%token <string> STATIC
%token <string> STRING_CONSTANT
%token <string> STRUCT
%token <string> SWITCH
%token <string> TILDE
%token <string> TYPEDEF
%token <string> TYPE_ID
%token <string> UINT_CONSTANT
%token <string> ULONG_CONSTANT
%token <string> UNDO
%token <string> UNION
%token <string> UNSIGNED
%token <string> VOID
%token <string> VOLATILE
%token <string> WHILE
%token <string> error
%token <string> LABELDEF

/* Nonterminals */

%type <string> program
%type <string> line_directive_opt
%type <string> file
%type <string> external_definition
%type <string> common_decl_header
%type <string> statement
%type <string> asm_list
%type <string> statement_list
%type <string> test_expression
%type <string> test_expression_opt
%type <string> expression_opt
%type <string> compound_statement
%type <string> enter_local_scope
%type <string> exit_local_scope
%type <string> internal_declaration_list
%type <string> param_declaration_list_opt
%type <string> external_declaration
%type <string> internal_declaration
%type <string> param_declaration
%type <string> declarator_list_opt
%type <string> declarator_list
%type <string> auto_init_declarator_list_opt
%type <string> auto_init_declarator_list
%type <string> static_init_declarator_list_opt
%type <string> static_init_declarator_list
%type <string> type_specifier
%type <string> type_spec
```

BEST AVAILABLE COPY

```
%type <string> integral_type
%type <string> declared_declarator
%type <string> declarator
%type <string> function_or_array_declarator
%type <string> param_list
%type <string> param_entry
%type <string> abstract_declarator_opt
%type <string> function_or_array_abstract_declarator
%type <string> auto_initializer
%type <string> static_initializer
%type <string> static_initializer_list
%type <string> constant_expression
%type <string> integral_constant
%type <string> struct_specifier
%type <string> union_specifier
%type <string> struct_decl_list
%type <string> struct_declaration
%type <string> struct_declarator_list
%type <string> struct_declarator
%type <string> enum_specifier
%type <string> enum_list
%type <string> enumerator
%type <string> expression
%type <string> assignment_expression
%type <string> conditional_expression
%type <string> logical_or_expression
%type <string> logical_and_expression
%type <string> inclusive_or_expression
%type <string> exclusive_or_expression
%type <string> and_expression
%type <string> equality_expression
%type <string> relational_expression
%type <string> shift_expression
%type <string> additive_expression
%type <string> multiplicative_expression
%type <string> cast_expression
%type <string> unary_expression
%type <string> type_name
%type <string> postfix_expression
%type <string> sub_postfix_expression
%type <string> function_name
%type <string> identifier
%type <string> constant
%type <string> argument_expr_list_opt
%type <string> argument_expr_list
%type <string> typedef
%type <string> else_opt


/* special rules */

%nonassoc RPAREN
```

BEST AVAILABLE COPY

```
%left ELSE          /* bae - NLS uses nonassoc */
%start program

%%


/****************************************************************************
 *
 *    E X T E R N A L   D E F I N I T I O N S
 *
 ****************************************************************************/

/*
 * Difference from ANSI: I have made a program consist of only one file
 * because the job of linking files is left to the linker and transparent
 * to the front end.
 */
program
    : line_directive_opt
    file
        {   SETSTRING($1, $2, $2);

            /* Print the rest of the file.  Note that we cannot simply print
               $2.end, because this would not include any trailing comments
            */
            printcpptext(clastcppbyte());
        }
    ;

line_directive_opt
    : FIRST_LINE_DIRECTIVE
        { SETSTRING($1, $1, $1); }
    | /* Empty */
        { SETSTRING($<string>0, $<string>0, $<string>0);
 }
    ;

file
    : /* Empty */
        { SETSTRING($<string>0, $<string>0, $<string>0);
 }
    | file external_declaration
        { SETSTRING($1, $2, $2); }
    | file external_definition
        { SETSTRING($1, $2, $2); }
/*  | file external_option
/*      { SETSTRING($1, $2, $2); } */
    ;


/*external_option
/* : option_stuff OPTION_STOP
```

BEST AVAILABLE COPY

```
/*     {
/*         /* for bba, we will not parse any #pragma stuff.  Therefore
/*            the lexical analyzer swallows everything else
/*         */
/*         SETSTRING($1, $2, $2);
/*     } */
/* : OPTION_START INTERRUPT OPTION_STOP
/*     { SETSTRING($1, $3, $3); }
/* | OPTION_START SEGMENT prog_seg_opt data_seg_opt const_seg_opt OPTION_STOP
/*     { SETSTRING($1, $6, $6); }
/* | OPTION_START SEGMENT UNDO OPTION_STOP
/*     { SETSTRING($1, $4, $4); }
/* | OPTION_START ALIAS identifier identifier OPTION_STOP
/*     { SETSTRING($1, $5, $5); }
/* | OPTION_START ALIAS identifier STRING_CONSTANT OPTION_STOP
/*     { SETSTRING($1, $5, $5); }
/* | OPTION_START error OPTION_STOP
/*     { SETSTRING($1, $3, $3); } */
    ;

/* The following are recognized as special tokens ONLY w/in the pragma
   confines...
*/
/*option_stuff
/* :  /* empty */
/*     {
/*         SETSTRING($<string>0, $<string>0, $<string>0);
/*     }
/* |   option_stuff BBA_IGNORE
/*     {
/*         gpragma(PF_IGNORE);
/*         SETSTRING($1, $1, $1);
/*     }
/* |   option_stuff BBA_ALERT
/*     {
/*         gpragma(PF_ALERT);
/*         SETSTRING($1, $1, $1);
/*     }
/* |   option_stuff error
/*     {
/*         SETSTRING($1, $1, $1);
/*     }
/* ; */


/* bae: These are safe from inadvertand branches in the constant_int
   because they cannot be at probe points (no probe points outside
   of functions! */


/*
```

BEST AVAILABLE COPY

```
 * According to ANSI specification, external_definition is either a function
 * definition or a declaration.  The substance of the external_definition
 * has been maintained below, but the format of the productions is changed
 * to avoid ambiguities and reduction conflicts.
 */

external_definition
    : /* No sscSpecifier or type */
    declarator
    enter_function_scope param_declaration_list_opt
    compound_statement exit_function_scope
        { SETSTRING($1, $4, $4); }
    | common_decl_header declarator
        {
            /* We want the gstart function to pick up the
               common_decl_header part, so we will set
               $0 for enter_function_scope to include
               it.  We can't have enter_function_scope
               simply reference $-1, because the first
               definition (above) does will not have a $-1!
            */
            SETSTRING($1, $2, $2);
        }
    enter_function_scope param_declaration_list_opt
    compound_statement exit_function_scope
        { SETSTRING($1, $6, $6); }
    /* bae - added exit_function_scope */
    | error exit_function_scope
        { SETSTRING($1, $1, $1); }
    ;


enter_function_scope
    : /* Empty */
        {
            /* This is when we find the closing ')' of the function
               declaration */
            inmain = gstartfunction($<string>0.symnum, $<string>0.startbyte,
                    $<string>0.endbyte);
        }
    ;


exit_function_scope
    : /* Empty */
        {
            gendfunction($<string>0.endbyte, inmain);
            inmain = FALSE;
        }
    ;


common_decl_header
```

BEST AVAILABLE COPY

```
    :  type_specifier
         {
            SETSTRING($1, $1, $1);
         }
    | EXTERN
         {
            SETSTRING($1, $1, $1);
            $$.general = S_EXTERN | T_INT;
         }
    | EXTERN type_specifier
         {
            SETSTRING($1, $2, $2);
            $$.general |= S_EXTERN;
         }
    | type_specifier EXTERN
         {
            SETSTRING($1, $2, $1);
            $$.general |= S_EXTERN;
         }
    | STATIC
         {
            SETSTRING($1, $1, $1);
            $$.general = S_STATIC | T_INT;
         }
    | STATIC type_specifier
         {
            SETSTRING($1, $2, $2);
            $$.general |= S_STATIC;
         }
    | type_specifier STATIC
         {
            SETSTRING($1, $2, $1);
            $$.general |= S_STATIC;
         }
    ;



/*************************************************************************
 *
 *        S T A T E M E N T S
 *
 *************************************************************************/
statement
    /* note that we need a special case for compound! */
    : compound_statement
       { SETSTRING($1, $1, $1); }
    /* Expression_opt is split into two parts:
       expression SEMICOLON
       SEMICOLON
    */
    /* note special case for expression_opt! */
```

BEST AVAILABLE COPY

```
| expression SEMICOLON
    {
        SETSTRING($1, $2, $2);
        gprevstmntend = $2.endbyte;
    }
| SEMICOLON statement_start
    {
        SETSTRING($1, $1, $1);
        gprevstmntend = $1.endbyte;
    }
| IF statement_start LPAREN test_expression RPAREN
    {
        gnextstatement(PT_IF, $1.startbyte, $5.endbyte, "(", ";", ")");
        SETSTRING($1, $5, $5);
    }
    statement
    {
        gendstatement($7.endbyte);
        SETSTRING($1, $7, $7);      /* in case elseless nees this */
    }
    else_opt
    { SETSTRING($1, $9, $9); }
| SWITCH statement_start LPAREN expression RPAREN
    {
        gstartswitch($1.startbyte, $5.endbyte);
        SETSTRING($1, $5, $5);
    }
    statement
    {
        gendswitch($7.endbyte);
        SETSTRING($1, $7, $7);
    }
| WHILE statement_start
    {
        gstartwhile($1.startbyte, $1.endbyte);
    }
    LPAREN test_expression RPAREN
    {
        gnextstatement(PT_WHILE, $1.startbyte, $6.endbyte, "(", ";", ")");
        SETSTRING($1, $6, $6);
    }
    statement
    {
        gendstatement($8.endbyte);
        gendwhile($8.startbyte, $8.endbyte);
        SETSTRING($1, $8, $8);
    }
| DO
    {
        /* statement_start for the DO, to prevent collisions */
        if (inhibit_statement_start == 0)
            gstartstatement($1.startbyte, $1.endbyte);
```

BEST AVAILABLE COPY

```
            gstartdo($1.startbyte, $1.endbyte);
            SETSTRING($1, $1, $1);      /* 'statement_start' will use this */
        }
        statement WHILE LPAREN
        {
            gstartdocond($5.startbyte);
        }
        test_expression
        {
            genddocond($3.startbyte, $3.endbyte, $7.startbyte, $7.endbyte);
        }
        RPAREN SEMICOLON
        {
            genddo($3.endbyte, $4.startbyte, $10.endbyte);
            SETSTRING($1, $10, $10);
            gprevstmntend = $10.endbyte;
        }
      | FOR statement_start LPAREN expression_opt SEMICOLON test_expression_opt SEMICOLON
        {
            gnextstatement(PT_3FOR, $6.startbyte, $6.endbyte, NULL, ",", NULL);
            SETSTRING($1, $7, $7);
        }
        for_expression_opt RPAREN
        {
            gnextstatement(PT_FOR, $1.startbyte, $10.endbyte, "(", ";", ")");
            SETSTRING($1, $10, $10);
        }
        statement
        {
            gendstatement($12.endbyte);
            SETSTRING($1, $12, $12);
        }
      /* bae - use LABELDEF instead of identifier to avoid conflicts */
      | LABELDEF statement_start COLON
        {
            /* Note definition of statement is same as control... */
            gstartlabel($1.startbyte, $3.endbyte);
            SETSTRING($1, $3, $1);
        }
        statement
        {
            SETSTRING($1, $5, $5);
        }
      | GOTO statement_start identifier SEMICOLON
        {
            SETSTRING($1, $4, $4);
            gbreak(FALSE, $1.startbyte, $4.endbyte);  /* might break a case */
            gprevstmntend = $4.endbyte;
        }
      | CONTINUE statement_start SEMICOLON
        {
```

BEST AVAILABLE COPY

```
            SETSTRING($1, $3, $3);
            gbreak(FALSE, $1.startbyte, $3.endbyte);  /* might break a case */
            gprevstmntend = $3.endbyte;
         }
      | BREAK SEMICOLON
         {
            /* Note that the 'statement_start' is removed to prevent
               collisions.... */
            gbreak(TRUE, $1.startbyte, $2.endbyte);
            if (inhibit_statement_start == 0)
               gstartstatement($1.startbyte, $1.endbyte);
            SETSTRING($1, $2, $2);
            gprevstmntend = $2.endbyte;
         }
      | RETURN
         {
            /* This is the same as 'statement_start' */
            if (inhibit_statement_start == 0)
               gstartstatement($1.startbyte, $1.endbyte);
            if (inmain)
            {
#pragma        BBA_IGNORE /* not for production */
               gmainreturn(TRUE, $1.startbyte);
            }
            SETSTRING($1, $1, $1);
         }
         expression_opt SEMICOLON
         {
            if (inmain)
            {
#pragma        BBA_IGNORE /* not for production */
               gmainreturn(FALSE, $4.endbyte);
            }
            gbreak(FALSE, $1.startbyte, $4.endbyte);  /* might break a case */
            SETSTRING($1, $4, $4);
            gprevstmntend = $4.endbyte;
         }
      | CASE
         {
            /* When we read a 'case', we need to turn of statement_start
               so that the constant_expression does not trigger probestart()
               This is not a classic "start of statement", since it MUST be
               w/in a switch statement.  In fact, the only thing that is
               pending and must know about this (other than gcase) is when
               a label was just before the case...)
               Further, if we put a statement start
               here, we will not be able to detect "empty cases" of cases
               prior to this case...
            */
            INHIBIT_SS_ON();
            INHIBIT_CA_ON();
            labeldefenable(FALSE);
```

BEST AVAILABLE COPY

```
        }
        constant_expression COLON
        {
           labeldefenable(TRUE);
           INHIBIT_SS_OFF();
           INHIBIT_CA_OFF();
           gcase(FALSE, $1.startbyte, $4.endbyte);
           SETSTRING($1, $4, $4);
        }
        statement
        {
           SETSTRING($1, $6, $6);
        }
        /* NOTE:
           we do not have to disable looking for label definitions at this
           point because DEFAULT is checked before islabeldef() is called
           Also, we do not consider default a statement_start because
           the only thing that might be done is to deal with a label -
           and that is handled in gcase.  If we put a statement start
           here, we will not be able to detect "empty cases" of cases
           prior to the defaul...
        */
      | DEFAULT COLON
        {
           gcase(TRUE, $1.startbyte, $2.endbyte);
           SETSTRING($1, $2, $2);
        }
        statement
        {
           SETSTRING($1, $4, $4);
        }
      | ASM statement_start OPTION_STOP
        {
           inasm = 1;     /* ignore lines until END_ASM found */
        }
        asm_list END_ASM OPTION_STOP
        {
           SETSTRING($1, $6, $6);
           inasm = 0;
        }
/*    | OPTION_START option_stuff OPTION_STOP
/*      {
/*         SETSTRING($1, $2, $2);
/*      } */
      ;

else_opt
      : /* empty */
        {
           gelselessif($<string>-8.startbyte, $<string>-4.endbyte,
                 $<string>-1.endbyte);
           SETSTRING($<string>0, $<string>0, $<string>0);
```

BEST AVAILABLE COPY

```
        }
    |   ELSE
        {
           gnextstatement(PT_ELSE, $<string>-8.startbyte, $<string>-4.endbyte,
                 "{", ";", "}");
           SETSTRING($1, $1, $1);
        }
        statement
        {
           gendstatement($3.endbyte);
           SETSTRING($1, $3, $3);
        }
    ;


/* bae - this is called after we have detected a possible start of a statement... */
/* NOTE: same code in RETURN, CASE, and DO statements to prevent collisions */
statement_start
    :  /* empty */
        {
           if (inhibit_statement_start == 0)
              gstartstatement($<string>0.startbyte, $<string>0.endbyte);
        }
    ;

asm_list
    : /* Empty */
       { SETSTRING($<string>0, $<string>0, $<string>0); }
    | asm_list error
       { SETSTRING($<string>0, $<string>0, $<string>0); }
    ;




statement_list
    : statement
       { SETSTRING($1, $1, $1); }
    | statement_list statement
       { SETSTRING($1, $2, $2); }
    | statement_list error SEMICOLON
       {
          SETSTRING($1, $3, $3);
          gprevstmntend = $3.endbyte;
       }
    ;



test_expression
    : expression
       { SETSTRING($1, $1, $1); }
```

```
    ;


test_expression_opt
    : /* Empty */
      { SETSTRING($<string>0, $<string>0, $<string>0);
 }
    | test_expression
      { SETSTRING($1, $1, $1); }
    ;


/* expression_opt is used by return and for statements .... */
expression_opt
    : /* Empty */
      { SETSTRING($<string>0, $<string>0, $<string>0);
 }
    | expression
      { SETSTRING($1, $1, $1); }
    ;

/* for_expression_opt is used by the for statement as the third
    statement... */
for_expression_opt
    : /* Empty */
      {
         gend3for(FALSE, 0);
         SETSTRING($<string>0, $<string>0, $<string>0);
      }
    | expression
      {
         gend3for(TRUE, $1.endbyte);
         SETSTRING($1, $1, $1);
      }
    ;

/* bae
    Some modifications:
    1) LBRACE and RBRACE have been moved to enter/exit_local_scope
       so that the 'gstart/endfunction()' routine has the byte number
       of the braces
    2) 'compound2' is added so that we can detect the first
       executable statement and insert a probe point.  In order to do this,
       we have to change 'internal_declaration_list_opt' into
       'internal_declaration_list' and handle the two cases up here
       [this avoids a conflict]
*/
compound statement
    : enter_local_scope compound2 exit_local_scope
      { SETSTRING($1, $3, $3); }
    ;
```

BEST AVAILABLE COPY

```
compound2
    :  /* empty */
       compound_exec_start
     | internal_declaration_list compound_exec_start
     | compound_exec_start statement_list
     | internal_declaration_list compound_exec_start statement_list
    ;


enter_local_scope
    : LBRACE
       {
          pushscope();
          ginitcompound($1.startbyte);
          SETSTRING($1, $1, $1);
       }
    ;


exit_local_scope
    : RBRACE
       {
          gendcompound($1.startbyte);
          popscope();
          SETSTRING($1, $1, $1);
          gprevstmntend = $1.endbyte;
       }
    ;

compound_exec_start
    :  /* EMPTY */
       {
          /* We are here when we have found the end of the
             declarations */
          gstartcompound($<string>0.endbyte);
       }
    ;


/* bae -
   This used to be 'internal_declaration_list_opt'; now it
   is no longer optional
*/
internal_declaration_list
    : internal_declaration
       { SETSTRING($1, $1, $1); }
    | internal_declaration_list internal_declaration
       { SETSTRING($1, $2, $2);   }
    ;
```

BEST AVAILABLE COPY

BEST AVAILABLE COPY

```
param_declaration_list_opt
    : /* Empty */
        { SETSTRING($<string>0, $<string>0, $<string>0);
    }
    | param_declaration_list_opt param_declaration
        { SETSTRING($1, $2, $2); }
    ;


/*****************************************************************************
 *
 *        D E C L A R A T I O N S
 *
 *****************************************************************************/

/*
 * External declarations are those which occur outside of any function.
 *
 * We need to list the first declarator explicitly so that we
 * don't run into a shift/reduce conflict
 * with the function definition.  After this first declarator, a function
 * definition will follow with parameter declarations or a left brace
 * whereas a function declaration will follow with a comma or an equals
 * in which case the parser can tell the difference.
 *
 * A parameter list is allowed in a function declaration, but it is ignored.
 */

external_declaration
    : declared_declarator SEMICOLON
        {
            /* (bae) - added for compatibility with other compilers (sun) */
            SETSTRING($1, $2, $2);
            caddsymnum($1.symnum, $1.general);
            gprevstmntend = $2.endbyte;
        }
    | common_decl_header declared_declarator SEMICOLON
        {
            SETSTRING($1, $3, $3);
            caddsymnum($2.symnum, $1.general);
            gprevstmntend = $3.endbyte;
        }
/*  | common_decl_header declared_declarator
/*      NOTE: this has been combined with the following rule, using
/*      static_init_decl_list_opt instead of COMMA static_init_decl_list.
/*      This was done to prevent conflicts.... bae
/*      {
/*          INHIBIT_SS_ON();
/*      }
/*      EQUALS static_initializer SEMICOLON
/*      {
/*          SETSTRING($1, $6, $6);
```

BEST AVAILABLE COPY

```
/*        caddsymnum($2.symnum, $1.general);
/*        INHIBIT_SS_OFF();
/*     } */
     | common_decl_header declared_declarator
        {
           INHIBIT_SS_ON();
           INHIBIT_CA_ON();
        }
        EQUALS static_initializer static_init_decl_list_opt SEMICOLON
        {
           SETSTRING($1, $7, $7);
           caddsymnum($2.symnum, $1.general);
           INHIBIT_SS_OFF();
           INHIBIT_CA_OFF();
           gprevstmntend = $7.endbyte;
        }
     | common_decl_header declared_declarator COMMA
     static_init_declarator_list SEMICOLON
        {
           SETSTRING($1, $5, $5);
           caddsymnum($2.symnum, $1.general);
           gprevstmntend = $5.endbyte;
        }

     /* This is the only use of ctype.  The 'typedef' target sets ctype to
        T_DEF; after it is used, ctype is set back to 0 so that we don't have
        to be complete about setting it...
     */
     | typedef
     declarator_list_opt SEMICOLON
        { SETSTRING($1, $3, $3); ctype = 0; gprevstmntend = $3.endbyte; }
     | typedef type_specifier
     declarator_list_opt SEMICOLON
        { SETSTRING($1, $4, $4); ctype = 0; gprevstmntend = $4.endbyte; }
     | type_specifier typedef
     declarator_list_opt SEMICOLON
        { SETSTRING($1, $4, $4); ctype = 0; gprevstmntend = $4.endbyte; }
     | common_decl_header SEMICOLON
        {
           SETSTRING($1, $2, $2)
           ctype = 0;
           gprevstmntend = $2.endbyte;
        }
     ;

/* The following rule is used to prevent shift/reduce conflicts */
static_init_decl_list_opt
     :  /* empty */
     |  COMMA static_init_declarator_list
     ;

/* This is done to force the ctype to typedef, because
```

BEST AVAILABLE COPY

```
   that is what the declarator_lsit_opt will set each
   identifier to... */
typedef
      : TYPEDEF
         {  SETSTRING($1, $1, $1); ctype = T_DEF; }


/*
 * Internal declarations are those at the front of a compound statement.
 */

internal_declaration
    : type_specifier
    auto_init_declarator_list_opt SEMICOLON
       { SETSTRING($1, $3, $3); gprevstmntend = $3.endbyte; }
    | AUTO
    auto_init_declarator_list_opt SEMICOLON
       { SETSTRING($1, $3, $3); gprevstmntend = $3.endbyte; }
    | AUTO type_specifier
    auto_init_declarator_list_opt SEMICOLON
       { SETSTRING($1, $4, $4); gprevstmntend = $4.endbyte; }
    | type_specifier AUTO
    auto_init_declarator_list_opt SEMICOLON
       { SETSTRING($1, $4, $4); gprevstmntend = $4.endbyte; }
    | REGISTER
    auto_init_declarator_list_opt SEMICOLON
       { SETSTRING($1, $3, $3); gprevstmntend = $3.endbyte; }
    | REGISTER type_specifier
    auto_init_declarator_list_opt SEMICOLON
       { SETSTRING($1, $4, $4); gprevstmntend = $4.endbyte; }
    | type_specifier REGISTER
    auto_init_declarator_list_opt SEMICOLON
       { SETSTRING($1, $4, $4); gprevstmntend = $4.endbyte; }
    | STATIC
    static_init_declarator_list_opt SEMICOLON
       { SETSTRING($1, $3, $3); gprevstmntend = $3.endbyte; }
    | STATIC type_specifier
    static_init_declarator_list_opt SEMICOLON
       { SETSTRING($1, $4, $4); gprevstmntend = $4.endbyte; }
    | type_specifier STATIC
    static_init_declarator_list_opt SEMICOLON
       { SETSTRING($1, $4, $4); gprevstmntend = $4.endbyte; }
    | EXTERN
    declarator_list_opt SEMICOLON
       { SETSTRING($1, $3, $3); gprevstmntend = $3.endbyte; }
    | EXTERN type_specifier
    declarator_list_opt SEMICOLON
       { SETSTRING($1, $4, $4); gprevstmntend = $4.endbyte; }
    | type_specifier EXTERN
    declarator_list_opt SEMICOLON
       { SETSTRING($1, $4, $4); gprevstmntend = $4.endbyte; }
    | typedef type_specifier
```

BEST AVAILABLE COPY

```
    declarator_list_opt SEMICOLON
       { SETSTRING($1, $4, $4); ctype = 0; gprevstmntend = $4.endbyte; }
    | type_specifier typedef
    declarator_list_opt SEMICOLON
       { SETSTRING($1, $4, $4); ctype = 0; gprevstmntend = $4.endbyte; }
    | error SEMICOLON
       { SETSTRING($1, $2, $2); gprevstmntend = $2.endbyte; }
    ;

/*
 * Parameter declarations are those in a function definition declaring
 * the parameter types.  They cannot be initialized.
 */

param_declaration
    : type_specifier
    declarator_list_opt SEMICOLON
       { SETSTRING($1, $3, $3); gprevstmntend = $3.endbyte; }
    | REGISTER
    declarator_list_opt SEMICOLON
       { SETSTRING($1, $3, $3); gprevstmntend = $3.endbyte; }
    | REGISTER type_specifier
    declarator_list_opt SEMICOLON
       { SETSTRING($1, $4, $4); gprevstmntend = $4.endbyte; }
    | type_specifier REGISTER
    declarator_list_opt SEMICOLON
       { SETSTRING($1, $4, $4); gprevstmntend = $4.endbyte; }
    ;


/*
 * This is the declarator_list allowed for parameters and EXTERNS which have
 * no initializers.
 *
 * This will add 'ctype' to each declarator...
 */

declarator_list_opt
    : /* Empty */
       { SETSTRING($<string>0, $<string>0, $<string>0);
 }
    | declarator_list
       { SETSTRING($1, $1, $1); }
    ;


declarator_list
    : declared_declarator
       {
          SETSTRING($1, $1, $1);
          caddsymnum($1.symnum, ctype);
       }
```

BEST AVAILABLE COPY

```
    | declarator_list COMMA dedlared_declarator
       {
          SETSTRING($1, $3, $3);
          caddsymnum($3.symnum, ctype);
       }
    ;

/*
 * This is the init_declarator_list allowed for automatic variables.  The
 * initializing value can be any assignment_expression.
 */

auto_init_declarator_list_opt
    : /* Empty */
      { SETSTRING($<string>0, $<string>0, $<string>0);
 }
    | auto_init_declarator_list
      { SETSTRING($1, $1, $1); }
    ;

auto_init_declarator_list
    : declared_declarator
      { SETSTRING($1, $1, $1); }
    | declared_declarator
      {
         /* Since these may occur in a compound statement, and the compound
            might well be at a probe point, we must inhibit the incorrect
            placement of a probe point at an assignment expression
         */
         INHIBIT_SS_ON();
      }
      EQUALS auto_initializer
      {
         INHIBIT_SS_OFF();
         SETSTRING($1, $4, $4);
      }
    | auto_init_declarator_list COMMA declared_declarator
      { SETSTRING($1, $3, $3); }
    | auto_init_declarator_list COMMA declared_declarator
      {
         INHIBIT_SS_ON();
      }
      EQUALS auto_initializer
      {
         INHIBIT_SS_OFF();
         SETSTRING($1, $6, $6);
      }
    ;

/*
```

BEST AVAILABLE COPY

```
 * This is the init_declarator_list allowed for static variables.  The
 * initializing value can only be a constant_expression.
 */

static_init_declarator_list_opt
   : /* Empty */
      { SETSTRING($<string>0, $<string>0, $<string>0); }
   | static_init_declarator_list
      { SETSTRING($1, $1, $1); }
   ;


/* Uses ctype to define types of variables (in case ctype is T_DEF) */
static_init_declarator_list
   : declared_declarator
      {
         SETSTRING($1, $1, $1);
         caddsymnum($1.symnum, ctype);
      }
   | declared_declarator
      {
         /* Since these may occur in a compound statement, and the compound
            might well be at a probe point, we must inhibit the incorrect
            placement of a probe point at an assignment expression
         */
         INHIBIT_SS_ON();
      }
      EQUALS static_initializer
      {
         INHIBIT_SS_OFF();
         SETSTRING($1, $4, $4);
         caddsymnum($1.symnum, ctype);
      }
   | static_init_declarator_list COMMA declared_declarator
      {
         SETSTRING($1, $3, $3);
         caddsymnum($3.symnum, ctype);
      }
   | static_init_declarator_list COMMA declared_declarator
      {
         INHIBIT_SS_ON();
      }
      EQUALS static_initializer
      {
         INHIBIT_SS_OFF();
         SETSTRING($1, $6, $6);
         caddsymnum($3.symnum, ctype);

      }
   ;


/*****************************************************************************
```

BEST AVAILABLE COPY

```
 *
 *          T Y P E S
 *
 *************************************************************************/

/* sets '$$.general' to current T_* definitions */

type_specifier
    : CONST
        { SETSTRING($1, $1, $1); $$.general = S_CONST; }
    | VOLATILE
        { SETSTRING($1, $1, $1); $$.general = S_VOLATILE; }
    | VOLATILE CONST
        { SETSTRING($1, $2, $2); $$.general = S_VOLATILE | S_CONST; }
    | CONST VOLATILE
        { SETSTRING($1, $2, $2); $$.general = S_VOLATILE | S_CONST; }
    | CONST type_spec
        { SETSTRING($1, $2, $2); $$.general = S_CONST | $2.general; }
    | VOLATILE type_spec
        { SETSTRING($1, $2, $2); $$.general = S_VOLATILE | $2.general; }
    | VOLATILE CONST type_spec
        { SETSTRING($1, $3, $3); $$.general = S_VOLATILE | S_CONST | $3.general; }
    | CONST VOLATILE type_spec
        { SETSTRING($1, $3, $3); $$.general = S_VOLATILE | S_CONST | $3.general; }
    | type_spec CONST
        { SETSTRING($1, $2, $2); $$.general = S_CONST | $1.general; }
    | type_spec VOLATILE
        { SETSTRING($1, $2, $2); $$.general = S_VOLATILE | $1.general; }
    | type_spec VOLATILE CONST
        { SETSTRING($1, $3, $3); $$.general = S_VOLATILE | S_CONST | $1.general; }
    | type_spec CONST VOLATILE
        { SETSTRING($1, $3, $3); $$.general = S_VOLATILE | S_CONST | $1.general; }
    | type_spec
        { SETSTRING($1, $1, $1); $$.general = $1.general; }
    ;

/* passes back the type as $$.general */
type_spec
    : struct_specifier
        { SETSTRING($1, $1, $1); $$.general = $1.general; }
    | union_specifier
        { SETSTRING($1, $1, $1); $$.general = $1.general; }
    | enum_specifier
        { SETSTRING($1, $1, $1); $$.general = $1.general; }
    | TYPE_ID
        { SETSTRING($1, $1, $1); $$.general = T_INT; }     /* typedef'd identifier */
    |  integral_type
        { SETSTRING($1, $1, $1); }    /* typedef'd identifier */
    | SIGNED
        { SETSTRING($1, $1, $1); $$.general = T_INT; }
    | SIGNED integral_type
        { SETSTRING($1, $2, $2); }
```

BEST AVAILABLE COPY

```
    | integral_type SIGNED
        { SETSTRING($1, $2, $2); }
    | UNSIGNED
        { SETSTRING($1, $1, $1); $$.general = T_INT; }
    | UNSIGNED integral_type
        { SETSTRING($1, $2, $2); }
    | integral_type UNSIGNED
        { SETSTRING($1, $2, $2); }
    | FLOAT
        { SETSTRING($1, $1, $1); $$.general = T_FLOAT; }
    | DOUBLE
        { SETSTRING($1, $1, $1); $$.general = T_DOUBLE; }
    | LONG DOUBLE
        { SETSTRING($1, $2, $2); $$.general = T_DOUBLE | T_LONG; }
    | DOUBLE LONG
        { SETSTRING($1, $2, $2); $$.general = T_DOUBLE | T_LONG; }
    | VOID
        { SETSTRING($1, $1, $1); $$.general = T_VOID; }
    ;

integral_type
    : CHAR
        { SETSTRING($1, $1, $1); $$.general = T_CHAR; }
    | SHORT
        { SETSTRING($1, $1, $1); $$.general = T_SHORT; }
    | SHORT INT
        { SETSTRING($1, $2, $2); $$.general = T_SHORT; }
    | INT SHORT
        { SETSTRING($1, $2, $2); $$.general = T_SHORT; }
    | INT
        { SETSTRING($1, $1, $1); }
    | LONG
        { SETSTRING($1, $1, $1); $$.general = T_LONG; }
    | LONG INT
        { SETSTRING($1, $2, $2); $$.general = T_LONG; }
    | INT LONG
        { SETSTRING($1, $2, $2); $$.general = T_LONG; }
    ;


/*****************************************************************************
 *
 *        D E C L A R A T O R S
 *
 *****************************************************************************/

/*
 * This production is used to declare each declarator as it is encountered to
 * allow the expressions in initializers to know that the symbols immediately
 * preceding them are declared.
 */
```

BEST AVAILABLE COPY

```
/* $$.symnum has the symbol number of this symbol */
declared_declarator
    : declarator
      { SETSTRING($1, $1, $1); }
    ;


/* $$.symnum has the symbol number of this symbol */
declarator
    : function_or_array_declarator
      { SETSTRING($1, $1, $1); }
    | STAR declarator
      { SETSTRING($1, $2, $2); }
    | STAR CONST declarator
      { SETSTRING($1, $3, $3); }
    | STAR VOLATILE declarator
      { SETSTRING($1, $3, $3); }
    | STAR CONST VOLATILE declarator
      { SETSTRING($1, $4, $4); }
    | STAR VOLATILE CONST declarator
      { SETSTRING($1, $4, $4); }
    ;


/* $$.symnum has the symbol number of this symbol */
function_or_array_declarator
    : NON_TYPE_ID
      {
         SETSTRING($1, $1, $1);
         /* The lexical analyzer added this to the symbol table if
            doing so was necessary */
      }
/*  | function_or_array_declarator LBRACKET RBRACKET
/*    { SETSTRING($1, $3, $1); }     - removed because of integral_constant_opt....*/
    | function_or_array_declarator LBRACKET
      {
         INHIBIT_SS_ON();
         INHIBIT_CA_ON();
         SETSTRING($2, $2, $2);
      }
      integral_constant_opt RBRACKET
      {
         SETSTRING($1, $5, $1);
         INHIBIT_SS_OFF();
         INHIBIT_CA_OFF();
      }
    | function_or_array_declarator LPAREN RPAREN
      { SETSTRING($1, $3, $1); }
    | function_or_array_declarator LPAREN param_list RPAREN
      { SETSTRING($1, $4, $1); }
    | LPAREN declarator RPAREN
      { SETSTRING($1, $3, $2); }
```

BEST AVAILABLE COPY

```
    ;

/* what can go into a function declaration */
param_list
    : param_entry
        { SETSTRING($1, $1, $1); }
    | param_list COMMA param_entry
        { SETSTRING($1, $3, $3); }
    ;

param_entry
    : NON_TYPE_ID
        { SETSTRING($1, $1, $1); }
    | type_specifier declarator
        { SETSTRING($1, $2, $2); }
    | type_specifier abstract_declarator_opt
        { SETSTRING($1, $2, $2); }
    ;


integral_constant_opt
    :  /* empty */
    |  integral_constant
    ;


/*
 * Abstract Declarator
 */

abstract_declarator_opt
    : /* Empty */
        { SETSTRING($<string>0, $<string>0, $<string>0);
  }
    | function_or_array_abstract_declarator
        { SETSTRING($1, $1, $1); }
    | STAR abstract_declarator_opt
        { SETSTRING($1, $2, $2); }
    | STAR CONST abstract_declarator_opt
        { SETSTRING($1, $3, $3); }
    | STAR VOLATILE abstract_declarator_opt
        { SETSTRING($1, $3, $3); }
    | STAR CONST VOLATILE abstract_declarator_opt
        { SETSTRING($1, $4, $4); }
    | STAR VOLATILE CONST abstract_declarator_opt
        { SETSTRING($1, $4, $4); }
    ;

function_or_array_abstract_declarator
/* : LBRACKET RBRACKET
/*      { SETSTRING($1, $2, $2); } - removed because using integral_constant_opt */
    : LBRACKET
```

BEST AVAILABLE COPY

```
        {
           INHIBIT_SS_ON();
           INHIBIT_CA_ON();
        }
        integral_constant_opt RBRACKET
        {
           SETSTRING($1, $4, $4);
           INHIBIT_SS_OFF();
           INHIBIT_CA_OFF();
        }
      | LPAREN RPAREN
        { SETSTRING($1, $2, $2); }
/*    | function_or_array_abstract_declarator LBRACKET RBRACKET
/*      { SETSTRING($1, $3, $3); } - removed because using integral_constant_opt */
      | function_or_array_abstract_declarator LBRACKET
        {
           INHIBIT_SS_ON();
           INHIBIT_CA_ON();
        }
        integral_constant_opt RBRACKET
        {
           SETSTRING($1, $5, $5);
           INHIBIT_SS_OFF();
           INHIBIT_CA_OFF();
        }
      | function_or_array_abstract_declarator LPAREN RPAREN
        { SETSTRING($1, $3, $3); }
      | LPAREN STAR abstract_declarator_opt RPAREN
        { SETSTRING($1, $4, $4); }
      | LPAREN STAR CONST abstract_declarator_opt RPAREN
        { SETSTRING($1, $5, $5); }
      | LPAREN STAR VOLATILE abstract_declarator_opt RPAREN
        { SETSTRING($1, $5, $5); }
      | LPAREN STAR CONST VOLATILE abstract_declarator_opt RPAREN
        { SETSTRING($1, $6, $6); }
      | LPAREN STAR VOLATILE CONST abstract_declarator_opt RPAREN
        { SETSTRING($1, $6, $6); }
      | LPAREN function_or_array_abstract_declarator RPAREN
        { SETSTRING($1, $3, $3); }
      ;


/*****************************************************************************
 *
 *       I N I T I A L I Z E R S
 *
 *****************************************************************************/


/* The second through fifth productions here are such that an assignment expression
 * initializer can be optionally brace enclosed and not conflict with a
```

BEST AVAILABLE COPY

```
 * simple brace enclosed static_initializer.  These involved productions are arrived
 * at by expanding the second static_initializer production to two levels deep with
 * the only difference being that the brace_enclosed assignment expression is used
 * instead of a brace enclosed constant_expression. */
/* NOTE:
   Anything using auto_initializer should INHIBIT_SS_ON() prior
   to where this is legal...  but not INHIBIT_CA_ON(). This is because it uses
   static_initializer, adn we don't want an inadverdant probe point
*/
auto_initializer
   : assignment_expression
      { SETSTRING($1, $1, $1); }
   | LBRACE assignment_expression RBRACE
      { SETSTRING($1, $3, $3); }
   | LBRACE LBRACE static_initializer_list RBRACE RBRACE
      { SETSTRING($1, $5, $5); }
   | LBRACE LBRACE static_initializer_list COMMA RBRACE RBRACE
      { SETSTRING($1, $6, $6); }
   | LBRACE static_initializer_list COMMA static_initializer RBRACE
      { SETSTRING($1, $5, $5); }
   | LBRACE static_initializer_list COMMA RBRACE
      { SETSTRING($1, $4, $4); }
   ;


/* NOTE:
   Anything using static_initializer should INHIBIT_SS_ON() prior
   to where this is legal...  but not INHIBIT_CA_ON().This is because constant_expression
   uses conditional_expression, and we don't want to generate
   a probe point here!
*/
static_initializer
   : constant_expression
      { SETSTRING($1, $1, $1); }
   | LBRACE static_initializer_list RBRACE
      { SETSTRING($1, $3, $3); }
   | LBRACE static_initializer_list COMMA RBRACE
      { SETSTRING($1, $4, $4); }
   | error
      { SETSTRING($1, $1, $1); }
   ;


static_initializer_list
   : static_initializer
      { SETSTRING($1, $1, $1); }
   | static_initializer_list COMMA static_initializer
      { SETSTRING($1, $3, $3); }
   ;


/*
```

BEST AVAILABLE COPY

```
 * Semantic check:
 * This production must check the conditional_expression to be sure it
 * is constant.
 */

/* NOTE:
   Anything referencing constant_expression that you do not want to
   generate a probe point on should INHIBIT_SS_ON() and INHIBIT_CA_ON(),
   because this allows conditional_expression
*/
constant_expression
   : conditional_expression
      { SETSTRING($1, $1, $1); }
   ;


/* NOTE:
   Anything referencing intergal_constant that you do not want to
   generate a probe point on should INHIBIT_SS_ON() and INHIBIT_CA_ON(),
   because this allows conditional_expression
*/
integral_constant
   : constant_expression
      { SETSTRING($1, $1, $1); }
   ;


/******************************************************************************
 *
 * S T R U C T U R E S,  U N I O N S,  A N D  E N U M E R A T I O N S
 *
 ******************************************************************************/

struct_specifier
   : STRUCT
      {
         /* We will disable looking for labels here
            because it is legal to have a NON_TYPE_ID
            followed by a colon below... */
         labeldefenable(FALSE);
         INHIBIT_SS_ON();
         INHIBIT_CA_ON();
      }
      LBRACE struct_decl_list RBRACE
      {
         SETSTRING($1, $5, $5);
         labeldefenable(TRUE);
         INHIBIT_SS_OFF();
         INHIBIT_CA_OFF();
      }
   | STRUCT identifier LBRACE
      {
```

BEST AVAILABLE COPY

```
            labeldefenable(FALSE);
            INHIBIT_SS_ON();
            INHIBIT_CA_ON();
        }
        struct_decl_list RBRACE
        {
            SETSTRING($1, $6, $6);
            labeldefenable(TRUE);
            INHIBIT_SS_OFF();
            INHIBIT_CA_OFF();
        }
      | STRUCT identifier
        { SETSTRING($1, $2, $2); }
      ;


union_specifier
      : UNION
        {
            labeldefenable(FALSE);
            INHIBIT_SS_ON();
            INHIBIT_CA_ON();
        }
        LBRACE struct_decl_list RBRACE
        {
            SETSTRING($1, $5, $5);
            labeldefenable(TRUE);
            INHIBIT_SS_OFF();
            INHIBIT_CA_OFF();
        }
      | UNION identifier
        {
            labeldefenable(FALSE);
            INHIBIT_SS_ON();
            INHIBIT_CA_ON();
        }
        LBRACE struct_decl_list RBRACE
        {
            SETSTRING($1, $5, $5);
            labeldefenable(TRUE);
            INHIBIT_SS_OFF();
            INHIBIT_CA_OFF();
        }
      | UNION identifier
        { SETSTRING($1, $2, $2); }
      ;


/* NOTE:
   Anybody who references struct_decl_list should disable looking for
   label definitions and INHIBIT_SS/CA_ON(), too!!!
*/
```

BEST AVAILABLE COPY

```
struct_decl_list
    : struct_declaration
        { SETSTRING($1, $1, $1); }
    | struct_decl_list struct_declaration
        { SETSTRING($1, $2, $2); }
    ;

struct_declaration
    : type_specifier
    struct_declarator_list SEMICOLON
        { SETSTRING($1, $3, $3); gprevstmntend = $3.endbyte; }
    ;

struct_declarator_list
    : struct_declarator
        { SETSTRING($1, $1, $1); }
    | struct_declarator_list COMMA struct_declarator
        { SETSTRING($1, $3, $3); }
    ;

/* See 'struct_decl_list' to understand how we avoid hitting
   'labeldef' for the case of NON_TYPE_ID COLON.  Also how
   we avoid probe points with integral_constant
*/
struct_declarator
    : declarator
        { SETSTRING($1, $1, $1); }
    | NON_TYPE_ID COLON integral_constant
        { SETSTRING($1, $3, $3); }
    | COLON integral_constant
        { SETSTRING($1, $2, $2); }
    ;

enum_specifier
    : ENUM LBRACE enum_list RBRACE
        { SETSTRING($1, $4, $4); }
    | ENUM identifier LBRACE enum_list RBRACE
        { SETSTRING($1, $5, $5); }
    | ENUM identifier
        { SETSTRING($1, $2, $2); }
    ;

enum_list
    : enumerator
        { SETSTRING($1, $1, $1); }
    | enum_list COMMA enumerator
        { SETSTRING($1, $3, $3); }
    /* bae: added this for compatability with s300 compiler */
    | enum_list COMMA
        { SETSTRING($1, $2, $2); }
    ;
```

BEST AVAILABLE COPY

```
enumerator
   : NON_TYPE_ID
      { SETSTRING($1, $1, $1); }
   | NON_TYPE_ID
      {
         /* This declaration might be in a compound statement.  Prevent
            incorrect setting of a probe point here
         */
         INHIBIT_SS_ON();
         INHIBIT_CA_ON();
      }
      EQUALS integral_constant
      {
         INHIBIT_SS_OFF();
         INHIBIT_CA_OFF();
         SETSTRING($1, $4, $4);
      }
   ;


/****************************************************************************
 *
 *       E X P R E S S I O N S
 *
 ****************************************************************************/

expression
   : assignment_expression
      { SETSTRING($1, $1, $1); }
   | expression COMMA assignment_expression
      { SETSTRING($1, $3, $3); }
   ;

assignment_expression
   : conditional_expression
      { SETSTRING($1, $1, $1); }
   | unary_expression EQUALS assignment_expression
      { SETSTRING($1, $3, $3); }
   | unary_expression STAR_EQUALS assignment_expression
      { SETSTRING($1, $3, $3); }
   | unary_expression SLASH_EQUALS assignment_expression
      { SETSTRING($1, $3, $3); }
   | unary_expression PERCENT_EQUALS assignment_expression
      { SETSTRING($1, $3, $3); }
   | unary_expression PLUS_EQUALS assignment_expression
      { SETSTRING($1, $3, $3); }
   | unary_expression MINUS_EQUALS assignment_expression
      { SETSTRING($1, $3, $3); }
   | unary_expression LSHIFT_EQUALS assignment_expression
      { SETSTRING($1, $3, $3); }
   | unary_expression RSHIFT_EQUALS assignment_expression
      { SETSTRING($1, $3, $3); }
```

BEST AVAILABLE COPY

```
    | unary_expression AMPERSAND_EQUALS assignment_expression
        { SETSTRING($1, $3, $3); }
    | unary_expression CARAT_EQUALS assignment_expression
        { SETSTRING($1, $3, $3); }
    | unary_expression BAR_EQUALS assignment_expression
        { SETSTRING($1, $3, $3); }
    ;

conditional_expression
    : logical_or_expression
        { SETSTRING($1, $1, $1); }
    | logical_or_expression QUESTION
        {
            if ((inhibit_conditional_expression == 0) && docondassign)
            {
                /* Temporarily enable statement starts */
                inhibitarray[inhibitnest++] = inhibit_statement_start;
                inhibit_statement_start = 0;
                gnextstatement(PT_CATRUE, $1.startbyte, $2.endbyte,
                        "(", ",", ")");
            }

            /*
                NOTE: we must turn off checking for identifiers at
                point, because expression may be of the form
                    <anything> <identifier>
                and if <identifier> preceeds the COLON it will be
                returned as a LABELDEF...
            */
            labeldefenable(FALSE);
            SETSTRING($1, $2, $2);
        }
        expression
        {
            if ((inhibit_conditional_expression == 0) && docondassign)
            {
                gendstatement($4.endbyte);
                gnextstatement(PT_CAFALSE, $1.startbyte, $2.endbyte,
                        "(", ",", ")");
            }
            SETSTRING($1, $4, $4);
        }
        COLON
        {
            labeldefenable(TRUE);
            SETSTRING($6, $6, $6);
        }
        conditional_expression
        {
            if ((inhibit_conditional_expression == 0) && docondassign)
            {
                gendstatement($8.endbyte);
```

BEST AVAILABLE COPY

```
                if (--inhibitnest < 0)
                {
#pragma             BBA_IGNORE BBA_ALERT
                   /* this should never happen, except
                      in a syntax error.... */
                   inhibitnest = 0;
                }
                inhibit_statement_start = inhibitarray[inhibitnest];
            }
            SETSTRING($1, $8, $8);
        }
    ;

logical_or_expression
    : logical_and_expression
        { SETSTRING($1, $1, $1); }
    | logical_or_expression OR logical_and_expression
        { SETSTRING($1, $3, $3); }
    ;

logical_and_expression
    : inclusive_or_expression
        { SETSTRING($1, $1, $1); }
    | logical_and_expression AND inclusive_or_expression
        { SETSTRING($1, $3, $3); }
    ;

inclusive_or_expression
    : exclusive_or_expression
        { SETSTRING($1, $1, $1); }
    | inclusive_or_expression BAR exclusive_or_expression
        { SETSTRING($1, $3, $3); }
    ;

exclusive_or_expression
    : and_expression
        { SETSTRING($1, $1, $1); }
    | exclusive_or_expression CARAT and_expression
        { SETSTRING($1, $3, $3); }
    ;

and_expression
    : equality_expression
        { SETSTRING($1, $1, $1); }
    | and_expression AMPERSAND equality_expression
        { SETSTRING($1, $3, $3); }
    ;

equality_expression
    : relational_expression
        { SETSTRING($1, $1, $1); }
```

BEST AVAILABLE COPY

```
        | equality_expression DOUBLE_EQUALS relational_expression
            { SETSTRING($1, $3, $3); }
        | equality_expression NOT_EQUALS relational_expression
            { SETSTRING($1, $3, $3); }
        ;

relational_expression
        : shift_expression
            { SETSTRING($1, $1, $1); }
        | relational_expression LESS_THAN shift_expression
            { SETSTRING($1, $3, $3); }
        | relational_expression GREATER_THAN shift_expression
            { SETSTRING($1, $3, $3); }
        | relational_expression LESS_THAN_OR_EQUAL shift_expression
            { SETSTRING($1, $3, $3); }
        | relational_expression GREATER_THAN_OR_EQUAL shift_expression
            { SETSTRING($1, $3, $3); }
        ;

shift_expression
        : additive_expression
            { SETSTRING($1, $1, $1); }
        | shift_expression LSHIFT additive_expression
            { SETSTRING($1, $3, $3); }
        | shift_expression RSHIFT additive_expression
            { SETSTRING($1, $3, $3); }
        ;

additive_expression
        : multiplicative_expression
            { SETSTRING($1, $1, $1); }
        | additive_expression PLUS multiplicative_expression
            { SETSTRING($1, $3, $3); }
        | additive_expression MINUS multiplicative_expression
            { SETSTRING($1, $3, $3); }
        ;

multiplicative_expression
        : cast_expression
            { SETSTRING($1, $1, $1); }
        | multiplicative_expression STAR cast_expression
            { SETSTRING($1, $3, $3); }
        | multiplicative_expression SLASH cast_expression
            { SETSTRING($1, $3, $3); }
        | multiplicative_expression PERCENT cast_expression
            { SETSTRING($1, $3, $3); }
        ;


cast_expression
        : unary_expression
            { SETSTRING($1, $1, $1); }
```

BEST AVAILABLE COPY

```
    | LPAREN statement_start type_name RPAREN cast_expression
        { SETSTRING($1, $5, $5); }
    ;


/* Differences from ANSI specification.
 * Unary_expression and unary2_expression are combined into
 * one unary_expression set of productions.
 */

unary_expression
    : postfix_expression
        { SETSTRING($1, $1, $1); }
    | INCREMENT statement_start unary_expression
        { SETSTRING($1, $3, $3); }
    | DECREMENT statement_start unary_expression
        { SETSTRING($1, $3, $3); }
    | AMPERSAND statement_start cast_expression
        { SETSTRING($1, $3, $3); }
    | STAR statement_start cast_expression
        { SETSTRING($1, $3, $3); }
    | PLUS statement_start cast_expression
        { SETSTRING($1, $3, $3); }
    | MINUS statement_start cast_expression
        { SETSTRING($1, $3, $3); }
    | TILDE statement_start cast_expression
        { SETSTRING($1, $3, $3); }
    | BANG statement_start cast_expression
        { SETSTRING($1, $3, $3); }
    | SIZEOF statement_start unary_expression
        { SETSTRING($1, $3, $3); }
    | SIZEOF statement_start LPAREN type_name RPAREN
        { SETSTRING($1, $3, $3); }
    ;

/*
 * Type name specification.
 */

type_Hdme
    : type_specifier abstract_declarator_opt
        { SETSTRING($1, $2, $2); }
    ;

postfix_expression
    : NON_TYPE_ID statement_start
        { SETSTRING($1, $1, $1); }
    | sub_postfix_expression
        { SETSTRING($1, $1, $1); }
    ;

/*
```

BEST AVAILABLE COPY

```
 * Sub_postfix_expression is used to separate a function name from other
 * postfix expressions because it need not be declared.  To help this
 * the ANSI primary_expression is contained in sub_posfix_expression.
 */

sub_postfix_expression
    : constant statement_start
        { SETSTRING($1, $1, $1); }
    | LPAREN statement_start expression RPAREN
        { SETSTRING($1, $4, $4); }
    | postfix_expression LBRACKET expression RBRACKET
        { SETSTRING($1, $4, $4); }
    | function_name LPAREN
        {
            if (insertdump)
            {
#pragma         BBA_IGNORE /* not part of production */
                gcallingfunc(TRUE, $1.symnum, $1.startbyte);
            }
            SETSTRING($1, $2, $1);
        }
        argument_expr_list_opt RPAREN
        {
            if (insertdump)
            {
#pragma         BBA_IGNORE /* not part of production */
                gcallingfunc(FALSE, $1.symnum, $5.endbyte);
            }
            SETSTRING($1, $5, $1);
        }
    | postfix_expression DOT identifier
        { SETSTRING($1, $3, $3); }
    | postfix_expression ARROW identifier
        { SETSTRING($1, $3, $3); }
    | postfix_expression INCREMENT
        { SETSTRING($1, $2, $2); }
    | postfix_expression DECREMENT
        { SETSTRING($1, $2, $2); }
    ;

function_name
    : NON_TYPE_ID statement_start
        { SETSTRING($1, $1, $1); }
    | sub_postfix_expression
        { SETSTRING($1, $1, $1); }
    ;

/*
 * Identifier is used where the name is independent from the normal id name
 * type name distinction.
 */
```

BEST AVAILABLE COPY

```
identifier
    : NON_TYPE_ID
        { SETSTRING($1, $1, $1); }
    | TYPE_ID
        { SETSTRING($1, $1, $1); }
    ;

constant
    : FLOAT_CONSTANT
        { SETSTRING($1, $1, $1); }
    | DOUBLE_CONSTANT
        { SETSTRING($1, $1, $1); }
    | INT_CONSTANT
        { SETSTRING($1, $1, $1); }
    | UINT_CONSTANT
        { SETSTRING($1, $1, $1); }
    | LONG_CONSTANT
        { SETSTRING($1, $1, $1); }
    | ULONG_CONSTANT
        { SETSTRING($1, $1, $1); }
    | STRING_CONSTANT
        { SETSTRING($1, $1, $1); }
    ;


argument_expr_list_opt
    : argument_expr_list
        { SETSTRING($1, $1, $1); }
    | /* Empty */
        { SETSTRING($<string>0, $<string>0, $<string>0);
  }
    ;

argument_expr_list
    : assignment_expression
        { SETSTRING($1, $1, $1); }
    | argument_expr_list COMMA assignment_expression
        { SETSTRING($1, $3, $3); }
    ;

%%
```

.eb 03 15:54 1988 pp/gram/lex.c Page 1

```
/*
 * FILE     $Header: lex.c,v 1.30 88/01/15 15:19:03 hmgr Exp $
 *
 * AUTHOR      Bruce Erickson
 *
 * ONELINER Lexical analyzer for the C grammar
 *
 * TABSTOPS 3
```

BEST AVAILABLE COPY

```
 *
 * INSPECTED   date      - inspectors
 *
 * RCS      $Log: lex.c,v $
 * Revision 1.30  88/01/15  15:19:03  15:19:03  hmgr ()
 * Author: bae@hplsdlc.hp.com
 * If no -g, do not emit CURRENT_DATA pragma
 *
 * Revision 1.29  88/01/06  18:47:23  18:47:23  hmgr ()
 * Author: bae@hplsdlc.hp.com
 * got rid of some unused functions
 *
 * Revision 1.28  88/01/04  09:52:53  09:52:53  hmgr ()
 * Author: bae@hplsdlc.hp.com
 * Fixed problem with quote ending a file
 *
 * Revision 1.27  88/01/02  18:58:05  18:58:05  hmgr ()
 * Author: bae@hplsdlc.hp.com
 * changed dummystring to have length MAXSTRING+1
 *
 * Revision 1.26  87/11/18  10:51:57  10:51:57  hmgr ()
 * Author: bae@hplsdlc.hp.com
 * Changed lexer so that a STRING_CONSTANT will
 * catenate multiple strings!
 *
 * Revision 1.25  87/11/06  08:50:28  08:50:28  hmgr ()
 * Author: bae@hplsdlc.hp.com
 * if bbanopragma is TRUE, don't print any pragma lines out (concession
 * to current Ft. Collins' problem with -g option & pragmas).
 * Use keepfiletimes instead of bbanofiletimes to decide if keeping the
 * file time makes sense.
 *
 * Revision 1.24  87/11/03  08:46:46  08:46:46  hmgr ()
 * Author: bae@hplsdlc.hp.com
 * update to AxLS's cpp
 *
 * Revision 1.22  87/10/14  15:06:35  15:06:35  hmgr ()
 * Author: bae@hplsdlc.hp.com
 * Convert to pragmas for ignore & alerts...
 * (swallow all pragmas except for ASM from the grammar's standpoint)
 *
 * Revision 1.21  87/09/30  15:48:58  15:48:58  hmgr ()
 * Author: bae@hplsdlc.hp.com
 * I had swapped ignorepending and alertpending!
 *
 * Revision 1.20  87/09/15  12:32:17  12:32:17  hmgr ()
 * Author: bae@hplsdlc.hp.com
 * added code so that a IGNORE/ALERT comment
 * outside of any procedure applies to the next procedure
 *
 * Revision 1.19  87/09/03  10:00:39  10:00:39  hmgr ()
 * Author: bae@hplsdlc.hp.com
```

BEST AVAILABLE COPY

```
 * added stuff to deal correctly with the ASM pragma
 *
 * Revision 1.18  87/08/24  19:51:22  19:51:22  hmgr ()
 * Author: bae@hplsdlc.hp.com
 * changes to make lint happy
 *
 * Revision 1.17  87/08/21  16:18:31  16:18:31  hmgr ()
 * Author: bae@hplsdlc.hp.com
 * Don't check for special comments if we are not in a function!
 *
 * Revision 1.16  87/07/10  10:25:54  10:25:54  hmgr ()
 * Author: bae@hplsdlc.hp.com
 * no comment
 *
 * Revision 1.19  87/07/09  17:39:35  17:39:35  bae (Bruce Erickson)
 * up to date with nxls version 4.38
 * (do not check '#'s when in a string)
 *
 * Revision 1.18  87/06/16  16:13:48  16:13:48  bae (Bruce Erickson)
 * updated to NXLS version 4.36
 *
 * Revision 1.17  87/06/16  09:14:28  09:14:28  bae (Bruce Erickson)
 * replaced calls of myexit() to calls to cleanup()
 * (That way we don't leave temp files around)
 *
 * Revision 1.16  87/06/01  12:08:57  12:08:57  bae (Bruce Erickson)
 * Changed name of local variable 'incomment' to 'lincomment'
 * so that lint would be quiet.  Also converted 'islabeldef'
 * to 'labeldef' for the same reason.
 *
 * Revision 1.15  87/05/06  12:12:30  12:12:30  bae (Bruce Erickson)
 * Passes Plum Hall conformance test
 *
 * Revision 1.11  87/04/01  16:16:48  16:16:48  bae (Bruce Erickson)
 * works with 'if', 'else', 'else-less-if', 'while', 'for'
 *
 * Revision 1.10  87/03/26  10:33:43  10:33:43  bae (Bruce Erickson)
 * merged in NLS lex version 4.19
 *
 * Revision 1.9  87/03/24  12:39:57  12:39:57  bae (Bruce Erickson)
 * before merge
 *
 * Revision 1.8  87/03/18  12:36:10  12:36:10  bae (Bruce Erickson)
 * When a token is found, we now return LABELDEF if the token
 * is followed by a colon; else we return TYPE_ID or NON_TYPE_ID
 * as before...
 *
 * Revision 1.7  87/03/17  15:50:13  15:50:13  bae (Bruce Erickson)
 *  'Illegal escape' will no longer generate a warning message.
 * 'Illegal character' will no longer generate an error message.
 * The check for type_id/non_type_id has been made more complete to
 * deal with the case of a typedef being used in a compound block.
```

BEST AVAILABLE COPY

```
 *
 * Revision 1.6  87/03/16  08:50:17  08:50:17  bae (Bruce Erickson)
 * default action (pass cpptext to output) works.
 * Removing comments when lpasscomments works.
 *
 * Revision 1.5  87/03/10  09:53:47  09:53:47  bae (Bruce Erickson)
 * Merged inv Steve Young's version 4.15
 * Also fixed problem with '#' in first column within comments.
 *
 * Revision 1.4  87/03/09  16:22:04  16:22:04  bae (Bruce Erickson)
 * Before merging in new version of NXLS grammar & lex
 *
 * Revision 1.3  87/02/18  11:29:25  11:29:25  bae (Bruce Erickson)
 * After merging with Steve's new grammar & lexical analyzer
 *
 * Revision 1.2  87/02/17  16:16:14  16:16:14  bae.(Bruce Erickson)
 * This seems to parse typedefs OK now
 *
 *
 */
static char rcsid[] = "$Header: lex.c,v 1.30 88/01/15 15:19:03 hmgr Exp $";
#include <stdio.h>
#include <model.h>
#include <ctype.h>
#include <boolean.h>
#include "probe.h"
#include "gram.h"
#include "nls.h"
#include "yystype.h"

/* GLOBALS */
u_int32 cbytenum = 0;       /* always contains the byte number that NEXTCHAR
                               just returned */

/* STATICS */
int checklabeldef = 0;      /* if non-zero, do not scan for label definition */
static int in_comment;      /* if 1, in eat_comment; else not */

/* EXTERNALS */
extern void tsinsertarraytype();
extern boolean keepfiletimes;
extern boolean bbanofirstline;
extern boolean bbanopragmas;
extern int currentcolumn;
extern void cdeccolumn();
extern void csetfname();
extern void csetline();
extern void cerror();
extern int varscope;                /* bae */
extern void printcppskip();         /* bae */
extern void probeaddflags();
extern boolean csymistypedef();
```

BEST AVAILABLE COPY

```
extern boolean passcomments;
extern char *cgets();
extern char *malloc();
extern void free();
extern char *creadahead();
extern boolean debugislabeldef;
extern FILE *finput;
extern YYSTYPE yylval;
extern char invokedname[];

/* FORWARD */
extern char dummystring[];
extern boolean islabeldef();

/* start of NLS's lexical analyzer */




#define NEXTCHAR()          (currentcolumn++, cbytenum++, *line_ptr++)
#define UNNEXTCHAR()        (cdeccolumn(), cbytenum--, line_ptr--)
#define ELSERETURN(n)       return((UNNEXTCHAR(), n))
#define CHECKEQUALS(n, m)   if((ch = NEXTCHAR()) == '=') return(n); else ELSERETURN(m)
#define CHECKIDENT(s, n)    if(!strcmp(text, (s))) return(n)

#define TRUE 1
#define FALSE 0
#define CHARSIZE 1
#define MAXTOKEN 256
#define MANTISSA_LENGTH 15
#define HUGE   1.7976931348623157e+308

static char *line;            /* cgets will return the line */
static char *line_ptr;

char text[MAXTOKEN];
char date[MAXTOKEN];          /* bae - the date (which follows the file name) */

long last_file_name;

int instring = 0;
int incomment = 0;
int inoption = 0;
int inasm = 0;

/*
 * This routine reads a line from the input source into 'line'.  It looks for
 * preprocessor line directives and pragmas.  It returns a token value if
 * a pragma derived token is found, -1 if the end of file is encountered, and
 * 0 otherwise.  It controls the inoption flag based on whether a pragma is
 * encountered.  It will not check for pragmas and line directives when a
```

BEST AVAILABLE COPY

```
 * comment is being scanned.  It checks the inasm flag to know if the line is
 * part of embedded assembly code, but will still recognize preprocessor
 * directives when in embedded assembly.
 */
readline()
{
   long decimal_const();
   register ch = '\n';
   register char *textp;
   static int hadFirstLineDirective = 0;
   char prevc;
   u_int32 startdate;          /* bae - start date on # <line> line */
   u_int32 startofline;        /* bae - cbytenum at start of the line */
   char *startofdate;          /* bae - start of date stuff */

   /* Increment line number *before* we call cgets, so that the
      line is inserted with the correct line number */
   cincline();
   if(cgets(&line, MAX_LINE, finput) == NULL)
      return(-1);
   line_ptr = line;
   inoption = 0;
   if(incomment || instring)
      return 0;
   startofline = cbytenum + 1;   /* store start of the line */
   if(*line == '#')
   {
      NEXTCHAR();
      while((ch = NEXTCHAR()) == ' ' || ch == '\t')
         ;
      textp = text;
      /* Check for pragma directive if first character is a 'p'. */
      if(ch == 'p')
      {
         while(isalpha(ch))
         {
            *textp++ = ch;
            ch = NEXTCHAR();
         }
         if(isspace(ch))
         {
            *textp = '\0';
            if(strcmp(text, "pragma") == 0)
            {
               /* bae - ignore everything except the ASM, CURRENT_DATE, BBA_IGNORE & BBA_ALERT pragmas.
                  Scan forward looking for those strings...

                  Ugly possibility:  If comment on this line, eat it.
                  If comment starts on this line, eat it - but do not continue
                  parsing....
               */
               while (TRUE)
```

BEST AVAILABLE COPY

```
{
   while ((ch = NEXTCHAR()) == ' ' || ch == '\t')
      ;
   textp = text;       /* start of first non-whitespace */
   prevc = '\0';       /* checking for /* */
   while (!isspace(ch))
   {
      if ((ch == '*') && (prevc == '/'))
      {
         /* eat_comment will return after the trailing '*''/' */
         eat_comment();
         prevc = '\0';

         /* Ok, now check to see if (any) previous token
            was known.  We would have read in the '/',
            so we need to back-up one char & terminate the string
         */
         *--textp = '\0';      /* erase the '/' */
         if (text == textp)
         {
            /* previously we found the comment seperated from tokens by
               a space.  Read until the next non-space
            */
            while ((ch = NEXTCHAR()) == ' ' || ch == '\t')
               ;
            continue;      /* and pretend we started at top of loop */
         }

         ch = NEXTCHAR();      /* Read a token so that the UNNEXTCHAR does OK */
         /* previously we found a slash right after a token.  Check out
            the token.
         */
         break;
      }
      *textp++ = ch;
      prevc = ch;         /* store previous char to check for comments */
      ch = NEXTCHAR();
   }
   /* Got here because ch is a space.... */
   if (textp != text)
   {
      /* Got some characters! */
      *textp = '\0';      /* null terminate string */
      UNNEXTCHAR();       /* ch is a space character, (including \n), so
                             we will need to "pop" it so the top of the loop
                             is OK, or so that if this is ASM or END_ASM
                             we get an OPTION_STOP
                          */

      if (strcmp("ASM", text) == 0)
      {
         inoption = 1;
         return(ASM);      /* note no OPTION_START here */
```

BEST AVAILABLE COPY

```
        }
        if (strcmp("END_ASM", text) == 0)
        {
           inoption = 1;
           return(END_ASM);
        }

        /* Only care about CURRENT_DATE if bbanofirstline is TRUE or if we were
           not invoked with the -g option */
        if (bbanofirstline || !keepfiletimes)
        {
           if (strcmp("CURRENT_DATE", text) == 0)
           {
           /* This is the first_line directive from AxLS's cpp and 'bbanofirstline'
              is TRUE; therefore remove the line
           */
              /* read thru end of line (including \n) */
              while ((ch = NEXTCHAR()) != '\n')
                 /* empty */;

              /* We will pretend that there are 0 lines being
                 skipped to prevent a line being printed
                 at the top of the file.....
              */
              printcppskip(startofline, cbytenum, 0);
              return(readline());
           }
        }
        if (strcmp("BBA_IGNORE", text) == 0)
        {
           gpragma(PF_IGNORE);     /* deal with ignore & continue parsing */
        }
        else
        {
           if (strcmp("BBA_ALERT", text) == 0)
           {
              gpragma(PF_ALERT);      /* deal with alert & continue parsing */
           }
        }

     }
     else
     {
        /* found eol.  Read another line.... */
        if (bbanopragmas)
        {
           /* Delete this pragma, since the compiler doesn't want any */
           printcppskip(startofline, cbytenum, 1);
        }

        /* Read another line */
        return(readline());
     }
```

BEST AVAILABLE COPY

```
                /* if we reach here, we had a BBA_* pragma, and want to continue
                   looking for others */
            }
         }
      }
   }
   /* Otherwise, look for a cpp line directive. */
   else
   {
      while(isdigit(ch))
      {
         *textp++ = ch;
         ch = NEXTCHAR();
      }
      *textp = '\0';
      if(textp != text)
      {
         csetline(decimal_const(text) - 1);
      }
      while(ch == ' ')
      {
         ch = NEXTCHAR();
      }
      /* Stop if it was a simple #line 1234. */
      if(ch == '\n' || ch == '\0')
      {
         return 0;
      }
      if(ch == '"' && (ch = NEXTCHAR()) != '"')
      {
         textp = text;
         while(ch != '"' && ch != '\n')
         {
            *textp++ = ch;
            ch = NEXTCHAR();
         }
         if(ch == '"')
         {
            *textp = '\0';
            /* text now contains the date.  Skip forward copying the
               rest of the line into "date" until the \n */
            textp = date;
            startdate = cbytenum + 1;      /* if necessary, remember last char after fname */
            startofdate = line_ptr;        /* point to first char after " (may be \n) */
            while ((ch = NEXTCHAR()) != '\n')
            {
               *textp++ = ch;
            }
            *textp = '\0';
            csetfname(text, date);

            if (!keepfiletimes)
```

BEST AVAILABLE COPY

```
                    {
                       /* this compiler does not want times to follow the file names! */
                       printcppskip(startdate, cbytenum - 1, 0);
                    }
                    if(hadFirstLineDirective)
                       return 0;
                    else
                    {
                       hadFirstLineDirective = 1;
                       /* Print out this line & follow with our array
                          definitions
                       */
                       printcpptext(cbytenum);    /* print out up-to and including the \n */
                       tsinsertarraytype(line, startofdate);  /* insert array */

                       return FIRST_LINE_DIRECTIVE;
                    }
                 }
              }
           }
           cerror("Unknown preprocessor directive");
           /* Terminate line here. */
           *line_ptr = '\0';
           return 0;
        }
        if(inasm)
        {
           /* *line = '\0'; pass this line */
           return ASM_LINE;
        }
        return 0;
     }


     nlsyylex()
     {
        long readstring(), readchar();
        register ch = '\n';
        register char *textp;
        register int opt;
        int temp;

        for(;;)
        {
           ch = NEXTCHAR();
           csetfirstchar();
           switch(ch)
           {
              case '\0':
                 cbytenum--;    /* \0's are not accounted for... */
              case '\n':
                 if(inoption)
                 {
                    UNNEXTCHAR();
```

BEST AVAILABLE COPY

```
            inoption = 0;
            return OPTION_STOP;
         }
         if((temp = readline()) != 0)
            return temp;
         break;
      case '\\':
      /* if((ch = NEXTCHAR()) != '\n')
      /*    cerror("Illegal Character"); */
         /* UNNEXTCHAR(); */
         break;
      case '(':
         return(LPAREN);
      case ')':
         return(RPAREN);
      case '[':
         return(LBRACKET);
      case ']':
         return(RBRACKET);
      case '{':
         return(LBRACE);
      case '}':
         return(RBRACE);
      case ';':
         return(SEMICOLON);
      case '<':
         if((ch = NEXTCHAR()) == '<')
            CHECKEQUALS(LSHIFT_EQUALS, LSHIFT);
         else if(ch == '=')
            return(LESS_THAN_OR_EQUAL);
         else
            ELSERETURN(LESS_THAN);
      case '>':
         if((ch = NEXTCHAR()) == '>')
            CHECKEQUALS(RSHIFT_EQUALS, RSHIFT);
         else if(ch == '=')
            return(GREATER_THAN_OR_EQUAL);
         else
            ELSERETURN(GREATER_THAN);
      case '=':
         CHECKEQUALS(DOUBLE_EQUALS, EQUALS);
      case '!':
         CHECKEQUALS(NOT_EQUALS, BANG);
      case '+':
         if((ch = NEXTCHAR()) == '+')
            return(INCREMENT);
         else if(ch == '=')
            return(PLUS_EQUALS);
         else
            ELSERETURN(PLUS);
      case '-':
         if((ch = NEXTCHAR()) == '>')
```

BEST AVAILABLE COPY

```
            return(ARROW);
         else if(ch == '-')
            return(DECREMENT);
         else if(ch == '=')
            return(MINUS_EQUALS);
         else
            ELSERETURN(MINUS);
      case '.':
         if(isdigit(ch = NEXTCHAR()))
         {
            UNNEXTCHAR();
            return lexOctDecFloatNumber('.');
         }
         else
            ELSERETURN(DOT);
      case '*':
         if((ch = NEXTCHAR()) == '/')
            cerror("Unexpected end of comment");
         else if(ch == '=')
            return(STAR_EQUALS);
         else
            ELSERETURN(STAR);
      case '&':
         if((ch = NEXTCHAR()) == '&')
            return(AND);
         else if(ch == '=')
            return(AMPERSAND_EQUALS);
         else
            ELSERETURN(AMPERSAND);
      case '~':
         return(TILDE);
      case '/':
         if((ch = NEXTCHAR()) == '*')
         {
            eat_comment();
            break;
         }
         else if(ch == '=')
            return(SLASH_EQUALS);
         else
            ELSERETURN(SLASH);
      case '%':
         CHECKEQUALS(PERCENT_EQUALS, PERCENT);
      case '^':
         CHECKEQUALS(CARAT_EQUALS, CARAT);
      case '|':
         if((ch = NEXTCHAR()) == '|')
            return(OR);
         else if(ch == '=')
            return(BAR_EQUALS);
         else
            ELSERETURN(BAR);
```

BEST AVAILABLE COPY

```
            case '?':
               return(QUESTION);
            case ':':
               return(COLON);
            case ',':
               return(COMMA);
            case ' ':
            case '\t':
            case '\v':
            case '\f':
               break;
            case '"':
               /* bae - swallow the string..... */
               readstring();
               return(STRING_CONSTANT);
            case '\'':
               /* bae - swallow the character constant... */
               readcharstring(dummystring, '\'');
               return(INT_CONSTANT);
            case '0':
               if((ch = NEXTCHAR()) == 'x' || ch == 'X')
                  return lexHexNumber();
               UNNEXTCHAR();
               ch = '0';
               /* Fall through to default. */
            default:
               if(isalpha(ch) || ch == '_')
                  return lexIdent(ch);
               else if(isdigit(ch))
                  return lexOctDecFloatNumber(ch);
               else
               {
                  /* cerror("Illegal Character"); bae: do not give this warning */
               }
         }
      }
}

lexIdent(ch)
int ch;
{
   int symnum;
   boolean istype;
   register char *textp;

   textp = text;
   *textp = ch;
   /* Read in up to MAXTOKEN-1 characters of identifier. */
   while((isalnum(*++textp = NEXTCHAR()) || *textp == '_') && textp < text+MAXTOKEN-1)
      ;
   /* Read whatever identifier characters remain beyond MAXTOKEN and ignore them. */
   while(isalnum(*textp) || *textp == '_')
```

BEST AVAILABLE COPY

```
      *textp = NEXTCHAR();
   UNNEXTCHAR();
   *textp = '\0';
   if(inoption)
   {
      /* bae - no need to check for any identifiers while inoption */
   }
   else
   {
      switch(ch)
      {
         case 'a':
            CHECKIDENT("auto", AUTO);
            break;
         case 'b':
            CHECKIDENT("break", BREAK);
            break;
         case 'c':
            CHECKIDENT("char", CHAR);
            CHECKIDENT("const", CONST);
            CHECKIDENT("case", CASE);
            CHECKIDENT("continue", CONTINUE);
            break;
         case 'd':
            CHECKIDENT("double", DOUBLE);
            CHECKIDENT("default", DEFAULT);
            CHECKIDENT("do", DO);
            break;
         case 'e':
            CHECKIDENT("else", ELSE);
            CHECKIDENT("extern", EXTERN);
            CHECKIDENT("enum", ENUM);
            break;
         case 'f':
            CHECKIDENT("for", FOR);
            CHECKIDENT("float", FLOAT);
            break;
         case 'g':
            CHECKIDENT("goto", GOTO);
            break;
         case 'i':
            CHECKIDENT("int", INT);
            CHECKIDENT("if", IF);
            break;
         case 'l':
            CHECKIDENT("long", LONG);
            break;
         case 'r':
            CHECKIDENT("register", REGISTER);
            CHECKIDENT("return", RETURN);
            break;
         case 's':
```

BEST AVAILABLE COPY

```
                    CHECKIDENT("struct", STRUCT);
                    CHECKIDENT("sizeof", SIZEOF);
                    CHECKIDENT("static", STATIC);
                    CHECKIDENT("short", SHORT);
                    CHECKIDENT("switch", SWITCH);
                    CHECKIDENT("signed", SIGNED);
                    break;
                case 't':
                    CHECKIDENT("typedef", TYPEDEF);
                    break;
                case 'u':
                    CHECKIDENT("union", UNION);
                    CHECKIDENT("unsigned", UNSIGNED);
                    break;
                case 'v':
                    CHECKIDENT("void", VOID);
                    CHECKIDENT("volatile", VOLATILE);
                    break;
                case 'w':
                    CHECKIDENT("while", WHILE);
                    break;
            }
        }
        /* This check - islabeldef() - was added to disambiguate (spelling?)
            the grammar.... */
        if (islabeldef())
            return(LABELDEF);

        /* Note that the assignment of symbol numbers must come here
            because if you use the grammar's string accumulation, you
            might inadverdently pick up a '*' or stuff like that...
        */
        if (!(istype = (csymistypedef(text, &symnum))))
        {
            /* Is not a typedef.  If symnum is -1, add to symbol table */
            if (symnum == -1)
            {
                symnum = caddsym(TRUE, text, (u_int32) 0);
            }
        }
        yylval.string.symnum = symnum;
        return((istype) ? TYPE_ID : NON_TYPE_ID);
    }

    lexOctDecFloatNumber(ch)
    register int ch;
    {
        long float_const(), decimal_const(), octal_const();
        register char *textp;
        int numtype = 0;  /* 0 = decimal;  1 = octal; 2 = float */
        int isUnsigned = FALSE, isLong = FALSE, isFloat = FALSE;
```

BEST AVAILABLE COPY

```
/* If there is a leading 0 then note it. */
if(ch == '0')
   numtype = 1;
textp = text;
while(isdigit(ch))
{
   *textp++ = ch;
   ch = NEXTCHAR();
}
if(ch == '.' || ch == 'e' || ch == 'E')
{
   numtype = 2;
   if(ch == '.')
   {
      *textp++ = ch;
      while(isdigit(ch = NEXTCHAR()))
         *textp++ = ch;
   }
   if(ch == 'e' || ch == 'E')
   {
      *textp++ = ch;
      if((ch = NEXTCHAR()) == '+' || ch == '-')
      {
         *textp++ = ch;
      }
      else
         UNNEXTCHAR();
      while(isdigit(ch = NEXTCHAR()))
         *textp++ = ch;
   }
}
*textp = '\0';
/* Check for suffix. */
if(numtype == 2)
{
   if(ch == 'f' || ch == 'F')
      isFloat = TRUE;
   else
      if(ch != 'l' && ch != 'L')
      {
         UNNEXTCHAR();
      }
}
else
{
   if(ch == 'u' || ch == 'U')
   {
      isUnsigned = TRUE;
      if((ch = NEXTCHAR()) == 'l' || ch == 'L')
         isLong = TRUE;
      else
      {
```

BEST AVAILABLE COPY

```
            UNNEXTCHAR();
         }
      }
      else if(ch == 'l' || ch == 'L')
      {
         isLong = TRUE;
         if((ch = NEXTCHAR()) == 'u' || ch == 'U')
            isUnsigned = TRUE;
         else
            UNNEXTCHAR();
      }
      else
         UNNEXTCHAR();
   }
   return(INT_CONSTANT);       /* bae - don't really care... */
/* switch(numtype)
/* {
/*    case 0:
/*       yylval = decimal_const(text);
/*       return literalType(yylval, isUnsigned, isLong, TRUE,
/*                          INT_CONSTANT, UINT_CONSTANT, LONG_CONSTANT, ULONG_CONSTANT);
/*    case 1:
/*       yylval = octal_const(text);
/*       return literalType(yylval, isUnsigned, isLong, FALSE,
/*                          INT_CONSTANT, UINT_CONSTANT, LONG_CONSTANT, ULONG_CONSTANT);
/*    case 2:
/*       yylval = float_const(text);
/*       return(isFloat ? FLOAT_CONSTANT : DOUBLE_CONSTANT);
/* } */
}

lexHexNumber()
{
   long hex_const();
   register char *textp;
   register ch;
   int isUnsigned = FALSE, isLong = FALSE;

   textp = text;
   ch = NEXTCHAR();
   while(isdigit(ch) || (ch >= 'a' && ch <= 'f') || (ch >= 'A' && ch <= 'F'))
   {
      *textp++ = ch;
      ch = NEXTCHAR();
   }
   *textp = '\0';
   if(ch == 'u' || ch == 'U')
   {
      isUnsigned = TRUE;
      if((ch = NEXTCHAR()) == 'l' || ch == 'L')
         isLong = TRUE;
      else
         UNNEXTCHAR();
```

BEST AVAILABLE COPY

```
    }
    else if(ch == 'l' || ch == 'L')
    {
       isLong = TRUE;
       if((ch = NEXTCHAR()) == 'u' || ch == 'U')
          isUnsigned = TRUE;
       else
          UNNEXTCHAR();
    }
    else
       UNNEXTCHAR();
    return(INT_CONSTANT);       /* Don't really care... */

/* yylval = hex_const(text);
/* return literalType(yylval, isUnsigned, isLong, FALSE,
/*                      INT_CONSTANT, UINT_CONSTANT, LONG_CONSTANT, ULONG_CONSTANT); */
}


#define MAXSTRING 1024  /* Maximum length of a string or character constant. */

#define C_DOUBLE_QUOTE      0042
#define C_SINGLE_QUOTE      0047
#define C_BACKSLASH         0134
#define C_BELL          0007
#define C_BACKSPACE         0010
#define C_FORM_FEED         0014
#define C_NEWLINE       0012
#define C_CARRIAGE_RETURN   0015
#define C_HORIZONTAL_TAB    0011
#define C_VERTICAL_TAB      0013

static char dummystring[MAXSTRING + 1];

/***************************************************************************
 * This routine reads a string of characters from the standard input until
 * MAXSTRING or the given delimiter is reached.  This is used to read in
 * string or character constants.  The substitutions for escaped characters
 * are performed.
 ***************************************************************************/
int readcharstring(string, delimiter)
char *string;
char delimiter;
{
   char ch;
   int val, index = 0;

   instring = TRUE;
   /* Read characters until delimiter is hit or MAXSTRING reached. */
   while((ch = NEXTCHAR()) != delimiter && index < MAXSTRING)
   {
      /* See if end of line is hit. */
```

BEST AVAILABLE COPY

```
        if(ch == '\n')
        {
            cerror("No string delimiter");
            break;
        }
        /* If it's not escaped, just copy it into the string. */
        if(ch != '\\')
        {
            string[index++] = ch;
            continue;
        }
        /* The follwing code handles the escaped characters. */
        /* Octal character constant. */
        if(is_octal(ch = NEXTCHAR()))
        {
            val = ch-'0';
            if(is_octal(ch = NEXTCHAR()))
            {
                val = val*8+ch-'0';
                if(is_octal(ch = NEXTCHAR()))
                {
                    val = val*8+ch-'0';
                    ch = NEXTCHAR();
                }
            }
            /* Put back last character read. */
            UNNEXTCHAR();
            /* Does constant overflow valid character? */
            /* bae - removed following tests... */
/*          if (overUnsigned(val, CHARSIZE))
/*          {
/*              cerror("Character constant too big");
/*              val = 0;
/*          } */
            /* Since character constants are signed ints we need to extend
             * a negative character constant to full int size. */
/*          if (overSigned(val, CHARSIZE))
/*          {
/*              val -= 1<<CHARSIZE;
/*          } */
            string[index++] = val;
            continue;
        }
        /* All other escaped characters. */
        switch(ch)
        {
        case 'x':   /* Hexadecimal constant. */
        case 'X':
            ch = NEXTCHAR();
            if(is_hex(ch))
            {
```

BEST AVAILABLE COPY

```
            val = hex_value(ch);
            ch = NEXTCHAR();
            if(is_hex(ch))
            {
               val = val*16+hex_value(ch);
               ch = NEXTCHAR();
               if(is_hex(ch))
               {
                  val = val*16+hex_value(ch);
                  ch = NEXTCHAR();
               }
            }
         }
         else
         {
            /* cerror("No Digits after 0X"); */
            val = 0;
         }
         UNNEXTCHAR();
         /* Does constant overflow valid character? */
         /* bae - removed tests... */
/*       if (overUnsigned(val, CHARSIZE))
/*       {
/*          cerror("Character constant too big");
/*          val = 0;
/*       } */
         /* Since character constants are signed ints we need to extend
          * a negative character constant to full int size. */
/*       if (overSigned(val, CHARSIZE))
/*       {
/*          val -= 1<<CHARSIZE;
/*       } */
         string[index++] = val;
         break;
      case '\"':
         string[index++] = C_DOUBLE_QUOTE;
         break;
      case '\'':
         string[index++] = C_SINGLE_QUOTE;
         break;
      case '\\':
         string[index++] = C_BACKSLASH;
         break;
      case 'a':
         string[index++] = C_BELL;
         break;
      case 'b':
         string[index++] = C_BACKSPACE;
         break;
      case 'f':
         string[index++] = C_FORM_FEED;
         break;
```

BEST AVAILABLE COPY

```
      case 'n':
         string[index++] = C_NEWLINE;
         break;
      case 'r':
         string[index++] = C_CARRIAGE_RETURN;
         break;
      case 't':
         string[index++] = C_HORIZONTAL_TAB;
         break;
      case 'v':
         string[index++] = C_VERTICAL_TAB;
         break;
      case '\n':
         /* Ignore backslash followed by newline. */
         readline();
         break;
      default:
         /* cwarning("Illegal escape"); */
         string[index++] = ch;
         break;
      }
   }
   /* Terminate string. */
   string[index] = '\0';
   /* If string too long, eat up rest of string from input. */
   if (index >= MAXSTRING)
   {
      /* cerror("String too long"); */
      while(ch != delimiter)
      {
         if(ch == '\n')
         {
            cerror("No string delimiter");
            break;
         }
         ch = NEXTCHAR();
      }
   }
   instring = FALSE;
   return index;
}

typedef struct st_list {
   char string[MAXSTRING+1];
   int length;
   struct st_list *next;
} t_string_list;

/****************************************************************************
 * The following routine calls readcharstring() to read a string constant
 * from the input.
 ****************************************************************************/
```

BEST AVAILABLE COPY

```
long readstring()
{
   int length;
   char *string, ch;
   t_string_list *string_list = NULL, *temp;
   char *copystring();

   length = 0;
   ch = '"';
   while(ch == '"')
   {
      temp = (t_string_list *) malloc(sizeof(t_string_list));
      length += temp->length = readcharstring(temp->string, '"');
      temp->next = string_list;
      string_list = temp;
      /* If this string is in an option then don't look to catenate a following string. */
      if (inoption)
      {
         ch = NEXTCHAR();
         break;
      }
      /* Skip whitespace to look for a consecutive string literal. */
      while((ch = NEXTCHAR()) == ' ' || ch == '\t' || ch == '\n' || ch == '\v' || ch == '\f' || ch == '\0')
         if (ch == '\n' || ch == '\0')
         {
            if (readline() == -1)
            {
               /* This will generate a syntax error later on - bae */
               string = (char *)malloc(length);
               copystring(string, string_list);
               return(0);
            }
         }
   }
   UNNEXTCHAR();
   string = (char *)malloc(length);
   copystring(string, string_list);
   return(0);
}

char *copystring(string, string_list)
char *string;
t_string_list *string_list;
{
   char *stp;
   int index;

   if(string_list == NULL)
      return string;
   stp = string_list->string;
   string = copystring(string, string_list->next);
   for(index = 0; index < string_list->length; index++)
```

BEST AVAILABLE COPY

```
        *string++ = *stp++;
    free(string_list);
    return string;
}


/*****************************************************************************
 * The following routine calls readcharstring() to read a character constant
 * from the input.
 *****************************************************************************/
/* long readchar()
/* {
/*      char string[MAXSTRING+1];
/*      register int length;
/*
/*      length = readcharstring(string, '\'');
/*      if(length == 0)
/*         cerror("Empty Character Literal");
/*      if(length > 1)
/*         cwarning("Multiple character literal"); */
/*      return(*string);
/* } */


/*****************************************************************************
 * This routine reads characters from the input until end of comment.
 *****************************************************************************/
eat_comment()
{
    register char this, last = '\0';
    u_int32 startcomment;
    int numlines = 0;

    incomment = 1;

    startcomment = cbytenum - 1;      /* already read in start of comment */

    while((this = NEXTCHAR()) != '/' || last != '*')
    {
        if(this == '\n')
        {
            if(readline() == -1)
            {
                in_comment = 0;
                if (!passcomments)
                    printcppskip(startcomment, cbytenum, numlines);     /* do not print comments */
                return;
            }
            last = '\0';
            if ((!passcomments) && ((++numlines % 20) == 0))
            {
                /* ask for a 'skip' every twenty lines to avoid the buffer
```

BEST AVAILABLE COPY

```
                overflow routine doing an output
             */
             printcppskip(startcomment, cbytenum, numlines);
             numlines = 0;
             startcomment = cbytenum + 1;
          }
       }
       else
          last = this;

    }
    incomment = 0;
    if (!passcomments)
       printcppskip(startcomment, cbytenum, numlines);    /* do not print comments */
}


/*
 * This is the default yacc error routine.
 */
yyerror(str)
char *str;
{
    if(*str == 'y')
       cerror("Yacc stack overflow");
    else
       if(inoption || inasm)
       {
          /* cwarning("Unknown Pragma"); */
       }
       else
          cerror("Syntax error");
}

/******************************************************************************
 * This routine returns 1 if ch is an octal digit; 0 otherwise.
 ******************************************************************************/
is_octal(ch)
char ch;
{
    return(ch >= '0' && ch <= '7');
}

/******************************************************************************
 * This routine returns 1 if ch is an hexadecimal digit; 0 otherwise.
 ******************************************************************************/
is_hex(ch)
char ch;
{
    return((ch >= '0' && ch <= '9')
         || (ch >= 'a' && ch <= 'f')
         || (ch >= 'A' && ch <= 'F'));
```

BEST AVAILABLE COPY

```
}

/*****************************************************************************
 * This routine returns the value of a hexadecimal digit.
 *****************************************************************************/
hex_value(ch)
char ch;
{
   if(ch >= '0' && ch <= '9')
      return(ch-'0');
   if(ch >= 'a' && ch <= 'f')
      return(10+ch-'a');
   return (10+ch-'A');
}

/*****************************************************************************
 * This routine normalizes the passed string into a standard floating
 * representation.  The string is converted to a modula-2 opaque type for
 * double which in C is a pointer to double.
 *****************************************************************************/
/* long float_const(string)
/* char *string;
/* {
/* long string_to_double();
/*
/* return string_to_double(string); */
/*    return 0L;        /* we don't care */
/* } */


/*****************************************************************************
 * This routine converts the passed string into the decimal value it
 * represents.
 * bae - must retain this, as we need it for #line <number>
 *****************************************************************************/
long decimal_const(string)
char *string;
{
   unsigned long val;
   char *strp = string;

   val = 0;
   while(*strp != '\0')
      val = val*10+*strp++-'0';
   return val;
}

/*****************************************************************************
 * This routine is just like the previous one, except it uses octal constants.
 *****************************************************************************/
/* long octal_const(string)
/* char *string;
```

BEST AVAILABLE COPY

```
/* {
/*     unsigned long val;
/*     char *strp = string;
/*
/*     return 0L;  /* we don't care */
/* val = 0;
/* while(*strp != '\0')
/* {
/*     if(*strp > '7')
/*        cerror("Bad Octal Digit");
/*     val = val*8+*strp++-'0';
/* }
/* return val; */
/* } */

/****************************************************************************
 * This routine is just like the previous one, except it uses hex constants.
 ****************************************************************************/
/* long hex_const(string)
/* char *string;
/* {
/*     unsigned long val;
/*     char *strp = string;
/*
/*     return 0L;  /* we don't care */
/* val = 0;
/* while(*strp != '\0')
/* {
/*     val = val*16;
/*     if (*strp >= 'a' && *strp <= 'f')
/*        val = val+*strp-'a'+10;
/*     else if (*strp >= 'A' && *strp <= 'F')
/*        val = val+*strp-'A'+10;
/*     else
/*        val = val+*strp-'0';
/*     strp++;
/* }
/* return val; */
/* } */


/**************************************************************************/

/* FUNCTION */
static boolean
islabeldef()

/*
 *     This routine is called when the global 'text'
 *     has an identifier in it.  We will scan forward until
 *     we hit the next non-comment non-white-space.  If it
 *     is a colon (':'), we will return TRUE; else we return FALSE.
```

BEST AVAILABLE COPY

```
 *
 *     In either event, we will back up to the same position as
 *     we used to be at...
 *
 *     If 'checklabeldef' is not 0, we will return FALSE.
 *
 *     This will not use NEXTCHAR (etc) in order to avoid changing stuff
 *     (in particular, we will not modify 'line' nor 'line_ptr').
 *
 *     If we must read more lines in, the routine 'creadahead()' will
 *     be used.  This returns a pointer to a buffer which is off on the 'side'.
 *     and thus we will not need to change 'line'...
 *     We will save the file stream offset before we request more lines, so
 *     that we can restore it when we leave - and therefore the nest
 *     fread() will get exactly what it would have gotten if we had
 *     not been called...
 */
{
   register char *ptr;
   register char c = '\0';
   register char lastc;
   boolean mustreset = FALSE;      /* set to TRUE when we we had to scan-ahead a line */
   boolean lincomment = FALSE;        /* set to TRUE while in a comment */
   long offset;                    /* if mustreset, reset to here */
   boolean labeldef = FALSE;       /* assume not a label */

   if (checklabeldef != 0)
      return(FALSE);

   ptr = line_ptr;
   /* Outer loop is reading lines.... */
   while(TRUE)
   {
      lastc = c;
      if ((c = *ptr++) == '\n')
      {
         /* Bummer... must fetch a new line */
         if (!mustreset)
         {
            mustreset = TRUE;
            if ((offset = ftell(finput)) == -1)
            {
               fprintf(stderr, "%s: cannot read file offset", invokedname);
               perror(" ");
               cleanup(1);
            }
         }
         if ((ptr = creadahead(finput)) == NULL)
         {
            /* Hit end-of-file attempting to figure this out.
               Must *not* be a label! */
            break;
```

BEST AVAILABLE COPY

```
            }
            continue;
        }

        if (!incomment)
        {
            if ((lastc == '*') && (c == '/'))
            {
                !incomment = FALSE;
                c = '\0';        /* prevent '*''/''*' from being recognized as
                                    end-comment then start-comment */
            }
            continue;
        }

        /* Not in a comment */
        if (c == '/')
        {
            /* We must read immediately to see if the next character is a '*'.
                If (c + 1) != '*', then text is not a label.  If (c + 1) == *,
                then we are in a comment
            */

            if ((c = *ptr++) != '*')
            {
                break;          /* we know that text is not a label */
            }
            !incomment = TRUE;
            c = '\0';       /* prevent '/''*''/' from being recognized as a whole comment */
            continue;
        }

        if ((c != ' ') && (c != '\t') && (c != '\f') && (c != '\r'))
        {
            if (c == ':')
                labeldef = TRUE;
            break;
        }
    }

    /* Hit here on
        1) end-of-file
        2) found a non-comment non-white space...
    */

    if (mustreset)
    {
        if (fseek(finput, offset, 0) != 0)
        {
            fprintf(stderr, "%s: cannot reposition input", invokedname);
            perror(" ");
            cleanup(1);
```

BEST AVAILABLE COPY

```
      }
   }
   if (debugislabeldef)
      fprintf(stderr, "%s %s a label\n", text, (labeldef) ? "is" : "is not");

   return(labeldef);
}


/**************************************************************************/

/* FUNCTION */
labeldefenable(enable)
boolean enable;       /* if FALSE, begin disabling looking for labeldefs;
                         else enable */

/*
 *    This routine is called to enable or disable looking for
 *    '<ident> :' strings.  This is only done after a conditional
 *    expression, so that in the case of
 *       (a == b) ? c : d;
 *    'c : ' is not returned as a labeldef
 *
 */
{
   if (enable)
   {
      if (checklabeldef > 0)
         checklabeldef--;
      else
      {
#pragma  BBA_IGNORE BBA_ALERT
      }
   }
   else
      checklabeldef++;     /* disable */
}
```

Feb 03 15:54 1988  pp/gram/lexinter.c Page 1

```
/*
 * FILE      $Header: lexinter.c,v 1.3 87/07/10 10:28:40 hmgr Exp $
 *
 * AUTHOR       Bruce Erickson
 *
 * ONELINER Interface to nls lexican analyzer
 *
 * TABSTOPS 3
 *
 * RCS       $Log: lexinter.c,v $
 * Revision 1.3  87/07/10  10:28:40  10:28:40  hmgr ()
 * Author: bae@hplsdlc.hp.com
 * no comment
```

```
 *
 * Revision 1.2  87/05/06  12:13:29  12:13:29  bae (Bruce Erickson)
 * Passes Plum Hall conformance test
 *
 * Revision 1.1  87/04/28  11:18:41  11:18:41  bae (Bruce Erickson)
 * Initial revision
 *
 *
 */
static char rcsid[] = "$Header: lexinter.c,v 1.3 87/07/10 10:28:40 hmgr Exp.$";
#include <stdio.h>
#include <boolean.h>
#include <model.h>
#include "yystype.h"

/* GLOBALS */

/* STATICS */

/* EXTERNALS */
extern u_int32 cbytenum;
extern YYSTYPE yylval;

/* FORWARD */


/***********************************************************************/

/* FUNCTION */
int
yylex()

/*
 *     This routine is called from the grammar.
 *     It calls nlsyylex() [the NLS grammar's lexical analyzer],
 *     which in turn calls 'csetfirstchar()' when it find the
 *     first character of a token.  Then, when the lexical analyzer
 *     returns, this sets yylval.string.endbyte to the current value
 *     of cbytenum.
 *
 */
{
    int retval;
    retval = nlsyylex();
    yylval.string.endbyte = cbytenum;
    return(retval);
}


/***********************************************************************/

/* FUNCTION */
```

BEST AVAILABLE COPY

```
csetfirstchar()

/*
 *     This routine is called when the first character of
 *     a token is found.  This sets yylval.string.startbyte
 *     to be cbytenum.
 *
 */
{
   yylval.string.startbyte = cbytenum;
}
```

Feb 03 15:54 1988  pp/gram/prcpptext.c Page 1

```
/*
 * FILE      $Header: prcpptext.c,v 1.5 87/08/24 19:52:46 hmgr Exp $
 *
 * AUTHOR       Bruce Erickson
 *
 * ONELINER printcpp*() routines
 *
 * TABSTOPS 3
 *
 * RCS       $Log: prcpptext.c,v $
 * Revision 1.5  87/08/24  19:52:46  19:52:46  hmgr ()
 * Author: bae@hplsdlc.hp.com
 * changes to make lint happy
 *
 * Revision 1.4  87/07/29  13:35:35  13:35:35  hmgr ()
 * Author: bae@hplsdlc.hp.com
 * Changed error statements to be preceeded by invokedname
 *
 * Revision 1.3  87/07/10  10:28:11  10:28:11  hmgr ()
 * Author: bae@hplsdlc.hp.com
 * no comment
 *
 * Revision 1.2  87/04/01  16:17:01  16:17:01  bae (Bruce Erickson)
 * works with 'if', 'else', 'else-less-if', 'while', 'for'
 *
 * Revision 1.1  87/03/16  08:51:13  08:51:13  bae (Bruce Erickson)
 * Initial revision
 *
 *
 */
static char rcsid[] = "$Header: prcpptext.c,v 1.5 87/08/24 19:52:46 hmgr Exp $";
#include <stdio.h>
#include <boolean.h>
#include <model.h>
#include "cppout.h"


/* A note about 'skiplist':
```

BEST AVAILABLE COPY

BEST AVAILABLE COPY

```
    The skiplist is a linked list of skipentries.  These entries
    are created when a call to 'printcppskip()' is called.  They
    are in byte-order (i.e., as you traverse the list the startbytes
    are in increasing order).
    The variable 'skiplist' points to the head of the list (it is NULL
    if there are no entries);
    the variable 'skipend' points to the last entry of the list
    (NULL also if no entries).

    You say, "Why is there such a beast?"  Because we may want to not
    output comments.  In the g-job version I used to:
       1) print all cpptext to beginning of comment
       2) set nextoutbyte to end of comment + 1
    This did not work, because of comments that were located at
    look-ahead points - cpptext would be printed that should not be!
*/

typedef struct skipentry
{
    u_int32 startbyte;      /* first byte to skip */
    u_int32 endbyte;        /* last byte to skip */
    int numlines;           /* Number of lines to print when this is skipped */
    struct skipentry *next; /* pointer to next one */
} SKIPENTRY;

/* GLOBALS */

/* STATICS */
static u_int32 nextoutbyte = 1;      /* start output with this byte */
static SKIPENTRY *skiplist = NULL;   /* head of a list of skip requests */
static SKIPENTRY *skipend = NULL;    /* last entry in list of skip requests */

/* efficient output of blank lines... */
static char newlines[] = "\n\n\n\n\n\n\n\n\n\n\n\n\n\n\n\n\n\n\n\n";

/* EXTERNALS */
extern char *malloc();
extern void free();
extern FILE *fba;
extern boolean passcomments;
extern char *cgetcppstring();
extern char invokedname[];

/* FORWARD */


/***************************************************************************/

/* FUNCTION */
void
printcpptext(lastbyte)
u_int32 lastbyte;           /* last byte to print out */
```

BEST AVAILABLE COPY

```
/*
 *    This routine is called to print cpptext that has not previously
 *    been printed.  The cpptext is kept in a N-entry ring buffer
 *    (see cpplines.c).
 *
 *    This routine will check the last byte number that was output
 *    (via previous calls to printcpptext) and print what bytes
 *    are remaining to be printed; perhaps none!
 *
 *    If there are any entries in the 'skiplist', and if any of the
 *    entries are in the range nextoutbyte-lastbyte, the bytes
 *    will be skipped and the skipentry will be removed if it is
 *    completed.... (i.e., lastbyte >= skipentry->endbyte)
 *
 *    nextoutbyte is set to lastbyte + 1 if lastbyte is > nextoutbyte
 *
 */
{
   char *output;              /* the string to print */
   int numbytes;              /* number of bytes to write out */
   register SKIPENTRY *skipentry;
   register int i;            /* temporary counter */
   SKIPENTRY *nextentry;      /* for when we want to remove an entry */

   if (lastbyte < nextoutbyte)
      return;

   skipentry = skiplist;

   while (nextoutbyte <= lastbyte)
   {

      /* If there are no skipentries for [the remainder of] this output,
         we can do a simple 'fwrite' .... */
      if ((skipentry == NULL) || (skipentry->startbyte > lastbyte))
      {
         /* No skipentries for this block! */

         output = cgetcppstring(nextoutbyte, lastbyte);
         numbytes = lastbyte - nextoutbyte + 1;
         if (fwrite(output, sizeof(char), numbytes, fba) != numbytes)
         {
            fprintf(stderr, "%s: unable to write output file\n", invokedname);
            exit(1);
         }
         nextoutbyte += numbytes;
         return;
      }

      /* There are (some) skipentries for this output.  We must 'scroll'
         thru them, sending output where we can.... */
      if (skipentry->startbyte > nextoutbyte)
```

BEST AVAILABLE COPY

```
    {
        /* There is some output prior to the first skip block */
        output = cgetcppstring(nextoutbyte, skipentry->startbyte - (u_int32) 1);
        numbytes = skipentry->startbyte - nextoutbyte;

        if (fwrite(output, sizeof(char), numbytes, fba) != numbytes)
        {
            fprintf(stderr, "%s: unable to write output file\n", invokedname);
            exit(1);
        }
        nextoutbyte += numbytes;        /* bump the counter */
    }

    /* At a skip block.  Do we get to the end of the block, or not? */
    if (skipentry->endbyte > lastbyte)
    {
        /* We have not yet reached the end of the skip block.  Update
            nextoutbyte to be 'lastbyte + 1' */
        nextoutbyte = lastbyte + 1;
        return;
    }

    /* OK.  We are skipping a block, and we are at the end of the block.
        Output 'numlines' new-lines and remove the skipentry.
        For efficiency, we will output multiple newlines at the same
        time.... the newlines are stored in the static array
        "newlines" */
    for (i = skipentry->numlines; i > 0; i -= sizeof(newlines))
    {
        numbytes = (i > sizeof(newlines)) ? sizeof(newlines) : i;
        if (fwrite(newlines, sizeof(char), numbytes, fba) != numbytes)
        {
            fprintf(stderr, "%s: unable to write output file\n", invokedname);
            exit(1);
        }
    }

    nextoutbyte = skipentry->endbyte + 1;       /* pretend we start here */

    /* And now, remove the skipentry from the linked list */
    nextentry = skipentry->next;
    free(skipentry);

    /* Note that we move the head of the list, too! */
    skiplist = skipentry = nextentry;

    /* If no more, set skipend to NULL too */
    if (skipentry == NULL)
        skipend = NULL;

    /* continue the output */
}
```

BEST AVAILABLE COPY

```
}


/***************************************************************************/

/* FUNCTION */
void
printcppskip(firstbyte, lastbyte, numlines)
u_int32 firstbyte;           /* first byte to not output */
u_int32 lastbyte;            /* last byte to not output */
int numlines;                /* number of lines this 'skip' covers */

/*
 *    This routine creates & appends a request to not output a
 *    block of text.  This is done when we find a comment, and
 *    when we want to replace some text...
 *
 *    This will create a new SKIPENTRY, and add it to the end of
 *    the list - or, create the list if it has no entries...
 *    Note that if firstbyte == (skipend->endbyte + 1), we will
 *    simply "expand" the last one.... so feel free to call this
 *    more often than needed.
 *
 *    In particular, if you have a long comment, call this every
 *    10 or so lines to avoid the buffer shift from occuring before
 *    the printcppskip call....
 */
{
   register SKIPENTRY *newskip;

   if (skipend != NULL)
   {
      if (skipend->startbyte == firstbyte - 1)
      {
         /* Simply expand the last request */
         skipend->endbyte = lastbyte;
         skipend->numlines += numlines;
         return;
      }
   }

   /* Cannot merge the last skip entry and this one...
      Must create a new one. */

   newskip = (SKIPENTRY *) malloc(sizeof(SKIPENTRY));
   newskip->startbyte = firstbyte;
   newskip->endbyte = lastbyte;
   newskip->numlines = numlines;
   newskip->next = NULL;

   if (nextoutbyte > firstbyte)
   {
```

BEST AVAILABLE COPY

```
        fprintf(stderr, "%s: ERROR: printcppskip: illegal call (output beyond request)\n",
              invokedname);
        abort();
    }

    /* Insert it! */
    if (skipend != NULL)
    {
        /* Verify that this is at the end of the array */
        if (skipend->endbyte > firstbyte)
        {
            fprintf(stderr, "%s: ERROR: printcppskip: illegal call (order)\n",
                  invokedname);
            abort();
        }

        skipend->next = newskip;
        skipend = newskip;
        return;
    }

    /* This is a first entry */

    skiplist = skipend = newskip;
}
```

Feb 03 15:54 1988 pp/gram/probe.c Page 1

```
/*
 * FILE     $Header: probe.c,v 1.9 87/10/14 15:07:03 hmgr Exp $
 *
 * AUTHOR      Bruce Erickson
 *
 * ONELINER Handling of the probe points that are inserted...
 *
 *    When a probe is inserted that will have it's end "sometime
 *    later" (e.g., an if statement), an entry is pushed onto
 *    'probeinfo'.  "probeinfo" is implemented as a linked list of
 *    information about probe points - There are 2 pointers
 *    to the probeinfo linked list:
 *       probehead   -> very first entry
 *       probelast   -> the last entry used.
 *
 *    When we "push" a probeentry, we will add at the end
 *    of probelast and move probelast to the new entry.
 *    When we "pop" a probeentry, we return the one probelast
 *    is pointing at and set probelast to the previous entry.
 *    Note that the memory is never deallocated for this array,
 *    because it is used very often... It is allocated only because
 *    I don't want to have to deal with calculating the maximun
 *    number of legal nesting levels for all targets compilers....
 *
```

BEST AVAILABLE COPY

```
* TABSTOPS 3
*
* INSPECTED   date      - inspectors
*
* RCS      $Log: probe.c,v $
* Revision 1.9  87/10/14  15:07:03  15:07:03  hmgr ()
* Author: bae@hplsdlc.hp.com
* Convert to pragmas for ignore & alerts...
*
* Revision 1.8  87/08/27  15:26:38  15:26:38  hmgr ()
* Author: bae@hplsdlc.hp.com
* Add routine to find out what probe is on top of the stack (to check
* for labels, primarily)
*
* Revision 1.7  87/08/24  19:51:46  19:51:46  hmgr ()
* Author: bae@hplsdlc.hp.com
* changes to make lint happy
*
* Revision 1.6  87/08/21  16:19:09  16:19:09  hmgr ()
* Author: bae@hplsdlc.hp.com
* Changed the way 'do' loops are handled so that we never have problems
* when the 'while' is far away from the 'do'.
*
* Revision 1.5  87/07/10  10:26:26  10:26:26  hmgr ()
* Author: bae@hplsdlc.hp.com
* no comment
*
* Revision 1.6  87/06/03  16:07:14  16:07:14  bae (Bruce Erickson)
* Made the Ba_debuG=p output easier to read...
*
* Revision 1.5  87/06/01  12:09:16  12:09:16  bae (Bruce Erickson)
* added 'probechangetype' so that PT_EMPTYCASE could
* be set.
* Also set up all systems so that both s2line (etc) have
* a seperate file number...
*
* Revision 1.4  87/04/16  16:46:22  16:46:22  bae (Bruce Erickson)
* changed debug output, and probestart now returns
* PROBETYPE.  Also added probenumprobes() so that the array
* declaration works.
*
* Revision 1.3  87/04/14  16:33:37  16:33:37  bae (Bruce Erickson)
* The following probe points work:
* if/else/else-less if
* for
* while
* switch
* conditional_expressions
*
* Revision 1.2  87/04/01  16:14:08  16:14:08  bae (Bruce Erickson)
* works with 'if', 'else', 'else-less-if', 'while', 'for'
*
```

BEST AVAILABLE COPY

```
 * Revision 1.1  87/03/26  12:45:53  12:45:53  .bae (Bruce Erickson)
 * Initial revision
 *
 *
 */
static char rcsid[] = "$Header: probe.c,v 1.9 87/10/14 15:07:03 hmgr Exp $";
#include <stdio.h>
#include <model.h>
#include <boolean.h>
#include "ba.h"
#include "probe.h"


/* The following defines information about a probe point... */
typedef struct probeinfo
{
    int index;              /* the index assigned to this point */
    PROBETYPE type;         /* type of probe point (PT_*) */
    PFLAGTYPE flags;        /* any flags, PF_* */
    int execscope;          /* scope of the inserted assignment statement */
    u_int32 after;          /* the probe was inserted right after this byte */
    int sourcenum;          /* sline/scol is in this source file (i.e., 1st executed
                               statement goes here */
    int sline, scol;        /* line/column of first stmnt executed if array[index]
                               is a 1. */
    int eline, ecol;        /* line/column of last stmnt executed */
    int source2num;         /* source file e2line/e2col is in (the ctlstring) */
    int s2line, s2col;      /* if PT_FUNCTION, function declaration started here.
                               if PT_NONFUNCTION, control statement started here
                            */
    int e2line, e2col;      /* ending location of s2line/s2col */
    int functionnum;        /* if PT_FUNCTION, this is the functions
                               symbol number */
    char *ctlstring;        /* if PT_NONFUNCTION, this is the text of the conditional
                               statement that controls if this index is executed
                               or not.  Note that this points to a malloc'd string
                               which is never free'd!
                               if PT_ELSELESSIF, this is the text of the if
                               statement which has no else.
                               if PT_EMPTYCASE, this is the text of the case
                               statement.
                               if PT_IDEFAULT, this is the text of the switch
                               statement that had no default.
                               In all cases, this is a malloc'd string of
                               length ctlbytes.
                            */
    int ctlbytes;           /* number of bytes in ctlstring.  Not its strlen! */

    char *ctlmstring;       /* if not "", ctlstring is a macro, and this is it's
                               expansion */
    int ctlmbytes;          /* number of bytes in ctlmstring */

```

BEST AVAILABLE COPY

```
    boolean leadinsert;  /* if TRUE, insert assignment statement prior to
                            probestart; else insert after probeend.... the
                            only ones which set this to FALSE are PT_DO* */
    char *leadstring;    /* pointer to leadstring to use prior to the array
                            assignment.  May be NULL. */
    char *terminator;    /* pointer to string to print after the assignment */
    char *trailstring;   /* pointer to string to print after the last statement
                            associated with this array entry. May be NULL */

    struct probeinfo *next; /* if not NULL, next probe info */
    struct probeinfo *prev; /* if not NULL, previous probe info */
} PROBEINFO;

/* GLOBALS */

/* STATICS */
static PROBEINFO *probehead;      /* head of the probe list */
static PROBEINFO *probelast;      /* last one currently in use */
static int probeindex = 0;        /* the (next) index to use for branch analysis */
static int execscope = 0;

/* EXTERNALS */
extern void printcpptext();
extern boolean debugprobes;
extern FILE *fba;
void tsprintassign();
extern char *malloc();
extern char *cgetorigstring();
extern char *csymstring();

/* FORWARD */
extern PROBEINFO *pinfopush();
extern PROBEINFO *pinfopop();


/*****************************************************************************/

/* FUNCTION */
void
probenew(type, varscope, leadstring, terminator, trailstring, ctlstart, ctlend, fnum, leadinsert)
PROBETYPE type;       /* type of probe point - PT_* definitions */
int varscope;         /* scope that we will insert the assignment statement at */
char *leadstring;     /* if non-NULL, put this string prior to the assignment
                         statement.  Usually a "(" or a "(" */
char *terminator;     /* terminator to place after the assignment statement -
                         usually a ";" or a "," */
char *trailstring;    /* string to place after the last statement dealing with
                         this array entry - usually a ')' or a ')'.  Can be
                         a NULL. */
u_int32 ctlstart;     /* starting byte of text to get original version of
                         and store in 'ctlstring'. */
u_int32 ctlend;       /* last byte of text to store in 'ctlstring'. */
```

BEST AVAILABLE COPY

```
int fnum;             /* if type is PT_FUNCTION, this is the function's number */
boolean leadinsert;   /* probeinfo.leadinsert */

/*
 *    This routine is called when we have detected a control statement
 *    (or function definition) and want to prepare information to insert
 *    a probe before the start of the next statement.
 *
 *    Flags are set to zero
 *
 *    This will:
 *        - fetch the next probeinfo (pushing it on the stack)
 *          [probelast will be pointing to it]
 *        - store the appropriate data into probeinfo.
 *
 */
{
   register PROBEINFO *probeinfo;
   char *origtext;           /* original text of control */
   char *expansion;          /* perhaps an expansion of the original text */

   probeinfo = pinfopush();
   probeinfo->type = type;
   probeinfo->execscope = execscope;
   probeinfo->leadstring = leadstring;
   probeinfo->terminator = terminator;
   probeinfo->trailstring = trailstring;
   probeinfo->flags = (PFLAGTYPE) 0;
   probeinfo->leadinsert = leadinsert;

   cgetorignumbers(ctlstart, ctlend, &probeinfo->source2num,
         &probeinfo->s2line, &probeinfo->s2col,
         &probeinfo->e2line, &probeinfo->e2col);

   if (ISPTYPE(type, PT_FUNCTION))
   {
      probeinfo->functionnum = fnum;
      if (debugprobes)
      {
         fprintf(stderr, "probenew: new function (%d) @ %d/%d\n", fnum,
               probeinfo->s2line, probeinfo->s2col);
         /* Put in a string here so subsequent debug prints do not core dump */
         strexpand("<function>", &probeinfo->ctlstring, &probeinfo->ctlbytes);
      }
   }

   if (ISPTYPE(type, PT_NONFUNCTION))
   {
      /* Must store the original text info probeinfo->ctlstring */
      origtext = cgetorigstring(ctlstart, ctlend, &probeinfo->source2num,
            &expansion);
```

BEST AVAILABLE COPY

```
        /* Must copy text to malloc'd area - expand malloc'd area
           if it is not large enough to take it */

        strexpand(origtext, &probeinfo->ctlstring, &probeinfo->ctlbytes);

        if (expansion != NULL)
        {
           /* Must copy text of expansion to malloc'd area - expand malloc'd area

              if it is not large enough to take it */
           strexpand(expansion, &probeinfo->ctlmstring, &probeinfo->ctlmbytes);
        }
        else
        {
           if (probeinfo->ctlmbytes != 0)
              *probeinfo->ctlmstring = '\0';
        }
        if (debugprobes)
           fprintf(stderr, "probenew: type 0x%x, %d/%d, '%s'\n", type, probeinfo->s2line,
                 probeinfo->s2col, probeinfo->ctlstring);
     }
  }

  /************************************************************************/

  /* FUNCTION */
  void
  probenew2(type, varscope, leadstring, terminator, trailstring,
        sourcenum, sline, scol, eline, ecol, origtext, expansion,
        leadinsert)
  PROBETYPE type;        /* type of probe point - PT_* definitions */
  int varscope;          /* scope that we will insert the assignment statement at */
  char *leadstring;      /* if non-NULL, put this string prior to the assignment
                            statement.  Usually a "(" or a "(" */
  char *terminator;      /* terminator to place after the assignment statement -
                            usually a ";" or a "," */
  char *trailstring;     /* string to place after the last statement dealing with
                            this array entry - usually a ')' or a ')'.  Can be
                            a NULL. */
  int sourcenum;         /* source file number of control statement */
  int sline, scol;       /* starting line/column of control statement */
  int eline, ecol;       /* ending line/column of control statement */
  char *origtext;        /* original text - pointer to a 'static' string */
  char *expansion;       /* if not NULL, pointer to expanded string */
  boolean leadinsert;    /* probeinfo->leadinsert */

  /*
   *    This routine is called when the caller would normally call
   *    probenew(), but already knows the source information.
   *
   *    Note that this must NOT be called with type = PT_FUNCTION!
   *
```

BEST AVAILABLE COPY

```
 *     This behaves the same as probenew, but without the overhead
 *     of calling cgetorignumbers and cgetorigstring
 */
{
   register PROBEINFO *probeinfo;

   probeinfo = pinfopush();
   probeinfo->type = type;
   probeinfo->execscope = execscope;
   probeinfo->leadstring = leadstring;
   probeinfo->terminator = terminator;
   probeinfo->trailstring = trailstring;
   probeinfo->flags = (PFLAGTYPE) 0;
   probeinfo->leadinsert = TRUE;

   probeinfo->source2num = sourcenum;
   probeinfo->s2line = sline;
   probeinfo->s2col = scol;
   probeinfo->e2line = eline;
   probeinfo->e2col = ecol;

   /* Must copy text to malloc'd area - expand malloc'd area
      if it is not large enough to take it */
   strexpand(origtext, &probeinfo->ctlstring, &probeinfo->ctlbytes);

   if (expansion != NULL)
   {
      /* Must copy text of expansion to malloc'd area - expand malloc'd area
         if it is not large enough to take it */
      strexpand(expansion, &probeinfo->ctlmstring, &probeinfo->ctlmbytes);
   }
   else
   {
      if (probeinfo->ctlmbytes != 0)
         *probeinfo->ctlmstring = '\0';
   }

   if (debugprobes)
      fprintf(stderr, "probenew2: type %d, %d/%d, '%s'\n", type, probeinfo->s2line,
            probeinfo->s2col, probeinfo->ctlstring);
}


/***********************************************************************/

/* FUNCTION */
void
probeelse(type, varscope, leadstring, terminator, trailstring)
PROBETYPE type;         /* either PT_ELSE or PT_IELSE or PT_CAFALSE or PT_WHILENOT */
int varscope;
char *leadstring;    /* if non-NULL, put this string prior to the assignment
                        statement.  Usually a "(" or a "(" */
```

BEST AVAILABLE COPY

```
char *terminator;     /* terminator to place after the assignment statement -
                         usually a ";" or a "," */
char *trailstring;    /* string to place after the last statement */

/*
 *    This routine is called when we are doing an else statement
 *    (whether the user had it in his source code, or if it
 *    was inserted), or for the false side of
 *    a conditional expression.
 *
 *    We will re-use all the information in the previous probe
 *    data area except for type and flags....
 *
 */
{
   register PROBEINFO *probeinfo;

   probeinfo = pinfopush();
   probeinfo->type = type;
   probeinfo->leadstring = leadstring;
   probeinfo->terminator = terminator;
   probeinfo->trailstring = trailstring;
   probeinfo->flags = (PFLAGTYPE) 0;

   if (debugprobes)
      fprintf(stderr, "probeelse: type 0x%x '%s'\n", type, probeinfo->ctlstring);
}


/**************************************************************************/

/* FUNCTION */
void
probeaddflags(flags)
PFLAGTYPE flags;           /* flag bits to add */

/*
 *    This routine is called to add flags to the currently-active
 *    probe.  We will simply or-in flags with the current values.
 *
 */
{
   probelast->flags |= flags;
}


/**************************************************************************/

/* FUNCTION */
void
probeleadtrail(newlead, newtrail)
char *newlead;        /* pointer to new leadstring */
char *newtrail;       /* pointer to new trailstring */
```

BEST AVAILABLE COPY

```

/*
 *    This routine is called when we want to change the leader
 *    and trailer strings associated with the current probe.
 *
 *    This is used, for example, when we enter a compound statement
 *    as the first statement after a conditional and we do not
 *    want to insert a '{' (because it is not needed)
 *
 *    Note that this only has effect if the type is leadinsert
 *    (otherwise it *really* messes up the PT_DOTRUE insertion!)
 */
{
   if (probelast->leadinsert)
   {
      probelast->leadstring = newlead;
      probelast->trailstring = newtrail;
   }
}


/***********************************************************************/

/* FUNCTION */
void
probechangetype(newtype)
PROBETYPE newtype;            /* type we want the current probe to be */

/*
 *    This routine is called to change the type of the current
 *    probe.  This is used to change the type of a PT_CASE to
 *    PT_EMPTYCASE when we realize that there is
 *    no statement between a previous case and this case
 *
 */
{
   probelast->type = newtype;
}


/***********************************************************************/

/* FUNCTION */
void
probechangectl(ctlstart, ctlend)
u_int32 ctlstart;    /* start of 'real' control statement */
u_int32 ctlend;      /* end of 'real' control statement */

/*
 *    This routine is typically called when the probe is type !leadinsert.
 *    It is called when we change our mind about what the controlling
 *    statement really was...
 *
```

BEST AVAILABLE COPY

```
 */
{
   register PROBEINFO *probeinfo;
   char *origtext;          /* original text of control */
   char *expansion;         /* perhaps an expansion of the original text */

   probeinfo = probelast;

   /* Get 'original information' from cgetorignumbers */
   cgetorignumbers(ctlstart, ctlend, &probeinfo->source2num,
         &probeinfo->s2line, &probeinfo->s2col,
         &probeinfo->e2line, &probeinfo->e2col);

   /* This is *never* used for functions! */
   /* Must store the original text info probeinfo->ctlstring */
   origtext = cgetorigstring(ctlstart, ctlend, &probeinfo->source2num,
         &expansion);

   /* Must copy text to malloc'd area - expand malloc'd area
      if it is not large enough to take it */

   strexpand(origtext, &probeinfo->ctlstring, &probeinfo->ctlbytes);

   if (expansion != NULL)
   {
      /* Must copy text of expansion to malloc'd area - expand malloc'd area
         if it is not large enough to take it */
      strexpand(expansion, &probeinfo->ctlmstring, &probeinfo->ctlmbytes);
   }
   else
   {
      if (probeinfo->ctlmbytes != 0)
         *probeinfo->ctlmstring = '\0';
   }
   if (debugprobes)
      fprintf(stderr, "probechangectl: type 0x%x, %d/%d, '%s'\n", probeinfo->type, probeinfo->s2line,
            probeinfo->s2col, probeinfo->ctlstring);
}


/***********************************************************************/

/* FUNCTION */
void
probeabort()

/*
 *    If this routine is called, it *must* be called before
 *    probestart() is called!  It is used when we thought we
 *    should start a probe, but later (perhaps much later!) we
 *    change our mind...
 *
```

BEST AVAILABLE COPY

```
 */
{
   if (debugprobes)
      fprintf(stderr, "probeabort: '%s'\n", probelast->ctlstring);

   (void) pinfopop();
}


/*****************************************************************************/

/* FUNCTION */
PROBETYPE
probestart(byte)
u_int32 byte;          /* byte just after where we insert our statement */


/*
 *    This routine is called when we want to insert a probe
 *    assignment statement (e.g. _bA_array[5] = 1;) into
 *    the fba output stream.
 *
 *    It will:
 *       - if leadinsert is TRUE:
 *          - request that the pending input up to (but not including) 'byte'
 *          be printed to fba
 *          - print the assignment statement to fba
 *          - increment the 'probeindex'
 *
 *    This returns the type that the current probe is
 */
{
   register PROBEINFO *probeinfo;
   char *leadstring;         /* For efficiency */
   int filenum;              /* for call to cgetorignumbers */
   int dummy;                /* for call to cgetorignumers */

   probeinfo = probelast;  /* fetch information previously set up */

   if (probeinfo->leadinsert)
   {
      printcpptext(byte - (u_int32) 1);      /* flush any pending output */

      /* Print the leader */
      if ((leadstring = probeinfo->leadstring) != NULL)
         fputs(leadstring, fba);

      /* Print the actual assignment */
      tsprintassign(probeindex);

      /* print the terminator */
      fputs(probeinfo->terminator, fba);
```

BEST AVAILABLE COPY

```
        probeinfo->after = byte;
        probeinfo->index = probeindex++;     /* note we incremented probeindex */
    }

    cgetorignumbers(byte, byte, &probeinfo->sourcenum, &probeinfo->sline,
          &probeinfo->scol, &dummy, &dummy);

    if (debugprobes)
       fprintf(stderr, "probestart: %d/%d '%s'\n", probeinfo->sline,
             probeinfo->scol, probeinfo->ctlstring);

    return(probeinfo->type);
}


/***********************************************************************/

/* FUNCTION */
void
probeend(endbyte)
u_int32 endbyte;          /* the last byte which is of the same execscope as
                             the inserted assignment statement */

/*
 *     This routine 'pops' the most-recently-used probeinfo
 *     from the stack.  It calculates some informatin then
 *     calls "wmapprobe()"
 *
 *     If leadinsert is FALSE, we will also do the insertion of
 *     the assignment statement...
 */
{
    register PROBEINFO *probeinfo;
    int filenum;              /* for call to cgetorignumbers */
    int dummy;             /* for call to cgetorignumers */
    char *funcname, *ctlstring, *ctlmstring;
    char *leadstring;         /* For efficiency */

    probeinfo = pinfopop();     /* Get information */

    if (!probeinfo->leadinsert)
    {
       printcpptext(endbyte - (u_int32) 1);       /* flush any pending output */

       /* Print the leader */
       if ((leadstring = probeinfo->leadstring) != NULL)
          fputs(leadstring, fba);

       /* Print the actual assignment */
       tsprintassign(probeindex);

       /* print the terminator */
       fputs(probeinfo->terminator, fba);
       probeinfo->after = endbyte;
```

BEST AVAILABLE COPY

```
      probeinfo->index = probeindex++;      /* note we incremented probeindex */
   }

   if (ISPTYPE(probeinfo->type, PT_FUNCTION))
      funcname = csymstring(probeinfo->functionnum);
   else
      funcname = NULL;

   ctlstring = probeinfo->ctlstring;

   if ((probeinfo->ctlmbytes == 0) || (*probeinfo->ctlmstring == '\0'))
      ctlmstring = NULL;
   else
      ctlmstring = probeinfo->ctlmstring;

   cgetorignumbers(endbyte, endbyte, &filenum, &dummy, &dummy,
         &probeinfo->eline, &probeinfo->ecol);

   if (debugprobes)
      fprintf(stderr, "probeend: %d/%d '%s'\n", probeinfo->eline,
            probeinfo->ecol, probeinfo->ctlstring);

   /* Call mapmake() */
   wmapprobe(probeinfo->index, probeinfo->type, probeinfo->flags,
         probeinfo->sourcenum, probeinfo->execscope,
         probeinfo->sline, probeinfo->scol, probeinfo->eline,
         probeinfo->ecol, probeinfo->source2num,
         probeinfo->s2line, probeinfo->s2col, probeinfo->e2line, probeinfo->e2col,
         funcname, ctlstring, ctlmstring);

   /* If a trailer is called for, print it */
   if (probeinfo->trailstring != NULL)
   {
      printcpptext(endbyte);      /* flush any pending output */
      fputs(probeinfo->trailstring, fba);
   }

   return;
}


/***************************************************************************/

/* FUNCTION */
PROBETYPE
probetop()

/*
 *    This returns the type of the probe at the top of the stack;
 *    0 if none...
 *
 */
{
```

BEST AVAILABLE COPY

```
    if (probelast == NULL)
    {
        /* This should never happen, since we only call this for
           labels... and those MUST be w/in a scope...*/
#pragma BBA_IGNORE
        return(0);
    }
    return(probelast->type);
}


/****************************************************************************/

/* FUNCTION */
static PROBEINFO *
pinfopush()

/*
 *    This routine returns a pointer to the next available
 *    probeinfo in the linked list.  If necessary, this will
 *    call malloc() to get another one and add it to the
 *    linked list...
 *
 *    When initial create of an entry, set ctl[m]string to NULL.
 *    Note that we cannot automatically set ctl[m]string to ""
 *    if we aren't creating it, because in the case of else-less if's
 *    we need that data!
 */
{
    register PROBEINFO *ptr;

    execscope++;

    if (probelast == NULL)
    {
        /* At scope 0.  Get probehead, realizing that we may have
           never been called before */

        if ((probelast = probehead) == NULL)
        {
            /* Never been called before.  Allocate the head */
            ptr = probelast = probehead = (PROBEINFO *) malloc(sizeof(PROBEINFO));
            ptr->next = ptr->prev = NULL;
            ptr->ctlbytes = 0;
            ptr->ctlmbytes = 0;
            ptr->ctlstring = ptr->ctlmstring = NULL;
        }
        ptr = probelast;     /* redundant in case of probehead == NULL */
        return(probelast);
    }

    /* Do not return the head of the list.  Need to allocate a new
```

BEST AVAILABLE COPY

```
       one if probelast->next is NULL... */
    if (probelast->next != NULL)
    {
       /* We can re-use an already allocated entry */
       ptr = probelast->next;
       return(probelast = ptr);
    }

    /* Need to allocate a new one, and link it in after the
       one that probelast is pointing to */
    ptr = probelast->next = (PROBEINFO *) malloc(sizeof(PROBEINFO));
    ptr->next = NULL;
    ptr->prev = probelast;
    ptr->ctlbytes = 0;
    ptr->ctlmbytes = 0;
    ptr->ctlstring = ptr->ctlmstring = NULL;
    return(probelast = ptr);
 }


/***********************************************************************/

/* FUNCTION */
int
probenumprobes()

/*
 *     This returns the number of probes used.
 *     It is called to determine how large to make the
 *     array
 *
 */
{
   return(probeindex);
}


/***********************************************************************/

/* FUNCTION */
static PROBEINFO *
pinfopop()

/*
 *     This is called to pop the probeinfo stack.
 *     It returns the current entry (what probelast points
 *     to) and sets probelast to probelast->prev.
 *
 *     Note that if we were at scope 0, probelast will be
 *     set to NULL.
 */
{
```

BEST AVAILABLE COPY

```
   register PROBEINFO *ptr;

   execscope--;
   ptr = probelast;

   probelast = probelast->prev;

   return(ptr);
}


/****************************************************************************/

/* FUNCTION */
int
pexecscope(set, push)
boolean set;      /* if FALSE, just return current execscope; else */
boolean push;     /* if TRUE, push the execscope; else pop it */

/*
 *    This returns 'execscope'
 *
 *    If 'set' is true, it will either push it or pop it.
 *    It is used to set the execscope in the case where we
 *    do not want to generate a probe point, but want to
 *    handle the exec scoping correctly.  For example,
 *    'do' statements in normal mode....
 *
 */
{
   if (set)
   {
      if (push)
         execscope++;
      else
         execscope--;
   }
   return(execscope);
}
```

Feb 03 15:55 1988 pp/gram/sym.c Page 1

```
/*
 * FILE      $Header: sym.c,v 1.10 88/01/06 18:48:04 hmgr Exp $
 *
 * AUTHOR       Bruce Erickson
 *
 * ONELINER routines dealing with symbols for the C grammar, and scoping
 *
 * TABSTOPS 3
 *
```

BEST AVAILABLE COPY

```
 * RCS      $Log: sym.c,v $
 * Revision 1.10  88/01/06  18:48:04  18:48:04  hmgr ()
 * Author: bae@hplsdlc.hp.com
 * got rid of some unused functions
 *
 * Revision 1.9  87/07/30  09:26:47  09:26:47  hmgr ()
 * Author: bae@hplsdlc.hp.com
 * changed error message
 *
 * Revision 1.8  87/07/29  13:35:15  13:35:15  hmgr ()
 * Author: bae@hplsdlc.hp.com
 * Changed error statements to be preceeded by invokedname
 *
 * Revision 1.7  87/07/10  10:27:55  10:27:55  hmgr ()
 * Author: bae@hplsdlc.hp.com
 * no comment
 *
 * Revision 1.9  87/06/17  17:10:07  17:10:07  bae (Bruce Erickson)
 * changed calls to myexit to become cleanup, so we don't
 * leave temporary files around...
 *
 * Revision 1.8  87/06/01  12:09:34  12:09:34  bae (Bruce Erickson)
 * *** empty log message ***
 *
 * Revision 1.7  87/05/18  09:06:01  09:06:01  bae (Bruce Erickson)
 * changed output of dumping routine (only used in debugging) so that
 * it outputs in strict symbol number.  This was done to prevent
 * problems when directories changed...
 *
 * Revision 1.6  87/05/06  12:13:53  12:13:53  bae (Bruce Erickson)
 * Passes Plum Hall conformance test
 *
 * Revision 1.5  87/04/14  16:33:51  16:33:51  bae (Bruce Erickson)
 * changed error message to make it clearer
 *
 * Revision 1.4  87/04/01  16:17:10  16:17:10  bae (Bruce Erickson)
 * works with 'if', 'else', 'else-less-if', 'while', 'for'
 *
 * Revision 1.3  87/03/26  12:18:53  12:18:53  bae (Bruce Erickson)
 * added some documentation to remind myself that caddsym
 * will look for symbols in the current scope only.
 * In cgetsym, if typemask is zero then any type will
 * be accepted.
 * Added the function csymistypedef() for cleanliness in the lex.c code.
 * Removed csymistype(), since it was superceded by csymistypedef().
 *
 * Revision 1.2  87/03/09  16:22:12  16:22:12  bae (Bruce Erickson)
 * Before merging in new version of NXLS grammar & lex
 *
 * Revision 1.1  87/02/17  16:16:27  16:16:27  bae (Bruce Erickson)
 * This seems to parse typedefs OK now
```

BEST AVAILABLE COPY

```
 *
 *
 */
static char rcsid[] = "$Header: sym.c,v 1.10 88/01/06 18:48:04 hmgr Exp $";
#include <stdio.h>
#include <model.h>
#include <boolean.h>
#include "yystype.h"
#include "csym.h"


#define MIN(a,b) ((a) < (b)) ? (a) : (b)

/* EXTERNALS */
extern boolean exitwitherror;
extern void cerror();
extern char *malloc();
extern char *realloc();
extern void free();
extern boolean allowbavars;
extern char invokedname[];

extern boolean debugsym;

extern YYSTYPE yylval;

/* STATICS */
static int symnum;          /* (next) symbol number */
static SCOPES scopes;       /* the scopes information */
static NUMTABLE numtable;   /* dynamically created */
int varscope;               /* current scope; 0 -> file level; 1 -> procedure */

/* GLOBALS */


/* FORWARDS */
extern SYMINFO *cgetinfo();

/* this defines how much to increase numtable when
                        an overflow occurs */
#define NINCREMENT   100


/**********************************************************************/


/* FUNCTION */
/* NO RETURN VALUE */
cinitsyms()

/*
 *    this initializes all sumbol information
```

BEST AVAILABLE COPY

```
 *
 */
{
   varscope = -1;
   pushscope();

   numtable = (NUMTABLE) malloc(sizeof(SYMINFO *) * NINCREMENT);

   symnum = 0;
}


/**************************************************************************/


/* FUNCTION */
/* NO RETURN VALUE */
/* clearsyms()
/*
/* /*
/*  *     This routine clears the symbol information.
/*  *     It is called when we want to do a chain-execution, and so
/*  *     need to remove all symbol/scope/etc
/*  *
/*  */
/* {
/*    while (varscope >= 0)
/*    {
/*       popscope();
/*    }
/*
/*    if (numtable != NULL)
/*       free(numtable);
/*
/* } */


/**************************************************************************/


/* FUNCTION */
int
caddsym(addinfo, symbol, type)
boolean addinfo;   /* if TRUE, or-in symbol information; else error
                      on attempt to re-write */
char *symbol;      /* the actual symbol */
u_int32 type;      /* type of symbol */

/*
 * This calculates the hash value for "symbol", then looks for it
 *     in the hash table IN THE CURRENT SCOPE ONLY.
 *     If not found, the symbol is added.  If it
```

BEST AVAILABLE COPY

```
 *     is found, and addinfo is FALSE, an error message is generated;
 *     else "type" is added with the new type.
 *     If 'symbol' was added, space is malloc'd for the string and copied.
 *
 *     This returns symnum in all cases.
 *     symnum is post-incremented.
 *
 */
{
    int hvalue;
    register SYMINFO *syminfo, *prev;
    register int addscope;          /* add scope to here */


    hvalue = chash(symbol);
    if ((type & M_FILE) == M_FILE)
    {
        addscope = 0;
        prev = syminfo = scopes[0][hvalue];     /* force 0 scope */
    }
    else
    {
        addscope = varscope;     /* use current scope value */
        prev = syminfo = scopes[varscope][hvalue];
    }

    while (syminfo != NULL)
    {
        if (strcmp(syminfo->symbol, symbol) == 0)
        {
            /* this symbol matches! - is this an error? */
            if (!addinfo)
            {
                if (debugsym)
                    fprintf(stderr,"addsym: Multiply defined symbol '%s'\n", symbol);
            }
            else
            {
                syminfo->type |= type;
                if (debugsym)
                    fprintf(stderr,"addsym: merged symbol '%s', type 0x%x, varscope %d as %d\n",
                        symbol, syminfo->type, addscope, syminfo->symnum);
            }
            return(syminfo->symnum);
        }
        prev = syminfo;
        syminfo = syminfo->next;
    }


    /* end of list.  Create a new syminfo entry */
    syminfo = (SYMINFO *) malloc(sizeof(SYMINFO));
```

BEST AVAILABLE COPY

```
    syminfo->next = NULL;
    syminfo->symbol = malloc(strlen(symbol) + 1);
    strcpy(syminfo->symbol, symbol);
    syminfo->symnum = symnum;
    syminfo->type = type;

    if ((symnum % NINCREMENT) == NINCREMENT - 1)
    {
       numtable = (NUMTABLE) realloc(numtable, sizeof(SYMINFO *) *
              (symnum + 1 + NINCREMENT));
    }
    numtable[symnum] = syminfo;

    if (debugsym)
       fprintf(stderr,"addsym: added symbol '%s', type 0x%x, varscope %d as %d\n",
              symbol, type, addscope, symnum);

    /* Check to see if the user has attempted to use a _bA_* variable */
    if (!allowbavars)
    {
       if ((strlen(symbol) >= 4) && (strncmp(symbol, "_bA_", 4) == 0))
       {
          cerror(NULL);
          fprintf(stderr, "symbol '%s' conflicts with bba symbol\n",
                symbol);
       }
    }


    /* if prev = NULL, this is the first in the list... */
    if (prev == NULL)
    {
       syminfo->prev = NULL;
       scopes[addscope][hvalue] = syminfo;
    }
    else
    {
       syminfo->prev = prev;
       prev->next = syminfo;
    }
    return(symnum++);
}



/*************************************************************************/


/* FUNCTION */
boolean
caddsymnum(symbolnum, type)
int symbolnum;         /* the symbol's number */
```

BEST AVAILABLE COPY

```
u_int32 type;      /* type of symbol (or'd into type) */

/*
 *     This routine simply finds the specified symbol number and
 *     or's in the type....
 *
 *     RETURNS TRUE if symbol existed; FALSE if it did not
 */
{
   register SYMINFO *syminfo;

   syminfo = cgetinfo(symbolnum);
   if (syminfo == NULL)
   {
      if (debugsym)
         fprintf(stderr, "csymnum: symnum %d undefined!\n", symbolnum);
      return(FALSE);
   }

   syminfo->type |= type;

   if (debugsym)
      fprintf(stderr,"addsymnum: merged symbol %d, type 0x%x\n",
            symbolnum, syminfo->type);

   return(TRUE);
}


/**************************************************************************/


/* FUNCTION */
int
cgetsym(symbol, rscope, info, typemask)
char *symbol;      /* the symbol's string */
int *rscope;       /* scope of the symbol we found */
SYMINFO **info;    /* if it exists, the information about it */
u_int32 typemask; /* to consider to exist, the and of typemask and
                     .type must be non-zero, unless .type is 0x0 and
                     typemask is ~0...*/

/*
 *     This routine will check to see if the symbol is in the
 *     symtable table.  If it doesn't, this returns -1.
 *
 *     If the symbol exists, it's type is anded with typemask.  If
 *     the result is zero, this returns -1.
 *
 *     If it is non-zero, this sets info to point at the symbol's information,
 *     and returns the symnum of the symbol.
 *
```

BEST AVAILABLE COPY

```
 */
{
   int hvalue;
   int scopescan;    /* going backwards thru scopes */
   register SYMINFO *syminfo;
   register boolean match0;   /*set to TRUE if typemask == -0 */

   hvalue = chash(symbol);
   match0 = (typemask == -0) ? TRUE : FALSE;

   for (scopescan = varscope; scopescan >= 0; scopescan--)
   {
      syminfo = scopes[scopescan][hvalue];
      while (syminfo != NULL)
      {
         if (strcmp(syminfo->symbol, symbol) == 0)
         {
            if ((match0 & (syminfo->type == 0)) || ((syminfo->type & typemask) != 0))
            {
               *rscope = scopescan;
               *info = syminfo;
               if (debugsym)
                  fprintf(stderr,"getsym: symbol '%s' is %d (type 0x%x)\n",
                        symbol, syminfo->symnum, syminfo->type);
               return(syminfo->symnum);
            }
            else
            {
               /* failed type test! */
               if (debugsym)
                  fprintf(stderr,"getsym: symbol '%s' matches, but it's type is 0x%x, and typemask = 0x%x\n",
                                                  symbol, sy
minfo->type, typemask);
               return(-1);
            }
         }
         syminfo = syminfo->next;
      }
   }

   if (debugsym)
      fprintf(stderr, "getsym: symbol '%s' not found\n", symbol);
   /* symbol not found! */
   return(-1);
}


/**************************************************************************/

/* FUNCTION */
/* int
/* cgetsymnum(symbol)
```

BEST AVAILABLE COPY

```
/* char *symbol;      /* Text to search for a symbol to match */
/*
/* /*
/*  *    This routine does the most general type matching
/*  *    and attempts to return the symbol number assocaited with
/*  *    the symbol
/*  *
/*  * RETURNS      -1 -> no such symbol
/*  *              else, symbol number
/*  *
/*  */
/* {
/*    int rscope;    /* don't care */
/*    SYMINFO *info; /* don't care */
/*
/*    return(cgetsym(symbol, &rscope, &info, ~0));
/* } */


/*************************************************************************/

/* FUNCTION */
boolean
csymistypedef(symbol, rsymnum)
char *symbol;          /* Text to see if it is a typedef */
int *rsymnum;          /* symbol number of this symbol */

/*
 *    This routine searches the symbol table from the current
 *    varscope down to see if the specified symbol is a typedef.
 *    If not, this returns a FALSE; else it returns a TRUE.
 *
 *    Also, if the symbol is in the symbol table, symnum is set
 *    to it's value; else it is set to -1.
 *
 */
{
   int rscope;    /* don't care */
   SYMINFO *info; /* Some information we need */

   *rsymnum = cgetsym(symbol, &rscope, &info, ~0);

   if (*rsymnum == -1)
      return(FALSE);    /* symbol does not exist, so cannot be typedef */

   if ((info->type & T_DEF) != 0)
      return(TRUE);
   else
      return(FALSE);
```

BEST AVAILABLE COPY

```
/***************************************************************************/


/* FUNCTION */
SYMINFO *
cgetinfo(number)
int number;         /* symbol number */

/*
 *    This routine returns the pointer to the symbol number requested.
 *    This returns NULL if the symnum is illegal
 *
 */
{
   if (number < 0)
      return(NULL);

   if (number < symnum)
      return(numtable[number]);
   return(NULL);
}



/***************************************************************************/


/* FUNCTION */
int
chash(string)
register char *string;      /* string to hash */

/*
 *    This will return a hash value mod HASHNUM for the
 *    given string.
 *
 */
{
   register int acc = 0;
   while (*string != '\0')
   {
      acc = (acc << 1) + *string++;
      acc %= HASHNUM;
   }
   return(acc);
}



/***************************************************************************/
```

BEST AVAILABLE COPY

```
/* FUNCTION */
/* NO RETURN VALUE */
cdumpsym(allscopes)
boolean allscopes;          /* if TRUE, dump from MAXSCOPES on down */

                            /* Otherwise, dump from current varscope */


/*
 *    This dumps the symbol table to stderr.
 *
 *    It used to dump in terms of scope and hash value.  However,
 *    for regression testing I changed this so it dumps in terms
 *    symbol numbers, which should be constant regardless of
 *    hash values (which change for path names when the directories
 *    change).
 *
 */
{
   int symscan;
   SYMINFO *syminfo;

   for (symscan = 0; (syminfo = cgetinfo(symscan)) != NULL; symscan++)
   {
      fprintf(stderr,"'%20s' : type 0x%x, num = %d\n",
            syminfo->symbol,
            syminfo->type, syminfo->symnum);
   }
}


/************************************************************************/


/* FUNCTION */
char *
csymstring(number)
int number;         /* symbol number to return the string of */

/*
 *    This routine returns the string that this symbol references.
 *
 */
{
   if (number < symnum)
      return(numtable[number]->symbol);
   return("Unknown symbol");
}


/************************************************************************/
```

BEST AVAILABLE COPY

```
/* FUNCTION */
int
pushscope()

/*
 *     When we are going "down" in scope (i.e., we just
 *     encountered a "{"), call this.  It will increment
 *     the scope value.
 *
 *     RETURN new scope value
 *
 */
{
   register int i;
   register SYMINFO **myscope;

   varscope++;

   if (varscope >= MAXSCOPES)
   {
      fprintf(stderr,"%s: exceeded maximum scoping (%d)\n", invokedname, MAXSCOPES);
      cleanup(1);
   }

   /* clear out the hash table stuff */
   myscope = &scopes[varscope][0];
   for (i = 0; i < HASHNUM; i++)
   {
      *myscope = NULL;
      myscope++;
   }

   if (debugsym)
      fprintf(stderr,"pushscope: varscope is now %d\n", varscope);

   return(varscope);
}



/****************************************************************************/


/* FUNCTION */
int
popscope()

/*
 *     When we pop up in scope (i.e., we encounter a "}"), call
 *     this.  It will
 *        decrement scope
```

BEST AVAILABLE COPY

```
 *        remove all symbols from the symbol table that were in that scope.
 *
 *     RETURN the new scope value
 *
 */
{
   int hvalue;     /* hash entry */
   register SYMINFO *next, *this;

   /* remove symbols in scopes[scope] */
   for (hvalue = 0; hvalue < HASHNUM; hvalue++)
   {
      this = scopes[varscope][hvalue];
      while (this != NULL)
      {
         next = this->next;
         if (this->symbol != NULL)
            free(this->symbol);
         free(this);
         this = next;
      }
   }

   /* decrement scope */
   varscope--;
   if (debugsym)
      fprintf(stderr,"popscope: varscope is now %d\n", varscope);

   return(varscope);
}
```

Feb 03 15:55 1988  pp/gram/tempvar.c Page 1

```
/*
 * FILE -   $Header: tempvar.c,v 1.3 87/08/17 16:25:10 hmgr Exp $
 *
 * AUTHOR       Bruce Erickson
 *
 * ONELINER administer temporary variables inserted into user's code
 *
 * TABSTOPS 3
 *
 * RCS      $Log: tempvar.c,v $
 * Revision 1.3  87/08/17  16:25:10  16:25:10  hmgr ()
 * Author: bae@hplsdlc.hp.com
 * depend on run-time selection of processor specifics instead of compile time
 *
 * Revision 1.2  87/07/10  10:28:23  10:28:23  hmgr ()
 * Author: bae@hplsdlc.hp.com
 * no comment
 *
 * Revision 1.2  87/06/01  12:09:44  12:09:44  bae (Bruce Erickson)
 * *** empty log message ***
```

BEST AVAILABLE COPY

```
 *
 * Revision 1.1  87/04/16  13:04:47  13:04:47  bae (Bruce Erickson)
 * Initial revision
 *
 *
 */
static char rcsid[] = "$Header: tempvar.c,v 1.3 87/08/17 16:25:10 hmgr Exp $";
#include <stdio.h>
#include <boolean.h>
#include "targetspec.h"

/* This structure is another 'infinite' stack.  It is used
   to create/handle temporary (boolean) values */

typedef struct tempvarinfo
{
   int number;        /* this one's number */
   struct tempvarinfo *next;
   struct tempvarinfo *prev;
} TEMPVARINFO;

/* GLOBALS */

/* STATICS */
static TEMPVARINFO *tempvarinfo = NULL;   /* start stack here */
static TEMPVARINFO *tempvarlast = NULL;   /* top of stack */
static int maxtempvar = 0;                /* highest tempvar number */

/* EXTERNALS */
extern char *malloc();

/* FORWARD */


/**************************************************************************/

/* FUNCTION */
char *
tempvarget(new)
boolean new;            /* if TRUE, create a new temporary variable,
                           putting it on the top of the stack.
                           Otherwise, return the one on the top of the
                           stack
                        */

/*
 *    This routine is called to return the string which
 *    represents a temporary variable.
 *
 */
{
   static char text[50];
```

BEST AVAILABLE COPY

```
static int lasttext = -1;            /* text currently has text for
                                        this number */
register TEMPVARINFO *tempvar;

if (new)
{
   /* Create a new variable!  This means that we
      need to push the stack.... Do we need to
      create a new stack entry, or is what we have OK?
   */
   if (((tempvarlast != NULL) && (tempvarlast->next != NULL)) ||
      ((tempvarlast == NULL) && (tempvarinfo != NULL)))
   {
      /* We have already malloc'd tempvar to this depth.
         All we have to do is to reset some information
      */
      if (tempvarlast != NULL)
         tempvar = tempvarlast = tempvarlast->next;
      else
         tempvar = tempvarlast = tempvarinfo;      /* start at top */
   }
   else
   {
      /* We will have to allocate space for this... */
      tempvar = (TEMPVARINFO *) malloc(sizeof(TEMPVARINFO));
      if (tempvarinfo == NULL)
      {
         /* Very first tempvar statement in this program! */
         tempvarinfo = tempvarlast = tempvar;
         tempvar->prev = NULL;
      }
      else
      {
         /* Not the first, but this is the first time at this depth */
         tempvar->prev = tempvarlast;
         tempvarlast->next = tempvar;
         tempvarlast = tempvar;
      }
      tempvar->next = NULL;
      tempvar->number = maxtempvar++;
   }
}
else
{
   tempvar = tempvarlast;
}

/* OK.  Is tempvar->number the last thing we formatted? */
if (lasttext != tempvar->number)
{
   /* Format the temporary variable */
   lasttext = tempvar->number;
```

BEST AVAILABLE COPY

```
        sprintf(text, "%s[%d]", bbatmpvar, lasttext);
    }

    return(text);
}


/**********************************************************************/

/* FUNCTION */
tempvartoss()

/*
 *     Toss out the previous temporary variable.
 *     That is, pop the tempvar stack.
 *
 */
{
    tempvarlast = tempvarlast->prev;
}


/**********************************************************************/

/* FUNCTION */
int
tempvarnumvars()

/*
 *     This returns the number of temporary variables used.
 *
 */
{
    return(maxtempvar);
}
```

Feb 03 15:46 1988  unload/bbaunload.c Page 1

```
/*     FILE  ($Header: bbaunload.c,v 1.4 87/11/05 11:33:52 hmgr Exp $)
 * AUTHOR   Minh D. Tu
 *
 * This file contains the routines for unloading the array
 * information from the target processor's memory to disk.
 *
 * ONELINER bbaunload
 * ROUTINES bbaunload bbatraverseedb bba_get_probe bba_todumpfile
 *
 * CONDCOMP DEBUG - for debugging
 *          TEST - for testing
 *
 * RCS $Log:    bbaunload.c,v $
 * Revision 1.4  87/11/05  11:33:52  11:33:52  hmgr ()
```

BEST AVAILABLE COPY

```
 * Author: mdt@hplsdlc.hp.com
 * The whole M68000 family in Pisces II is identified
 * with only one string "68000".
 *
 * Revision 1.3  87/10/20  10:25:00  10:25:00  hmgr ()
 * Author: mdt@hplsdlc.hp.com
 * Add the PII emulators.
 *
 * Revision 1.2  87/09/11  13:09:25  13:09:25  hmgr ()
 * Author: mdt@hplsdlc.hp.com
 * Check spec file with security string.
 *
 * Revision 1.1  87/09/04  14:26:32  14:26:32  hmgr ()
 * Initial revision
 *
 */

static char bbaunld_subid[]= "@(subid)libbaunld:                                    ";
#include <stdio.h>
#include <ctype.h>
#include <boolean.h>
#include <model.h>
#include <sys/types.h>
#include <sys/stat.h>
#include <edb.h>
#include <address.h>
#include "dumpfile.h"
#include "smithdate.h"
#include "emulator.h"
#include "targetspec.h"

/***********/
/* STATICS */
/***********/

static EDB edb;
static FILE *dumpfile;
static char defaultdump[] = "bbadump.data";
static u_int8 func_code;
static int emul_id; /* emulator id */
static char proc68020[] = "68020";
static char proc68000[] = "68000";
static int print_mode = PR_NOOPT; /* print mode */

/* The following variables correspond to fields inside of the probe structure */
static u_int32 protocol;
static unsigned char suffix;
static char modtime[10];
static u_int32 options;
static u_int32 numentries;
static LOGICALADDRESS array_addr;
```

BEST AVAILABLE COPY

```
static char probe_name[10]; /* name of probe structure */
static int  probename_length;
static u_int8 *probe_buf = NULL;  /* buffer for probe structure */
static int probesize = 0; /* size of probe structure in bytes */
static char *array_name = NULL; /* name of dump array */
static char *temp_name = NULL; /* name of temporary variable */
static char unld_msg[70]; /* error message for bbaunload */

/*************/
/* EXTERNALS */
/*************/

extern int intr_occurred; /* flag for signal */
extern boolean bbareadspec();
extern char *malloc(),*mchunkalloc(),*strpos(),*smithtostore();
extern long time();
#ifdef TEST
extern FILE *memfile; /* contains simulated processor's memory */
#endif

/************/
/* FORWARDS */
/************/

extern void bbatraverseedb();
extern boolean bba_get_probe(),bba_todumpfile();

/**************************************************************************/

/* FUNCTION */
void
bbaunload(processor,database, dumpfilename, fcode)
char *processor;
char *database;
register char *dumpfilename;
u_int8 fcode;

/* PARAMETERS
 * processor - processor name
 * database - name of EDB data base
 * dumpfilename - name of dump file (optional)
 * fcode - function code (processor dependent)
 *
 * This is the main routine for 'bbaunload'. It reads the processor's
 * memory and unloads the array info to the specified dump file.
 *
 * RETURNS NONE
 */

{
register EDBERROR edberror;
static boolean first time = TRUE; /* flag for first invocation */
EDBNAME root = (NULL);
EDBSYMBOL rootsymbol;
```

BEST AVAILABLE COPY

```
boolean has_idline = FALSE; /* TRUE if dump file has :id line */
struct stat statbuf;
long dumptime;
SMITHTIME sm_time;

#ifdef TEST
      /* Initialize globals */
      bbainsprotusedbytes = -1;
      bbainsmapsuffix = FALSE;
      bbainsmodtime = -1;
      bbainsoptions = -1;
      bbainsnumentries = -1;
      bbainsdataarray = -1;
      bbaunderscores = FALSE;
      bbaupsegmented = FALSE;
      bbaupaddrsize = 8;
      bbauphifirst = FALSE;
      bbauplofirst = FALSE;
      bbafreespec(); /* Always try to free when we come in */
      print_mode = PR_NOOPT;
#endif

   if (first_time != FALSE)
   {
      /* Read spec file */
#ifdef TEST
      if (bbareadspec(processor,FALSE,NULL) == FALSE)
#else
      if (bbareadspec(processor,FALSE,processor) == FALSE)
#endif
      {
         error_message("spec file is corrupt");
         return;
      }

      /* Check protocol level */
      if (bbainsertprotocol > MAXINSERTPROTOCOL)
      {
         sprintf(unld_msg,"insert protocol %d is newer than known protocol %d",
         bbainsertprotocol,MAXINSERTPROTOCOL);
         error_message(unld_msg);
#ifndef TEST
         bbafreespec(); /* this is freed at entry with -DTEST */
#endif
         return;
      }
      if (bbadumpprotocol > MAXDUMPPROTOCOL)
      {
         sprintf(unld_msg,"dump protocol %d is newer than known protocol %d",
         bbadumpprotocol,MAXDUMPPROTOCOL);
         error_message(unld_msg);
#ifndef TEST
```

BEST AVAILABLE COPY

```
        bbafreespec(); /* this is freed at entry with -DTEST */
#endif
        return;
    }

    /* Set emulator id */
    if (strpos(processor,proc68020) != NULL)
    {
        emul_id = M68020;
    }
    if (strpos(processor,proc68000) != NULL)
    {
        emul_id = M68000;
    }

#ifdef TEST
    /* Skip comment in memfile */
    fgets(unld_msg,65,memfile);

    if (probe_buf) /* not the 1st time */
    {
        fgets(unld_msg,65,memfile);
        free(probe_buf);
        free(array_name);
        free(temp_name);
    }
#endif

    /* Set up probe name and array name to search for in symbol data base */
    probe_name[0] = '\0';
    array_name = malloc(strlen(bbaarrayname)+2);
    array_name[0] = '\0';
    temp_name = malloc(strlen(bbatmpvar)+2);
    temp_name[0] = '\0';
    if (bbaunderscores != FALSE)
    {
        probe_name[0] = '_';
        probe_name[1] = '\0';
        array_name[0] = '_';
        array_name[1] = '\0';
        temp_name[0] = '_';
        temp_name[1] = '\0';
    }
    strcat(probe_name,"_bA_");
    probename_length = strlen(probe_name);
    strcat(array_name,bbaarrayname);
    strcat(temp_name,bbatmpvar);

    /* Allocate buffer for probe structure */
    probesize = bbainsprotusedbytes;
    if (bbainsmapsuffix != FALSE)
    {
```

BEST AVAILABLE COPY

```
        }
        if (bbainsmodtime > 0)
        {
           probesize += bbainsmodusedbytes;
        }
        if (bbainsoptions > 0)
        {
           probesize += bbainsoptusedbytes;
        }
        if (bbainsnumentries > 0)
        {
           probesize += bbainsnumusedbytes;
        }
        if (bbainsdataarray > 0)
        {
           probesize += bbainsdatausedbytes;
        }
        probe_buf = (u_int8 *)malloc(probesize);

        /* Determine the print mode */
        if ((bbainsmodtime > 0) && (bbainsmapsuffix != FALSE))
        {
           print_mode = PR_ALL;
        }
        else if (bbainsmodtime > 0)
        {
           print_mode = PR_TIME;
        }
        else if (bbainsmapsuffix != FALSE)
        {
           print_mode = PR_SUFFIX;
        }

#ifndef TEST
        first_time = FALSE;
#endif
    }

    /* Open symbol data base */
    edberror = edbopen(database, &edb);
    if (edberror != EDBNOERROR)
    {
        pathtrunc(unld_msg,database,MSGSIZE - 16);
        sprintf(unld_msg,"%s can't be opened",unld_msg);
        error_message(unld_msg);
#ifdef DEBUG
        fprintf(stderr,"Can't open %s (%s)\n", database, edberrortostring(edberror));
#endif
        edbfreeerror(edberror);
        return;
    }
```

BEST AVAILABLE COPY

```
    edberror = edbnametosymbol(edb, root, &rootsymbol);
    if (edberror != EDBNOERROR)
    {
        error_message("No root symbol");
#ifdef DEBUG
        fprintf(stderr,"Can't access the root symbol (%s)\n", edberrortostring(edberror));
#endif
        edbfreeerror(edberror);
        return;
    }

    /* Open dump file */
    if (dumpfilename == NULL)
    {
        dumpfilename = defaultdump;
    }
    if ((dumpfile = fopen(dumpfilename,"a")) == NULL)
    {
        pathtrunc(unld_msg,dumpfilename,MSGSIZE - 18);
        sprintf(unld_msg,"%s can't be appended",unld_msg);
        error_message(unld_msg);
#ifdef DEBUG
        fprintf(stderr,"Can't append to %s\n",dumpfilename);
#endif
        return;
    }

    /* Check the format of the output file */
    has_idline = fileid(dumpfilename, FALSE, "r", DUMPID, NULL, NULL);
    fstat(fileno(dumpfile),&statbuf);
    if ((has_idline == FALSE) && (statbuf.st_size != 0))
    {
        error_message("Incorrectly formatted dump file");
#ifdef DEBUG
        fprintf(stderr,"%s is incorrectly formatted\n", dumpfilename);
#endif
    }

    /* Processor dependent parameters */
    func_code = fcode;

    /* Output the header */
    if (has_idline == FALSE)
    {
        fprintf(dumpfile,":id %s\n",DUMPID);
    }
    time(&dumptime);
    smithfromunix(&dumptime,&sm_time);
    fprintf(dumpfile,":dump %d :dumptime %s\n",
    MAXDUMPPROTOCOL, smithtostore(&sm_time));

    /* Traverse the symbol data base & output for each dump array encountered */
```

BEST AVAILABLE COPY

```
    bbatraverseedb(rootsymbol, 0);

    /* Clean up when we are done */
    fclose(dumpfile);
}

/***************************************************************************/

/* FUNCTION */
void
bbatraverseedb(parent, level)
EDBSYMBOL parent;
int level;

/* PARAMETERS
 * parent - parent symbol
 * level  - level from the root  symbol
 *
 * This routine traverses the whole EDB tree recursively. It only
 * descends two levels from the root symbol. The first level is the
 * level of file symbols and the second contains global symbols in
 * the file. This is enough since we look for 'struct _bA_probe_struct
 * _bA_' and '_bA_array' in each file. When we find them, we read each
 * probe structure to find other relevant information (sourcemodtime,
 * options,etc.) then we read the bA_array[] and dump the info out
 * for 'bbareport'.
 *
 * RETURNS NONE
 *
 * SIDEEFFECTS
 */
{
register int n;
register EDBERROR edberror;
register boolean probefound,arrayfound;
register int errorcode;
EDBSYMBOL child;
EDBNAME name;
LOGICALADDRESS address;
u_int32 range;
int type;

    for (n = 0; /* exit other way */; n++)
    {
#ifndef TEST
        /* Abort on signal */
        if (intr_occurred)
        {
            return;
        }
#endif

        edberror = edbsymboltochild(edb, parent, n, &child);
```

BEST AVAILABLE COPY

```
        if (edberror != EDBNOERROR)
        {
           errorcode = edberrortocode(edberror);
           if ((errorcode != EDBNOTFOUND) && (errorcode != EDBBADQUERY))
           {
              error_message("Can't search the symbol database");
#ifdef DEBUG
              fprintf(stderr,"Can't search the symbol database (%s)\n",
              edberrortostring(edberror));
#endif
           }
           edbfreeerror(edberror);
           return;
        }


        if (level == 0) /* Go down to the level of symbols in a file */
        {
           bbatraverseedb(child, 1);
        }
        else /* At the level of symbols in a file */
        {
           if (n == 0) /* first time at this level */
           {
              probefound = FALSE;
              arrayfound = FALSE;
           }

           edberror = edbsymboltoname(edb, child, &name);

           if (edberror != EDBNOERROR)
           {
              error_message("Can't look up symbol");
#ifdef DEBUG
              fprintf(stderr,"Can't look up name of symbol (%s)\n",
                 edberrortostring(edberror));
#endif
              edbfreeerror(edberror);
              continue; /* try another symbol */
           }

           edbsymboltotype(edb, child, &type);
           if (type == EDBSYMBOLSTATIC)
           {
              if (probefound == FALSE)
              {
              /* Look for probe structure: the name begins with _bA_ */
              /* but it is neither _bA_array nor _bA_temp_ */
                 if ((strncmp(probe_name,name[1],probename_length) == 0) &&
                    (strcmp(array_name,name[1]) != 0) &&
                    (strcmp(temp_name,name[1]) != 0))
                 {
                    edberror = edbsymboltorange(edb, child, &address, &range);
```

BEST AVAILABLE COPY

```
                    if (edberror != EDBNOERROR)
                    {
#ifdef DEBUG
                       fprintf(stderr,"%s has no address (%s)\n", name[1],
                       edberrortostring(edberror));
#endif
                       edbfreeerror(edberror);
                       return;
                    }
#ifdef DEBUG
                    fprintf(stderr,"get probe %s %x\n",name[1],address);
#endif
                    probefound = bba_get_probe(address,name[0]);
                 }
              }
              if (arrayfound == FALSE)
              {
              /* Look for dump array */
                 if (strcmp(array_name,name[1]) == 0)
                 {
                    edberror = edbsymboltorange(edb, child, &array_addr, &range);
                    if (edberror != EDBNOERROR)
                    {
#ifdef DEBUG
                       fprintf(stderr,"%s has no address (%s)\n", name[1],
                       edberrortostring(edberror));
#endif
                       edbfreeerror(edberror);
                       return;
                    }
                    arrayfound = TRUE;
                 }
              }

              if (probefound && arrayfound)
              {
                 bba_todumpfile(name[0]);
                 return;
              }
           }
        }
     }
}

/**************************************************************************/

/* FUNCTION */
boolean
bba_get_probe(address,file)
LOGICALADDRESS address;
char *file;
```

BEST AVAILABLE COPY

```
/* PARAMETERS
 * address - address of probe structure
 * file - file where the probe structure is defined
 *
 * This routine reads the probe structure from the emulator memory
 * and sets up all values for the :file line.
 *
 * RETURNS TRUE if successful, FALSE if not
 *
 * SIDEEFFECTS The following variables are set:
 * static u_int32 protocol
 * static unsigned char suffix
 * static char modtime[10]
 * static u_int32 options
 * static u_int32 numentries
 */
{
register u_int8 *probe_ptr;
register int i;
register int temp = 0;
register int offset;
boolean  protect;

   switch(emul_id)
   {
      case M68020:
      protect = TRUE;
      temp = readmemory(address, func_code, probesize, probe_buf,
      LOGICAL68020, &protect);
      break;
      case M68000:
      temp = readmemory(address, probesize, probe_buf, maplist[func_code], 1);
      break;
   }

   if (temp < probesize) /* Fail to read memory */
      return(FALSE);

#ifdef DEBUG
   fprintf(stderr,"%s\n",file);
   for (i = 0,probe_ptr = probe_buf;i < probesize;i++,probe_ptr++)
      fprintf(stderr," %x",*probe_ptr);
   fprintf(stderr,"\n");
#endif

   /* Get protocol */
   if (bbauphifirst)
   {
      probe_ptr = probe_buf + bbainsprotlength - 1;
      for (i = 0,temp = 0,protocol = 0;i < bbainsprotlength;i++,probe_ptr--)
      {
         protocol |= *probe_ptr << temp;
         temp += 8;
```

BEST AVAILABLE COPY

```
            }
        }
        if (bbauplofirst)
        {
            probe_ptr = probe_buf;
            for (i = 0,temp = 0,protocol = 0;i < bbainsprotlength;i++,probe_ptr++)
            {
                protocol |= *probe_ptr << temp;
                temp += 8;
            }
        }
        if ((protocol < INIT_INSERT_PROTO) || (protocol > MAXINSERTPROTOCOL))
            return (FALSE);

        /* Get map suffix */
        if (bbainsmapsuffix != FALSE)
        {
            suffix = probe_buf[bbainsprotusedbytes];
            if (!isgraph(suffix))
            {
                return(FALSE);
            }
            offset = bbainsprotusedbytes + bbainsmapsufusedbytes;
        }
        else
        {
            offset = bbainsprotusedbytes;
        }

        /* Get source modification time */
        if (bbainsmodtime > 0)
        {
            probe_ptr = probe_buf + offset;
            for (i = 0;i < bbainsmodtime;probe_ptr++,i++)
            {
                temp = *probe_ptr;
                if ((temp < 0x40) || (temp > 0x7f))
                {
                    return(FALSE); /* incorrect string */
                }
                modtime[i] = temp;
            }
            offset += bbainsmodusedbytes;
        }

        /* Get options */
        if (bbainsoptions > 0)
        {
            options = 0;
            temp = 0;
            probe_ptr = probe_buf + offset;
            for (i = 0;i < bbainsoptions;i++,probe_ptr++)
```

BEST AVAILABLE COPY

```
        {
            options |= *probe_ptr << temp;
            temp += 8;
        }
        if (options > MAX_OPTIONS)
        {
            return(FALSE);
        }
        offset += bbainsoptusedbytes;
    }

    /* Get numentries */
    if (bbainsnumentries > 0)
    {
        if (bbauphifirst)
        {
            probe_ptr = probe_buf + offset + bbainsnumentries - 1;
            numentries = 0;
            for (i = 0,temp = 0;i < bbainsnumentries;i++,probe_ptr--)
            {
                numentries |= *probe_ptr << temp;
                temp += 8;
            }
        }
        if (bbauplofirst)
        {
            probe_ptr = probe_buf + offset;
            numentries = 0;
            for (i = 0,temp = 0;i < bbainsnumentries;i++,probe_ptr++)
            {
                numentries |= *probe_ptr << temp;
                temp += 8;
            }
        }
    }
    else
    {
        return(FALSE);
    }

    return(TRUE);
}

/*****************************************************************************/

/* FUNCTION */
boolean
bba_todumpfile(file)
char *file;

/* PARAMETERS
 * file - file where the _bA_array is defined
```

BEST AVAILABLE COPY

```
 *
 * This routine reads the dump array and prints the :file and
 * :array lines to the dump file.
 *
 * RETURNS TRUE if successful, FALSE if not
 */
{
register int count;
register u_int8 *buf;
boolean  protect;

   buf = (u_int8 *)mchunkalloc(numentries);
   /* Read memory */
   switch(emul_id)
   {
      case M68020:
      protect = TRUE;
#ifdef DEBUG
      fprintf(stderr,"get array %x code %d size %d\n",array_addr,func_code,numentries);
#endif
      count = readmemory(array_addr, func_code, numentries, buf,
      LOGICAL68020, &protect);
      break;
      case M68000:
#ifdef DEBUG
      fprintf(stderr,"get array %x maplist %d size %d\n",array_addr,func_code,numentries);
#endif
      count = readmemory(array_addr, numentries, buf, maplist[func_code], 1);
      break;
   }

   if (count < numentries) /* Fail to read memory */
      return(FALSE);

#ifdef DEBUG
   for (count = 0;count < numentries;count++)
   {
      fprintf(stderr," %d",buf[count]);
   }
   fprintf(stderr,"\n");
#endif

   /* Print the :file line */
   switch(print_mode)
   {
      case PR_ALL:
      if (suffix != '@')
      {
         fprintf(dumpfile,":file %d %d 0%x %s :modtime %s :mapsuffix @%c@\n",
         protocol, numentries, options, file, modtime, suffix);
      }
      else
```

BEST AVAILABLE COPY

```
        {
            fprintf(dumpfile,":file %d %d 0%x %s :modtime %s :mapsuffix @@@@\n",
            protocol, numentries, options, file, mpdtime);
        }
        break;
        case PR_TIME:
        fprintf(dumpfile,":file %d %d 0%x %s :modtime %s\n",
        protocol, numentries, options, file, modtime);
        break;
        case PR_SUFFIX:
        if (suffix != '@')
        {
            fprintf(dumpfile,":file %d %d 0%x %s :mapsuffix @%c@\n",
            protocol, numentries, options, file, suffix);
        }
        else
        {
            fprintf(dumpfile,":file %d %d 0%x %s :mapsuffix @@@@\n",
            protocol, numentries, options, file);
        }
        break;
        default:
        fprintf(dumpfile,":file %d %d 0%x %s\n",
        protocol, numentries, options, file);
    }

    /* Print the :array line */
    bba_prarray(dumpfile, numentries, buf);
    mchunkfree(buf);
    return(TRUE);
}

/****************************************************************************/

/* FUNCTION */
char *
bbap2emul(p2_pod_id)
u_int32 p2_pod_id;

/* PARAMETERS
 * p2_pod_id - pod id of a Pisces II emulator
 *
 * This routine returns the name of the Pisces II emulator based on its
 * pod id.
 *
 * RETURNS name of Pisces II emulator
 */
{

    switch(p2_pod_id)
    {
    case PII_68010:
```

BEST AVAILABLE COPY

```
      case PII_o68010:
      case PII_68000:
      case PII_o68000:
      case PII_68008:
         return (proc68000);
      default:
         return (NULL);
   }
}

#ifdef TEST

/*****************************************************************************/

/* FUNCTION */
int
readmemory(addr)
LOGICALADDRESS addr;

/* PARAMETERS
 *
 * This routine simulates the processor memory read routine. It
 * actually reads from a file to get the necessary data.
 *
 * RETURNS size of buffer read to simulate SUCCESS, 0 to simulate FAILURE.
 */
{
register u_int8 *buf; /* buffer to read data into */
register int size = 0; /* size of above buffer */
register u_int8 *ptr; /* pointer to travel stack frame */
register int i;
int filedata;
int count;

   switch(emul_id)
   {
      case M68020:
      /* logical address is the 1st argument */
      ptr = (u_int8 *)&addr;
      /* skip over logical address and function code */
      ptr += 8;
      /* set the buffer size */
      size = *(int *)ptr;
      /* skip over the buffer size */
      ptr += 4;
      /* set the buffer address */
      buf = *(u_int8 **)ptr;
      break;
      case M68000:
      /* logical address is the 1st argument */
      ptr = (u_int8 *)&addr;
      /* skip over logical address */
```

```
        ptr += 4;
        /* set the buffer size */
        size = *(u_int32 *)ptr;
        /* skip over the buffer size */
        ptr += 4;
        /* set the buffer address */
        buf = *(u_int8 **)ptr;
        break;
    }

    for (i= 0;i < size;i++)
    {
        count = fscanf(memfile,"%x",&filedata);
        buf[i] = (u_int8)filedata;
    }

    if (count != EOF)
        return (size);
    else
        return (0);
}
#endif
/*     FILE  ($Header: bbakey.c,v 1.5 87/11/05 11:46:03 hmgr Exp $)
 * AUTHOR    Minh D. Tu
 *
 * Initialize the 'bbaunload' capability
 *
 * ONELINER turn on 'bbaunload'
 * ROUTINES bba_key
 *
 * CONDCOMP TEST - for testing
 *
 * RCS $Log:    bbakey.c,v $
 * Revision 1.5  87/11/05  11:46:03  11:46:03  hmgr ()
 * Author: mdt@hplsdlc.hp.com
 * We use the 68000.spec for all Pisces II emulators in
 * the M68000 family.
 *
 * Revision 1.4  87/10/20  10:24:33  10:24:33  hmgr ()
 * Author: mdt@hplsdlc.hp.com
 * Test the recognition of PII emulators.
 *
 * Revision 1.3  87/09/24  15:51:45  15:51:45  hmgr ()
 * Author: mdt@hplsdlc.hp.com
 * Delete the printf of the test directory.
 *
 * Revision 1.2  87/09/24  14:06:34  14:06:34  hmgr ()
 * Author: mdt@hplsdlc.hp.com
 * Use the TESTHOME variable to form file names.
 *
 * Revision 1.1  87/09/04  14:29:25  14:29:25  hmgr ()
 * Initial revision
```

BEST AVAILABLE COPY

BEST AVAILABLE COPY

```
 *
 */

#include <stdio.h>
#include <fcntl.h>
#include <boolean.h>
#include <model.h>
#include <track.h>
#include "emulator.h"

/**************/
/* EXTERNALS */
/**************/
extern char *fhpname();

/*************************************************************************/

/* FUNCTION */
void
bba_key(processor, keyindex)
char *processor;
int keyindex;

/* PARAMETERS
 * processor - processor name
 * keyindex - index of softkey BBAUNLOAD
 *
 * This routine checks for the existence of spec file and turns on
 * the softkey 'bbaunload' if it is present.
 *
 * RETURNS NONE
 */

{
int fd;
char *path;     /* path of file name */
char localpath[50];

   /* Look for spec file */
   if (*processor != '/')
   {
      /* User did not pass an absolute file name */
      sprintf(localpath, "lib/%s/bbacpp.spec", processor);
      path = fhpname(localpath, NULL);
      fd = open(path, O_RDONLY);
      free(path);
   }
   else
   {
      /* User passed an absolute file name (testing?) */
      fd = open(processor, O_RDONLY);
   }
```

BEST AVAILABLE COPY

```
    if (fd != -1) /* Success */
    {
#ifndef TEST
        TURNONPERMANENT(keyindex);
#endif
        close(fd);
    }

}

#ifdef TEST

FILE *memfile = NULL; /* contains simulated target processor's memory */
MEMMAP maplist[1]; /* dummy Pisces II memory map */

/*************************************************************************/

/* FUNCTION */
main(argc,argv)
int argc;
char *argv[];

/* PARAMETERS
 * argc - argument count
 * argv - argument list
 *
 * This is the test driver for bbaunload().
 *
 * RETURNS NONE
 */
{
char testdir[80];
char specfile[100];

    if (argc < 3)
    {
        error message("Usage: unldtest absolute_file dumpfile\n");
        exit(1);
    }

    if ((memfile = fopen("memory","r")) == NULL)
    {
        error message("Can't open memory file");
        exit(2);
    }

    /* Get test directory */
    strcpy(testdir,getenv("TESTHOME"));
    strcat(testdir,"/s300/host/unload/");

    /* spec with relative path */
```

BEST AVAILABLE COPY

```
    bba_key("xyzzy",0);

    /* spec without underscores */
    strcpy(specfile,testdir);
    strcat(specfile,"no_");
    bbaunload(specfile,argv[1],NULL,0);

    /* Corrupt spec */
    strcpy(specfile,testdir);
    strcat(specfile,"corruptspec");
    bbaunload(specfile,argv[1],argv[2],0);

    /* Unknown insert protocol */
    strcpy(specfile,testdir);
    strcat(specfile,"biginsert");
    bbaunload(specfile,argv[1],argv[2],0);

    /* Unknown dump protocol */
    strcpy(specfile,testdir);
    strcat(specfile,"bigdump");
    bbaunload(specfile,argv[1],argv[2],0);

    /* Test with host spec */
    strcpy(specfile,testdir);
    strcat(specfile,"68020host");
    bba_key(specfile,0);
    bbaunload(specfile,argv[1],argv[2],0);

    /* Test with 68020 spec */
    strcpy(specfile,testdir);
    strcat(specfile,"68020spec");
    bba_key(specfile,0);
    bbaunload(specfile,argv[1],argv[2],0);

    /* Test with no modtime and no map suffix */
    strcpy(specfile,testdir);
    strcat(specfile,"68000noopt");
    bbaunload(specfile,argv[1],argv[2],0);

    /* Test with no modtime */
    strcpy(specfile,testdir);
    strcat(specfile,"68000nomod");
    bbaunload(specfile,argv[1],argv[2],0);

    /* Test with no map suffix */
    strcpy(specfile,testdir);
    strcat(specfile,"68000nosuf");
    bbaunload(specfile,argv[1],argv[2],0);
}

/**********************************************************************/
```

BEST AVAILABLE COPY

```
/* FUNCTION */
error_message(message)
char *message;

/* PARAMETERS
 * message - The message to be printed
 *
 * This routine prints the error message to stderr instead of the
 * status line during testing.
 *
 * RETURNS NONE
 */
{
   fprintf(stderr,"%s\n",message);
}
#endif

/*
 * FILE      $Header: prarray.c,v 1.1 87/09/04 14:31:37 hmgr Exp $
 *
 * AUTFOR    Bruce Erickson
 *         Minh Tu
 *
 *     This is the same as prarray.c in /hp/bba/src/report execpt
 *     that the buffer passed is of type u_int8 for bbaunload().
 * ONELINER print output array - version for bbaunload (u_int8 type)
 *
 * TABSTOPS 3
 *
 * INSPECTED   date      - inspectors
 *
 * RCS       $Log: prarray.c,v $
 * Revision 1.1  87/09/04  14:31:37  14:31:37  hmgr ()
 * Initial revision
 *
 */

#include <stdio.h>
#include <model.h>

/* Number of columns printed out (max) */
#define NUMCOLS   72

/* GLOBALS */

/* STATICS */

/* EXTERNALS */

/* FORWARD */
```

BEST AVAILABLE COPY

```
/*************************************************************************/

/* FUNCTION */
bba prarray(fp, numentries, arrayptr)
FILE *fp;           /* output goes to here */
register int numentries;   /* number of entries in the array */
register u_int8 *arrayptr; /* array to print */

/*
 *     This will print out the array as defined in PROTOCOL.
 *     Note that the number of columns printed is 'NUMCOLS'
 *     (defined above).
 *
 */
{
    register int numinline;        /* number of characters in this line */
    register int cmask;            /* mask to or-in with c */
    register unsigned char c;      /* accumulate a character here */

    numinline = 0;
    while(numentries > 0)
    {
        /* At top of this loop, we just printed 'c', or
           are just starting... */

        c = 0x40;
        cmask = 0x20;
        do
        {
            if (*arrayptr++ != 0)
                c |= cmask;
        }
        while ((--numentries != 0) && ((cmask = cmask >> 1) != 0));

        /* Either ran out of entries or 'c' is full.  In either case,
           print out 'c', perhaps followed by a \n */
        if (numinline == 0)
            fputs(":array ", fp);

        fputc(c, fp);

        if (++numinline > (NUMCOLS - 1))
        {
            fputc('\n', fp);
            numinline = 0;
        }
    }

    /* Ran out of entries.  If numinline is not zero, print a new-line */
    if (numinline != 0)
        fputc('\n', fp);
}
```

BEST AVAILABLE COPY

```
/*
 * FILE      $Header: emulator.h,v 1.3 87/11/05 11:35:46 hmgr Exp $
 *
 * AUTHOR        Minh Tu
 *
 * ONELINER definitions of emulator specific information
 *
 * TABSTOPS 4
 *
 * EXCEPTIONS  description
 *
 * INSPECTED   date     - inspectors
 *
 * RCS       $Log: emulator.h,v $
 * Revision 1.3  87/11/05  11:35:46  11:35:46  hmgr ()
 * Author: mdt@hplsdlc.hp.com
 * One emulator id is sufficient for the M68000 family in
 * Pisces II.
 *
 * Revision 1.2  87/10/20  10:25:24  10:25:24  hmgr ()
 * Author: mdt@hplsdlc.hp.com
 * Add the PII emulators.
 *
 * Revision 1.1  87/09/04  14:32:35  14:32:35  hmgr ()
 * Initial revision
 *
 */

#define INIT_INSERT_PROTO  6 /* Initial insert protocol */

/* Emulator id */

#define M68020 1
#define M68000 2

/* size of message on status line */
#define MSGSIZE 62

#define MAX_OPTIONS  0x3FFFF /* Largest value for option flag */

/* Print mode */
#define PR_NOOPT  0 /* no optional fields */
#define PR_ALL    1 /* print everything */
#define PR_TIME      2 /* print smithtime  */
#define PR_SUFFIX 3 /* print suffix */

/* Motorola 68020 definitions */

#define LOGICAL68020 0

/* Pisces II definitions */
```

BEST AVAILABLE COPY

```
typedef struct mapentry *MAPENTRY;
typedef struct memmap *MEMMAP;

struct mapentry      /* map entry of Pisces II */
{
    u_int32  startaddr;
    u_int32  endaddr;
    u_int32  startblk;
    u_int32  memtype;
    MAPENTRY link;
};

struct memmap      /* memory map for Pisces II */
{
    int      (*maploadfunc)();
    u_int32  attrib;
    u_int32  addr_bits;
    u_int32  addr_mask;
    u_int32  sig_addr_bits;
    u_int32  sig_addr_mask;
    u_int32  emulblksize;
    u_int32  emulrdblksize;
    u_int32  emulwrblksize;
    u_int32  userblksize;
    u_int32  (*reademulmem)();
    u_int32  (*readusermem)();
    u_int32  (*writeemulmem)();
    u_int32  (*writeusermem)();
    char     *titletext;
    MAPENTRY link;
};
extern MEMMAP maplist[];

/* Pisces II emulator pod ids */

#define PII_68010 0x0034
#define PII_68000 0x0035
#define PII_68008 0x0036
#define PII_o68000   0x00F2
#define PII_o68010   0x00FA

/*
 * FILE      $Header: darray.c,v 1.6 87/12/11 14:27:02 hmgr Exp $
 *
 * AUTHOR       Bruce Erickson
 *
 * ONELINER Manipulate the DR_DARRAY array
 *
 *     The DR_ANAL structure references a DR_DARRAY pointer.
 *     This pointer is actually a pointer to the first entry
 *     of an array of DR_DARRAY structures which has
 *     (INC_DUMPARRAY +1) entries.  The first INC_DUMPARRAY
 *     entries are pointers to DR_DUMP structures; the last
```

BEST AVAILABLE COPY

```
 *     is either NULL or a pointer to another array.
 *
 *     Note that this combines the flixibility of a linked list with
 *     the space-efficiency of arrays.
 *
 *     This file supports:
 *        adding a DR_DUMP pointer to the array
 *        getting the 'ith' DR_DUMP pointer
 *        deleting a DR_ARRAY structure (and any linked ones)
 *        comparing two DR_ARRAY structures.
 *
 * TABSTOPS 3
 *
 * INSPECTED   date     - inspectors
 *
 * RCS      $Log: darray.c,v $
 * Revision 1.6  87/12/11  14:27:02  14:27:02  hmgr ()
 * Author: bae@hplsdlc.hp.com
 * force last entry in darray to NULL
 *
 * Revision 1.5  87/11/03  08:44:38  08:44:38  hmgr ()
 * Author: bae@hplsdlc.hp.com
 * updated to pragmas
 *
 * Revision 1.4  87/10/02  12:17:53  12:17:53  hmgr ()
 * Author: bae@hplsdlc.hp.com
 * checkpoint before moving onward
 *
 * Revision 1.3  87/07/09  15:04:34  15:04:34  bae (Bruce Erickson)
 * modified call to darraysadd; fixed method of scanning thru root pointer
 * int darraysadd...
 *
 * Revision 1.2  87/07/02  09:12:45  09:12:45  bae (Bruce Erickson)
 * added darraysame() [a routine for comparing two DR_ARRAY structures,
 * used in merging], and darraysadd()...
 *
 * Revision 1.1  87/06/15  13:57:57  13:57:57  bae (Bruce Erickson)
 * Initial revision
 *
 *
 */
static char rcsid[] = "$Header: darray.c,v 1.6 87/12/11 14:27:02 hmgr Exp $";
#include <stdio.h>
#include <boolean.h>
#include <model.h>
#include "smithdate.h"
#include "probe.h"
#include "report.h"

/* This is the number of DR_DUMP pointers we will store in one
   block.  Note that this should be a power of 2! */
#define INC_DUMPARRAY   32
/* GLOBALS */
```

BEST AVAILABLE COPY

```

/* STATICS */

/* EXTERNALS */
extern char *malloc();
extern void free();

/* FORWARD */
extern void darrayadd();
extern DR_DUMP *darrayget();

/*************************************************************************/

/* FUNCTION */
void
darraysadd(rnumdumps, rdarrayptr, root, numinroot)
int *rnumdumps;          /* number of entries already in the darray.  We
                            will increment this */
DR_DARRAY **rdarrayptr; /* pointer to first array - we will set this
                            if *rnumdumps is zero */
DR_DARRAY *root;         /* root of dump pointers to add to array */
int numinroot;           /* number of entries in the root array */


/*
 *     This routien is used to add (perhaps multiple) DR_DUMP records
 *     to a DR_DARRAY structure.  If rdarrayptr is zero, we will allocate
 *     the initial block and return it's address....
 *
 */
{
   DR_DUMP *dumpptr;
   int dumpscan;

   for (dumpscan = 0; dumpscan < numinroot; dumpscan++)
   {
      dumpptr = darrayget(root, dumpscan);
      darrayadd(rnumdumps, rdarrayptr, dumpptr);
   }
}


/*************************************************************************/

/* FUNCTION */
void
darrayadd(rnumdumps, rdarrayptr, dumpptr)
int *rnumdumps;          /* number of entries already in the darray.  We
                            will increment this */
DR DARRAY **rdarrayptr; /* pointer to first array - we will set this
                            if *rnumdumps is zero */
DR DUMP *dumpptr;        /* dump pointer to add to array */
```

```
/*
 *     This routine is called to add to the DR_DARRAY "array" the pointer
 *     'dumpptr'.  If *rnumdumps is zero, we will allocate the initial
 *     array and return it's address.  Otherwise, we will traverse to
 *     the point where we ought to add the pointer, and add it.  Note htat
 *     this may mean that we in fact allocate a new array and add a pointer
 *     to it in the last allocated array....
 *
 */
{
    register DR_DARRAY *darray;        /* Pointer as we traverse */
    register int numblocks;            /* number of arrays we need to traverse */
    register int addnum;               /* This is the number we want to add */
    int entry;                         /* which entry we add to */

    addnum = *rnumdumps;
    if (addnum == 0)
    {
        /* First one - need to allocate initial block */
        darray = *rdarrayptr = (DR_DARRAY *) malloc(sizeof(DR_DARRAY) * (INC_DUMPARRAY + 1));
        darray->next = NULL;     /* flag that this is the last block */
    }
    else
    {
        /* Figure out which array this next one will be in */
        numblocks = addnum / INC_DUMPARRAY;

        /* Traverse the arrays until we find the right array */
        darray = *rdarrayptr;        /* get address of first block */
        for (/* no init */; numblocks > 0; numblocks--)
        {
            if (darray->next == NULL)
            {
                /* Need to allocate another block....  Note that we have
                   a BAD logical error when we hit this code and we
                   are not accessing entry 0! */
                if ((numblocks != 1) || ((addnum % INC_DUMPARRAY) != 0))
                {
#pragma         BBA_ALERT BBA_IGNORE /* should never get here, but.... */
                    fprintf(stderr, "darrayadd: logical error!\n");
                }
                /* Allocate a block! */
                darray->next = (DR_DARRAY *) malloc(sizeof(DR_DARRAY) *
                    (INC_DUMPARRAY + 1));
                darray = darray->next;
                darray->next = NULL;     /* flag that this is the last block */
            }
            else
            {
                darray = darray->next;
            }
```

BEST AVAILABLE COPY

BEST AVAILABLE COPY

```
        }
    }

    /* At this point, darray points to the array which has the
       entry in interest in it */

    darray[entry = ((addnum % INC_DUMPARRAY) + 1)].data = dumpptr;
    if (++entry < INC_DUMPARRAY+1)
       darray[entry].data = NULL;     /* force next guy to be NULL */

    *rnumdumps = addnum + 1;
}


/***********************************************************************/

/* FUNCTION */
DR_DUMP *
darrayget(root, entrynum)
DR_DARRAY *root;                /* first DR_DARRAY block */
int entrynum;                   /* which one we want */

/*
 *     This returns a pointer to the entrynum'th DR_DUMP
 *     pointer in the DR_DARRAY block.  This returns NULL
 *     if entrynum is too large...
 *
 */
{
    register int block;         /* which block we want */
    register DR_DARRAY *dptr;

    dptr = root;
    /* Scan thru until we find the block of interest */
    for (block = entrynum / INC_DUMPARRAY; block > 0; block--)
    {
       if (dptr->next == NULL)
       {
#pragma  BBA_ALERT /* out of range */
          return(NULL);
       }

       dptr = dptr->next;       /* go to next block */
    }

    return(dptr[(entrynum % INC_DUMPARRAY) + 1].data);
}


/***********************************************************************/

/* FUNCTION */
```

BEST AVAILABLE COPY

```
void
darrayfree(root)
DR_DARRAY *root;      /* The first drarray block */

/*
 *    This frees up the blocks pointed to by this
 *    pointer..
 *
 */
{
   register DR_DARRAY *dptr1;
   register DR_DARRAY *dptr2;

   dptr1 = root;
   while (dptr1 != NULL)
   {
      dptr2 = dptr1->next;     /* Get next one */
      free(dptr1);
      dptr1 = dptr2;
   }
}


/**************************************************************************/

/* FUNCTION */
boolean
darraysame(root1, root2)
DR_DARRAY *root1, *root2;

/*
 *    This routine compares all entries in the two roots.
 *    If they are identical (in order as well as in content),
 *    this returns TRUE; else this returns FALSE.
 *
 */
{
   DR_DUMP *entry1, *entry2;
   int entrynum = 0;

   while(TRUE)
   {
      entry1 = darrayget(root1, entrynum);
      entry2 = darrayget(root2, entrynum);

      if ((entry1 == NULL) || (entry2 == NULL))
      {
         if (entry1 != entry2)
            return(FALSE);       /* different number of entries */
         return(TRUE);           /* same entries exactly! */
      }

```

BEST AVAILABLE COPY

```
      /* Compare the two entries */
      if (entry1->protocol != entry2->protocol)
         return(FALSE);

      if (entry1->timevalid != entry2->timevalid)
         return(FALSE);

      if (entry1->timevalid)
      {
         if (smithcmp(&entry1->dumptime, &entry2->dumptime) != 0)
            return(FALSE);
      }
      entrynum++;
   }
}

/*
 * FILE      $Header: dmctl.c,v 1.11 87/12/11 14:26:46 hmgr Exp $
 *
 * AUTHOR       Bruce Erickson
 *
 * ONELINER Routines to add map info to dump info
 *
 *    Quote for the file:
 *       "There is nothing that cannot be solved by one more level
 *       of indirection"
 *                                    - Unknown
 *
 * TABSTOPS 3
 *
 * INSPECTED   date      - inspectors
 *
 * RCS       $Log: dmctl.c,v $
 * Revision 1.11  87/12/11  14:26:46  14:26:46  hmgr ()
 * Author: bae@hplsdlc.hp.com
 * If merges occur, set mapexists to TRUE, but mappath to
 * NULL
 *
 * Revision 1.10  87/11/06  08:48:32  08:48:32  hmgr ()
 * Author: bae@hplsdlc.hp.com
 * When setting the array lengths, I had been using maxprobe - 1; it SHOULD
 * be maxprobe + 1!!!!  This was resulting in incorrect #probes in the
 * merged files...
 *
 * Revision 1.9  87/11/03  08:44:26  08:44:26  hmgr ()
 * Author: bae@hplsdlc.hp.com
 * updated to pragmas
 *
 * Revision 1.8  87/10/02  12:18:02  12:18:02  hmgr ()
 * Author: bae@hplsdlc.hp.com
 * checkpoint before moving onward
 *
```

BEST AVAILABLE COPY

```
 * Revision 1.7  87/09/28  13:26:08  13:26:08  hmgr ()
 * Author: bae@hplsdlc.hp.com
 * added ignore flags to ignore the debug routines
 *
 * Revision 1.6  87/08/05  17:53:59  17:53:59  hmgr ()
 * Author: bae@hplsdlc.hp.com
 * use mchunkalloc for speed
 *
 * Revision 1.5  87/07/28  13:13:50  13:13:50  hmgr ()
 * Author: bae@hplsdlc.hp.com
 * no comment
 *
 * Revision 1.4  87/07/09  15:04:50  15:04:50  bae (Bruce Erickson)
 * Fixed this up to deal with case of *no* files being "ok to merge"
 *
 * Revision 1.3  87/07/02  09:12:51  09:12:51  bae (Bruce Erickson)
 * Added check in the case that the map file does not exist
 *
 * Revision 1.2  87/06/25  16:02:44  16:02:44  bae (Bruce Erickson)
 * Fixed bug in that tossdate was incorrect in some cases
 *
 * Revision 1.1  87/06/24  15:50:44  15:50:44  bae (Bruce Erickson)
 * Initial revision
 *
 *
 */
static  char rcsid[] = "$Header: dmctl.c,v 1.11 87/12/11 14:26:46 hmgr Exp $";
#include <stdio.h>
#include <boolean.h>
#include <model.h>
#include "probe.h"
#include "smithdate.h"
#include "report.h"
#include "kmerge.h"

/* INC_PROBES is how we increment dmmerged->arrays and mapinfo */
#define INC_PROBES 64

/* GLOBALS */
boolean mergedebug = FALSE;

/* STATICS */
static int numoktomerge;        /* number of analysis structs we should merge */
static DR_ANAL **oktomerge;     /* the entries in here are ok to merge */
static DR_ANAL *dmmerged;       /* the merged entry... */

/* EXTERNALS */
extern boolean mapcheck();
extern boolean dumpkeepold;
extern char *pathtofname();
extern char *smithtoascii();
extern char *malloc();
```

BEST AVAILABLE COPY

```
extern char *mchunkalloc();
extern char *realloc();
extern void free();
extern char *invokedname;
extern char currentdirectory[];
extern RP_FILE *rfnumtofile();
extern void darrayadd();
extern DR_DUMP *darrayget();

/* FORWARD */
extern void initmerged();
extern void dmdomerge();
extern void dmgenoklist();
extern int dmcompare();
extern void dmadd();


/***************************************************************************/

/* FUNCTION */
void
dmaddmapinfo()

/*
 *    This routine is used to traverse through all analyzed files
 *    that rfile.c knows about and adds in mapinformation for
 *    each DR_ANAL structure found...
 *
 *    Any errors are sent to stderr.
 *
 */
{
   int32 snum;     /* source file number */
   RP_FILE *fptr;
   int analindex; /* for traversing thru all anal structures */


   for (snum = 0; (fptr = rfnumtofile(snum)) != NULL; snum++)
   {
      if (!fptr->isanalyzed)
         continue;

      /* This file is analyzed - i.e., it has one or more analysis
         structures associated with it
      */

      for (analindex = 0; analindex < fptr->numanal; analindex++)
      {
         mrinput(fptr->path, fptr->anal[analindex]);
      }
   }
}
```

BEST AVAILABLE COPY

```
/***********************************************************************/

/* FUNCTION */
dmmergedumps()

/*
 *    When this routine is called it will go thru
 *    all of the RP_FILEes that are analyzed looking
 *    for numanals that are not 1.  If any are found,
 *    we will merge the multiple analysis stuff
 *    into a single analysis file, putting the result
 *    into analinfo.  For those whose numanal's are
 *    one, we will simply set analinfo to the
 *    anal[0] pointer...
 *
 */
{
   int32 snum;     /* source file number */
   RP_FILE *fptr;

   for (snum = 0; (fptr = rfnumtofile(snum)) != NULL; snum++)
   {
      if (!fptr->isanalyzed)
         continue;

      /* This file is analyzed - i.e., it has one or more analysis
         structures associated with it
      */

      if (fptr->numanal <= 1)
      {
         fptr->analinfo = fptr->anal[0];
         continue;
      }

      /* NOTE: 90% of the people stop above.  Here's for the
         10% who really push this stuff to it's limit.  Ugh.
      */

      /* For simplicity's sake, reserve maximum room for the arrays */
      oktomerge = (DR_ANAL **) malloc(sizeof(DR_ANAL *) * fptr->numanal);

      dmgenoklist(fptr);

      if (numoktomerge != 0)
      {
         /* Note: it is possible to delete ALL merging when all .M files
            are out-of-date wrt to data... */
         if (numoktomerge == 1)
         {
```

BEST AVAILABLE COPY

```
                /* Only 1 survived the date comparisons.  Just assign
                   analinfo to this guy
                */
                fptr->analinfo = oktomerge[0];
            }
            else
            {
                /* Despite our best efforts, we still need to merge data */
                dmdomerge(fptr);
            }
        }
        else
        {
            fptr->analinfo = fptr->anal[0];
        }

        free(oktomerge);
    }
}


/*************************************************************************/

/* FUNCTION */
static void
dmgenoklist(fptr)
RP_FILE *fptr;        /* this RP_FILE has more than one DR_ANAL struct */

/*
 *    This routine is called for the case where there are more
 *    than one DR_ANAL struct for this fptr.
 *
 *    First we will check source mod dates, and will toss out
 *    any old ones (with appropriate warning messages to stderr).
 *
 *    Then we will merge the data from the different analysis
 *    structures into one (maybe larget) structure...
 */
{
   SMITHTIME *tossdate; /* date we are tossing away */
   int smcmp;           /* results of a smithtime comparison */
   int numoldtimes;     /* number of old times we have already warned
                           about */
   SMITHTIME **oldtimes;   /* the times we have warned about */
   int timesindex;      /* scanning thrue oldtimes array */
   boolean newtime;     /* if TRUE, need to complain beceause we
                           are ignoring a new time */


   int analindex;       /* Keep track as we scan */
   DR_ANAL *analscan;   /* scanning thru analysis structure.. */

```

BEST AVAILABLE COPY

```
numoldtimes = numoktomerge = 0;


oldtimes = (SMITHTIME **) malloc(sizeof(SMITHTIME *) * (fptr->numanal - 1));

/* Are the source mod dates of all of these the same?
   If not, boy do we have problems.  We will need to
   scan thru and find the most recent... even if he specified
   the -o option...
*/

for (analindex = 0; analindex < fptr->numanal; analindex++)
{
   analscan = fptr->anal[analindex];

   /* If this has no map file, we must skip it */
   if (!mapcheck(fptr, analscan))
   {
      fprintf(stderr, "%s: warning: skipping data for file %s\n",
            invokedname, pathtofname(currentdirectory, fptr->path, 0));
      fprintf(stderr, "because map file %s is invalid\n",
            pathtofname(currentdirectory, analscan->mappath, 0));
      continue;
   }

   /* If this is the first one, just put it in w/o comparison */
   if (numoktomerge == 0)
   {
      /* This is the original list... */
      oktomerge[0] = analscan;
      numoktomerge++;
      continue;       /* Go on to next one */
   }

   /* Compare the date of this guy with the date we have put
      into the oktomerge array */

   if (dumpkeepold || (!oktomerge[0]->modvalid) || (!analscan->modvalid) ||
         (smcmp = smithcmp(&oktomerge[0]->sourcemodtime, &analscan->sourcemodtime)) == 0)
   {
      /* Either one of the source times is invalid, or the times are both
         valid and they are the same.  In either event, we will
         simply add analscan to the oktomerge array
      */
      oktomerge[numoktomerge++] = analscan;
      continue;       /* And onward ho! */
   }

   /* Bummer to the max.
      Figure out whether we need to toss the data analscan points to,
      or all the data in the oktomerge array.  This is done
      based on the dates.
```

BEST AVAILABLE COPY

```
        */

        if (smcmp < 0)
        {
           /* Toss what is already in the oktomerge array */
           tossdate = &oktomerge[0]->sourcemodtime;
           oktomerge[0] = analscan;
           numoktomerge = 1;
        }
        else
        {
           /* Toss what analscan points to */
           tossdate = &analscan->sourcemodtime;
        }

        /* Decide whether or not to give a warning message */
        newtime = TRUE;       /* Assume this is a new time */
        for (timesindex = 0; timesindex < numoldtimes; timesindex++)
        {
           if (smithcmp(oldtimes[timesindex], tossdate) == 0)
           {
              newtime = FALSE;      /* naahh - we have seen this before */
              break;
           }
        }

        if (newtime)
        {
           /* Give a warning!!!! */
           fprintf(stderr, "%s: warning: skipping data from older version of file %s\n",
                 invokedname, pathtofname(currentdirectory, fptr->path, 0));
           fprintf(stderr, "date of skipped file is %s\n",
                 smithtoascii(tossdate, DATEFORMAT));

           /* Add to oldtimes array */
           oldtimes[numoldtimes++] = tossdate;
        }
     }

     free(oldtimes);       /* No longer need this... */
  }


  /**************************************************************************/

  /* FUNCTION */
  static void
  dmdomerge(fptr)
  RP_FILE *fptr;

  /*
   *    This is called to merge all of the arrays that are
```

BEST AVAILABLE COPY

```
 *      in the 'oktomerge' array.
 *
 *      We will create a single array - that fptr->anal will
 *      be set equal to - that contains all of this information.
 *      kmerge(3x) will do the hard work.
 *
 *      Note that "fptr->analinfo->mapexists" will be set to
 *      true, but the name will be set to 'merged'
 */
{
    int *arraylengths;
    int probescan;

    /* Generate the arraylengths information */
    arraylengths = (int *) malloc(sizeof(int) * numoktomerge);

    /* Create and initialize dmmerged */
    initmerged();

    for (probescan = 0; probescan < numoktomerge; probescan++)
    {
       arraylengths[probescan] = oktomerge[probescan]->mapinfo->maxprobe + 1;
    }

    kmerge(numoktomerge, arraylengths, dmcompare, dmadd);

    free(arraylengths);
    fptr->analinfo = dmmerged;
}


/***************************************************************************/

/* FUNCTION */
static int
dmcompare(a, b)
KMERGE_ADDR *a, *b;

/*
 *      This does a comparison of probes.
 *      (a, b)->arraynum is the DR_ANAL structure
 *      in oktomerge[arraynum]. The entrynum is
 *      anal->mapinfo->probes[entrynum]. The comparison
 *      is based on the values of:
 *         probetype
 *         fname
 *         sline/scol
 *
 *      Note that we will get terribly confused about *where*
 *      a probe goes if the fname is different, and will need
 *      to do something special if that happens. In fact, we
 *      will need to scan backwards in probes until we find
```

```
 *     a fname that matches, scan forwards for a fname
 *     that matches, and figure it out from there.  HOWEVER,
 *     we won't do that for this version!
 *
 *     Instead, we will scan forward in a or b until an
 *     identical 'fname' is found, and to comparisons on that.
 */
{
   MR_PROBE *aprobe, *bprobe;
   int cmpvalue;

   if (mergedebug)
   {
#pragma BBA_IGNORE /* debug info only */
      fprintf(stderr, "Comparing ");
      praddr(stderr, a);
      fprintf(stderr, " with ");
      praddr(stderr, b);
      fprintf(stderr, "\n");
   }

   aprobe = oktomerge[a->arraynum]->mapinfo->probes[a->element];
   bprobe = oktomerge[b->arraynum]->mapinfo->probes[b->element];

   if (aprobe->source.mastersnum == bprobe->source.mastersnum)
   {
      if (aprobe->probetype == bprobe->probetype)
      {
         return(dmcomplinecol(aprobe, bprobe));
      }
      else
      {
         /* Different probe types.  Compare based on source lines,
            but if they are at the same location, we will need
            to force one probe to be 'before' the other so the
            merge works correctly
         */
         cmpvalue = dmcomplinecol(aprobe, bprobe);
         if (cmpvalue != 0)
            return(cmpvalue);
         if (aprobe->probetype > bprobe->probetype)
            return(1);
         return(-1);
      }
   }
   /* OOPS.  DIFFERENT SOURCE FILES. */
   if (1 != 0)
   {
#pragma  BBA_ALERT /* if we reach here, we want to be notified! */
   }
   return(1);
}
```

BEST AVAILABLE COPY

BEST AVAILABLE COPY

```
/*************************************************************************/

/* FUNCTION */
static int
dmcomplinecol(aprobe, bprobe)
MR_PROBE *aprobe, *bprobe;

/*
 *     This routine is called when we are at the same
 *     source file, and we want to compare starting
 *     line numbers and columns.
 *
 * RETURNS      0 if same sline/scol;
 *             -1 if a is 'before' b;
 *              1 if a is 'after' b.
 *
 */
{
   if (aprobe->source.sline == bprobe->source.sline)
   {
      if (aprobe->source.scol == bprobe->source.scol)
      {
         return(0);      /* Completely identical! */
      }
      else
      {
         /* same file, same startline, different start column...
         */
         if (aprobe->source.scol < bprobe->source.scol)
            return(-1);
         else
            return(1);
      }
   }
   else
   {
      /* different starting lines */
      if (aprobe->source.sline < bprobe->source.sline)
         return(-1);
      else
         return(1);
   }
}


/*************************************************************************/

/* FUNCTION */,
static void
dmadd(adder, numidentical, identical)
```

BEST AVAILABLE COPY

```
KMERGE_ADDR *adder;
int numidentical;
KMERGE_ADDR **identical;

/*
 *      This routine is called from kmerge(3x) to add a
 *      probe to the final merged array.
 *
 *      This will add the specified data to dmmerged:
 *         a pointer to the MR_PROBE will be added to dmmerged
 *         all of the 'identical' probe data will be or'd together
 *         and put into dmmerged.
 */
{
   MR_FILE *mapptr;
   boolean *arrayentry;
   int arrayscan;

   if (mergedebug)
   {
#pragma BBA_IGNORE /* only for testing! */

      fprintf(stderr, "Adding ");
      praddr(stderr, adder);
      fprintf(stderr, "\n   Identical list: ");
      for (arrayscan = 0; arrayscan < numidentical; arrayscan++)
      {
         praddr(stderr, identical[arrayscan]);
         fprintf(stderr, " ");
      }
      fprintf(stderr, "\n");
   }

   mapptr = dmmerged->mapinfo;

   /* First, do we need to expand the data array to handle this? */
   if ((dmmerged->numentries % INC_PROBES) == 0)
   {
      if (dmmerged->numentries == 0)
      {
         dmmerged->array = (boolean *) malloc(sizeof(boolean) * INC_PROBES);
         mapptr->probes = (MR_PROBE **) malloc(sizeof(MR_PROBE *) * INC_PROBES);
      }
      else
      {
         int newnum = dmmerged->numentries + INC_PROBES;
         dmmerged->array = (boolean *) realloc(dmmerged->array,
                  sizeof(boolean) * newnum);
         mapptr->probes = (MR_PROBE **) realloc(mapptr->probes,
               sizeof(MR_PROBE *) * newnum);
      }
   }
```

BEST AVAILABLE COPY

```
    /* Set the data */
    arrayentry = &dmmerged->array[dmmerged->numentries++];
    *arrayentry = oktomerge[adder->arraynum]->array[adder->element];

    /* Scan thru identical until
       1) out of identical information
       2) *arrayentry is a 1
    */
    for (arrayscan = 0; (*arrayentry == FALSE) && arrayscan < numidentical;
          arrayscan++)
    {
       *arrayentry = oktomerge[identical[arrayscan]->arraynum]->array[identical[arrayscan]->element];
    }

    /* Now add the probe information */
    mapptr->probes[++mapptr->maxprobe] =
          oktomerge[adder->arraynum]->mapinfo->probes[adder->element];

}


/***********************************************************************/

/* FUNCTION */
static void
initmerged()

/*
 *    This routine creates and initializes the dmmerge
 *    pointer.  This is what the probes will be added to.
 *
 *    This routine will:
 *       allocate a DR_ANAL structure:
 *          options will be an 'or' of all options merged
 *          protocol will be highest protocol
 *          sourcemodtime (there will be only one)
 *          numentries & array set by dmadd()
 *          numdumps/dumpinfo will be all merged
 *          suffixvalid will be set to FALSE (there will be
 *             multiple ones)
 *          mappath will be NULL, and mapexists will be TRUE
 *          numoldmodtimes and numoldnumentries will be 0
 *
 *       allocate a MR_FILE structure:
 *          protocol will be highest protocol
 *          master file will be same (there is only 1)
 *          maxprobe initialized to -1, but set by dmadd()
 *          options will be 'or' of all options merged
 *          modvalid will be TRUE; there will only be one
 *          probes will be set by dmadd()
 *          funcs will be a NULL pointer
```

BEST AVAILABLE COPY

```
 *
 */
{
   register DR_ANAL *analptr;
   register MR_FILE *mapptr;
   register DR_ANAL *srcanal;
   register MR_FILE *srcmap;
   int mergeindex;
   int i;                  /* general register */

   analptr = dmmerged = (DR_ANAL *) mchunkalloc(sizeof(DR_ANAL));

   /* Might as well get the common stuff from first entry */
   *analptr = *oktomerge[0];
   analptr->numentries = 0;       /* dmadd will add to this array */
   analptr->numdumps = 0;         /* merge dumps below */
   analptr->suffixvalid = FALSE;
   analptr->mapexists = TRUE;
   analptr->mappath = NULL;
   analptr->numoldmodtimes = 0;
   analptr->numoldnumentries = 0;

   mapptr = analptr->mapinfo = (MR_FILE *) mchunkalloc(sizeof(MR_FILE));

   /* Copy first entry's mapinfo */
   *mapptr = *oktomerge[0]->mapinfo;
   mapptr->maxprobe = -1;
   mapptr->options = 0;       /* merged below */
   mapptr->cppver = NULL;

   /* Run thru all of the stuff we will merge and "merge" some
      of the data
   */
   for (mergeindex = 0; mergeindex < numoktomerge; mergeindex++)
   {
      srcanal = oktomerge[mergeindex];

      analptr->options |= srcanal->options;
      if (srcanal->protocol > analptr->protocol)
         analptr->protocol = srcanal->protocol;

      /* add all of the dumps from srcanal to analptr */
      for (i = 0; i < srcanal->numdumps; i++)
      {
         darrayadd(&analptr->numdumps, &analptr->dumpinfo,
               darrayget(srcanal->dumpinfo, i));
      }

      srcmap = srcanal->mapinfo;
      if (srcmap->protocol > mapptr->protocol)
         mapptr->protocol = srcmap->protocol;

```

BEST AVAILABLE COPY

```
        mapptr->options |= srcmap->options;
    }

    /* We are now merged as much as we can without merging the
        probes.  dmadd() will do the rest. */
}


/*************************************************************************/

/* FUNCTION */
static
praddr(fp, addr)
FILE *fp;
KMERGE_ADDR *addr;

/*
 *
 *      Print what addr points to:
 *          (ptype, sline/scol)
 */
{
    MR_PROBE *ptr;

#pragma BBA_IGNORE /* only for testing! */
    ptr = oktomerge[addr->arraynum]->mapinfo->probes[addr->element];

    fprintf(fp, "(0xXX, %d/%d)", ptr->probetype, ptr->source.sline,
            ptr->source.scol);
}
```

```
/*
 * FILE      $Header: drinput.c,v 1.21 87/12/11 14:26:01 hmgr Exp $
 *
 * AUTHOR       Bruce Erickson
 *
 * ONELINER Read in a dump file....
 *
 *      This file contains the routines necessary to read in a
 *      bbadump.data-style file.  The format of this file is
 *      found in the PROTOCOL document.
 *      This basically fills in the DR_ANAL structures (in report.h)
 *      for each file found, and or's in the data appropriately.
 *
 *      Note that this file may be used both in the report generator
 *      as well as in the compress program.
 *
 *      Note that this may have to deal with very large data files
 *      as quickly and as space-efficently as possible.
 *
 *      There are some special error/warning conditions that we will
 *      need to think of.  Consider, for example, the case where
```

BEST AVAILABLE COPY

```
 *    there are two (or more) versions of a program which are
 *    tooled for branch analysis, and the data from them is put
 *    into the same file....
 *
 *    NOTE: there is a different set of data & mapfiles for
 *    records that have different <options>.  This is because
 *    a file may generate different probe points, but the
 *    number of probe points and sourcemodate may be the same...
 *    We will depend on intelligent 'merge' routines to merge
 *    probe points that are the same but in different <options>'s runs...
 *
 *  while reading in a dumpfile, we may come across a source file mod-time
 *  that has different dates, or numprobes are different (but
 * <options> are the same.  The action taken is:
 *
 * dates num_probes  |  action
 * ------------------------------------------------------------
 * same  same        |  data or'd in; no message
 * same  diff        |  Fewest number of probes tossed; new data replaces it;
 *                   |  give error message;  Insure only get one message per different
 *                   |  num_probes
 * diff  same        |  IF -o specified:  give warning message; or-in data.
 *                   |  ELSE, toss data on oldest date; give error message.
 *                   |  Insure one message per different source-mod.
 * diff  diff        |  Toss data of oldest date; give error message
*****************************************************************************
 *
 * TABSTOPS 3
 *
 * INSPECTED   06/15/87    - Phyllis Smith, John Sparks
 *
 * RCS      $Log: drinput.c,v $
 * Revision 1.21  87/12/11  14:26:01  14:26:01  hmgr ()
 * Author: bae@hplsdlc.hp.com
 * Initialize the DR_ANAL struct so that mapexists is FALSE and
 * mappath is NULL
 *
 * Revision 1.20  87/11/23  09:03:34  09:03:34  hmgr ()
 * Author: bae@hplsdlc.hp.com
 * Fixed problem when a larger numentries is followed
 * by a smaller number with same options (dumpread/misc02)
 *
 * Revision 1.19  87/11/06  08:47:59  08:47:59  hmgr ()
 * Author: bae@hplsdlc.hp.com
 * changed drinitoldmodtime() to also store if the date's data was used
 * or not
 *
 * Revision 1.18  87/11/03  08:43:17  08:43:17  hmgr ()
 * Author: bae@hplsdlc.hp.com
 * updated to pragmas
 *
 * Revision 1.17  87/10/02  12:18:18  12:18:18  hmgr ()
```

BEST AVAILABLE COPY

```
 * Author: bae@hplsdlc.hp.com
 * checkpoint before moving onward
 *
 * Revision 1.16  87/08/21  16:21:31  16:21:31  hmgr ()
 * Author: bae@hplsdlc.hp.com
 * no comment
 *
 * Revision 1.15  87/08/05  17:17:37  17:17:37  hmgr ()
 * Author: bae@hplsdlc.hp.com
 * Made dreaddata somewhat faster
 *
 * Revision 1.14  87/08/05  16:03:13  16:03:13  hmgr ()
 * Author: bae@hplsdlc.hp.com
 * use qstrtok() for speed now!
 *
 * Revision 1.13  87/07/17  10:21:43  10:21:43  hmgr ()
 * Author: bae@hplsdlc.hp.com
 *
 *
 * Revision 1.12  87/07/09  15:05:02  15:05:02  bae (Bruce Erickson)
 * fixed call to darraysadd
 *
 * Revision 1.11  87/07/02  09:12:20  09:12:20  bae (Bruce Erickson)
 * Made thisdump a DR_DARRAY instead of just a DR_DUMP.  This
 * was done so that we could accumulate a set of dump information
 * for the merging operation.
 *
 * Revision 1.10  87/06/25  16:02:55  16:02:55  bae (Bruce Erickson)
 * Changed isinteger, so changed invocation
 *
 * Revision 1.9  87/06/24  15:52:58  15:52:58  bae (Bruce Erickson)
 * *** empty log message ***
 *
 * Revision 1.8  87/06/17  17:10:57  17:10:57  bae (Bruce Erickson)
 * added system to read in the option flags...
 *
 * Revision 1.7  87/06/15  13:56:32  13:56:32  bae (Bruce Erickson)
 * added documentation, and new method of dealing with
 * DR_DUMP data
 *
 * Revision 1.6  87/06/15  10:09:48  10:09:48  bae (Bruce Erickson)
 * Corrected system of reading in dumptimes...
 *
 * Revision 1.5  87/06/12  15:06:47  15:06:47  bae (Bruce Erickson)
 * This seems to work, except that I have not checked the dump
 * times....
 *
 * Revision 1.4  87/06/11  15:51:43  15:51:43  bae (Bruce Erickson)
 * Array reading apparently works, too!
 *
 * Revision 1.3  87/06/11  13:57:26  13:57:26  bae (Bruce Erickson)
 * incremental check in, so I don't accidentally destroy
```

BEST AVAILABLE COPY

```
 * what I have.  This is tested down to 'oldnew05' in
 * test/dumpread/Makefile
 *
 * Revision 1.2  87/06/10  08:36:43  08:36:43  bae (Bruce Erickson)
 * (incremental check-in)
 *
 * Revision 1.1  87/06/09  10:51:48  10:51:48  bae (Bruce Erickson)
 * Initial revision
 *
 *
 */
static char rcsid[] = "$Header: drinput.c,v 1.21 87/12/11 14:26:01 hmgr Exp $";
#include <stdio.h>
#include <boolean.h>
#include <model.h>
#include "smithdate.h"
#include "probe.h"
#include "report.h"
#include "targetspec.h"
#include "dumpfile.h"


/* INC_OLDARRAY is the margin by which we add to oldmodtimes and
   oldnumentries arrays */
#define INC_OLDARRAY 5

/* INC_DRANAL is the number by which we increment the anal array by.
   It should be set to the number of different options per sourcefile
   we reasonably expect to encounter in a dump file
*/
#define INC_DRANAL 3


/* The following macro is used when we are scanning a line via qstrtok,
   and we want to do a 'dumperror = TRUE; return' when qstrtok returns
   NULL
*/
#define NEXTTOK(ptr, msg) if ((ptr = qstrtok(NULL)) == NULL)\
                               {  \
                                  DUMPERROR(msg); \
                                  return; \
                               }

/* The following macro will format an error message correctly, and
   set the dumperror global to TRUE ... */
#define DUMPERROR(msg)  dumperror = TRUE; \
                        fprintf(stderr, "%s: %s: %d: %s\n", invokedname, \
                                pathtofname(currentdirectory, dumpfile, 0),\
                                dumplinenum, msg)

#define DUMPWARNING(msg)   fprintf(stderr, "%s: %s: %d: %s\n", invokedname, \
                                pathtofname(currentdirectory, dumpfile, 0),\
```

BEST AVAILABLE COPY

```
                                                    dumplinenum, msg)

/* The following macro is used when we want the next token
   read to be converted to an integer and placed in 'value'
*/
#define INTASSIGN(value, ptr, msg)  NEXTTOK(ptr, msg);\
                                    if (!isinteger(ptr, &value))\
                                    {\
                                       DUMPERROR(msg);\
                                       return;\
                                    }

/* GLOBALS */

/* STATICS */
static FILE *dstream;       /* read from this stream */
static char *dumpfile;      /* name of dumpfile we are reading */
static int dumplinenum;     /* line number we just read */
static int dumpprotocol;    /* Current dump protocol (-1 == none yet) */
static boolean dumperror;   /* if TRUE, error in reading file */
static char *dumpline;      /* line we just read in */

/* Error messages that may be used more than one time */
static char errdump[] = "illegal ':dump' line";
static char errfile[] = "illegal ':file' line";
static char errarray[] = "illegal ':array' line";

static DR_DARRAY *thisdump;   /* current dump record(s) is/are ... */
static int numthisdump = 0;   /* number in thisdump */


/* EXTERNALS */
extern char *smithtoascii();
extern void free();
extern char *realloc();
extern char *malloc();
extern char *mchunkalloc();
extern void darraysadd();
extern boolean readoption();
extern void darrayadd();
extern void darrayfree();
extern char *smithtoascii();
extern boolean dumpkeepold;
extern RP_FILE *rfnumtofile();
extern char *qstringread();
extern int32 rfaddfile();
extern int32 rfpathtonum();
extern char *qstrtok();
extern char currentdirectory[];
extern char *freadline();
extern char *invokedname;  /* name we were invoked with */
extern boolean drkeepold;
```

BEST AVAILABLE COPY

```
extern boolean fileid();
extern char *pathtofname();
                •

/* FORWARD */
extern boolean samesuffixes();
extern DR_ANAL *dfindanal();
extern DR_ANAL *draddanal();
extern void drfoptional();
extern void darrayread();
extern boolean drfilediff();
extern boolean drinitoldnumentries();
extern boolean drinitoldmodtime();
extern void dreadloop();
extern void dreaddump();
extern void dreadfile();
extern void drinitrpfile();


/************************************************************************/

/* FUNCTION */
boolean
drinput(filename)
char *filename;       /* dumpfile's name */

/*
 *    This routine is called to read in the specified dumpfile.
 *    This does *not* cause the mapfiles to be read!
 *
 *    If any fatal errors (syntax errors in dumpfile), this returns FALSE
 *    else this returns TRUE.
 *
 *    This enters data into RP_FILE structures via the rf* routines.
 *
 */
{
   dumpfile = filename;     /* copy passed parameter to 'global' value */


   /* Find the "id line, and make certain it is the DUMPID line.
      Also return the line number the "id" line is at in dumplinenum
   */
   if (!fileid(dumpfile, FALSE, "r", DUMPID, &dstream, &dumplinenum))
   {
      fprintf(stderr, "%s: cannot open %s, or it is not a Basis Branch Analysis dumpfile\n",
            invokedname, dumpfile);
      return(FALSE);
   }

   dumpprotocol = -1;       /* flag that we have no protocol yet */
   dumperror = FALSE;       /* assume no errors */
```

BEST AVAILABLE COPY

```
    dreadloop();                /* read in the rest of the file */
    fclose(dstream);            /* close input */
    if (dumperror)
       return(FALSE);           /* failure! */
    return(TRUE);               /* OK! */
}


/*************************************************************************/

/* FUNCTION */
/* static */ void
dreadloop()

/*
 *     This routine is called after we have read in the :id line and
 *     know this is a dump file.  This then reads in the
 *     information and puts it in the appropriate RP_FILE (and other)
 *     places...
 *
 *     This routine is responsible for detecting the type of each
 *     "control" line (i.e., those that start with a ':').
 *
 *     If we find an unknown control line, or if any of the other
 *     reader routines find an error, this sets the global 'dumperror'
 *     to TRUE, prints a message to stderr, and exits...
 *
 */
{
   boolean havefile = FALSE;  /* set to TRUE when we find a :file line */
   boolean gotfile;           /* set to TRUE when we find a :file line; set
                                 to FALSE when we find a :dump line.  Used to
                                 know when we should toss :dump information
                                 instead of accumulating it
                              */

   gotfile = TRUE;
   while((dumpline = freadline(dstream)) != NULL)
   {
      dumplinenum++;     /* just read in this line number */

      /* If previous read got an error, abort reading the file */
      if (dumperror)
         break;

      if (*dumpline != ':')
         continue;          /* not a line we should recognize */


      /* This is a dump "control" line.  Check what it is... */

      if (strncmp(dumpline, ":id ", 4) == 0)
```

```
        {
            /* This is an extra id line.  Ignore it. */
            continue;
        }

        if (strncmp(dumpline, ":dump ", 6) == 0)
        {
            if (gotfile)
            {
                /* Reset what we have */
                if (numthisdump != 0)
                    darrayfree(thisdump);
                numthisdump = 0;
                gotfile = FALSE;
            }
            dreaddump();        /* read in the :dump line */
            continue;       /* Go on to next line */
        }

        /* This is not a :dump line.  If we don't have one yet, we
            really don't know how to interpret the rest of the file... */

        if (dumpprotocol == -1)
        {
            DUMPERROR("no ':dump' line, or ':dump' line out of order");
            break;      /* exit from loop; dumperror is TRUE */
        }

        if (strncmp(dumpline, ":file ", 6) == 0)
        {
            gotfile = TRUE;
            havefile = TRUE;      /* found one! */
            dreadfile();
            continue;
        }

        if (strncmp(dumpline, ":array ", 7) == 0)
        {
            DUMPERROR("unexpected :array line");
            break;      /* Exit reading loop */
        }

        /* This is a control line that we don't know how to interpret */

        DUMPERROR("unknown line");
        break;      /* Exit reading loop */
    }

    /* Either EOF or error (depending on dumperror variable).
        If EOF, generate error if no :options line
    */
```

BEST AVAILABLE COPY

BEST AVAILABLE COPY

```
    if (!dumperror)
    {
        if (dumpprotocol == -1)
        {
            DUMPERROR("no ':dump' line");
        }
        else
        {
            if (!havefile)
            {
                DUMPERROR("no ':file' lines; no branch data in dump file");
            }
        }
    }
}


/************************************************************************/

/* FUNCTION */
/* static */ void
dreaddump()

/*
 *      This routine is called when dumpline contains the ":dump" line.
 *      This reads the rest of the line, and sets 'thisdump' as necessary.
 *
 *      If any error, this sets the global 'dumperror' to TRUE and returns.
 *      This sets up the global 'thisdump' to point to a malloc'd copy
 *      of the DR_DUMP information
 *
 */
{
    char *ptr;
    DR_DUMP *dumprecord;

    ptr = qstrtok(dumpline);        /* ptr = ":dump" */

    INTASSIGN(dumpprotocol, ptr, errdump);    /* get dumpprotocol */

    if (dumpprotocol > MAXDUMPPROTOCOL)
    {
        fprintf(stderr, "%s: Unable to read protocol level (%d) of dump file %s\n",
                invokedname, dumpprotocol, pathtofname(currentdirectory, dumpfile, 0));
        fprintf(stderr, "\t(current maximum protocol level for dumpfiles is %d)\n",
                MAXDUMPPROTOCOL);
        dumperror = TRUE;
        return;
    }

    /* Else, we know how to read this file */
    ptr = qstrtok(NULL);     /* ptr may be :dumptime */
```

BEST AVAILABLE COPY

```
    dumprecord = (DR_DUMP *) mchunkalloc(sizeof(DR_DUMP));
    dumprecord->protocol = dumpprotocol;

    if (ptr == NULL)
    {
        /* No dumptime (which is OK by me). */
        dumprecord->timevalid = FALSE;
    }
    else
    {
        if (strcmp(ptr, ":dumptime") == 0)
        {
            NEXTTOK(ptr, errdump);      /* fetch the actual dump time */
            if (!smithfromstore(ptr, &dumprecord->dumptime))
            {
                DUMPERROR("error in dump time");
                return;
            }
            dumprecord->timevalid = TRUE;
        }
        else
        {
            DUMPERROR(errdump);
        }
    }

    /* Add 'dumprecord' to thisdump */
    darrayadd(&numthisdump, &thisdump, dumprecord);
}


/***********************************************************************/

/* FUNCTION */
/* static */ void
dreadfile()

/*
 *    This is called when we find the ':file' line.  This reads
 *    in the line, and inserts data appropriately.
 *
 */
{
    char *ptr;       /* pointer to token */
    int protocol;  /* insertprotocol of this file */
    int numentries;   /* total number of entries */
    int32 snum;       /* (master) source number of this file */
    register RP_FILE *fileptr;
    register DR_ANAL *analptr;
    SMITHTIME modtime;
    boolean modvalid; /* if TRUE, this line had a ':modtime' token */
```

BEST AVAILABLE COPY

```
char suffix;        /* mapsuffix if 'suffixvalid' is true */
char *sourcename; /* Name of the source file */
boolean suffixvalid;
boolean tossarray;    /* if TRUE, read but ignore :array lines */
PROBETYPE options;    /* options this file was processed with */

ptr = qstrtok(dumpline);       /* ptr = ":file" */

INTASSIGN(protocol, ptr, errfile);      /* get protocol */

INTASSIGN(numentries, ptr, errfile);    /* get number of entries */

if (numentries == 0)
{
   /* Do not attempt to read in a zero-length array entry! */
   DUMPERROR(errdump);
   return;
}

/* OK, now get the <options>.  This is hex, so we can't just use
   the INTASSIGN macro */
NEXTTOK(ptr, errfile);                  /* ptr = <option> */
if (!readoption(&options, ptr))
{
   DUMPERROR(errfile);
   return;
}

NEXTTOK(sourcename, errfile);           /* Get name of source file */

/* Pick up source modification date/time and mapsuffix */
drfoptional(&modvalid, &modtime, &suffixvalid, &suffix);

if (dumperror)
   return;      /* Error in those options */

if ((snum = rfpathtonum(sourcename)) == -1)
{
   /* This is a *new* source file!!!!  Add it in... */
   snum = rfaddfile(sourcename);
   fileptr = rfnumtofile(snum);

   /* Initialize values in the RP_FILE array, knowing that
      the previous values are junk */
   fileptr->isanalyzed = TRUE;       /* Show that we should analyze this file */
   fileptr->numanal = 0;
   analptr = draddanal(fileptr);
   analptr->options = options;       /* Store the options (it is a key) */

   drinitrpfile(analptr, numentries, modvalid, &modtime,
         suffixvalid, suffix);
```

BEST AVAILABLE COPY

```
            tossarray = FALSE;                  /* Force reading array */
        }
        else
        {
            /* We have read in this source file before.  We need to check for
               some error conditions:
               0) not analyzed (previous error in merging)
               1) options different?
               2) numprobes different?
               3) moddates different?
            */
            fileptr = rfnumtofile(snum);
            if (!fileptr->isanalyzed)
            {
               /* read in array, but ignore it */
               darrayread(numentries, NULL, TRUE);
               return;
            }

            analptr = dfindanal(fileptr, options);
            if (analptr != NULL)
            {
               /* We have read in these options before.... check for
                  numprobes and moddates being different
               */

               tossarray = drfilediff(analptr, numentries, modvalid, &modtime,
                     fileptr->path);

               /* Check for conflicts of mapsuffix */
               if (suffixvalid)
               {
                  if (analptr->suffixvalid == 'N')
                  {
                     if (suffix != analptr->mapsuffix)
                     {
                        /* Generate a warning.... */
                        fprintf(stderr, "%s: warning: ignoring mapsuffix of '%s' for source file '%s'\n",
                              invokedname, suffix, pathtofname(currentdirectory, fileptr->path, 0));
                     }
                     /* Else, the two mapsuffix's are the same */
                  }
                  else
                  {
                     /* The new suffix is valid, but the old one wasn't */
                     analptr->mapsuffix = suffix;
                     analptr->suffixvalid = TRUE;
                  }
               }
               /* Else, the new suffix isn't valid */
            }
            else
            {
```

BEST AVAILABLE COPY

```
        /* We have read in this source file before, but this is a different
           set of options.  In this case, we will need to generate a
           *new* DR_ANAL structure...

           First, check for the very bad case of multiple options
           with same mapsuffixes
        */

        if (samesuffixes(fileptr, suffixvalid, suffix))
        {
           /* Very bad.  Ignore the array information
              Read in array, but ignore it */
           darrayread(numentries, NULL, TRUE);
           return;
        }
        analptr = draddanal(fileptr);
        analptr->options = options;      /* Store the options (it is a key) */

        drinitrpfile(analptr, numentries, modvalid, &modtime,
              suffixvalid, suffix);
        tossarray = FALSE;               /* Force reading array */
     }
   }

   /* Keep the highest protocol... */
   if (protocol > analptr->protocol)
      analptr->protocol = protocol;

   if (!tossarray)
   {
      /* If we do, in fact, add this array, increment the
         count for it */
      darraysadd(&analptr->numdumps, &analptr->dumpinfo, thisdump, numthisdump);
   }

   /* At this point, we are ready to read in (and or-in) the array information.
   */
   darrayread(numentries, analptr->array, tossarray);
}


/***************************************************************************/

/* FUNCTION */
/* static */ void
drinitrpfile(analptr, numentries, modvalid, modtime, suffixvalid,
      suffix)
register DR_ANAL *analptr;
int numentries;             /* Number of entries in 'array' */
boolean modvalid;           /* Whether or not the modification time is valid */
SMITHTIME *modtime;         /* the modification date/time */
boolean suffixvalid;        /* if TRUE, the suffix is valid */
```

BEST AVAILABLE COPY

```
char suffix;                    /* mapsuffix */

/*
 *     This routine is called to set initial values for the
 *     DR_ANAL entry.
 *
 */
{
   register int i;          /* general index */
   register boolean *bptr; /* for setting array values to FALSE */

   /* Initialize history information */
   analptr->numoldmodtimes = 0;
   analptr->numoldnumentries = 0;
   analptr->protocol = 0;          /* this will be set up later */
   analptr->mapexists = FALSE;
   analptr->mappath = NULL;

   /* Initialize certain values */
   analptr->modvalid = modvalid;
   if (modvalid)
      analptr->sourcemodtime = *modtime;

   if (suffixvalid)
   {
      analptr->suffixvalid = TRUE;
      analptr->mapsuffix = suffix;
   }
   else
   {
      analptr->suffixvalid = FALSE;
      /* Assume the default */
      analptr->mapsuffix = 'M';
   }

   analptr->numdumps = 0;

   /* Set up the array to numentries entries */
   analptr->numentries = numentries;
   bptr = analptr->array = (boolean *) malloc(sizeof(boolean) * numentries);

   for (i = 0; i < numentries; i++)
      *bptr++ = FALSE;
}


/*************************************************************************/

/* FUNCTION */
/* static */ void
drfoptional(rmodvalid, rmodtime, rsuffixvalid, rsuffix)
boolean *rmodvalid;     /* set this to FALSE if no "modtime" token */
```

BEST AVAILABLE COPY

```
SMITHTIME *rmodtime;     /* valid iff we have set rmodvalid to TRUE */
boolean *rsuffixvalid;   /* set to TRUE iff we get a :mapsuffix token */
char *rsuffix;           /* the suffix we find */

/*
 *     This is called when dumpline was ':file'.  This checks for
 *     :modtime and :mapsuffix tokens and their values.
 *
 *     If found, the appropriate values (rmodvalid, etc) are set and
 *     returned as shown above.
 *
 * RETURNS     If any error, we will set the global 'dumperror' to TRUE
 *           and generate an error message
 *
 */
{
   char *ptr;
   char *sufptr;          /* suffix returned by 'qstringread' */
   boolean havemod = FALSE;   /* if TRUE, we have read a :modtime */

   *rmodvalid = *rsuffixvalid = FALSE;    /* assume we read nothing */
   ptr = qstrtok(NULL);

   /* Remain in this loop until an error, or until we find the end of
      this string */
   while (ptr != NULL)
   {
      if (strcmp(ptr, ":mapsuffix") == 0)
      {
         /* Read in the suffix */
         ptr = qstrtok(NULL);
         if (ptr == NULL)
         {
            DUMPERROR(errfile);
            return;
         }

         sufptr = qstringread(ptr, NULL, &ptr);
         if (sufptr == NULL)
         {
            DUMPERROR(errfile);
            return;
         }
         *rsuffix = *sufptr;
         *rsuffixvalid = TRUE;
         /* Note that mapsuffix *must* be the last option on the line! */
         return;
      }

      if (strcmp(ptr, ":modtime") == 0)
      {
         if (havemod)
```

BEST AVAILABLE COPY

```
            {
               /* If we already have a modtime... */
               DUMPERROR(errfile);
               return;
            }

            havemod = TRUE;       /* remember that we have one */

            /* Attempt to read in the modification date/time */
            ptr = qstrtok(NULL);
            if (ptr == NULL)
            {
               DUMPERROR(errfile);
               return;
            }

            if (!smithfromstore(ptr, rmodtime))
            {
               DUMPERROR(errfile);
               return;
            }
            *rmodvalid = TRUE;       /* Flag that modtime is OK */
            ptr = qstrtok(NULL); /* Go on to next one */
            continue;
         }

         /* This isn't the token :modtime nor :mapsuffix.  Don't know
            how to handle it
         */
         DUMPERROR(errdump);
         return;
      }
   }


   /************************************************************************/

   /* FUNCTION */
   /* static */ boolean
   drinitoldmodtime(analptr, modvalid, modtime, used)
   register DR_ANAL *analptr;
   boolean modvalid;               /* if modtime is valid or not */
   SMITHTIME *modtime;             /* time to check & add */
   boolean used;                   /* if TRUE, we will use this data; else we are
                                      tossing it */

   /*
    *    This routine is called when we want to move
    *    modtime to the oldmodtime array (if modvalid is TRUE).
    *
    *    If modvalid is FALSE, this does nothing.
    *    Otherwise, we scan thru the existing entries in
```

```
 *     oldmodtimes to see if there is already one with this
 *     value.  If yes, this does nothing.  If no, this
 *     adds one to the list, setting 'dataused' to 'used'
 *
 *     If we added modtime to the list, this returns TRUE; else
 *     this returns FALSE.
 */
{
    register int i;
    register OLDTIMES *optr;

    if (!modvalid)
    {
#pragma BBA_IGNORE BBA_ALERT
        /*
            This should *never* happen, since this routine should
            only be called when we are making a decision based on
            modtimes....which we can't do if modtime is invalid!
        */
        return(FALSE);     /* Oh well.... */
    }

    for (i = 0, optr = analptr->oldmodtimes; i < analptr->numoldmodtimes;
            i++, optr++)
    {
        if (smithcmp(modtime, &optr->modtime) == 0)
        {
            /* Yes, this 'obsolete' time is already in the old list.
               Do not repeat it.
            */
            return(FALSE);
        }
    }

    /* Add this to the list (or, maybe, create the list) */
    if (analptr->numoldmodtimes == 0)
        analptr->oldmodtimes = (OLDTIMES *) malloc(sizeof(OLDTIMES) * INC_OLDARRAY);
    else
    {
        if ((analptr->numoldmodtimes % INC_OLDARRAY) == 0)
        {
            analptr->oldmodtimes = (OLDTIMES *) realloc(analptr->oldmodtimes,
                    sizeof(OLDTIMES) * (INC_OLDARRAY + analptr->numoldmodtimes));
        }
    }

    optr = &analptr->oldmodtimes[analptr->numoldmodtimes++];
    optr->modtime = *modtime;
    optr->dataused = used;
    return(TRUE);
}
```

BEST AVAILABLE COPY

```
/*************************************************************************/

/* FUNCTION */
/* static */ boolean
drinitoldnumentries(analptr, numentries)
register DR_ANAL *analptr;
int numentries;            /* numentries to add to list */

/*
 *    This routine is called when we want to move
 *    numentries to the oldnumentries array.
 *
 *    We scan thru the existing entries in
 *    oldnumentriess to see if there is already one with this
 *    value.  If yes, this does nothing.  If no, this
 *    adds one to the list...
 *
 *    If we added this one (i.e., it was not on the list), return TRUE;
 *    else return FALSE
 */
{
   register int i;
   register int *iptr;

   for (i = 0, iptr = analptr->oldnumentries; i < analptr->numoldnumentries;
         i++, iptr++)
   {
      if (*iptr == numentries)
      {
         /* Yes, this 'obsolete' numentries is already in the old list.
            Do not repeat it.
         */
         return(FALSE);
      }
   }

   /* Add this to the list (or, maybe, create the list) */
   if (analptr->numoldnumentries == 0)
      analptr->oldnumentries = (int *) malloc(sizeof(int) * INC_OLDARRAY);
   else
   {
      if ((analptr->numoldnumentries % INC_OLDARRAY) == 0)
      {
         analptr->oldnumentries = (int *) realloc(analptr->oldnumentries,
               sizeof(int) * (INC_OLDARRAY + analptr->numoldnumentries));
      }
   }
   analptr->oldnumentries[analptr->numoldnumentries++] = numentries;
   return(TRUE);
}
```

BEST AVAILABLE COPY

```
/***************************************************************************/

/* FUNCTION */
/* static */ boolean
drfilediff(analptr, numentries, modvalid, modtime, filename)
register DR_ANAL *analptr;     /* already-created analysis info for this file */
int numentries;                /* number of entries we just read in */
boolean modvalid;              /* if TRUE, modtime here is valid */
SMITHTIME *modtime;            /* just read-in modtime */
char *filename;                /* source file's name (for error messages) */

/*
 *     This routine is called when we read in a :file line and the
 *     <source_path> is the same as another :file line previously
 *     read in.
 *
 *     This decides whether or not the two files read in are the same;
 *     if yes, this returns FALSE and no modification is made to the
 *     data analptr points to.
 *
 *     If the two :files are different, this may issue a warning to stderr
 *     and toss one of the two sets of data (i.e., either keep what we
 *     have and return TRUE, or toss what we have and return FALSE)
 *
 *     Whatever the decision is based on, this enters the relevant
 *     data into the old* array, so that only one message per decision
 *     point is given...
 *
 * RETURNS      TRUE if the :array data following should be ignored,
 *              FALSE if the :array data following should be or-d in
 *              with analptr->array.
 *
 */
{
   boolean datesame = TRUE;    /* if dates the same, or at least one invalid */
   boolean numsame = TRUE;     /* if both numentries agree */
   int cmprtn;                 /* return value of smithcmp(), if called */
   boolean tossnew;            /* if TRUE, decision is to toss the new info */
   int tossnum;                /* numentries we are tossing, if different
                                  number of numentries */
   SMITHTIME tossdate;         /* smithdate we are tossing, if decision based
                                  on date  Note that we actually copy it... */
   register int i;             /* general register */
   register boolean *bptr;

   if (analptr->numentries != numentries)
      numsame = FALSE;

   if (analptr->modvalid && modvalid)
   {
      if ((cmprtn = smithcmp(&analptr->sourcemodtime, modtime)) != 0)
```

BEST AVAILABLE COPY

```
            datesame = FALSE;
    }

    /* If the dates are the same and the number of entries are the same,
       simply return FALSE (i.e., go ahead and read in the :array data)
    */
    if (datesame && numsame)
       return(FALSE);

    /* Oh, bummer.  The stuff is not the same.  We must decide what to keep/
       toss (and the warnings) based on 'dumpkeepold' and what is different
    */

    if (!numsame)
    {
       /* In this case, 'dumpkeepold' is irrelevant - we *must* toss one
          or the other.  If the dates are different, we will toss the oldest;
          else we will toss the one with the fewest number of branches
       */

       if (datesame)
       {
          /* We have the make the decision based on number of
             entries
          */
          if (analptr->numentries > numentries)
          {
             tossnew = TRUE;       /* what is stored has more entries */
             tossnum = numentries;
          }
          else
          {
             tossnew = FALSE;      /* new guy has more entries */
             tossnum = analptr->numentries;
             /* Remove old dump information */
             if (analptr->numdumps != 0)
             {
#pragma BBA_IGNORE /* this will always be taken, but why not be cautious? */
                darrayfree(analptr->dumpinfo);
             }
             analptr->numdumps = 0;
          }

          /* May need to print a message based on numentries.  Scan thru
             the oldnumentries array to see if tossnum is on the list.  If yes,
             no message; if no, message.  Note that this automagically
             adds 'tossnum' to the oldnumentries list if necessary....
          */
          if (drinitoldnumentries(analptr, tossnum))
          {
             fprintf(stderr, "%s: warning: skipping data from file %s showing %d branches\n",
                   invokedname, pathtofname(currentdirectory, filename, 0),
```

BEST AVAILABLE COPY

```
                    tossnum);
                fprintf(stderr, "date of both files is the same\n");
            }

        }
        else
        {
            /* We must dump some of the data, but we can make the decision
               based on dates! */
            if (cmprtn > 0)
            {
               tossdate = *modtime;
               tossnew = TRUE;
               tossnum = numentries;
            }
            else
            {
               tossnew = FALSE;
               tossdate = analptr->sourcemodtime;
               analptr->sourcemodtime = *modtime;
               tossnum = analptr->numentries;

               /* Free previous information about dumps... */
               if (analptr->numdumps != 0)
               {
#pragma           BBA_IGNORE /* this will always be taken, but why not be cautious? */
                  darrayfree(analptr->dumpinfo);
               }
               analptr->numdumps = 0;
            }

            /* May need to print a message based on dates.  Scan thru the
               oldsourcemodate array to see if we need to print a message
            */

            if (drinitoldmodtime(analptr, TRUE, &tossdate, FALSE))
            {
               fprintf(stderr, "%s: warning: skipping data from file %s showing %d branches\n",
                     invokedname, pathtofname(currentdirectory, filename, 0),
                     tossnum);
               fprintf(stderr, "date of file skipped is %s\n",
                     smithtoascii(&tossdate, DATEFORMAT));
            }
        }

        /* OK - we have decided which one to toss, and which one to keep. */

        /* If we are tossing the old data, we will need to re-do the boolean data
           array, because it's size has changed */
        if (!tossnew)
        {
```

BEST AVAILABLE COPY

```
            analptr->numentries = numentries;
            free(analptr->array);
            bptr = analptr->array = (boolean *) malloc(sizeof(boolean) * numentries);
            for (i = numentries; i > 0; i--)
               *bptr++ = FALSE;
         }
         return(tossnew);
      }

      /* Else, the number of entries is the same and the dates are different */

      if (dumpkeepold)
      {
         /* We were requested to retain old data... */
         if (drinitoldmodtime(analptr, modvalid, modtime, TRUE))
         {
            fprintf(stderr, "%s: warning: using data from multiple versions of file %s\n",
                  invokedname, pathtofname(currentdirectory, filename, 0));
         }
         return(FALSE);     /* do not ignore :array lines */
      }

      /* Must toss the oldest.... */
      if (cmprtn > 0)
      {
         tossdate = *modtime;
         tossnew = TRUE;
      }
      else
      {
         tossnew = FALSE;
         tossdate = analptr->sourcemodtime;

         /* Free previous information about dumps... */
         if (analptr->numdumps != 0)
         {
#pragma BBA_IGNORE /* this will always be taken, but why not be cautious? */
            darrayfree(analptr->dumpinfo);
         }
         analptr->numdumps = 0;
         analptr->sourcemodtime = *modtime;
      }

      /* May need to print a message based on dates.  Scan thru the
         oldsourcemodate array to see if we need to print a message
      */

      if (drinitoldmodtime(analptr, TRUE, &tossdate, FALSE))
      {
         fprintf(stderr, "%s: warning: skipping data from older version of file %s\n",
               invokedname, pathtofname(currentdirectory, filename, 0));
         fprintf(stderr, "date of skipped file is %s\n",
```

BEST AVAILABLE COPY

```
                smithtoascii(&tossdate, DATEFORMAT));
        }

        /* May need to clear out the old data.  Don't need to reallocate the
           array because the numentries is the same */

        if (!tossnew)
        {
           for (i = numentries, bptr = analptr->array; i > 0; i--)
              *bptr++ = FALSE;
        }

        return(tossnew);
     }


     /*****************************************************************************/

     /* FUNCTION */
     /* static */ void
     darrayread(numentries, array, tossarray)
     int numentries;         /* number of entries to expect */
     boolean *array;         /* start of the array */
     boolean tossarray;      /* if TRUE, read & toss the data */

     /*
      *     This routine is called when we expect to read in
      *     :array lines.  We will read in numentries of data,
      *     and will or it in (if !tossarray) to array.
      *
      *     If there is any error, we will set dumperror to TRUE
      *     and simply return.
      *
      *     We will return when we finish all the lines necessary to
      *     read in the array.  If there are any more :array lines,
      *     that is an error!
      *
      *     This will only depend on each character using the correct
      *     format; it will *not* assume a number-of-characters/line
      *
      *     Note that it is illegal (tho bizarre) that an :array line
      *     have nothing after it....
      */
     {
        register char *ptr;         /* pointer in the line */
        register char c;
        int numread;        /* number of bits read in */
        boolean keeparray;   /* inverse of tossarray, for speed */
        int numthisread;

        keeparray = !tossarray;
        numread = 0;
```

BEST AVAILABLE COPY

```
    while (numread < numentries)
    {
       /* Start a new line */
       if ((dumpline = freadline(dstream)) == NULL)
       {
          DUMPERROR("unexpected end of file");
          return;
       }

       dumplinenum++;     /* just read in this line number */
       if (*dumpline != ':')
          continue;       /* comment/unknown line */

       if (strncmp(dumpline, ":array ", 7) != 0)
       {
          DUMPERROR("expected ':array' line; did not find it");
          return;
       }

       /* Find the first non-blank after :array */
       ptr = dumpline + 7;
       while (((c = *ptr++) == ' ') || (c == '\t'))
          /* no action */;

       /* c points to a non-whitespace.  If eol, go to next line */
       if (c == '\0')
          continue;

       if ((numthisread = dreaddata(c, ptr, numentries - numread, array, keeparray))
             < 0)
       {
          return;     /* error! */
       }

       array += numthisread;
       numread += numthisread;
       /* Either finished reading in all data, or finished with all
          of the characters on this line... */
    }

    /* Finished reading in all the numentries we need to! */
 }


 /****************************************************************************/

 /* FUNCTION */
 int
 dreaddata(c, ptr, numleft, array, keeparray)
 register char c;            /* character ptr -1 points to */
 register char *ptr;
 int numleft;                /* amount of data outstanding */
```

BEST AVAILABLE COPY

```
register boolean *array;    /* place to stuff data */
boolean keeparray;          /* whether or not to keep it */

/*
 *    This is called to read in boolean data....
 *    It returns with the number of valid data read (-1 if error);
 *
 *    Note that, for large files, we spend a *lot* of time in this
 *    loop, so it is pretty much as optimized as possible right now...
 */
{
   register int numread = 0;      /* number of bytes read in */
   register char mask;            /* mask for bit significance */

   if (keeparray)
   {
      do
      {
         /* Quick check: is c a complete zero? */
         if (c == 0x40)
         {
            array += 6;
            numread += 6;
            continue;
         }

         /* Inspect c to see if it is in our range */
         if ((c & 0x40) == 0)
         {
            /* Character does not have bit 6 set! */
            DUMPERROR(errarray);
            return -1;
         }

         /* Decompose the bits in 'c' */
         mask = 0x20;
         do
         {
            if ((c & mask) != 0)
               *array++ = TRUE;     /* Or this information in */
            else
               array++;             /* or in '0' */

            mask = mask >> 1;       /* shift the mask over */
         }
         while ((++numread < numleft) && (mask != 0));

         /* Either finished reading in all data, or finished with this
            character... */
      }
      while ((numread < numleft) && ((c = *ptr++) != '\0'));
   }
   else
```

BEST AVAILABLE COPY

```
    {
       /* Not keeping the array, so... */
       do
       {
          /* Inspect c to see if it is in our range */
          if ((c & 0x40) == 0)
          {
             /* Character does not have bit 6 set! */
             DUMPERROR(errarray);
             return -1;
          }

          /* There could be up to 6 bits in the character.... */
          numread += 6;
       }
       while ((numread < numleft) && ((c = *ptr++) != '\0'));
    }

    /* In some cases, we may have incremented numread by it's maximum
       (i.e., keepold is FALSE or the last character was
       all zeros)
    */
    if (numread > numleft)
       numread = numleft;

    return numread;
 }


 /**********************************************************************/

 /* FUNCTION */
 /* static */ DR_ANAL *
 draddanal(fptr)
 RP_FILE *fptr;        /* RP_FILE structure to add an analysis struct to */

 /*
  *    This routine is called to add a pointer to an analysis
  *    structure to, and to malloc that DR_ANAL structure.
  *    It also increments fptr->numanal.
  *
  *    This allocates the array of pointers in INC_DRANAL increments....
  *
  */
 {
    int index;          /* index of entry we will add */
    DR_ANAL *analptr; /* new analysis structure we create */

    index = fptr->numanal++;

    if ((index % INC_DRANAL) == 0)
    {
```

BEST AVAILABLE COPY

```
        if (index == 0)
        {
           /* Initial allocation */
           fptr->anal = (DR_ANAL**) malloc(sizeof(DR_ANAL *) * INC_DRANAL);
        }
        else
        {
           /* Incremental allocation */
           fptr->anal = (DR_ANAL **) realloc(fptr->anal,
                 sizeof(DR_ANAL *) * (INC_DRANAL + index));
        }
    }

    analptr = fptr->anal[index] = (DR_ANAL *) mchunkalloc(sizeof(DR_ANAL));
    return(analptr);
}


/***********************************************************************/

/* FUNCTION */
DR_ANAL *
dfindanal(fileptr, options)
RP_FILE *fileptr;
PROBETYPE options;

/*
 *    This routine scans thru the analysis structures that
 *    'fileptr' has looking for one with 'options'.  If it
 *    cannot find it, this returns NULL.  Otherwise, this
 *    returns a pointer to it..
 *
 */
{
    register DR_ANAL **analptr;
    register int analindex;


    for (analindex = fileptr->numanal, analptr = fileptr->anal;
          analindex > 0;
          analindex--, analptr++)
    {
       if ((*analptr)->options == options)
          return(*analptr);
    }
    return(NULL);
}


/***********************************************************************/

/* FUNCTION */
```

BEST AVAILABLE COPY

```
/* static */ boolean
samesuffixes(fileptr, suffixvalid, mapsuffix)
RP_FILE *fileptr;
boolean suffixvalid;
char mapsuffix;

/*
 *    This is called when we detect that we have a new
 *    'option' (i.e., an option that has not already
 *    been read in).  This will check that all suffixes
 *    are valid ('cause we *need* those in order to
 *    do the merge later), and that different options
 *    do not have the same suffix.
 *
 *    If no suffix is detected, we will issue a warning
 *    and set fileptr->isanalyzed to FALSE (i.e., forbid
 *    analysis on this, because we will become
 *    terribly confused)
 *
 *    RETURN TRUE if there is some error
 *           FALSE if no errors
 */
{
    int analscan;
    DR_ANAL *analptr;

    if (!suffixvalid)
    {
       fprintf(stderr, "%s: error: cannot merge data for %s\n",
             invokedname, pathtofname(currentdirectory, fileptr->path, 0));
       fprintf(stderr, "(no map-suffix information; no analysis done for file)\n");
       fileptr->isanalyzed = FALSE;
       return (TRUE);
    }

    for (analscan = 0; analscan < fileptr->numanal; analscan++)
    {
       analptr = fileptr->anal[analscan];

       if (!analptr->suffixvalid)
       {
          fprintf(stderr, "%s: error: cannot merge data for %s\n",
                invokedname, pathtofname(currentdirectory, fileptr->path, 0));
          fprintf(stderr, "(no map-suffix information; no analysis done for file)\n");
          fileptr->isanalyzed = FALSE;
          return (TRUE);
       }

       if (analptr->mapsuffix == mapsuffix)
       {
          fprintf(stderr, "%s: error: cannot merge data for %s\n",
                invokedname, pathtofname(currentdirectory, fileptr->path, 0));
```

BEST AVAILABLE COPY

```
            fprintf(stderr, "(different -O= options have identical map-suffixes; no analysis done for file)\n");
            fileptr->isanalyzed = FALSE;
            return (TRUE);
         }
      }

      return(FALSE);
   }
```

Feb 03 15:52 1988  report/drtest.c Page 1

```
/*
 * FILE      $Header: drtest.c,v 1.9 87/11/03 08:43:52 hmgr Exp $
 *
 * AUTHOR       Bruce Erickson
 *
 * ONELINER Testing program for dump read routines.
 *
 * TABSTOPS 3
 *
 * CONDCOMP     PROFIL    - set up buffer for profiling...
 *
 * INSPECTED    date      - inspectors
 *
 * RCS      $Log: drtest.c,v $
 * Revision 1.9  87/11/03  08:43:52  08:43:52  hmgr ()
 * Author: bae@hplsdlc.hp.com
 * updated to pragmas
 *
 * Revision 1.8  87/10/02  12:18:35  12:18:35  hmgr ()
 * Author: bae@hplsdlc.hp.com
 * checkpoint before moving onward
 *
 * Revision 1.7  87/09/03  10:01:35  10:01:35  hmgr ()
 * Author: bae@hplsdlc.hp.com
 * added test of rfgetsort()
 *
 * Revision 1.6  87/07/02  09:12:39  09:12:39  bae (Bruce Erickson)
 * added stuff for profiling
 *
 * Revision 1.5  87/06/25  16:03:17  16:03:17  bae (Bruce Erickson)
 * added stuff for precise profiling
 *
 * Revision 1.4  87/06/24  15:53:21  15:53:21  bae (Bruce Erickson)
 * *** empty log message ***
 *
 * Revision 1.3  87/06/17  17:11:12  17:11:12  bae (Bruce Erickson)
 * Added some testing capibility
 *
 * Revision 1.2  87/06/15  10:10:06  10:10:06  bae (Bruce Erickson)
 * added -n option
 *
```

BEST AVAILABLE COPY

```
 * Revision 1.1  87/06/11  16:36:31  16:36:31  bae (Bruce Erickson)
 * Initial revision
 *
 *
 */
static char rcsid[] = "$Header: drtest.c,v 1.9 87/11/03 08:43:52 hmgr Exp $";
#include <stdio.h>
#include <boolean.h>
#include <model.h>
#include "smithdate.h"
#include "probe.h"
#include "report.h"
#ifdef PROFIL
#  include <mon.h>
#endif

#define DATEFORMAT   SMITH_DATEFILL | SMITH_DATEMDY | SMITH_TIMEHRMN |  SMITH_TIME24 | SMITH_TIMEFILL

/* GLOBALS */
char *invokedname;
char currentdirectory[1024];
boolean dumpkeepold = FALSE;     /* keep old files when reading in dump */

/* STATICS */
#  ifdef PROFIL
   static WORD monbuf[20000];
#  endif

/* EXTERNALS */
extern void dmaddmapinfo();
extern DR_DUMP *darrayget();
extern char *smithtoascii();
extern RP_FILE *rfnumtofile();
extern RP_FILE *rfgetsort();
extern char *pathtofname();
extern int optind;
extern char *optarg;
extern boolean drinput();
extern char *strrchr();

#ifdef PROFIL
   extern etext;
#endif

/* FORWARD */


/***************************************************************************/

/* FUNCTION */
int
main(argc, argv)
```

BEST AVAILABLE COPY

```
int argc;
char *argv[];

/*
 *    Usage:
 *       drtest [-anoms] <dumpfile>
 *
 *       -a : print array values...
 *       -n : print number of dumps for each file
 *       -o : keep old data in dump files if possible
 *       -m : add mapinformation and merge dumps
 *       -s : test rfgetsort()
 *
 */
#pragma BBA_IGNORE /* not for production */
{
   char *dumpfile;
   boolean error = FALSE;          /* if TRUE, command line error */
   boolean printarray = FALSE;     /* if TRUE, -a used */
   boolean prnumdumps = FALSE;     /* if TRUE, -n used */
   boolean domerge = FALSE;           /* if TRUE, -m used */
   boolean sorted = FALSE;         /* if TRUE, -s used */
   int c;

#  ifdef PROFIL
      monitor((int (*)()) 2, (int(*)()) &etext, monbuf, sizeof(monbuf) / sizeof(WORD), 5000);
      /* printf("etext = 0x%lx\n", &etext); */
#  endif

   /* Set up invokedname */
   invokedname = strrchr(argv[0], '/');
   if (invokedname == NULL)
      invokedname = argv[0];
   else
      invokedname++;    /* skip over slash */

   /* Set up currentdirectory variable */
   getcwd(currentdirectory, sizeof(currentdirectory));

   /* use getopt to fetch arguments.... */
   while ((c = getopt(argc, argv, "amnos")) != EOF)
   {
      switch(c)
      {
      case 'a' :  printarray = TRUE;
                  break;
      case 'm' :  domerge = TRUE;
                  break;
      case 'n' :  prnumdumps = TRUE;
                  break;
      case 'o' :  dumpkeepold = TRUE;
                  break;
```

BEST AVAILABLE COPY

```
         case 's' :  sorted = TRUE;
                     break;
         default  :  error = TRUE;
         }
      }

      if (error || (optind >= argc))
      {
         fprintf(stderr, "Usage: %s <file>\n", invokedname);
         exit(1);
      }

      dumpfile = argv[optind];

      if (!drinput(dumpfile))
         printf("drinput() returned FALSE\n");
      else
         printf("drinput() returned TRUE\n");

      if (printarray || prnumdumps)
      {
         doprinting(TRUE, printarray, prnumdumps);
      }

      if (domerge)
      {
         fflush(stdout);
         dmaddmapinfo();
         dmmergedumps();

         doprinting(FALSE, printarray, prnumdumps);
      }

#     ifdef PROFIL
         monitor((int (*)()) 0, (int(*)()) 0, 0, 0, 0);
         printf("< monitoring stopped >\n");
#     endif

      if (sorted)
      {
         RP_FILE *fptr;

         printf("Sorted list of file names is:\n");
         fptr = rfgetsort(TRUE);      /* get first one */
         while (fptr != NULL)
         {
            printf("   %s\n", fptr->path);
            fptr = rfgetsort(FALSE);
         }
      }

      return(0);
```

BEST AVAILABLE COPY

```
}


/***********************************************************************/

/* FUNCTION */
/*-- static -- */
doprinting(useanalinfo, array, numdumps)
boolean useanalinfo; /* if TRUE, use analinfo array; else
                        use anal only */
boolean array;        /* if TRUE, print values of array */
boolean numdumps;     /* if TRUE, print number of dumps */

/*
 *     This is called to print data associated with the data read in
 *     with each file...
 *
 */
#pragma BBA_IGNORE /* not for production */
{
   int32 snum;    /* scroll thru all source numbers */
   RP_FILE *fptr;
   register DR_ANAL *analptr;
   DR_DUMP *dptr;
   char *fname;
   register int i;   /* general register */
   int analindex;

   for (snum = 0; (fptr = rfnumtofile(snum)) != NULL; snum++)
   {
      fname = pathtofname(currentdirectory, fptr->path, 0);

      if (fptr->isanalyzed)
      {
         /* This is an 'analyzed' file... */
         printf("%s:\n", fname);
         analindex = 0;    /* in case useanalinfo is TRUE */
         do
         {
            /* Analindex is incremented at end of loop */

            if (useanalinfo)
            {
               if (analindex >= fptr->numanal)
                  break;      /* exit while loop this way, too! */
               analptr = fptr->anal[analindex];
            }
            else
               analptr = fptr->analinfo;


            if (numdumps)
```

BEST AVAILABLE COPY

```
        {
            printf("    number of dumps: %d", analptr->numdumps);
            if (fptr->numanal != 1)
                printf(" (options = 0x%X)", analptr->options);
            printf("\n");

            for (i = 0; i < analptr->numdumps; i++)
            {
                dptr = darrayget(analptr->dumpinfo, i);
                if (dptr == NULL)
                    printf("        %d: invalid\n", i);
                else
                {
                    printf("        %d: protocol = %d", i, dptr->protocol);
                    if (dptr->timevalid)
                        printf(", time = %s",
                            smithtoascii(&dptr->dumptime, DATEFORMAT));
                    else
                        printf(", time is invalid");
                    printf("\n");
                }
            }
        }

        if (array)
        {
            /* Print array values, in rows of (up to) 50 */
            for (i = 0; i < analptr->numentries; i++)
            {
                if ((i % 48) == 0)
                {
                    if (i != 0)
                        printf("\n    ");
                    else
                        printf("    ");
                }

                /* Then there is a space every 6 characters */
                if (((i % 6) == 0) && ((i % 48) != 0))
                    putc(' ', stdout);

                if (analptr->array[i])
                    putc('1', stdout);
                else
                    putc('0', stdout);
            }
            putc('\n', stdout);
        }

    /* If !useanalinfo, we only want to do this once.
       If useanalinfo, the check for overflow will cause
```

BEST AVAILABLE COPY

```
            us to exit
          */
          analindex++;
          }
          while (useanalinfo);
        }
    }
}
```

Feb 03 15:52 1988  report/genprobemap Page 1

```
#!/bin/sh
#
#     This shell script takes data from what should be
#  probe.h and creates a file that gives a mapping from
#  PROBETYPEs and PFLAGs to ascii values.....
#
#  usage:
#     genprobemap infile outfile
#

if [ $# != 2 ]
then
   echo "usage: $0 infile outfile"
   exit 1
fi

infile=$1
outfile=$2

rm -f $outfile

#  First the header....
cat >>$outfile <<EOF
/*
 *    CAUTION: Automatically generated file.  See 'genprobemap' script!
 *
 *    This file has the routines 'probemap' and 'pflagmap'.  They provide
 *    a mapping between probetype and pflagtype values and ascii representations
 *    of same.  Only for testing/debug purposes, of course!
 */


#include <stdio.h>
#include <boolean.h>
#include <model.h>
#include "probe.h"

/* The following structures have a value -> ascii pair, which
   is then put in an array.  The array's values are scanned
   until a match is found, and then we know the ascii representation -
   right?
```

BEST AVAILABLE COPY

```
*/
typedef struct
{
   PROBETYPE ptype;
   char *pascii;
} PROBE_MAP;

typedef struct
{
   PFLAGTYPE pflag;
   char *pfascii;
} PFLAG_MAP;

static PROBE_MAP probemaparray[] =
{
EOF

#  Now we scan the probe.h file.  The declarations are of the form
#  #define PT_FUNCTION  ((PROBETYPE) 0x0001) /* start of a function */
#
#     We will retain the declaration and the comment....

sed -e '/#define PT_/ !d
         /#define PT_NONFUNCTION/ d
         s/#define[  ]*/   { /
         s-((PROBETYPE).*)[   ]*/\*[   ]*\([^*]*\)[   ][   ]*\*/-, "\1"),-' < $infile >> $outfile

#  Now we finish the PROBE_MAP array and start the PFLAG_MAP array
cat >>$outfile <<EOF
);

static PFLAG_MAP pflagmaparray[] =
{
EOF

#  Now we scan the probe.h file.  The declarations are of the form
#  #define PF_IGNORE    0x0001      /* if we are to ignore this probe */
#
#  we will retain the declaration, and repeat the declaration in quotes...

sed -e '/#define PF_/ !d
         s/#define[  ]*/   { /
         s-\(PF_[^   ]*\).*$-\1, "\1"),-' < $infile >> $outfile


#  Now the trailer that has the code in it....
cat >>$outfile <<EOF
);

/*
 * This returns a pointer to a static string which describes
 * what this ptype is
```

BEST AVAILABLE COPY

```
 * It will return at most one description.
 */

char *
probemap(ptype)
PROBETYPE ptype;
{
   register int i;

# pragma BBA_IGNORE /* testing only */

   for (i = 0; i < (sizeof(probemaparray) / sizeof(PROBE_MAP)); i++)
   {
      if (ptype == probemaparray[i].ptype)
         return(probemaparray[i].pascii);
   }
   return("unknown probe type");
}

/*
 * This is called to request that the strings returned
 * by probemap() are capitalized.  It simply goes thru
 * the probemaparray and capitalizes each character
 */
probemapcapitalize()
{
   register int i;
   register char *ptr, c;

#pragma BBA_IGNORE /* testing only */
   for (i = 0; i < (sizeof(probemaparray) / sizeof(PROBE_MAP)); i++)
   {
      for (ptr = probemaparray[i].pascii; (c = *ptr) != '\0'; ptr++)
      {
         if ((c >= 'a') && (c <= 'z'))
            *ptr = (c - 'a') + 'A';
      }
   }
}

/*
 * This returns a pointer to a static string which describes
 * all the flags that 'flag' has.  The values are within
 * angle brackets.  If the flag is 0, this returns
 * "<no flags>"
 */

char *
pflagmap(flag)
PFLAGTYPE flag;
{
   static char string[80];
```

BEST AVAILABLE COPY

```
   register int i;
   int noflags = 1;

#pragma BBA_IGNORE /* testing only */
   string[0] = '<';
   string[1] = '\0';

   for (i = 0; i < (sizeof(pflagmaparray) / sizeof(PFLAG_MAP)); i++)
   {
      if ((flag & pflagmaparray[i].pflag) != 0)
      {
         if (!noflags)
            strcat(string, " ");

         strcat(string, pflagmaparray[i].pfascii);
         noflags = 0;
      }
   }

   if (noflags)
      return("<no flags>");
   strcat(string, ">");
   return(string);
}
EOF
```

Feb 03 15:52 1988 report/mapdb.c Page 1

```
/*
 * FILE      $Header: mapdb.c,v 1.6 87/11/03 08:43:45 hmgr Exp $
 *
 * AUTHOR       Bruce Erickson
 *
 * ONELINER Various routines to access the map database - testing only!
 *
 * TABSTOPS 3
 *
 * RCS       $Log: mapdb.c,v $
 * Revision 1.6  87/11/03  08:43:45  08:43:45  hmgr ()
 * Author: bae@hplsdlc.hp.com
 * updated to pragmas
 *
 * Revision 1.5  87/10/02  12:19:24  12:19:24  hmgr ()
 * Author: bae@hplsdlc.hp.com
 * checkpoint before moving onward
 *
 * Revision 1.4  87/09/28  13:26:38  13:26:38  hmgr ()
 * Author: bae@hplsdlc.hp.com
 * removed unused routines
 *
 * Revision 1.3  87/07/09  15:05:31  15:05:31  bae (Bruce Erickson)
 * added extern statement to make lint happy
```

BEST AVAILABLE COPY

```
 *
 * Revision 1.2  87/06/24  15:53:27  15:53:27  bae (Bruce Erickson)
 * *** empty log message ***
 *
 * Revision 1.1  87/06/01  12:16:41  12:16:41  bae (Bruce Erickson)
 * Initial revision
 *
 *
 */
static char rcsid[] = "$Header: mapdb.c,v 1.6 87/11/03 08:43:45 hmgr Exp $";
#include <stdio.h>
#include <boolean.h>
#include <model.h>
#include "ba.h"
#include "targetspec.h"
#include "map.h"
#include "probe.h"
#include "smithdate.h"
#include "report.h"

/* GLOBALS */

/* STATICS */

/* EXTERNALS */
extern RP_FILE *rfnumtofile();
extern int32 rfpathtonum();

/* FORWARD */

/**************************************************************************/

/* FUNCTION */

int
mrnumprobes(analinfo)
DR_ANAL *analinfo;    /* analysis structure that may contain map info */

/*
 *     This routine returns the number of probes in the
 *     specified map.  Note that mrinput() must have been read
 *     prior to this routine!
 *
 *     RETURNS the number of probes.  0 if no probes associated
 *     with this source.  -1 if mapnum is illegal, or cannot
 *     find mapfile for this mapnum.
 */
{

#pragma BBA_IGNORE /* not for production */
    if (!analinfo->mapexists)
    {
```

```
        return(-1);
    }

    return(analinfo->mapinfo->maxprobe + 1);
}


/***********************************************************************/

/* FUNCTION */
boolean
mrsourceinfo(analinfo, index, rpath, rsline, rscol, reline, recol)
DR_ANAL *analinfo;    /* analysis structure that (may) have a map */
int index;            /* probe index to fetch source ref for */
int32 *rpath;         /* (master) snum of the file in question */
int *rsline, *rscol; /* start line/column that is executed when
                        the probe is TRUE */
int *reline, *recol; /* last line/column that is executed when
                        the probe is TRUE */

/*
 *     This simply returns the requested information.  If found
 *     data is returned and this returns TRUE; else this returns
 *     FALSE.
 *
 */
{
    register MR_SOURCE *srcptr;

#pragma BBA_IGNORE /* not for production */

    if (!analinfo->mapexists)
    {
        return(FALSE);
    }

    if (index > analinfo->mapinfo->maxprobe)
        return(FALSE);     /* index out of range */

    srcptr = &analinfo->mapinfo->probes[index]->source;

    *rpath = srcptr->mastersnum;
    *rsline = srcptr->sline;
    *rscol = srcptr->scol;
    *reline = srcptr->eline;
    *recol = srcptr->ecol;
    return(TRUE);
}
```

BEST AVAILABLE COPY

BEST AVAILABLE COPY

```
/*
 * FILE     $Header: merge.c,v 1.7 87/11/06 08:47:10 hmgr Exp $
 *
 * AUTHOR      Bruce Erickson
 *
 * ONELINER Main routine for bbamerge function.
 *
 *    Overview:
 *       traverse thru rpfiles looking for a TRUE isanalyzed.
 *          find first non-NULL anal pointer; it's dumpinfo
 *          becomes 'master' - print it out.
 *          for all anal that have that dumpinfo:
 *             print out data for it
 *             set it's anal pointer to NULL (set isanalyzed to FALSE
 *                if all anal's are NULL)
 *       go back and traverse again.
 *
 *    Note that the data structures are thouroughly trashed at this
 *    point, so we can't continue an analysis....
 *
 * TABSTOPS 3
 *
 * INSPECTED   date     - inspectors
 *
 * RCS      $Log: merge.c,v $
 * Revision 1.7  87/11/06  08:47:10  08:47:10  hmgr ()
 * Author: bae@hplsdlc.hp.com
 * Force getopt to use invokedname when printing error messages
 *
 * Revision 1.6  87/11/03  08:44:45  08:44:45  hmgr ()
 * Author: bae@hplsdlc.hp.com
 * updated to pragmas
 *
 * Revision 1.5  87/10/02  12:19:31  12:19:31  hmgr ()
 * Author: bae@hplsdlc.hp.com
 * checkpoint before moving onward
 *
 * Revision 1.4  87/09/28  13:26:48  13:26:48  hmgr ()
 * Author: bae@hplsdlc.hp.com
 * no comment
 *
 * Revision 1.3  87/09/03  10:02:19  10:02:19  hmgr ()
 * Author: bae@hplsdlc.hp.com
 * changed name of prarray to bbaprarray sothat Minh could
 * use it in the emulation bbaunload command
 *
 * Revision 1.2  87/07/09  17:40:18  17:40:18  bae (Bruce Erickson)
 * Changed name of our prarray
 *
```

BEST AVAILABLE COPY

```
 * Revision 1.1  87/07/09  14:56:57  14:56:57  bae (Bruce Erickson)
 * Initial revision
 *
 *
 */
static char rcsid[] = "$Header: merge.c,v 1.7 87/11/06 08:47:10 hmgr Exp $";
#include <stdio.h>
#include <boolean.h>
#include <model.h>
#include "smithdate.h"
#include "probe.h"
#include "report.h"
#include "dumpfile.h"

/* GLOBALS */

/* STATICS */
FILE *outstream;      /* stream to write merged data to */

/* EXTERNALS */
extern boolean dumpkeepold;
extern DR_DUMP *darrayget();
extern RP_FILE *rfnumtofile();
extern char *invokedname;
extern char *optarg;
extern int optind;
extern boolean darraysame();

/* FORWARD */
extern void mergepranal();
extern void merge();
extern boolean mergeblock();
extern void mergeprdump();


/***************************************************************************/

/* FUNCTION */
int
mergemain(argc, argv)
int argc;
char *argv[];

/*
 *     This is the main routine for 'bbamerge'.  It is called from
 *     bbareport's main routine when the basename is 'bbamerge'.
 *     (this way we get to share object files..)
 *
 *     Usage:
 *        bbamerge [-o] [-i input-dumpfile] [output-dumpfile]
 *
 */
(
```

BEST AVAILABLE COPY

```
    int c;
    char *infile;       /* input file's name. */
    char *outfile;      /* output file's name. */
    boolean error = FALSE;      /* command line error */

    /* The default for both infile and outfile is 'bbadump.data' */
    infile = outfile = "bbadump.data";

    /* Force getopt to use the basename of this when reporting errors */
    argv[0] = invokedname;

    while ((c = getopt(argc, argv, "i:o")) != EOF)
    {
       switch(c)
       {
       case 'i' :
          infile = optarg;
          break;
       case 'o' :
          dumpkeepold = TRUE;
          break;
       default :
          error = TRUE;
          break;
       }
    }

    /* See if he asked for an output file */
    if (optind < argc)
       outfile = argv[optind++];

    if (error || (optind < argc))
    {
       fprintf(stderr, "Usage: %s [-o] [-i input-dumpfile] [output-dumpfile]\n",
             invokedname);
       return(1);      /* error */
    }

    /* Check to see if the output file is writeable.  I would hate to spend
       a lot of time compressing a file then go ahead and be unable
       to open the output for writing!  Note that we cannot simply
       open the file at this point, because they may be the same file..
    */

    if (access(outfile, 0) == 0)
    {
       /* File exists.. */
       if (access(outfile, 2) != 0)
       {
          fprintf(stderr, "%s: error: cannot write to file %s\n",
                invokedname, outfile);
          return(1);
```

```
        }
    }

    /* Ok - we can write the output file... (unless the directory
       is unwriteable, in which case we are messed up.  But you can't test
       that w/o a lot of trouble, so we won't).  Now we read in the dumpfile....
    */
    if (!drinput(infile))
    {
       /* that routine would have informed about the error, so we can just
          quit */
       return(2);
    }

    /* Open the output for writing */
    outstream = fopen(outfile, "w");
    if (outstream == NULL)
    {
#pragma  BBA_IGNORE /* probably cannot ever happen */
       fprintf(stderr, "%s: error: cannot write to file %s\n",
              invokedname, outfile);
       return(1);
    }

    /* Print the id of the file out */
    fprintf(outstream, ":id %s\n", DUMPID);

    /* Write the data out! */
    mergeblock();
    fclose(outstream);
    return(0);
}


/**************************************************************************/

/* FUNCTION */
static boolean
mergeblock()

/*
 *    This traverses thru the rpfiles, looking for the first one
 *    that is analyzed.  Find the first non-NULL anal pointer; that
 *    becomes the 'master'.  Print out the dumpinfo strings,
 *    then traverse the rpfiles *again* looking for all identical
 *    dumpinfos....
 *
 *    Note that subroutines will be setting isanalyzed to FALSE, and
 *    anal pointers to NULL appropriately.
 */
{
    int32 rpscan;               /* scanning thru rpinfo */
```

BEST AVAILABLE COPY

BEST AVAILABLE COPY

```
    register RP_FILE *rptr;
    int analscan;
    register DR_ANAL **analptr;
    DR_DARRAY *dumpinfo;

    for (rpscan = 0; rptr = rfnumtofile(rpscan); rpscan++)
    {
        if (rptr->isanalyzed)
        {
            for (analscan = 0, analptr = rptr->anal; analscan < rptr->numanal; analscan++, analptr++)
            {
                if (*analptr != NULL)
                {
                    /* All right!  This becomes our 'master'.  Print out the dump
                       record(s)
                    */
                    mergeprdump(dumpinfo = (*analptr)->dumpinfo);

                    /* Print *all* DR_ANAL's that have this same dumpinfo */
                    mergepranal(dumpinfo, rpscan);
                }
            }
        }
        else
        {
#pragma    BBA_IGNORE BBA_ALERT
            /* Since we are only taking data
               from the dumpfile (i.e., we have not scanned the
               mapfiles), there should be *no* non-analyzed files!
            */
        }
    }
}

/*************************************************************************/

/* FUNCTION */
static void
mergeprdump(dumpinfo)
DR_DARRAY *dumpinfo;

/*
 *    This routine will print out (all of the) dumps
 *    that this dumpinfo contains...
 *
 */
{
    int dumpnum;
    register DR_DUMP *dptr;

    for(dumpnum = 0; (dptr = darrayget(dumpinfo, dumpnum)) != NULL; dumpnum++)
```

```
    {
        fprintf(outstream, ":dump %d", dptr->protocol);
        if (dptr->timevalid)
        {
            fprintf(outstream, " :dumptime %s", smithtostore(&dptr->dumptime));
        }
        fputc('\n', outstream);
    }
}


/****************************************************************************/

/* FUNCTION */
static void
mergepranal(dumpinfo, firstsnum)
DR_DARRAY *dumpinfo;
int32 firstsnum;            /* first source's number to try */

/*
 *    Print out all data that has the same dumpinfo
 *
 */
{
    int32 rpscan;                /* scanning thru rpinfo */
    register RP_FILE *rptr;
    int analscan;
    register DR_ANAL **analptr;
    register DR_ANAL *aptr;

    for (rpscan = firstsnum; rptr = rfnumtofile(rpscan); rpscan++)
    {
        if (rptr->isanalyzed)
        {
            for (analscan = 0, analptr = rptr->anal; analscan < rptr->numanal; analscan++, analptr++)
            {
                /* Note: if a DR_ANAL has been previously printed, it will
                   have been set to NULL - and we don't want to print it again!
                */
                if (*analptr != NULL)
                {
                    aptr = *analptr;
                    if (darraysame(dumpinfo, aptr->dumpinfo))
                    {
                        /* Yup, print this one out.... */
                        fprintf(outstream, ":file %d %d %08X %s", aptr->protocol,
                              aptr->numentries, aptr->options, rptr->path);

                        if (aptr->modvalid)
                        {
                            fprintf(outstream, " :modtime %s",
                                  smithtostore(&aptr->sourcemodtime));
```

BEST AVAILABLE COPY

BEST AVAILABLE COPY

```
                        }

                        if (aptr->suffixvalid)
                        {
                           fprintf(outstream, " :mapsuffix @%c@", aptr->mapsuffix);
                        }
                        fputc('\n', outstream);

                        /* Dump the array, too */
                        bbaprarray(outstream, aptr->numentries, aptr->array);

                        /* Set this entry to NULL */
                        *analptr = NULL;
                     }
                  }
               }
            }
            else
            {
#pragma    BBA_IGNORE BBA_ALERT
               /* since all data is from dump file,
                  this should *never* happen! */
            }
      }
   }
Feb 03 15:52 1988  report/miscread.c Page 1

   /*
    * FILE       $Header: miscread.c,v 1.3 87/11/03 08:44:18 hmgr Exp $
    *
    * AUTHOR        Bruce Erickson
    *
    * ONELINER Misc. reading routines that are not specific to maps/dumps
    *
    *
    * TABSTOPS 3
    *
    * INSPECTED   date     - inspectors
    *
    * RCS        $Log: miscread.c,v $
    * Revision 1.3  87/11/03  08:44:18  08:44:18  hmgr ()
    * Author: bae@hplsdlc.hp.com
    * updated to pragmas
    *
    * Revision 1.2  87/10/02  12:19:40  12:19:40  hmgr ()
    * Author: bae@hplsdlc.hp.com
    * checkpoint before moving onward
    *
    * Revision 1.1  87/06/24  15:51:36  15:51:36  bae (Bruce Erickson)
    * Initial revision
    *
```

BEST AVAILABLE COPY

```
 -
 */
static char rcsid[] = "$Header: miscread.c,v 1.3 87/11/03 08:44:18 hmgr Exp $";
#include <stdio.h>
#include <boolean.h>
#include <model.h>
#include "probe.h"

/* GLOBALS */

/* STATICS */

/* EXTERNALS */

/* FORWARD */


/************************************************************************/

/* FUNCTION */
boolean
readoption(optptr, ptr)
register PROBETYPE *optptr;       /* pointer to option-bits to set */
register char *ptr;               /* string of options, stored as hex */

/*
 *    This routine is called to read in the options.
 *    If any error, this returns FALSE; else this returns
 *    TRUE and *optptr contains the value of the hex string
 *
 *    NOTE: this is the identical algorithm found in
 *    readpflags, but the type returned is different...
 */
{
#pragma BBA_IGNORE /* testing for readpflags is sufficient */
   register char c;

   *optptr = 0;

   while ((c = *ptr++) != '\0')
   {
      *optptr *= 16;

      if ((c >= '0') && (c <= '9'))
      {
         *optptr += c - '0';
         continue;
      }

      if ((c >= 'a') && (c <= 'f'))
      {
         *optptr += c - 'a' + 10;
```

BEST AVAILABLE COPY

```
            continue;
        }

        if ((c >= 'A') && (c <= 'F'))
        {
            *optptr += c - 'A' + 10;
            continue;
        }
        return(FALSE);    /* character not in hax range */
    }
    return(TRUE);
}


/**********************************************************************/

/* FUNCTION */
boolean
readpflags(pflagptr, ptr)
register PFLAGTYPE *pflagptr;    /* pointer to flags to set */
register char *ptr;              /* string of pflags, stored as hex */

/*
 *    This routine is called to read in the pflags.
 *    If any error, this returns FALSE; else this returns
 *    TRUE and *pflagptr contains the value of the hex string
 *
 */
{
    register char c;

    *pflagptr = 0;

    while ((c = *ptr++) != '\0')
    {
        *pflagptr *= 16;

        if ((c >= '0') && (c <= '9'))
        {
            *pflagptr += c - '0';
            continue;
        }

        if ((c >= 'a') && (c <= 'f'))
        {
 #pragma BBA_IGNORE
            /* I think I write out only capital hex digits,
               but why not be safe? */
            *pflagptr += c - 'a' + 10;
            continue;
        }

```

```
         if ((c >= 'A') && (c <= 'F'))
         {
            *pflagptr += c - 'A' + 10;
            continue;
         }
         return(FALSE);     /* character not in hax range */
      }
      return(TRUE);
   }
```

Feb 03 15:52 1988  report/mrinput.c Page 1

```
/*
 * FILE      $Header: mrinput.c,v 1.25 87/12/17 14:38:10 hmgr Exp $
 *
 * AUTHOR        Bruce Erickson
 *
 * ONELINER This routine is the actual read of the mapfile
 *
 * CONDCOMP PATHSEARCH   - if defined, search paths in BBAPATH
 *                         for mapping and source files
 *
 * TABSTOPS 3
 *
 * CONDCOMP define       - description
 *
 * INSPECTED   date      - inspectors
 *
 * RCS       $Log: mrinput.c,v $
 * Revision 1.25  87/12/17  14:38:10  14:38:10  hmgr ()
 * Author: bae@hplsdlc.hp.com
 * added PATHSEARCH ability
 *
 * Revision 1.24  87/12/11  14:25:27  14:25:27  hmgr ()
 * Author: bae@hplsdlc.hp.com
 * added mapcheck, so that maps can be loaded on demand
 *
 * Revision 1.23  87/11/06  08:46:35  08:46:35  hmgr ()
 * Author: bae@hplsdlc.hp.com
 * added checking for :cppver <version> on tahe :options lines
 *
 * Revision 1.22  87/10/28  17:02:01  17:02:01  hmgr ()
 * Author: bae@hplsdlc.hp.com
 * Fixed incorrect realloc allocation calculation
 *
 * Revision 1.21  87/10/08  16:55:33  16:55:33  hmgr ()
 * Author: bae@hplsdlc.hp.com
 * correct comment in readctlmac
 *
 * Revision 1.20  87/10/02  12:19:47  12:19:47  hmgr ()
 * Author: bae@hplsdlc.hp.com
 * checkpoint before moving onward
```

BEST AVAILABLE COPY

BEST AVAILABLE COPY

```
*
* Revision 1.19  87/09/28  13:27:00  13:27:00  hmgr ()
* Author: bae@hplsdlc.hp.com
* Fixed problem that prevented mapping of :ctl and :fname source
* file numbers to master source numbers
*
* Revision 1.18  87/08/17  18:23:54  18:23:54  hmgr ()
* Author: bae@hplsdlc.hp.com
* Changed so that target specific information is
* decided at runtime.
*
* Revision 1.17  87/08/05  16:03:53  16:03:53  hmgr ()
* Author: bae@hplsdlc.hp.com
* use qstrtok() for speed now!
*
* Revision 1.16  87/07/28  13:10:47  13:10:47  hmgr ()
* Author: bae@hplsdlc.hp.com
* Add stuff to set up MR_FUNCS linked list
*
* Revision 1.15  87/07/17  10:21:25  10:21:25  hmgr ()
* Author: bae@hplsdlc.hp.com
*
*
* Revision 1.14  87/07/16  12:51:52  12:51:52  hmgr ()
* Author: bae@hplsdlc.hp.com
* Fixed problem in getting map protocol
*
* Revision 1.13  87/07/09  17:40:06  17:40:06  bae (Bruce Erickson)
* added nodumpdata, used when running under mrtest, which prevents
* checking dates wrt analysis dates
*
* Revision 1.12  87/07/09  15:05:37  15:05:37  bae (Bruce Erickson)
* added stuff to check sourcemodtimes wrt data files
*
* Revision 1.11  87/07/02  09:12:02  09:12:02  bae (Bruce Erickson)
* changed type of invokedname.
* Updated calls to isinteger().
*
* Revision 1.10  87/06/25  16:03:23  16:03:23  bae (Bruce Erickson)
* Changed isinteger, so changed invocation
*
* Revision 1.9  87/06/24  15:53:31  15:53:31  bae (Bruce Erickson)
* *** empty log message ***
*
* Revision 1.8  87/06/17  17:10:44  17:10:44  bae (Bruce Erickson)
* moved readprobetype, readoption and readpflags out of this file...
*
* Revision 1.7  87/06/12  07:58:00  07:58:00  bae (Bruce Erickson)
* Change call to rfaddfile....
*
* Revision 1.6  87/06/04  15:57:09  15:57:09  bae (Bruce Erickson)
* added readoption, because PROBETYPE and PFLAGTYPE are nolonger
```

BEST AVAILABLE COPY

```
 * the same size.
 * Added system to verify that all probes are present.
 *
 * Revision 1.5  87/06/01  12:16:11  12:16:11  bae (Bruce Erickson)
 * Initialize sourcevalid to TRUE (which is default); set
 * source.ctlmac to NULL
 *
 * Revision 1.4  87/05/28  13:23:58  13:23:58  bae (Bruce Erickson)
 * Initially set maxprobe to -1 instead of 0.
 * When we expand xreflist, set new entries to -1 so we can detect
 * unset entries.
 *
 * Revision 1.3  87/05/21  14:28:49  14:28:49  bae (Bruce Erickson)
 * defined MAPWARNING (same as MAPERROR, but does not set
 * maperror to TRUE)
 * Enable getstring to fetch multiple lines if necessary
 *
 * Revision 1.2  87/05/13  08:30:04  08:30:04  bae (Bruce Erickson)
 * *** empty log message ***
 *
 * Revision 1.1  87/05/12  12:46:12  12:46:12  bae (Bruce Erickson)
 * Initial revision
 *
 *
 */
static char rcsid[] = "$Header: mrinput.c,v 1.25 87/12/17 14:38:10 hmgr Exp $";
#include <stdio.h>
#include <boolean.h>
#include <model.h>
#include "ba.h"
#include "targetspec.h"
#include "map.h"
#include "probe.h"
#include "smithdate.h"
#include "report.h"

/* Routines in here maintain a mapping between a mapfile's "sourcenum"
   and the global snum.  The 'xreflist' array maintains the mapping:
      xreflist[i]    returns the mastersnum of mapfile's sourcenum "i"
*/

/* Allocate xreflist array in increments of this */
#define XREF_INC  20

/* Allocate probe pointers array in increments of PROBE_INC (should
   be power of 2 for speed...) */
#define PROBE_INC 64

/* The following macro is used when are are scanning a line via qstrtok,
   and we want to do a 'maperror = TRUE; return' when qstrtok returns
   NULL
*/
```

BEST AVAILABLE COPY

```
#define NEXTTOK(ptr, msg) if ((ptr = qstrtok(NULL)) == NULL)\
                              {  \
                                 MAPERROR(msg); \
                                 return; \
                              }

/* The following macro will format an error message correctly, and
   set the maperror global to TRUE ... */
#define MAPERROR(msg)   maperror = TRUE; \
                        fprintf(stderr, "%s: %s: %d: %s\n", invokedname, \
                                pathtofname(currentdirectory, mapfile, 0),\
                                maplinenum, msg)

#define MAPWARNING(msg) fprintf(stderr, "%s: %s: %d: %s\n", invokedname, \
                                pathtofname(currentdirectory, mapfile, 0),\
                                maplinenum, msg)

/* The following macro is used when we want the next token
   read to be converted to an integer and placed in 'value'
*/
#define INTASSIGN(value, ptr, msg)  NEXTTOK(ptr, msg);\
                                    if (!isinteger(ptr, &value))\
                                    {\
                                       MAPERROR(msg);\
                                       return;\
                                    }

/* GLOBALS */
boolean nodumpdata = FALSE;   /* set to TRUE when running mrtest */

/* STATICS */
boolean maperror;           /* set to TRUE when we encounter an error */
static int32 *xreflist;     /* pointer to array of pointers to xref entries */
static int xrefalloc;       /* number of entries in xreflist that are allocated */

static FILE *mapstream;     /* stram file is attached to */
static char *mapfile;       /* name of map file we are reading */
static char *mapline;       /* the characters we just read */
static int maplinenum;      /* line of mapfile we are reading */
static int linelength;      /* number of bytes in the line we just read in */

static char errsource[] = "illegal ':source' line";
static char errprobe[] = "illegal ':probe' line";
static char erroption[] = "illegal ':option' line";

static boolean *dataarray;    /* if not NULL, array of data */

/* EXTERNALS */
extern void funcadd();
extern boolean dumpkeepold;
extern char *pathtofname();
extern int32 rfpathtonum();
```

BEST AVAILABLE COPY

```
extern int32 rfaddfile();
extern boolean fileid();
extern char *strcpy();
extern char currentdirectory[];
extern char *pathtofname();
extern char *qstringread();
extern boolean isinteger();
extern char *qstrtok();
extern char *strchr();
extern char *freadline();
extern RP_FILE *rfnumtofile();
extern char *strrchr();
extern boolean mrprobeinfo;
extern boolean mrsource;
extern void free();
extern char *malloc(), *realloc();
extern char *mchunkalloc();
extern char *invokedname;
extern boolean readprobetype();
extern boolean readpflags();
#ifdef PATHSEARCH
   extern char *psearchinit();
#endif

/* FORWARD */
extern char *readctl();
extern char *readctlmac();
extern char *readfname();
extern void mainreadloop();
extern void readsource();
extern void readprobe();
extern void readprobealways();
extern boolean readoption();
extern char *getstring();
extern boolean mrinput();


/*****************************************************************************/

/* FUNCTION */
boolean
mapcheck(rpfile, aptr)
RP_FILE *rpfile;                /* file structure */
register DR_ANAL *aptr;         /* analysis info structure */

/*
 *     This routine will check to see aptr->mapexists (i.e., the mapifno
 *     is valid).  If not, this attempts to read it in.  If failure
 *     (i.e., we cannot read in the data) this returns FALSE; else
 *     (the data is available) this returns TRUE
 *
 */
```

BEST AVAILABLE COPY

```
{
    if (!rpfile->isanalyzed)
#       pragma BBA_IGNORE BBA_ALERT   /* should never happen */
        return(FALSE);    /* inappropriate type! */

    if (aptr->mapexists && (aptr->mapinfo!= NULL))
        return(TRUE);     /* already have it available */

    if (aptr->mappath == NULL)
    {
        /* haven't tried to load it, or we loaded it and free'd it */
        if (mrinput(rpfile->path, aptr))
            return(TRUE);
    }
    /* either we have previously attempted to load and failed,
        or we just tried to load it and failed*/
    return(FALSE);


}


/**************************************************************************/

/* FUNCTION */
boolean
mrinput(sourcepath, analinfo)
char *sourcepath;        /* source file's name */
DR_ANAL *analinfo;       /* analysis info block to put data into */

/*
 *    This is called when we know that we have not attempted
 *    to read in the map information for this sourcepath/mapsuffix
 *    before.  Except in testing and in compression, this is called
 *    after we have read the (probe) data in.
 *
 *    If the mapfile does not exist, this sets the 'mapexists' field
 *    to FALSE, but leaves the 'mappath' field set to the map's filename
 *    (so that warnings/errors will work correctly).
 *
 *    If the mapfile *does* exist, the mapinfo structure is filled
 *    in only as much as is necessary to fulfill the requests of
 *    this report:
 *
 *       mrprobeinfo    fill in MR_PROBE structure  (not implemented)
 *       mrsource       fill in MR_SOURCE structure (not implemented)
 *
 *    If there is an error reading the mapfile, we will set the
 *    'mapexists' flag back to FALSE; we will have output an
 *    error message explaining why the mapfile is unavailable.
 *
 *    If the number of probes is not the same as the number of probes
```

BEST AVAILABLE COPY

```
 *     in the data, we will pretend that the mapfile doesn't exist after
 *     issuing an error message.
 *
 *     If the sourcemod times in the mapfile disagree with those in
 *     the dumpfile:
 *        if dumpkeepold is FALSE, we will issue a warning and pretend
 *        that the mapfile doesn't exist
 *        if dumpkeepold is TRUE, we will issue a warning and continue...
 *
 *     This also accumulates creates the MR_FUNC pointer 'thisfunc'.
 *     To be specific, this sets:
 *        funcname, firstprobe, dsnum
 *     The name of the function always comes after the rest of
 *     the data about the function in the map file
 *
 *     RETURN TRUE if we did read in the file; else FALSE...
 */
{
   int slength;
   char nmap[MAXPATH];
   char *lastslash;
   boolean hasmapfile = TRUE;
   register int i;   /* general index */
   MR_FILE *mapinfo;
   RP_FILE *fptr;     /* used to check date of .c file */
   char *spath;       /* sourcepath, unless PATHSEARCH is enabled */

   analinfo->mapexists = FALSE;     /* Assume file not there */

#  ifndef PATHSEARCH
      spath = sourcepath;
#  else
      if ((spath = psearchinit("BBAPATH", sourcepath)) == NULL)
         spath = sourcepath;     /* so we get correct error messages */
#  endif

   /* Figure out name of mapping file */
   slength = strlen(spath);
   strcpy(nmap, spath);
   if (nmap[slength - 2] == '.')
   {
      /* Oh goody - this is a <fname>.<ext> style file.  Just
         replace siffix with mapsuffix */

      nmap[slength - 1] = analinfo->mapsuffix;
   }
   else
   {
      /* The input file has no extension.  Is there enough room to
         add a .<mapsuffix>? */

      if ((lastslash = strrchr(nmap, '/')) == NULL)
```

BEST AVAILABLE COPY

```
        {
           laststash = nmap;     /* no slashes.... */
        }

        if ((slength - (lastslash - nmap) - 1) > 12)
        {
           /* Can't append a .M, so there must be some mistake... */
           hasmapfile = FALSE;
           fprintf(stderr, "%s: cannot derive a mapping file name for %s\n",
                 invokedname, pathtofname(currentdirectory, nmap, 0));
        }
        else
        {

           /* We *can* append a .%c! */
           sprintf(nmap, "%s.%c", spath, analinfo->mapsuffix);
        }
     }

     /* Is the filename in nmap a real mapping file? */
     if (hasmapfile && !fileid(nmap, FALSE, "r", MAPID, &mapstream, &maplinenum))
     {
        fprintf(stderr, "%s: cannot find %s, or it is not a mapping file\n",
              invokedname, pathtofname(currentdirectory, nmap, 0));
        hasmapfile = FALSE;
     }

     analinfo->mappath = malloc(strlen(nmap) + 1);
     strcpy(analinfo->mappath, nmap);

     if (!hasmapfile)
     {
        /* This file has no mapfile with it */

        return(FALSE);
     }

     analinfo->mapexists = TRUE;

     /* This file *has* a mapping file!
        Scan forward looking for:
           1) :source 0       (so we can get the modtime)
           2) :probe <index> (to find the maxindex)
     */
     mapfile = nmap;           /* stuff name in global area for error messages */


     mapinfo = analinfo->mapinfo = (MR_FILE *) mchunkalloc(sizeof(MR_FILE));
     mapinfo->masterfile = rfpathtonum(sourcepath);
     mapinfo->maxprobe = -1;     /* Show no probes at all */
     mapinfo->funcs = NULL;      /* set the function list to NULL */
     mapinfo->cppver = NULL;
```

BEST AVAILABLE COPY

```
dataarray = analinfo->array;

/* Initialize the xref array */
xreflist = (int32 *) malloc(sizeof(int32) * XREF_INC);
xrefalloc = XREF_INC;
for (i = 0; i < xrefalloc; i++)
   xreflist[i] = -1;     /* so we can detect uninitialized entries */

maperror = FALSE;
mainreadloop(mapinfo);

if (maperror)
   analinfo->mapexists = FALSE;      /* on error, pretend file does not exist */

fclose(mapstream);


/* Altho we don't set xrefalloc to 0, we could.... */

/* Check to see if the number of probes in the mapfile correspond with
   the number of probes in the data....
*/
if ((!maperror) && (!nodumpdata))
{
   if (analinfo->numentries != (mapinfo->maxprobe + 1))
   {
      fprintf(stderr, "%s: warning: mapfile '%s' has different number of probes\n",
            invokedname, pathtofname(currentdirectory, analinfo->mappath, 0));
      fprintf(stderr, "than the dump file shows; some functions disallowed for %s\n",
            pathtofname(currentdirectory, sourcepath, 0));
      analinfo->mapexists = FALSE;
      maperror = TRUE;
   }
   else
   {
      /* Check dates on the data and .c map file....
         The number of the .c file is always local snum 0, so
         it's easy to get the "master" snum
      */
      fptr = rfnumtofile(xreflist[0]);
      if (analinfo->modvalid && fptr->modvalid)
      {
         if (smithcmp(&analinfo->sourcemodtime, &fptr->filemodtime) != 0)
         {
            if (dumpkeepold)
            {
               /* Only issue a warning */
               fprintf(stderr, "%s: warning: mapfile '%s' shows different source date than dumpfile\n",
                     invokedname, pathtofname(currentdirectory, analinfo->mappath, 0));
            }
            else
            {
```

BEST AVAILABLE COPY

```
                        fprintf(stderr, "%s: warning: mapfile '%s' shows different source date than dumpfile\n",
                            invokedname, pathtofname(currentdirectory, analinfo->mappath, 0));
                        fprintf(stderr, "some functions disallowed for %s\n",
                            pathtofname(currentdirectory, sourcepath, 0));
                        analinfo->mapexists = FALSE;
                        maperror = TRUE;
                    }
                }
            }
        }
    }

    /* Delete the current xref array */
    free(xreflist);

    return(!maperror);
}


/**************************************************************************/

/* FUNCTION */
static void
mainreadloop(mapinfo)
MR_FILE *mapinfo;     /* root of structure we are getting values for */

/*
 *    This routine is called after we have read in the :id line and
 *    know this is a mapping file.  This then reads in the
 *    information and puts it in the RP_FILE
 *
 */
{
    register int i;           /* misc. integer */
    int protocol;             /* protocol of this dump */
    register MR_PROBE **probeptr;
    int maxprobe;
    char *ptr;
    char *restart;
    boolean haveprotocol = FALSE;    /* must find protocol before anything else */
    boolean haveoptions = FALSE;     /* set to TRUE when we find :options line */

    while((mapline = freadline(mapstream)) != NULL)
    {
        maplinenum++;      /* just read in this line number */
        linelength = strlen(mapline); /* store length */

        /* If previous read got an error, abort reading the file */
        if (maperror)
            break;
```

BEST AVAILABLE COPY

```
if (*mapline != ':')
   continue;          /* not a line we should recognize */

/* This is a map "control" line.  Check what it is... */
if (strncmp(mapline, ":protocol ", 10) == 0)
{
   /* This is the protocol of this file .. */
   ptr = mapline + 10;
   if ((!isinteger(ptr, &protocol)) || (protocol > MAXMAPPROTOCOL))
   {
      fprintf(stderr, "%s: Unable to read protocol level (%d) of map file %s\n",
            invokedname, protocol, pathtofname(currentdirectory, mapfile, 0));
      fprintf(stderr, "\t(current maximum protocol level for mapfiles is %d)\n",
            MAXMAPPROTOCOL);
      maperror = TRUE;
   }
   haveprotocol = TRUE;    /* Flag that we have the protocol information */
   continue;
}

/* This is not a :protocol line.  If we don't have one yet, we
   really don't know how to interpret the rest of the file... */

if (!haveprotocol)
{
   MAPERROR("no ':protocol' line, or ':protocol' line out of order");
   continue;      /* exit from loop when it sees maperror is TRUE */
}


if (strncmp(mapline, ":probe ", 7) == 0)
{
   readprobe(mapinfo);
   continue;
}

if (strncmp(mapline, ":source ", 8) == 0)
{
   readsource(mapinfo);
   continue;

}

if (strncmp(mapline, ":options ", 9) == 0)
{
   /* This line is the options that were used when the file was compiled */
   ptr = qstrtok(mapline);                  /* ptr = ":options" */
   NEXTTOK(ptr, erroption);                 /* ptr = "<options>" */
   if (!readoption(&mapinfo->options, ptr))
   {
      MAPERROR(erroption);
   }
```

BEST AVAILABLE COPY

```
            haveoptions = TRUE;

            ptr = qstrtok(NULL);     /* check for :cppver */
            if (ptr == NULL)
               continue;             /* not there; all is OK */

            mapinfo->cppver = getstring(ptr, &restart);  /* read in the string */
            continue;
         }
         MAPERROR("unknown control line");
      }

      /* Either EOF or error (depending on maperror variable).
         If EOF, generate error if no :options line
      */

      if ((!maperror) && (!haveoptions))
      {
         MAPERROR("no ':options' line");
      }

      if (!maperror)
      {
         /* Scan thru all of the probes.  If any of them are NULL, generate an error */
         maxprobe = mapinfo->maxprobe;
         for (i = 0, probeptr = mapinfo->probes; i <= maxprobe; i++, probeptr++)
         {
            if (*probeptr == NULL)
            {
               MAPERROR("missing at least one :probe line");
               break;
            }
         }
      }
   }


   /*************************************************************************/

   /* FUNCTION */
   static void
   readsource(mapinfo)
   MR_FILE *mapinfo;           /* adding info to this structure */

   /*
    *     This routine is called to parse the :source line.
    *     It is currently in 'mapline'
    *
    *     It will create an entry in the xreflist array, and enter
    *     the information into the master list if necessary.
    *
    */
```

BEST AVAILABLE COPY

```
{
   register char *ptr;  /* pointer to tokens */
   int localsnum;       /* snum in mapfile */
   int32 mastersnum;    /* master snum associated with localsnum */
   char *path;          /* path of source file */
   char *modtime;       /* (perhaps) modification date/time of file */
   int prevalloc;       /* previous allocation of xref (if we need to expand it) */
   register int i;      /* general index */
   RP_FILE *fptr;       /* to store modtimes */

   /* Skip ':source' to the snum */
   ptr = qstrtok(mapline);     /* ptr = ":source" */
   NEXTTOK(ptr, errsource);    /* ptr = "<snum>" */

   if (!isinteger(ptr, &localsnum))
   {
      MAPERROR(errsource);
      return;
   }

   /* Isolate the path */
   NEXTTOK(path, errsource);  /* path = "<path>" */

   /* Is there a :modtime */
   ptr = qstrtok(NULL);
   modtime = NULL;        /* assume no modtime */
   if (ptr != NULL)
   {
      modtime = NULL;
      if (strcmp(ptr, ":modtime") == 0)
      {
         /* Yes, there is the modtime here... */
         modtime = qstrtok(NULL);
         /* Note that modtime is set to NULL if qstrtok fails... */
      }

      if (modtime == NULL)
      {
         /* If it wasn't a :modtime, it must be an error */
         MAPERROR(errsource);
         return;
      }
   }

   /* Is there an entry for this path already? */
   mastersnum = rfpathtonum(path);

   if (mastersnum == -1)
   {
      /* New file */
      mastersnum = rfaddfile(path);
   }
```

BEST AVAILABLE COPY

```
    fptr = rfnumtofile(mastersnum);     /* fetch the RP_FILE structure */

    /* If modtime exists, translate it to the master file's
       modification date/time */

    if (modtime != NULL)
    {
       if (!smithfromstore(modtime, &fptr->filemodtime))
       {
          MAPERROR("error in modification date");
       }
       else
          fptr->modvalid = TRUE;     /* modtime is now valid */
    }

    /* Enter this file into the xref of local-to-master source numbers */
    if (localsnum >= xrefalloc)
    {
       /* get more memory for the xref list: just enough
          to cover what was requested, but in increments
          of XREF_INC. */
       prevalloc = xrefalloc;
       xrefalloc = ((localsnum + XREF_INC) / XREF_INC) * XREF_INC;

       xreflist = (int32 *) realloc(xreflist, sizeof(int32) * xrefalloc);

       /* Set the new data from prevalloc thru xrefalloc to -1, so we can
          detect unknown xrefs */
       for (i = prevalloc; i < xrefalloc; i++)
          xreflist[i] = -1;
    }

    /* Check to make sure we aren't overwriting a previous one */
    if (xreflist[localsnum] != -1)
    {
       MAPERROR(errsource);
       return;
    }

    xreflist[localsnum] = mastersnum;
 }


 /***************************************************************************/

 /* FUNCTION */
 static void
 readprobe(mapinfo)
 MR_FILE *mapinfo;

 /*
```

BEST AVAILABLE COPY

```
 *     This routine is called when a line of the form
 *     ":probe *" is found.  We will analyze the line, and
 *     enter the information into the RP_FILE->mapifno->probe
 *     correctly.
 *
 *     The line is currently in 'mapline'
 *
 *     If any errors occur, 'maperror' is set to FALSE and an
 *     error message sent to stderr.
 *
 */
{
   char *ptr;      /* general pointer */
   int probenum;  /* probe number */
   register MR_FILE *mrfile;
   register MR_PROBE *mrprobe;
   int alloc;      /* number of probes to allocated */
   register int i;   /* general index */
   boolean didallocate;    /* if TRUE, we did allocate more room for probes */


   /* Start scanning thru the line */
   ptr = qstrtok(mapline); /* ptr = ":probe" */
   NEXTTOK(ptr, errprobe);/* ptr = "<index> */


   if (!isinteger(ptr, &probenum))
   {
      MAPERROR(errprobe);
      return;
   }

   mrfile = mapinfo;

   /* Do we need to expand the probe array? */
   if (probenum >= mrfile->maxprobe)
   {
      didallocate = FALSE;
      /* Yes.  Note special case if we need to create it initially */
      if (mrfile->maxprobe == -1)
      {
         alloc = ((probenum + PROBE_INC) / PROBE_INC) * PROBE_INC;
         mrfile->probes = (MR_PROBE **) malloc(sizeof(MR_PROBE) * alloc);
         didallocate = TRUE;
      }
      else
      {
         /* We may not need to actually expand this if it will fit in
            the allocation incremental blocks */

         alloc = ((mrfile->maxprobe + PROBE_INC) / PROBE_INC) * PROBE_INC;
         if (probenum >= alloc)
```

BEST AVAILABLE COPY

```
            {
               /* Yes, we really do need to expand this! */.
               alloc = ((probenum + PROBE_INC) / PROBE_INC) * PROBE_INC;
               mrfile->probes = (MR_PROBE **) realloc(mrfile->probes,
                     sizeof(MR_PROBE) * alloc);
               didallocate = TRUE;
            }
         }

         /* If we expanded, set all probes to NULL so we can detect 'holes' */
         if (didallocate)
         {
            for (i = (mrfile->maxprobe <= -1) ? 0 : probenum; i < alloc; i++)
            {
               mrfile->probes[i] = NULL;
            }
         }
      }

      /* We are guaranteed that mrfile->probes[probenum] exists */

      mrfile->probes[probenum] = mrprobe = (MR_PROBE *) mchunkalloc(sizeof(MR_PROBE));

      /* If this probe number is greater than what is in the mrfile,
         update mrfile->maxprobe */

      if (probenum > mrfile->maxprobe)
         mrfile->maxprobe = probenum;

      /* Initialize probe information */
      mrprobe->sourcevalid = TRUE;      /* In the future, this may be FALSE when mrsource is FALSE */
      mrprobe->source.ctlmac = NULL;

      /* Read in the information that is always available */
      readprobealways(mrprobe);
      if (maperror)
         return;


      /* While there is something left on the line, read it in.  It is optional
         information */

      ptr = qstrtok(NULL);
      while ((ptr != NULL) && !maperror)
      {
         if (strcmp(ptr, ":fname") == 0)
         {
            ptr = readfname(&mrprobe->source.fname, mrfile, probenum);
            continue;
         }

         if (strcmp(ptr, ":ctl") == 0)
```

BEST AVAILABLE COPY

```
        {
           ptr = readctl(&mrprobe->source.ctl);
           continue;
        }

        if (strcmp(ptr, ":ctlmac") == 0)
        {
           ptr = readctlmac(&mrprobe->source.ctlmac, ptr);
           continue;
        }

        /* Don't know what this token is ... */
        MAPERROR(errprobe);
        break;
     }
}


/**************************************************************************/

/* FUNCTION */
static void
readprobealways(mrprobe)
register MR_PROBE *mrprobe;          /* place to stuff data */

/*
 *    This is called after we have parsed the <index> in the input line.
 *    It reads in the information that should always be there, and
 *    puts it in the MR_PROBE structure.  If there is any error,
 *    this sets maperror to TRUE and returns.
 *
 */
{
   register char *ptr;
   int localsnum;
   int32 mastersnum;

   NEXTTOK(ptr, errprobe);     /* should be <ptype> */

   if (!readprobetype(&mrprobe->probetype, ptr))
   {
      MAPERROR(errprobe);
      return;
   }

   NEXTTOK(ptr, errprobe);     /* ptr = "<pflags>" */
   if (!readpflags(&mrprobe->pflags, ptr))
   {
      MAPERROR(errprobe);
      return;
   }
```

BEST AVAILABLE COPY

```
    NEXTTOK(ptr, errprobe);          /* ptr = "<snum>" */
    if (!isinteger(ptr, &localsnum))
    {
       MAPERROR(errprobe);
       return;
    }

    if (localsnum >= xrefalloc)
    {
#pragma BBA_IGNORE /* this should *never* happen (if the mapfile is valid) */
       MAPERROR(errprobe);
       return;
    }

    if (xreflist[localsnum] == -1)
    {
       /* Attempt to reference a local source reference that
          was never defined in a :source line
       */
       MAPERROR(errprobe);
       return;
    }

    mastersnum = xreflist[localsnum];      /* translated to mastersnum */
    mrprobe->source.mastersnum = mastersnum;

    /* Read in escope, sline, scol, eline, & ecol */
    INTASSIGN(mrprobe->source.escope, ptr, errprobe)

    INTASSIGN(mrprobe->source.sline, ptr, errprobe)

    INTASSIGN(mrprobe->source.scol, ptr, errprobe)

    INTASSIGN(mrprobe->source.eline, ptr, errprobe)

    INTASSIGN(mrprobe->source.ecol, ptr, errprobe)

    return;
}


/**************************************************************************/

/* FUNCTION */
static boolean
readprobetype(typeptr, ptr)
PROBETYPE *typeptr;          /* probetype to read */
char *ptr;                   /* character pointer */

/*
 *    This routine is used to read probetype, assuming
 *    that ptr is pointing to it.
```

BEST AVAILABLE COPY

```
 *
 * RETURNS      FALSE if an error in ptr; TRUE if we read
 *              in probetype OK.
 *
 * SIDEEFFECTS *typeptr is set to probetype's value
 *
 */
{
   int intval;

   if (!isinteger(ptr, &intval))
      return(FALSE);     /* wrong format */

   PTINTTOPT(intval, *typeptr);
   return(TRUE);
}


/*************************************************************************/

/* FUNCTION */
static char *
readfname(mrfname, mrfile, probenum)
register MR_FNAME *mrfname;         /* fname structure to fill in */
MR_FILE *mrfile;                    /* function is in this file */
int probenum;                       /* first probe in function is this */

/*
 *    This routine is called after we have used qstrtok()
 *    and found the token ':fname'.  This reads in
 *    what follows and places it in the MR_FNAME structure
 *
 *    Also, thisfunc->funcname, firstprobe, and dsnum are set,
 *    then thisfunc is added to the hash table and MR_FILE.funcs
 *    linked list....
 *
 *    On any error, maperror is set to TRUE, and an error
 *    message is printed to stderr
 *
 *    The line is in 'mapline'
 *
 */
{
   char *ptr;
   char *restart;
   int localsnum;

   /* On entry, ptr is pointing to ":fname" */
   INTASSIGN(localsnum, ptr, errprobe);

   if (localsnum >= xrefalloc)
   {
```

BEST AVAILABLE COPY

```
#pragma BBA_IGNORE /* this should *never* happen (if the mapfile is valid) */
         MAPERROR(errprobe);
         return;
      }

      if (xreflist[localsnum] == -1)
      {
         /* Attempt to reference a local source reference that
            was never defined in a :source line
         */
         MAPERROR(errprobe);
         return;
      }

      mrfname->mastersnum = xreflist[localsnum];        /* translated to mastersnum */

      INTASSIGN(mrfname->sline, ptr, errprobe);
      INTASSIGN(mrfname->scol, ptr, errprobe);
      INTASSIGN(mrfname->eline, ptr, errprobe);
      INTASSIGN(mrfname->ecol, ptr, errprobe);

      ptr = getstring(ptr, &restart);
      if (ptr == NULL)
      {
         MAPERROR(errprobe);
         return(NULL);
      }
      mrfname->fname = ptr;
      funcadd(ptr, probenum, mrfile);
      return(qstrtok(restart));
}


/*************************************************************************/

/* FUNCTION */
static char *
readctl(mrctl)
register MR_CTL *mrctl;     /* ctl structure to fill in */

/*
 *    This routine is called after we have used qstrtok()
 *    and found the token ':ctl'.  This reads in
 *    what follows and places it in the MR_CTL structre
 *
 *    On any error, maperror is set to TRUE, and an error
 *    message is printed to stderr
 *
 *    The line is in 'mapline'
 */
{
   char *ptr;
```

BEST AVAILABLE COPY

```
    char *restart;
    int localsnum;

    /* On entry, ptr is pointing to ":ctl" */
    INTASSIGN(localsnum, ptr, errprobe);

    if (localsnum >= xrefalloc)
    {
#pragma BBA_IGNORE /* this should *never* happen (if the mapfile is valid) */
       MAPERROR(errprobe);
       return;
    }

    if (xreflist[localsnum] == -1)
    {
       /* Attempt to reference a local source reference that
          was never defined in a :source line
       */
       MAPERROR(errprobe);
       return;
    }

    mrctl->mastersnum = xreflist[localsnum];      /* translated to mastersnum */

    INTASSIGN(mrctl->sline, ptr, errprobe);
    INTASSIGN(mrctl->scol, ptr, errprobe);
    INTASSIGN(mrctl->eline, ptr, errprobe);
    INTASSIGN(mrctl->ecol, ptr, errprobe);

    ptr = getstring(ptr, &restart);
    if (ptr == NULL)
    {
       MAPERROR(errprobe);
       return(NULL);
    }
    mrctl->ctlstring = ptr;
    return(qstrtok(restart));
}


/***************************************************************************/

/* FUNCTION */
static char *
readctlmac(ctlmac, ptr)
char **ctlmac;        /* string to fetch */
char *ptr;            /* right after :fname */

/*
 *    This routine is called after we have used qstrtok()
 *    and found the token ':ctlmac'.  This reads in
 *    what follows and places it in the passed character pointer
 *
```

BEST AVAILABLE COPY

```
 *     On any error, maperror is set to TRUE, and an error
 *     message is printed to stderr
 *
 *     The line is in 'mapline'
 */
{
   char *restart;

   ptr = getstring(ptr, &restart);
   if (ptr == NULL)
   {
      MAPERROR(errprobe);
      return(NULL);
   }
   *ctlmac = ptr;
   return(qstrtok(restart));
}


/*************************************************************************/

/* FUNCTION */
static char *
getstring(ptr, rnext)
register char *ptr;
char **rnext;          /* continue scanning here */

/*
 *     This routine is passed a pointer to a
 *     string which qstrtok() has returned.
 *     This skips past the \0 which the qstrtok inserted,
 *     and uses qstringread() to read in the '@'-quoted
 *     string.  If none, this returns NULL; if there is one,
 *     this malloc's a string for it and returns the malloc'd
 *     string.
 *
 *     The passed pointer is within 'mapline'.  If we need to
 *     read in new lines, will will put them in mapline too.
 *
 * RETURNS     NULL if no '@' found; else pointer to malloc'd string
 *
 */
{
   char *newstring;
   boolean tryagain;

   ptr += strlen(ptr) + 1;     /* beyond the \0 inserted by qstrtok */

   /* If we are beyond the initial line length, quit */
   if ((mapline - ptr) >= linelength)
      return(NULL);

```

BEST AVAILABLE COPY

```
   if (strchr(ptr, '@') == NULL)
      return(NULL);     /* Must start on this line! */

   tryagain = FALSE;
   do
   {
      newstring = qstringread(ptr, &tryagain, rnext);
      if (tryagain)
      {
         /* Read in another line */
         if ((ptr = mapline = freadline(mapstream)) == NULL)
            return(NULL);
         maplinenum++;     /* just read in this line number */

         /* append a \n to line */
         newstring = qstringread("\n", &tryagain, rnext);
      }
   }
   while (tryagain);

   return(newstring);
}
```

Feb 03 15:52 1988 report/mrtest.c Page 1

```
/*
 * FILE      $Header: mrtest.c,v 1.15 87/11/06 08:46:18 hmgr Exp $
 *
 * AUTHOR       Bruce Erickson
 *
 * ONELINER Main program used to test the mapread functions
 *
 * TABSTOPS 3
 *
 * INSPECTED   date     · inspectors
 *
 * RCS      $Log: mrtest.c,v $
 * Revision 1.15  87/11/06  08:46:18  08:46:18  hmgr ()
 * Author: bae@hplsdlc.hp.com
 * added the -v option to print out cpp version information
 *
 * Revision 1.14  87/11/03  08:42:29  08:42:29  hmgr ()
 * Author: bae@hplsdlc.hp.com
 * updated place where sourcemodtimes are printed
 *
 * Revision 1.13  87/10/02  12:20:01  12:20:01  hmgr ()
 * Author: bae@hplsdlc.hp.com
 * checkpoint before moving onward
 *
 * Revision 1.12  87/08/03  16:14:35  16:14:35  hmgr ()
 * Author: bae@hplsdlc.hp.com
```

BEST AVAILABLE COPY

```
 * because call to smithtodate has changed...
 *
 * Revision 1.11  87/07/28  13:09:41  13:09:41  hmgr ()
 * Author: bae@hplsdlc.hp.com
 * set array to NULL to avoid problems in mrinput .
 *
 * Revision 1.10  87/07/09  17:39:55  17:39:55  bae (Bruce Erickson)
 * added nodumpdata, which prevents mrinput from checking dates in
 * analysis data area
 *
 * Revision 1.9  87/07/09  15:05:53  15:05:53  bae (Bruce Erickson)
 * *** empty log message ***
 *
 * Revision 1.8  87/07/02  09:11:55  09:11:55  bae (Bruce Erickson)
 * changed type of invokedname from array to pointer to char.
 *
 * Revision 1.7  87/06/24  15:53:49  15:53:49  bae (Bruce Erickson)
 * *** empty log message ***
 *
 * Revision 1.6  87/06/04  15:57:02  15:57:02  bae (Bruce Erickson)
 * Changed printing of options from 4 digits to 8
 *
 * Revision 1.5  87/06/01  12:16:05  12:16:05  bae (Bruce Erickson)
 * added -E, -p, and -r options
 *
 * Revision 1.4  87/05/28  13:26:09  13:26:09  bae (Bruce Erickson)
 * When we finish, exit with a '0' always.
 *
 * Revision 1.3  87/05/21  14:29:03  14:29:03  bae (Bruce Erickson)
 * prints options and strings now!
 *
 * Revision 1.2  87/05/13  08:30:25  08:30:25  bae (Bruce Erickson)
 * *** empty log message ***
 *
 * Revision 1.1  87/05/12  12:46:14  12:46:14  bae (Bruce Erickson)
 * Initial revision
 *
 *
 */
static char rcsid[] = "$Header: mrtest.c,v 1.15 87/11/06 08:46:18 hmgr Exp $";
#include <stdio.h>
#include <boolean.h>
#include <model.h>
#include "ba.h"
#include "probe.h"
#include "smithdate.h"
#include "report.h"

/* GLOBALS */
boolean mrprobeinfo = TRUE;
boolean mrsource = TRUE;
char *invokedname;
```

BEST AVAILABLE COPY

```
char currentdirectory[1024];
boolean dumpkeepold = TRUE;        /* keep old files when reading in dump */

/* STATICS */

/* EXTERNALS */
extern boolean nodumpdata;
extern char *getcwd();
extern char *malloc();
extern char *pathtofname();
extern int32 rfaddfile();
extern void exit();
extern boolean mrsourceinfo();
extern char *probemap();
extern char *pflagmap();
extern char *pathtofname();
extern char *fnametopath();
extern char *strrchr();
extern RP_FILE *rfnumtofile();
extern char *optarg;
extern int optind;

/* FORWARD */
extern char *makesafe();


/**************************************************************************/

/* FUNCTION */
main(argc, argv)
int argc;
char *argv[];

/*
 *     This main program is used to test the mapread functins.
 *     Usage:
 *
 *         mrtest -<options> mapfile [mapfile ... ]
 *
 *     <options>:
 *         -a : print info on all mastersourcefiles
 *         -t : print modtimes of each source file
 *         -e : print probe points as input to error(1)
 *         -E : print probe types in all capital letters
 *         -o : print options used...
 *         -s : print strings associated with certain probe info
 *         -p : print number of probes in the mapfile
 *         -r : print source references
 *         -v : print cpp version information/map file
 *
 */
#pragma BBA_IGNORE /* only for testing! */
```

BEST AVAILABLE COPY

```
(
    int c;
    boolean argerror = FALSE;
    boolean prmodtimes = FALSE;
    boolean prallfiles = FALSE;
    boolean prerror = FALSE;
    boolean proptions = FALSE;
    boolean prstrings = FALSE;
    boolean prnumprobes = FALSE;
    boolean prsourceref = FALSE;
    boolean prversion = FALSE;
    boolean capitalize = FALSE;
    int month, day, year, hour, minute, second, millisecond, microsecond;
    int32 snum;
    RP_FILE *fptr, *fptr2;
    char *string;
    int probenum;          /* for scanning thru the probes */
    char *fname;           /* file name of the fptr->path */
    int analindex;         /* which analysis index we are dealing with */
    DR_ANAL *analinfo;     /* analinfo we are dealing with */
    char *tz;


    /* Set up invokedname */
    invokedname = strrchr(argv[0], '/');
    if (invokedname == NULL)
       invokedname = argv[0];
    else
       invokedname++;     /* skip over slash */

    getcwd(currentdirectory, sizeof(currentdirectory));
    nodumpdata = TRUE;

    while ((c = getopt(argc, argv, "Eaetosprv")) != EOF)
    (
       switch(c)
       (
       case 'E' :  capitalize = TRUE;
                   break;
       case 'a' :  prallfiles = TRUE;
                   break;
       case 'e' :  prerror = TRUE;
                   break;
       case 't' :  prmodtimes = TRUE;
                   break;
       case 'o' :  proptions = TRUE;
                   break;
       case 'p' :  prnumprobes = TRUE;
                   break;
       case 'r' :  prsourceref = TRUE;
                   break;
       case 's' :  prstrings = TRUE;
```

BEST AVAILABLE COPY

```
                 break;
      case 'v' : prversion = TRUE;
                 break;
      default  : argerror = TRUE;
      }
   }

   if (argerror || (optind >= argc))
   {
      fprintf(stderr, "Usage: %s [-ateosprv] mapfile [mapfile...]\n", invokedname);
      exit(1);
   }

   if (capitalize)
   {
      /* Capitalize the strings which define what each probe
         point is
      */
      probemapcapitalize();
   }

   for (/* no init */; optind < argc; optind++)
   {
      /* Read the file in */
      snum = rfaddfile(argv[optind]);
      fptr = rfnumtofile(snum);
      /* Initialize the RP_FILE to be analyzed */
      fptr->isanalyzed = TRUE;
      fptr->numanal = 1;
      fptr->anal = (DR_ANAL **) malloc(sizeof(DR_ANAL *));
      analinfo = *fptr->anal = (DR_ANAL *) malloc(sizeof(DR_ANAL));
      analinfo->array = NULL;       /* set array to NULL so that we don't
                                       check it in mrinput() */
      analinfo->mapexists = FALSE;
      analinfo->mapinfo = NULL;
      analinfo->mapsuffix = 'M';
      mrinput(argv[optind], analinfo);
   }

   for (snum = 0; (fptr = rfnumtofile(snum)) != NULL; snum++)
   {
      fname = pathtofname(currentdirectory, fptr->path, 0);
      if (prallfiles)
      {
         printf("%2ld: '%s'", snum, fname);
         printf("; %s analyzed\n", fptr->isanalyzed ? "is" : "is not");
      }

      if (fptr->isanalyzed)
      {
         for (analindex = 0; analindex < fptr->numanal; analindex++)
         {
```

BEST AVAILABLE COPY

```
analinfo = fptr->anal[analindex];
if (prversion)
   printf("cpp version: '%s'\n", analinfo->mapinfo->cppver);

if (prnumprobes)
{
   int numprobes;

   numprobes = mrnumprobes(analinfo);
   printf("%s:  %d probes\n", fname, numprobes);
}


if (prallfiles)
{
   printf("    map %s exist\n",
         analinfo->mapexists ? "does" : "does not");
   if (analinfo->mappath != NULL)
      printf("    mappath = '%s'\n", analinfo->mappath);
}

if (analinfo->mapexists)
{
   printf("%s:\n", pathtofname(currentdirectory, analinfo->mappath, 0));

   if (proptions)
   {
      printf("   options = %08X\n", analinfo->mapinfo->options);
   }


   /* Cycle thru the probes */
   for (probenum = 0; probenum <= analinfo->mapinfo->maxprobe; probenum++)
   {
      if (prerror)
      {
         fptr2 = rfnumtofile(analinfo->mapinfo->probes[probenum]->source.mastersnum);
         printf("%s: %d: %s %s [%d] ",
               pathtofname(currentdirectory, fptr2->path, 0),
               analinfo->mapinfo->probes[probenum]->source.sline,
               probemap(analinfo->mapinfo->probes[probenum]->probetype),
               pflagmap(analinfo->mapinfo->probes[probenum]->pflags),
               probenum);
         if (ISPTYPE(analinfo->mapinfo->probes[probenum]->probetype, PT_FUNCTION))
         {
            printf(" '%s'\n", analinfo->mapinfo->probes[probenum]->source.fname.fname);
         }
         else
         {
            string = analinfo->mapinfo->probes[probenum]->source.ctlmac;
            if (string != NULL)
            {
```

BEST AVAILABLE COPY

```
                    printf("MAC '%s' ", makesafe(string));
                 }
                 else
                 {
                    string = analinfo->mapinfo->probes[probenum]->source.ctl.ctlstring;
                    if (string != NULL)
                    {
                       printf("'%s' ", makesafe(string));
                    }
                 }
                 printf("\n");
              }
           }


           if (prstrings)
           {
              if (ISPTYPE(analinfo->mapinfo->probes[probenum]->probetype, PT_FUNCTION))
              {
                 printf("%d: function '%s'\n", probenum,
                       analinfo->mapinfo->probes[probenum]->source.fname.fname);
              }
              else
              {
                 string = analinfo->mapinfo->probes[probenum]->source.ctl.ctlstring;
                 if (string != NULL)
                 {
                    printf("%d: ctlstring '%s'\n", probenum, string);
                 }
                 string = analinfo->mapinfo->probes[probenum]->source.ctlmac;
                 if (string != NULL)
                 {
                    printf("%d: ctlmac '%s'\n", probenum, string);
                 }
              }
           }
        }
     }  /* mapexists */
  }  /* was analyzed */

  if (prsourceref)
  {
     int index, sline, scol, eline, ecol;
     int32 pathnum;
     char *path;

     index = 0;
     if (!mrsourceinfo(analinfo, index, &pathnum, &sline, &scol, &eline, &ecol))
     {
        printf("%s: no probes at all\n", fname);
     }
     else
```

BEST AVAILABLE COPY

```
            {
                do
                {
                    path = pathtofname(currentdirectory, (rfnumtofile(pathnum))->path, 0);
                    printf("%d: %s, %d/%d thru %d/%d\n",
                          index, path, sline, scol, eline, ecol);
                    index++;
                }
                while (mrsourceinfo(analinfo, index, &pathnum, &sline, &scol, &eline, &ecol));
            }
        }

    }

    if (prmodtimes)
    {
        if (!smithtodate(&fptr->filemodtime,
                &year, &month, &day, &hour, &minute, &second, &millisecond, &microsecond,
                &tz))
        {
            printf("   sourcemodtime conversion FAILED\n");
        }
        else
        {
            printf("   sourcemodtime of %s is %02d/%02d/%04d %02d:%02d:%02d.%03d.%03d %s\n",
                    fname,
                    month, day, year, hour, minute, second, millisecond, microsecond, tz);
        }
    }
  }

  exit(0);
}


/**************************************************************************/

/* FUNCTION */
static char *
makesafe(instring)
char *instring;

/*
 *     This routine makes the specified string 'safe' for the -e option.
 *     It removes comments (replace '/' '*' with '(' '*' and '*' '/'
 *     with '*' ')'), replaces new-lienes with 'N', etc.
 *
 * RETURNS      pointer to static "safe-to-insert" string
 *
 */
#pragma BBA_IGNORE /* only for testing! */
{
```

BEST AVAILABLE COPY

```
   char mystring[500];
   register char *src;
   register char *dest;
   register char c;
   register char lastc = '\0';

   for (src = instring, dest = mystring;
         (c = *src) != '\0';
         src++, dest++)
   {
      switch(c)
      {
      case '*' :  if (lastc == '/')
                     *(dest - 1) = '(';      /* convert / * with ( * */
                  *dest = '*';
                  break;

      case '/' :  if (lastc == '*')
                     *dest = ')';
                  else
                     *dest = '/';
                  break;

      case '\n':  *dest = 'N';
                  break;
      default  :  *dest = c;
      }
      lastc = c;
   }
   *dest = '\0';
   return(mystring);
}
eb 03 15:52 1988  report/prarray.c Page 1

/*
 * FILE      $Header: prarray.c,v 1.4 87/10/02 12:20:12 hmgr Exp $
 *
 * AUTHOR       Bruce Erickson
 *
 * ONELINER print output array - version for bbamerge (because of boolean vs type)
 *
 * TABSTOPS 3
 *
 * INSPECTED   date      - inspectors
 *
 * RCS       $Log: prarray.c,v $
 * Revision 1.4  87/10/02  12:20:12  12:20:12  hmgr ()
 * Author: bae@hplsdlc.hp.com
 * checkpoint before moving onward
 *
 * Revision 1.3  87/09/03  10:02:52  10:02:52  hmgr ()
```

BEST AVAILABLE COPY

```
 * Author: bae@hplsdlc.hp.com
 * changed name of prarray to bbaprarray sothat Minh could
 * use it in the emulation bbaunload command
 *
 * Revision 1.2  87/07/09  17:40:24  17:40:24  bae (Bruce Erickson)
 * Changed name of our prarray
 *
 * Revision 1.1  87/07/09  14:56:59  14:56:59  bae (Bruce Erickson)
 * Initial revision
 *
 *
 */
static char rcsid[] = "$Header: prarray.c,v 1.4 87/10/02 12:20:12 hmgr Exp $";
#include <stdio.h>
#include <model.h>
#include <boolean.h>
#include "targetspec.h"

/* Number of columns printed out (max) */
#define NUMCOLS   72

/* GLOBALS */

/* STATICS */

/* EXTERNALS */

/* FORWARD */


/***********************************************************************/

/* FUNCTION */
bbaprarray(fp, numentries, arrayptr)
FILE *fp;           /* output goes to here */
register int numentries;   /* number of entries in the array */
register boolean *arrayptr;   /* array of booleans to print */

/*
 *    This will print out the array as defined in PROTOCOL.
 *    Note that the number of columns printed is 'NUMCOLS'
 *    (defined above).
 *
 */
{
   register int numinline;        /* number of characters in this line */
   register int cmask;            /* mask to or-in with c */
   register unsigned char c;      /* accumulate a character here */

   numinline = 0;
   while(numentries > 0)
   {
```

BEST AVAILABLE COPY

```
      /* At top of this loop, we just printed 'c', or
         are just starting... */

      c = 0x40;
      cmask = 0x20;
      do
      {
         if (*arrayptr++ != 0)
            c |= cmask;
      }
      while ((--numentries != 0) && ((cmask = cmask >> 1) != 0));

      /* Either ran out of entries or 'c' is full.  In either case,
         print out 'c', perhaps followed by a \n */
      if (numinline == 0)
         fputs(":array ", fp);

      fputc(c, fp);

      if (++numinline > (NUMCOLS - 1))
      {
         fputc('\n', fp);
         numinline = 0;
      }
   }

   /* Ran out of entries.  If numinline is not zero, print a new-line */
   if (numinline != 0)
      fputc('\n', fp);
}
```

Feb 03 15:52 1988  report/report.c Page 1

```
/*
 * FILE      $Header: report.c,v 1.15 87/12/17 14:38:26 hmgr Exp $
 *
 * AUTHOR       Bruce Erickson
 *
 * ONELINER Main routine for bbareport and bbamerge
 *
 *
 * TABSTOPS 3
 *
 * INSPECTED   date     - inspectors
 *
 * RCS      $Log: report.c,v $
 * Revision 1.15  87/12/17  14:38:26  14:38:26  hmgr ()
 * Author: bae@hplsdlc.hp.com
 * no comment
 *
 * Revision 1.14  87/12/11  14:25:47  14:25:47  hmgr ()
 * Author: bae@hplsdlc.hp.com
```

BEST AVAILABLE COPY

```
 * removed the call to dmaddmapinfo()
 *
 * Revision 1.13  87/11/24  11:53:05  11:53:05  hmgr ()
 * Author: bae@hplsdlc.hp.com
 * Made certain combinations of styles illegal
 *
 * Revision 1.12  87/11/06  08:47:30  08:47:30  hmgr ()
 * Author: bae@hplsdlc.hp.com
 * added -Dv option
 *
 * Revision 1.11  87/11/04  09:52:11  09:52:11  hmgr ()
 * Author: bae@hplsdlc.hp.com
 * forced error messages from getopt to use basename;
 * fixed problem with -D*'s error message
 *
 * Revision 1.10  87/11/03  12:39:13  12:39:13  hmgr ()
 * Author: bae@hplsdlc.hp.com
 * Prevent trailing two lines if no -D options
 *
 * Revision 1.9  87/11/03  08:43:06  08:43:06  hmgr ()
 * Author: bae@hplsdlc.hp.com
 * added -D* options
 *
 * Revision 1.8  87/10/06  10:41:05  10:41:05  hmgr ()
 * Author: bae@hplsdlc.hp.com
 * Implemented the -u option.
 *
 * Revision 1.7  87/10/02  12:20:46  12:20:46  hmgr ()
 * Author: bae@hplsdlc.hp.com
 * checkpoint before moving onward
 *
 * Revision 1.6  87/09/28  13:27:38  13:27:38  hmgr ()
 * Author: bae@hplsdlc.hp.com
 * no comment
 *
 * Revision 1.5  87/08/27  15:27:35  15:27:35  hmgr ()
 * Author: bae@hplsdlc.hp.com
 * fancied up the line-output header
 *
 * Revision 1.4  87/08/21  16:21:06  16:21:06  hmgr ()
 * Author: bae@hplsdlc.hp.com
 * If we cannot open the ignore file specified, exit without reporting
 * on options...
 *
 * Revision 1.3  87/08/14  11:07:34  11:07:34  hmgr ()
 * Author: bae@hplsdlc.hp.com
 * enable -i option
 * if no outopts were used, set the default
 *
 * Revision 1.2  87/07/28  13:12:18  13:12:18  hmgr ()
 * Author: bae@hplsdlc.hp.com
 * Apparently the -l option works pretty completely
```

BEST AVAILABLE COPY

```
 *
 * Revision 1.1  87/07/09  14:57:01  14:57:01  bae (Bruce Erickson)
 * Initial revision
 *
 *
 */
static char rcsid[] = "$Header: report.c,v 1.15 87/12/17 14:38:26 hmgr Exp $";
#include <stdio.h>
#include <boolean.h>
#include <model.h>
#include "smithdate.h"
#include "probe.h"
#include "report.h"

/* GLOBALS */
char *invokedname;          /* name we were invoked with (base part only) */
char currentdirectory[1024];
boolean dumpkeepold = FALSE;     /* keep old files when reading in dump */

/* Output options */
boolean outfuncsum = FALSE;      /* print function-by-function summary */
boolean outlines = FALSE;        /* print line numbers */
int outafter = -1;               /* source print/after branch */
int outbefore = -1;           /* source print/before branch */
int outinter;                 /* number of lines to print between control & exec'd */
boolean prpositions = FALSE;  /* if TRUE, print character positions when printing lines */

boolean docufiles = FALSE;    /* if TRUE, document bbarep version, and file info */
boolean docutotal = FALSE;    /* if TRUE, document total files, procedures, and branches */
boolean docuversion = FALSE;  /* if TRUE, document version of bbarep & bbacpp */


/* The following represent totals that are accumulated during the report.
   They are 'totals' in that they represent totals of all specified
   (-u or trailing command-line arguments) files or procedures
   *not* all files/procedures in the dumpfile!
*/
int rtotalbranches = 0;     /* total number of branches */
int rtotalhits = 0;         /* hits of non-ignored branches */
int rtotalignores = 0;      /* total number of ignored branches */
int rtotalalerts = 0;       /* hits of alert branches */

boolean debugrprint = FALSE;     /* debug printing enable/disable */
boolean debugignore = FALSE;     /* debug ignore enable/disable */
/* STATICS */

/* EXTERNALS */
extern void dmaddmapinfo();
extern void inituse();
extern void expandset();
extern boolean ffsaddfile();
extern char *getenv();
```

BEST AVAILABLE COPY

```
extern void footnotes();
extern char *getcwd();
extern void exit();
extern char *optarg;
extern int optind;
extern char *strrchr();

/* FORWARD */
extern void rpercents();


/*************************************************************************/

/* FUNCTION */
int
main(argc, argv)
int argc;
char *argv[];

/*
 *    This routine is used to control the output of the report generator.
 *    Also, it will do nothing except call 'merge' if the basename is
 *    'bbamerge'.
 *
 */
{
   int rvalue;

   setdebug();

   /* Create base name */
   if ((invokedname = strrchr(argv[0], '/')) == NULL)
      invokedname = argv[0];      /* already basename only */
   else
      invokedname++;              /* now point at basename only */

   /* Set up currentdirectory variable */
   getcwd(currentdirectory, sizeof(currentdirectory));

   if (strcmp(invokedname, "bbamerge") == 0)
   {
      /* Do merge function... */
      rvalue = mergemain(argc, argv);
      exit(rvalue);
   }

   report(argc, argv);
}


/*************************************************************************/
```

BEST AVAILABLE COPY

```
/* FUNCTION */
static
report(argc, argv)
int argc;
char *argv[];

/*
 *    Main program for 'bbareport'.
 *    Options:
 *        -oFpSsl -d<dumpfile> -aN -bN -u<usefile> -i<ignorefile> -c<catenatefile> -e <tabs>
 *        -D <document options>
 *
 *    Does not return (this does an exit)
 *
 */
{
    int c;
    boolean error = FALSE;
    char *dumpfile = "bbadump.data";    /* dump file's name */
    boolean nooutopts = TRUE;     /* if TRUE, no output options chosen */
    boolean docuonly = TRUE;      /* if TRUE, only -D* requests made.. */
    boolean docu = FALSE;         /* if TRUE, we havea a -D option */

    /* output options */
    boolean prfootnotes = TRUE;       /* print footnotes */
    boolean percents = FALSE;     /* print % of coverage */

    inituse();     /* in case any -i or -u options (or trailing args) .... */

    /* Force getopt to use the basename of this when reporting errors */
    argv[0] = invokedname;

    /* Fetch options ... */
    while ((c = getopt(argc, argv, "D:FLSa:b:d:e:i:lopsu:")) != EOF)
    {
        switch(c)
        {
        case 'D' :        /* documentation options */
            while (*optarg != '\0')
            {
                switch (*optarg)
                {
                case 'f' :  docufiles = TRUE;
                            break;
                case 't' :  docutotal = TRUE;
                            break;
                case 'v' :  docuversion = TRUE;
                            break;
                default  :  fprintf(stderr, "%s: unknown documentation option -D%c\n",
                                invokedname, *optarg);
                            error = TRUE;
                }
```

BEST AVAILABLE COPY

```
            optarg++;       /* move on to next option */
         }
         nooutopts = FALSE;
         docu = TRUE;
         break;
      case 'F' :        /* Do not print footnotes out */
         prfootnotes = FALSE;
         break;
      case 'S' :        /* print percentages */
         percents = TRUE;
         nooutopts = FALSE;
         docuonly = FALSE;
         break;
      case 'a' :
         outafter = atoi(optarg);
         percents = TRUE;
         nooutopts = FALSE;
         docuonly = FALSE;
         break;
      case 'b' :
         outbefore = atoi(optarg);
         nooutopts = FALSE;
         percents = TRUE;
         docuonly = FALSE;
         break;
      case 'c' :     /* never implemented? */
#        pragma BBA_IGNORE
         fprintf(stderr, "%s: -'%c' unimplemented\n", invokedname, c);
         error = TRUE;
         break;
      case 'd' :     /* change from default dumpfile */
         dumpfile = optarg;
         break;
      case 'e' :     /* set tab expansion */
         expandset(atoi(optarg));
         break;
      case 'i' :
         if (!ffsaddfile(FALSE, optarg))     /* Read in the file */
         {
            exit(1);
         }
         break;
      case 'l' :
         outlines = TRUE;
         percents = TRUE;
         nooutopts = FALSE;
         docuonly = FALSE;
         break;
      case 'o' :        /* retain old data */
         dumpkeepold = TRUE;
         break;
      case 'p' :        /* print character positions */
```

BEST AVAILABLE COPY

```
            prpositions = TRUE;
            break;
        case 's' :
            /* Note that this is the default! */
            outfuncsum = TRUE;
            percents = TRUE;     /* -s implies -S */
            nooutopts = FALSE;
            docuonly = FALSE;
            break;
        case 'u' :
            if (!ffsaddfile(TRUE, optarg))      /* Read in the file */
            {
                exit(1);
            }
            break;
        default :
            error = TRUE;
        }
    }

    /* If a command-line error, print a usage message */
    if (error)
    {
        fprintf(stderr, "%s: usage: [options] [file|function ....]\n",
                invokedname);
        fprintf(stderr, "\t-FSlops -e <tabs> -aN -bN\n");
        fprintf(stderr, "\t-d <dumpfile>\n");
        fprintf(stderr, "\t-u <usefile>\n");
        fprintf(stderr, "\t-i <ignorefile>\n");
        fprintf(stderr, "\t-c <catenatefile>\n");
        fprintf(stderr, "\t-D[ftv]\n");
        exit(1);
    }

    /* Check for illegal combinations of inputs */
    if ((outafter != -1) || (outbefore != -1))
    {
        if (outlines)
        {
            fprintf(stderr, "%s: cannot combine -l with -aN or -bN\n", invokedname);
            error = TRUE;
        }
        if (outfuncsum)
        {
            fprintf(stderr, "%s: cannot combine -s with -aN or -bN\n", invokedname);
            error = TRUE;
        }
    }

    if (outlines && outfuncsum)
    {
        fprintf(stderr, "%s: cannot combine -l with -s\n", invokedname);
```

BEST AVAILABLE COPY

```
      error = TRUE;
   }

   if (error)
      exit(1);        /* nyaah, nyaah, nyaah!!!! */

   if (nooutopts)
   {
      /* User did not choose any output options... select
         the -s option by default */
      outfuncsum = TRUE;
      percents = TRUE;      /* -s implies -S */
      nooutopts = FALSE;
   }

   /* Set default outinter, which is the number of lines to print
      between the control statement and the executed statement.
      Only used if both are not -1
   */

   /* Use the minimum */
   outinter = (outafter > outbefore) ? outbefore : outafter;
   if (outinter < 2)
      outinter = 2;      /* after all, it takes a line to print the warning! */

   /* Pick up any filenames or functions that follow */
   for (/* no init */; optind < argc; optind++)
   {
      flsadd(TRUE, argv[optind]);
   }

   /* Ok.  Read in the dump file */
   if (!drinput(dumpfile))
      exit(10);

   /* Read in as much of the map files as we can */
   /* dmaddmapinfo(); - done on the fly to avoid too much memory usage */

   /* If there is any merging that needs to be done, do it! */
   dmmergedumps();

   if (outlines)
   {
      /* Put up the line header */
      if (prpositions)
         printf("___range_of_code________#_explanation_________________\n");
      else
         printf("range_of_code____#_explanation________________________\n");
   }

   if (outfuncsum)
   {
```

BEST AVAILABLE COPY

```
        /* put up the summary header */
        fputs(RP_FUNCHDR, stdout);
    }

    /* Scan thru the dump file structure, printing sources, lines,
        and function summaries as necessary.  Also accumulate data
        needed by the rpercents() routine...
    */
    reportscan();

    /* Perhaps print the percentage summary .... */
    if (percents)
    {
        rpercents();
    }

    if (prfootnotes)
        footnotes();

    if (docu && !docuonly)
        printf("\n\n");        /* seperate documentation output */

    document();

    exit(0);
}


/*************************************************************************/

/* FUNCTION */
static void
rpercents()

/*
 *    This routine prints the percentage summary.
 *    If done, this is always at the *end* of a report.
 *
 *
 */
{
    float branches, hits;       /* floating-point versions */
    float coverage;

    branches = rtotalbranches;
    hits = rtotalhits;

    if (rtotalbranches != 0)
    {
        coverage = 100.0 * (hits / branches);
        printf("%d out of %d %sbranches executed (%5.2f%%)\n",
                rtotalhits, rtotalbranches,
```

BEST AVAILABLE COPY

```
                (rtotalignores == 0) ? "" : "retained ",
                coverage);
    }
    else
    {
       printf("%d out of %d %sbranches executed\n",
                rtotalhits, rtotalbranches,
                (rtotalignores == 0) ? "" : "retained ");
    }

    if (rtotalalerts != 0)
    {
       printf("[ %d alert branches executed ]\n", rtotalalerts);
    }

    if (rtotalignores != 0)
    {
       printf("[ %d branches were ignored ]\n", rtotalignores);
    }

    /* Should we print out what -O= options were enabled? */

}


/*************************************************************************/

/* FUNCTION */
setdebug()

/*
 *     This sets debug variables as described by the
 *     Ba_debuG shell variable...
 *
 *
 */
#pragma BBA_IGNORE /* not for production */
{
    char *ptr;
    char c;
    char *start;
    int length;
    char temp[1024];

    ptr = getenv("Ba_debuG");

    if (ptr == NULL)
       return;


    while ((c = *ptr++) != '\0')
    {
```

BEST AVAILABLE COPY

```
        switch(c)
        {
        case 'i' :  debugignore = TRUE;
                    break;
        case 'p' :  debugrprint = TRUE;
                    break;
        }
    }
}
```

Feb 03 15:52 1988  report/rfiles.c Page 1

```
/*
 * FILE      $Header: rfiles.c,v 1.9 87/11/03 08:42:01 hmgr Exp $
 *
 * AUTHOR       Bruce Erickson
 *
 * ONELINER Deal with the RP_FILE structures
 *
 *    This maintains a list of source files (both .h files
 *    and .c files).  The basic access method is via a
 *    'mastersourcenum', which is an entry into the
 *    mastersources array.  The second entry is
 *    by the path name of a file; to make this entry
 *    quicker a hashed list indexing to the mastersources
 *    array is also maintained.
 *
 *    A third access method is alphebetically based on the
 *    path name; to support this, a (doubly) linked list is created.
 *    In adding, the list is linearly searched from the end,
 *    because if the files are in order, it will likely
 *    be alphabetized.  When the files are accessed, of
 *    course, the forward links are used.
 *
 * TABSTOPS 3
 *
 * INSPECTED   date      - inspectors
 *
 * RCS      $Log: rfiles.c,v $
 * Revision 1.9  87/11/03  08:42:01  08:42:01  hmgr ()
 * Author: bae@hplsdlc.hp.com
 * initialize modvalid to false
 *
 * Revision 1.8  87/10/02  12:20:58  12:20:58  hmgr ()
 * Author: bae@hplsdlc.hp.com
 * checkpoint before moving onward
 *
 * Revision 1.7  87/09/28  13:27:50  13:27:50  hmgr ()
 * Author: bae@hplsdlc.hp.com
 * Added support for cannotread field in RP_FILE structure
 *
 * Revision 1.6  87/09/03  10:01:11  10:01:11  hmgr ()
```

BEST AVAILABLE COPY

```
 * Author: bae@hplsdlc.hp.com
 * added the rfgetsort() routines
 *
 * Revision 1.5  87/08/05  17:53:45  17:53:45  hmgr ()
 * Author: bae@hplsdlc.hp.com
 * use mchunkalloc for speed
 *
 * Revision 1.4  87/07/09  15:06:01  15:06:01  bae (Bruce Erickson)
 * added some extern statements to make lint happy
 *
 * Revision 1.3  87/06/24  15:53:54  15:53:54  bae (Bruce Erickson)
 * *** empty log message ***
 *
 * Revision 1.2  87/06/12  07:58:12  07:58:12  bae (Bruce Erickson)
 * Changed rfaddfile() so that all you pass is a path,
 * and it initiailazes everything to FALSE or NULL
 *
 * Revision 1.1  87/05/12  12:46:17  12:46:17  bae (Bruce Erickson)
 * Initial revision
 *
 *
 */
static char rcsid[] = "$Header: rfiles.c,v 1.9 87/11/03 08:42:01 hmgr Exp $";
#include <stdio.h>
#include <boolean.h>
#include <model.h>
#include "probe.h"
#include "smithdate.h"
#include "report.h"

/* Number of entries in the array to increase at a time */
#define RP_FILE_INC  20
#define RP_HASH_NUM  127

typedef struct rphashentry
{
   char *path;                 /* pointer to path */
   int32 mastersourcenum;      /* the mastersourcenum of this path */
   struct rphashentry *next;   /* if not NULL, another path that hashed to here */
   struct rphashentry *listprev, *listnext;  /* linked list ... */
} RP_HASHENTRY;

/* GLOBALS */

/* STATICS */
static RP_FILE **mastersources;     /* pointer to array of pointers to file info */
static int32 nummastersources = 0;  /* number of entries in mastersources */
static RP_HASHENTRY *rphashtable[RP_HASH_NUM];

/* listroot.listnext is the first in the linked list, and
   listroot.listprev is the last in the linked list
*/
```

BEST AVAILABLE COPY

```
static RP_HASHENTRY listroot = {NULL, 0, NULL, NULL, NULL};

/* EXTERNALS */
extern char *strcpy();
extern char *malloc();
extern char *mchunkalloc();
extern char *realloc();

/* FORWARD */
extern int rfhash();
extern RP_HASHENTRY *rfhashcheck();


/****************************************************************************/

/* FUNCTION */
int32
rfaddfile(path)
char *path;

/*
 *      This routine is called to create an entry in the hash table
 *      and files list for the given pathname.
 *
 *      If 'path' is already in the list, this simply returns
 *      it's mastersnum; else this creates a new entry and
 *      set's the following values:
 *         path is a malloc'd copy of 'path' paramater
 *         isanalyzed = FALSE
 *         modvalid = FALSE
 *         cannotread = FALSE
 *         mappath = NULL
 *         mapinfo = NULL
 *         analinfo = NULL
 *
 */
{
   register RP_HASHENTRY *hashptr;
   register RP_HASHENTRY *scan;          /* for traversing the list */
   register RP_FILE *fileptr;
   int32 new;

   /* Check to see if 'path' is already in list */
   hashptr = rfhashcheck(path, TRUE);
   if (hashptr->mastersourcenum != -1)
      return(hashptr->mastersourcenum);

   /* Not in list.  Add at end of list */
   fileptr = (RP_FILE *) mchunkalloc(sizeof(RP_FILE));
   hashptr->mastersourcenum = new = nummastersources++;

   hashptr->path = fileptr->path = malloc(strlen(path) + 1);
```

BEST AVAILABLE COPY

```
    strcpy(fileptr->path, path);
    fileptr->isanalyzed = fileptr->modvalid = fileptr->cannotread = FALSE;
    fileptr->numanal = 0;
    fileptr->analinfo = NULL;       /* no merged information yet */

    /* Now enter fileptr to the mastersources array for rapid
       indexing via masternum.
       Do we need to expand the array of pointers? */
    if ((new % RP_FILE_INC) == 0)
    {
       if (new == 0)
          mastersources = (RP_FILE **) malloc(sizeof(RP_FILE *) * RP_FILE_INC);
       else
          mastersources = (RP_FILE **) realloc(mastersources, sizeof(RP_FILE *) *
                  (new + RP_FILE_INC));
    }
    mastersources[new] = fileptr;

    /* Finally, add this path to the linked list */
    if (listroot.listnext == NULL)
    {
       listroot.listnext = listroot.listprev = hashptr;
       hashptr->listprev = hashptr->listnext = &listroot;
    }
    else
    {
       /* Traverse list in reverse order.... */
       scan = listroot.listprev;

       while(TRUE)
       {
          /* Add after scan if
             1) hashptr's path is after scan's path
             2) we are at the beginning of the list
          */
          if ((scan->path == NULL) || strcmp(hashptr->path, scan->path) > 0)
          {
             /* Add hashptr after scan */
             (scan->listnext)->listprev = hashptr;
             hashptr->listnext = scan->listnext;
             scan->listnext = hashptr;
             hashptr->listprev = scan;
             break;
          }
          scan = scan->listprev;
       }

    }

    return(new);
}
```

BEST AVAILABLE COPY

```
/*************************************************************************/

/* FUNCTION */
RP_FILE *
rfnumtofile(sourcenum)
int32 sourcenum;      /* mastersourcenum of file */

/*
 *     This is called when we want to get information about a file
 *     that we know the mastersourcenum of.
 *
 * RETURNS      NULL if sourcenum not in correct range; else
 *              pointer to RP_FILE info about this
 *
 */
{
   if ((sourcenum < 0) || (sourcenum >= nummastersources))
   {
      return(NULL);
   }
   return(mastersources[sourcenum]);
}


/*************************************************************************/

/* FUNCTION */
int32
rfpathtonum(path)
char *path;       /* file name to get number of */

/*
 *     This is called to fetch the master source number related
 *     to a path.  If there is no, this returns -1.
 *
 */
{
   RP_HASHENTRY *hashentry;

   if ((hashentry = rfhashcheck(path, FALSE)) == NULL)
      return(-1);

   return(hashentry->mastersourcenum);
}


/*************************************************************************/

/* FUNCTION */
RP_FILE *
rfgetsort(start)
```

BEST AVAILABLE COPY

```
boolean start;     /* if TRUE, start at beginning of list */

/*
 *    This routine either returns the first (alphabetically) path,
 *    or the next (when start is FALSE); it returns NULL when the
 *    previosu one was the end-of-list
 *
 */
{
   static RP_HASHENTRY *ptr;        /* last one returned */

   /* If no files, or if we returned NULL last time, don't croak! */
   if ((listroot.listnext == NULL) || ((ptr == NULL) && !start))
      return(NULL);

   if (start)
   {
      ptr = listroot.listnext;
   }
   else
   {
      ptr = ptr->listnext;
      if (ptr == &listroot)
         ptr = NULL;    /* mark end-of-list */
   }
   if (ptr == NULL)
      return(NULL);

   return(mastersources[ptr->mastersourcenum]);
}

/***********************************************************************/

/* FUNCTION */
/*-- static -- */ RP_HASHENTRY *
rfhashcheck(path, make)
char *path;        /* path to hash & find an entry for */
boolean make;      /* if TRUE and if path is not in list, make an
                      entry for it */


/*
 *    This routine takes a given path and finds the equivalent
 *    hashentry for it.  If non exists
 *    if make is TRUE:
 *       this will create one
 *       in the appropriate spot and return it if make is true; the new entries
 *       mastersourcenum will be -1, and *nothing* else is filled
 *       in except the 'next' pointer (BEWARE: this means that
 *       path isn't filled in either!)
 *    else
 *       return NULL
```

BEST AVAILABLE COPY

```
 *
 */
{
   int hashvalue;
   RP_HASHENTRY *ptr;
   RP_HASHENTRY *lastptr;

   hashvalue = rfhash(path);      /* fetch hash for this */

   lastptr = ptr = rphashtable[hashvalue];

   /* Does it already exist? */
   while (ptr != NULL)
   {
      if (strcmp(ptr->path, path) == 0)
         return(ptr);        /* found it! */
      lastptr = ptr;
      ptr = ptr->next;       /* go to next one */
   }

   /* Totally new.  Create a new one or return NULL */
   if (!make)
      return(NULL);

   ptr = (RP_HASHENTRY *)mchunkalloc(sizeof(RP_HASHENTRY));
   ptr->mastersourcenum = -1;
   ptr->next = ptr->listnext = ptr->listprev = NULL;

   if (lastptr == NULL)
      rphashtable[hashvalue] = ptr;
   else
      lastptr->next = ptr;     /* add at end of list */

   return(ptr);
}


/***************************************************************************/

/* FUNCTION */
/*-- static -- */ int
rfhash(path)
register char *path;     /* hash this path */

/*
 *     this routine does a quick hash on the path.
 *     Returns an int from 0 thru RP_HASH_NUM-1
 *
 */
{
   register int accum = 0;
   register char c;
```

BEST AVAILABLE COPY

```
    while ((c = *path++) != '\0')
    {
       if ((accum += c) >= RP_HASH_NUM)
          accum -= RP_HASH_NUM;
    }
    return(accum);
 }
```

Feb 03 15:52 1988 report/strcheck.c Page 1

```
/*
 * FILE      $Header: strcheck.c,v 1.3 87/10/02 12:21:37 hmgr Exp $
 *
 * AUTHOR       Bruce Erickson
 *
 * ONELINER Various routines to verify strings
 *
 * TABSTOPS 3
 *
 * RCS       $Log: strcheck.c,v $
 * Revision 1.3  87/10/02  12:21:37  12:21:37  hmgr ()
 * Author: bae@hplsdlc.hp.com
 * checkpoint before moving onward
 *
 * Revision 1.2  87/06/25  16:03:40  16:03:40  bae (Bruce Erickson)
 * Always did an 'isinteger'/'atoi', so decided to
 * combine them...
 *
 * Revision 1.1  87/05/12  12:46:18  12:46:18  bae (Bruce Erickson)
 * Initial revision
 *
 *
 */
static char rcsid[] = "$Header: strcheck.c,v 1.3 87/10/02 12:21:37 hmgr Exp $";
#include <stdio.h>
#include <boolean.h>

/* GLOBALS */

/* STATICS */

/* EXTERNALS */

/* FORWARD */


/*************************************************************************/

/* FUNCTION */
boolean
isinteger(string, valueptr)
```

BEST AVAILABLE COPY

```
register char *string;        /* pointer to a \0 terminated string */
int *valueptr;                /* pointer to value to return */

/*
 *    This routine returns TRUE if all characters in string
 *    are [0-9].
 *
 *    If they are, this also
 *    returns the value of the integer
 *
 */
{
   register char c;
   register int val = 0;

   while ((c = *string++) != '\0')
   {
      if ((c < '0') || (c > '9'))
         return(FALSE);
      val *= 10;
      val += c - '0';
   }
   *valueptr = val;
   return(TRUE);
}
Feb 03 15:53 1988  report/funcs.c Page 1

/*
 * FILE      $Header: funcs.c,v 1.5 88/01/06 18:47:04 hmgr Exp $
 *
 * AUTHOR       Bruce Erickson
 *
 * ONELINER Handle the MR_FUNC hash table & linked lists..
 *
 * TABSTOPS 3
 *
 * INSPECTED   date     - inspectors
 *
 * RCS      $Log: funcs.c,v $
 * Revision 1.5  88/01/06  18:47:04  18:47:04  hmgr ()
 * Author: bae@hplsdlc.hp.com
 * got rid of some unused functions
 *
 * Revision 1.4  87/11/03  08:42:44  08:42:44  hmgr ()
 * Author: bae@hplsdlc.hp.com
 * updated to using pragmas
 *
 * Revision 1.3  87/10/02  12:19:08  12:19:08  hmgr ()
 * Author: bae@hplsdlc.hp.com
 * checkpoint before moving onward
 *
```

```
 * Revision 1.2  87/07/28  13:11:48  13:11:48  hmgr ()
 * Author: bae@hplsdlc.hp.com
 * no comment
 *
 * Revision 1.1  87/07/22  17:18:57  17:18:57  hmgr ()
 * Initial revision
 *
 *
 */
static char rcsid[] = "$Header: funcs.c,v 1.5 88/01/06 18:47:04 hmgr Exp $";
#include <stdio.h>
#include <boolean.h>
#include <model.h>
#include "ba.h"
#include "targetspec.h"
#include "map.h"
#include "probe.h"
#include "smithdate.h"
#include "report.h"

#define FHASHNUM 127    /* hash array length */
typedef struct fhash
{
   MR_FUNC *mrfunc;     /* pointer to an MR_FUNC structure, whose funcname
                           hashes to this value */
   struct fhash *next;  /* if not NULL, another funcname hashed to same value */
} FHASH;
/* GLOBALS */

/* STATICS */
static FHASH *fhasharray[FHASHNUM];

/* EXTERNALS */

/* FORWARD */
extern MR_FUNC *newfunc();
extern int fhashval();
extern char *malloc();


/***********************************************************************/

/* FUNCTION */
void
funcadd(name, probenum, mrfile)
char *name;                 /* function's name */
int probenum;               /* function's first probe number */
MR_FILE *mrfile;            /* this function's data came from this .. */

/*
 *    This is called from mrinput() when we found a probe "fname"
 *    (function's first probe number).
```

BEST AVAILABLE COPY

```
 *
 *    Mrinput passes us
 *       funcname, firstprobe, and dsnum...
 *
 *    This will create a new structure, and copy the data, and also
 *    add this to dsnum's linked list, and to the function hash list.
 */
{
   MR_FUNC *thisfunc;          /* the paritally filled in structure */
   MR_FUNC *scan;
   int hvalue;        /* name hashes to this */
   register FHASH *fptr;    /* pointer linker... */
   register FHASH *fnew;    /* fnew->mrfunc will point to thisfunc */

   thisfunc = newfunc();
   thisfunc->funcname = name;
   thisfunc->dsnum = mrfile->masterfile;
   thisfunc->firstprobe = probenum;

   /* Add thisfunc to MR_FILE structure, perhaps to end of linked list */
   if (mrfile->funcs == NULL)
   {
      /* No, at beginning of linked list */
      mrfile->funcs = thisfunc;
   }
   else
   {
      /* Yes, scan thru funcs.... */
      scan = mrfile->funcs;
      while (scan->next != NULL)
         scan = scan->next;

      scan->next = thisfunc;
   }

   fnew = (FHASH *) malloc(sizeof(FHASH));
   fnew->mrfunc = thisfunc;
   fnew->next = NULL;

   hvalue = fhashval(name);
   fptr = fhasharray[hvalue];
   if (fptr == NULL)
   {
      /* First entry! */
      fhasharray[hvalue] = fnew;
      return;
   }

   /* Must scan to end of linked list */
   while (fptr->next != NULL)
      fptr = fptr->next;
```

BEST AVAILABLE COPY

BEST AVAILABLE COPY

```
    fptr->next = fnew;
}


/*************************************************************************/

/* FUNCTION */
/* MR_FUNC *
/* funcget(name, snum)
/* char *name;         /* function's name */
/* int32 snum;         /* if not -1, name must be in this snum */
/*
/* /*
/*  *    Scan thru hash list looking for this specific function.
/*  *    If snum is not -1, this is the master source number of
/*  *    the file that name will be in...
/*  *
/*  *    returns NULL if not found...
/*  */
/* {
/*    register FHASH *fptr;    /* pointer linker... */
/*
/*    fptr = fhasharray[fhashval(name)];
/*    while (fptr != NULL)
/*    {
/*       if (strcmp(fptr->mrfunc->funcname, name) == 0)
/*       {
/*          if ((snum == -1) || (snum == fptr->mrfunc->dsnum))
/*             return(fptr->mrfunc);
/*       }
/*       fptr = fptr->next;
/*    }
/*    if (1 == 1)
/*    {
/* #pragma  BBA_ALERT BBA_IGNORE /* should never get here, but.... */
/*    }
/*    return(NULL);
/* } */


/*************************************************************************/

/* FUNCTION */
static int
fhashval(name)
char *name;        /* name of a function */

/*
 *    This routine returns the hash value of the name.
 *    range is 0 thru FHASHNUM-1
 *
 */
```

BEST AVAILABLE COPY

```
{
   register int acc = 0;
   register char *ptr = name;
   register char c;

   while ((c = *ptr++) != '\0')
   {
      if ((acc += c) >= FHASHNUM)
         acc -= FHASHNUM;
   }
   return(acc);
}


/****************************************************************************/

/* FUNCTION */
static MR_FUNC *
newfunc()

/*
 *    Called when we want to allocate a new function structure...
 *
 *    The following data are *not* initialized:
 *       funcname, firstprobe, msnum
 */
{
   register MR_FUNC *func;

   func = (MR_FUNC *) malloc(sizeof(MR_FUNC));

   func->numignores = func->numprobes = func->numhit = func->numalerts = 0;
   func->next = NULL;
}
```

Feb 03 15:53 1988 report/use.c Page 1

```
/*
 * FILE     $Header: use.c,v 1.6 87/11/03 08:43:34 hmgr Exp $
 *
 * AUTHOR      Bruce Erickson
 *
 * ONELINER Routines to specify functions/files to report on
 *
 *    This routine maintains two lists:
 *       ffonly   - list of functions or files to only report on
 *       ignore   - list of functions, files, or statements to
 *                  be ignored.
 *
 *    This allows inquiries from the report routine of
 *       "should I include this file/function/statement in the report?"
 *
```

BEST AVAILABLE COPY

```
 *     Subtlety:
 *        in the ffonly table are both files and functions.
 *        If a file is in the table, all functions are OK to use.
 *        If a file is *not* in the table, you still need to
 *           check each function in the file....if the function
 *           is in the table, use it, else do not.
 *
 *     Note that ffonly is a hash table - so is ignore, for now...
 *
 * TABSTOPS 3
 *
 * INSPECTED   date     - inspectors
 *
 * RCS      $Log: use.c,v $
 * Revision 1.6  87/11/03  08:43:34  08:43:34  hmgr ()
 * Author: bae@hplsdlc.hp.com
 * updated to pragmas
 *
 * Revision 1.5  87/10/02  12:21:44  12:21:44  hmgr ()
 * Author: bae@hplsdlc.hp.com
 * checkpoint before moving onward
 *
 * Revision 1.4  87/08/21  16:22:03  16:22:03  hmgr ()
 * Author: bae@hplsdlc.hp.com
 * suppress spaces correctly now!
 *
 * Revision 1.3  87/08/14  11:07:53  11:07:53  hmgr ()
 * Author: bae@hplsdlc.hp.com
 * added routine to read a file & then call ffsadd for each line.
 *
 * Revision 1.2  87/07/28  13:12:43  13:12:43  hmgr ()
 * Author: bae@hplsdlc.hp.com
 * no comment
 *
 * Revision 1.1  87/07/22  17:19:00  17:19:00  hmgr ()
 * Initial revision
 *
 *
 */
static char rcsid[] = "$Header: use.c,v 1.6 87/11/03 08:43:34 hmgr Exp $";
#include <stdio.h>
#include <boolean.h>
#include <sys/types.h>
#include <sys/stat.h>
#include <fcntl.h>

/* HASHNUM is the number of entries in the hash tables */
#define HASHNUM   257

/* HASHENTRY is the number of 'pointers to strings' in each node.
   This is chosen so it will fulfill the typical user's needs; however,
   we can cascade them (the 'next' pointer) for the atypical user
```

BEST AVAILABLE COPY

```
*/
#define HASHENTRY 5

typedef struct hnode
{
   char *strings[HASHENTRY];     /* set to NULLs if invalid */
   struct hnode *next;
} HNODE;

/* GLOBALS */

/* STATICS */
static HNODE *ffonly[HASHNUM];
static HNODE *ignore[HASHNUM];
static boolean useffonly;     /* set to TRUE iff some entries in
                                 the ffonly array */
static boolean useignore;     /* set to TRUE iff some entries in
                                 the ignore array */

/* EXTERNALS */
extern char *strchr();
extern char *malloc();
extern char *fnametopath();
extern char currentdirectory[];

/* FORWARD */
extern boolean intable();
extern void inithnode();


/*************************************************************************/

/* FUNCTION */
void
inituse()

/*
 *    This routine should be called prior to using any of the
 *    ffonly or ignore tables.  It runs thru them both setting
 *    them to 'unused'
 *
 */
{
   int i;

   for (i = 0; i < HASHNUM; i++)
      ffonly[i] = NULL;

   for (i = 0; i < HASHNUM; i++)
      ignore[i] = NULL;

   useffonly = FALSE;
   useignore = FALSE;
```

BEST AVAILABLE COPY

```c
}


/***************************************************************************/

/* FUNCTION */
ffsadd(use, string)
boolean use;          /* if TRUE, add string to ffonly; else add to ignore */
char *string;         /* string, perhaps with spaces, to add to array */

/*
 *    This routine will remove spaces assocaited with
 *    the string, and add it to the appropriate table.
 *
 *    If the string ends in ".c", it is assumed to be a file,
 *    and is converted to an absolute path name.... we will
 *    generate a malloc'd version (of the absolute path)
 *
 *    Note that we will do nothing with strings which are all
 *    white-spaces ....
 *
 *    NOTE: string must point to a 'static' area that we can
 *    modify (remove spaces from).
 *
 */
{
   char *path;           /* if doing fnametopath */
   int len;              /* length of the string */

   len = strlen(string);

   if ((len >= 3) && (string[len - 2] == '.') && (string[len - 1] == 'c'))
   {
      /* string is a file name.  Convert to absolute path */
      path = fnametopath(currentdirectory, string);
      len = strlen(path);     /* get length of absolute path */
      string = malloc(len + 1);
      strcpy(string, path);      /* create malloc'd version */
   }

   spacesrm(string);

   if (strlen(string) == 0)
      return;     /* bozo! */

   if (use)
   {
      addtable(ffonly, string);
      useffonly = TRUE;
   }
   else
   {
```

BEST AVAILABLE COPY

```
        addtable(ignore, string);
        useignore = TRUE;
    }
}


/*************************************************************************/

/* FUNCTION */
boolean
ffsaddfile(use, fname)
boolean use;          /* if TRUE, add string to ffonly; else add to ignore */
char *fname;          /* file name to read */

/*
 *     This routine reads the file 'fname', and places each line
 *     into the appropriate table (based on 'use')
 *
 *     The entire file is read into a malloc'd area which is
 *     never freed...
 *
 *     RETURNs TRUE if read & add OK; else FALSE
 */
{
    struct stat statbuf;
    int bytes;              /* number of bytes in file */
    int fd;                 /* file descriptor of fname */
    char *data;             /* the buffer */
    char *start, *end;      /* start/end of each line */

    /* Try to open the file */
    fd = open(fname, O_RDONLY);
    if (fd == -1)
    {
        fprintf(stderr, "cannot open %s", fname);
        perror(" ");
        return(FALSE);
    }

    /* Find the length of the file */
    if (fstat(fd, &statbuf) != 0)
    {
#pragma BBA_IGNORE
        /* to check this, you would need to delete
           the i-node between the time of opening the file
           and here....
        */
        fprintf(stderr, "cannot stat %s", fname);
        perror(" ");
        return(FALSE);
    }
```

BEST AVAILABLE COPY

```
    bytes = statbuf.st_size;    /* convert to integer */

    /* Allocate room for data + 2 byte, 'cause we will
       append a \n\0.  This is done so that if the file does
       not end with a \n we don't need to get fancy later...
    */
    data = malloc(bytes + 2);
    /* NOTE: malloc errors are checked in a higher area... check out
       the file bba/src/alloc/x.c
    */


    /* All right - we know the length of the file.  Now read it in */
    if (read(fd, data, bytes) != bytes)
    {
#pragma BBA_IGNORE
        /* to test this, you would need to truncate
           the file between the time of stating the file
           and here....
        */
        fprintf(stderr, "cannot read %s", fname);
        perror(" ");
        return(FALSE);     /* Oh well.... */
    }

    close(fd);

    data[bytes] = '\n';          /* force a trailing \n */
    data[bytes + 1] = '\0';      /* force a trailing \0 */

    /* We have read in the file.  Now split up the file into
       lines (placing a \0 in place of each \n), and send
       the line to ffsadd()
    */
    end = data - 1;

    /* Repeat loop for each line in the file */
    while (*(start = end + 1) != '\0')
    {
        /* Find the end of this line (i.e., the next \n) */
        end = strchr(start, '\n');
        *end = '\0';       /* replace \n with \0 */

        ffsadd(use, start);
    }

    /* Finished with all lines in the file */

    return(TRUE);
}
```

BEST AVAILABLE COPY

```
/******************************************************************************/

/* FUNCTION */
void
ffsok(string, ruse, rignore)
char *string;          /* function, file or statement string */
boolean *ruse;         /* string in use array */
boolean *rignore;      /* string in ignore array */

/*
 *    This routine sets the appropriate values.  Note that if
 *    !useffonly, use is set to TRUE, and if
 *    !useignore, ignore is set to FALSE
 */
{
   if (useffonly)
   {
      if (intable(ffonly, string))
         *ruse = TRUE;
      else
         *ruse = FALSE;
   }
   else
      *ruse = TRUE;

   if (useignore)
   {
      if (intable(ignore, string))
         *rignore = TRUE;
      else
         *rignore = FALSE;
   }
   else
      *rignore = FALSE;
}


/******************************************************************************/

/* FUNCTION */
static void
inithnode(hnode)
HNODE *hnode;      /* pointer to node array to initialize */

/*
 *    This routine is used to set all entries in the strings array
 *    to NULL, and the next pointer to NULL, too...
 *
 */
{
   register char **sptr;
   register int i;
```

BEST AVAILABLE COPY

```
   for (i = 0, sptr = hnode->strings; i < HASHENTRY; i++, sptr++)
      *sptr = NULL;

   hnode->next = NULL;
}


/*************************************************************************/

/* FUNCTION */
static boolean
intable(root, string)
HNODE *root[];              /* The array to check */
char *string;               /* string to see if it is in the table */


/*
 *    This simply returns TRUE if 'string' is in the table;
 *    FALSE otherwise
 *
 *    Note that we remove spaces before doing a hash, because
 *    the string we had also had spaces removed....
 *    However, we will not modify string!
 *
 */
{
   register HNODE *hptr;
   register int i;          /* scan thru table for 'string'; also misc */
   static char *nospaces;   /* string with no spaces */
   static int bytes = 0;    /* number of bytes in 'nospaces' */

   if ((i = strlen(string)) > bytes)
   {
      /* Free previous string holder */
      if (bytes != 0)
         free(nospaces);
      /* Get space for the string which is a multiple of 50 bytes */
      bytes = ((i + 50) / 50) * 50;
      nospaces = malloc(bytes);
   }

   strcpy(nospaces, string);
   spacesrm(nospaces);         /* remove spaces from the string */

   hptr = root[dohash(nospaces)];

   while (hptr != NULL)
   {
      for (i = 0; i < HASHENTRY; i++)
      {
         if (hptr->strings[i] == NULL)
```

BEST AVAILABLE COPY

```
            return(FALSE);    /* nowhere to be found */
         if (strcmp(hptr->strings[i], nospaces) == 0)
            return(TRUE);     /* found it! */
      }

      /* Attempt to go on to the next structure in the list */
      hptr = hptr->next;
   }
   return(FALSE);    /* *nowhere!!!!* */

}

/****************************************************************************/

/* FUNCTION */
static boolean
addtable(root, string)
HNODE *root[];             /* The array to add string to */
char *string;              /* string to see if it is in the table -
                              if not, add to table */

/*
 *    This simply returns TRUE if 'string' is in the table;
 *    otherwise this returns FALSE after adding strign to the table.
 *
 *    Note that 'string' must be pointing to a string that will not
 *    disappear, since all we do is store a pointer to it...
 *
 */
{
   register HNODE *hptr;
   register int i;          /* scan thru table for 'string' */
   int hval;

   hptr = root[hval = dohash(string)];

   if (hptr == NULL)
   {
      /* First time this hash address has been used */
      hptr = root[hval] = (HNODE *) malloc(sizeof(HNODE));
      inithnode(hptr);
   }

   while (TRUE)
   {
      for (i = 0; i < HASHENTRY; i++)
      {
         if (hptr->strings[i] == NULL)
         {
            /* add it here! */
            hptr->strings[i] = string;
            return(FALSE);    /* nowhere to be found */
```

BEST AVAILABLE COPY

```
            }
            if (strcmp(hptr->strings[i], string) == 0)
               return(TRUE);     /* found it! (don't add it) */
         }

         /* Attempt to go on to the next structure in the list */
         if (hptr->next == NULL)
         {
            hptr->next = (HNODE *) malloc(sizeof(HNODE));
            hptr = hptr->next;
            inithnode(hptr);
         }
      }

      /* NOT_REACHED */
   }

   /**********************************************************************/

   /* FUNCTION */
   static int
   dohash(string)
   char *string;     /* string to return hash value for */

   /*
    *    Return a value of 0 thru HASHNUM-1
    *
    */
   {
      register int acc = 0;
      register char *ptr = string;
      register char c;

      while ((c = *ptr++) != '\0')
      {
         if ((acc += c) >= HASHNUM)
            acc -= HASHNUM;
      }
      return(acc);
   }
```

Feb 03 15:53 1988  report/rscan.c Page 1

```
   /*
    * FILE     $Header: rscan.c,v 1.12 87/12/17 14:38:34 hmgr Exp $
    *
    * AUTHOR      Bruce Erickson
    *
    * ONELINER Scan thru the dumpfile generating report output and data
    *
    * TABSTOPS 3
    *
```

BEST AVAILABLE COPY

```
* INSPECTED   date      - inspectors
*
* RCS       $Log: rscan.c,v $
* Revision 1.12  87/12/17  14:38:34  14:38:34  hmgr ()
* Author: bae@hplsdlc.hp.com
* cleaned up notes
*
* Revision 1.11  87/12/11  14:26:29  14:26:29  hmgr ()
* Author: bae@hplsdlc.hp.com
* changes for demand-loading of map files
*
* Revision 1.10  87/11/03  08:44:01  08:44:01  hmgr ()
* Author: bae@hplsdlc.hp.com
* updated to pragmas
*
* Revision 1.9  87/10/02  12:21:07  12:21:07  hmgr ()
* Author: bae@hplsdlc.hp.com
* checkpoint before moving onward
*
* Revision 1.8  87/09/28  13:28:02  13:28:02  hmgr ()
* Author: bae@hplsdlc.hp.com
* no comment
*
* Revision 1.7  87/09/03  10:02:00  10:02:00  hmgr ()
* Author: bae@hplsdlc.hp.com
* use rfgetsort() so that in the report all files are in
* alphabetical order
*
* Revision 1.6  87/08/27  15:27:53  15:27:53  hmgr ()
* Author: bae@hplsdlc:hp.com
* deal correctly with PF_HIDDEN flag...
*
* Revision 1.5  87/08/21  16:22:35  16:22:35  hmgr ()
* Author: bae@hplsdlc.hp.com
* no comment
*
* Revision 1.4  87/08/14  11:08:09  11:08:09  hmgr ()
* Author: bae@hplsdlc.hp.com
* added the 'ignores present' token.
* Now handle ignore cases (?)
*
* Revision 1.3  87/08/04  15:46:26  15:46:26  hmgr ()
* Author: bae@hplsdlc.hp.com
* In addition to checking that mapinfo is not NULL, also
* check that anainfo->mapexists is TRUE before attempting
* map stuff
*
* Revision 1.2  87/07/28  13:13:06  13:13:06  hmgr ()
* Author: bae@hplsdlc.hp.com
* no comment
*
```

```
 * Revision 1.1  87/07/22  17:19:06  17:19:06  hmgr ()
 * Initial revision
 *
 *
 */
static char rcsid[] = "$Header: rscan.c,v 1.12 87/12/17 14:38:34 hmgr Exp $";
#include <stdio.h>
#include <boolean.h>
#include <model.h>
#include "smithdate.h"
#include "probe.h"
#include "report.h"

/* GLOBALS */

/* STATICS */
extern boolean outfuncsum;
extern boolean outlines;
extern int outafter;
extern int outbefore;

/* EXTERNALS */
extern boolean mapcheck();
extern RP_FILE *rfgetsort();
extern char *pathtofname();
extern boolean notealert;
extern boolean noteallfuncs;
extern boolean noteignore;
extern boolean noteunknown;
extern char currentdirectory[];
extern RP_FILE *rfnumtofile();
extern void ffsok();
extern int rtotalbranches;
extern int rtotalhits;
extern int rtotalignores;
extern int rtotalalerts;
extern void prctlnewfunc();
extern void prctl();
extern boolean ignctl();
extern void ignctlnewfunc();
extern void prctleofunction();

/* FORWARD */
extern void rscanfile();
extern void rscanfunc();


/****************************************************************************/

/* FUNCTION */
reportscan()
```

BEST AVAILABLE COPY

```
/*
 *     This routine goes thru the dumpfile collecting data about the
 *     dump.  If none of the options is enabled, we will only accumulated
 *     data in rtotal* variables.
 *
 *     Note that we will be using the ffsok() routine to determine if we should
 *     include a particular file/function/statement in the report...
 *
 *     This routine also propagates the ignores.  This is done here so that
 *     we avoid the overhead of propatating ignores when we are not
 *     including a file/function in the report..
 */
{
   boolean first = TRUE;        /* TRUE only for first access to rfgetsource */
   register RP_FILE *fptr;      /* data on this file */
   char *path;
   boolean checkfuncs;          /* if TRUE, this file was not in the 'ok-to-use
                                   array... use the function iff it is in the
                                   'ok-to-use' arrays... */
   boolean ignoreit;            /* if TRUE, abort and don't check further */

   /* Access files by name, alphabetical order */
   while((fptr = rfgetsort(first)) != NULL)
   {
      first = FALSE;     /* Subsequent calls do not start over */

      if (!fptr->isanalyzed)
         continue;       /* do nothing if this was not analyzed */

      /* Fetch the file name */
      path = fptr->path;

      /* Can we include this file in the report? */
      ffsok(path, &checkfuncs, &ignoreit);
      if (ignoreit)
         continue;       /* we got a positive 'yes, ignore it!' response */

      /* Ok, we can include this file in the report */
      rscanfile(fptr, !checkfuncs);
   }
}


/*************************************************************************/

/* FUNCTION */
static void
rscanfile(rpfptr, checkfuncs)
RP_FILE *rpfptr;            /* file we are looking at */
boolean checkfuncs;     /* if TRUE, only do functions that ffsok approves of */

/*
```

BEST AVAILABLE COPY

```
 *      This is called to check all functions that are referenced by
 *      this analysis structure (i.e., all that are in the
 *      analinfo->mapinfo->funcs linked list).
 *
 *      If mapinfo is NULL (i.e., no mapping file for this function), we
 *      will simply add up the branches and return.  Otherwise, we will
 *      use the mapping info to check & propagate ignored branches
 *      and alert branches, and perhaps output lines/sources of unexecuted
 *      code....
 *
 */
{
   register int i;              /* scan thru dumparray if no mapping */
   register boolean *bptr;      /* scan thru dumparray if no mapping */
   register MR_FUNC *fptr;      /* scan thru functions if mapping */
   register int hitcount;       /* scan thru dumparray if no mapping */
   boolean use, ignore;         /* returns from ffsok() */
   float hits, total, coverage;  /* if outfuncsum and no mapping */
   char *path;               /* path of this file */
   DR_ANAL *analinfo;        /* scan functions implied by this */

   path = rpfptr->path;
   analinfo = rpfptr->analinfo;

   if (analinfo == NULL)
   {
#pragma  BBA_ALERT BBA_IGNORE
      /* This really shouldn't happen, but if it does, let's not
         core dump! */
      return;
   }

   if (!mapcheck(rpfptr, analinfo))
   {
      /* No mapping information.  Scan thru modifying rtotal* vars,
         and then return.  However, if checkfuncs was true, this
         means that
            1) the user specified some 'only' strings
            2) this file isn't on the 'only' list
         Therefore, if checkfuncs is TRUE, just return...
      */
      if (checkfuncs)
         return;
      hitcount = 0;
      for (i = analinfo->numentries, bptr = analinfo->array;
            i > 0;
            i--, bptr++)
      {
         if (*bptr)
            hitcount++;
      }
      rtotalbranches += analinfo->numentries;
```

BEST AVAILABLE COPY

```
        rtotalhits += hitcount;

        if (outfuncsum)
        {
           hits = hitcount;
           total = analinfo->numentries;
           if (total != 0)
           {
              coverage = 100.0 * (hits / total);
           }
           else
           {
#pragma    BBA_ALERT BBA_IGNORE /* should never get here, but.... */
              coverage = 0.0;
           }

           printf(RP_FUNCFMT, hitcount, analinfo->numentries,
                 coverage, '?', '?', "All functions in file",
                 pathtofname(currentdirectory, path, 0));
           noteallfuncs = noteunknown = TRUE;
        }
        return;
     }

     /* We have mapping information!!!!
        Scan thru each function in this guys linked list
     */
     for (fptr = analinfo->mapinfo->funcs; fptr != NULL;
           fptr = fptr->next)
     {

        /* Check to see if we should do this function or not */
        ffsok(fptr->funcname, &use, &ignore);

        if (ignore)
           continue;          /* not - explicitly on ignore list */

        if (checkfuncs && !use)
        {
           /* 1) there was a uselist
              2) file was not on it
              3) this functions wasn't on it, either
           */
           continue;
        }

        /* go thru the function... */
        rscanfunc(path, analinfo, fptr);
     }

     /* Release the mapping information.... */
     mapfree(analinfo);
```

BEST AVAILABLE COPY

```
}


/***************************************************************************/

/* FUNCTION */
static void
rscanfunc(path, analinfo, fptr)
char *path;          /* the path of the file */
DR_ANAL *analinfo;   /* analysis information */
MR_FUNC *fptr;       /* function information */

/*
 *    This is called to go thru the given function.
 *    We already know we should check this function (i.e.,
 *    it is not ignored and it was selected)
 *
 *    If necessary (i.e., correct options enabled), we will
 *    do some output.
 *
 *    NOTE: In the future, we may need to check pptr->sourcevalid.
 *    Right now, the only value that can have is 'true'.
 *
 *    This will check and propagate ignores....
 *
 */
{
    register MR_PROBE *pptr;      /* info about a specific probe */
    int probenum;          /* probe number we are considering */
    int hits;              /* number of hits */
    int total;             /* total of non-ignored branches */
    int ignores;           /* number of branches ignored */
    int alerthits;         /* number of alert branches hit */
    float fhits, ftotal, coverage;
    int ignore;            /* if TRUE, we are ignoring the current probe */

    total = hits = ignores = alerthits = 0;

    ignctlnewfunc(fptr);
    prctlnewfunc(fptr);

    probenum = fptr->firstprobe;
    pptr = analinfo->mapinfo->probes[probenum];

    /* This loop continues until we
       1) run out of data
       2) hit the next function
    */
    do
    {
       /* Find out whether or not to ignore this... */
```

BEST AVAILABLE COPY

```
        ignore = ignctl(pptr);

        /* If this is ignored, count it as ignored.  However, it is possible
           that labels (PF_HIDDEN) are under an ignore scope - therefore,
           don't count HIDDEN branches in the ignore list...
        */
        if (ignore && !ISPTYPE(pptr->probetype, PT_IDEFAULT))
           ignores++;      /* increment count of ignored branches */

        /* probe probenum IS within the current function.  Note that
           we cannot simply not call prctl if we are ignoring, because
           we would miss alert branches... */
        prctl(pptr, analinfo->array[probenum], analinfo, probenum, ignore);

        /* If this is not an ignore function, nothing fancy - just
           increment data & check for alert */

        if (!ignore)
        {
           /* Note that 'hidden' flags should not be counted has ignores, totals,
              nor hits
           */
           if (!ISPFLAG(pptr->pflags, PF_HIDDEN))
           {
              /* inserted defaults are neither counted as hit nor in the total */
              if (!ISPTYPE(pptr->probetype, PT_IDEFAULT))
              {
                 total++;       /* increment non-ignored branches */
                 if (analinfo->array[probenum])
                 {
                    hits++;

                    /* cannot have ALERT for IDEFAULT */
                    if (ISPFLAG(pptr->pflags, PF_ALERT))
                       alerthits++;
                 }
              }
           }
           probenum++;    /* Go on to next probe... */
        }
        else
        {
           /* We are ignoring this - but still check alert flags! */
           if (analinfo->array[probenum])
           {
              /* Note that HIDDEN flags cannot be alert flags.... */
              /* do NOT increment hits! */
              if (ISPFLAG(pptr->pflags, PF_ALERT))
                 alerthits++;
           }
           probenum++;    /* Go on to next probe... */
        }
```

BEST AVAILABLE COPY

```
         if (probenum >= analinfo->numentries)
            break;

         /* Go on to next probe, unless it is a new function */
         pptr = analinfo->mapinfo->probes[probenum];
      }
      while (!ISPTYPE(pptr->probetype, PT_FUNCTION));

      /* Flush any pending output */
      prctleofunction();


      /* Update global information */
      rtotalbranches += total;
      rtotalhits += hits;
      rtotalalerts += alerthits;
      rtotalignores += ignores;

      /* If we are printing function summaries, and not all branches
         in a function were ignored, print it out
      */
      if (outfuncsum && (total != 0))
      {
         fhits = hits;
         ftotal = total;

         if (total != 0)
         {
            coverage = 100.0 * (fhits / ftotal);
         }
         else
         {
#pragma  BBA_ALERT BBA_IGNORE /* should never get here, but.... */
            coverage = 0.0;
         }
         printf(RP_FUNCFMT, hits, total, coverage,
               (ignores != 0) ? '*' : ' ',
               (alerthits != 0) ? '*' : ' ',
               fptr->funcname,
               pathtofname(currentdirectory, path, 0));
         if (ignores != 0)
            noteignore = TRUE;
         if (alerthits != 0)
            notealert = TRUE;
      }
}
```

BEST AVAILABLE COPY

Feb 03 15:53 1988 report/footnotes.c Page 1

```
/*
 * FILE     $Header: footnotes.c,v 1.8 88/01/02 10:06:05 hmgr Exp $
 *
 * AUTHOR      Bruce Erickson
 *
 * ONELINER Footnotes to put at the end of the report...
 *
 *
 * TABSTOPS 3
 *
 * INSPECTED   date     - inspectors
 *
 * RCS      $Log: footnotes.c,v $
 * Revision 1.8  88/01/02  10:06:05  10:06:05  hmgr ()
 * Author: bae@hplsdlc.hp.com
 * Added code to deal with 'inner cases'
 *
 * Revision 1.7  87/12/17  14:38:44  14:38:44  hmgr ()
 * Author: bae@hplsdlc.hp.com
 * cleaned up notes
 *
 * Revision 1.6  87/11/03  08:44:11  08:44:11  hmgr ()
 * Author: bae@hplsdlc.hp.com
 * changed 'procedure' to 'function'
 *
 * Revision 1.5  87/10/02  12:19:00  12:19:00  hmgr ()
 * Author: bae@hplsdlc.hp.com
 * checkpoint before moving onward
 *
 * Revision 1.4  87/08/27  15:28:08  15:28:08  hmgr ()
 * Author: bae@hplsdlc.hp.com
 * added some footnotes
 *
 * Revision 1.3  87/08/14  11:08:23  11:08:23  hmgr ()
 * Author: bae@hplsdlc.hp.com
 * added some footnotes
 *
 * Revision 1.2  87/07/28  13:13:28  13:13:28  hmgr ()
 * Author: bae@hplsdlc.hp.com
 * no comment
 *
 * Revision 1.1  87/07/22  17:19:10  17:19:10  hmgr ()
 * Initial revision
 *
 *
 */
static char rcsid[] = "$Header: footnotes.c,v 1.8 88/01/02 10:06:05 hmgr Exp $";
#include <stdio.h>
#include <boolean.h>
```

BEST AVAILABLE COPY

```
#define FPRINT() if (firstprint) { firstprint = FALSE; fputs(header, stdout); }

/* GLOBALS */
boolean notequestion = FALSE;
boolean noteallfuncs = FALSE;
boolean notestars = FALSE;
boolean notec = FALSE;
boolean notealert = FALSE;
boolean noteignore = FALSE;
boolean notem = FALSE;
boolean noteg = FALSE;
boolean noteunknown = FALSE;

/* STATICS */
static char *header = "\nNOTE:\n";

/* EXTERNALS */

/* FORWARD */


/**********************************************************************/

/* FUNCTION */
void
footnotes()

/*
 *    Print the footnotes out that were requested during the
 *    report...
 *
 */
{
   boolean firstprint = TRUE;    /* if TRUE, print out a message first... */

   if (noteallfuncs)
   {
      FPRINT();
      printf("'All functions in file' - because no mapping file, not able to decompose\n\tfile into functions\n");
   }

   if (notestars)
   {
      FPRINT();
      printf("'****' - the code for this branch had a BBA_ALERT and the code was executed\n");
   }

   if (notec)
   {
      FPRINT();
      printf("'c' - the range of code is the controlling statement, not\n\tthe code that was unexecuted\n");
```

```
      }

      if (notealert)
      {
         FPRINT();
         printf("A '*' in the 'A' column means this function had a BBA_ALERT which\n\twas executed\n");
      }

      if (noteignore)
      {
         FPRINT();
         printf("A '*' in the 'I' column means this function had one or more\n\tbranches that were ignored\n");
      }

      if (noteunknown)
      {
         FPRINT();
         printf("A '?' in the 'I' and 'A' columns means that it is not known if a\n\tBBA_ALERT branch was executed,
or if the function contained\n\tignored branches, because no map file was found for this function\n");
      }

      if (notem)
      {
         FPRINT();
         printf("'m' - the remainder of lines controlled by this branch were executed\n\tafter the label\n");
      }

      if (noteg)
      {
         FPRINT();
         printf("'g' - the remainder of lines controlled by this 'case' were executed\n\tafter the 'inner case'\n");
      }

   }
```

Feb 03 15:53 1988 report/ignctl.c Page 1

```
   /*
    * FILE      $Header: ignctl.c,v 1.4 87/11/03 08:44:56 hmgr Exp $
    *
    * AUTHOR       Bruce Erickson
    *
    * ONELINER Ignore/not ignore control for report generator
    *
    *    This function knows when to 'ignore' and when to not
    *    'ignore' a given probe.  It is decoupled from the
    *    printing function to reduce complexity (risk), and
    *    to make the algorithm clearer.
    *
    * TABSTOPS 3
    *
```

BEST AVAILABLE COPY

BEST AVAILABLE COPY

```
 * INSPECTED   date     · inspectors
 *
 * RCS       $Log: ignctl.c,v $
 * Revision 1.4  87/11/03  08:44:56  08:44:56  hmgr ()
 * Author: bae@hplsdlc.hp.com
 * updated to pragmas
 *
 * Revision 1.3  87/10/08  16:55:49  16:55:49  hmgr ()
 * Author: bae@hplsdlc.hp.com
 * added macro ignore capibility
 *
 * Revision 1.2  87/10/02  12:19:16  12:19:16  hmgr ()
 * Author: bae@hplsdlc.hp.com
 * checkpoint before moving onward
 *
 * Revision 1.1  87/09/04  08:29:46  08:29:46  hmgr ()
 * Initial revision
 *
 *
 *
 */
static char rcsid[] = "$Header: ignctl.c,v 1.4 87/11/03 08:44:56 hmgr Exp $";
#include <stdio.h>
#include <boolean.h>
#include <model.h>
#include "smithdate.h"
#include "probe.h"
#include "report.h"

/* GLOBALS */

/* STATICS */
static boolean ignore;          /* if TRUE, we are looking for the 'next'
                                   probe which can turn off the ignore */
static PROBETYPE lastigtype;    /* if disabled, we printed this type last time */
static int lastigscope;         /* if disabled, scope was this */

/* EXTERNALS */
extern char *strchr();
extern boolean debugignore;
extern void ffsok();

/* FORWARD */


/*************************************************************************/

/* FUNCTION */
void
ignctlnewfunc(fptr)
MR_FUNC *fptr;        /* function information */

```

BEST AVAILABLE COPY

```
/*
 *    This is called when we are starting a new function.
 *    This resets the ignore flag...
 *
 */
{
   ignore = FALSE;

   if (debugignore)
   {
#pragma BBA_IGNORE /* only for testing! */
      fprintf(stderr, "NEWFUNC\n");
   }
}


/*************************************************************************/

/* FUNCTION */
boolean
ignctl(pptr)
MR_PROBE *pptr;          /* this probe's definition */

/*
 *    This routine is called for each probe, regardless whether
 *    it was executed, and regardless whether it was ignored, etc.
 *
 *    This returns the value of 'ignore' that this routine
 *    sets ignore to...
 *
 *    If ignore is FALSE
 *       and the ignore flag for this probe is not set
 *          this does nothing.
 *       if the ignore flag for this probe is set:
 *          set 'ignore', lastigscope, and lastigtype from current data.
 *    else (ignore is TRUE)
 *       is escope > lastigscope
 *          return   (remain ignoring)
 *       if escope == lastigscope
 *          if lastigtype == PT_WHILE
 *             if ptype == PT_WHILENOT
 *                set 'ignore', lastigscope, and listigtype; return
 *          if lastigtype == PT_IF
 *             if ptype == PT_IELSE
 *                set 'ignore', lastigscope, and listigtype; return
 *       set ignore to FALSE
 *
 */
{
   int escope;         /* scope of current probe */
   PROBETYPE ptype;  /* type of current probe */
   PFLAGTYPE pflags; /* any flags that were set */
```

BEST AVAILABLE COPY

```
boolean thisignore;  /* set to TRUE if this particular probe is ignored */
boolean usestr, ignstr; /* if string is on ignore/use list */
char *rparen;

if (ignore)
{
   /* We are currently in ignore mode. */
   if ((escope = pptr->source.escope) > lastigscope)
      return(ignore);        /* down 'beneath' the ignored scope */

   if (escope == lastigscope)
   {
      /* Handle special cases... */
      if (ISPTYPE(lastigtype, PT_WHILE) && ISPTYPE(pptr->probetype, PT_WHILENOT))
      {
         /* Maintain ignore..... */
         lastigscope = pptr->source.escope;
         lastigtype = pptr->probetype;
         return(ignore);
      }
      if (ISPTYPE(lastigtype, PT_IF) && ISPTYPE(pptr->probetype, PT_IELSE))
      {
         /* Maintain ignore..... */
         lastigscope = pptr->source.escope;
         lastigtype = pptr->probetype;
         return(ignore);
      }
   }
   ignore = FALSE;       /* Just based on previous state, we should not be ignored */
}

/* Set 'thisignore' if the current probe should be ignored
   regardless of any upper stuff
*/
thisignore = FALSE;
if (ISPFLAG(pptr->pflags, PF_IGNORE))
   thisignore = TRUE;

if (!thisignore)
{
   /* How about the ctl string being on the ignore list? */
   if (ISPTYPE(pptr->probetype, PT_FUNCTION))
   {
      ffsok(pptr->source.fname.fname, &usestr, &ignstr);
   }
   else
   {
      /* Not file, must be a control statement.... */
      ffsok(pptr->source.ctl.ctlstring, &usestr, &ignstr);
      if (!ignstr)
      {
         /* ctl string wasn't on ignore list.... if there was
```

BEST AVAILABLE COPY

```
                a control macro, is the expansion of the macro
                on the ignore list? */
             if (pptr->source.ctlmac != NULL)
             {
                ffsok(pptr->source.ctlmac, &usestr, &ignstr);

                if (!ignstr)
                {
                   /* Ok, so far we aren't ignoring this.  Now check to
                      see if the macro name of this ctlstring is
                      in the ignore list.  To do this, we will
                      strip everything up to the leading "(" and
                      pass it to ffsok()
                   */
                   rparen = strchr(pptr->source.ctl.ctlstring, '(');
                   if (rparen != NULL)
                   {
                      /* Found the right paren!  Replace it with a
                         \0 so we can test solely for the macro name
                      */
                      *rparen = '\0';
                      ffsok(pptr->source.ctl.ctlstring, &usestr, &ignstr);
                   }
                }
             }
          }
       }
       thisignore = ignstr;     /* set thisignore if on ignore list */
    }

    if (thisignore)
    {
       ignore = TRUE;     /* turn on ignore */
       lastigscope = pptr->source.escope;
       lastigtype = pptr->probetype;
       return(ignore);
    }

    /* Ignore not set for this probe, and ignore is not current... */
    return(ignore);
 }
```

Feb 03 15:53 1988  report/prctl.c Page 1

```
 /*
  * FILE      $Header: prctl.c,v 1.17 88/01/02 10:55:13 hmgr Exp $
  *
  * AUTHOR       Bruce Erickson
  *
  * ONELINER Printing control for report generator
  *
```

BEST AVAILABLE COPY

```
 *     When we are printing sources (or line numbers), we
 *     will use this function.
 *
 *     NOTE: we will 'queue up' a probe to be printed, but not print
 *     it until the disable goes false.  This is done so that we
 *     can easily keep track of the number of 'concealed' probes...
 *     'Concealed' probes are those probes that were not executed, but
 *     are not printed because they are 'underneath' a printed probe.
 *     For example:  Given:
 *     if (cond1) { probe_1 if (cond2) {probe_2}}
 *     if cond1 is always FALSE, probe1 is printed - but probe2 is
 *     concealed.
 *
 *     NOTE: If an 'if' was executed and not hidden, we will immediately
 *     scan forward to see if there was an inserted if associated with it.
 *     If the associated inserted if was not executed, we will print it
 *     at that point.  Note the implication that from that point on
 *     we can ignore inserted ifs....
 *
 * TABSTOPS 3
 *
 * INSPECTED   date     - inspectors
 *
 * RCS      $Log: prctl.c,v $
 * Revision 1.17  88/01/02  10:55:13  10:55:13  hmgr ()
 * Author: bae@hplsdlc.hp.com
 * don't print inner cases unless we are disabled at a case!
 *
 * Revision 1.16  88/01/02  10:05:51  10:05:51  hmgr ()
 * Author: bae@hplsdlc.hp.com
 * Added code to deal with 'inner cases'
 *
 * Revision 1.15  87/11/03  08:42:51  08:42:51  hmgr ()
 * Author: bae@hplsdlc.hp.com
 * updated to pragmas;
 * fixed some problems dealing with prdoielse and prdocase
 *
 * Revision 1.14  87/10/06  10:40:48  10:40:48  hmgr ()
 * Author: bae@hplsdlc.hp.com
 * Moved some stuff around to deal with contiguous ignores...
 *
 * Revision 1.13  87/10/02  12:20:21  12:20:21  hmgr ()
 * Author: bae@hplsdlc.hp.com
 * checkpoint before moving onward
 *
 * Revision 1.12  87/09/28  13:27:19  13:27:19  hmgr ()
 * Author: bae@hplsdlc.hp.com
 * no comment
 *
 * Revision 1.11  87/09/17  15:58:48  15:58:48  hmgr ()
 * Author: bae@hplsdlc.hp.com
 * Now handles else-less if's correctly
 *
```

BEST AVAILABLE COPY

```
 * Revision 1.10  87/09/17  13:40:10  13:40:10  hmgr ()
 * Author: bae@hplsdlc.hp.com
 * re-write of prctl seems to work, but IELSE and IDEFAULT
 * have not yet been implemented
 *
 * Revision 1.9  87/09/16  16:52:14  16:52:14  hmgr ()
 * Author: bae@hplsdlc.hp.com
 * correctly report inserted elses...
 *
 * Revision 1.8  87/08/27  15:27:14  15:27:14  hmgr ()
 * Author: bae@hplsdlc.hp.com
 * Deal with what happens when we 'goto' a label that lays within
 * the scope of an unexecuted probe...
 * Changed 'hidden' to 'concealed', and then made use of the 'HIDDEN'
 * flag...
 *
 * Revision 1.7  87/08/25  15:08:12  15:08:12  hmgr ()
 * Author: bae@hplsdlc.hp.com
 * added alert branch printing & fixed problem with
 * counting PT_IDEFAULT branches
 *
 * Revision 1.6  87/08/25  08:34:07  08:34:07  hmgr ()
 * Author: bae@hplsdlc.hp.com
 * no comment
 *
 * Revision 1.5  87/08/24  19:53:59  19:53:59  hmgr ()
 * Author: bae@hplsdlc.hp.com
 * fixed problem associated with deleting too much...
 *
 * Revision 1.4  87/08/21  16:23:22  16:23:22  hmgr ()
 * Author: bae@hplsdlc.hp.com
 * no comment
 *
 * Revision 1.3  87/08/14  11:08:34  11:08:34  hmgr ()
 * Author: bae@hplsdlc.hp.com
 * handle ignores correctly now (?)
 *
 * Revision 1.2  87/08/12  10:41:54  10:41:54  hmgr ()
 * Author: bae@hplsdlc.hp.com
 * changed column offsets to start with 1
 *
 * Revision 1.1  87/07/28  13:06:14  13:06:14  hmgr ()
 * Initial revision
 *
 *
 */
static char rcsid[] = "$Header: prctl.c,v 1.17 88/01/02 10:55:13 hmgr Exp $";
#include <stdio.h>
#include <boolean.h>
#include <model.h>
#include "smithdate.h"
#include "probe.h"
```

BEST AVAILABLE COPY

```
#include "report.h"

/* The following structure defines everything needed to print a
   given probe.  It is set when we first detect a probe we need
   to print, and used when we re-enable
*/
typedef struct
{
   boolean valid;    /* if this data is valid */
   MR_PROBE *pptr;   /* probe in question */
   DR_ANAL *analinfo;   /* associated analysis info */
   int probenum;     /* which probe (in analinfo) this is */
   boolean executed; /* whether it was executed or not */
   boolean firstout; /* if TRUE, this is the first output for a function */
   int numconcealed;    /* number of probes which are disabled because
                           this was printed */
} PRCTLINFO;

/* GLOBALS */
MR_FUNC *prthisfunc;       /* current function */

/* STATICS */
static boolean disabled;      /* if TRUE, we are looking for the 'next'
                                 probe which can enable printing */
static PROBETYPE lastprtype;  /* if disabled, we printed this type last time */
static int lastprscope;       /* if disabled, scope was this */
static boolean nooutfunc;     /* if TRUE, we have not generated any output for this function */
static PRCTLINFO prctlinfo = (FALSE);  /* printing probe information */

/* EXTERNALS */
extern void prexplain();
extern void prsource();
extern void prdoidefault();
extern void prdoielse();
extern boolean prpositions;
extern boolean debugrprint;
extern boolean notec;
extern boolean notem;
extern boolean noteg;
extern boolean notestars;
extern RP_FILE *rfnumtofile();
extern char *pathtofname();
extern boolean outlines;
extern int outafter;
extern int outbefore;
extern char currentdirectory[];

/* FORWARD */
extern void doprprobe();
extern boolean prcaseexec();
extern int prfindmate();
extern void prprobe();
```

BEST AVAILABLE COPY

```
extern void prlines();


/**************************************************************************/

/* FUNCTION */
void
prctlnewfunc(fptr)
MR_FUNC *fptr;          /* function information */

/*
 *     This is called when we are starting a new function.
 *     This resets the disabled flag, so that we can start
 *     printing on the next unexecuted branch...
 *
 */
{
    nooutfunc = TRUE;     /* flag that we have no output for it */
    prctlinfo.firstout = TRUE;     /* for some short cuts dealing with
                                      prdoielse and prdocase */
    prthisfunc = fptr;

    if (debugrprint)
    {
#pragma BBA_IGNORE /* only for testing! */
        fprintf(stderr, "NEWFUNC\n");
    }
}


/**************************************************************************/

/* FUNCTION */
void
prctleofunction()

/*
 *     This is called when we are finished with a function.
 *     It is used to print any pending output for this function.
 *
 */
{
    if (disabled)
    {
       doprprobe((MR_PROBE *) NULL);    /* print previous function's output */
       disabled = FALSE;
    }
}


/**************************************************************************/
```

BEST AVAILABLE COPY

```
/* FUNCTION */
void
prctl(pptr, executed, analinfo, probenum, ignore)
MR_PROBE *pptr;           /* this probe's definition */
boolean executed;         /* whether this was executed or not */
DR_ANAL *analinfo;        /* analysis information for this file */
int probenum;             /* This probe's number.  Unused except for scanning
                             for it's mate */
boolean ignore;           /* if TRUE, we are ignoring this branch... */

/*
 *     This routine is called for each probe, regardless whether
 *     it was executed, and regardless whether it was ignored, etc.
 *     It is responsible for deciding when/if a line is printed.
 *
 *     Algorithm is:
 *     if we cannot generate any output, just return -- this routine
 *          is *not* responsible for accumulating statistics.
 *     if probe was an alert probe, print it out, unless it was HIDDEN
 *          (even print if it is concealed).
 *     if disabled (i.e., previous probe was unexecuted)
 *        if this scope <= disable's scope
 *           print previous probe & enable
 *        else
 *           if executed
 *              (this scope > disabled's scope; i.e., jumped to label w/in scope)
 *              print previous probe (notify that it was because of a goto or PF_INNER) & enable
 *           else (disabled & probe wasn't executed)
 *              if disabled on a PT_CASE (etc) && current is PF_INNERCASE (outer case not executed)
 *                 print this as inner case; 1 accounted to it
 *              else
 *                 increment count of concealed probes (if appropriate) & return
 *
 *     (not disabled on entry, or we were enabled on this call.)
 *     if probe is HIDDEN, return (cannot print a HIDDEN probe regardless)
 *     if probe was handled previously (PT_IELSE, PT_IDEFAULT), just return
 *     (special handling for PT_IELSE, so it is printed before stuff inside if:)
 *     if PT_IF & was executed
 *        if PT_IELSE is possible (i.e., options map shows the IELSE bit is set)
 *           if next PT_IELSE | PT_ELSE is PT_IELSE
 *              if associated PT_IELSE was not executed
 *                 print the associated PT_IELSE; do not disable; return
 *     (special handling for PT_IDEFAULT, soi it is printed before other cases:)
 *     if PT_CASE
 *        if PT_IDEFAULT is possible (i.e., options show IDEFULAT bit is set)
 *           if this is the first default for this switch (PF_FIRST set)
 *              (new switch statement!)
 *              if next PT_DEFAULT | PT_IDEFAULT at this scope is PT_IDEFAULT
 *                 print PT_IDEFAULT; do not disable; set previous_default....; continue
 *     (special look-ahead cases handled above)
 *     if ignore || executed
 *        return
```

BEST AVAILABLE COPY

```
 *     if probe is PT_DEFAULT | PT_CASE
 *        if code possibly executed by fall-thru (prcaseexec)
 *           executed = TRUE
 *     set up prctlinfo to current probe
 *     if executed or probe is DO* or WHILENOT
 *        (i.e., default/case executed by fall-thru, or a probe that does not
 *         determine if CODE was executed)
 *        print probe; do not disable; return
 *     disable (print probe when we enable on subsequent calls)
 *
 */
{
   int escope;         /* scope of current probe */
   PROBETYPE ptype;  /* type of current probe */
   PFLAGTYPE pflags; /* any flags that were set */

   /* If we cannot generate any output, just return */
   if (!(outlines || (outafter != -1) || (outbefore != -1)))
      return;

   /* This is done regardless of anything else:
      if this is an alert scope, and it was executed,
      print it out! */
   if (executed)
   {
      /* Note that HIDDEN probes cannot be ALERT probes */
      if (ISPFLAG(pptr->pflags, PF_ALERT))
      {
         /* We don't flush pending output here so that the count of unexecuted
            probes will be correct
            However, use prctlinfo.firstout so the file name will be printed
            correctly if this is the first output...
         */
         prprobe(pptr, analinfo, probenum, executed, prctlinfo.firstout, 1, TRUE, (MR_PROBE *) NULL);
         prctlinfo.firstout = FALSE;   /* in case one was pending... */
         nooutfunc = FALSE;       /* Generate output for this function */
      }
   }


   escope = pptr->source.escope;

   if (disabled)
   {
      if (escope <= lastprscope)
      {
         /* popped out of previous probe's scope.  Print it out! */
         doprprobe((MR_PROBE *) NULL);

         /* Continue & enable */
      }
      else
```

BEST AVAILABLE COPY

```
        {
           /* Still w/in scope of a previously unexecuted probe... */
           if (executed)
           {
              /* Hmm... a branch WAS executed, but it normally would be hidden.
                 This can only happen when a label was gone to or an INNERCASE
                 was gone to...
              */
              doprprobe(pptr);  /* Abnormal print out previous entry */
              /* Continue & enable */
           }
           else
           {
              /* Normal - this probe is w/in the scope of apreviously unexecuted
                 probe.... account for it! (because it will be concealed)

                 Increment count of concealed probes if
                 1) we are not ignoring this probe
                 2) this probe is not an inserted default
                 3) this probe is not hidden
              */
              if ((!ignore) && (ISPFLAG(pptr->pflags, PF_INNERCASE)))
              {
                 /* an inner case was not executed.... If we are disabled at a case or
                    default, we will print it out; else not (so that if the switch itself
                    was never executed we will not print out the inner cases) */
                 if (ISPTYPE(prctlinfo.pptr->probetype,
                       PT_EMPTYCASE | PT_DEFAULT | PT_IDEFAULT | PT_CASE | PT_EMPTYDEFAULT))
                 {
                    prprobe(pptr, analinfo, probenum, FALSE, prctlinfo.firstout, 1, FALSE, pptr);
                    prctlinfo.firstout = FALSE;      /* remember that we have output */
                 }
                 else
                 {
                    /* just increment numconcealed */
                    prctlinfo.numconcealed++;
                 }
              }
              else

                 if (!(ignore || ISPTYPE(pptr->probetype, PT_IDEFAULT) || ISPFLAG(pptr->pflags, PF_HIDDEN)))
                 {
                    prctlinfo.numconcealed++;  /* increment number of concealed probes */
                 }
              }

              return;     /* still disabling printing */
           }
        }

        /* (Can only reach here if we enabled this time around) */
        disabled = FALSE:
```

BEST AVAILABLE COPY

```
        if (debugrprint)
        {
#pragma BBA_IGNORE /* only for testing! */
            fprintf(stderr, "ENABLE %d/%d (%d)\n", pptr->source.sline, pptr->source.scol,
                    pptr->source.escope);
        }

    }

    /***********************************************************************/
    /*    not disabled on entry, or became enabled                         */
    /***********************************************************************/

    /* If this were a hidden type, or we handle this probe in a look-ahead
       manner, just ignore */
    if (ISPFLAG(pptr->pflags, PF_HIDDEN) || ISPTYPE(pptr->probetype, PT_IELSE | PT_IDEFAULT))
    {
       return;
    }

    if (ISPTYPE(analinfo->options, PT_IDEFAULT) &&
          ISPTYPE(pptr->probetype, PT_CASE | PT_EMPTYCASE) &&
          ISPFLAG(pptr->pflags, PF_FIRST))
    {
       /* This probe is the first case in the switch.  Note that if the first
          "case" of a switch is a default or empty default, we need do nothing,
          since no inserted default is possible.
          Do the things necessary to bring an inserted
          default case up to the top of the switch statement in the output
          (because we will print out the switch's line number...)
       */
       prdoidefault(probenum, analinfo);
       /* Regardless of results, we should continue.... */
    }

    /* Handle look-ahead of ELSE for case where IF was executed... */
    if ((!ignore) && executed && ISPTYPE(pptr->probetype, PT_IF) &&
          ISPTYPE(analinfo->options, PT_IELSE))
    {
       /* This probe is an if, and not ignored.  If it was executed, it is
          possible that it's associated else was not....
          and, insertion of elses is allowed...  so...
       */
       prdoielse(probenum, analinfo);
       /* Even if it printed out the inserted else, we will not disable at
          this point.  Instead, just return (since the if itself was executed,
          we won't want to print it out below!)
       */
       return;
    }

    if (ignore || executed)
```

BEST AVAILABLE COPY

```
        return;

    /* Check for code that was executed via fall-thru from above */
    if (prcaseexec(probenum, analinfo))
        executed = TRUE;

    /* We will (eventually?) want to print this probe!  Set up prctlinfo.*
        so that a simple call to doprprobe() will print it!
    */

    prctlinfo.valid = TRUE;
    prctlinfo.pptr = pptr;
    prctlinfo.analinfo = analinfo;
    prctlinfo.probenum = probenum;
    prctlinfo.executed = executed;
    prctlinfo.firstout = nooutfunc;     /* stash this information for when output comes */
    prctlinfo.numconcealed = 1;
    nooutfunc = FALSE;          /* this will be the first output printed... */

    if (debugrprint)
    {
#pragma BBA_IGNORE /* only for testing! */
        fprintf(stderr, "PRINT %d/%d\n", pptr->source.sline, pptr->source.scol);
    }

    if (executed || ISPTYPE(pptr->probetype, PT_DOTRUE | PT_DOFALSE | PT_WHILENOT))
    {
        /* We will print this, but not do a disable... */
        doprprobe(NULL);  /* print this probe out */
        return;         /* don't disable.. */
    }

    disabled = TRUE;        /* and print prctlinfo.* when we enable */
    lastprscope = escope;

    if (debugrprint)
    {
#pragma BBA_IGNORE /* only for testing! */
        fprintf(stderr, "DISABLE %d/%d (%d)\n", pptr->source.sline, pptr->source.scol,
                pptr->source.escope);
    }

    /* Handle look-ahead of ELSE for case where IF was *not* executed.
        This can happend when code was not reached... */
    if (ISPTYPE(pptr->probetype, PT_IF) && ISPTYPE(analinfo->options, PT_IELSE))
    {
        /* This probe is an if, and not ignored and not executed.
            Insertion of elses is allowed...  so...
        */
        prdoielse(probenum, analinfo);
        /* Even if it printed out the inserted else, we will not disable at
            this point.  Instead, just return (since the if itself was executed,
            we won't want to print it out below!)
```

BEST AVAILABLE COPY

```
        */
        return;
    }
}


/*************************************************************************/

/* FUNCTION */
static void
prdoielse(probenum, analinfo)
int probenum;          /* number of the if's probe */
DR_ANAL *analinfo;     /* analysis information */

/*
 *      This routine is called when we want to scan forward and
 *      see if the else associated with this if is an inserted
 *      else or a normal one.  If inserted, and not executed, we
 *      will print it out immediately without changing the enable/disable
 *      state of the print control system...
 *
 */
{
    int mate;        /* probe number of the ELSE or IELSE */
    MR_PROBE *pptr;

    /* Search forwards for either ELSE or IELSE */
    mate = prfindmate(FALSE, probenum, PT_ELSE | PT_IELSE, analinfo);
    pptr = analinfo->mapinfo->probes[mate];
    if (!ISPTYPE(pptr->probetype, PT_IELSE))
    {
        /* Either the prfindmate failed, or the else was a user-inserted
           else...
        */
        return;
    }
    /* Yes, the mate of this 'if' was an inserted else.  Do nothing
        if it was executed!
    */
    if (analinfo->array[mate])
        return;         /* ielse was executed */

    /* Print out the info for the else... Note that number of concealed
        branches is always 1!
    */
    /* We don't flush pending output here so that the count of unexecuted
        probes will be correct
        However, use prctlinfo.firstout so the file name will be printed
        correctly if this is the first output...
    */
    prprobe(pptr, analinfo, mate, FALSE, prctlinfo.firstout, 1, FALSE, (MR_PROBE *) NULL);
    prctlinfo.firstout = FALSE;
    nooutfunc = FALSE;
```

BEST AVAILABLE COPY

```
}


/*************************************************************************/

/* FUNCTION */
static void
prdoidefault(probenum, analinfo)
int probenum;           /* probe number of this 'case' */
DR_ANAL *analinfo;      /* analysis information */

/*
 *    This routine is called to:
 *    check if the default associated with this case is an inserted default
 *       if the inserted default WAS executed, print it
 *
 *    For more information, see the function header for prctl()
 *
 *    Note that this does not affect the disable/enable state of
 *    these routines!
 */
{
   int mate;       /* either the default or the inserted default */
   MR_PROBE *pptr;

   mate = prfindmate(FALSE, probenum, PT_DEFAULT | PT_EMPTYDEFAULT | PT_IDEFAULT, analinfo);
   pptr = analinfo->mapinfo->probes[mate];

   if (!ISPTYPE(pptr->probetype, PT_IDEFAULT))
   {
      /* Either this is an inserted default, or for some reason we
         failed to find either of them...
      */
      return;
   }

   /* This IS an inserted default.  If it was not executed, do nothing */
   if (!analinfo->array[mate])
      return;

   /* This inserted default WAS executed.  Warn the user! */
   /* We don't flush pending output here so that the count of unexecuted
      probes will be correct
   */
   prprobe(pptr, analinfo, mate, TRUE, prctlinfo.firstout, 0, FALSE, (MR_PROBE *) NULL);
   prctlinfo.firstout = FALSE;
   nooutfunc = FALSE;

}


/*************************************************************************/
```

BEST AVAILABLE COPY

```
/* FUNCTION */
static void
doprprobe(labelptr)
MR_PROBE *labelptr;       /* if non-NULL, this is a probe which is related to a label.
                             in fact, the label is in the scope of an unexecuted branch,
                             but the label's array was true anyway (a goto was done to
                             it)
                          */

/*
 *    This is called when we are going to the enable state.
 *    If we were previously disabled, we will print the probe
 *    that caused us to disable
 *
 */
{
   if (prctlinfo.valid)
   {
      prprobe(prctlinfo.pptr, prctlinfo.analinfo, prctlinfo.probenum,
            prctlinfo.executed, prctlinfo.firstout, prctlinfo.numconcealed,
            FALSE, labelptr);
      prctlinfo.valid = FALSE;
      prctlinfo.firstout = FALSE;      /* in case second print is via prdoielse() */
   }
}


/**********************************************************************/

/* FUNCTION */
static void
prprobe(pptr, analinfo, probenum, executed, firstout, concealed, alert, labelptr)
MR_PROBE *pptr;
DR_ANAL *analinfo;
int probenum;          /* this probe's number */
boolean executed;      /* type is DEFAULT or CASE; their code really
                          was executed, but the case wasn't */
boolean firstout;      /* TRUE if this is first output for a procedure */
int concealed;            /* number of probes that are not executed */
boolean alert;         /* if true, this is an alert probe which was executed */
MR_PROBE *labelptr;    /* if non-NULL, this is a label in the scope of pptr which
                          was executed even tho pptr was not
                       */

/*
 *    This is the (main) output routine
 *    It calls the appropriate routine if the user used -l, -a, -b, etc...
 *
 *    It generates output both for non-executed probes, executed probes,
 *    and alert probes
 */
```

BEST AVAILABLE COPY

```
{
   if (outlines)
      prlines(pptr, analinfo, probenum, executed, firstout, concealed, alert, labelptr);
   if ((outafter != -1) || (outbefore != -1))
      prsource(pptr, analinfo, probenum, executed, firstout, concealed, alert, labelptr);
}


/*************************************************************************/

/* FUNCTION */
static void
prlines(pptr, analinfo, probenum, executed, firstout, concealed, alert, labelptr)
MR_PROBE *pptr;
DR_ANAL *analinfo;
int probenum;           /* this probe's number */
boolean executed;       /* type is DEFAULT or CASE; their code really
                           was executed, but the case wasn't */
boolean firstout;       /* TRUE if this is first output for a procedure */
int concealed;             /* number of probes that are not executed */
boolean alert;          /* if true, this is an alert probe which was executed */
MR_PROBE *labelptr;     /* if non-NULL, this is a label in the scope of pptr which
                           was executed even tho pptr was not
                        */

/*
 *    This routine is called for the -l option.
 *
 *    It generates output both for non-executed probes, executed probes,
 *    and alert probes
 */
{
   char start[30], end[30];
   boolean isctl;                /* if TRUE, lines are the lines of the controlling
                                    statement, not the lines of unexecuted code
                                 */
   char *posformat;              /* position format.  Either line/column,
                                    or just line
                                 */

   boolean startmid;             /* if TRUE, execution resumed in middle of scope */
   MR_SOURCE *src;
   char *explain;                /* control string */
   char comment[30];             /* normally, an option 'c' a space, and 3 digits
                                    telling number of concealed probes.  For alert,
                                    this is 3 stars
                                 */
   char note = ' ';
   PROBETYPE same;               /* unused */

   /* When we exit this switch statement, pptr points to the data we
      want to print... */
```

BEST AVAILABLE COPY

```
isctl = FALSE;    /* if possible, always talk about code */
prexplain(pptr, probenum, analinfo, executed, &explain, &isctl, &probenum, &same);
pptr = analinfo->mapinfo->probes[probenum];

if (prpositions)
   posformat = "%d/%d";
else
   posformat = "%d";

startmid = FALSE;
src = &pptr->source;

if (!isctl)
{
   /* Print lines of unexecuted code */
   sprintf(start, posformat, src->sline, src->scol + 1);
   if (labelptr == NULL)
   {
      /* Not interrupted by an executed label - normal state of affairs */
      sprintf(end, posformat, src->eline, src->ecol + 1);
   }
   else
   {
      /* A label was executed!  In that case, show the ending of the unexecuted
         code to be the column at the end of the label
      */
      if (ISPFLAG(labelptr->pflags, PF_INNERCASE))
      {
         sprintf(end, posformat, labelptr->source.ctl.eline, labelptr->source.ctl.ecol + 1);
         noteg = TRUE;     /* do a footnote about this */
         note = 'g';
      }
      else
      {
         /* must be a goto'd label */
         sprintf(end, posformat, labelptr->source.ctl.eline, labelptr->source.ctl.ecol + 1);
         notem = TRUE;     /* do a footnote about this */
         note = 'm';
      }
      startmid = TRUE;
   }
}
else
{
   /* Print the lines of the controlling statement */
   sprintf(start, posformat, src->ctl.sline, src->ctl.scol + 1);
   sprintf(end, posformat, src->ctl.eline, src->ctl.ecol + 1);
   notec = TRUE;     /* generate footnote about what this means */
}

/* Set the concealed count either to stars (for alert branches), or
```

BEST AVAILABLE COPY

```
        to the number of probes concealed by the printout */
    if (alert)
    {
        strcpy(comment, "****  ");
        explain = "code with BBA_ALERT was executed";
        notestars = TRUE;    /* generate footnote about what this means */
    }
    else
    {
        sprintf(comment, "%c%c%3d", (isctl) ? 'c' : ' ', note, concealed);
    }

    /* If this is the fisrt time we have output for this function,
        put in a file/function line */
    if (firstout)
    {
        printf("\n%s   %s\n", prthisfunc->funcname, pathtofname(currentdirectory,
                (rfnumtofile(src->mastersnum))->path, 0));
    }

    if (prpositions)
        printf("%8s -> %-8s%s %s\n", start, end, comment, explain);
    else
        printf("%4s -> %-5s%s %s\n", start, end, comment, explain);
}


/***********************************************************************/

/* FUNCTION */
boolean
prcaseexec(probenum, analinfo)
int probenum;                    /* this probe's number */
DR_ANAL *analinfo;               /* so we can know probe 0 */

/*
 *     This routine is called when a case statement was not executed.
 *     It returns TRUE if the case:
 *        1) had some executable statements
 *        2) had some previous cases' (that had no code) were
 *           executed.
 *
 *     This is used, for example, to put up the idea that even tho
 *     a case was not executed it's code was...
 *
 *     case a:
 *     case b: code
 *
 *     This returns TRUE if case a was executed...
 *
 *     Clearly this only works if the file was compiled
 *     with the PT_EMPTYCASE option enabled...
```

BEST AVAILABLE COPY

```
 *
 */
{
   register MR_PROBE **pptr;      /* current probe */
   register MR_PROBE *probe;
   int scope;         /* scope to search for */

   if (!ISPTYPE(analinfo->mapinfo->options, PT_EMPTYCASE))
   {
      return(FALSE);     /* option not enabled; can never be TRUE */
   }

   /* Scan backwards until
      1) find a case that is not PF_NOBREAK (return FALSE)
      2) find a case this *is* PF_NOBREAK and was executed (TRUE)
      3) find a scope < first case's scope

      NOTE: the case of two switches (number 2 right after the
      other) is not a problem, because the last case of a
      switch CANNOT be a PT_EMPTYCASE|DEFAULT (compiler syntax error)
   */

   pptr = &analinfo->mapinfo->probes[probenum];
   scope = (*pptr)->source.escope;

   /* Start our scan at the probe prior to this.  No need to
      check if probenum == 0 prior to decrement, because
      a switch statement cannot be the first probe
      in a function! However, let's be safe (so that if
      a new version allows that case, we don't blow up)
   */

   if (probenum <= 0)
      return(FALSE);

   probenum--;
   pptr--;
   for(/* no init */; probenum >= 0; probenum--, pptr--)
   {
      if ((probe = *pptr)->source.escope < scope)
      {
         /* Popped out of the switch statement */
         return(FALSE);
      }

      if (probe->source.escope > scope)
      {
         /* if this WERE a case, it would not belong to the
            same switch statement (nested switches)
```

BEST AVAILABLE COPY

```
            */
            continue;
         }

         if (!ISPTYPE(probe->probetype, PT_EMPTYCASE | PT_DEFAULT | PT_IDEFAULT |
               PT_CASE | PT_EMPTYDEFAULT))
         {
            continue;      /* not of interest */
         }

         /* At this point, we have found a case or default.  If it is not
            a NOBREAK, we must return FALSE
         */
         if (!ISPFLAG(probe->pflags, PF_NOBREAK))
         {
            return(FALSE);
         }

         /* Found a probe which is a case, and has the NOBREAK flag.
            If it was executed, return TRUE; else return FALSE
         */
         if (analinfo->array[probenum])
            return(TRUE);

         /* Else, continue searching backwards... */
      }

      /* Hit the top of the file and no case... */
      return(FALSE);
   }
```

Feb 03 15:53 1988  report/qstrtok.c Page 1

```
/*
 * FILE      $Header: qstrtok.c,v 1.3 87/10/02 12:20:36 hmgr Exp $
 *
 * AUTHOR       Bruce Erickson
 *
 * ONELINER High-speed 'strtok' - seperators are ' ', '\t', '\n'
 *
 * TABSTOPS 3
 *
 * INSPECTED   date     - inspectors
 *
 * RCS      $Log: qstrtok.c,v $
 * Revision 1.3  87/10/02  12:20:36  12:20:36  hmgr ()
 * Author: bae@hplsdlc.hp.com
 * checkpoint before moving onward
 *
 * Revision 1.2  87/08/05  17:54:18  17:54:18  hmgr ()
 * Author: bae@hplsdlc.hp.com
```

BEST AVAILABLE COPY

```
 * Various speed improvements
 *
 * Revision 1.1  87/08/05  16:01:57  16:01:57  hmgr ()
 * Initial revision
 *
 *
 */
static char rcsid[] = "$Header: qstrtok.c,v 1.3 87/10/02 12:20:36 hmgr Exp $";
#include <stdio.h>
#include <boolean.h>

/* GLOBALS */

/* STATICS */

/* EXTERNALS */

/* FORWARD */


/* FUNCTION */
char *qstrtok(start)
register char *start;
/*
 *    Same function as strtok(3), except that 'seperators' is ignored
 *    and seperators are hard-coded
 */
{
   static char *end;      /* end of previous call */
   static boolean eos;    /* if TRUE, at end of string */
   char *rstart;          /* return this as start of string */
   register char c;

   if (start == NULL)
   {
      /* User wants to continue previous string. If we have already hit
         the end-of-string, return NULL
      */
      if (eos)
         return(NULL);

      /* We did not find \0 on previous attempt - start at one character
         after we stopped last time
      */
      start = end + 1;
   }
   else
   {

      /* New string - clear the end-of-string flag */
      eos = FALSE;
   }

```

BEST AVAILABLE COPY

```
    /* Scan from current position to first non-space */
    while (TRUE)
    {
       if (((c = *start++) != ' ') && (c != '\t') && (c != '\n'))
          break;          /* c (start - 1) is not a seperator! */
    }

    /* Note that c might well be a \0, tho! */
    if (c == '\0')
    {
       eos = TRUE;
       return(NULL);
    }


    rstart = start - 1;
    /* 'rstart' is the var we will return.  Scan forward until
       1) space
       2) end of string

       Note that start is already one character beyond rstart...
    */

    while ((c = *start++) != '\0')
    {
       /* c is not end of string.  Is it a seperator? */
       if ((c == ' ') || (c == '\t') || (c == '\n'))
       {
          *--start = '\0';  /* replace space with string terminator */
          end = start;      /* so we can restart here */
          return(rstart);
       }
    }

    /* c IS end of string... Insure that any subsequent calls
       return end-of-string, and go for it
    */
    eos = TRUE;
    return(rstart);
 }
```

Feb 03 15:53 1988  report/expand.c Page 1

```
 /*
  * FILE     $Header: expand.c,v 1.3 87/10/02 12:18:43 hmgr Exp $
  *
  * AUTHOR      Bruce Erickson
  *
  * ONELINER Take a line, expand spaces, print, return special columns
  *
  * This routine takes a string & expands spaces according to the
```

BEST AVAILABLE COPY

```
 *     current value of 'tabs' (set via expandset() call).
 *     If it was passed any character numbers, it will return the
 *     printed column numbers that the character is at.
 *
 * CONDCOMP TEST  - create a main() for testing
 *
 * TABSTOPS 3
 *
 * INSPECTED   date      - inspectors
 *
 * RCS      $Log: expand.c,v $
 * Revision 1.3  87/10/02  12:18:43  12:18:43  hmgr ()
 * Author: bae@hplsdlc.hp.com
 * checkpoint before moving onward
 *
 * Revision 1.2  87/09/28  13:26:27  13:26:27  hmgr ()
 * Author: bae@hplsdlc.hp.com
 * Added ability to call expander with a NULL stream pointer
 *
 * Revision 1.1  87/09/21  15:47:41  15:47:41  hmgr ()
 * Initial revision
 *
 *
 */
static char rcsid[] = "$Header: expand.c,v 1.3 87/10/02 12:18:43 hmgr Exp $";
#include <stdio.h>
#include <boolean.h>

/* GLOBALS */

/* STATICS */
static int tabs = 8;     /* default expansion */

/* EXTERNALS */

/* FORWARD */



/**************************************************************************/

/* FUNCTION */
void
expandset(newvalue)
int newvalue;          /* value to expand tabs to */

/*
 *     This only sets tabs to newvalue; used to
 *     reset from the default of 8
 *
 */
{
```

BEST AVAILABLE COPY

```
    tabs = newvalue;
}


/**************************************************************************/

/* FUNCTION */
boolean
prexpand(fp, line, numcols, collist)
FILE *fp;           /* file pointer to print to (if not NULL) */
char *line;         /* malloc'd string */
int numcols;        /* if not 0, collist is a pointer to an array of
                       numcols integers, which specify character positions
                       that we want column information on
                    */
int *collist;       /* On return, if an entry is negative, we never got
                       to the associated character position
                    */

/*
 *    This routine expands any tabs that might be in "line".
 *    It will print the expanded line out to file pointer "fp" (if fp is not NULL).
 *    If numcols was not 0, we will return the column position
 *    that character collist[*] was printed at.  Origin is 0.
 *    If collist[?] points to a character that is expanded, we will return
 *    the starting position....
 *
 *    This expects line to end in a \n, and will also print the \n
 *
 *    This uses the same tab expansion method as tlist, which is the
 *    same that vi(1) & expand(1) use....
 *
 *    You might call this with fp == NULL when all you want is the
 *    expansion information....
 *
 *    RETURN TRUE if no output error; false otherwise
 */
{
    register char *ptr;         /* character we are at */
    register int cnum;          /* [next] character position (number) */
    register int col;           /* [next] column number */
    register char c;
    register listscan;          /* for scanning thru collist */

    cnum = col = 0;             /* start at zero! */
    ptr = line;

    while (((c = *ptr++) != '\n') && (c != '\0'))
    {
        /* If 'c' is at a column position that we are interested
           in, set it */
        for (listscan = 0; listscan < numcols; listscan++)
```

BEST AVAILABLE COPY

```
        {
            /* If this was, in fact, the character position we were interested
               in knowing the column output number it is in, set it to the
               negative of the column - so that we do not reset it
               on a later pass.  We will invert all of these at
               the end of the process
            */
            if (cnum == collist[listscan])
               collist[listscan] = -col;
        }

        /* Unless c is a tab, print it out, increment cnum, & return */
        if (c != '\t')
        {
            cnum++;
            col++;
            if (fp != NULL)
               fputc(c, fp);
            continue;
        }

        /* This character is a tab... */
        if (fp != NULL)
        {
            do
            {
               fputc(' ', fp);
            }
            while ((++col % tabs) != 0);
        }
        else
        {
            do
            {
               /* empty */
            }
            while ((++col % tabs) != 0);
        }
        cnum++;
    }

    if (fp != NULL)
    {
        if (c == '\n')
           fputc(c, fp);
    }

    for (listscan = 0; listscan < numcols; listscan++)
    {
        /* Negate the collist.  That way those that were
           never found become negative...
        */
```

BEST AVAILABLE COPY

```
        collist[listscan] = -collist[listscan];
    }
    return(TRUE);
}

#ifdef TEST
extern char *optarg;

main(argc, argv)
char *argv[];
/*
 *      usage:
 *          exp [-e tabs] [-p <position>]
 *      print column position of character position ... up to 8 of these..
 */
{
    int origpositions[10];
#   define NUMPOS (sizeof(origpositions) / sizeof(int))
    int newpositions[NUMPOS];
    int nump = 0;               /* number of -p options */
    char inline[1024];          /* input line */
    int c;
    int i;

    while ((c = getopt(argc, argv, "e:p:")) != EOF)
    {
        switch(c)
        {
        case 'e' :
            expandset(atoi(optarg));
            break;
        case 'p' :
            origpositions[nump++] = atoi(optarg);
            break;
        default :
            fprintf("usage: %s [-e <tabs>] [-p <positions>]\n", argv[0]);
            exit(1);
        }
    }

    while(TRUE)
    {
        if (fgets(inline, sizeof(inline), stdin) == NULL)
            exit(0);
        for (i = 0; i < nump; i++)
            newpositions[i] = origpositions[i];

        prexpand(stdout, inline, nump, newpositions);

        for (i = 0; i < nump; i++)
        {
            printf("%2d -> %2d ", origpositions[i], newpositions[i]);
```

BEST AVAILABLE COPY

```
      }
      if (nump > 0)
         printf("\n");
   }
}
#endif
```

Feb 03 15:53 1988  report/src.c Page 1

```
/*
 * FILE     $Header: src.c,v 1.7 87/12/17 14:38:51 hmgr Exp $
 *
 * AUTHOR      Bruce Erickson
 *
 * CONDCOMP PATHSEARCH  - if defined, search paths in BBAPATH
 *                        for mapping and source files
 *
 * ONELINER Print source references...
 *
 *    A word about file errors (such as "cannot open", "cannot seek", etc):
 *       After playing with the output for quite a while, I decided that
 *       the 'nicest' thing to do would be:
 *       1) do not print the explanation unless we have legal source
 *          output (but do print the function name/file name)
 *       2) report any errors when we switch files....
 *
 *
 * TABSTOPS 3
 *
 * INSPECTED   date     - inspectors
 *
 * RCS      $Log: src.c,v $
 * Revision 1.7  87/12/17  14:38:51  14:38:51  hmgr ()
 * Author: bae@hplsdlc.hp.com
 * added PATHSEARCH ability
 *
 * Revision 1.6  87/11/23  09:55:47  09:55:47  hmgr ()
 * Author: bae@hplsdlc.hp.com
 * correct messge grammar
 *
 * Revision 1.5  87/11/03  08:45:08  08:45:08  hmgr ()
 * Author: bae@hplsdlc.hp.com
 * Cleaned up printing of procedure/file-names between different files.
 *
 * Revision 1.4  87/10/02  12:21:20  12:21:20  hmgr ()
 * Author: bae@hplsdlc.hp.com
 * checkpoint before moving onward
 *
 * Revision 1.3  87/09/28  13:28:15  13:28:15  hmgr ()
 * Author: bae@hplsdlc.hp.com
 * no comment
```

BEST AVAILABLE COPY

```
 *
 * Revision 1.2  87/09/26  14:22:02  14:22:02  hmgr ()
 * Author: bae@hplsdlc.hp.com
 * Error reports, and -bN seem to be working...
 *
 * Revision 1.1  87/09/26  13:31:33  13:31:33  hmgr ()
 * Initial revision
 *
 *
 */
static char rcsid[] = "$Header: src.c,v 1.7 87/12/17 14:38:51 hmgr Exp $";
#include <stdio.h>
#include <sys/types.h>
#include <sys/stat.h>
#include <boolean.h>
#include <model.h>
#include "smithdate.h"
#include "probe.h"
#include "report.h"

/* The following structure is used to hold information about
   the most recent file we had opened...
*/
typedef struct
{
   char *path;           /* path of file; NULL if rest of data invalid */
   int32 snum;           /* source number of file */
   boolean exists;       /* if FALSE, 'path' does not exist */
   boolean outofdate;    /* if TRUE, 'path' is newer than our source date */
   FILE *stream;         /* stream.  NULL if we couldn't access it */
   int lastlinenum;      /* last line we read - origin 1 */
   char *text;           /* text of line 'lastlinenum' - no trailing \n */
} SOURCE;

/* The following structure is used to keep track of lines that we
   couldn't find in the file (if any)
*/
typedef struct
{
   boolean error;    /* if FALSE, never had any seek problems (or could not open the file) */
   int sline, eline; /* lowest/highest lines we had problems getting */
} SEEKERRORS;

/* The following macro is used prior to when we *know* we have valid
   source output to print.  If the explanation has not yet been printed,
   it prints it & sets pendinexp to FALSE to prevent further prints
*/
#define PREXPLAIN()  if (pendingexp) { fputs(fullexplain, stdout); pendingexp = FALSE;}

/* GLOBALS */

/* STATICS */
```

BEST AVAILABLE COPY

```
static SOURCE source = { NULL }; /* source reference */
static SEEKERRORS seekerrors;    /* To keep track of seek errors */
static char fullexplain[100];    /* explanation of current probe point */
static boolean pendingexp;       /* if TRUE, we have not yet printed fullexplain */

/* EXTERNALS */
extern int errno;
extern char *sys_errlist[];
extern int sys_nerr;
extern void prexplain();
extern void prcarets();
extern void prsgetcols();
extern MR_FUNC *prthisfunc;
extern void prsline();
extern char *freadline();
extern boolean prsseek();
extern int outafter;
extern int outbefore;
extern int outinter;
extern RP_FILE *rfnumtofile();
extern char currentdirectory[];
extern char *pathtofname();
#ifdef PATHSEARCH
    extern char *psearchinit();
#endif

/* FORWARD */
extern void prseekerrors();
extern boolean prscheckoverlap();
extern void prsgetctllines();
extern void prserror();
extern void prswarning();


/**************************************************************************/

/* FUNCTION */
void
prsource(pptr, analinfo, probenum, executed, firstout, concealed, alert, labelptr)
MR_PROBE *pptr;
DR_ANAL *analinfo;
int probenum;           /* this probe's number */
boolean executed;       /* type is DEFAULT or CASE; their code really
                           was executed, but the case wasn't */
boolean firstout;       /* TRUE if this is first output for a procedure */
int concealed;             /* number of probes that are not executed */
boolean alert;          /* if true, this is an alert probe which was executed */
MR_PROBE *labelptr;     /* if non-NULL, this is a label in the scope of pptr which
                           was executed even tho pptr was not
                        */

/*
```

BEST AVAILABLE COPY

```
 * This routine prints out sources as defined by values of outbefore/outafter:
 *
 *    If we really are printing (non-)executed code:
 * before after
 *    -1     -1     print no source references (should never be called for this!)
 *    -1      0     print first line of (non-)executed code
 *    -1      N     print first line of (non-)executed code thru (first line + N)
 *     0     -1     print only the line(s) with the control statement
 *     0      0     print the first line of control thru first line of (non-)executed code
 *     0      N     print the first line of control thru (first line of (non-)executed code) + N
 *     N     -1     print (first line of control - N) thru last line of control statement
 *     N      0     print (first line of control - N) thru first line of (non-)executed code
 *     N      N     print (first line of control - N) thru first line of (non-)executed code + N
 *
 * If outafter >= 0, and we are print (non-)executed code:
 *    If we detect that probe-1 or probe+1 has same (execute) line as probe, print
 *    a line which as carets (^) under this probe's column range.
 * else (outafter was -1 & outbefore != -1, or we are printing control code)
 *    If we detect that probe-1 or probe+1 has same (control) line as probe, print
 *    a line which as carets (^) under this probe's control column range.
 *
 *
 *    If we are really printing control statement (e.g., an inserted default was executed,
 *    so we print the switch statement), the "-aN" refers not to the code, but to N lines
 *    after the control statement.
 *
 * Make notes PRIOR to source output.
 *
 */
{
    int start, end;              /* first/last lines to print */
    boolean isctl;               /* if TRUE, lines are the lines of the controlling
                                    statement, not the lines of unexecuted code
                                 */
    boolean prctl;               /* if TRUE, we are printing control (only?) */
    int newprobenum;
    boolean startmid;            /* if TRUE, execution resumed in middle of scope */
    MR_SOURCE *src;
    char conc[20];               /* string containing (%d) of concealed number */
    char *explain;               /* explanation, if any */
    char errorstring[30];        /* in case of error... */
    boolean overlap;             /* set to TRUE if control or statements overlap */
    MR_PROBE *pptr2;             /* in case we need to check other probes for overlap */
    int sline, eline;            /* start/stop lines */
    int scol, ecol;              /* start/end column if we need to put carets under a line */
    PROBETYPE same;              /* disambiguate a line if any probes with this type on
                                    same line */
    int32 snum;                  /* source code number */
    boolean someout;             /* if TRUE, at least one prsfile succeeded (so prcarets
                                    call is OK) */
    char *filename;              /* name of file containing a function */
    boolean printedexec;         /* if TRUE, we have printed the first executed line */
```

BEST AVAILABLE COPY

```
int32 firstprintedsnum;     /* this is the source number of the first file that will
                               be printed for this output */

/* Ask prexplain to talk about code, unless emphasis is on the
   branch (outafter == -1)
*/
isctl = (outafter == -1) ? TRUE : FALSE;

/* Copy the explanatory comment to 'fullexplain' for later output */
prexplain(pptr, probenum, analinfo, executed, &explain, &isctl, &probenum, &same);
pptr = analinfo->mapinfo->probes[probenum];

if (alert)
{
   explain = "code with BBA_ALERT was executed";
   strcpy(conc, "****");
}
else
   sprintf(conc, "(%d)", concealed);

sprintf(fullexplain, " %4s %s%s\n", conc, explain,
      (isctl && outafter != -1) ? " [control lines]" : "");

pendingexp = TRUE;          /* mark that the explanation is pending.... */
seekerrors.error = FALSE;         /* Assume no problems */
printedexec = FALSE;
someout = FALSE;      /* assume all prsfile's fail */

/* Fetch line/column information for the control line */
prsgetctllines(pptr, &snum, &sline, &scol, &eline, &ecol);

/* The first source that will be printed is pptr->source.mastersnum if
   outbefore is -1; else it is the source number of the control code
*/
if (outbefore == -1)
   firstprintedsnum = pptr->source.mastersnum;
else
   firstprintedsnum = snum;      /* use the control statement's line */

/* If this is the fisrt time we have output for this function,
   or if we are in a different file (include file with code),
   put in a file/function line */
if ((firstprintedsnum != source.snum) || firstout)
{
   filename = (rfnumtofile(firstprintedsnum))->path;
   printf("\n%s    %s\n", prthisfunc->funcname, pathtofname(currentdirectory,
         filename, 0));
}

/* If we need to, print N lines prior to the control line... */
if (outbefore > 0)
{
```

BEST AVAILABLE COPY

```
      /* Always print N lines prior to CONTROL line */
      someout |= prsfile(snum, sline - outbefore, scol, eline - 1, -1, alert, FALSE);
   }


   /* At the control line, we have some subtlities, because the executed code
      may be on the same line as the control code.  Therefore:
         if outbefore >= 0, print the entire control line(s)
         if outafter >= 0 && 1st line of non-executed code is same as control line,
            print code section of line
   */
   if ((outbefore >= 0) || ((eline >= pptr->source.sline) && (snum == pptr->source.mastersnum)))
   {
      prctl = printedexec = ((outafter == -1) || isctl);

      if ((eline >= pptr->source.sline) && (snum == pptr->source.mastersnum))
      {
         prctl = TRUE;            /* When time comes, tag the control (executed) line */
         printedexec = TRUE;      /* Yes, we will print the first executable line */
      }

      /* Print out the control line ... */
      someout |= prsfile(snum, eline, 0, eline, -1, alert, prctl);

      /* Ok - we may have printed out the control line.  Should we put carets under it? */
      if (someout && prctl)
      {
         /* If any other control statements of type 'same' on this line, we will need
            to put carets under this control statement
         */
         overlap = prscheckoverlap(probenum, analinfo, pptr, same);

         if (overlap)
         {
            /* Print the carets under current probe's control statement */
            if (isctl || (outafter == -1))
            {
               /* Emphasis on control line */
               scol = (sline == source.lastlinenum) ? scol : 0;
               ecol = (eline == source.lastlinenum) ? ecol : -1;
            }
            else
            {
               /* Emphasis on executed code */
               scol = ((sline == pptr->source.sline) &&
                     (snum == pptr->source.mastersnum)) ? pptr->source.scol : 0;
               ecol = ((eline == pptr->source.eline) &&
                     (snum == pptr->source.mastersnum)) ? pptr->source.ecol : -1;
            }
            prcarets(scol, ecol);
```

BEST AVAILABLE COPY

```
            }

        }

        /*****************************************************************************/
        /*    At this point, we have printed out the control line - even maybe     */
        /*    printed out (part of) the executable code, if it was on the          */
        /*    same line as the control code                                         */
        /*****************************************************************************/

        if (outafter == -1)
        {
           /* Stop after printing the control code */
           /* If any seek errors, print a warning out */
           prseekerrors(analinfo);
           /* We are finished! */
           if (someout)
           {
              /* We had some output.  Seperate output with new-lines */
              fputs("\n", stdout);
           }
           return;
        }

        /* Potentially some "after" code */

        if ((outbefore != -1) && !isctl)
        {
           /* Consider how many lines between the end of the control code and the
              beginning of the executable code.  If more than outinter, print
              out 1/2 of interlines after the control code, a warning about omitted
              lines, then 1/2 of interlines prior to the execution code
              We will also use this method if the control code & the controlled code
              are in different files.
           */
           if (((pptr->source.sline - eline - 1) > outinter) || (pptr->source.mastersnum != snum))
           {
              someout |= prsfile(snum, eline + 1, 0, eline + 1 + outinter / 2, -1, alert, FALSE);
              if (pptr->source.mastersnum != snum)
              {
                 /* The twisted mind of this programmar has put the control code & the controlled
                    code in different files.  Print out the file name that has the controlled code
                    in parenthesis, so it looks like the (omitted) warning.
                 */
                 printf(" (%s)\n", pathtofname(currentdirectory,
                       (rfnumtofile(pptr->source.mastersnum))->path, 0));
              }
              else
              {
                 fputs(" (omitted)\n", stdout);
              }
```

BEST AVAILABLE COPY

```
            someout |= prsfile(pptr->source.mastersnum, pptr->source.sline - 1 - outinter / 2, 0,
                  pptr->source.sline - 1, -1, alert, FALSE);
         }
         else
         {
            if (pptr->source.sline != eline)
            {
               /* Just print the lines */
               someout |= prsfile(snum, eline + 1, 0, pptr->source.sline - 1, -1, alert, FALSE);
            }
         }
      }

      if (!isctl)
      {
         /* Ok, unless we are print the control statement out, copy the info
            about the executed lines to the appropriate variables
         */
         snum = pptr->source.mastersnum;
         sline = pptr->source.sline;
         scol = pptr->source.scol;
         eline = pptr->source.eline;
         ecol = pptr->source.ecol;
      }

      /* Print the first code line, unless it was printed as part of the control
         code....
      */
      if (!printedexec)
      {
         /* Print the first executed line out.  If there may be confusion,
            print carets under the important stuff
         */
         someout |= prsfile(snum, sline, 0, sline, -1, alert, TRUE);
      }

      /* Now print lines from sline + 1 thru sline + outafter */
      someout |= prsfile(snum, sline + 1, 0, sline + outafter, -1, alert, FALSE);

      /* Stop printing for this entire probe */
      prseekerrors(analinfo);
      if (someout)
         fputs("\n", stdout);
      return;
   }


   /*************************************************************************/

   /* FUNCTION */
   static void
```

BEST AVAILABLE COPY

```
prcarets(scol, ecol)
int scol, ecol;            /* start/end columns (0 = first, -1 = last) */

/*
 *
 *    This routine will print carets (^) between the columns specified.
 *    The columns will be mapped taking into account tab expansion.
 *
 */
{
   int pos;                /* position on line */
   int spos, epos;         /* start/end position */

   if (ecol == -1)
      ecol = strlen(source.text) - 1;      /* map -1 to end of line */

   prsgetcols(scol, ecol, &spos, &epos);

   for (pos = 0; pos <= epos; pos++)
   {
      if (pos < spos)
         fputc(' ', stdout);
      else
         fputc('^', stdout);
   }
   fputc('\n', stdout);

}


/***************************************************************************/

/* FUNCTION */
static boolean
prsfile(snum, sline, scol, eline, ecol, alert, tag)
int32 snum;             /* source file's master source number */
int sline;              /* first line to print */
int scol;               /* first column to print; */
int eline;              /* last line to print */
int ecol;               /* last column to print; -1 means end of eline */
boolean alert;          /* if TRUE, this is an alert branche */
boolean tag;            /* if TRUE, tag the line with a '>' */

/*
 *    This routine prints the given lines of the current source file
 *    out.
 *    If alert is TRUE, we will print '*'s in the first column (else
 *    spaces)
 *
 *    RETURN TRUE if at least one line printed; else FALSE
 */
{
```

BEST AVAILABLE COPY

```
    int line;           /* line number we are printing */
    boolean someline; /* if TRUE, we printed at least one line */
    char errorstring[30];       /* in case of an error */

    if (sline < 1)
       sline = 1;      /* in case of underflow */

    someline = FALSE;
    for (line = sline; line <= eline; line++)
    {
       if (prsseek(snum, line))
       {
          /* If the seek didn't fail, then we succeeded in reading in
             the requested line
          */
          someline = TRUE;      /* show that we printed at least one line */
          if (line == sline)
          {
             if (line == eline)
                prsline(scol, ecol, alert, tag); /* first line == last line */
             else
                prsline(scol, -1, alert, tag);   /* first line - print all of it from scol down */
          }
          else
          {
             if (line == eline)
                prsline(0, ecol, alert, tag);
             else
                prsline(0, -1, alert, tag);         /* print entire line */
          }
       }
    }

    if (!someline)
    {
       return(FALSE);
    }
    return(TRUE);
}


/*************************************************************************/

/* FUNCTION */
static void
prsline(scol, ecol, alert, tag)
int scol, ecol;      /* starting/ending columns.  -1 means end-of-line; 0 is start */
boolean alert;       /* if TRUE, print stars at left column.*/
boolean tag;         /* if TRUE, put a '>' on the line, too */

/*
 *    When we are called, source.text is the line we need to print, and
```

BEST AVAILABLE COPY

```
 *
 *     If we haven't printed the explanation yet, do so prior to printing
 *     the line.
 *
 *     In user testing, they wanted "->" as the tag string, but were
 *     unwilling to give up yet-another-column for the "-"  (they previously
 *     saw ">").
 *
 *     Therefore, for line numbers <= 999, the user will see -> for the tag;
 *     for 1000 <= line numbers <= 9999, he will see ">", and for
 *     larger numbers the routine which prints the carets will be messed up.
 *     Small price to pay...
 *
 *     NOTE: if the part that is printed prior to the source line
 *     ever changes, you will need to change
 *     prsgetcols() to reflect it!
 */
{
   char alertchar;        /* either ' ' or '*' */
   char *format;          /* format, depending on value of source.lastlinenum */

   PREXPLAIN();

   if (alert)
      alertchar = '*';
   else
      alertchar = ' ';

   if (source.lastlinenum < 1000)
   {
      /* 2 characters available for tag */
      if (tag)
         format = "%c%-3d-> ";
      else
         format = "%c%-3d   ";
   }
   else
   {
      /* 1 character available for tag */
      if (tag)
         format = "%c%-4d> ";
      else
         format = "%c%-4d  ";
   }

   printf(format, alertchar, source.lastlinenum);

   prexpand(stdout, source.text, 0, NULL);
   putc('\n', stdout);     /* put a \n at the end.... */
}
```

BEST AVAILABLE COPY

```
/*************************************************************************/

/* FUNCTION */
static void
prsgetcols(c1, c2, p1, p2)
int c1, c2;             /* character positions */
int *p1, *p2;           /* column positions that c1 & c2 are at */

/*
 *    This routine returns (absolute) column positions that
 *    c1 & c2 are at for the line currently in source.text
 *
 *    Origin 0.
 */
{
   int array[2];

   array[0] = c1;
   array[1] = c2;

   prexpand(NULL, source.text, 2, array);
   *p1 = array[0] + 7;      /* offset by "*xxxx> " that prsline uses */
   *p2 = array[1] + 7;
}


/*************************************************************************/

/* FUNCTION */
static boolean
prsgetfile(snum)
int32 snum;             /* source file number we are interested in */

/*
 *    This routine will check to see if we already have file
 *    snum open.  If yes, we just return; else
 *    we will do whatever is necessary.
 *
 *    This routine will generate error messages and
 *    warnings as appropriate.
 *
 *    Returns FALSE if we cannot open the file; TRUE otherwise.
 */
{
   RP_FILE *rptr;        /* pointer to file information */
   struct stat statbuf;
   SMITHTIME filetime;
   char *spath;          /* same as path, unless PATHSEARCH is enabled */

   /* If we have never opened a file (source.path == NULL), or
      If not the same file, we will need to open a new one
```

BEST AVAILABLE COPY

```
   */
   if ((source.path == NULL) || (source.snum != snum))
   {
      /* Must (attempt to) open a file */
      if (source.path != NULL)
      {
         /* Already have a file open */
         if (source.stream != NULL)
            fclose(source.stream);     /* close previous pointer */
      }

      /* Fetch new source's name */
      source.snum = snum;
      rptr = rfnumtofile(snum);
      source.path = rptr->path;
      rptr->analinfo->mapinfo;

      if (rptr->cannotread)
      {
         source.stream = NULL;
         source.exists = FALSE;
         prserror("Cannot open ", pathtofname(currentdirectory,
               source.path, 0), NULL);
         return(FALSE);    /* but don't generate a full error message */
      }

#     ifndef PATHSEARCH
         spath = source.path;
#     else
         if ((spath = psearchinit("BBAPATH", source.path)) == NULL)
            spath = source.path;    /* to get correct error message */
#     endif

      source.stream = fopen(spath, "r");

      if (source.stream == NULL)
      {
         /* OOPS.  File not found, or we cannot open it. */
         rptr->cannotread = TRUE;
         prserror("Cannot open ", pathtofname(currentdirectory,
               source.path, 0), NULL);
         /* Attempt to provide a full reason why we failed */
         if (errno <= sys_nerr)
         {
#pragma       BBA_IGNORE /* don't know how to test this, either! */
            prserror(sys_errlist[errno], NULL);
         }
         source.exists = FALSE;
```

BEST AVAILABLE COPY

```
            return(FALSE);
        }

        /* Opened new file successfully */
        source.exists = TRUE;
        source.lastlinenum = 0;

        /* Compare dates (maybe!) */
        source.outofdate = FALSE;      /* assume not out of date */
        if (rptr->modvalid)
        {
            if (fstat(fileno(source.stream), &statbuf) == 0)
            {
                smithfromunix(&statbuf.st_mtime, &filetime);
                if (smithcmp(&rptr->filemodtime, &filetime) != 0)
                    source.outofdate = TRUE;
            }
            else
            {
#pragma         BBA_IGNORE
                /* to test this, you would need to delete
                    the i-node between the time of opening the file
                    and here....
                */
            }
        }

        if (source.outofdate)
        {
            prswarning("Source ref may be bad for ", pathtofname(currentdirectory, source.path, 0),
                "\nthe file does not have the same date as the mapfile does", NULL);
        }
        return(TRUE);      /* opened new file OK */
    }

    /* else, file may already be opened */
    if (source.stream == NULL)
    {
        return(FALSE);     /* previous attempt failed, and already printed error */
    }
    return(TRUE);          /* previous attempt OK */
}


/************************************************************************/

/* FUNCTION */
static void
prserror(str1, str2, str3, str4)
char *str1, *str2, *str3, *str4;

/*
```

BEST AVAILABLE COPY

```
 *     This routine will print out an error; the text of the error
 *     is str*, where the last is a NULL pointer.
 *     This will append a \n after the last one.
 *
 *     Any \n's should start a string (so any necessary prepends
 *     can be done)
 *
 *     This is used because I am uncertain of how to present error
 *     messages on the source ref listing in such a manner as
 *     to make it readable & stand out at the same time.
 */
{
#  define ERPRINT(str) if (str == NULL) { fputc('\n', stdout); return;} if (*str == '\n') { fputs("\n**** ",
   st stdout); r++; } fputs(str, stdout);

   printf("**** %s", str1);

   ERPRINT(str2);
   ERPRINT(str3);
   ERPRINT(str4);
   fputc('\n', stdout);
}


/**********************************************************************/

/* FUNCTION */
static void
prswarning(str1, str2, str3, str4)
char *str1, *str2, *str3, *str4;

/*
 *     This routine will print out a warning; the text of the error
 *     is str*, where the last is a NULL pointer.
 *     This will append a \n after the last one.
 *
 *     This is used because I am uncertain of how to present error
 *     messages on the source ref listing in such a manner as
 *     to make it readable & stand out at the same time.
 */
{
#  define WARNPRINT(str) if (str == NULL) { fputc('\n', stdout); return;} if (*str == '\n') { fputs("\n==== ",
   stdout  str++; } fputs(str, stdout);
   printf("==== %s", str1);

   WARNPRINT(str2);
   WARNPRINT(str3);
   WARNPRINT(str4);
   fputc('\n', stdout);
}
```

```
/***************************************************************************/

/* FUNCTION */
static boolean
prsseek(snum, linenum)
int32 snum;           /* source number of file */
int linenum;          /* line number we want */

/*
 *    This routine is called to get a specific line number
 *    into source.text.
 *    If we fail, source.linenum will be set to the last
 *    line in the file, and we will return FALSE.
 *    Otherwise, source.lastlinenum will be linenum, and
 *    source.text is that line.
 *
 */
{
   char *text;

   /* Get file/verify it is already opened */
   if (!prsgetfile(snum))
      return(FALSE);

   if (linenum < source.lastlinenum)
   {
      /* We need to back up to the beginning of the file... */
      fseek(source.stream, 0L, 0);
      source.lastlinenum = 0;
   }

   while (linenum > source.lastlinenum)
   {
      if ((text = freadline(source.stream)) == NULL)
      {
         /* The last line we read was the last line in the file! */
         if (seekerrors.error)
         {
            /* This isn't the first time.... */
            if (seekerrors.sline > linenum)
               seekerrors.sline = linenum;
            if (seekerrors.eline < linenum)
               seekerrors.eline = linenum;
         }
         else
         {
            /* First error for this probe */
            seekerrors.sline = seekerrors.eline = linenum;
         }
         seekerrors.error = TRUE;
         return(FALSE);
      }
```

BEST AVAILABLE COPY

```
        source.lastlinenum++;       /* got another line */
        source.text = text;
    }
    return(TRUE);
}


/*************************************************************************/

/* FUNCTION */
static boolean
prscheckoverlap(probenum, analinfo, pptr, same)
int probenum;          /* probe number of current probe */
DR_ANAL *analinfo;
register MR_PROBE *pptr;      /* for effeciency */
PROBETYPE same;          /* any probes of this type on same line generates TRUE */

/*
 *    This routine returns TRUE if there are any probes of type 'same'
 *    on the same line as pptr.
 *
 */
{
    int pscan;                  /* probe we are checking */
    register MR_PROBE *pptr2;   /* probe we are checking */
    int scol, ecol;             /* unused - only for calling reasongs */
    int sline, eline;           /* pptr's sline/eline */
    int s2line, e2line;         /* probe we are checking's sline/eline */
    int32 snum;                 /* source file lines are in */

    /* Fetch sline etc */
    prsgetctllines(pptr, &snum, &sline, &scol, &eline, &ecol);

    /* Scan backwards.  Stop at top of file, or when
       we find a probe that is not on this line
    */
    for (pscan = probenum - 1; pscan >= 0; pscan--)
    {
        pptr2 = analinfo->mapinfo->probes[pscan];
        /* Fetch correct sline/eline based on type */
        prsgetctllines(pptr2, &snum, &s2line, &scol, &e2line, &ecol);

        if (snum == pptr->source.mastersnum)
        {
            /* In the same file .. */
            if (ISPTYPE(pptr2->probetype, same))
            {
                /* potential conflict */
                if (e2line >= sline)
                    return(TRUE);     /* Yup, we have overlap */
            }
```

BEST AVAILABLE COPY

```
            if (e2line < sline)
               break;      /* not possible for any more probes to be on
                                this line */
         }
         else
            break;         /* out of file; must be OK */
      }

      /* Scan forwards until end of file or when we find
         a probe that is not on this line
      */
      for (pscan = probenum + 1; pscan < analinfo->numentries; pscan++)
      {
         pptr2 = analinfo->mapinfo->probes[pscan];
         /* Fetch correct sline/eline based on type */
         prsgetctllines(pptr2, &snum, &s2line, &scol, &e2line, &ecol);

         if (snum == pptr->source.mastersnum)
         {
            if (ISPTYPE(pptr2->probetype, same))
            {
               /* potential conflict */
               if (s2line <= sline)
                  return(TRUE);     /* Yup, we have overlap */
            }
            if (s2line > sline)
               break;      /* not possible for any more probes to be on
                                this line */
         }
         else
            break;      /* out of file; must be OK */
      }
      return(FALSE);
   }


   /***************************************************************************/

   /* FUNCTION */
   static void
   prsgetctllines(pptr, snum, sline, scol, eline, ecol)
   register MR_PROBE *pptr;       /* probe */
   int32 *snum;                   /* source number */
   int *sline, *scol;
   int *eline, *ecol;

   /*
    *    This returns the correct sline,scol/eline,ecol based on
    *    the probe type.
    *
    */
   {
```

BEST AVAILABLE COPY

```
    if (ISPTYPE(pptr->probetype, PT_FUNCTION))
    {
        *snum = pptr->source.fname.mastersnum;
        *sline = pptr->source.fname.sline;
        *scol = pptr->source.fname.scol;
        *eline = pptr->source.fname.eline;
        *scol = pptr->source.fname.scol;
    }
    else
    {
        *snum = pptr->source.ctl.mastersnum;
        *sline = pptr->source.ctl.sline;
        *scol = pptr->source.ctl.scol;
        *eline = pptr->source.ctl.eline;
        *ecol = pptr->source.ctl.ecol;
    }
}


/*****************************************************************************/

/* FUNCTION */
static void
prseekerrors(analinfo)
DR_ANAL *analinfo;

/*
 *    This is called just before we are finished printing
 *    the output for a probe.
 *    If we encountered any seek errors, check to see if they
 *    were beyond the last line number of the last function
 *    in this file.  If they were beyond the last line number
 *    of the last function, print out (eof); else
 *    print an error message...
 *
 */
{
    char errorstring[30];
    int lastline;                 /* last line in function */
    register MR_FUNC *fptr;       /* function pointer */

    if (seekerrors.error)
    {
        /* Find the last function */
        fptr = prthisfunc;
        while (fptr->next != NULL)
            fptr = fptr->next;         /* go to next function */

        lastline = analinfo->mapinfo->probes[fptr->firstprobe]->source.eline;
        if (seekerrors.sline > lastline)
        {
            /* Explain that we could not print out any more because of the
```

BEST AVAILABLE COPY

```
            end of file... */
         fputs("(eof)\n", stdout);
         return;        /* do not generate an error message; EOF probably OK */
      }

      PREXPLAIN();      /* in case no explanation printed yet */
      if (seekerrors.sline != seekerrors.eline)
         sprintf(errorstring, "s %d through %d", seekerrors.sline, seekerrors.eline);
      else
         sprintf(errorstring, " %d", seekerrors.sline);

      prserror("Cannot find line", errorstring, " in file ",
            pathtofname(currentdirectory, source.path, 0), NULL);
   }
}
```

Feb 03 15:53 1988  report/explain.c Page 1

```
/*
 * FILE     $Header: explain.c,v 1.6 88/01/02 10:05:41 hmgr Exp $
 *
 * AUTHOR      Bruce Erickson
 *
 * ONELINER Routine to explain what a probe is about
 *
 *    A note about phrasing:
 *       We used to talk about "always false" and "always true".
 *       However, consider the case of an else-less if never having
 *       been reached (a return was always executed prior to reaching
 *       the if).  If we talk about a branch being "always false"
 *       and "always true", this leads to a seeming inconsistancy!
 *       It will be ok, however, to talk about a branch that
 *       was both "never false" and "never true".
 *
 * TABSTOPS 3
 *
 * EXCEPTIONS  description
 *
 * INSPECTED   date     - inspectors
 *
 * RCS      $Log: explain.c,v $
 * Revision 1.6  88/01/02  10:05:41  10:05:41  hmgr ()
 * Author: bae@hplsdlc.hp.com
 * Added code to deal with 'inner cases'
 *
 * Revision 1.5  87/11/03  08:42:20  08:42:20  hmgr ()
 * Author: bae@hplsdlc.hp.com
 * converted to pragmas
 *
 * Revision 1.4  87/10/06  10:40:30  10:40:30  hmgr ()
 * Author: bae@hplsdlc.hp.com
 * changed the phrasing...
```

BEST AVAILABLE COPY

```
 *
 * Revision 1.3  87/10/02  12:18:51  12:18:51  hmgr ()
 * Author: bae@hplsdlc.hp.com
 * checkpoint before moving onward
 *
 * Revision 1.2  87/09/29  10:36:57  10:36:57  hmgr ()
 * Author: bae@hplsdlc.hp.com
 * better messages....
 *
 * Revision 1.1  87/09/28  16:17:45  16:17:45  hmgr ()
 * Initial revision
 *
 *
 */
static char rcsid[] = "$Header: explain.c,v 1.6 88/01/02 10:05:41 hmgr Exp $";
#include <stdio.h>
#include <boolean.h>
#include <model.h>
#include "smithdate.h"
#include "probe.h"
#include "report.h"

/* GLOBALS */

/* STATICS */

/* EXTERNALS */

/* FORWARD */


/*************************************************************************/

/* FUNCTION */
void
prexplain(pptr, probenum, analinfo, executed, explain, isctl, newprobenum,
        same)
MR_PROBE *pptr;       /* comment we want */
int probenum;
DR_ANAL *analinfo;
boolean executed;
char **explain;             /* return explanation to here */
boolean *isctl;          /* Input: if TRUE, talk about the control code;
                            if FALSE, talk about the executed code...
                            Output: set to TRUE if we need to print ctl statement
                         */
int *newprobenum;        /* probe number to use: if isctl is FALSE, new probe
                            number for executed code (see whilenot); else
                            probe number of ctl statement
                         */
PROBETYPE *same;         /* probes ofthis type on the same line as newprobenum require
                            pointing out a subsection of the line
```

BEST AVAILABLE COPY

```
                         */

/*
 *    This routine is used both by line-reference & source reference systems.
 *
 * A note about prev/next-same:
 *    The goal of the source ref. is to avoid having to point out subsections
 *    of a line.  The only time the line itself is insufficient (for pointing out
 *    control codes) is when there are two or more probes of the same type on
 *    a single line (e.g., if (a) { if (a) } whould require pointing out
 *    which one you are talking about, but while (a) { if (a) .. } would not).
 *    Therefore prev/next-same are set to the probe types which can be on
 *    the same line and would require pointing out a subsection.
 *
 *    The largest explanation we can return is 55 characters.... if this
 *    changes, check the places where this is called, since at least one
 *    of the places uses this + other & sticks into a static string....
 */
{
   static char errorstring[30];
   int mate;
   boolean ctlemph;     /* passed-in emphasis (TRUE = control-code emphasis) */

   ctlemph = *isctl;
   *isctl = FALSE;          /* assume not control statement */
   *newprobenum = probenum;/* assume same */

   *same = pptr->probetype;      /* assume the only problem is with
                                    identical probes */
   /* When we exit this switch statement, pptr points to the data we
      want to print... */
   switch(pptr->probetype)
   {
   case PT_FUNCTION :
      /* Same messege either emphasis */
      *explain = "function was never called";
      break;
   case PT_IF :
      if (ctlemph)
         *explain = "conditional of 'if' was never TRUE";
      else
         *explain = "'then' part of 'if' was never executed";
      break;
   case PT_ELSE :
      if (ctlemph)
         *explain = "conditional of 'if' was never FALSE ('else' never executed)";
      else
         *explain = "'else' part of 'if' was never executed";
      break;
   case PT_IELSE :
      /* For this case, we need to search backwards for the associated
         if statement....
```

BEST AVAILABLE COPY

```
        */
        *newprobenum = mate = prfindmate(TRUE, probenum, PT_IF, analinfo);
        pptr = analinfo->mapinfo->probes[mate];
        *isctl = TRUE;
        /* Always print out control-emphasis statement... */
        *explain = "conditional of 'if' was never FALSE (no 'else' statement)";
        *same = PT_IF;
        break;
    case PT_EMPTYCASE :
        /* PF_INNERCASE can never have EMPTY set */
        *isctl = TRUE;
        *newprobenum = probenum;
        /* Message the same regardless of emphasis */
        *explain = "switch never went to 'case' (no executable statements)";
        *same = PT_CASE | PT_EMPTYCASE | PT_DEFAULT | PT_EMPTYDEFAULT;
        break;
    case PT_WHILE :
        if (ctlemph)
            *explain = "conditional of 'while' was never TRUE";
        else
            *explain = "body of 'while' loop was never executed";
        break;
    case PT_3FOR :
        /* Explanation of this is only clear in one way.... */
        *explain = "3rd expression of 'for' was never executed";
        break;
    case PT_FOR :
        if (ctlemph)
            *explain = "conditional of 'for' was never TRUE";
        else
            *explain = "body of 'for' loop was never executed";
        break;
    case PT_DEFAULT :
        if (executed)
        {
            if (ISPFLAG(pptr->pflags, PF_INNERCASE))
                *explain = "switch never went to 'inner default' (code executed by fall-thru)";
            else
                *explain = "switch never went to 'default' (code executed by fall-thru)";
            *isctl = TRUE;
            *newprobenum = probenum;
        }
        else
            if (ISPFLAG(pptr->pflags, PF_INNERCASE))
            {
                *explain = "switch never went to 'inner default'";
                *isctl = TRUE;
            }
            else
            {
            if (ctlemph)
                *explain = "switch never went to 'default'";
```

BEST AVAILABLE COPY

```
            else
                *explain = "'default' code was never executed";
            }
        break;
    case PT_IDEFAULT :
        /* Show switch statement, 'cause no code to show */
        *isctl = TRUE;
        *newprobenum = probenum;
        *explain = "switch went to 'default' (default not defined in code)";
        break;
    case PT_CASE :
        if (executed)
        {
            if (ISPFLAG(pptr->pflags, PF_INNERCASE))
                *explain = "switch never went to 'inner case' (code executed by fall-thru)";
            else
                *explain = "switch never went to 'case' (code executed by fall-thru)";
            *isctl = TRUE;
            *newprobenum = probenum;
        }
        else
            if (ISPFLAG(pptr->pflags, PF_INNERCASE))
            {
                *explain = "switch never went to 'inner case'";
                *isctl = TRUE;
            }
            else
            {
            if (ctlemph)
                *explain = "switch never went to 'case'";
            else
                *explain = "'case' code was never executed";
            }
        *same = PT_CASE | PT_EMPTYCASE | PT_DEFAULT | PT_EMPTYDEFAULT;
        break;
    case PT_CATRUE :
        if (ctlemph)
            *explain = "conditional of 'conditional assignment' was never TRUE";
        else
            *explain = "true part of 'conditional assignment' was never executed";
        break;
    case PT_CAFALSE :
        if (ctlemph)
            *explain = "conditional of 'conditional assignment' was never FALSE";
        else
            *explain = "false part of 'conditional assignment' was never executed";
        break;
    case PT_DOTRUE :
        *isctl = TRUE;
        *newprobenum = probenum;
        *explain = "conditional of 'do while' was never TRUE";
        break;
```

BEST AVAILABLE COPY

```
      case PT_DOFALSE :
         *isctl = TRUE;
         *newprobenum = probenum;
         *explain = "conditional of 'do while' was never FALSE";
         break;
      case PT_WHILENOT :
         /* since the source ref is garbage for WHILENO, use the WHILETRUE
            to get source information */
         *newprobenum = mate = prfindmate(TRUE, probenum, PT_WHILE, analinfo);
         if (ctlemph)
            *explain = "conditional of 'while' was never false first time thru";
         else
            *explain = "body of 'while' loop was never skipped";
         break;
      case PT_EMPTYDEFAULT :
         *isctl = TRUE;
         *newprobenum = probenum;
         *explain = "switch never went to 'default' (no executable statements)";
         break;
      default :
#pragma   BBA_IGNORE BBA_ALERT
         sprintf(errorstring, "Unknown probetype 0x%x was never executed", pptr->probetype);
         *explain = errorstring;
         break;
   }
}


/*****************************************************************************/

/* FUNCTION */
int
prfindmate(backwards, probenum, searchtype, analinfo)
boolean backwards;             /* if TRUE, search backwards - else search forwards */
int probenum;                  /* this probe's number */
PROBETYPE searchtype;          /* type to search for */
DR_ANAL *analinfo;             /* so we can know probe 0 */


/*
 *    This routine will search backwards in the probe array for
 *    the next probe whose type is 'searchtype' and whose
 *    scope is the same as the passed probe's scope...
 *
 *    It returns the probenum of the mate of the one passed.
 *
 */
{
   register MR_PROBE **pptr;     /* current probe */
   register MR_PROBE *probe;
   int scope;         /* scope to search for */

```

BEST AVAILABLE COPY

```
   pptr = &analinfo->mapinfo->probes[probenum];
   scope = (*pptr)->source.escope;

   if (backwards)
   {
      for(/* no init */; probenum >= 0; probenum--, pptr--)
      {
         if ((probe = *pptr)->source.escope > scope)
         {
            /* scope is not correct.... */
            continue;
         }

         if (ISPTYPE(probe->probetype, searchtype))
            return(probenum);           /* found it! */
      }
      if (1==1)
      {
#pragma  BBA_ALERT BBA_IGNORE /* should never get here, but.... */
      }
      return(0);
   }

   /* Else, search forwards */
   for(/* no init */; probenum < analinfo->numentries; probenum++, pptr++)
   {
      if ((probe = *pptr)->source.escope > scope)
      {
         /* scope is not correct.... */
         continue;
      }

      if (ISPTYPE(probe->probetype, searchtype))
         return(probenum);           /* found it! */
   }

   if (1 == 1)
   {
#pragma  BBA_ALERT BBA_IGNORE /* should never get here, but.... */
   }
   return(analinfo->numentries - 1);
}
```

Feb 03 15:53 1988  report/docu.c Page 1

```
/*
 * FILE     $Header: docu.c,v 1.3 87/12/11 14:27:14 hmgr Exp $
 *
 * AUTHOR       Bruce Erickson
 *
 * ONELINER Document environment....
```

BEST AVAILABLE COPY

```
 * TABSTOPS 3
 *
 * INSPECTED   date     - inspectors
 *
 * RCS      $Log: docu.c,v $
 * Revision 1.3  87/12/11  14:27:14  14:27:14  hmgr ()
 * Author: bae@hplsdlc.hp.com
 * changes to demand-load mapfiles
 *
 * Revision 1.2  87/11/06  08:48:59  08:48:59  hmgr ()
 * Author: bae@hplsdlc.hp.com
 * added -v and -f options
 *
 * Revision 1.1  87/11/03  15:04:47  15:04:47  hmgr ()
 * Author: bae@hplsdlc.hp.com
 * Initial revision
 *
 *
 */
static char rcsid[] = "$Header: docu.c,v 1.3 87/12/11 14:27:14 hmgr Exp $";
#include <stdio.h>
#include <boolean.h>
#include <model.h>
#include "smithdate.h"
#include "probe.h"
#include "report.h"

/* GLOBALS */

/* STATICS */

/* EXTERNALS */
extern boolean mapcheck();
extern char *malloc();
extern char *realloc();
extern char *getmktrev();
extern char *strrchr();
extern char currentdirectory[];
extern char *pathtofname();
extern boolean docufiles;     /* if TRUE, document bbarep version, and file info */
extern boolean docutotal;     /* if TRUE, document total files, procedures, and branches */
extern boolean docuversion;   /* if TRUE, document bbarep & bbacpp versions */
extern RP_FILE * rfnumtofile();

/* FORWARD */
extern char *listtimes();
extern void totals();
extern char *optascii();
extern void files();


/**************************************************************************/
```

BEST AVAILABLE COPY

```
/* FUNCTION */
document()

/*
 *    Using the variable "docu*", this causes the information requested
 *    to be printed....
 *
 */
{
   if (docuversion)
   {
      printf("bbarep version: %s\n", getmktrev(NULL, 0));

      if (docufiles || docutotal)
         printf("\n");
   }

   if (docufiles)
   {
      files();

      if (docutotal)
         printf("\n");      /* space between output */
   }

   if (docutotal)
   {
      totals();
   }
}


/************************************************************************/

/* FUNCTION */
static void
files()

/*
 *    This routine prints documentation on a per-file basis.
 *
 *    Instead of using the merged information, this uses the
 *    non-merged information (rp_file.anal[*])
 *
 *    NOTE: released mktids are 5 characaters: xx.xx
 */
{
   RP_FILE *fileptr;     /* file information */
   u_int32 fnum;         /* file number */
   DR_ANAL *aptr;
   int optnum;           /* fileptr->anal[optnum] */
   char *thistime;       /* current ascii */
```

BEST AVAILABLE COPY

```
char *options;          /* ascii version of options */
char *basename;         /* basename of file */
boolean firstprint;     /* used to prevent "Include files:" being printed when
                           there aren't any! */
boolean newfile;        /* force file name to be printed if first output... */
char *cppver;           /* bbacp's version */
char prevcppver[100];    /* previous cpp version printed... */
char *multitimes;       /* set to NULL if only one date for an option-set... */

/* The following is used to keep track of the strings printed for each column */

if (docuversion)
   printf("file__________modification date__options__branches__unloads__bbacpp version__full path of file\n");
else
   printf("file__________modification date__options__branches__unloads___full path of file\n");

for (fnum = 0; (fileptr = rfnumtofile(fnum)) != NULL; fnum++)
{
   if (!fileptr->isanalyzed)
   {
      continue;       /* print out header files later */
   }

   /* New file.... */
   time[0] = '\0';       /* force time to always print for first one */
   prevcppver[0] = '\0';   /* force printing of cpp version first time, too */
   newfile = TRUE;
   for (optnum = 0; optnum < fileptr->numanal; optnum++)
   {
      /* New option (or first option) for this file */
      aptr = fileptr->anal[optnum];

      if (!mapcheck(fileptr, aptr))
      {
         /* map file didn't exist for this set of options.  Therefore, it
            wasn't used in 'mergeing' data.  Therefore, do not print it out
         */
         continue;
      }

      if (aptr->modvalid)
      {
         thistime = listtimes(aptr, &multitimes);
      }
      else
      {
         thistime = "<unknown>";
      }

      /* Convert the options used to letters */
      options = optascii(aptr->options);
```

BEST AVAILABLE COPY

```

        basename = strrchr(fileptr->path, '/') + 1;

        /* Print the line out! */
        if (docuversion)
        {
           cppver = aptr->mapinfo->cppver;
           if (cppver == NULL)
              cppver = "<unknown>";

           printf("%-14s %-17s %-7s  %4d        %2d       %-14s  %s\n",
                  (newfile) ? basename : "",
                  (strcmp(thistime, time) == 0) ? "" : thistime,
                  options,
                  countbranches(aptr),
                  aptr->numdumps,
                  (strcmp(cppver, prevcppver) == 0) ? "" : cppver,
                  (newfile) ? fileptr->path : "");

           strcpy(prevcppver, cppver);      /* don't repeat... */
        }
        else
        {
           printf("%-14s %-17s %-7s  %4d        %2d       %s\n",
                  (newfile) ? basename : "",
                  (strcmp(thistime, time) == 0) ? "" : thistime,
                  options,
                  countbranches(aptr),
                  aptr->numdumps,
                  (newfile) ? fileptr->path : "");
        }

        if (multitimes != NULL)
        {
           /* Multiple times for a version.... */
           printf("* = %s\n", multitimes);
        }
        newfile = FALSE;     /* don't print this file's name again! */

        /* Copy the time over so that if there were multiple options with
           the same sourcemod date the date is only printed once */
        strcpy(time, thistime);
     }
  }

  /* Now print out included file's and their times ... */
  firstprint = TRUE;
  for (fnum = 0; (fileptr = rfnumtofile(fnum)) != NULL; fnum++)
  {
     if (fileptr->isanalyzed)
     {
```

BEST AVAILABLE COPY

```
        }

        if (firstprint)
        {
           /* Show that these are included files */
           printf("\nIncluded files:\n");
           firstprint = FALSE;
        }

        basename = strrchr(fileptr->path, '/') + 1;

        /* Only retain one mod time for .h files */
        if (fileptr->modvalid)
        {
           thistime = smithtoascii(&fileptr->filemodtime, DATEFORMAT);
        }
        else
        {
           thistime = "<unknown>";
        }

        printf("%-14s %-17s                      %s\n",
           basename,
           thistime,
           fileptr->path);
     }
  }


/*************************************************************************/

/* FUNCTION */
static char *
optascii(options)
PROBETYPE options;       /* options that are enabled */

/*
 *    This routine will convert the probetype to the options that
 *    must have been used to create them....
 *
 *    Returns a pointer to a static string.
 */
{
   struct optlist
   {
      PROBETYPE bit;        /* flag for a type of probe */
      char option;          /* option to get that flag */
   };

   /* The following is an alphabetical list of options */
   static struct optlist optlist[] =
```

BEST AVAILABLE COPY

```
    {
       { PT_CATRUE, 'a' },
       { PT_DOTRUE, 'd' },
       { PT_EMPTYCASE, 'e' },
       { PT_3FOR, 'f' },
       { PT_IELSE, 'i' },
       { PT_IDEFAULT, 's' },
       { PT_WHILENOT, 'w' },
    };

    static char list[sizeof(optlist) / sizeof(struct optlist) + 1];
    register char *ptr = list;
    register int i;

    for (i = 0; i < sizeof(optlist) / sizeof(struct optlist); i++)
    {
       if (ISPTYPE(options, optlist[i].bit))
          *ptr++ = optlist[i].option;
       else
          *ptr++ = ' ';
    }
    *ptr = '\0';

    return(list);
}


/************************************************************************/

/* FUNCTION */
static void
totals()

/*
 *    Print the total number of files, procedures, and branches.
 *
 */
{
    boolean procvalid = TRUE;  /* if FALSE, some map files don't exist */
    int procs = 0;     /* number of procedures */
    int analfiles = 0;   /* number of analyzed (.c) files */
    int numfiles = 0;    /* total number of files (.c and .h) */
    int branches = 0;    /* total number of branches (including ignored) */
    int32 filenum;       /* scan thru files */
    register DR_ANAL *aptr;
    register MR_FUNC *funcptr;
    register RP_FILE *pfptr;


    for (filenum = 0; (pfptr = rfnumtofile(filenum)) != NULL; filenum++)
    {
       numfiles++;    /* increment total number of files */
```

BEST AVAILABLE COPY

```
        if (!pfptr->isanalyzed)
        {
           /* File is not a .c file */
           continue;        /* go to next file */
        }

        /* File *is* a .c file */
        analfiles++;
        aptr = pfptr->analinfo;
        if (aptr == NULL)
        {
#          pragma BBA_IGNORE    /* jsut for safety! */
           continue;
        }

        if (!mapcheck(pfptr, aptr))
        {
           branches += aptr->numentries;    /* (try to) account for branches */
           procvalid = FALSE;      /* don't have all of the info */
           continue;
        }

        branches += countbranches(aptr);

        funcptr = aptr->mapinfo->funcs;
        while (funcptr != NULL)
        {
           procs++;    /* account for this procedure */
           funcptr = funcptr->next;
        }
     }

     /* Got data - now print it! */
     printf("Number of compiled files: %d\n", analfiles);
     printf("Number of included files: %d\n", numfiles - analfiles);

     if (procvalid)
     {
        printf("Number of functions: %d\n", procs);
        printf("Number of branches (including ignored branches): %d\n", branches);
     }
     else
     {
        if (procs != 0)
        {
           printf("Number of functions: at least %d (*)\n", procs);
           printf("Number of branches (including ignored branches): at most %d (*)\n", branches);
           printf("(*) - cannot find mapping files for some source files\n");
        }
        else
        {
           printf("Number of functions: unknown (*)\n");
```

BEST AVAILABLE COPY

```
            printf("Number of branches (including ignored branches): at most %d (*)\n", branches);
            printf("(*) - cannot find mapping files for any source files\n");
        }
    }

}


/***************************************************************************/

/* FUNCTION */
static int
countbranches(aptr)
register DR_ANAL *aptr;         /* DR_ANAL struct to check */

/*
 *    This routine will count all of the branches in
 *    the DR_ANAL structure, ignoring the PT_IDEFAULT and
 *    PF_HIDDEN branches.
 *
 *    RETURN - number of branches counted....
 *
 */
{
    register MR_PROBE **probeptr;
    register int i;
    register int branches = 0;

    /* Scan thru branches.  Do not count PT_IDEFAULT or PF_HIDDEN branches.
       Can't use total*, because there were probably ignore branches
       and maybe hidden branches...
    */

    for (i = aptr->mapinfo->maxprobe, probeptr = aptr->mapinfo->probes;
          i >= 0; i--, probeptr++)
    {
        if (!ISPTYPE((*probeptr)->probetype, PT_IDEFAULT))
        {
            if (!ISPFLAG((*probeptr)->pflags, PF_HIDDEN))
            {
                branches++;
            }
        }
    }
    return(branches);
}


/***************************************************************************/

/* FUNCTION */
static char *
```

BEST AVAILABLE COPY

```
listtimes(aptr, multitimes)
DR_ANAL *aptr;
char **multitimes;          /* set to NULL if only one time; else
                               a string with all times */


/*
 *    This routine is used to create a string representing the
 *    modtimes associated with the data used in a DR_ANAL struct.
 *
 *    If there is only one, this returns the address of of a string
 *    which has only one date, and multitimes is set to NULL.
 *
 *    If there were more than one, this returns a pointer to the string
 *    "*", and multitest is the string with all of the dates...
 *
 */
{
   static char *string;        /* string with dates */
   static int numbytes = 0;    /* number of byrtes in string */
   char *date;                 /* a formatted date from smithtoascii */
   int length;                 /* total length of string needed */
   OLDTIMES *optr;
   int oldcount;
   int numdates = 1;           /* number of dates found */

   /* Always fetch at least the most recent sourcemodtime */
   date = smithtoascii(&aptr->sourcemodtime, DATEFORMAT);

   if (numbytes == 0)
   {
      /* First time thru */
      string = malloc((numbytes = strlen(date) + 1));
   }
   strcpy(string, date);

   for (oldcount = 0, optr = aptr->oldmodtimes; oldcount < aptr->numoldmodtimes;
         oldcount++, optr++)
   {
      if (optr->dataused)
      {
         numdates++;    /* increment count of dates */
         date = smithtoascii(&optr->modtime, DATEFORMAT);
         length = strlen(string) + 3 + strlen(date);  /* +3 'cause 2 for ", ", 1 for \0 */
         if (length > numbytes)
         {
            string = realloc(string, numbytes = length);
         }
         strcat(string, ", ");
         strcat(string, date);
      }
   }
```

BEST AVAILABLE COPY

```

    if (numdates == 1)
    {
       *multitimes = NULL;      /* flag only 1 date */
       return(string);
    }

    *multitimes = string;
    return("*");
 }
```

Feb 03 15:53 1988  report/mrfree.c Page 1

```
/*
 * FILE      $Header: mrfree.c,v 1.1 87/12/11 10:10:29 hmgr Exp $
 *
 * AUTHOR       Bruce Erickson
 *
 * ONELINER Free mapinfo->*
 *
 * CONDCOMP DEBUG - before freeing memory, set to wierd data
 *
 * TABSTOPS 3
 *
 * EXCEPTIONS  description
 *
 * INSPECTED   date     - inspectors
 *
 * RCS       $Log: mrfree.c,v $
 * Revision 1.1  87/12/11  10:10:29  10:10:29  hmgr ()
 * Author: bae@hplsdlc.hp.com
 * Initial revision
 *
 *
 */
static char rcsid[] = "$Header: mrfree.c,v 1.1 87/12/11 10:10:29 hmgr Exp $";
#include <stdio.h>
#include <boolean.h>
#include <model.h>
#include "ba.h"
#include "targetspec.h"
#include "map.h"
#include "probe.h"
#include "smithdate.h"
#include "report.h"

/* GLOBALS */

/* STATICS */

/* EXTERNALS */

```

BEST AVAILABLE COPY

```
extern void mapfreeprobes();
extern void mapfreefuncs();


/******************************************************************************/

/* FUNCTION */
mapfree(aptr)
DR_ANAL *aptr;        /* analysis entry to free */

/*
 *    THis routine is used to return the mapinfo data
 *    pointed to to the free list.
 *
 *    It leaves the DR_ANAL struct such that the next call to
 *    mapcheck will read in the data again...
 */
{
   register MR_FILE *mapinfo;

   /* Check for non-existance of the data */
   if ((aptr->mappath == NULL) || !aptr->mapexists)
      return;

   mapinfo = aptr->mapinfo;
   if (mapinfo == NULL)
   {
#     pragma BBA_IGNORE BBA_ALERT /* shouldn't happen */
      return;
   }


   mapfreeprobes(mapinfo);     /* free probes array */
   mapfreefuncs(mapinfo);      /* free functions */
   if (mapinfo->cppver != NULL)
      free(mapinfo->cppver);
#  ifdef DEBUG
      mapinfo->protocol = 0xffff;
      mapinfo->masterfile = 0xffff;
      mapinfo->maxprobe = 0xffff;
      mapinfo->probes = (MR_PROBE **) 0xffff;
      mapinfo->funcs = (MR_FUNC *) 0xffff;
      mapinfo->cppver = "oops!";
#  endif
   mchunkfree(mapinfo);

   aptr->mapexists = FALSE;
   if (aptr->mappath != NULL)
   {
      /* Not a merged set of data */
      free(aptr->mappath);
```

BEST AVAILABLE COPY

```
            aptr->mappath = NULL;
        }
    }


    /*************************************************************************/

    /* FUNCTION */
    static void
    mapfreeprobes(mapinfo)
    MR_FILE *mapinfo;

    /*
     *     Free everything associated with a PROBES array
     *
     */
    {
        register MR_PROBE *pptr;
        register MR_SOURCE *sptr;
        int numprobes;

        for (numprobes = 0; numprobes <= mapinfo->maxprobe; numprobes++)
        {
            pptr = mapinfo->probes[numprobes];
            if (pptr->sourcevalid)
            {
                sptr = &pptr->source;
                if (sptr->ctlmac != NULL)
                {
                    free(sptr->ctlmac);
    #               ifdef DEBUG
                        sptr->ctlmac = (char *) 0xffff;
    #               endif
                }
                if (ISPTYPE(pptr->probetype, PT_FUNCTION))
                {
                    free(sptr->fname.fname);
    #               ifdef DEBUG
                        sptr->fname.fname = (char *) 0xffff;
    #               endif
                }
                else
                {
                    free(sptr->ctl.ctlstring);
    #               ifdef DEBUG
                        sptr->ctl.ctlstring = (char *) 0xffff;
    #               endif
                }
            }
            mchunkfree(pptr);
    #       ifdef DEBUG
                pptr = (MR_PROBE *) 0xffff;
```

BEST AVAILABLE COPY

```
      }
      free(mapinfo->probes);
   }


   /*************************************************************************/

   /* FUNCTION */
   static void
   mapfreefuncs(mapinfo)
   MR_FILE *mapinfo;

   /*
    */
   {
      register MR_FUNC *fptr;
      register MR_FUNC *nextptr;

      nextptr = mapinfo->funcs;

      while (nextptr != NULL)
      {
         fptr = nextptr;
         nextptr = fptr->next;
#        ifdef DEBUG
            fptr->next = (MR_FUNC *) 0xffff;
#        endif
         free(fptr);
      }
   }
```

Feb 04 09:03 1988  cpp/define.c Page 1

```
   #include <stdio.h>
   #include "support.h"
   #include "define.h"

   #define NUMCHARS 256

   t_define *define_table[TABLESIZE];

   char id_chars[NUMCHARS];

   extern boolean HostLikeOption;

   /*
    * This routine handles the '#undef' directive.  The line passed in points
    * to the character immediately following the '#undef'.  This routine parses
    * out the name of the macro being undeffed and removes it from the table
    * of defined macros.
    */
```

BEST AVAILABLE COPY

```
handle_undef(line)
register char *line;
{
    register char *id, *name;
    register int id_length;
    register int index;
    register t_define *define_list;

    /* Move 'line' up to the first character of the macro. */
    skip_space(line);
    if(!is_id_start(*line))
        bail("Missing or illegal macro name");
    /* Parse the macro name. */
    id = line;
    while(is_id(*line))
        line++;
    if(is_illegal(id, line-id))
        error("Illegal macro name in #undef");
    remove_define(id, line-id);
    /* Make sure the macro name was the only thing on the line. */
    if(*line != '\n')
        error("Extra characters at end of undef");
}


/*
 * This routine handles a #define directive.  The 'line' points to the character
 * immediately following the 'define'.  The routine distinguishes between macros
 * with parameters and those without.  The resulting macro is recorded in the
 * define_table data structure for later reference.  All whitespace in a macro
 * replacement string is represented by one space to make all whitespace
 * identical for purposes of recognizing a macro redefinition.
 */
handle_define(line)
char *line;
{
    t_param_array param_array;
    t_define *new_define;
    char *ch_ptr;
    char *macro_name;
    char *param_name;
    int num_params = 0;
    boolean has_params;
    char *make_replacement_string();

    /* Find first character of macro name. */
    skip_space(line);
    if(!is_id_start(*line))
        bail("Missing or illegal macro name");
    /* Scan to end of macro name and record name in 'macro_name' */
    ch_ptr = line;
    while(is_id(*line))
```

BEST AVAILABLE COPY

```
        line++;
    macro_name = my_malloc(line-ch_ptr+1);
    strncpy(macro_name, ch_ptr, line-ch_ptr);
    macro_name[line-ch_ptr] = '\0';
    /* See if the macro name is illegal. */
    if(is_illegal(macro_name, line-ch_ptr))
        error("Illegal macro name in #define");
    /* The next char must be whitespace or a '(' for a macro with params. */
    if(*line != ' ' && *line != '\t' && *line != '\n' && *line != '(')
        bail("Illegal macro name in #define");
    /* See if this is a macro with parameters. */
    has_params = (*line == '(');
    if(has_params)
    {
        line++;
        skip_space(line);
        /* Parse the parameter names into 'param_array' */
        while(*line != ')')
        {
            if(!is_id_start(*line))
                bail("Bad macro parameter");
            ch_ptr = line;
            while(is_id(*line))
                line++;
            param_name = my_malloc(line-ch_ptr+1);
            strncpy(param_name, ch_ptr, line-ch_ptr);
            param_name[line-ch_ptr] = '\0';
            if(num_params >= MAXPARAMS)
                bail("Too many macro parameters");
            param_array[num_params++] = param_name;
            skip_space(line);
            if(*line == ',')
            {
                line++;
                skip_space(line);
            }
        }
        line++;
    }
    /* Skip spaces preceding the replacement string. */
    skip_space(line);
    /* Mark the beginning of the replacement string. */
    ch_ptr = line;
    while(*line != '\n')
        line++;
    /* Now using ch_ptr as a temp for the replacement string. */
    ch_ptr = make_replacement_string(ch_ptr, has_params, num_params, param_array);
    add_define(macro_name, ch_ptr, has_params, num_params);
}


/*
```

BEST AVAILABLE COPY

```
 * This routine copies the replacement string from 'original' to 'string' changing
 * parameter names into a two character sequence.  The first character
 * indicates the type of parameter.  The second character has value
 * equal to the parameter's position.  The types of parameters are:
 *   NORMAL_PARAM   - normal
 *   QUOTED_PARAM   - preceded by #
 *   SQUEEZED_PARAM - preceded or followed by ##, but not preceded by #
 * Also, whitespace surrounding '##' is removed.
 */
char *make_replacement_string(original, has_params, num_params, param_array)
register char *original;
int has_params;
int num_params;
t_param_array *param_array;
{
    char buffer[2*BUFFERSIZE];
    register char *string;
    register char *id;
    register int number;
    int param_type;

    string = buffer;
    while(*original != '\n')
    {
        /* Turn consecutive spaces into a single space. */
        if(*original == ' ' || *original == '\t')
        {
            *string++ = ' ';
            skip_space(original);
        }
        /* The host cpp replaces names in string literals, ANSI doesn't. */
        else if(is_quote(*original) && !HostLikeOption)
        {
            skip_quote(original, string);
        }
        /* Check for '#' operator or start of '##' operator. */
        else if(*original == '#' && !HostLikeOption)
        {
            ++original;
            /* Check for '##' operator. */
            if(*original == '#')
            {
                ++original;
                /* Is this the start of the replacement string? */
                if(string == buffer)
                {
                    error("Cannot have '##' at beginning of replacement string");
                    continue;
                }
                /* Remove whitespace preceding the '##' operator. */
                back_over_space(string, buffer);
                /* Remove whitespace following the '##' operator. */
```

BEST AVAILABLE COPY

```
                /* Is this the end of the replacement string? */
                if(*original == '\n')
                {
                    error("Cannot have '##' at end of replacement string");
                    continue;
                }
                /* A parameter preceded or followed by '##' is type SQUEEZED_PARAM. */
                param_type = SQUEEZED_PARAM;
                /* Mark a parameter which was followed by this '##', but wasn't preceded
                 * by a '#' as type SQUEEZED_PARAM. */
                if(string-2 >= buffer && *(string-2) == 1)
                    *(string-2) = param_type;
            }
            else
            {
                /* A parameter preceded by '#' is type QUOTED_PARAM. */
                param_type = QUOTED_PARAM;
            }
            /* Skip to start of id potentially following the '#' or '##' operator. */
            skip_space(original);
            id = original;
            while(is_id(*original))
                original++;
            /* If the id matched a parameter then copy over that
             * parameter's number.  Otherwise, copy over the id. */
            if((number = param_number(id, original-id, num_params, param_array)) != NON_PARAM)
            {
                *string++ = param_type;
                *string++ = number+1;
            }
            else
            {
                if(param_type == QUOTED_PARAM)
                {
                    error("The '#' operator must precede a parameter");
                    continue;
                }
                else
                {
                    strncpy(string, id, original-id);
                    string += original-id;
                }
            }
        }
        else if(has_params && is_id_start(*original))
        {
            id = original;
            while(is_id(*original))
                original++;
            /* If the id matched a parameter then copy over that
             * parameter's number.  Otherwise, copy over the id. */
```

BEST AVAILABLE COPY

```
                if((number = param_number(id, original-id, num_params, param_array)) != NON_PARAM)
                {
                    *string++ = NORMAL_PARAM;
                    *string++ = number+1;
                }
                else
                {
                    strncpy(string, id, original-id);
                    string += original-id;
                }
            }
            else
                *string++ = *original++;
        }
        *string = '\0';
        /* Now dynamically allocate the right amount of space for the replacement
         * string and return that. */
        string = my_malloc(string-buffer+1);
        strcpy(string, buffer);
        return string;
}

/*
 * This routine returns the parameter number of the given id if it is a
 * parameter.  Otherwise, it returns NON_PARAM.
 */
int param_number(id, length, num_params, param_array)
char *id;
int length;
int num_params;
t_param_array param_array;
{
        register int index;

        /* See if the id matches a parameter. */
        for(index = 0; index < num_params; index++)
            if(strncmp(id, param_array[index], length) == 0 && param_array[index][length] == '\0')
                return index;
        return NON_PARAM;
}


add_define(name, string, has_params, num_params)
char *name;
char *string;
boolean has_params;
int num_params;
{
        register int index;
        register t_define *new_define, *define_list;
        register int length, bitval;
        register char *ch_ptr;
```

BEST AVAILABLE COPY

```
    length = strlen(name);
    index = string_hash(name, length)%TABLESIZE;
    /* See if this is a redefinition of a previously defined macro name. */
    define_list = define_table[index];
    while(define_list != NULL)
    {
        if(strcmp(define_list->name, name) == 0)
        {
            /* Redeclaration not an error if it is identical to previous one. */
            if(strcmp(define_list->string, string) != 0
            || define_list->has_params != has_params
            || define_list->num_params != num_params)
            {
                error("Redefinition of macro %s", name);
            }
            return;
        }
        define_list = define_list->next;
    }
    new_define = NEW(t_define);
    new_define->name = name;
    new_define->string = string;
    new_define->has_params = has_params;
    new_define->num_params = num_params;
    new_define->next = define_table[index];
    define_table[index] = new_define;
    /* Mark the id_chars array with the character information from this define. */
    if((length = strlen(name)) > 8)
        length = 8;
    ch_ptr = name;
    bitval = 1;
    while(length > 0)
    {
        id_chars[*ch_ptr] |= bitval;
        ch_ptr++;
        bitval <<= 1;
        length--;
    }
}


remove_define(name, length)
char *name;
int length;
{
    register int index;
    register t_define *define_list;

    /* Find the hash list which would contain this macro. */
    index = string_hash(name, length)%TABLESIZE;
    /* If the list is not empty, then search for the macro and
```

BEST AVAILABLE COPY

```
     * delete it if it is found. */
    if(define_table[index] != NULL)
    {
        /* Check the first macro in the list. */
        if(strncmp(define_table[index]->name, name, length) == 0 && define_table[index]->name[length] == '\0')
        {
            define_table[index] = define_table[index]->next;
            return;
        }
        /* Check all other macros. */
        define_list = define_table[index];
        while(define_list->next != NULL)
        {
            if(strncmp(define_list->next->name, name, length) == 0 && define_list->next->name[length] == '\0')
            {
                define_list->next = define_list->next->next;
                return;
            }
            define_list = define_list->next;
        }
    }
}


/*
 * This routine returns the define macro which matches the given id.  If none
 * match then it returns NULL.
 */
t_define *get_define(id, length)
char *id;
int length;
{
    register t_define *define;

    define = define_table[string_hash(id, length)%TABLESIZE];
    while(define != NULL)
    {
        /* See if the macro matches.  This means that the names match and that if the
         * defined macro has parameters then the invocation needs to have parameters. */
        if(strncmp(id, define->name, length) == 0 && define->name[length] == '\0')
            return define;
        define = define->next;
    }
    return NULL;
}


typedef struct pre_define_node {
    char *name;
    char *string;
    struct pre_define_node *next;
} t_pre_define;
```

BEST AVAILABLE COPY

```
typedef struct pre_undefine_node {
    char *name;
    struct pre_undefine_node *next;
} t_pre_undefine;

t_pre_define *pre_define_list = NULL;
t_pre_undefine *pre_undefine_list = NULL;


handle_pre_define(argument)
char *argument;
{
    char *ch_ptr;
    t_pre_define *pre_define;

    if(is_id_start(*argument))
    {
        pre_define = NEW(t_pre_define);
        ch_ptr = pre_define->name = my_malloc(strlen(argument)+1);
        while(is_id(*argument))
            *ch_ptr++ = *argument++;
        *ch_ptr = '\0';
        if(*argument == '=')
        {
            argument++;
            ch_ptr = pre_define->string = my_malloc(strlen(argument)+1);
            while(*argument != '\0')
                *ch_ptr++ = *argument++;
            *ch_ptr = '\0';
        }
        else
            pre_define->string = "1";
        if(*argument == '\0')
        {
            pre_define->next = pre_define_list;
            pre_define_list = pre_define;
            return;
        }
    }
    error("bad syntax for argument to '-D' option");
}

handle_pre_undefine(argument)
char *argument;
{
    char *ch_ptr;
    t_pre_undefine *pre_undefine;

    if(is_id_start(*argument))
    {
```

BEST AVAILABLE COPY

```
        pre_undefine = NEW(t_pre_undefine);
        ch_ptr = pre_undefine->name = my_malloc(strlen(argument)+1);
        while(is_id(*argument))
            *ch_ptr++ = *argument++;
        *ch_ptr = '\0';
        if(*argument == '\0')
        {
            pre_undefine->next = pre_undefine_list;
            pre_undefine_list = pre_undefine;
            return;
        }
    }
    error("bad syntax for argument to '-U' option");
}

init_defines()
{
    char *string;
    t_pre_define *pre_define;
    t_pre_undefine *pre_undefine;

    /* Then set up the -D defines. */
    pre_define = pre_define_list;
    while(pre_define != NULL)
    {
        add_define(pre_define->name, pre_define->string, FALSE, 0);
        pre_define = pre_define->next;
    }
    /* Then undo the -U macros. */
    pre_undefine = pre_undefine_list;
    while(pre_undefine != NULL)
    {
        remove_define(pre_undefine->name, strlen(pre_undefine->name));
        pre_undefine = pre_undefine->next;
    }
    /* Finally set up the special predefines which cannot be undeffed. */
    string = my_malloc(2);
    *string = CURRENT_LINE;
    *(string+1) = '\0';
    add_define("__LINE__", string, FALSE, 0);
    string = my_malloc(2);
    *string = CURRENT_FILE;
    *(string+1) = '\0';
    add_define("__FILE__", string, FALSE, 0);
    if(!HostLikeOption)
    {
        string = my_malloc(2);
        *string = CURRENT_DATE;
        *(string+1) = '\0';
        add_define("__DATE__", string, FALSE, 0);
        string = my_malloc(2);
        *string = CURRENT_TIME;
```

BEST AVAILABLE COPY

```
        [illegible]
        add_define("__TIME__", string, FALSE, 0);
        add_define("__STDC__", "1", FALSE, 0);
    }
}


/*
 * This routine indicates if a macro name is illegal in a #define or #undef.
 */
boolean is_illegal(macro, length)
char *macro;
int length;
{
    /* See if the macro name is 'defined' which is illegal. */
    if(strncmp(macro, "defined", 7) == 0 && length == 7)
        return TRUE;
    if(length != 8)
        return FALSE;
    if(strncmp(macro, "__LINE__", 8) == 0
    || strncmp(macro, "__FILE__", 8) == 0
    || strncmp(macro, "__DATE__", 8) == 0
    || strncmp(macro, "__TIME__", 8) == 0
    || strncmp(macro, "__STDC__", 8) == 0)
        return TRUE;
    return FALSE;
}


#ifdef DEBUG
print_defines()
{
    int index;
    t_define *define;
    char *p;

    for(index = 0; index < TABLESIZE; index++)
    {
        define = define_table[index];
        if(define != NULL)
        fprintf(stderr, "At table index %d:\n", index);
        while(define != NULL)
        {
            if(define->has_params)
            {
                fprintf(stderr, "%s(%d) = ", define->name, define->num_params);
                p = define->string;
                while(*p != '\0')
                {
                    if(*p == NORMAL_PARAM)
                        fprintf(stderr, "$%d", *++p);
                    else if(*p == QUOTED_PARAM)
```

BEST AVAILABLE COPY

```
                        fprintf(stderr, "#%d", *++p);
                    else if(*p == SQUEEZED_PARAM)
                        fprintf(stderr, "##%d", *++p);
                    else if(*p == CURRENT_LINE)
                        fprintf(stderr, "<line>");
                    else if(*p == CURRENT_FILE)
                        fprintf(stderr, "<file>");
                    else
                        fprintf(stderr, "%c", *p);
                    p++;
                }
                fprintf(stderr, "\n");
            }
            else
                fprintf(stderr, "%s = %s\n", define->name, define->string);
            define = define->next;
        }
    }
}


print_id_chars()
{
    register int i, j, bitval;

    for(i = 0; i < NUMCHARS; i++)
    {
        if(id_chars[i] != 0)
        {
            fprintf(stderr, "%c:", i);
            bitval = 1;
            for(j = 0; j < 8; j++)
            {
                if(id_chars[i] & bitval)
                    fprintf(stderr, " %d", j);
                bitval <<= 1;
            }
            fprintf(stderr, "\n");
        }
    }
}
#endif
```

Feb 04 09:03 1988 cpp/define.h Page 1

```
/* This value is limited to the range of positive values
 * represented by a character. */
#define MAXPARAMS 127
#define MAX_MACRO_NAME 256
#define TABLESIZE 499

#define NON_PARAM -1
```

```
#define NORMAL_PARAM 1
#define QUOTED_PARAM 2
#define SQUEEZED_PARAM 3
#define CURRENT_LINE 4
#define CURRENT_FILE 5
#define CURRENT_DATE 6
#define CURRENT_TIME 7

#define is_special_char(ch) ((ch) >= NORMAL_PARAM && (ch) <= CURRENT_TIME)

typedef struct define_node {
    char *name;
    char *string;
    int  has_params;
    int  num_params;
    struct define_node *next;
} t_define;

typedef struct name_node {
    char *name;
    struct name_node *next;
} t_name_list;

typedef char *t_param_array[MAXPARAMS];
```

Feb 04 09:04 1988  cpp/error.c Page 1

```
#include <stdio.h>
#include "support.h"
#include "file.h"

boolean is_error = FALSE;
extern boolean NoWarningsOption;
extern int current_lineno;

/*
 * This routine returns the basename of the given file.
 */
char *basename(filename)
char *filename;
{
    register char *p;

    p = filename;
    /* Go the the end of the filename. */
    while(*p != '\0')
        p++;
    /* Back up to the first character after a '/'. */
    while(p > filename && *(p-1) != '/')
        p--;
```

BEST AVAILABLE COPY

BEST AVAILABLE COPY

```
    return p;
}


/*
 * This routine prints out the given error message using the given parameters
 * like printf would.  It sets the 'is_error' flag.
 */
error(message, parm1, parm2, parm3)
char *message;
int parm1, parm2, parm3;
{
    is_error = TRUE;
    if(current_file != NULL)
        fprintf(stderr, "%s: %d: ", basename(current_file->filename), current_lineno);
    else
        fprintf(stderr, "cpp: ");
    fprintf(stderr, message, parm1, parm2, parm3);
    fprintf(stderr, ".\n");
}


/*
 * This routine prints out the given warning message using the given parameters
 * like printf would.  It does not set the 'is_error' flag.
 */
warning(message, parm1, parm2, parm3)
char *message;
int parm1, parm2, parm3;
{
    if(NoWarningsOption)
        return;
    if(current_file != NULL)
        fprintf(stderr, "%s: %d: warning- ", basename(current_file->filename), current_lineno);
    else
        fprintf(stderr, "cpp: warning- ");
    fprintf(stderr, message, parm1, parm2, parm3);
    fprintf(stderr, ".\n");
}


/*
 * This routine handles the '#error' directive.  The parameter points to the
 * first character following '#error'.  It generates an error message
 * using the given line as the message.
 */
handle_error(line)
register char *line;
{
    register char *line_ptr;
    register char *new_line;

```

BEST AVAILABLE COPY

```
    skip_space(line);
    line_ptr = new_line = my_malloc(strlen(line));
    /* Copy 'line' into 'new_line' up to the '\n'. */
    while(*line != '\n')
        *line_ptr++ = *line++;
    *line_ptr = '\0';
    /* Generate an error message using the directive line as the message. */
    error(new_line);
}
```

Feb 04 09:04 1988  cpp/file.c Page 1

```
#include <stdio.h>
#include "support.h"
#include "file.h"

extern boolean DebugOption;
extern boolean SuppressSynchronization;
extern int current_lineno;
int num_lines_to_finish_file = 0;

/* The initial value of output_line is changed in init_output_line to be the
 * header stuff that needs to appear as the first output. */
char *output_line = NULL;
int output_lineno;
char *output_filename;
#define MAX_SYNC_LINES 5

/* This keeps track of the number of lines read during each call to get_sub_line. */
int num_newlines_in_output = 0;


/* This is the start of a linked list of files which are the
 * current nested include files starting with the file input
 * currently comes from and ending with the original source. */
t_include_file *current_file = NULL;

typedef struct search_path_node {
    char *pathname;
    struct search_path_node *next;
} t_search_path;

/* This is the list of directory paths to search for include files.
 * The first directory on the list is the directory the source file
 * is in, and the last is the standard include directory.  Directories
 * in between are those added by '-I' command line options. */
t_search_path *search_path_list = NULL;


/*
 * This routine starts the given include file by opening it for input and
```

BEST AVAILABLE COPY

```
 * adding it to the 'current_file' linked list.
 */
boolean start_file(filename)
char *filename;
{
    t_include_file *file;
    FILE *fp;
    char *get_file_date();

    fp = fopen(filename, "r");
    if(fp == NULL)
        return FALSE;
    file = NEW(t_include_file);
    file->fp = fp;
    file->filename = filename;
    if(DebugOption)
        file->filedate = get_file_date(filename);
    else
        file->filedate = NULL;
    file->lineno = 0;
    num_lines_to_finish_file = current_lineno-output_lineno+1;
    current_lineno = file->lineno+1;
    file->parent = current_file;
    current_file = file;
    return TRUE;
}


/*
 * This routine ends the current include file by closing it and
 * removing it from the 'current_file' linked list.
 */
boolean end_file()
{
    if(current_file == NULL || current_file->parent == NULL)
    {
        check_if_ifs_are_ended();
        return FALSE;
    }
    fclose(current_file->fp);
    current_file = current_file->parent;
    num_lines_to_finish_file = current_lineno-output_lineno;
    current_lineno = current_file->lineno+1;
    return TRUE;
}


/*
 * This routine handles a '#include' directive.  The given 'line' points
 * to the first character following the '#include'.  The string pointed
 * to by 'line' is expected to represent an include file.  If the file is
 * in quotes, then it is searched for starting with the directory
```

BEST AVAILABLE COPY

```
 * that the source file is in and continuing with the rest of the directories
 * in 'search_path_list'.  If the file is in angle brackets, then the search
 * starts with the first directory in 'search_path_list' after skipping the
 * directory that the source file is in.  If neither of these forms is matched
 * then the string is macro substituted and the two forms are tried for again.
 */
handle_include(line)
register char *line;
{
    register char *filename;
    register char *pathname;
    register t_search_path *search_path;
    char *parse_filename();
    char *get_sub_line();

    filename = NULL;
    skip_space(line);
    if(*line == '"')
        filename = parse_filename(line+1, '"');
    else if(*line == '<')
        filename = parse_filename(line+1, '>');
    /* If filename is NULL then 'line' didn't match either acceptable form,
     * so macro substitute and try again. */
    if(filename == NULL)
    {
        line = get_sub_line(line, NULL);
        if(*line == '"')
            filename = parse_filename(line+1, '"');
        else if(*line == '<')
            filename = parse_filename(line+1, '>');
    }
    /* Was the include file found? */
    if(filename == NULL)
    {
        error("Bad syntax for #include directive");
        return;
    }
    /* If the filename is absolute then look for it at its absolute location. */
    if(*filename == '/')
    {
        if(start_file(filename))
            return;
    }
    else
    {
        search_path = search_path_list;
        /* The first search path is the local one so only check it if the
         * include file is in quotes. */
        if(*line != '"')
            search_path = search_path->next;
        while(search_path != NULL)
        {
```

BEST AVAILABLE COPY

```
                pathname = my_malloc(strlen(filename)+strlen(search_path->pathname)+1);
                strcpy(pathname, search_path->pathname);
                strcpy(pathname+strlen(search_path->pathname), filename);
                if(start_file(pathname))
                    return;
                search_path = search_path->next;
            }
        }
        error("Unable to find include file '%s'", filename);
}


/*
 * This routine returns a filename parsed out of the given 'line' and
 * terminated by the 'delimiter'.  When the routine is called, 'line'
 * points to the character immediately following the first delimiter.
 * If the filename doesn't parse properly then NULL is returned.
 */
char *parse_filename(line, delimiter)
char *line;
char delimiter;
{
        register char *line_ptr;
        register int length;
        char *filename;

        line_ptr = line;
        while(*line_ptr != delimiter && *line_ptr != '\n')
            line_ptr++;
        length = line_ptr-line;
        /* Was filename terminated by 'delimiter' rather than end of line. */
        if(*line_ptr == delimiter)
        {
            line_ptr++;
            /* Make sure there are no other non-whitespace characters on line
             * after filename. */
            if(*line_ptr == '\n')
            {
                filename = my_malloc(length+1);
                strncpy(filename, line, length);
                filename[length] = '\0';
                return filename;
            }
        }
        return NULL;
}


/*
 * This routine handles the '#line' directive.  The 'line' parameter points
 * to the first character following the '#line'.  The following string must
 * contain a line number and an optional filename.  The preprocessors assumed
```

BEST AVAILABLE COPY

```
 * '#line' directive.
 */
handle_line(line)
register char *line;
{
    register int lineno;
    register char *filename;

    register char *pathname;
    char *parse_filename();
    char *get_sub_line();

    skip_space(line);
    line = get_sub_line(line, NULL);
    if(isdigit(*line))
    {
        lineno = 0;
        while(isdigit(*line))
            lineno = lineno*10+*line++-'0';
        skip_space(line);
        /* If there was only a line number in the directive then return. */
        if(*line == '\n')
        {
            current_file->lineno = lineno-1;
            current_lineno = current_file->lineno+1;
            return;
        }
        /* Otherwise, look for a following filename. */
        if(*line == '"')
        {
            filename = parse_filename(line+1, '"');
            if(filename != NULL)
            {
                current_file->filename = filename;
                num_lines_to_finish_file = current_lineno-output_lineno;
                current_file->lineno = lineno-1;
                current_lineno = current_file->lineno+1;
                return;
            }
        }
    }
    error("Bad syntax for #line directive");
}


/*
 * This routine initializes the value of output_line to be the
 * header information that needs to appear as the first output.  This header
 * information is not generated if SuppressSynchronization is set.
 */
init_output_line()
```

BEST AVAILABLE COPY

```
{
    register char *line_ptr, *date;
    char *get_current_date();

    output_lineno = 1;
    output_filename = current_file->filename;
    if(SuppressSynchronization)
        return;
    line_ptr = output_line = temp_alloc(BUFFERSIZE);
    if(DebugOption)
    {
        strcpy(line_ptr, "#pragma CURRENT_DATE ");
        line_ptr += 21;
        date = get_current_date();
        *line_ptr++ = ' ';
        strcpy(line_ptr, date);
        line_ptr += strlen(date);
        *line_ptr++ = '\n';
    }
    strcpy(line_ptr, "# 1 \"");
    line_ptr += 5;
    strcpy(line_ptr, current_file->filename);
    line_ptr += strlen(current_file->filename);
    *line_ptr++ = '"';
    if(current_file->filedate != NULL)
    {
        strcpy(line_ptr, current_file->filedate);
        line_ptr += strlen(current_file->filedate);
    }
    *line_ptr++ = '\n';
}


/*
 * This is routine returns one line of preprocessed input (which may contain newlines).
 * It is responsible for returning '#' synchronization lines to keep the line count
 * right.
 */
char *get_output_line()
{
    register char *synchronization_line;
    register char *sync_ptr;
    register char *line_ptr;
    register int num_lines;
    char *get_sub_line();

    /* If there is a line left over due to a line synchronization directive
     * being output last time, then output that line. */
    if(output_line != NULL)
    {
        line_ptr = output_line;
        output_line = NULL;
        /* Since the returned line may have had multiple newlines, then increment
```

BEST AVAILABLE COPY

```
        output_lineno += num_newlines_in_output;
        return line_ptr;
    }
    /* Get a new non-blank or file transition line from get_sub_line. */
    do
    {
        /* Deallocate all line memory since there are no current lines. */
        temp_dealloc();
        num_newlines_in_output = 0;
        /* Since the first line of a potentially multi-line 'get_line' input is
         * about to be read, set 'current_lineno' to the first line number. */
        current_lineno = current_file->lineno+1;
        output_line = get_sub_line(NULL, NULL);
    } while(output_line != NULL && *output_line == '\n' && output_filename == current_file->filename);
    /* If the line is NULL, then the end of the current file was hit. */
    if(output_line == NULL)
    {
        /* If the original source file was ended then return NULL. */
        if(!end_file())
            return NULL;
    }
    /* If the output line number or filename are different than they should be
     * then generate a line synchronization directive. (The double check for the
     * filename is to make the normal case of the files being the same short
     * circuit after a cheap test.) */
    if(output_lineno != current_lineno ||
       (output_filename != current_file->filename
        && strcmp(output_filename, current_file->filename) != 0))
    {
        /* See if synchronization can be accomplished by outputting blank lines. */
        num_lines = current_lineno-output_lineno;
        if(output_filename == current_file->filename
        && (SuppressSynchronization || num_lines <= MAX_SYNC_LINES) && num_lines > 0)
        {
            synchronization_line = temp_alloc(num_lines+1);
            sync_ptr = synchronization_line;
            while(num_lines-- > 0)
                *sync_ptr++ = '\n';
            *sync_ptr = '\0';
            output_lineno = current_lineno;
            return synchronization_line;
        }
        else if(!SuppressSynchronization)
        {
            if(num_lines_to_finish_file > 0)
            {
                synchronization_line = temp_alloc(13+strlen(current_file->filename)+20+18);
                sync_ptr = synchronization_line;
                if(num_lines_to_finish_file <= MAX_SYNC_LINES)
                {
                    while(num_lines_to_finish_file-- > 0)
```

BEST AVAILABLE COPY

```
                    *sync_ptr++ = '\n';
                }
                else
                {
                    *sync_ptr++ = '#';
                    *sync_ptr++ = ' ';
                    number_to_string(output_lineno+num_lines_to_finish_file-1; sync_ptr);
                    *sync_ptr++ = '\n';
                    *sync_ptr++ = '\n';
                }
            }
            else
            {
                synchronization_line = temp_alloc(strlen(current_file->filename)+20+18);
                sync_ptr = synchronization_line;
            }
            *sync_ptr++ = '#';
            *sync_ptr++ = ' ';
            number_to_string(current_lineno, sync_ptr);
            if(output_filename != current_file->filename)
            {
                *sync_ptr++ = ' ';
                *sync_ptr++ = '"';
                strcpy(sync_ptr, current_file->filename);
                sync_ptr += strlen(current_file->filename);
                *sync_ptr++ = '"';
                if(current_file->filedate != NULL)
                {
                    strcpy(sync_ptr, current_file->filedate);
                    sync_ptr += strlen(current_file->filedate);
                }
                output_filename = current_file->filename;
            }
            *sync_ptr++ = '\n';
            *sync_ptr = '\0';
            output_lineno = current_lineno;
            return synchronization_line;
        }
        else
        {
            output_filename = current_file->filename;
            output_lineno = current_lineno;
        }
    }
    /* The 'output_line' can be NULL if an include file has just terminated. */
    if(output_line == NULL)
    {
        return get_output_line();
    }
    line_ptr = output_line;
    output_line = NULL;
    /* Since the returned line may have had multiple newlines, then increment
```

BEST AVAILABLE COPY

```
        output_lineno += num_newlines_in_output;
        return line_ptr;
    }


    /*
     * This routine adds the given search path to the 'search_path_list'.
     * It is called to set up the standard include directory, directories given
     * via a '-I' command line option, and the directory containing the
     * source file.
     */
    add_search_path(path)
    char *path;
    {
        t_search_path *search_path;
        register char *ch_ptr;

        search_path = NEW(t_search_path);
        ch_ptr = search_path->pathname = my_malloc(strlen(path)+2);
        while(*path != '\0')
            *ch_ptr++ = *path++;
        /* If the path was non-null and did not end with '/' then add a '/'. */
        if(ch_ptr > search_path->pathname && *(ch_ptr-1) != '/')
            *ch_ptr++ = '/';
        *ch_ptr++ = '\0';
        search_path->next = search_path_list;
        search_path_list = search_path;
    }
```

Feb 04 09:04 1988 cpp/file.h Page 1

```
    #include "support.h"

    typedef struct include_file_node {
        FILE *fp;
        char *filename;
        char *filedate;
        int lineno;
        struct include_file_node *parent;
    } t_include_file;

    extern t_include_file *current_file;

    extern boolean start_file();
    extern boolean end_file();
```

Feb 04 09:04 1988 cpp/if.c Page 1

```
    #include <stdio.h>
    #include "support.h"
```

BEST AVAILABLE COPY

```
#define MAX_IF_DEPTH 100

boolean has_been_true[MAX_IF_DEPTH+1] = {1};
boolean is_true[MAX_IF_DEPTH+1] = {1};
int depth = 0;
char *if_line;
long if_value;

extern boolean HostLikeOption;

/*
 * This routine handles an '#ifdef' directive.
 */
handle_ifdef(line)
char *line;
{
    register char *id;
    register int length;

    skip_space(line);
    if(is_id_start(*line))
    {
        id = line;
        while(is_id(*line))
            line++;
        length = line-id;
        if(*line == '\n')
        {
            start_if(get_define(id, length) != NULL);
            return;
        }
    }
    error("Bad syntax for #ifdef");
    start_if(FALSE);
}


/*
 * This routine handles an '#ifndef' directive.
 */
handle_ifndef(line)
char *line;
{
    register char *id;
    register int length;

    skip_space(line);
    if(is_id_start(*line))
    {
        id = line;
        while(is_id(*line))
```

BEST AVAILABLE COPY

```
        length = line-id;
        if(*line == '\n')
        {
            start_if(get_define(id, length) == NULL);
            return;
        }
    }
    error("Bad syntax for #ifndef");
    start_if(FALSE);
}


handle_if(line)
char *line;
{
    char *get_sub_line();

    evaluate_defined_keyword(line);
    if_line = get_sub_line(line, NULL);
    zzparse();
    start_if(if_value != 0);
}


handle_elif(line)
char *line;
{
    char *get_sub_line();

    if(depth <= 0)
    {
        error("#elif without matching #if");
        return;
    }
    /* If a true if condition has already occurred then this else is false. */
    if(has_been_true[depth])
    {
        is_true[depth] = FALSE;
        return;
    }
    evaluate_defined_keyword(line);
    if_line = get_sub_line(line, NULL);
    zzparse();
    is_true[depth] = if_value != 0;
    has_been_true[depth] = if_value != 0;
}


/*
 * This routine handles an '#else' directive.
 */
```

BEST AVAILABLE COPY

```
handle_else(line)
char *line;
{
    if(!HostLikeOption && *line != '\n')
        warning("extra characters on #else");
    if(depth <= 0)
    {
        error("#else without matching #if");
        return;
    }
    is_true[depth] = !has_been_true[depth];
    has_been_true[depth] = TRUE;
}


/*
 * This routine handles an '#endif' directive.
 */
handle_endif(line)
char *line;
{
    if(!HostLikeOption && *line != '\n')
        warning("extra characters on #endif");
    if(depth <= 0)
    {
        error("#endif without matching #if");
        return;
    }
    depth--;
}


start_if(condition_is_true)
boolean condition_is_true;
{
    depth++;
    if(depth > MAX_IF_DEPTH)
    {
        error("Conditional compilation nested too deeply");
        return;
    }
    if(!is_true[depth-1])
    {
        has_been_true[depth] = TRUE;
        is_true[depth] = FALSE;
    }
    else
    {
        has_been_true[depth] = condition_is_true;
        is_true[depth] = condition_is_true;
    }
}
```

BEST AVAILABLE COPY

```
/*
 * This routine searches for the keyword 'defined' followed by an
 * identifier.  If the following identifier is a defined macro name
 * then the identifiers are replaced by '1'.  Otherwise, the identifiers
 * are replaced by '0'.  The following identifier may optionally be
 * enclosed in parentheses.
 */
evaluate_defined_keyword(line)
register char *line;
{
    register char *target;
    register char *id;
    boolean is_paren;

    target = line;
    while(*line != '\0')
    {
        if(*line == 'd')
        {
            id = line;
            while(is_id(*line))
                line++;
            if(strncmp(id, "defined", line-id) == 0 && line-id == 7)
            {
                skip_space(line);
                if(*line == '(')
                {
                    line++;
                    is_paren = TRUE;
                    skip_space(line);
                }
                else
                    is_paren = FALSE;
                if(!is_id_start(*line))
                {
                    error("bad macro name after 'defined'");
                    return;
                }
                id = line;
                while(is_id(*line))
                    line++;
                if(get_define(id, line-id) == NULL)
                    *target++ = '0';
                else
                    *target++ = '1';
                if(is_paren)
                {
                    skip_space(line);
                    if(*line != ')')
                        error("missing right paren after 'defined(macro'");
```

BEST AVAILABLE COPY

```
                        else
                            line++;
                    }
                }
                else
                {
                    strncpy(target, id, line-id);
                    target += line-id;
                }
            }
            else
                *target++ = *line++;
        }
        *target = '\0';
    }


    /*
     * This routine checks if all conditional compilation nestings
     * have been terminated.
     */
    check_if_ifs_are_ended()
    {
        if(depth != 0)
            error("Missing #endif at end of file");
    }
```

Feb 04 09:04 1988 cpp/if.h Page 1

```
extern handle_ifdef();
extern handle_ifndef();
extern handle_else();
extern handle_endif();

extern int depth;
extern boolean is_true[];

#define produce_output is_true[depth]
```

Feb 04 09:04 1988 cpp/ifgram.y Page 1

```
%{
#include "support.h"
extern long if_value;
%}

/* Tokens with lexical values. */
%token IDENTIFIER
%token CONSTANT

```

BEST AVAILABLE COPY

```
%token DEFINED LPAREN RPAREN

/* Relational operators. */
%token LESS_THAN GREATER_THAN LESS_THAN_OR_EQUAL GREATER_THAN_OR_EQUAL
%token DOUBLE_EQUALS NOT_EQUALS

/* Functional operators. */
%token PLUS MINUS TILDE BANG SLASH PERCENT LSHIFT RSHIFT
%token CARAT BAR AND OR QUESTION COLON AMPERSAND STAR

%start constant_expression
%%

constant_expression
    : conditional_expression
    {
        if_value = $1.value;
    }
    ;

conditional_expression
    : logical_or_expression
    | logical_or_expression QUESTION conditional_expression COLON
    conditional_expression
    {
        $$.is_unsigned = $3.is_unsigned || $5.is_unsigned;
        $$.value = $1.value ? $3.value : $5.value;
    }
    ;

logical_or_expression
    : logical_and_expression
    | logical_or_expression OR logical_and_expression
    {
        $$.is_unsigned = FALSE;
        $$.value = $1.value || $3.value;
    }
    ;

logical_and_expression
    : inclusive_or_expression
    | logical_and_expression AND inclusive_or_expression
    {
        $$.is_unsigned = FALSE;
        $$.value = $1.value && $3.value;
    }
    ;

inclusive_or_expression
    : exclusive_or_expression
    | inclusive_or_expression BAR exclusive_or_expression
```

BEST AVAILABLE COPY

Feb 04 09:04 1988 cpp/ifgram.y Page 2

```
        {
            $$.is_unsigned = $1.is_unsigned || $3.is_unsigned;
            $$.value = $1.value | $3.value;
        }
        ;

exclusive_or_expression
        : and_expression
        | exclusive_or_expression CARAT and_expression
        {
            $$.is_unsigned = $1.is_unsigned || $3.is_unsigned;
            $$.value = $1.value ^ $3.value;
        }
        ;

and_expression
        : equality_expression
        | and_expression AMPERSAND equality_expression
        {
            $$.is_unsigned = $1.is_unsigned || $3.is_unsigned;
            $$.value = $1.value & $3.value;
        }
        ;

equality_expression
        : relational_expression
        | equality_expression DOUBLE_EQUALS relational_expression
        {
            $$.is_unsigned = FALSE;
            $$.value = $1.value == $3.value;
        }
        | equality_expression NOT_EQUALS relational_expression
        {
            $$.is_unsigned = FALSE;
            $$.value = $1.value != $3.value;
        }
        ;

relational_expression
        : shift_expression
        | relational_expression LESS_THAN shift_expression
        {
            $$.is_unsigned = FALSE;
            if($1.is_unsigned || $3.is_unsigned)
                $$.value = (unsigned long)$1.value < (unsigned long)$3.value;
            else
                $$.value = $1.value < $3.value;
```

```
        }
        | relational_expression GREATER_THAN shift_expression
        {
            $$.is_unsigned = FALSE;
            if($1.is_unsigned || $3.is_unsigned)
                $$.value = (unsigned long)$1.value > (unsigned long)$3.value;
            else
                $$.value = $1.value > $3.value;
        }
        | relational_expression LESS_THAN_OR_EQUAL shift_expression
        {
            $$.is_unsigned = FALSE;
            if($1.is_unsigned || $3.is_unsigned)
```

Feb 04 09:04 1988 cpp/ifgram.y Page 3

```
                $$.value = (unsigned long)$1.value <= (unsigned long)$3.value;
            else
                $$.value = $1.value <= $3.value;
        }
        | relational_expression GREATER_THAN_OR_EQUAL shift_expression
        {
            $$.is_unsigned = FALSE;
            if($1.is_unsigned || $3.is_unsigned)
                $$.value = (unsigned long)$1.value >= (unsigned long)$3.value;
            else
                $$.value = $1.value >= $3.value;
        }
        ;

shift_expression
        : additive_expression
        | shift_expression LSHIFT additive_expression
        {
            $$.is_unsigned = $1.is_unsigned;
            $$.value = $1.value << $3.value;
        }
        | shift_expression RSHIFT additive_expression
        {
            if($$.is_unsigned = $1.is_unsigned)
                $$.value = (unsigned long)$1.value >> $3.value;
            else
                $$.value = $1.value >> $3.value;
        }
        ;

additive_expression
        : multiplicative_expression
        | additive_expression PLUS multiplicative_expression
        {
```

BEST AVAILABLE COPY

BEST AVAILABLE COPY

```
            $$.is_unsigned = $1.is_unsigned || $3.is_unsigned;
            $$.value = $1.value + $3.value;
        }
        | additive_expression MINUS multiplicative_expression
        {
            $$.is_unsigned = $1.is_unsigned || $3.is_unsigned;
            $$.value = $1.value - $3.value;
        }
        ;

multiplicative_expression
        : unary_expression
        | multiplicative_expression STAR unary_expression
        {
            if($$.is_unsigned = $1.is_unsigned || $3.is_unsigned)
                $$.value = (unsigned long)$1.value * (unsigned long)$3.value;
            else
                $$.value = $1.value * $3.value;
        }
        | multiplicative_expression SLASH unary_expression
        {
            if($$.is_unsigned = $1.is_unsigned || $3.is_unsigned)
                $$.value = (unsigned long)$1.value / (unsigned long)$3.value;
            else
                $$.value = $1.value / $3.value;
        }
```

Feb 04 09:04 1988 cpp/ifgram.y Page 4

```
        | multiplicative_expression PERCENT unary_expression
        {
            if($$.is_unsigned = $1.is_unsigned || $3.is_unsigned)
                $$.value = (unsigned long)$1.value % (unsigned long)$3.value;
            else
                $$.value = $1.value % $3.value;
        }
        ;

unary_expression
        : postfix_expression
        | PLUS unary_expression
        {
            $$ = $2;
        }
        | MINUS unary_expression
        {
            $$.is_unsigned = $2.is_unsigned;
            $$.value = -$2.value;
        }
        | TILDE unary_expression
        {
```

BEST AVAILABLE COPY

```
            $$.is_unsigned = $2.is_unsigned;
            $$.value = ~$2.value;
        }
        | BANG unary_expression
        {
            $$.is_unsigned = $2.is_unsigned;
            $$.value = !$2.value;
        }
        ;

postfix_expression
        : CONSTANT
        {
            $$ = $1;
        }
        | LPAREN conditional_expression RPAREN
        {
            $$ = $2;
        }
        ;
```

Feb 04 09:04 1988 cpp/iflex.c Page 1

```
#include <stdio.h>
#include <ctype.h>
#include "y.tab.h"
#include "support.h"

extern char *if_line;

extern YYSTYPE zzlval;

zzerror()
{
    error("Bad syntax for #if condition");
}


#define C_DOUBLE_QUOTE      0042
#define C_SINGLE_QUOTE      0047
#define C_BACKSLASH         0134
#define C_BELL              0007
#define C_BACKSPACE         0010
#define C_FORM_FEED         0014
#define C_NEWLINE           0012
#define C_CARRIAGE_RETURN   0015
#define C_HORIZONTAL_TAB    0011
#define C_VERTICAL_TAB      0013


static int hex_value(ch)
```

BEST AVAILABLE COPY

```
char ch;
{
    if(isdigit(ch))
        return ch-'0';
    else if(ch >= 'a' && ch <= 'f')
        return ch-'a'+10;
    else
        return ch-'A'+10;
}

/*
 * This routine reads a character literal from if_line and
 * returns its value.
 */
static long readchar()
{
    register int val;

    if(*if_line == '\'')
    {
        error("empty character literal in #if line");
        val = 0;
    }
    else if(*if_line != '\\')
        val = *if_line++;
    else
    {
        if_line++;
        switch(*if_line)
        {
            case '0':
            case '1':
```

Feb 04 09:04 1988 cpp/iflex.c Page 2

```
            case '2':
            case '3':
            case '4':
            case '5':
            case '6':
            case '7':
                /* Octal character constant. */
                val = *if_line++-'0';
                if(*if_line >= '0' && *if_line <= '7')
                {
                    val = val*8+*if_line++-'0';
                    if(*if_line >= '0' && *if_line <= '7')
                        val = val*8+*if_line++-'0';
                }
                if (val > 255)
                {
```

BEST AVAILABLE COPY

```
                error("Octal character value too large");
                val = 0;
            }
            /* Since character constants are signed ints we need to extend
             * a negative character constant to full int size. */
            if (val > 127)
                val -= 256;
            break;
        case 'x':   /* Hexadecimal constant. */
        case 'X':
            if_line++;
            if(isxdigit(*if_line))
            {
                val = hex_value(*if_line++);
                if(isxdigit(*if_line))
                {
                    val = val*16+hex_value(*if_line++);
                    if(isxdigit(*if_line))
                        val = val*16+hex_value(*if_line++);
                }
            }
            else
            {
                error("No digits in hex constant");
                val = 0;
            }
            if (val > 255)
            {
                error("Octal character value too large");
                val = 0;
            }
            /* Since character constants are signed ints we need to extend
             * a negative character constant to full int size. */
            if (val > 127)
                val -= 256;
            break;
        case '\"':
            if_line++;
            val = C_DOUBLE_QUOTE;
            break;
        case '\'':
            if_line++;
            val = C_SINGLE_QUOTE;
            break;
```

Feb 04 09:04 1988 cpp/iflex.c Page 3

```
        case '\\':
            if_line++;
            val = C_BACKSLASH;
            break;
```

```
            case 'a':
                if_line++;
                val = C_BELL;
                break;
            case 'b':
                if_line++;
                val = C_BACKSPACE;
                break;
            case 'f':
                if_line++;
                val = C_FORM_FEED;
                break;
            case 'n':
                if_line++;
                val = C_NEWLINE;
                break;
            case 'r':
                if_line++;
                val = C_CARRIAGE_RETURN;
                break;
            case 't':
                if_line++;
                val = C_HORIZONTAL_TAB;
                break;
            case 'v':
                if_line++;
                val = C_VERTICAL_TAB;
                break;
            default:
                val = *if_line++;
                break;
        }
    }
    /* Scan the rest of the character literal. */
    while(*if_line != '\'' && *if_line != '\n')
    {
        if(*if_line == '\\')
            if_line++;
        if_line++;
    }
    if(*if_line == '\n')
        error("missing right quote on character literal");
    else
        if_line++;
    return val;
}


/*
 * This routine skips the optional 'l' or 'L' and  'u' or 'U' which may
 * be appended to constants.  If there is a 'u' or 'U' it returns TRUE,
 * otherwise FALSE.
```

BEST AVAILABLE COPY

BEST AVAILABLE COPY

```
 */
static boolean skip_suffix()
{
    if(*if_line == 'l' || *if_line == 'L')
```

Feb 04 09:04 1988  cpp/iflex.c Page 4

```
    {
        if_line++;
        if(*if_line == 'u' || *if_line == 'U')
        {
            if_line++;
            return TRUE;
        }
    }
    else if(*if_line == 'u' || *if_line == 'U')
    {
        if_line++;
        if(*if_line == 'l' || *if_line == 'L')
            if_line++;
        return TRUE;
    }
    return FALSE;
}


zzlex()
{
    for(;;)
    {
        switch(*if_line++)
        {
            case '\n':
            case '\0':
                return -1;
                break;
            case '(':
                return(LPAREN);
            case ')':
                return(RPAREN);
            case '<':
                if(*if_line == '<')
                {
                    if_line++;
                    return LSHIFT;
                }
                else if(*if_line == '=')
                {
                    if_line++;
                    return LESS_THAN_OR_EQUAL;
```

BEST AVAILABLE COPY

```
                }
                else
                    return LESS_THAN;
            case '>':
                if(*if_line == '>')
                {
                    if_line++;
                    return RSHIFT;
                }
                else if(*if_line == '=')
                {
                    if_line++;
                    return(GREATER_THAN_OR_EQUAL);
                }
                else
                    return(GREATER_THAN);
            case '=':
```

Feb 04 09:04 1988  cpp/iflex.c Page 5

```
                if(*if_line == '=')
                {
                    if_line++;
                    return DOUBLE_EQUALS;
                }
                else
                {
                    error("Illegal character '=' in #if directive");
                    break;
                }
            case '!':
                if(*if_line == '=')
                {
                    if_line++;
                    return NOT_EQUALS;
                }
                else
                    return BANG;
            case '+':
                return(PLUS);
            case '-':
                return(MINUS);
            case '*':
                return(STAR);
            case '&':
                if(*if_line == '&')
                {
                    if_line++;
                    return AND;
                }
```

BEST AVAILABLE COPY

```
                else
                    return(AMPERSAND);
            case '~':
                return(TILDE);
            case '/':
                return(SLASH);
            case '%':
                return PERCENT;
            case '^':
                return CARAT;
            case '|':
                if(*if_line == '|')
                {
                    if_line++;
                    return(OR);
                }
                else
                    return(BAR);
            case '?':
                return(QUESTION);
            case ':':
                return(COLON);
            case ' ':
            case '\t':
                break;
            case '\'':
                zzlval.value = readchar();
                zzlval.is_unsigned = FALSE;
                return(CONSTANT);
            case '0':
```

Feb 04 09:04 1988  cpp/iflex.c Page 6

```
                if(*if_line == 'x' || *if_line == 'X')
                {
                    if_line++;
                    zzlval.value = 0;
                    if(!isxdigit(*if_line))
                        error("No digits in hex constant");
                    while(isxdigit(*if_line))
                        zzlval.value = zzlval.value*16+hex_value(*if_line++);
                }
                else
                {
                    zzlval.value = 0;
                    while(*if_line >= '0' && *if_line <= '7')
                        zzlval.value = zzlval.value*8+*if_line++-'0';
                }
                zzlval.is_unsigned = skip_suffix() || (zzlval.value < 0);
                return CONSTANT;
```

BEST AVAILABLE COPY

```
                default:
                    if(is_id_start(*(if_line-1)))
                    {
                        while(is_id(*if_line))
                            if_line++;
                        zzlval.value = 0;
                        zzlval.is_unsigned = FALSE;
                        return CONSTANT;
                    }
                    if(isdigit(*(if_line-1)))
                    {
                        if_line--;
                        zzlval.value = 0;
                        while(isdigit(*if_line))
                            zzlval.value = zzlval.value*10+*if_line++-'0';
                        zzlval.is_unsigned = skip_suffix() || !(zzlval.value < 0);
                        return CONSTANT;
                    }
                    error("illegal character on '#if' line");
            }
        }
    }
```

Feb 04 09:04 1988  cpp/main.c Page 1

```
    #include <stdio.h>
    #include "support.h"

    extern boolean is_error;
    extern FILE *outfile;

    main(argc, argv)
    int argc;
    char *argv[];
    {
        static char *line = NULL;
        char *get_output_line();
        char *fhpname();

        /* First set up the predefines. */
    #ifdef FSD
        /* This is just a start as to what predefines FSD wants. */
        add_search_path("/usr/include");
        add_define("PWB", "1", FALSE, 0);
        add_define("hpux", "1", FALSE, 0);
        add_define("unix", "1", FALSE, 0);
        add_define("hp9000s300", "1", FALSE, 0);
        add_define("hp9000s200", "1", FALSE, 0);
    #endif
    #ifdef M68020
        add_search_path(fhpname("include/68020", NULL));
        add_define("hp64000", "1", FALSE, 0);
```

BEST AVAILABLE COPY

```
#endif
#ifdef M68000
    add_search_path(fhpname("include/68000", NULL));
    add_define("hp64000", "1", FALSE, 0);
    add_define("m68000", "1", FALSE, 0);
#endif
#ifdef I8086
    add_search_path(fhpname("include/8086", NULL));
    add_define("hp64000", "1", FALSE, 0);
    add_define("i8086", "1", FALSE, 0);
#endif
#ifdef I80386
    add_search_path(fhpname("include/80386", NULL));
    add_define("hp64000", "1", FALSE, 0);
    add_define("i80386", "1", FALSE, 0);
#endif
    startup(argc, argv);
    while((line = get_output_line()) != NULL)
        fputs(line, outfile);
    if(is_error)
        exit(1);
    else
        exit(0);
}
```

Feb 04 09:04 1988 cpp/readline.c Page 1

```
#include <stdio.h>
#include <nl_ctype.h>
#include "support.h"
#include "file.h"
#include "if.h"

extern boolean PassComments;
extern boolean NLSOption;
/* This variable is used by code which wants to know the current line number.
 * it's value is the first line of a potentially multi-line input line as
 * opposed to current_file->lineno whose value is the last line. */
int current_lineno;


/*
 * This routine reads a newline terminated line of up to BUFFERSIZE-2 characters
 * from the current input file into 'line'.  It returns a boolean indicating
 * if the read succeded.
 */
boolean input_line(line)
char *line;
{
    int ch;

```

BEST AVAILABLE COPY

```
        /* Set the last read character to a newline for later checking. */
        line[BUFFERSIZE-2] = '\n';
        if(fgets(line, BUFFERSIZE, current_file->fp) == NULL)
        {
            return FALSE;
        }
        /* If last read character is not a newline then it was overwritten by an input
         * line that was too long. */
        if(line[BUFFERSIZE-2] != '\n' && line[BUFFERSIZE-2] != '\0')
        {
            error("Input line too long.");
            /* Eat up the rest of the line. */
            while((ch = getc(current_file->fp)) != '\n' && ch != EOF)
                ;
            line[BUFFERSIZE-2] = '\n';
        }
        current_file->lineno++;
    }


    /* This array is used in 'get_line' to quickly determine if a character is
     * potentially one requiring special processing.  The characters marked with
     * a '1' in the array are those checked for in the if-else construct of 'get_line'. */
    static char is_special_to_get_line[256] = {
    1,1,1,0,0,0,0,0,0,0,0,0,0,0,0,0,
    0,0,0,0,0,0,0,0,0,0,0,0,0,0,0,0,
    0,0,1,0,0,0,0,1,0,0,0,0,0,0,0,1,
    0,0,0,0,0,0,0,0,0,0,0,0,0,0,0,1,
    0,0,0,0,0,0,0,0,0,0,0,0,0,0,0,0,
    0,0,0,0,0,0,0,0,0,0,0,0,1,0,0,0,
    0,0,0,0,0,0,0,0,0,0,0,0,0,0,0,0,
    0,0,0,0,0,0,0,0,0,0,0,0,0,0,0,0,
    1,1,1,1,1,1,1,1,1,1,1,1,1,1,1,1,
    1,1,1,1,1,1,1,1,1,1,1,1,1,1,1,1,
    1,1,1,1,1,1,1,1,1,1,1,1,1,1,1,1,
    1,1,1,1,1,1,1,1,1,1,1,1,1,1,1,1,
    1,1,1,1,1,1,1,1,1,1,1,1,1,1,1,1,
    1,1,1,1,1,1,1,1,1,1,1,1,1,1,1,1,
    1,1,1,1,1,1,1,1,1,1,1,1,1,1,1,1,
    1,1,1,1,1,1,1,1,1,1,1,1,1,1,1,1,
    };

    /*
     * This routine reads lines from the input.  The input line length is limited to BUFFERSIZE.
     * It translates trigraphs and connects lines with continuation characters.
     * Comments are turned into single spaces.  It limits the length of the string it returns
     * to BUFFERSIZE.
     * The 'directive_pos' pointer is used to point to the start of a directive if the line
     * is a directive.
     */
    char *get_line()
    {
```

BEST AVAILABLE COPY

```
    static char return_line[2*BUFFERSIZE];
    static char line[BUFFERSIZE];
    static boolean unterminatedComment = FALSE;
    register char *ret_ptr, *line_ptr;
    register char ch;
    register boolean inLiteral = FALSE;
    register char delimiter;
    register char *directive_pos;
    register boolean passComments;
    char *handle_directive();

    ret_ptr = return_line;
    line_ptr = line;
    /* There may be an unterminated comment at this point with input
     * residing in 'line'. */
    if(unterminatedComment)
        unterminatedComment = FALSE;
    else if(!input_line(line))
        return NULL;
    /* Skip leading space and see if this is a '#' directive. */
    while(*line_ptr == ' ' || *line_ptr == '\t')
        *ret_ptr++ = *line_ptr++;
    if(*line_ptr == '#')
    {
        *ret_ptr++ = *line_ptr++;
        /* Skip space after '#'. */
        while(*line_ptr == ' ' || *line_ptr == '\t')
            *ret_ptr++ = *line_ptr++;
        directive_pos = ret_ptr;
        passComments = FALSE;
    }
    else
    {
        directive_pos = NULL;
        passComments = PassComments;
    }
    /* Loop through all characters read until end of line is hit. */
    while((ch = *line_ptr++) != '\0')
    {
        if(is_special_to_get_line[(unsigned char)ch])
        {
            if(ch == '?' && *line_ptr == '?')
            {
                /* Increment 'line_ptr' on the assumption that a trigraph will match.
                 * If no match is made then 'line_ptr' will be unincremented. */
                line_ptr += 2;
                switch(*(line_ptr-1))
                {
                    case '=':
                        ch = '#';
                        break;
                    case '(':
```

BEST AVAILABLE COPY

```
                    ch = '[';
                    break;
                case '/':
                    ch = '\\';
                    break;
                case ')':
                    ch = ']';
                    break;
                case '\'':
                    ch = '^';
                    break;
                case '<':
                    ch = '{';
                    break;
                case '!':
                    ch = '|';
                    break;
                case '>':
                    ch = '}';
                    break;
                case '-':
                    ch = '~';
                    break;
                default:
                    line_ptr -= 2;
            }
        }
        /* Check that none of the characters used to represent column position
         * information in substitute.c are in the input file. */
        if(ch > 0 && ch < 4)
        {
            error("Illegal character in source");
            ch = ' ';
        }
        else if(ch == '/' && *line_ptr == '*' && !inLiteral)
        {
            if(passComments)
            {
                *ret_ptr++ = '/';
                *ret_ptr++ = '*';
            }
            line_ptr++;
            while(!(*line_ptr == '*' && *(line_ptr+1) == '/'))
            {
                if(*line_ptr == '\0')
                {
                    /* See if the output is more than half way throung the max buffer
                     * size.  If so, break up the comment to avoid problems with
                     * a comment causing the buffer size to be exceeded. */
                    if(passComments && ret_ptr > return_line+BUFFERSIZE/2)
                    {
                        /* Terminate this portion of the comment and copy the remainder
```

BEST AVAILABLE COPY

```
                     * of the comment back to 'line' preceded by new comment start. */
                    *ret_ptr++ = '\0';
                    ret_ptr = return_line+BUFFERSIZE/2;
                    *line = '/';
                    *(line+1) = '*';
                    strcpy(line+2, ret_ptr);
                    *ret_ptr++ = '*';
                    *ret_ptr++ = '/';
                    *ret_ptr++ = '\0';
                    unterminatedComment = TRUE;
                    return return_line;
                }
                if(!input_line(line))
                {
                    error("Unterminated comment at end of file");
                    return NULL;
                }
                line_ptr = line;
            }
            else
            {
                /* If the character is an NLS character pair then skip over the pair to
                 * avoid the second character being taken as part of a comment termination. */
                if(NLSOption && FIRSTof2(*line_ptr) && SECof2(*(line_ptr+1)))
                {
                    if(passComments)
                        *ret_ptr++ = *line_ptr;
                    line_ptr++;
                }
                if(passComments)
                    *ret_ptr++ = *line_ptr;
                line_ptr++;
            }
        }
        if(passComments)
        {
            *ret_ptr++ = '*';
            ch = '/';
        }
        else
            ch = ' ';
        line_ptr += 2;
    }
    else if((ch == '"' || ch == '\'') && !inLiteral)
    {
        inLiteral = TRUE;
        delimiter = ch;
    }
    else if(ch == delimiter && inLiteral)
    {
        inLiteral = FALSE;
    }
```

BEST AVAILABLE COPY

```
            else if(ch == '\\')
            {
                if(*line_ptr == '\n')
                {
                    if(!input_line(line))
                    {
                        error("Continuation character on last line of file");
                        return NULL;
                    }
                    if(ret_ptr >= return_line+BUFFERSIZE-1)
                        break;
                    line_ptr = line;
                    continue;
                }
                if(inLiteral)
                {
                    *ret_ptr++ = '\\';
                    ch = *line_ptr++;
                }
            }
            /* Skip over NLS characters in inside of string literals. */
            if(NLSOption && FIRSTof2(ch) && SECof2(*line_ptr) && inLiteral)
            {
                *ret_ptr++ = ch;
                ch = *line_ptr++;
            }
        }
        *ret_ptr++ = ch;
    }
    if(ret_ptr >= return_line+BUFFERSIZE-1)
    {
        error("Catenated input line too long.");
        *(return_line+BUFFERSIZE-2) = '\n';
        *(return_line+BUFFERSIZE-1) = '\0';
    }
    else
    {
        /* Back over the newline. */
        ret_ptr--;
        /* Remove space from the end of the line.  This is important so that comments
         * on their own line don't generate whitespace, and so macro parameters preceding
         * the end of line have trailing space removed.  Also, the #undef, #ifdef, #ifndef,
         * and #else count on it when checking for extra characters at end of line. */
        back_over_space(ret_ptr, return_line);
        *ret_ptr++ = '\n';
        *ret_ptr++ = '\0';
    }
    if(directive_pos != NULL)
        return handle_directive(directive_pos);
    else
        return return_line;
}
```

BEST AVAILABLE COPY

```
char *read_line(target)
char *target;
{
    register char *line;
    register char *target_ptr;

    do
    {
        if((line = get_line()) == NULL)
        {
            *target = '\0';
            return NULL;
        }
    } while(!produce_output);
    target_ptr = target;
    while(*line != '\0')
        *target_ptr++ = *line++;
    *target_ptr = '\0';
    return target;
}


/*
 * This routine takes a pointer to the '#' directive's name which follows the '#'.
 * It returns the line which should result from the directive.  This is a simple
 * blank line for all but the pragma.  It assumes that for the pragma is is OK
 * to write a character at *(line-1).
 */
char *handle_directive(line)
register char *line;
{
    static char blank_line[] = "\n";
    static char empty_line[] = "";

    switch(*line)
    {
        case '\n':
            return blank_line;
        case 'd':
            if(id_cmp(line, "define"))
            {
                if(produce_output)
                    handle_define(line+6);
                return blank_line;
            }
            break;
        case 'e':
            if(id_cmp(line, "error"))
            {
                if(produce_output)
```

BEST AVAILABLE COPY

```
                handle_error(line+5);
            return blank_line;
        }
        if(id_cmp(line, "else"))
        {
            handle_else(line+4);
            return blank_line;
        }
        if(id_cmp(line, "elif"))
        {
            handle_elif(line+4);
            return blank_line;
        }
        if(id_cmp(line, "endif"))
        {
            handle_endif(line+5);
            return blank_line;
        }
        break;
    case 'i':
        if(id_cmp(line, "include"))
        {
            if(produce_output)
                handle_include(line+7);
            return empty_line;
        }
        if(id_cmp(line, "if"))
        {
            handle_if(line+2);
            return blank_line;
        }
        if(id_cmp(line, "ifdef"))
        {
            handle_ifdef(line+5);
            return blank_line;
        }
        if(id_cmp(line, "ifndef"))
        {
            handle_ifndef(line+6);
            return blank_line;
        }
        break;
    case 'l':
        if(id_cmp(line, "line"))
        {
            if(produce_output)
                handle_line(line+4);
            return empty_line;
        }
        break;
    case 'p':
        if(id_cmp(line, "pragma"))
```

BEST AVAILABLE COPY

```
            {
                *(line-1) = '#';
                return line-1;
            }
            break;
        case 'u':
            if(id_cmp(line, "undef"))
            {
                if(produce_output)
                    handle_undef(line+5);
                return blank_line;
            }
            break;
    }
    error("Unknown preprocessing directive");
    return blank_line;
}
```

Feb 04 09:04 1988  cpp/startup.c Page 1

```
#include <stdio.h>
#include "support.h"
#include "file.h"

FILE *outfile;


boolean DebugOption = FALSE;
boolean HostLikeOption = FALSE;
boolean NoWarningsOption = FALSE;
boolean SuppressSynchronization = FALSE;
boolean NLSOption = FALSE;
boolean PassComments = FALSE;

startup(argc, argv)
int argc;
char *argv[];
{
    set_time();
    parse_options(argc, argv);
    /* This is called after parse_options because the -D and -U options
     * mark macros which will be set up in init_defines.  The reason for
     * waiting is that all -U options take precedence over all -D options. */
    init_defines();
    /* Set up the pragma which should appear on the first line and
     * the '#' line which should be the second line. */
    init_output_line();
}

parse_options(argc, argv)
int argc;
char *argv[];
```

BEST AVAILABLE COPY

```
{
    int c;
    extern char *optarg;
    extern int optind;
    char *ch_ptr;
    int num_file_params = 0;
    char *source_file = "";
    char *source_path;

    outfile = stdout;
    while(optind < argc)
    {
        switch(c = getopt(argc, argv, "D:U:I:N:ghwPCn"))
        {
            case 'D':
                handle_pre_define(optarg);
                break;
            case 'U':
                handle_pre_undefine(optarg);
                break;
            case 'I':
                add_search_path(optarg);
                break;
            case 'g':
                DebugOption = TRUE;
                break;
            case 'h':
                HostLikeOption = TRUE;
                break;
            case 'w':
                NoWarningsOption = TRUE;
                break;
            case 'P':
                SuppressSynchronization = TRUE;
                break;
            case 'C':
                PassComments = TRUE;
                break;
            case 'n':
                NLSOption = TRUE;
                if(langinit(getenv("LANG")))
                    warning("Language \"%s\" not available, using \"n-computer\"\n", getenv("LANG"));
                break;
            case '?':
                error("Illegal option to cpp");
                break;
            case EOF:
                /* Ignore lone '-'. */
                if(strcmp(argv[optind], "-") == 0)
                {
                    optind++;
                    continue;
```

BEST AVAILABLE COPY

```
                    num_file_params++;
                    if(num_file_params == 1)
                    {
                        if(!start_file(argv[optind]))
                        {
                            error("Unable to open source file '%s'", argv[optind]);
                            exit(1);
                        }
                        source_file = argv[optind];
                    }
                    else if(num_file_params == 2)
                    {
                        if((outfile = fopen(argv[optind], "w")) == NULL)
                        {
                            error("Unable to open output file '%s'", argv[optind]);
                            exit(1);
                        }
                    }
                    else
                    {
                        error("Too many arguments to cpp");
                        exit(1);
                    }
                    optind++;
            }
        }
        if(num_file_params == 0)
        {
            error("Missing source file argument to cpp");
            exit(1);
        }
        ch_ptr = source_file+strlen(source_file);
        while(ch_ptr > source_file && *(ch_ptr-1) != '/')
            ch_ptr--;
        source_path = my_malloc(ch_ptr-source_file+1);
        strncpy(source_path, source_file, ch_ptr-source_file);
        *(source_path+(ch_ptr-source_file)) = '\0';
        add_search_path(source_path);
    }
```

Feb 04 09:04 1988 cpp/substitute.c Page 1

```
#include <stdio.h>
#include <nl_ctype.h>
#include "support.h"
#include "define.h"
#include "file.h"

#define ORIGIN (buffer+BUFFERSIZE)
#define MAX_RECURSION_LEVELS 32
```

BEST AVAILABLE COPY

```
#define START_MARK 1
#define MIDDLE_MARK 2
#define END_MARK 3

extern boolean DebugOption;
extern boolean NLSOption;
extern char id_chars[];

extern char date_string[], time_string[];
extern int current_lineno;


/* This data structure is used to hold a list of macros which are unavailable
 * for substitution because the have already been substituted and macro
 * recursion must be avoided.  The structure also holds and end_position which
 * is where buffer line pointer must reach for the macro to be available for
 * substitution again. */
typedef struct recursive_name_node {
    char *name;
    char *start_position;
    char *end_position;
    struct recursive_name_node *next;
} t_recursive_name_list;

static char original_line[BUFFERSIZE], *original_line_ptr, *macro_end;
extern int num_newlines_in_output;

#define update_original_line(macro_start, line) {\
                                        if(macro_end == NULL)\
                                        {\
                                            original_line_ptr = original_line;\
                                            macro_end = macro_start;\
                                            while(macro_end < line)\
                                                *original_line_ptr++ = *macro_end++;\
                                        }\
                                        else\
                                            while(macro_end < line)\
                                                *original_line_ptr++ = *macro_end++;\
                                    }

#define output_original_line(GenerateColumnInfo, current_line_pos, result_ptr) \
                    if(GenerateColumnInfo && macro_end != NULL && current_line_pos >= macro_end)\
                    {\
                        *result_ptr++ = MIDDLE_MARK;\
                        strncpy(result_ptr, original_line, original_line_ptr-original_line);\
                        result_ptr += original_line_ptr-original_line;\
                        *result_ptr++ = END_MARK;\
                        macro_end = NULL;\
                    }
```

BEST AVAILABLE COPY

```
 * potentially one requiring special processing.  The characters marked with
 * a '1' in the array are those checked for in the if-else construct of 'get_sub_line'. */
static char is_special_to_get_sub_line[256] = {
1,0,0,0,0,0,0,0,0,0,0,0,0,0,0,0,
0,0,0,0,0,0,0,0,0,0,0,0,0,0,0,0,
0,0,1,0,0,0,0,1,0,0,0,0,0,0,0,1,
1,1,1,1,1,1,1,1,1,1,0,0,0,0,0,0,
0,1,1,1,1,1,1,1,1,1,1,1,1,1,1,1,
1,1,1,1,1,1,1,1,1,1,1,0,0,0,0,1,
0,1,1,1,1,1,1,1,1,1,1,1,1,1,1,1,
1,1,1,1,1,1,1,1,1,1,1,0,0,0,0,0,
};

/*
 * This routine returns a fully macro replaced line from the input.  Several
 * source lines may be read to form the line returned due to possible comments,
 * preprocessing directives, or macro invocations crossing line boundaries.
 * If the parameter 'string' is non-NULL then it is used as the sole input,
 * otherwise the input is read using 'read_line'.
 *     The 'recursive_name_list_ptr'
 * parameter is a pointer used to return a list of substituted macros which
 * are unavailable to parent substitution routines.  This list is used to avoid
 * macro recursion.
 */
char *get_sub_line(string, recursive_name_list_ptr)
char *string;
t_recursive_name_list **recursive_name_list_ptr;
{
    char *result;                /* Pointer to the returned line. */
    int result_size;             /* Amount of allocated memory for result. */
    register char *result_ptr;   /* Current output position of result. */
    char buffer[2*BUFFERSIZE];
    char sub_string[BUFFERSIZE];
    register char *line;
    register char *chmark;
    register int id_length;
    register boolean GenerateColumnInfo;
    t_define *define;
    t_param_array param_array;
    register int sub_length;
    t_recursive_name_list *recursive_names = NULL;
    t_recursive_name_list *sub_recursive_names = NULL;
    register boolean CouldBeDefine;
    register int bitval;


    char *parse_arguments();
    t_define *get_define();
    t_recursive_name_list *replace_macro();
    t_recursive_name_list *catenate_recursive_names();
```

BEST AVAILABLE COPY

```
    t_recursive_name_list *adjust_recursive_name_pointers();
    t_recursive_name_list *add_recursive_name();
    t_recursive_name_list *convert_recursive_names();
    boolean is_recursive_name();
    char *read_line();

    line = ORIGIN;
    /* Start result size out at 2*BUFFERSIZE so that a reallocation won't occur for
     * just a few small macros. */
    result = result_ptr = temp_alloc(2*BUFFERSIZE);
    result_size = 2*BUFFERSIZE-1;
    /* Read up to BUFFERSIZE characters into 'line'. */
    if(string == NULL)
    {
        if(read_line(ORIGIN) == NULL)
            return NULL;
        /* Since this is the outermost level of call to get_sub_line, then set
         * up macro_end to allow macro replacement column information to work. */
        macro_end = NULL;
        GenerateColumnInfo = DebugOption;
    }
    else
    {
        strcpy(ORIGIN, string);
        GenerateColumnInfo = FALSE;
    }
    /* Copy the given line into the result substituting macros as necessary. */
    while(*line != '\0')
    {
        if(is_id_start(*line))
        {
            /* Mark the start of the identifier. */
            chmark = line;
            CouldBeDefine = TRUE;
            bitval = 1;
            do
            {
                if(CouldBeDefine && bitval <= 128)
                {
                    if((id_chars[*line] & bitval) == 0)
                        CouldBeDefine = FALSE;
                    bitval <<= 1;
                }
                line++;
            }
            while(is_id(*line));
            if(CouldBeDefine && (define = get_define(chmark, id_length=line-chmark)) != NULL
            && !is_recursive_name(chmark, id_length, recursive_names))
            {
                if(define->has_params)
                {
                    skip_space_and_com(line);
```

BEST AVAILABLE COPY

```
while(*line == '\n')
{
    register int distance;
    register char *ch_ptr;

    /* See how the id must be moved to make room for a new line. */
    distance = line-ORIGIN+1;
    /* Copy the identifier back 'distance' spaces so that there is room
     * for a new line to be read. */
    for(ch_ptr = chmark; ch_ptr <= line; ch_ptr++)
        *(ch_ptr-distance) = *ch_ptr;
    chmark -= distance;
    line -= distance;
    if(GenerateColumnInfo && macro_end != NULL)
        macro_end -= distance;
    /* Since the end of the current line was reached, then
     * all macros will be available for substitution. */
    recursive_names = NULL;
    if(read_line(ORIGIN) == NULL)
        break;
    line++;
    skip_space_and_com(line);
}
if(*line != '(')
{
    /* Else, the identifier wasn't a macro, so just copy it over. */
    while(chmark < line)
    {
        if(recursive_names != NULL)
        {
            recursive_names = convert_recursive_names(recursive_names, chmark, result_ptr,
                                                      recursive_name_list_ptr);
            output_original_line(GenerateColumnInfo, chmark, result_ptr);
        }
        *result_ptr++ = *chmark++;
    }
    continue;
}

line++;
if(GenerateColumnInfo)
{
    if(macro_end == NULL)
        *result_ptr++ = START_MARK;
    update_original_line(chmark, line);
}
/* Parse the arguments into param_array. */
line = parse_arguments(line, param_array, define->num_params, ORIGIN, &recursive_names,
mnInfo); GenerateColu
}
```

BEST AVAILABLE COPY

```
        else if(GenerateColumnInfo)
        {
            if(macro_end == NULL)
                *result_ptr++ = START_MARK;
            update_original_line(chmark, line);
        }
        sub_recursive_names = replace_macro(sub_string, define->string, param_array);
        sub_length = strlen(sub_string);
        /* Add this macro's name to the list of macro names which cannot be recursively
         * substituted until 'line' passes the end of this macro.  It is important that
         * this macro be added to the list before the sub macros are added on the
         * next line since the start and end pointers of any macros spanned by this macro
         * will be adjusted to the start and end of this macro. */
        recursive_names = add_recursive_name(chmark, id_length, line-sub_length, line, recursive_names);
        /* The recursive names from the substituted macro are added to the current list
         * of recursive names after the start and end pointers have been made relative to
         * 'line-sub_length' rather than 'sub_string'. */
        recursive_names = catenate_recursive_names(adjust_recursive_name_pointers(sub_recursive_names,
                                                                                   line-sub_length,
                                      sub_string),, recursive_names);

        /* Back up the line pointer to put the replacement text immediately in front of
         * the text following the macro invocation so that macro recognition can continue
         * from the beginning of the replacement text and on through the rest of the line. */
        if(line-sub_length < buffer)
        {
            error("Overflowed replacement buffer.");
            sub_length = 0;
        }
        line -= sub_length;
        strncpy(line, sub_string, sub_length);

        /* See if there is room in the allocated result for the expanded macro (plus
         * BUFFERSIZE just to leave room for the rest of the original string). */
        {
            char *old_result = result;
            int new_size;
            if(GenerateColumnInfo)
                new_size = result_ptr-result+(ORIGIN+BUFFERSIZE-line)+(original_line_ptr-original_line);
            else
                new_size = result_ptr-result+(ORIGIN+BUFFERSIZE-line);
            while(result_size < new_size)
            {
                result_size += BUFFERSIZE;
                result = temp_realloc(result, result_size);
                result_ptr += result-old_result;
                if(recursive_name_list_ptr != NULL)
                    *recursive_name_list_ptr = adjust_recursive_name_pointers(*recursive_name_list_ptr,
                                                                              result, old_result);
            }
        }
    }
```

BEST AVAILABLE COPY

```
        {
            /* Else, the identifier wasn't a macro, so just copy it over. */
            /* There first fast loop is for copying when there are no active macros.
             * The second slower one is for when there are active macros. */
            if(recursive_names == NULL)
                while(chmark < line)
                    *result_ptr++ = *chmark++;
            else
            {
                while(chmark < line)
                {
                    recursive_names = convert_recursive_names(recursive_names, chmark, result_ptr,
                                                              recursive_name_list_ptr);
                    output_original_line(GenerateColumnInfo, chmark, result_ptr);
                    *result_ptr++ = *chmark++;
                }
            }
        }
    }
    /* Need to specially parse numbers so that the letters which can appear as part of numbers
     * aren't taken as identifiers.  Note that floating point numbers involving an exponent are
     * done in two parts because it is simpler and accomplishes the purpose of eating the letters. */
    else if(isdigit(*line))
    {
        chmark = line;
        line++;
        /* Either skip through hex number. */
        if(*chmark == '0' && (*line == 'x' || *line == 'X'))
        {
            line++;
            while(isxdigit(*line))
                line++;
        }
        /* Or decimal, octal, or floating point number. */
        else
        {
            while(isdigit(*line) || *line == '.')
                line++;
        }
        /* Skip over possible postfixes.  This code doesn't precisely restrict the postfixes
         * to just legal combinations, but it comes close enough. */
        if(*line == 'l' || *line == 'L' ||
           *line == 'u' || *line == 'U')
        {
            line++;
            if(*line == 'l' || *line == 'L' ||
               *line == 'u' || *line == 'U')
                line++;
        }
        else if(*line == 'f' || *line == 'F' ||
                *line == 'e' || *line == 'E')
```

BEST AVAILABLE COPY

```
                line++;
            /* Copy over the number. */
            /* There first fast loop is for copying when there are no active macros.
             * The second slower one is for when there are active macros. */
            if(recursive_names == NULL)
                while(chmark < line)
                    *result_ptr++ = *chmark++;
            else
            {
                while(chmark < line)
                {
                    recursive_names = convert_recursive_names(recursive_names, chmark, result_ptr,
                                                              recursive_name_list_ptr);
                    output_original_line(GenerateColumnInfo, chmark, result_ptr);
                    *result_ptr++ = *chmark++;
                }
            }
        }
        else if(is_quote(*line))
        {
            skip_quote(line, result_ptr);
        }
        /* Skip over comments copying them into the result string and keeping
         * track of the number of newlines copied over to keep the output line
         * count in sync. */
        else if(*(line) == '/' && *((line)+1) == '*')
        {
            *result_ptr++ = *line++;
            *result_ptr++ = *line++;
            while((*line != '*' || *(line+1) != '/') && *line != '\0')
            {
                if(*line == '\n')
                    num_newlines_in_output++;
                /* If the character is an NLS character pair then skip over the pair to
                 * avoid the second character being taken as part of a comment termination. */
                if(NLSOption && FIRSTof2(*line) && SECof2(*(line+1)))
                    *result_ptr++ = *line++;
                *result_ptr++ = *line++;
            }
            if(*line == '\0')
                error("Non token comment encountered while substituting");
            else
            {
                *result_ptr++ = *line++;
                *result_ptr++ = *line++;
            }
        }
        else
        {
            if(recursive_names == NULL)
            {
                /* Do a whole series of non-special characters in this fast loop rather
```

BEST AVAILABLE COPY

```
                 * character must be copied regardless. */
                do
                {
                    *result_ptr++ = *line++;
                }
                while(!is_special_to_get_sub_line[(unsigned char)*line]);
            }
            else
            {
                recursive_names = convert_recursive_names(recursive_names, line, result_ptr,
                                                          recursive_name_list_ptr);
                output_original_line(GenerateColumnInfo, line, result_ptr);
                *result_ptr++ = *line++;
            }
        }
    }
    /* If this is a parent level call and a newline was at the end of the line
     * then count it in the line total. */
    if(string == NULL && result_ptr > result && *(result_ptr-1) == '\n')
        num_newlines_in_output++;
    /* Check the character position corresponding to the terminating '\0'. */
    recursive_names = convert_recursive_names(recursive_names, line, result_ptr,
                                              recursive_name_list_ptr);
    *result_ptr = '\0';
    return result;
}


/*
 * This routine parses the arguments of a macro with parameters into 'param_array'.
 * The 'line' points to the character immediately following the '(' of the arguments.
 * All newlines are turned into single spaces. */
char *parse_arguments(line, param_array, expected_num_params, origin, recursive_name_list_ptr, GenerateColumnInf
register char *line;
t_param_array param_array;
int expected_num_params;
char *origin;
t_recursive_name_list **recursive_name_list_ptr;
boolean GenerateColumnInfo;
{
    register int num_params = 0;
    register int depth;
    register char *param_ptr;
    /* The buffer is 2*BUFFERSIZE in size so that the check for the paramter
     * size exceeding BUFFERSIZE need only be made after each new line and
     * at the end. */
    char param_buffer[2*BUFFERSIZE];
    static char null_string[] = "\0";

    skip_space_and_com(line);
```

BEST AVAILABLE COPY

```
    /* If end of a line is encountered, then read in a new line and continue. */
    while(*line == '\n')
    {
        line++;
        /* Copy rest of line into 'original_line' string. */
        if(GenerateColumnInfo)
            while(macro_end < line)
                *original_line_ptr++ = *macro_end++;
        /* Since the end of the current line was reached, then
         * all macros will be available for substitution. */
        *recursive_name_list_ptr = NULL;
        read_line(origin);
        line = origin;
        macro_end = line;
        skip_space_and_com(line);
    }

    num_params = 0;
    while(*line != ')' && *line != '\0')
    {
        /* Each param will first be loaded into param_buffer. */
        param_ptr = param_buffer;
        depth = 0;
        while(depth > 0 || (*line != ',' && *line != ')' && *line != '\0'))
        {
            if(*line == '\n')
            {
                line++;
                /* Copy rest of line into 'original_line' string. */
                if(GenerateColumnInfo)
                    while(macro_end < line)
                        *original_line_ptr++ = *macro_end++;
                /* Put out one space for newline. */
                *param_ptr++ = ' ';
                /* Check to see if the parameter is too long. */
                if(param_ptr-param_buffer >= BUFFERSIZE-1)
                {
                    error("Macro param too large.");
                    param_ptr = param_buffer;
                }
                /* Since the end of the current line was reached, then
                 * all macros will be available for substitution. */
                *recursive_name_list_ptr = NULL;
                read_line(origin);
                line = origin;
                macro_end = line;
                skip_space_and_com(line);
            }
            /* Skip over string literals copying them into the parameter string. */
            else if(is_quote(*line))
            {
                skip_quote(line, param_ptr);
```

BEST AVAILABLE COPY

```
        /* Skip over and throw away comments since comments crossing line
         * boundaries will throw off the line count. */
        else if(*(line) == '/' && *((line)+1) == '*')
        {
            *param_ptr++ = ' ';
            line += 2;
            while(*line != '*' || *(line+1) != '/')
            {
                /* If the character is an NLS character pair then skip over the pair to
                 * avoid the second character being taken as part of a comment termination. */
                if(NLSOption && FIRSTof2(*line) && SECof2(*(line+1)))
                    line++;
                line++;
            }
            line += 2;
        }
        else
        {
            if(*line == '(')
                depth++;
            else if(*line == ')')
                depth--;
            *param_ptr++ = *line++;
        }
    }
    /* Remove spaces from the end of the parameter. */
    back_over_space(param_ptr, param_buffer);
    /* Check to see if the parameter is too long. */
    if(param_ptr-param_buffer >= BUFFERSIZE-1)
    {
        error("Macro param too large.");
        param_ptr = param_buffer+BUFFERSIZE-2;
    }
    *param_ptr++ = '\0';
    param_array[num_params] = temp_alloc(param_ptr-param_buffer);
    strcpy(param_array[num_params++], param_buffer);
    if(*line == ',')
    {
        line++;
        skip_space_and_com(line);
        while(*line == '\n')
        {
            line++;
            /* Copy rest of line into 'original_line' string. */
            if(GenerateColumnInfo)
                while(macro_end < line)
                    *original_line_ptr++ = *macro_end++;
            /* Since the end of the current line was reached, then
             * all macros will be available for substitution. */
            *recursive_name_list_ptr = NULL;
            read_line(origin);
```

BEST AVAILABLE COPY

```
                    line = origin;
                    macro_end = line;
                    skip_space_and_com(line);
                }
            }
        }
        if(*line == '\0')
            error("Unexpected end of macro invocation");
        else
            line++;
        if(GenerateColumnInfo)
            while(macro_end < line)
                *original_line_ptr++ = *macro_end++;

        if(num_params != expected_num_params)
        {
            error("Wrong number of parameters for macro");
            /* Fill remaining parameter holes with a null string. */
            while(expected_num_params > num_params)
                param_array[--expected_num_params] = null_string;
        }
        return line;
    }


    /*
     * This routine expands the given macro replacement string 'string' substituting
     * the arguments in the given 'arg_array' into the marked parameter positions
     * in the replacement string.  NORMAL_PARAMs are recursively macro substituted
     * prior to being put into the resulting expanded string.  The resulting string is
     * placed in 'result'.  The function returns a list of macro names which were substituted
     * in recursive macro substitutions.
     *     This routine recognizes the three forms of parameters and handles them
     * appropriately.  It also recognizes special marks for the current FILE, LINE, DATE and TIME.
     */
    t_recursive_name_list *replace_macro(result, string, arg_array)
    char *result;
    register char *string;
    t_param_array arg_array;
    {
        register char *result_ptr;
        char *argument;
        int arg_length;
        t_recursive_name_list *recursive_name_list, *temp_recursive_name_list;
        t_recursive_name_list *catenate_recursive_names();

        result_ptr = result;
        /* Start recursive_name_list out as empty. */
        recursive_name_list = NULL;
        /* This loop copies characters from string (the macro replacement string) to
         * result.  If it encounters a macro parameter, then the corresponding argument
```

```
while(*string != '\0')
{
    if(is_special_char(*string))
    {
        if(*string == NORMAL_PARAM)
        {
            /* Normal parameters need to perform a recursive substitution on
             * their argument. */
            string++;
            /* Macro substitute the parameter and keep track of the macros
             * which were substituted in the nested invocation. */
            temp_recursive_name_list = NULL;
            argument = get_sub_line(arg_array[*string-1], &temp_recursive_name_list);
            arg_length = strlen(argument);
            if(arg_length > BUFFERSIZE-1)
            {
                error("Macro param too large after substitution.");
                argument[BUFFERSIZE-1] = '\0';
            }
            /* The start and end pointers in the recursive name list should be changed to
             * be relative to 'result_ptr' rather than 'argument'. */
            recursive_name list = catenate_recursive_names(adjust_recursive_name_pointers(temp_recursive
              _name_list,              result_ptr, argument), recursive_name_list);

            strcpy(result_ptr, argument);
            result_ptr += arg_length;
        }
        else if(*string == QUOTED_PARAM)
        {
            /* Quoted parameters have the argument copied over with double
             * quotes around it. */
            string++;
            argument = arg_array[*string-1];
            arg_length = strlen(argument);
            /* Make sure there is room in the chunk for the new argument.
             * The 2*arg_length is used in case every character is an escaped '"',
             * and the extra 2 is for the quotes on the ends. */
            if(2*arg_length+2 > BUFFERSIZE-1)
            {
                error("Quoted macro param too large.");
                argument[(BUFFERSIZE-3)/2] = '\0';
            }
            *result_ptr++ = '"';
            while(*argument != '\0')
            {
                /* Every '"' or '\' in a literal should have a '\' prepended. */
                if(is_quote(*argument))
                {
                    register char delimiter = *argument;

                    if(delimiter == '"')
```

BEST AVAILABLE COPY

BEST AVAILABLE COPY

```
                        *result_ptr++ = '\\';
                    *result_ptr++ = *argument++;
                    do
                    {
                        /* Skip the character following a '\' in case it is the delimiter. */
                        if(*argument == '\\')
                        {
                            *result_ptr++ = '\\';
                            *result_ptr++ = '\\';
                            argument++;
                        }
                        else if(*argument == '"')
                            *result_ptr++ = '\\';
                    }
                    while(*argument != '\0' && (*result_ptr++ = *argument++) != delimiter);
                }
                else
                {
                    *result_ptr++ = *argument++;
                }
            }
            *result_ptr++ = '"';
        }
        else if(*string == SQUEEZED_PARAM)
        {
            /* Squeezed parameters simply have the argument copied over. */
            string++;
            argument = arg_array[*string-1];
            arg_length = strlen(argument);
            /* No check for parameter too large here since parse_arguments
             * guarantees it will be less than BUFFERSIZE. */
            strcpy(result_ptr, argument);
            result_ptr += arg_length;
        }
        else if(*string == CURRENT_LINE)
        {
            /* Copy the current line number to the output. */
            number_to_string(current_lineno, result_ptr);
        }
        else if(*string == CURRENT_FILE)
        {
            /* Copy the current line number to the output. */
            *result_ptr++ = '"';
            strcpy(result_ptr, current_file->filename);
            result_ptr += strlen(current_file->filename);
            *result_ptr++ = '"';
        }
        else if(*string == CURRENT_DATE)
        {
            *result_ptr++ = '"';
            strcpy(result_ptr, date_string);
            result_ptr += strlen(date_string);
```

BEST AVAILABLE COPY

```
        }
        else /* Must be CURRENT_TIME. */
        {
            *result_ptr++ = '"';
            strcpy(result_ptr, time_string);
            result_ptr += strlen(time_string);
            *result_ptr++ = '"';
        }
        string++;
    }
    else
    {
        *result_ptr++ = *string++;
    }
  }
  *result_ptr = '\0';
  return recursive_name_list;
}


boolean is_recursive_name(id, length, recursive_names)
char *id;
int length;
t_recursive_name_list *recursive_names;
{
    while(recursive_names != NULL)
    {
        if(strncmp(recursive_names->name, id, length) == 0 && recursive_names->name[length] == '\0'
        && id >= recursive_names->start_position && id < recursive_names->end_position)
            return TRUE;
        recursive_names = recursive_names->next;
    }
    return FALSE;
}


/*
 * This routine adds the given macro to the list of recursive names and returns the
 * resulting list.  If it covers the start or end ranges of any sub macros then their
 * boundary is modified to match the corresponding boundary of this macro.  This is
 * to avoid mutual macro recursion.
 */
t_recursive_name_list *add_recursive_name(id, length, start_position, end_position, recursive_names)
char *id;
int length;
char *start_position, *end_position;
t_recursive_name_list *recursive_names;
{
    t_recursive_name_list *result;

    result = (t_recursive_name_list *)temp_alloc(sizeof(t_recursive_name_list));
```

BEST AVAILABLE COPY

```
    result->name = temp_alloc(length+1);
    strncpy(result->name, id, length);
    *(result->name+length) = '\0';
    result->next = recursive_names;
    result->start_position = start_position;
    result->end_position = end_position;
    return result;
}


/*
 * This routine catenates the 'new_recursive_names' list and the 'recursive_names'
 * list and returns the resulting list.
 */
t_recursive_name_list *catenate_recursive_names(new_recursive_names, recursive_names)
t_recursive_name_list *new_recursive_names;
t_recursive_name_list *recursive_names;
{
    t_recursive_name_list *name_ptr, *last_ptr;

    if(new_recursive_names == NULL)
        return recursive_names;
    name_ptr = new_recursive_names;
    while(name_ptr != NULL)
    {
        last_ptr = name_ptr;
        name_ptr = name_ptr->next;
    }
    last_ptr->next = recursive_names;
    return new_recursive_names;
}


/*
 * This routine adjusts the start_position and end_position pointers in the
 * given list to be relative to new_start rather than old_start.
 */
t_recursive_name_list *adjust_recursive_name_pointers(recursive_names, new_start, old_start)
t_recursive_name_list *recursive_names;
char *new_start, *old_start;
{
    t_recursive_name_list *name_ptr;

    name_ptr = recursive_names;
    while(name_ptr != NULL)
    {
        name_ptr->start_position += new_start-old_start;
        /* Don't want to adjust the potentially NULL end pointer. */
        if(name_ptr->end_position != NULL)
            name_ptr->end_position += new_start-old_start;
        name_ptr = name_ptr->next;
    }
```

BEST AVAILABLE COPY

```
}


/*
 * This routine checks to see if the given character which is being copied from 'buffer_ptr'
 * to 'result_ptr' is at the endpoint of any recursive name boundaries.  If it is a left
 * boundary then a new entry is made in the result_list at the current
 * 'result_ptr' position with the right boundary set to NULL.  If it is a right boundary
 * then an entry for that macro is found in the result_list and its right
 * boundary is set to 'result_ptr'; the entry in the original list is also removed since
 * it is no longer needed.  This all results in making a recursive names list which
 * correctly maps on to the result string from get_sub_line.
 *   If the result_list_ptr is NULL the the result_list is not wanted.
 */
t_recursive_name_list *convert_recursive_names(original_list, buffer_ptr, result_ptr, result_list_ptr)
t_recursive_name_list *original_list;
char *buffer_ptr;
char *result_ptr;
t_recursive_name_list **result_list_ptr;
{
    t_recursive_name_list *updated_original_list = NULL;
    t_recursive_name_list *temp_recursive_list;

    while(original_list != NULL)
    {
        if(original_list->start_position == buffer_ptr && result_list_ptr != NULL)
        {
            /* Make new result list node with left boundary at 'result_ptr'. */
            temp_recursive_list = (t_recursive_name_list *)temp_alloc(sizeof(t_recursive_name_list));
            temp_recursive_list->name = original_list->name;
            temp_recursive_list->start_position = result_ptr;
            temp_recursive_list->end_position = NULL;
            temp_recursive_list->next = *result_list_ptr;
            *result_list_ptr = temp_recursive_list;
        }
        if(original_list->end_position == buffer_ptr)
        {
            if(result_list_ptr != NULL)
            {
                /* Set the end_pointer in the corresponding result_list entry. */
                temp_recursive_list = *result_list_ptr;
                while(temp_recursive_list != NULL)
                {
                    if(temp_recursive_list->name == original_list->name)
                    {
                        temp_recursive_list->end_position = result_ptr;
                        break;
                    }
                    temp_recursive_list = temp_recursive_list->next;
                }
            }
```

BEST AVAILABLE COPY

```
                original_list = original_list->next;
            }
            /* Don't add the entry to the updated list if an end_pointer was encountered. */
            else
            {
                temp_recursive_list = original_list;
                original_list = original_list->next;
                temp_recursive_list->next = updated_original_list;
                updated_original_list = temp_recursive_list;
            }
        }
        return updated_original_list;
    }


    #ifdef DEBUG
    print_macro_info(string, recursive_names)
    char *string;
    t_recursive_name_list *recursive_names;
    {
        fprintf(stderr, "---------------------------------------------\n");
        fprintf(stderr, "'%s'\n", string);
        while(recursive_names != NULL)
        {
            fprintf(stderr, "   macro '%s' starts at %d and ends at %d\n", recursive_names->name,
            recursive_names->start_position-string, recursive_names->end_position-string);
              :cursive_names = recursive_names->next;
        }
        fprintf(stderr, "---------------------------------------------\n");
    }
    #endif
```

Feb 04 09:04 1988 cpp/support.c Page 1

```
#include <stdio.h>
#include <sys/types.h>
#include <sys/stat.h>
#include <time.h>
#include "support.h"

char date_string[12], time_string[9];


/*
 * This routine returns a hash number of int range based upon the given
 * string.  It uses up to the first 10 characters in string.
 */
int string_hash(string, length)
register char *string;
int length;
{
```

BEST AVAILABLE COPY

```
    if(length > 10)
        length = 10;
    while(length--)
    {
        hash_num = (hash_num<<1)+*string;
        string++;
    }
    return hash_num;
}


/*
 * This routine compares the two ids up to the first non-identifier
 * character.  It returns TRUE if they are the same, FALSE otherwise.
 */
boolean id_cmp(id1, id2)
register char *id1, *id2;
{
    while(*id1 == *id2 && is_id(*id1))
    {
        id1++;
        id2++;
    }
    if(is_id(*id1) || is_id(*id2))
        return FALSE;
    else
        return TRUE;
}


/* The amount allocated at each sbrk in temp_alloc.
 * Must be > MaxSizeAllocatedPerCall+sizeof(pointer) or my_malloc will be
 * used. */
#define MEMORYCHUNK 8196

/* ALIGN must be a power of 2 and is the alignment boundary. */
#define ALIGN 4
#define align(n) ((-(long)(n)) & (ALIGN-1))

int total_allocated - 0;

/* These lists are pointers to MEMORYCHUNK sized blocks of memory.  The first
 * sizeof(pointer) bytes of each block is itself treated as a pointer to another block creating
 * a linked list.  The last block has a null pointer. */
static char *allocList = 0, *freeList = 0;

/* These are the size remaining of and pointer into the current chunk. */
static int size = 0;
static char *mem = 0;
```

BEST AVAILABLE COPY

```
/*
 * The allocate procedure assumes that the size asked for will be no larger
 * than MEMORYCHUNK-sizeof(pointer).
 */
char *temp_alloc(n) /* PROCEDURE ALLOCATE */
register int n;
{
    char *sbrk();
    register char *chunkPtr;
    register char *temp;

    /* Make n the value of the passed parameter rounded up to an alignment boundary. */
    n += align(n);
    /* See if the current chunk of memory is big enough to provide n bytes. */
    if (n > size)
    {
        if (n > MEMORYCHUNK-sizeof(char *))
        {
            /* If this allocator can't handle the chunk then use my_malloc. */
            return my_malloc(n);
        }
        if(freeList == 0)
        {
            /* Dynamically allocate from 0 to ALIGN-1 bytes from the system
             * to align the dynamic memory.  This amount should always be 0, but it
             * is allocated just to be safe. */
            sbrk(align(sbrk(0)));
            chunkPtr = sbrk(MEMORYCHUNK);
            if ((long)chunkPtr <= 0)
            {
                fprintf(stderr, "Out of dynamic memory.  Total allocated = %d\n", total_allocated);
                exit(1);
            }
            /* This total doesn't account for memory allocated to align the dynamic area. */
            total_allocated += MEMORYCHUNK;
        }
        else
        {
            chunkPtr = freeList;
            freeList = *(char **)chunkPtr;
        }
        *(char **)chunkPtr = allocList;
        allocList = chunkPtr;
        mem = chunkPtr+sizeof(char *);
        size = MEMORYCHUNK-sizeof(char *);
    }
    /* Remember the return value for later use in realloc. */
    temp = mem;
    mem += n;
    size -= n;
    return temp;
```

BEST AVAILABLE COPY

```
/*
 * This routine returns a pointer to 'n' bytes of dynamic storage the first
 * portion of which has the same contents as what 'ptr' points to.
 * No attempt is made to expand the space which 'ptr' points to since
 * branch analysis showed that this case never occurs.
 */
char *temp_realloc(ptr, n)
register char *ptr;
register int n;
{
    register char *new_mem, *new_ptr;

    n += align(n);
    new_ptr = new_mem = temp_alloc(n);
    /* This may copy over a lot of garbage if the chunk has grown, but the size
     * of the original chunk is unknown. */
    while(n > 0)
    {
        *new_ptr++ = *ptr++;
        n--;
    }
    return new_mem;
}


/*
 * This routine combines the freeList and allocList to be one free list
 * making the blocks available for future allocation.  When combining the
 * two lists, the alloc list is traversed rather than the free list because
 * it will tend to be shorter and will definitely be proportional to the
 * amount of space allocated since the last deallocate.
 */
temp_dealloc()  /* PROCEDURE DEALLOCATE */
{
    register char **chunkPtrPtr;

    if(allocList == 0)
        return;
    if(freeList != 0)
    {
        chunkPtrPtr = (char **)allocList;
        while(*chunkPtrPtr != 0)
            chunkPtrPtr = (char **)(*chunkPtrPtr);
        *chunkPtrPtr = freeList;
    }
    freeList = allocList;
    allocList = 0;
    mem = 0;
    size = 0;
```

BEST AVAILABLE COPY

```
}

set_time()
{
    register struct tm *current_time;
    long seconds;
    static char month_name[12][3] = {"Jan", "Feb", "Mar", "Apr", "May", "Jun", "Jul", "Aug", "Sep", "Oct",
; "Nov", "Dec"}

    /* Get the current time. */
    seconds = time(0);
    current_time = localtime(&seconds);

    /* Create the date string for the __DATE__ macro. */
    strncpy(date_string, month_name[current_time->tm_mon], 3);
    date_string[3] = ' ';
    if(current_time->tm_mday < 10)
        date_string[4] = ' ';
    else
        date_string[4] = '0'+current_time->tm_mday/10;
    date_string[5] = '0'+current_time->tm_mday%10;
    date_string[6] = ' ';
    date_string[7] = '1';
    date_string[8] = '9';
    date_string[9] = '0'+current_time->tm_year/10;
    date_string[10] = '0'+current_time->tm_year%10;
    date_string[11] = '\0';

    /* Create the time string for the __TIME__ macro. */
    time_string[0] = '0'+current_time->tm_hour/10;
    time_string[1] = '0'+current_time->tm_hour%10;
    time_string[2] = ':';
    time_string[3] = '0'+current_time->tm_min/10;
    time_string[4] = '0'+current_time->tm_min%10;
    time_string[5] = ':';
    time_string[6] = '0'+current_time->tm_sec/10;
    time_string[7] = '0'+current_time->tm_sec%10;
    time_string[8] = '\0';
}

static char *make_date_string(file_time)
register struct tm *file_time;
{
    register char *filedate;

    filedate = my_malloc(21);
    filedate[0] = ',';
    filedate[1] = '1';
    filedate[2] = '9';
    filedate[3] = '0'+file_time->tm_year/10;
    filedate[4] = '0'+file_time->tm_year%10;
    filedate[5] = ',';
```

BEST AVAILABLE COPY

```
    [illegible]
    filedate[7] = '0'+(file_time->tm_mon+1)%10;
    filedate[8] = ',';
    filedate[9] = '0'+file_time->tm_mday/10;
    filedate[10] = '0'+file_time->tm_mday%10;
    filedate[11] = ',';
    filedate[12] = '0'+file_time->tm_hour/10;
    filedate[13] = '0'+file_time->tm_hour%10;
    filedate[14] = ',';
    filedate[15] = '0'+file_time->tm_min/10;
    filedate[16] = '0'+file_time->tm_min%10;
    filedate[17] = ',';
    filedate[18] = '0'+file_time->tm_sec/10;
    filedate[19] = '0'+file_time->tm_sec%10;
    filedate[20] = '\0';
    return filedate;
}

char *get_file_date(filename)
char *filename;
{
    struct stat buf, *bufp = &buf;
    register struct tm *file_time;

    if(stat(filename, bufp) != 0)
    {
        error("Unable to stat %s", filename);
        return NULL;
    }
    file_time = localtime(&bufp->st_mtime);
    return make_date_string(file_time);
}

char *get_current_date()
{
    register struct tm *current_time;
    long seconds;

    /* Get the current time. */
    seconds = time(0);
    current_time = localtime(&seconds);
    return make_date_string(current_time);
}

char *my_malloc(n)
int n;
{
    register char *result;
    char *malloc();

    result = malloc(n);
    if(result == NULL)
```

BEST AVAILABLE COPY

```
    {
        error("Ran out of dynamic memory");
        exit(1);
    }
    return result;
}
```

Feb 04 09:04 1988  cpp/support.h Page 1

```
#ifndef SUPPORT_HAS_BEEN_INCLUDED
#define SUPPORT_HAS_BEEN_INCLUDED
#include <ctype.h>
#include <nl_ctype.h>

#define boolean int
#define TRUE 1
#define FALSE 0
/* This is the maximum input line size plus two. */
#define BUFFERSIZE 2048

extern boolean NLSOption;

typedef struct {
    boolean is_unsigned;
    long value;
} t_yystype;

#define YYSTYPE t_yystype

#define NEW(type)  ((type *)my_malloc(sizeof(type)))
#define bail(message)    (error(message); return;)
#define skip_space(line) while(*(line) == ' ' || *(line) == '\t') (line)++;
#define skip_space_and_com(line) do {\
                                        if(*(line) == ' ' || *(line) == '\t')\
                                            (line)++;\
                                        else if(*(line) == '/' && *((line)+1) == '*')\
                                        {\
                                            line += 2;\
                                            while(*line != '*' || *(line+1) != '/')\
                                            {\
                                                /* If the character is an NLS character pair then skip over
                                                 [illegible] \
                                                 * avoid the second character being taken as part of a comment
                                                 termination. */\

                                                if(NLSOption && FIRSTof2(*line) && SECof2(*(line+1)))\
                                                    line++;\
                                                line++;\
                                            }\
                                            line += 2;\
                                        }\
```

```
                                                break;\
                                    } while(1);
#define back_over_space(line, minimum)  while(line > (minimum) && (*(line-1) == ' ' || *(line-1) == '\t'))

#define is_id_start(ch)    (isalpha(ch) || (ch) == '_')
#define is_id(ch)          (isalnum(ch) || (ch) == '_')
#define is_quote(ch)       ((ch) == '"' || (ch) == '\'')
/* This macro skips a quoted literal assuming the current source character is
 * the delimiter character.  It copies characters from the source to the destination
 * up to and including the next matching delimiter encountered.  It also terminates
 * at newline.  A '\' can escape the delimiter within the literal. */
#define skip_quote(source, dest)    {\
                                        register char delimiter = *source;\
                                        *dest++ = *source++;\
                                        while(*source != delimiter && *source != '\n')\
                                        {\
                                            /* Skip the character following a '\' in case it is the delimiter.\
                                             * But don't escape the first char of an NLS pair. */\
                                            if(*source == '\\' && !FIRSTof2(*(source+1)))\
                                                *dest++ = *source++;\
                                            /* If the character is an NLS character pair then skip over the
                                               pair to\
                                             * avoid the second character being taken as a quote terminating the
                                               string. */\
                                            if(NLSOption && FIRSTof2(*source) && SECof2(*(source+1)))\
                                                *dest++ = *source++;\
                                            *dest++ = *source++;\
                                        }\
                                        if(*source == delimiter)\
                                            *dest++ = *source++;\
                                    }
/* See if there is room in chunk for add_size more characters.  If not, add
 * Maxline characters to the allocated chunk.  Chunk_size is the size of
 * chunk already allocated.  Chunk_ptr is where characters are currently
 * being written to in chunk. */
#define check_chunk_size(chunk, chunk_ptr, chunk_size, add_size)\
                                    {\
                                        register int current_length = chunk_ptr-chunk;\
                                        while(chunk_size < current_length+add_size)\
                                        {\
                                            chunk_size += Maxline;\
                                            chunk = temp_realloc(chunk, chunk_size);\
                                            chunk_ptr = chunk+current_length;\
                                        }\
                                    }


/*
 * This routine converts the given positive number to a string which is
 * copied out to the 'string' parameter.  The 'string' is incremented
```

BEST AVAILABLE COPY

BEST AVAILABLE COPY

```
 * as the number is written to it.
 */
#define number_to_string(value, string) {\
                                            register char number[12], *num_ptr = number;\
                                            register int temp = value;\
                                            do\
                                            {\
                                                *num_ptr++ = temp%10+'0';\
                                                temp /= 10;\
                                            }\
                                            while(temp > 0);\
                                            while(num_ptr > number)\
                                                *string++ = *--num_ptr;\
                                        }
extern char *my_malloc(), *temp_alloc(), *temp_realloc();
#endif
```

BEST AVAILABLE COPY

APPENDIX B

CASE # 187037

HP 64000-UX

Microprocessor Development Environment

68020
Basis Branch Analyzer

Operating Manual

HEWLETT PACKARD

© COPYRIGHT HEWLETT-PACKARD COMPANY 1988
LOGIC SYSTEMS DIVISION
COLORADO SPRINGS, COLORADO, U.S.A.

ALL RIGHTS RESERVED

Manual Part Number: 64381-90901
E0188

TABLE OF CONTENTS

BEST AVAILABLE COPY

USING THIS MANUAL

GENERAL ..... vi
MANUAL CONTENTS GUIDE ..... vi

Chapter 1: GENERAL INFORMATION

INTRODUCTION ..... 1-1
BBACPP ..... 1-2
BBAUNLOAD ..... 1-2
BBAREP ..... 1-2
BBAMERGE ..... 1-2

Chapter 2: GETTING STARTED (WALKTHROUGH)

INTRODUCTION ..... 2-1
TEST PROGRAM (AND DIRECTORIES) ..... 2-1
THE DRIVER ROUTINE ..... 2-2
THE MAKEFILE ..... 2-2
THE INITIAL TEST SET ..... 2-5
GATHERING DATA ..... 2-6
THE DEFAULT REPORT ..... 2-7
THE SOURCE-REFERENCE REPORT ..... 2-9
AVOIDING MANUAL RE-VERIFICATION OF KNOWN-GOOD RESULTS ..... 2-10
USING IGNORE FILES ..... 2-14
LOGICALLY DEAD CODE ..... 2-15
THE FINAL REPORT - NET BENEFITS ..... 2-20

Chapter 3: DETAILS OF BBACPP

INTRODUCTION ..... 3-1
WHAT BBACPP DOES ..... 3-3
AMOUNT OF CODE ADDED ..... 3-3
EXAMPLE OF BBACPP'S OPERATION ON A SIMPLE SOURCE FILE ..... 3-4
EXPLANATION OF LINES IN FIGURE 3-3 ..... 3-6
HOW TO INVOKE BBACPP ..... 3-7
DETAILS OF THE -DBBA_OPTM<character> OPTION ..... 3-7
DETAILS OF THE -DBBA_OPTS OPTION ..... 3-8
DETAILS OF THE -DBBA_OPTp<lines> OPTION ..... 3-9
DETAILS OF THE -DBBA_OPTc<constname> OPTION ..... 3-10
DETAILS OF THE -DBBA_OPTd<dataname> OPTION ..... 3-10
DETAILS OF HOW BBACPP MODIFIES YOUR CODE, AND THE
=DBBA_OPTO=<options> OPTIONS ..... 3-11
No -DBBA_OPTO=<options> ..... 3-13
The -DBBA_OPTO=a Option ..... 3-15
The -DBBA_OPTO=d Option ..... 3-1[illegible]
The -DBBA_OPTO=e Option ..... 3-17

BEST AVAILABLE COPY

TABLE OF CONTENTS (Cont'd)

hapter 3: DETAILS OF BBACPP (Cont'd)

- The -DBBA_OPTO=i Option ..... 3-17
- The -DBBA_OPTO=s Option ..... 3-18
- The -DBBA_OPTO=f Option ..... 3-18
- The -DBBA_OPTO=w Option ..... 3-19
- The -DBBA_OPTO=A Option ..... 3-19
- HOW (AND WHY) TO COMBINE -DBBA_OPTO= OPTIONS ..... 3-19
- DETAILED EXPLANATION OF THE BBA_IGNORE PRAGMA ..... 3-21
  - Why Use Ignore Branches? ..... 3-23
  - bbarep And BBA_IGNOREd Branches ..... 3-23
- DETAILED EXPLANATION OF THE BBA_ALERT PRAGMA ..... 3-23
- WHY USE BBA_ALERT ..... 3-24
- RESERVED WORDS (SYMBOLS) ..... 3-24
- PITFALLS WITH BBACPP AND CC68020 ..... 3-24
  - cc68020 -h ..... 3-24
  - cc68020 -s ..... 3-25
  - cc68020 -u ..... 3-25
  - The ASM Pragma Of cc68020 ..... 3-25
  - Linking Array And Data Sections ..... 3-25 hapter 4: DETAILS OF BBAUNLOAD

- INTRODUCTION ..... 4-1
- WHAT BBAUNLOAD DOES ..... 4-1 hapter 5: DETAILS OF BBAREP

- INTRODUCTION ..... 5-1
- WHAT BBAREP DOES ..... 5-3
- DETAILS OF THE -S OPTION ..... 5-4
- DETAILS OF THE -s OPTION ..... 5-4
- DETAILS OF THE -l OPTION ..... 5-5
- EXPLANATION LINES FOR -l, -bN, AND -aN OPTIONS ..... 5-7
- DETAILS OF THE -bN OPTION ..... 5-9
- DETAILS OF THE -aN OPTION ..... 5-11
- DETAILS OF ACTIONS WHEN -bN AND -aN OPTIONS ARE COMBINED ..... 5-12
- DETAILS OF THE -p OPTION ..... 5-13
- DETAILS OF THE -i <ignorefile> OPTION ..... 5-13
  - How To Ignore All Functions In A File ..... 5-14
  - How To Ignore A Function ..... 5-14
  - How To Ignore All Branches Generated By A Macro ..... 5-14
  - How To Ignore All Branches Controlled By A Specific Statement ..... 5-16
- DETAILS OF THE -u <usefile> OPTION ..... 5-18
- DETAILS OF THE -d <file> OPTION ..... 5-19
- HOW TO OBTAIN SEPARATE REPORTS PER TEST SUITE, AND THEN COMBINE THEM ..... 5-19
  - The -DBBA_OPTO= Option ..... [illegible]

TABLE OF CONTENTS (Cont'd)

Chapter 5: DETAILS OF BBAREP (Cont'd)

DETAILS OF THE -e <tabs> OPTION .......... 5-20
DETAILS OF THE -o OPTION .......... 5-20
DETAILS OF THE -F OPTION .......... 5-21
DETAILS OF THE -D[fvt] OPTION .......... 5-21
The -Dt Option .......... 5-21
The -Df Option .......... 5-22
The -Dv Option .......... 5-23

Chapter 6: TIPS ON MORE EFFECTIVE TESTING

INTRODUCTION .......... 6-1
MAKEFILES (MAKE) .......... 6-1
Makefile Without Branch-Analysis Capability .......... 6-2
Makefile With Simple Branch-Analysis Capabilities .......... 6-3
Makefile With And Without Branch-Analysis Capabilities .......... 6-4
Automatic Makefile With And Without Branch-Analysis Capabilities .......... 6-6
Automatic And Efficient Makefile With And Without Branch-Analysis Capabilities .......... 6-8
AUTOMATIC REGRESSION TESTING .......... 6-10
DETAILED EXAMPLE - AUTOMATIC REGRESSION TESTING .......... 6-11
HP-UX SCRIPTS TO RUN HP64000-UX COMMAND FILES .......... 6-13
MAKEFILE TO RUN HP64000-UX COMMAND FILES .......... 6-14
ADVANTAGES OF AUTOMATIC REGRESSION TESTING .......... 6-15

Appendix A: ERROR AND WARNING MESSAGES

INTRODUCTION .......... A-1
BBACPP MESSAGES .......... A-1
BBAUNLOAD MESSAGES .......... A-5
BBAREP MESSAGES .......... A-8

Appendix B: FILES IN THE DEMO2/START DIRECTORY

INTRODUCTION .......... B-1
start/Makefile .......... B-2
start/Makefile.old .......... B-3
start/convert.c .......... B-4
start/driver.c .......... B-5
start/getkey.c .......... B-9
start/input .......... B-10
start/keymap.h .......... B-11
start/multibits.c .......... B-12

BEST AVAILABLE COPY

TABLE OF CONTENTS (Cont'd)

Appendix C: FILES IN THE DEMO2/FINISH DIRECTORY

INTRODUCTION ........ C-1
finish/Makefile ........ C-2
finish/convert.c ........ C-3
finish/driver.c ........ C-5
finish/getkey.c ........ C-8
finish/ignorelist ........ C-9
finish/input ........ C-9
finish/keymap.h ........ C-10
finish/multibits.c ........ C-11
finish/output ........ C-12
finish/output.good ........ C-12

Index ........ I-1

LIST OF ILLUSTRATIONS

Figure 1-1. Example Source Program Without BBA Analyzer Statements ........ 1-1
Figure 1-2. Example Source Program With BBA Analyzer Statements Added ........ 1-1

Figure 2-1. Initial Setup For Walkthrough ........ 2-1
Figure 2-2. Makefile Without Branch Analysis Additons ........ 2-3
Figure 2-3. Makefile With Branch Analysis Additions ........ 2-4
Figure 2-4. The First Test-Set Data ........ 2-5
Figure 2-5. Instructions List #1 ........ 2-6
Figure 2-6. "output" File Using First Test-Set Data ........ 2-7
Figure 2-7. Default Branch Analysis Output ........ 2-7
Figure 2-8. Instructions List #2 ........ 2-8
Figure 2-9. Default Branch Analysis Output #2 ........ 2-8
Figure 2-10. Source Reference Branch Analysis Output ........ 2-9
Figure 2-11. First Additions To "input" File ........ 2-10
Figure 2-12. Instructions #3 ........ 2-11
Figure 2-13. Display Of "diff" Output ........ 2-11
Figure 2-14. Summary Report After Supplementing The Test-Set ........ 2-12
Figure 2-15. Branch Analysis Source-Reference For bitpos ........ 2-13
Figure 2-16. The "ignorelist" File ........ 2-14
Figure 2-17. Branch Analysis Report Using An Ignore File ........ 2-14
Figure 2-18. Branch Analysis Source-Reference for keyconvert ........ 2-16
Figure 2-19. Additional Lines To "input" ........ 2-17
Figure 2-20. Instructions #4 ........ 2-17
Figure 2-21. Another Source-Reference Output ........ 2-18
Figure 2-22. Natural Way To Write Case 16's Code ........ 2-18
Figure 2-23. Instructions #5 ........ 2-19
Figure 2-24. Full Coverage For "keyconvert" ........ 2-19

BEST AVAILABLE COPY

LIST OF ILLUSTRATIONS (Cont'd)

Figure 2-25. Another Source-Reference Output ........ 2-20
Figure 2-26. Instructions #6 ........ 2-21
Figure 2-27. Frank's Last Report ........ 2-21

Figure 3-1. Quick Reference To "bbacpp" ........ 3-1
Figure 3-2. Simple C Source File ........ 3-4
Figure 3-3. Simple C Source File Tooled By bbacpp ........ 3-5
Figure 3-4. Sample Function For bbacpp -C -DBBA_OPTO= ........ 3-12
Figure 3-5. Results Of bbacpp -C ........ 3-14
Figure 3-6. Results Of bbacpp -C -DBBA_OPTO=a ........ 3-15
Figure 3-7. Results Of bbacpp -C -DBBA_OPTO=d ........ 3-16
Figure 3-8. Results Of bbacpp -C -DBBA_OPTO=e ........ 3-17
Figure 3-9. Results Of bbacpp -C -DBBA_OPTO=i ........ 3-17
Figure 3-10. Results Of bbacpp -C -DBBA_OPTO=s ........ 3-18
Figure 3-11. Results Of bbacpp -C -DBBA_OPTO=f ........ 3-18
Figure 3-12. Results Of bbacpp -C -DBBA_OPTO=w ........ 3-19
Figure 3-13. Ignoring Lines 21 Through 24 ........ 3-21
Figure 3-14. Ignoring The TRUE Condition ........ 3-22
Figure 3-15. Ignore Pragma Under If Statement ........ 3-22
Figure 3-16. Combining BBA_ALERT And BBA_IGNORE ........ 3-24

Figure 4-1. Quick Reference To "bbaunload" ........ 4-1
Figure 4-2. Example Of A Linker Command File ........ 4-2

Figure 5-1. Quick Reference To "bbarep" ........ 5-1
Figure 5-2. Example Of bbarep -S Output ........ 5-4
Figure 5-3. Example Of bbarep -s Output ........ 5-5
Figure 5-4. Example Of bbarep -l Output ........ 5-5
Figure 5-5. Sample Code Fragment To Explain The # Column ........ 5-6
Figure 5-6. Explanation Of 'inner case' And 'inner default' ........ 5-8
Figure 5-7. Example Code Fragment ........ 5-10
Figure 5-8. Example Report Using -p Option ........ 5-10
Figure 5-9. Macro Definitions ........ 5-15
Figure 5-10. Report Of bbadump.data Content ........ 5-22
Figure 5-11. Reports Of Multiple Runs, Different -DBBA_OPTO= Options ........ 5-22
Figure 5-12. Report On Files With Multiple Modification Dates ........ 5-23

Figure 6-1. Example Makefile Without Branch-Analysis Entries ........ 6-2
Figure 6-2. Example Makefile Configured For Branch Analysis ........ 6-4
Figure 6-3. Example Makefile That Makes Either Executable File Desired ........ 6-5
Figure 6-4. Example Makefile #4 ........ 6-7
Figure 6-5. Fully Automatic Makefile ........ [illegible]
Figure 6-6. Input Output Selected For Example Test ........ [illegible]
Figure 6-7. Command File To Run Example Test ........ [illegible]
Figure 6-8. HP-UX Script To Run The Example Command File ........ 6-13
Figure 6-9. Master-Test Shell Script Example ........ 6-14
Figure 6-10. Example Makefile To Run HP64000-UX Command Files ........ 6-15

BEST AVAILABLE COPY

NOTES

BEST AVAILABLE COPY

USING THIS MANUAL

GENERAL

The information provided in this manual is listed in the Manual Contents Guide, below:

MANUAL CONTENTS GUIDE

| Analysis Task | Manual Chapter |
|---|---|
| BRANCH-ANALYZER OVERVIEW | **Chapter 1: GENERAL INFORMATION** - discusses the general testing with the Basis Branch Analyzer. The tests made with the Basis Branch Analyzer determine the extent of execution of branches in your source program. |
| GETTING STARTED | **Chapter 2: GETTING STARTED (WALKTHROUGH)** - describes a sequence in which the Basis Branch Analyzer is used to develop a comprehensive test set to thoroughly test a software routine under development. |
| PREPARING THE FILE FOR TEST | **Chapter 3: DETAILS OF BBACPP** - shows you how to use the preprocessing routine to prepare your source files for testing with the Basis Branch Analyzer. Shows you how to use the options available to obtain specific information from your test runs. |
| GATHERING THE READABLE DATA | **Chapter 4: DETAILS OF BBAUNLOAD** - shows you how to use the command that builds the readable file of branch analysis information, after you have completed your tests. |
| GETTING REPORTS | **Chapter 5: DETAILS OF BBAREP** - shows you how to obtain reports of measurement results and use these to develop a comprehensive test suite during software development. |
| IMPROVING YOUR TESTS | **Chapter 6: TIPS ON MORE EFFECTIVE TESTING** - shows you how to create and use Makefiles. This chapter also discusses regression testing. Finally, this chapter shows you how to use command files to run Makefiles and perform automatic regression testing. |
| MESSAGES | **Appendix A: ERROR AND WARNING MESSAGES** - lists each error message that is specific to the use of the Basis Branch Analyzer. |
| SOURCE FILES | **Appendix B: FILES IN THE DEMO2 START DIRECTORY** - **Appendix C: FILES IN THE DEMO2 FINISH DIRECTORY** - provide listings of all the files used for demonstrations in the chapters of this manual. |

BEST AVAILABLE COPY

NOTES

BEST AVAILABLE COPY

Chapter 1

GENERAL INFORMATION

INTRODUCTION

The quality of your product is directly related to the extent that you tested your product. The Hewlett-Packard Basis Branch Analyzer (called BBA analyzer) is a software tool you can use to analyze your testing, create more complete test suites, and quantify your level of testing.

This chapter gives an overview of testing using the BBA analyzer. The tests made with the BBA analyzer determine the extent of execution of the branches in your source program. Branches are optional paths in a source program:

```
if (statement)
  statement 1           /* branch 1 */
else
  statement 2           /* branch 2 */
```

Figure 1-1. Example Source Program Without BBA Analyzer Statements

By doing branch analysis on the above example, you can obtain a record showing which (if either, or both) of the two possible branches were taken during any execution of the example program.

To do branch analysis testing, a BBA analyzer array must be defined and BBA analyzer statements must be inserted in your source code file(s) before the corresponding executable file is generated. These are inserted automatically by a BBA analyzer preprocessor routine (called bbacpp).

```
static short _bA_array[23];

if (statement)
  { _bA_array[1]=1;statement 1; }
else
  { _bA_array[2]=1;statement 2; }
```

Figure 1-2. Example Source Program With BBA Analyzer Statements Added

BEST AVAILABLE COPY

BBACPP

'he first step in a typical compiler sequence is to submit the source file to a "C" language ıreprocessor. This preprocessor performs tasks to get the file ready for parsing by the compiler, uch as "including" files specified by the "# include" commands, and the processing of "# ifdef" tatements. The BBA analyzer uses a special "C" language preprocessor (called bbacpp) that is ubstituted for the normal "C" language preprocessor. This special "bbacpp" preprocessor does ›verything that the normal preprocessor does, and additionally, it inserts array definitions and BBA ınalyzer statements in the source file to record which branches were executed in the file. Bbacpp ılso creates a "map file", which contains information necessary to map a specific branch with the ıssociated source file.

Vhen you run your executable file, the BBA analyzer statements write to the arrays to keep track ɔf which branches were executed.

BBAUNLOAD

Vhen you have run your program as many times as you want, you use an emulator command (caled "bbaunload") to gather the data into an appropriate file for interpretation. While still in your emulation session, you issue the "bbaunload" command. This unloads the data in the BBA analyzer arrays and stores it in a file called "bbadump.data". The "bbadump.data" file is formatted to be read by the routine that generates reports of branch analysis information ("bbarep").

BBAREP

Now you run "bbarep" from the shell. The bbarep command offers several options to generate reports based on the data contained in the "bbadump.data" file. You can use "bbarep" to derive a variety of report information and formats, depending on the kind of information you need to know about the execution of your program. For example, you can measure the percentage of your program's branches which were executed during your series of tests. You can identify all of the branches that were not executed branch that was not executed so that you can write additional tests to execute those branches. By this method, you can also identify unnecessary branches (if any) in your program.

BBAMERGE

The last BBA analyzer routine described in this chapter is "bbamerge". This routine can take large bbadump.data files and compress their information into smaller "bbadump.data" files. By using "bbamerge" you can reduce the overall execution time of a "bbarep" when you are running "bbarep" several times on a large "bbadump.data" file. You can also use bbamerge to recover some disk space when you are storing large "bbadump.data" files.

BEST AVAILABLE COPY

Chapter 2

GETTING STARTED (WALKTHROUGH)

INTRODUCTION

Frank Wiz is working on a routine. He is designing it to read two hardware registers that reflect which lines are down on a 5X5 grid of buttons, and map that information into a keycode reflecting which button was pressed. In this chapter, we will watch Frank create a test-set to thoroughly test that routine.

The files used in this chapter can be found in the /usr/hp64000/demo/bbacpp68020/demo2 directory. In that directory are several sub-directories (e.g., 'start' and 'mod1') which show the program and test-set data in several stages of development. To read a more complete description of the problem, see the introductory comments in the file /usr/hp64000/demo/bbacpp68020/demo2/start/getkey.c.

In this chapter you will see examples of:

1. A quick 'driver' program to test a function.
2. A Makefile to compile programs either for branch analysis or regular execution.
3. Different bbarep reports, showing when each is useful.
4. Use of BBA_IGNORE pragmas.
5. Extending test-set data based on coverage information.
6. How to avoid manual re-verification of known-good results.
7. How to use ignore files.

THE TEST PROGRAM (AND DIRECTORIES)

If you would like to follow along with this chapter, create an empty directory and copy all of the files from /usr/hp64000/demo/bbacpp68020/demo2/start to the directory. (If the files are not on your disk, the 'start' and 'finish' source files are shown in Appendices B and C at the end of this manual.) You can adapt the commands shown in figure 2-1 to copy the files to your directory.

```
cd   # go to your home directory
mkdir examples    # make an empty directory
cd examples       # go to the empty directory
cp /usr/hp64000/demo/bbacpp68020/demo2/start/* .      # copy all files
```

Figure 2-1. Initial Setup For Walkthrough

Note that each subdirectory of /usr/hp64000/demo/bbacpp68020/demo2 has all of the files instead of just the files that change from the 'previous' subdirectory. This is a convenience in case you

BEST AVAILABLE COPY

'ant to jump to the middle of this walkthrough. At the beginning of each section, a comment will :' you which files should be copied to your current directory, if you want to start at the beginning :' that section (if you do that, some warning messages may be different from those shown in this manual).

THE DRIVER ROUTINE

.e are using the files in the /usr/hp64000/demo/bbacpp68020/demo2/start directory).

..ometimes it is useful to have a 'driver' routine to help when testing a function. A 'driver' routine . a program that fetches input (in a friendly way!) from a test-set (file), sends that data to a func- -- (or functions) that you want to test, and then presents the results in such a way as to make it easy to decide whether or not the tested functions passed or failed the tests.

-e driver routine in this example is in the file named "driver.c".

: "driver.c" creates a main() routine so we can use the default linker command file. We will not :ave to bother with creating a new linker command file. (Remember, this is to be used for testing, -- the less time we have to spend here, the better. On the other hand, in many cases the ability to ..ickly tell if a test has passed or failed is important, so the test program may become quite :laborate - it just depends on the circumstances).

-is driver routine takes input from a file on the host system (via SIM I/O), and sends the results to another file (again via SIM I/O). This is a typical test method - it makes it easy to re-run the tests :ter when the program has been modified. You'll see this used later in this chapter.

-is driver opens a file named "input" and sends the output to a file named "output". Both "input" :-d "output" are files located in the directory where the emulator is running.

THE MAKEFILE

.e are still using the files in the /usr/hp64000/demo/bbacpp68020/demo2 start directory.)

-e HP-UX program "make" is an indispensable aid to program development. Properly used, it track changes made to source files and compile, assemble, and link only those files that need .e.g., if you have 500 source files and modify only three of them, only the three modified files will -e re-compiled and assembled, and then all 500 will be linked together to form your executable. -is is quite a timesaver over always having to compile all files, and it is a lot safer than trying to remember exactly which files you changed!)

:ake" uses a description file (typically named "Makefile") to determine which source files are -eeded to create the executable. When Frank started out (i.e., before he wanted to use the BBA :nalyzer to help him test his routine), his Makefile looked like the one shown in figure 2-2 (also cal- - "Makefile.old" in the directory /usr/hp64000/demo/bbacpp68020/demo2/start).

BEST AVAILABLE COPY

```
#   Example Makefile
#
#   target      action
#   runtest      creates test program (runtest)
#

CFLAGS= -ghw
CC=cc68020
SHELL=/bin/sh

#   Source files
CSRC = convert.c driver.c getkey.c multibits.c
#   Object files
COBJ = $(CSRC:.c=.o)

#   Main target.  Create a program to test the 'getkey.c' file.
runtest : $(COBJ)
   $(CC) $(CFLAGS) -o runtest $(COBJ)
```

Figure 2-2. Makefile Without Branch Analysis Additions

Note that the Makefile in figure 2-2 uses the 68020 compiler. If you are using a different compiler, simply change the "CC=" line to identify the compiler you are using. For example, if you want to use the 68000 compiler, change the "CC=" line as shown below:

```
CC=cc68000
```

Frank wants to be able to switch quickly between normal compilation and compilation with bba. He changes the Makefile so that it has two targets: runtest, and bbatest.

NOTE

Frank has chosen one of the fancier options for modifying his Makefile. The paragraph on MAKEFILES in Chapter 6 shows simpler changes he might have made.

BEST AVAILABLE COPY

Figure 2-3 shows Frank's new Makefile (which is the file "Makefile"). This Makefile will automatically remember if the programs were last compiled with or without BBA analyzer statements, so it is totally automatic (which Frank thinks is a great idea!)

```
#   Example Makefile
#
#   target      action
#   runtest      creates test program (runtest) w/o bba
#   bbatest      creates test program (bbatest) w/bba
#
#   NOTE: the file .NORMAL is present if the last compile did not use bba
#   the file .BBA is present if the last compile did use bba

BBACMD= -b
BBAOPT=  -DBBA_OPTO=A
CFLAGS= -gwh
CC=cc68020
SHELL=/bin/sh

#   Source files
CSRC = convert.c driver.c getkey.c multibits.c
#   Object files
COBJ = $(CSRC:.c=.o)

#   Normal make
#   First check to see if the last time we compiled we
#   used bba.  If so, delete the object files and remind
#   ourselves that we are compiling without bba.
runtest ::
   if [ ! -f .NORMAL ] ; then rm $(COBJ) .BBA; touch .NORMAL; fi
#   Now compile any out-of-date object files
runtest :: $(COBJ)
   # link the object files into the file 'runtest'
   $(CC) $(CFLAGS) -o runtest $(COBJ)

#   Bba make
#   If last time we compiled without bba remove all .o files;
#   then compile any out-of-date files.
bbatest ::
   if [ ! -f .BBA ] ; then rm $(COBJ) .NORMAL; touch .BBA; fi
   $(MAKE) CFLAGS="$(CFLAGS) $(BBACMD) $(BBAOPT)" runobjs

bbatest :: $(COBJ)
   $(CC) $(CFLAGS) -o bbatest $(COBJ)

runobjs :   $(COBJ)
   touch runobjs
```

Figure 2-3. Makefile With Branch Analysis Additions

BEST AVAILABLE COPY

THE INITIAL TEST SET (We are still using the files in /usr/hp64000/demo/bbacpp68020/demo2/start for this section.)

For Frank's first attempt at a test-set, he decides to try the equivalent of hitting all of the buttons in the first column, and all of the buttons on the first row. (He knows this will cause the function to have been run with all bits set in both "horiz" and "vert".) Because our driver program reads the file named "input", this is shown as the file "input" in the "start" directory:

```
 1,1
 2,1
 4,1
 8,1
16,1
 1,2
 1,4
 1,8
 1,16
```

Figure 2-4. The First Test-Set Data

BEST AVAILABLE COPY

GATHERING DATA (We are still using the files in /usr/hp64000/demo/bbacpp68020/demo2/start for this section.)

To gather the branch analysis data for this first set of test data, Frank does the following: (if you are following along, you should also do the numbered instructions below. Don't be alarmed if some of the "rm" commands invoke messages about non-existent files; it just means we attempted to remove a file that wasn't there, as a precaution).

1. Make the absolute file that is tooled for branch analysis:
   ```
   make bbatest
   ```

2. Delete any old data, using the command:
   ```
   rm bbadump.data
   ```

3. Enter the emulator. This assumes the monitor you linked in supports simulated I/O, and that the program can be loaded into the emulator without problems (i.e., the memory map in the emulator is correct):
   ```
   cp /usr/hp64000/env/hp64410/ioconfig.EA .
      load configuration ioconfig
   ```

4. If Step 3 above does not work, use the following:
   ```
   cp /usr/hp64000/env/hp64416/ioconfig.EA .
      load configuration ioconfig
   ```

5. Load the program into memory using the command:
   ```
   load memory bbatest
   ```

6. Run the program using the command:
   ```
   run from transfer_address
   ```

7. When the program finishes, Frank unloads the branch data using the command:
   ```
   bbaunload bbatest
   ```

8. Fork a sub-shell from the emulator, using the command:
   ```
   !
   ```

Figure 2-5. Instructions List #1

Then Mr. Frank G. W. looks at the output file which was created when the testing program ran. He wants to see if the output is correct. The output file looks like figure 2-6.

BEST AVAILABLE COPY

```
( 1,  1) -> 10
( 2,  1) -> 11
( 4,  1) -> 12
( 8,  1) -> 13
(16,  1) -> 14
( 1,  2) -> 15
( 1,  4) -> 1
( 1,  8) -> 6
( 1, 16) -> 20
```

Figure 2-6. "output" File Using First Test-Set Data

As Frank looks through the data, he sees that, yes, "1,1" should indeed return a "10" (because "10" is the keycode for the "a" key, as shown in keymap.h), and that "2,1" returns keycode "11" correctly, and so on.

THE DEFAULT REPORT (We are still using the files in /usr/hp64000/demo/bbacpp68020/demo2/start for this section.)

Reassured that the function took the test data correctly, Frank now runs the "bbarep" program. He wants to focus on functions that are only lightly tested, so he selects the default output (shown in figure 2-7).

```
bbarep       # Frank's command

_hit___total____%____IA____function____________file ______________________
   8 /    12 ( 66.67)    keyconvert                 convert.c
   6 /     9 ( 66.67)    bitpos                     convert.c
   0 /     1 (  0.00)    error                      driver.c
   3 /     5 ( 60.00)    getkeyvalue                getkey.c
   5 /     7 ( 71.43)    twobits                    multibits.c
22 out of 34 retained branches executed (64.71%)
[ 23 branches were ignored ]
```

Figure 2-7. Default Branch Analysis Output

The first thing that Frank notices is that a function from his driver program (error) was included in the report. Frank doesn't care about testing his driver program. The appearance of this function annoys him so he goes into his driver.c program and adds a BBA_IGNORE pragma in error so it won't show up in the report anymore. (He had remembered to do that for his other routines, but forgot it for this one.)

If you are following along, this change is reflected in the driver.c file found in the directory /usr/hp64000/demo/bbacpp68020/demo2/mod1. Copy the file "driver.c" from that directory to your current directory by using the following command:

```
cp /usr/hp64000/demo/bbacpp68020/demo2/mod1/driver.c .
```

'hen Frank reruns his tests as shown in figure 2-8.

1. Make a new version of the program tooled for branch analysis:
   `make bbatest`

2. Return to the emulator. Since we had entered a subshell in the previous set, we can go back to the emulator by exiting this subshell. Use a command like:
   `exit`

3. Now that we are in the emulator, load the new absolute file:
   `load memory bbatest`

4. Then run the test and unload the data as we did before:
   `run from transfer_address`
   `bbaunload bbatest`

5. Enter a subshell with the command:
   `!`

6. Get another default report:
   `bbarep`

Figure 2-8. Instructions List #2

'he output of the bbarep command is shown in figure 2-9.

```
bbarep: warning: skipping data from older version of file driver.c
date of skipped file is 10/05/1987 12:46
_hit___total____%____[A____function____________file ______________
   8 /    12 ( 66.67)   keyconvert               convert.c
   6 /     9 ( 66.67)   bitpos                   convert.c
   3 /     5 ( 60.00)   getkeyvalue              getkev.c
   5 /     7 ( 71.43)   twobits                  multibits.c
22 out of 33 retained branches executed (66.67%)
[ 24 branches were ignored ]
```

Figure 2-9. Default Branch Analysis Output #2

)h yes. Frank remembers, he forgot to remove the old branch analysis data (bbadump.data) before ie ran the new version. Therefore, the report generator warned him that there was some data rom an old version of the driver. No problem - Frank doesn't care about data from driver.c. nyway.

BEST AVAILABLE COPY

THE SOURCE-REFERENCE REPORT (Now we are using the files from /usr/hp64000/demo/bbacpp68020/demo2/mod1)

The next item that catches Frank's eye is that the function 'getkeyvalue' has a rather low coverage (60%). Frank decides to do a better job of testing 'getkeyvalue'. To find out which branches were not hit during the test, Frank gets a source-reference listing of getkeyvalue. Frank likes to see four lines before the control statement, and four lines after the first non-executed statement, so he uses the following command and gets the output shown in figure 2-10.

```
bbarep -a4 -b4 getkeyvalue      # Frank's command

bbarep: warning: skipping data from older version of file driver.c
date of skipped file is 10/05/1987 09:05

getkeyvalue   getkey.c
 (1) 'then' part of 'if' was never executed
 49    {
 50            int keycode;            /* keycode we will return */
 51
 52            /* First test: if both horiz and vert are 0, just return KEY_NONE */
 53            if ((horiz == 0) && (vert == 0))
 54            {
 55 ->                 return(KEY_NONE);
 56            }
 57
 58            /* Second: if more than one key pressed, return an error */
 59            if ((twobits(horiz) != 0) || (twobits(vert) != 0))

 (1) 'then' part of 'if' was never executed
 55                    return(KEY_NONE);
 56            }
 57
 58            /* Second: if more than one key pressed, return an error */
 59            if ((twobits(horiz) != 0) || (twobits(vert) != 0))
 60 ->                 return(KEY_NONE);
 61
 62            /* Do the conversion! */
 63            keycode = keyconvert(horiz, vert);
 64

3 out of 5 branches executed (60.00%)
```

Figure 2-10. Source Reference Branch Analysis Output

"Well", says Frank, "I guess I should test the conditions of no bits set in either horiz or vert, as well as the case of multiple bits set." He modifies the file "input" by adding the lines:

BEST AVAILABLE COPY

```
0,0
3,1
2,7
```

Figure 2-11. First Additions To "Input" File

This is reflected in the file /usr/hp64000/demo/bbacpp68020/demo2/mod2/input; to get it use a command like:

```
cp /usr/hp64000/demo/bbacpp68020/demo2/mod2/input .
```

"Wait a minute!", Frank says. "If I rerun the test with the new data, it'll re-write the file 'output', and I'll have to re-verify the first nine sets of data! Isn't there some way around that?"

AVOIDING MANUAL RE-VERIFICATION OF KNOWN-GOOD RESULTS (We are using the files in /usr/hp64000/demo/bbacpp68020/demo2/mod2.)

When a test is run on a set of test data, the output is checked (manually) to make sure it is correct (i.e., the test-set "passed"). Wouldn't it be nice to never have to manually check that test-set's output again? After all, if you have a lot of output to check, you might easily miss a significant error.

HP-UX helps again. There is a program (called 'diff') which will show differences between two ASCII files.

Frank uses the following command to copy the current "output" file (which contains data that he knows is OK) to a file he calls "output.good":

```
cp output output.good
```

Then Frank re-runs the tests by using the sequence of instructions in figure 2-12.

BEST AVAILABLE COPY

1. Remove the current dump data file (to avoid those nasty warning messages):
   `rm bbadump.data`
2. Return to the emulator:
   `exit`
3. Execute the test with the new data (no need to load the program; it was loaded in previous steps):
   ```
   run from transfer_address
   bbaunload bbatest
   ```
4. Enter another subshell with the command:
   `!`

Figure 2-12. Instructions #3

Now Frank needs to see if the output was good. He uses the 'diff' command so that any differences will leap out at him. The command is shown below. Its output is shown in figure 2-13.

```
diff output.good output        # Frank's command
```

```
9a10,12
> ( 0,  0) -> -1
> ( 3,  1) -> -1
> ( 2,  7) -> -1
```

Figure 2-13. Display Of "diff" Output

Figure 2-13 shows that the only differences found by "diff" were that lines 10 thru 12 in "output" were added after line 9 in "output.good". That means that the first nine lines - the previous output that Frank had manually verified - didn't change. There is no need to even look at the first nine sets of input that was passed to the function under test. (Refer to the manual page on "diff" in your HP-UX system for more information on how to read "diff" outputs. Use the command "man diff" to do this.)

At any rate, the additional tests show good news for Frank: "0,0" should, indeed, return a "-1" (because -1 is the keycode for "KEY_NONE"), and the same goes for "3,1" and "2,7", because they both show multiple keys being down.

Because this output is "good", Frank copies it to output.good so that he doesn't have to check it over again, later.

```
cp output output.good
```

BEST AVAILABLE COPY

Now Frank wants to get a report that shows his new test coverage so he runs the default bbarep command.

The output of the bbarep command is shown in figure 2-14.

```
_hit__total____%____IA___function___________file _________________________
   8 /    12 ( 66.67)   keyconvert              convert.c
   6 /     9 ( 66.67)   bitpos                  convert.c
   5 /     5 (100.00)   getkeyvalue             getkey.c
   6 /     7 ( 85.71)   twobits                 multibits.c
25 out of 33 retained branches executed (75.76%)
[ 24 branches were ignored ]
```

Figure 2-14. Summary Report After Supplementing The Test-Set

Great! It gets 100% coverage of the `getkeyvalue` routine. Now to find the untested parts of another low-coverage routine, `bitpos`. Frank issues another bbarep command:

```
bbarep -a4 -b4 bitpos      # Frank's command
```

BEST AVAILABLE COPY

```
bitpos   convert.c
 (1) 'case' code was never executed
 71                     return(2);
 72             case 8 :
 73                     return(3);
 74             case 16 :
 75                     return(4);
 76             case 32 :
 77 ->                  return(5);
 78             case 64 :
 79                     return(6);
 80             case 128 :
 81                     return(7);

 (1) 'case' code was never executed
 73                     return(3);
 74             case 16 :
 75                     return(4);
 76             case 32 :
 77                     return(5);
 78             case 64 :
 79 ->                  return(6);
 80             case 128 :
 81                     return(7);
 82             }
 83     }

 (1) 'case' code was never executed
 75                     return(4);
 76             case 32 :
 77                     return(5);
 78             case 64 :
 79                     return(6);
 80             case 128 :
 81 ->                  return(7);
 82             }
 83     }
(eof)

 6 out of 9 branches executed (66.67%)
```

Figure 2-15. Branch Analysis Source-Reference For bitpos

BEST AVAILABLE COPY

USING IGNORE FILES (At this point, we are using the files in /usr/hp64000/demo/bbacpp68020/demo2/mod2.)

"Ah ha!", Frank exclaims. "I can never get to cases 32, 64, and 128 (for legal input!) because only bits 0 thru 4 are legal". Upon investigation, however, he discovers that Shirley (another programmer in his group) would like to use his routine to do the same task, but she needs all eight bits to be returned. To save memory space, Frank and Shirley decide to make the routine work for both applications. However, for his comfort, Frank wants to ignore the branches he won't need. He asks Shirley if he can place "BBA_IGNORE" pragmas for those cases.

"Surely you jest!", she replies. "I'll need to test those, and if you put BBA_IGNORE pragmas in those cases, I won't ever see whether or not they are executed!"

Frank creates the file "ignorelist" (which is already in the mod2 directory). It looks like figure 2-16.

```
case 32:
case 64:
case 128:
```

Figure 2-16. The "Ignorelist" File

If you do not have the 'ignorelist' file in your directory, copy it to your current directory by using the following command:

```
cp /usr/hp64000/demo/bbacpp68020/demo2/mod2/ignorelist .
```

Here is Frank's new (summary) bbarep command. Its output is shown in figure 2-17.

```
bbarep -i ignorelist        # Frank's command


_hit___total____%____IA____function____________file ______________________________
   8 /    12 ( 66.67)   keyconvert                convert.c
   6 /     6 (100.00) * bitpos                    convert.c
   5 /     5 (100.00)   getkeyvalue               getkey.c
   6 /     7 ( 85.71)   twobits                   multibits.c
25 out of 30 retained branches executed (83.33%)
[ 27 branches were ignored ]

NOTE:
A '*' in the 'I' column means this function had one or more
   branches that were ignored
```

Figure 2-17. Branch Analysis Report Using An Ignore File

Frank notes that bitpos now has 100% coverage, but the report notified him that some branches in the routine were ignored.

LOGICALLY DEAD CODE (We are still using the files in /usr/hp64000/demo/bbacpp68020/demo2/mod2.)

Frank next looks at the unexecuted branches in keyconvert. He uses the following command:

```
bbarep -a4 -b4 keyconvert      # Frank typed this
```

BEST AVAILABLE COPY

```
keyconvert   convert.c
 (1) 'then' part of 'if' was never executed
32                  keycode = bitpos(horiz) + KEY_1;
               break;
34             case 8: /* pressing fourth column of keys */
35                  keycode = bitpos(horiz) + KEY_6;
36                  if (keycode > KEY_9)          /* special case for 0 key */
37 ->                    keycode = KEY_0;
38                  break;
39             case 16:        /* pressing fifth column of keys */
40                  keycode = KEY_RUN;
41                  do

 (1) conditional of 'if' was never FALSE (no 'else' statement) [control lines]
40                  keycode = KEY_RUN;
41                  do
42                  {
43                       /* If lowest bit is set, return its keycode */
44 ->                    if (horiz == 1)
45                            return(keycode);
46                       horiz = horiz >> 1;
47                       keycode++;
48                  }

 (1) conditional of 'do while' was never TRUE [control lines]
45                            return(keycode);
46                       horiz = horiz >> 1;
47                       keycode++;
48                  }
49 ->               while (horiz != 0);
50             }
51
52             return(keycode);
53    }

 (1) conditional of 'do while' was never FALSE [control lines]
45                            return(keycode);
46                       horiz = horiz >> 1;
47                       keycode++;
48                  }
49 ->               while (horiz != 0);
50             }
51
52             return(keycode);
53    }

8 out of 12 branches executed (66.67%)
```

Figure 2-18. Branch Analysis Source-Reference For keyconvert

"Hmm," Frank says. "The first one is pretty easy. I'll just add the equivalent of pressing the 0 key (16 8). But how can the conditional of the 'do while' be both 'never TRUE' and 'ne[illegible]

BEST AVAILABLE COPY

FALSE'?!?! Oh, I see. I always executed the 'return' statement on line 45 (and therefore I never got to the conditional of the 'do while'). Maybe I'd better add some cases to exercise the while conditional." After some thinking, Frank adds the lines shown in figure 2-19 to the file "input".

```
16,8
2, 16
16, 16
```

Figure 2-19. Additional Lines To "input"

To get this new version of the file "input", use the command:

```
cp usr/hp64000/demo/bbacpp68020/demo2/mod3/input .
```

Now Frank runs the test program again with the new data. The steps he follows are shown in figure 2-20.

1. Remove the current dump data (it's a good habit):
   ```
   rm bbadump.data
   ```

2. Return to the emulator:
   ```
   exit
   ```

3. Execute the test with the new data (There's no need to load the program. It was loaded in the previous steps.):
   ```
   run from transfer_address
   bbaunload bbatest
   ```

4. Enter another subshell with the command:
   ```
   !
   ```

5. Verify that the output file is correct by using the command:
   ```
   diff output.good output
   ```

6. The above command automatically checks the "known good" (i.e. previously verified) data, and Frank manually checks the additional values.

7. Now copy the output file to "output.good" so you can preserve the new "known good" data:
   ```
   cp output output.good
   ```

8. Get another detailed report for keyconvert:
   ```
   bbarep -a4 -b4 keyconvert
   ```

Figure 2-20. Instructions #4

BEST AVAILABLE COPY

```
keyconvert   convert.c
 (1) conditional of 'do while' was never FALSE [control lines]
 45                                    return(keycode);
 46                            horiz = horiz >> 1;
 47                            keycode++;
 48                    }
 49 ->                 while (horiz != 0);
 50            }
 51
 52            return(keycode);
 53    }

11 out of 12 branches executed (91.67%)
```

Figure 2-21. Another Source-Reference Output

After some reflection, Frank realizes that the while loop will only become FALSE if the value of horiz either (A) has more than one bit set, or (B) is zero on entry to `keyconvert`. Neither one of these cases are legal input, but Frank wonders if these cases are dealt with appropriately? (The problem definition states that for non-legal input, the program should return KEY_NONE. Frank wonders if it does that correctly.) Looking at the routine `getkeyvalue` (in getkey.c), Frank sees that both cases are trapped prior to calling `keyconvert`.

Therefore, the test "`while (horiz != 0)`" doesn't make a whole lot of sense; `horiz` can never be 0!

To tell the truth, this loop was only added to point out that you can discover "logically dead" code by using the BBA analyzer. Frank would not have written the code this way (Frank made us put that disclaimer in the manual). The natural way to have written `case 16` in `keyconvert` is shown in figure 2-22.

```
case 16: /* pressing fifth column of keys */
   keycode = bitpos(horiz) + KEY_RUN;
   break;
```

Figure 2-22. Natural Way To Write Case 16's Code

Frank now changes convert.c to the way shown in figure 2-22. To see Frank's rewrite, enter the following command:

```
cp /usr/hp64000/demo/bbacpp68020/demo2/mod4/convert.c .
```

Frank now recompiles, runs the tests, and gets yet another report by using the steps shown in figure 2-23.

BEST AVAILABLE COPY

1. Make the new version of the test:
   `make bbatest`

2. Remove the current dump data (it's a good habit to develop):
   `rm bbadump.data`

3. Return to the emulator:
   `exit`

4. Load in the new executable:
   `load memory bbatest`

5. Execute the test with the new data:
   ```
   run from transfer_address
   bbaunload bbatest
   ```

6. Enter another subshell with the command:
   `!`

7. Get another summary report, using the ignore file:
   `bbarep -i ignorelist`

Figure 2-23. Instructions #5

```
_hit___total____%____IA____function___________file __________________________
   8 /    8 (100.00)   keyconvert               convert.c
   6 /    6 (100.00) * bitpos                   convert.c
   5 /    5 (100.00)   getkeyvalue              getkey.c
   6 /    7 ( 85.71)   twobits                  multibits.c
25 out of 26 retained branches executed (96.15%)
[ 27 branches were ignored ]

NOTE:
A '*' in the 'I' column means this function had one or more
   branches that were ignored
```

Figure 2-24. Full Coverage For "keyconvert"

Continuing to track down the unexecuted branches, Frank issues the command:

BEST AVAILABLE COPY

```
bbarep -i ignorelist -a4 -b4 multibits.c


twobits   multibits.c
 (1) body of 'while' loop was never skipped
 20
 21              /* This loop continues only while there is at least
 22                      one more bit set in bitmap
 23              */
 24              while (bitmap != 0)
 25              {
 26 ->                   if ((bitmap & 1) != 0)
 27                              numbits++;  /* increment count of bits that are set */
 28                      bitmap = bitmap >> 1;    /* test next bit */
 29              }
 30

6 out of 7 branches executed (85.71%)
```

Figure 2-25. Another Source-Reference Output

(Note: Frank didn't need the `-i ignorelist` in his last command because the ignorelist file doesn't contain any code pertaining to the file `multibits.c`. On the other hand, using the "ignorelist" file didn't hurt him, either.)

As Frank looks at his source-reference output, he sees that the while loop is only skipped when the routine is entered and `bitmap` is 0. The routine `getkeyvalue` checks for 0 values before this is called. It might make more sense to change this to a "do-while" loop instead of a "while" loop.

Remember, Shirley wants to use this routine, too. She wants the function's documentation to show that it will return a '0' only if the passed parameter has exactly one bit set (she thinks that the documentation implies that it returns a '0' if 1 or 0 bits are set).

Therefore, Frank changes the documentation and adds "while (bitmap != 0)" to the "ignorelist" file. These changes are shown in the following files. Copy them to your directory using the following commands:

```
cp /usr/hp64000/demo/bbacpp68020/demo2/finish/multibits.c .
cp /usr/hp64000/demo/bbacpp68020/demo2/finish/ignorelist .
```

THE FINAL REPORT - NET BENEFITS (We are now using the files in the /usr/hp64000/demo/bbacpp68020/demo2/finish directory.)

Frank now recompiles, runs the tests, and gets the last report by using the steps shown in figure 2-26.

BEST AVAILABLE COPY

```
bbarep -i ignorelist -a4 -b4 multibits.c


twobits   multibits.c
 (1) body of 'while' loop was never skipped
 20
 21           /* This loop continues only while there is at least
 22                   one more bit set in bitmap
 23           */
 24           while (bitmap != 0)
 25           {
 26 ->                if ((bitmap & 1) != 0)
 27                           numbits++;  /* Increment count of bits that are set */
 28                   bitmap = bitmap >> 1;    /* test next bit */
 29           }
 30

6 out of 7 branches executed (85.71%)
```

Figure 2-25. Another Source-Reference Output

(Note: Frank didn't need the `-i ignorelist` in his last command because the ignorelist file doesn't contain any code pertaining to the file `multibits.c`. On the other hand, using the "ignorelist" file didn't hurt him, either.)

As Frank looks at his source-reference output, he sees that the while loop is only skipped when the routine is entered and `bitmap` is 0. The routine `getkeyvalue` checks for 0 values before this is called. It might make more sense to change this to a "do-while" loop instead of a "while" loop.

Remember, Shirley wants to use this routine, too. She wants the function's documentation to show that it will return a '0' only if the passed parameter has exactly one bit set (she thinks that the documentation implies that it returns a '0' if 1 or 0 bits are set).

Therefore, Frank changes the documentation and adds "while (bitmap != 0)" to the "ignorelist" file. These changes are shown in the following files. Copy them to your directory using the following commands:

```
cp /usr/hp64000/demo/bbacpp68020/demo2/finish/multibits.c .
cp /usr/hp64000/demo/bbacpp68020/demo2/finish/ignorelist .
```

THE FINAL REPORT - NET BENEFITS (We are now using the files in the /usr/hp64000/demo/bbacpp68020/demo2/finish directory.)

Frank now recompiles, runs the tests, and gets the last report by using the steps shown in figure 2-26.

BEST AVAILABLE COPY

1. Recompile:
```
make bbatest
```
2. Remove the current dump data:
```
rm bbadump.data
```
3. Return to the emulator:
```
exit
```
4. Load and execute the new test program:
```
load memory bbatest
run from transfer_address
bbaunload bbatest
```
5. Enter another subshell with the command:
```
!
```
6. Get the report:
```
bbarep -i ignorelist
```

Figure 2-26. Instructions #6

```
_hit___total____%____IA____function___________file ___________________________
   8 /    8 (100.00)   keyconvert              convert.c
   6 /    6 (100.00) * bitpos                  convert.c
   5 /    5 (100.00)   getkeyvalue             getkey.c
   3 /    3 (100.00) * twobits                 multibits.c
22 out of 22 retained branches executed (100.00%)
[ 31 branches were ignored ]

NOTE:
A '*' in the 'I' column means this function had one or more
   branches that were ignored
```

Figure 2-27. Frank's Last Report

Frankly, this was a lot of work. Let's see what Frank has gained:

1. Frank now has high confidence that his routine works.
2. If Frank needs to change the routine, he does not need to create his tests all over again. He can use his old tests and only write new tests.
3. When Frank changes a routine in the future, he does not need to be nervous that he may "break" something. He can just run these tests over again and still have high confidence that everything is working.
4. If Shirley has to take over maintenance of these routines, she is assured that these routines have been well tested. She won't be nervous about having to support them.
5. Both Frank and Shirley can share code, knowing that if any changes are made to it, they can run the old tests and discover any unanticipated side effects (i.e., somebody adds some functionality, but their "addition" changes some output that it shouldn't have changed. Rerunning these tests will quickly locate the problems).

BEST AVAILABLE COPY

NOTES

BEST AVAILABLE COPY

Chapter 3

DETAILS OF BBACPP

INTRODUCTION

Chapter 1 briefly explained the purpose of bbacpp. This chapter will explain how to invoke bbacpp, the options available to bbacpp, the effect bbacpp has on your code, and how and why to insert BBA_IGNORE and BBA_ALERT pragmas into your source code.

```
                    BBACPP QUICK REFERENCE

Bbacpp is invoked by using the "-b" command-line option to
"cc68020".

In addition to the options that cpp68020 will accept (e.g., -P,
-C, -I<directory>, etc), bbacpp68020 accepts:

 -DBBA_OPTM<character>
     Use <character> as the suffix for the mapping file (instead
     of the default M).

  -DBBA_OPTp<lines>
     Increase the amount of "push-back-line" memory (see below).

  -DBBA_OPTS
     Do not generate a mapping file.

  -DBBA_OPTc<constname>
     Place the constant data that bbacpp creates in a CONST
     SECTION named <constname>.  The default is to place the
     constant data into the CONST SECTION that is valid at the
     end of the file.

  -DBBA_OPTd<dataname>
     Place the array that bbacpp creates in a DATA SECTION named
     <dataname>.  The default is to place the array into
     the DATA SECTION that is valid at the beginning of the file.
```

Figure 3-1. Quick Reference To "bbacpp"

BEST AVAILABLE COPY

```
-DBBA_OPTO=<insert_options>
   <insert_options>:

   A - turn on all of the following options.

   a - insert code to tell if the true and false expressions
       of a conditional assignment statement were ever
       executed.

   d - insert code to tell if the conditional of a 'do'
       statement was evaluated as true.

   e - insert code to tell if empty 'case' statements
       (i.e., those with no statements or only a "break"
       statement) were ever executed.

   i - insert code to tell if an 'if' statement that has no
       'else' was never evaluated as false.

   s - insert a 'default' statement for 'switch' statements
       that do not have a 'default'.

   f - insert code to tell if the third expression in a 'for
       statement was ever executed.

   w - insert code to tell if the body of a 'while' statement
       was never skipped.


Examples:

   cc68020 -hb jello.c chocolate.c
   cc68020 -hb -DBBA_OPTMq alpha.c
   cc68020 -hb -DBBA_OPTp98 biggie.c
   cc68020 -hb -DBBA_OPTS dontcare.c
   cc68020 -hb -DBBA_OPTO=A complex.c
   cc68020 -hb -DBBA_OPTO=ade -DBBA_OPTM1 big1.c big2.c big3.c
   -DBBA_OPTM2 big1.c big2.c big3.c
```

Figure 3-1. Quick Reference To "bbacpp" (Cont'd)

WHAT BBACPP DOES

Bbacpp prepares a C source file to have branch analysis data generated when it is executed. It also creates a "map file" that is used by bbarep to associate branches with the source statements that created the branches.

To do this, bbacpp performs the following:

1. Creates an array with one entry for each branch. Each entry in the array is initialized to 0, which is the default for the C language.
2. For each branch that is detected:
   a. An array entry is assigned to the branch.
   b. An assignment statement is inserted as the first executable statement within the branch. (The assignment statement sets the associated array entry to 1, showing that it was executed. Also, the assignment statement is inserted on the same line as the first executable statement so that debuggers can report the correct line numbers of the source statements.)
   c. An entry in the map file is created for that array entry. The entry specifies what type of branch it was (e.g., an if statement or a for-loop).
3. At the end of the source file, an "environment" data area is created. This data prevents mismatching of mapping files with data, and allows changes in the source file to be monitored. The data area specifies (among other things):
   a. Which -DBBA_OPTO= options were used.
   b. The number of branches detected in this file.
   c. The suffix of the map file.
   d. The date that the source file was last modified.

The bbaunload routine will use a symbol database to locate the array and the environment data area, then use the emulator to download the values in the array and data area to your host's disk. The symbol database is created automatically when you load your program into the emulator. It can be created manually by using the HP64000-UX command edbuild.

AMOUNT OF CODE ADDED

The "environment" data (step 3 in the paragraph above) adds 20 bytes to the const section of your absolute file for the 68020 compiler.

The "per-branch" data (step 2 in the paragraph above) adds between five and eight bytes in your code segment (depending on optimization and register usage), plus one byte in the data section (the array, itself).

Experiments have shown total code expansion anywhere between 1% and 100%, depending on coding practices.

BEST AVAILABLE COPY

EXAMPLE OF BBACPP'S OPERATION ON A SIMPLE SOURCE FILE

Figure 3-2 shows a simple C source file. Figure 3-3 shows that same source file after it has been tooled by bbacpp. Line numbers have been inserted on the left-hand side for use in the discussion that follows.

```
1   extern int goodbye;
2
3   yousay(hello)
4   int hello;
5   {
6       if (hello == goodbye)
7           goodbye = hello + 3;
8       else
9           goodbye = hello - 5;
10  }
```

Figure 3-2. Simple C Source File

BEST AVAILABLE COPY

```
# 1 "t.c"
#pragma SECTION DATA=bbadata CONST=bbaconst
static unsigned char _bA_array[3        ] = {0};
#pragma SECTION UNDO
# 1 "t.c"
extern int goodbye;

yousay(hello)
int hello;
{
   _bA_array[0]=1;if (hello == goodbye)
      {_bA_array[1]=1;goodbye = hello + 3;}
   else
      {_bA_array[2]=1;goodbye = hello - 5;}
}
#pragma SECTION DATA=bbadata CONST=bbaconst
struct _bA_probe_struct_    {
      unsigned char insertprotocol;
      char mapsuffix;
      char sourcemodtime[9];
      unsigned char options[4];
      int numentries;
   };
const struct _bA_probe_struct_ _bA_t_nam_crs_abb_ph_ =
{   6,
   'M',
   {'B', 'w', 'x', ''', 'q', 'j', '^', 'v', '''},
   {0xa7, 0x05, 0x02, 0x00},
   3,
};
#pragma SECTION UNDO
```

Figure 3-3. Simple C Source File Tooled By bbacpp

BEST AVAILABLE COPY

EXPLANATION OF LINES IN FIGURE 3-3

Lines 1 and 5 are lines that C preprocessors generate for the compiler. They identify the file and line where the text originated (so that include files can be tracked correctly).

Line 2 sets the SECTION for the branch data array to be in section bbadata. For this to have happened, the -DBBA_OPTdbbadata option was used with bbacpp. Refer to the paragraph that discusses the details of the -DBBA_OPTd<dataname> OPTION appearing later in this chapter, for more information. If no -DBBA_OPTd<dataname> option had been used, this line would not be present.

Line 3 is the declaration of the array where the branch data is kept. Note that the bizarre name (_bA_array) is unlikely to conflict with variables you use. In fact, all variables that bbacpp creates begin with the characters _bA_.

Line 4 sets the SECTION information back to what it was prior to line 2. If no -DBBA_OPTd<dataname> option had been used, this line would not be present.

Lines 6 thru 10 are exact copies of lines 1 thru 5 in the source file.

Line 11 contains the first executable statement of the function yousay. Therefore, an array assignment expression is inserted. The array entry for this function is 0, something you don't care about but bbarep does.

Line 12 shows that another array assignment was generated. Note that bbacpp has inserted "(" and ")" correctly so that no logical change to the code was made.

Line 13 is a copy of line 8 in the source file.

Line 14 is another array assignment.

Line 15 is the last line of the source file.

Line 16 sets the SECTION for the following constant definition to be bbaconst. Refer to the paragraph that discusses the details of the -DBBA_OPTc<constname> OPTION appearing later in this chapter, for more information. If no -DBBA_OPTc<constname> option had been used, this line would not be present.

Lines 17 thru 30 were inserted by bbacpp to define the data area that keeps track of the environment that the file was compiled under. The name defined on line 24 (_bA_t_nam_crs_abb_on_) will be unique for each file (it has to be, because it is global), and will always start with _bA_ so it will not conflict with any of your symbols.

Line 32 sets the SECTION information back to what it was prior to line 16. This is not strictly necessary, but clean, in case you have additional processing you wish to do.

BEST AVAILABLE COPY

HOW TO INVOKE BBACPP

To use bbacpp with your AxLS C compiler, you simply add the `-b` option to your `cc68020` command line. This tells `cc68020` to replace the normal C preprocessor (cpp68020) with the BBA analyzer preprocessor that is specific for the 68020 (bbacpp68020). This preprocessor has the same predefined variables (e.g. `m68020`) and search paths (e.g., `/usr/hp64000/include/68020`) as cpp68020, but adds the BBA analyzer capabilities.

For example, if you normally compile a program by use of a command such as:

```
cc68020 -c -h myfile.c
```

you can modify your command to use bbacpp by adding the `-b` option, as follows:

```
cc68020 -c -h -b myfile.c
```

Bbacpp accepts the same options as cpp68020. The following are examples of legal commands:

```
cc68020 -o absfile -hb -I/proj1/include -I/local/includes -DALPHA src1.c src2.c
cc68020 -b -h -c -UOMEGA -DBETA -DLINES=43 driver.c
```

If you are using "make" (an HP-UX program that detects changes in source files and only compiles and links the files that changed), refer to Chapter 6 for more information.

DETAILS OF THE -DBBA_OPTM<character> OPTION

This option allows you to override the default suffix that is used for the map file. Refer to the detailed discussion of THE -DBBA_OPTS OPTION appearing later in this chapter for information on the use of the map file, and information on how to suppress the creation of the map file, if necessary.

Typically, the name of the map file is the same as the name of the C source file, except that the file extension "`.c`" is replaced with "`.M`". If your source file name does not end with "`.c`", but does end with "`.<character>`", the <character> is replaced with an "M". However, bbacpp will not overwrite a file unless it is either zero length or is a bbacpp map file (so don't worry that bbacpp may overwrite one of your significant files!). If the name of the C source file does not end with an extension (a "`.<character>`"), the file name will be truncated to 12 characters (if it is presently more than 12 characters), and the "`.M`" will be appended.

The map file is always placed in the same directory as the C source file.

To change the map suffix from `M` to something else, add the `-DBBA_OPTM<character>` option to the same command line which has the `-b` option. There must be no space between the `-DBBA_OPTM` and the <character>. For example, if you normally use:

```
cc68020 -b -h hello.c goodbye.c
```

BEST AVAILABLE COPY you can change the suffix from M to m for both hello.c and goodbye.c with:

```
cc68020 -h -b -DBBA_OPTMm hello.c goodbye.c
```

There are several reasons why you might want to use the -DBBA_OPTM<character> option:

1. You already have files (that you want to keep) with the name of the C source file, but with the M extension.
2. Your organization may reserve the .M extension for a particular type of file, and you don't want any exceptions to that rule.
3. You need to compile your program several times with different -DBBA_OPTO= options. When you do this, you must specify different map file extensions for each compilation. Refer to the discussion entitled "HOW (AND WHY) TO COMBINE -DBBA_OPTO= OPTIONS" appearing later in this chapter for reasons to use several compilations with different -DBBA_OPTO= options.

When the bbaunload command unloads the data area associated with each file, it will store the map suffix (along with other information) into the "bbadump.data" file. Bbarep will look for map files with the specified suffix in order to generate reports. Refer to the next paragraph (the -DBBA_OPTS option), for the list of bbarep output options that require the map files.

DETAILS OF THE -DBBA_OPTS OPTION

This option allows you to prevent creation of the mapping file. If you use this option, some of the functions of the bbarep command will not work.

To use this option, simply add the -DBBA_OPTS option to the same command line which has the -b option. For example, if you normally use a command such as:

```
cc68020 -h -b read.c white.c
```

(which will create the mapping files read.M and white.M), you can prevent creation of these files by changing the command to:

```
cc68020 -h -b -DBBA_OPTS read.c white.c
```

You might use this option if you are concerned about limited disk space, or if you only care about over-all coverage percentage (and have no embedded BBA_IGNORE or BBA_ALERT pragmas in your source code).

Bbarep uses the map file(s) to:

1. Find out what type of branch was executed or not executed (used by the [illegible] and [illegible] options to bbarep).
2. Determine the "scope" of a branch (so you don't get 500 reports of unexecuted branches, if a single function that had 500 branches in it was never executed). Used by the [illegible] and [illegible] options to bbarep.
3. Determine if a branch had a BBA_IGNORE or BBA_ALERT pragma with it (used by all reporting options of bbarep).

BEST AVAILABLE COPY

4. Determine what function a branch is associated with (used by all reporting options of bbarep). 5. Determine which source lines generated the branch, and which source lines would be unexecuted if a branch were not taken. Used by the -l, -aN and -bN options to bbarep.

DETAILS OF THE -DBBA_OPTp<lines> OPTION

'his option is only necessary when a previous run of bbacpp gives you the following error nessage:

```
Out of push-back-line memory; use -DBBA_OPTpNNN, where NNN is greater than XXX
```

Vhere xxx is a decimal integer. This message warns you that your source code exceeded an inernal limit, and bbacpp could not finish processing your file. The xxx will be the current internal imit, and if you specify a number larger than xxx, bbacpp will probably succeed. (If it doesn't suc:eed, it will give you the error message again, and you should try an even larger number).

For example, if you normally compile bigfile.c with the command:

```
cc68020 -h -b bigfile.c
```

and you get the following error message:

```
Out of push-back-line memory; use -DBBA_OPTpNNN, where NNN is greater than 64
```

you can probably successfully compile your program by specifying -DBBA_OPTp90 in your command ine, as follows:

```
cc68020 -h -b -DBBA_OPTp90 bigfile.c
```

(Note that there are no spaces between the p and the number of lines.)

The only negative aspect of specifying larger values for the push-back-line memory is that (core) memory usage is increased. Therefore, if you have one file which requires a -DBBA_OPTp1[illegible] you could have all files compiled with that option, but realize that it would cause bbacpp to use more memory than is strictly necessary.

BEST AVAILABLE COPY

DETAILS OF THE -DBBA_OPTc<constname> OPTION

NOTE

Due to limitations in the file formats, the use of -DBBA_OPTc<constname> option to bba does not make sense when using the cc68020 -h flag. For more information, refer to the paragraph titled PITFALLS WITH BBACPP AND CC68020 at the end of this chapter.

---

Bbacpp generates a constant data structure for each file (refer to DETAILS OF HOW BBACPP MODIFIES YOUR CODE later in this chapter for more information on this structure).

Normally this data structure is placed in the same section that contains rest of your constants.

You can override placement of this data structure in the normal section by using the -DBBA_OPTc<constname> option on the same command line that has the -b option. There must be no space between the c and the constant name.

This will allow you to separate the constants that bbacpp generated from the constants you generate.

Normally, the <constname> section is placed after the "const" section. You can also use a linker command file to place the sections where you want them. For example, if you usually use a command like the following:

```
cc68020 -b blue.c
```

you can force bbacpp to put the data structure for blue.c in the section myconst by using the command:

```
cc68020 -b -DBBA_OPTcmyconst blue.c
```

DETAILS OF THE -DBBA_OPTd<dataname> OPTION

NOTE

Due to limitations in the file formats, the use of -DBBA_OPTc<constname> option to bba does not make sense when using the cc68020 -h flag. For more information, refer to the paragraph titled PITFALLS WITH BBACPP AND CC68020 at the end of this chapter.

---

Bbacpp normally places the branch analysis data (the array) in the same data section with the rest of your data.

You can override placement of the array in the normal section by using the [illegible] option on the same command line that the -b option. There must be no space between the [illegible] and the constant name.

BEST AVAILABLE COPY his will allow you to separate the data that bbacpp generated from the data that you generated.

lormally, the <dataname> section is placed after the "data" section. You can also use a linker ommand file to place the sections anywhere else that you want them. For example, if you usually se a command such as:

```
cc68020 -h -b green.c
```

ou can force bbacpp to put the data structure for green.c in the section named mydata by using ne command:

```
cc68020 -h -b -DBBA_OPTdmydata green.c
```

DETAILS OF HOW BBACPP MODIFIES YOUR CODE, AND THE -DBBA_OPTO=<options> OPTIONS This part of the manual explains which branches are detected and instrumented by using different -DBBA_OPTO=<options> options. (The term "instrumented" means that the branch is detected, and an array assignment statement is inserted. Examples in the following subparagraphs show how the code is instrumented by using different opptions to this command.

Normally, the option -DBBA_OPTO=A is used. It requests bbacpp to detect all branches (therefore, bbarep reports on all branches). However, you may not wish to recognize certain branches based on previous experience or lack of microprocessor address space. If this is the case, you can still obtain the equivalent of the -DBBA_OPTO=A option by making multiple compilations and test-set executions (refer to the paragraph that discusses HOW TO COMBINE -DBBA-OPTO= OPTIONS later in this chapter for more information). To use any (or all) of the -DBBA_OPTO=<options>, simply add the options you want on the same command line that contains the -b option.

Examples:

```
cc68020 -h -b -DBBA_OPTO=a hello.c
cc68020 -h -b -DBBA_OPTO=iaf hello.c
cc68020 -h -b -DBBA_OPTO=A hello.c
```

The examples in the following subparagraphs refer to the sample function in figure 3-4. Line numbers have been added on the left-hand side of the sample function for reference in the discussions that follow.

BEST AVAILABLE COPY

```
/* Sample function showing many types of branches */
sample()
{
   int a, b, c;

   /* if statement with an else */
   if (a == 0)
      b++;
   else
      c++;

   /* if statement with no else */
   if (b == 0)
      b++;

   /* Switch statement with empty case, a case with fall-thru
      execution, and a default */
   switch(a)
   {
   case 0:
   case 1:  b++;
            break;
   default: b++;
   }

   /* switch statement with no default */
   switch(a)
   {
   case 0:  b++;      /* non-empty, no fall-thru */
            break;
                      /* no default */
   }

   /* while statement */
   while(b != 0)
      b--;

   /* For loop */
   for (c = 0; c < b; c++)
      b--;

   /* Conditional assignment */
   c = (a == 0) ? 123 : 321;

   /* do-while loop */
   do
      b++;
   while (b != 0);
}
```

Figure 3-4. Sample Function For bbacpp -C -DBBA_OPTO=

BEST AVAILABLE COPY

No -DBBA_OPTO=<options>

When no -DBBA_OPTO=<options> are used, bbacpp detects the following:

1. Functions (an array assignment is added as the first executable statement of any function).
2. if statements (an array assignment is added as the first executable statement of the 'then' part of any if statement).
3. else statements (an array assignment is added as the first executable statement of the 'else' part of any if statement for which you wrote the else).
4. while statements (an array assignment is added as the first executable statement within any while loop).
5. for statements (an array assignment is added as the first executable statement within any for loop).
6. case and default statements (an array assignment is added as the first executable statement following a case or default within a switch statement).

(To understand the purpose of the "array assignments" described above, refer to the paragraphs entitled, "WHAT BBACPP DOES" and, "EXAMPLE OF BBACPP'S OPERATION ON A SIMPLE SOURCE FILE", earlier in this chapter.)

Running the sample through bbacpp with no -DBBA_OPTO= options (but with the -C option so that comments are retained) will produce a listing as shown in figure 2-5. We removed the _bA_array declaration and the file's data structure from the top and bottom to emphasize the _bA_array assignment statement insertions:

BEST AVAILABLE COPY

```
/* Sample function showing many types of branches */
sample()
{
   int a, b, c;

   /* if statement with an else */
   _bA_array[0]=1;if (a == 0)
      {_bA_array[1]=1;b++;}
   else
      {_bA_array[2]=1;c++;}

   /* if statement with no else */
   if (b == 0)
      {_bA_array[3]=1;b++;}

   /* Switch statement with empty case, a case with fall-thru
      execution, and a default */
   switch(a)
   {
   case 0:
   case 1:  _bA_array[4]=1;b++;
            break;
   default: _bA_array[5]=1;b++;
   }

   /* switch statement with no default */
   switch(a)
   {
   case 0:  _bA_array[6]=1;b++;     /* non-empty, no fall-thru */
            break;
                     /* no default */
   }

   /* while statement */
   while(b != 0)
      {_bA_array[7]=1;b--;}

   /* For loop */
   for (c = 0; c < b; c++)
      {_bA_array[8]=1;b--;}

   /* Conditional assignment */
   c = (a == 0) ? 123 : 321;

   /* do-while loop */
   do
      b++;
   while (b != 0);
}
```

Figure 3-5. Results Of bbacpp -C

BEST AVAILABLE COPY

Notes on figure 3-5:

1. On line 7, the array assignment was inserted because the `if (a == 0)` statement is the first statement of the function. The first statement of any function is always preceded with an array assignment so the BBA analyzer can tell if the function was ever called.
2. An insertion was done on lines 8 and 14 to reflect the `if` statements.
3. An insertion was done on line 10 because the example program had an `else` statement. No insertion was done for the `if` statement on line 13, because the example program did not have one (but refer to the explanation of the `-DBBA_OPTO=i` option later in this chapter).
4. Insertions were done on lines 21, 23, and 29 in response to code after `case` or `default` statements. Note that on line 21, array[4] will be set even if a is 0. Refer to the discussion of `-DBBA_OPTO=e` later in this chapter). Also note that if the switch statement at line 27 was entered with "a not equal to 0", no notice would be given; however, refer to the discussion of `-DBBA_OPTO=s` later in this chapter.
5. An insertion was done on line 36 because that was the first statement of a while loop.
6. An insertion was done on line 40 because that was the first statement of a for loop.

The `-DBBA_OPTO=` options add to the branches that are detected. The examples that follow will only show differences caused by adding the options.

The -DBBA_OPTO=a Option

This option will cause bbacpp to detect and instrument conditional assignments, that is, code will be inserted to detect whether or not the condition in the conditional assignment was ever TRUE and was ever FALSE. By adding this option to the sample program, line 43 changes as shown in figure 3-6.

```
42      /* Conditional assignment */
43      c = (a == 0) ? (_bA_array[9]=1,123) : (_bA_array[10]=1,321);
44
```

Figure 3-6. Results Of bbacpp -C -DBBA_OPTO=a

When you have used this option, bbarep will automatically report whether or not the condition (in this example, the `(a == 0)` expression) was never TRUE or never FALSE.

BEST AVAILABLE COPY

NOTE

When you use this option, you may receive warnings from the compiler about "illegal combination of pointer and integer". This happens when the left-hand side (lhs) of the conditional assignment is a pointer, and either the TRUE or FALSE expression was 0 or NULL. For example, you will receive the warning for the following code fragment:

```
char *ptr1, *ptr2;
ptr1 = (a == 0) ? ptr2 : NULL;
```

To avoid this warning, typecast the 0 or NULL to be the same type as the lhs. For example:

```
char *ptr1, *ptr2;
ptr1 = (a == 0) ? ptr2 : (char *) NULL;
```

The -DBBA_OPTO=d Option

This option is used to instrument do-while statements. Obviously, the code in a do-while is always executed (at least once). This adds code to determine if the do-while is ever executed more than once. Adding this option to the sample program changes lines 46 thru 48 as shown in figure 3-7.

```
45      /* do-while loop */
46      do
47 .        b++;
48      while ((b != 0)?(_bA_array[9]=1,1):(_bA_array[10]=1,0));
```

Figure 3-7. Results Of bbacpp -C -DBBA_OPTO=d

Note that if there was a break within the do loop that was always being executed, bbarep would also report that the conditional of the while was never FALSE.

BEST AVAILABLE COPY

The -DBBA_OPTO=e Option

This option actually does several things to case statements:

1. If a `case` or `default` statement has no code, this will instrument the case statements so that the BBA analyzer can tell when the `switch` statement went to that case. In our example function, line 20 has a `case` with no code.
2. If a `case` or `default` statement is not preceded by a `break` statement, code is inserted so that you can tell if the `switch` statement did not go to that case, but the case's code was executed because the previous code "fell through" and executed the code. For example, the `b++;` on line 21 of the sample function will be executed even if `a` is never 1 (but is ever a 0).

Figure 3-8 shows an example of the inserted code when the `-DBBA_OPTO=e` option is used:

```
16      /* Switch statement with empty case, a case with fall-thru
17         execution, and a default */
18      switch(a)
19      {
20      case 0:
21   _bA_array[4]=1; goto _bA_switch_label_1_1;case 1: _bA_array[5]=1;_bA_switch_label_1_1:b++;
22                 break;
23      default: _bA_array[6]=1;_bA_switch_label_1_2:b++;
24      }
```

Figure 3-8. Results Of bbacpp -C -DBBA_OPTO=e

Note that if the switch is entered with a value of 0, array[4] will be set, but array[5] will not be set, even though the code associated with `case 1` will still be executed because of fall through.

The -DBBA_OPTO=i Option

This option allows you to detect when an `if` statement which has no `else` is always TRUE. It does this by inserting an `else` statement and an array assignment. Then bbarep checks to see if the array value is 0, and if it is, informs you that the conditional of the `if` was never FALSE.

For example, using the `-DBBA_OPTO=i` option with our sample function, the code is modified as shown in figure 3-9.

```
/* if statement with no else */
if (b == 0)
   {_bA_array[3]=1;b++;}else _bA_array[4]=1;

```

Figure 3-9. Results Of bbacpp -C -DBBA_OPTO=i

The -DBBA_OPTO=s Option

BEST AVAILABLE COPY

This option is used to determine if a `switch` which has no `default` was entered with a value that caused none of the `case` statements to be executed. It creates a `default` statement and inserts an assignment statement. By using this option, our example function will be modified as shown in figure 3-10.

```
26      /* switch statement with no default */
27      switch(a)
28      {
29      case 0:  _bA_array[6]=1;b++;     /* non-empty, no fall-thru */
30               break;
31                         /* no default */
32    default:_bA_array[7]=1; }
```

Figure 3-10. Results Of bbacpp -C -DBBA_OPTO=s

As you can see, a `default` and associated array assignment statement have been added at line 32, at the end of the `switch` statement on line 27.

The -DBBA_OPTO=f Option

This option is used to tell if the third expression in a `for` statement is ever executed. By default, bbacpp inserts statements to tell if the code within a for loop was ever executed, but it is possible for the code within a for loop to be executed and the third expression to never be executed (for example, this could be caused by a `break` or a `return` that is always executed in the code controlled by the `for`).

Using `-DBBA_OPTO=f` to tool the sample function yields code as shown in figure 3-11.

```
38      /* for loop */
39      for (c = 0; c < b; _bA_array[8]=1,c++)
40         {_bA_array[9]=1;b--;}
41
```

Figure 3-11. Results Of bbacpp -C -DBBA_OPTO=f

In the example of figure 3-11, the `c++` is the third expression of the `for` on line 39.

BEST AVAILABLE COPY

The -DBBA_OPTO=w Option

This option allows you to detect when the body of a `while` loop is always executed. It does this by adding a "temporary" variable, setting it to "0" prior to the loop, and then after the loop, checking to see if the temporary variable is still 0. This is shown in figure 3-12.

```
/* while statement */
_bA_temp_[0]=0;while(b != 0)
    {_bA_array[7]=1;_bA_temp_[0]=1;b--;}if(_bA_temp_[0]==0)_bA_array[8]=1;

```

Figure 3-12. Results Of bbacpp -C -DBBA_OPTO=w

NOTE

The `_bA_temp_` array is created only if needed (which is why you haven't seen it in this manual before).

The -DBBA_OPTO=A Option

This option implies all of the previous `-DBBA_OPTO=` options. Therefore, it is identical to `-DBBA_OPTO=adeisf`.

HOW (AND WHY) TO COMBINE -DBBA_OPTO= OPTIONS

Generally, you will want to use the `-DBBA_OPTO=A` option. However, there are two at least two occasions you may not want to use it:

1. Your organization chooses not to (for example, your organization may want to shorten testing time [recognizing the trade-off in test quality]).
2. Your system does not have enough memory to load the entire program in memory with all the branch-analysis options enabled (-DBBA_OPTO=A).

For the first case, just choose the options you want, and that's the end of it.

For the second case, you can usually use the memory mapping in the emulator to expand you system's memory by placing some emulation memory after your system's memory. However, if you are constrained by your addressing space (i.e., your program just about fills the processor's addressing capability), there is another method.

In this case, compile all of your files with two or more -DBBA_OPTO= options. Load the program. Run the tests, and dump the data to "bbadump.data". Then do the compile-load-run-dump loop with different -DBBA_OPTO= options. When you run "bbarep" or "bbamerge", the branch data will automatically be "merged" to give you the same effect as if you had used all of the -DBBA_OPTO= options and had only run the tests one time.

BEST AVAILABLE COPY

For example, assume that when you used -DBBA_OPTO=A, you could not fit your program into your system's memory space, but when you used the options -DBBA_OPTO=ade, and -DBBA_OPTO=isfw, the program fit.

You would first compile all of your programs using

```
cc68020 -h -c -b -DBBA_OPTO=ade -DBBA_OPTM1 <C source files>
```

This enables the "ade" insertion options, and sets the extension of the map file to "1" instead of "M". It is necessary to change the map file extension so that when you use different options, you won't remove the mapping file created with the previous options. That would restrict the type of reports you could get with "bbarep".

Then run your tests and create the "bbadump.data" file with the "bbaunload" emulation command.

Re-compile all of your programs using the command:

```
cc68020 -h -c -b -DBBA_OPTO=isfw -DBBA_OPTM2 <C source files>
```

This enables the "isfw" insertion options, and sets the mapping file extension to "2" instead of "M". Run your tests, and use the "bbaunload" command (which always appends the data to the previous dump, so you don't loose previous data).

When you run "bbarep", you will get the same results as if you had been able to use the -DBBA_OPTO=A option.

Two requirements must be met before this can work:

1. The modification dates of your source files must all be the same during each compilation of your program. Don't go in and modify your source files half-way through and expect to merge the results of all the tests!

2. Each time you compile tests with a new option, be sure to give your "mapping file" a different file extension. Otherwise, each time you invoke tests, your new (.M) map will overwrite the existing (.M) map, and the map information required by "bbarep" will only be able to show information from the most recent run of your executable file.

Example:

```
cc68020 -h -b -c -DBBA_OPTO=a prog.c
cc68020 -DBBA_OPTMm -h -DBBA_OPTO=d -b -c prog.c
```

The above two lines run the same instructions on the module "prog.c", except:

1. The first line uses option "a" to see if true/false statements of conditional assignment statements are ever executed, and its map information is stored in "prog.M" (by default).

2. The second line uses option "d" to see if the conditional of a "do" statement was ever evaluated to be true, and its map information is stored in "prog.m" (by command assignment).

BEST AVAILABLE COPY

NOTE

---

The order of options is not important (e.g., "-b" can precede or follow any of the other options.)

---

DETAILED EXPLANATION OF THE BBA_IGNORE PRAGMA

First, let's define "pragma" because it is not defined in the K&R book.

In ANSI-standard C, a "pragma" is defined to be the way to extend directives in an implementation-dependent manner. A pragma can go anywhere that a "#if" operator can go - i.e., the '#' must be the first non-whitespace on the line, and the entire line is generally not considered part of the C source file for grammatical purposes. Further, all implementations of C ignore unrecognized pragmas.

Got that? Now let's see how the BBA analyzer uses pragmas:

We have defined two pragmas for use with the BBA analyzer: BBA_ALERT, and BBA_IGNORE. The names were chosen to make it highly unlikely that any other implementation of C would recognize these pragmas (thus, these should be ignored).

The BBA_IGNORE pragma causes all branches to be ignored at, or within, the scope where the pragma is located - i.e., the reports generated by bbarep will not show whether or not the ignored branches were hit (although the number of ignored branches will be shown in a summary). As a special case, a BBA_IGNORE pragma that is outside of any function will act as if it were located within the next function (but only the next one; it will not cause any of the other functions from that point on to be ignored!).

```
20        if (a == 0)
21        {
22   #        pragma BBA_IGNORE
23            if (j == 0)
24                k++;
25        }
26        if (j == 5)
27        {
28            k--;
29        }
30      if (b == 5)
31      {
32          j++;
33 #        pragma BBA_IGNORE
34      }
```

Figure 3-13. Ignoring Lines 21 Through 24

BEST AVAILABLE COPY

In figure 3-13, lines 21 through 24 are ignored (i.e., if a was never zero, you would not see it in the number of unexecuted branches). Further, because the statement `if (j == 0)` is "within" the same scope as the BBA_IGNORE pragma, it is also ignored.
The 'if' statement on line 26 is not within the same scope as line 22. Therefore, it will not be ignored (i.e., if j is never 5, you will see an unexecuted branch in the report).

Lines 31 through 34 are also ignored because that is the scope BBA_IGNORE, even though the pragma itself is toward the end of the scope.

```
    k = (j == 0) ?
# pragma BBA_IGNORE /* reasonable to do this? */
        hello->dolly + 67 : 487 - well;
```

Figure 3-14. Ignoring The TRUE Condition

In figure 3-14, the TRUE condition of `(j == 0) ?` is ignored while the FALSE condition is not ignored (because the FALSE part is at a different scoping level - see below). Note that the pragma can go anyplace a white space can go, but it must be on a line by itself. Since C always expands macros on a single line, no pragmas can be used in macros. (Specifically, you cannot ignore a portion of the branches generated by a macro; however, you can ignore all branches generated by a macro by using the `-i <ignorefile>` option to bbarep.)

Note that C comments are legal on the pragma line; however, they should not continue on to other lines.

```
76        if (j == 4)
77   #        pragma BBA_IGNORE
78            drag_cursor(LEFT);
79        else
80            drag_cursor(RIGHT);
```

Figure 3-15. Ignore Pragma Under If Statement

In figure 3-15, we see that the pragma is not part of C's grammar - i.e., the object of the statement `if (j == 4)` is the statement on line 78, not the pragma on line 77. Also, since the pragma is not considered part of the grammar, it was not necessary to put braces ({ and }) around lines 77 and 78. It may be wise to insert the braces, anyway, for readability reasons.

One final note about BBA_IGNORE. For the 'if' statement that has an 'else' associated with it, a BBA_IGNORE in the 'then' part does not ignore the 'else' part. If you want to also ignore the 'else' part, you must put a BBA_IGNORE pragma in the 'else' statement, as well. However, for the case of an 'if' statement with no 'else', and when `-DBBA_OPTO=i` is used, a BBA_IGNORE in the 'then' part will cause the (inserted) 'else' to also be ignored. In the example in figure 3-15, line 78 is ignored but not line 80. If you want line 80 to be ignored, add a BBA_IGNORE pragma after the else statement.

BEST AVAILABLE COPY

Vhy Use Ignore Branches?

'ou might ask, "Why would I want to ignore branches?" Good question! The answer is that there nay be conditions that you want to check, but that are impossible (or very difficult) to test. For xample, a motor-controller program might be designed to go to a "fail-safe" condition if the motor ıverheats. You probably would not want to ruin a motor for each test! On the other hand, you lon't want to be "penalized" by the test report for doing a complete job of programming, and not ıeing able to test it as completely!

ılso, you might want to include code in your product that is only executable in a "maintenance node", and yet you might not want to test that code.

ɔbarep And BBA_IGNOREd Branches n the percent summary (bbarep -S), the number of ignored branches is subtracted from the total ıumber of branches, and the number of ignored branches that were hit is subtracted from the total ıumber of hit branches. However, the number of ignored branches *is* printed (at the end of the 'eport).

n the function summary (bbarep -s), the number of ignored branches is subtracted from the total ıumber of branches in each function, and the number of ignored branches that were hit in each 'unction is subtracted from the total number of branches hit in each function. Any function that was completely ignored (i.e., there was a BBA_IGNORE pragma prior to the function declaration) will not show up in the listing. Any function which was not completely ignored, but which did have one or more BBA_IGNORE pragmas within it, will have a star next to it in the 'I' column.

When you request a list of unexecuted branches (bbarep -a,-b), no ignored branch will be printed, whether it was hit or not (unless it was also a BBA_ALERT branch, described in the next paragraph in this chapter).

Refer to the discussion of DETAILS OF BBAREP OPTION "-i" in Chapter 5 for more information.

DETAILED EXPLANATION OF THE BBA_ALERT PRAGMA

The BBA_ALERT pragma causes bbarep to 'flag' you when a branch containing the BBA_ALERT pragma is executed. Specifically, if code which is in the same scope as the BBA_ALERT pragma is executed, bbarep will alert you. Refer to Chapter 5 for details of the bbarep options -s, -aN, -bN, and -l.

The BBA_ALERT pragma can go anywhere the BBA_IGNORE pragma can go. Further, both BBA_ALERT and BBA_IGNORE can be combined in any order on the same #pragma line. See figure 3-16.

BEST AVAILABLE COPY

```
if (a != OMEGA)
{
#   pragma BBA_ALERT BBA_IGNORE /* should never get here.... */
}
```

Figure 3-16. Combining BBA_ALERT And BBA_IGNORE

WHY USE BBA_ALERT

Sometimes when a program is written, conditions are identified as "impossible". However, as specifications change, the case that was "impossible" may become "possible". Or, you may not be in a position to write code to deal with a "possible" condition now, but you want to be reminded to write that code later. A method for dealing with this is to test for the condition, but not have any code for the condition, except whatever is necessary to alert you that the condition has occurred.

Alert branches are a method of notifying you when a branch (which you designate) has been executed.

By using the alter pragma, you do not need to write any code to alert yourself, because the BBA analyzer will! In fact, any bbarep report of a function or file that contains executed "alert" branches will quickly show that; the output was designed to immediatly catch your attention.

RESERVED WORDS (SYMBOLS)

Bbacpp generates symbols of the form _bA_xxxxxxxx. If your source file has any symbols of that form, the error message below will be printed to stderr:

```
symbol 'xxxxxx' conflicts with bba symbol
```

where xxxxxx is the symbol in your source file. In order to avoid these messages, and other problems, do not use bbacpp with any file that gives you this message. Change the name of the offending symbol to begin with characters other than '_bA_'.

PITFALLS WITH BBACPP AND CC68020

Keep the following considerations in mind whebn using the BBA analyzer with cc68020.

cc68020 -h

Prior to version 3.0 of the HP64410 (or HP64416) 68020 emulator, only HP64000 format symbol tables can be used. Therefore, the -h option must be given to the compiler.

BEST AVAILABLE COPY

If you use the -h option, and if you use the -DBBA_OPTc<constname> or -DBBA_OPTd<dataname>, bbaunload may not be able to unload some file data.

cc68020 -s

Do not use the -s option for cc68020. The -s option causes all symbol information to be stripped. When this happens, the emulation bbaunload command cannot locate the data arrays.

cc68020 -u

Be very careful when using the -u option for cc68020. The -u option prevents the setting of initialized data to zeros. Getting valid bba data requires the data arrays to be 0 before the program starts. If you use the -u option, you should manually force all of the memory to 0's before loading your program.

The ASM Pragma Of cc68020

The ASM pragma of cc68020 is used to insert 68020 assembly language code into your C source file. Branches within the assembly language area will not be recognized by the BBA analyzer. The entire block of code between ASM and END_ASM will be treated as a single C statement.

Linking Array And Data Sections

In order for bbaunload to work correctly, the sections that contain the array data and the constant data must have the same "function code". Refer to "WHAT BBAUNLOAD DOES", in Chapter 4, for an example linker command file and discussion of how bbaunload reacts to different linking strategies.

BEST AVAILABLE COPY

NOTES

BEST AVAILABLE COPY

Chapter 4

DETAILS OF BBAUNLOAD

INTRODUCTION

Chapter 1 briefly explained the purpose of bbaunload. This chapter will explain exactly how to invoke bbaunload, and it will also describe each of the options available to use with bbaunload. Figure 4-1 is provided for quick reference to the bbaunload function.

```
                BBAUNLOAD QUICK REFERENCE

Bbaunload is invoked by using the "bbaunload softkey
when you are in an emulation session.  This command unloads
the data in the branch-analysis arrays from the emulator
memory (either emulation or target memory) to a file
named "bbadump.data".  Bbaunload always appends the data to
the file instead of writing over it.  Error messages, if any,
are sent to the status line.  Softkey tracking is available
to help you enter a correct command because "bbaunload" is
executed from within an emulation session.


Usage:

      bbaunload [ function codes ] load_file [ dump_file ]


Examples:

   bbaunload  myprogram
   bbaunload  fcode  USER_DATA programundertest  mydumpfile
```

Figure 4-1. Quick Reference To "bbaunload"

WHAT BBAUNLOAD DOES

The bbaunload command appends all the branch-execution data from the target system RAM or the emulation RAM to a file on the host disc. (Branch execution data is created when files are compiled using the [illegible] option. Refer to Chapter 3 for more information on how to use [illegible]. In place of load_file, enter the name of the file that contains the absolute code being executed by the emulator to gather the branch data.

BEST AVAILABLE COPY e bbaunload command is highly dependent on the emulator in use, and the way it views its emory. The optional function codes appear only when you are using the Motorola M68010 or 68020 emulator which supports separate address spaces. With these emulators, you have to put e DATA section for the BBA analyzer (the same DATA section used in your source files by efault), and the CONST section for the BBA analyzer (the same CONST section used in your ource files by default) next to each other in the final link of your executable file in order to unload e branch data properly.

ssuming that you used the options `-DBBA_OPTcbbaconst` and `-DBBA_OPTdbbadata` when compiling all the source files, the example linker command file in figure 4-2 will be a good guide for you hen you are preparing your own linker command file.

```
*  Example of a linker command file
CHIP  68020
SECT  env=$400               * Load address for program/const sections
ORDER env,prog,const,lib,libc,libm

SECT  mon_prog=$20000        * Load address for emulation monitor sections
ORDER mon_prog,mon_data      * This must be mapped to emulation memory

SECT  stack=$7FFF8000        * Load address for stack section

SECT  envdata=$FFFEA000      * Load address for data sections
ORDER envdata,data,bbadata,bbaconst,libdata,libcdata,libmdata,heap
*********************************************************************
* Set register A5 to the beginning address of the data section + 32k
* so that the A5-relative address mode may be used. If this directive
* is omitted ?A5 has an undefined value.
*********************************************************************
INDEX ?A5,data,$8000
LOAD test.o,sub1.o,sub2.o
LOAD /usr/hp64000/env/hp64410/crt1.o
LOAD /usr/hp64000/lib/68020/libc.a
LOAD /usr/hp64000/lib/68020/lib.a
LOAD /usr/hp64000/env/hp64410/mon_68020.o
LOAD /usr/hp64000/env/hp64410/env.a
END
```

Figure 4-2. Example Of A Linker Command File the file shown in figure 4-2, it may be necessary to use "hp64416" instead of "hp64410" in three aces.

igure 4-3, `bbadata` and `bbaconst` are together in the address ranging from FFFEA000 up. If we ssign that address range to USER_DATA, and invoke bbaunload with the function code SER_DATA, the unload operation will proceed correctly. If we move `bbaconst` to address 400 and it right after `const` for example, and the addresses from 400 up are either SUPER_PROG or SER_PROG (it is a program and/or constant section), then the data accessed by bbaunload is t into two different function codes and the unload operation will not work properly.

BEST AVAILABLE COPY

In the emulator for M68020, function codes appear on softkeys when the absolute code has been loaded into a memory configuration that uses the function codes. Depending on the memory configuration selected, there are different modes for function codes: (1) they may be enabled (full use of function codes), (2) disabled (no use of function codes), or (3) partially disabled (only PROGRAM/DATA spaces recognized). If the function codes are disabled (even partially), they will be masked off and ignored during the access of memory by bbaunload. When they are enabled, there are only two valid choices for function code for the bbaunload command: SUPER_DATA or USER_DATA (the branch data always resides in the data area of the program). Function codes are not required when they are disabled in the selected memory configuration. They don't even appear on softkeys. When a function code is valid, but not explicitly specified, SUPER_DATA is the default.

When using the BBA analyzer with the M68010 emulator, the function codes always appear as optional softkey choices. If you do not specify the function code, it defaults to the function code used last in a command which accessed memory.

The file on the host disc where the branch data is sent can be optionally specified. This is the file that bbarep uses to prepare reports on the number of branches hit during execution of the code. Refer to Chapter 5 for details of the bbarep command and its options. The name of the dump file defaults to bbadump.data, unless otherwise specified.

NOTES

BEST AVAILABLE COPY

BEST AVAILABLE COPY

Chapter 5

DETAILS OF BBAREP

INTRODUCTION

Chapter 1 briefly explained the purpose of bbarep. This chapter will explain exactly how to invoke bbarep, describe the options available to bbarep, and show you how to interpret the reports produced by bbarep.

```
                    BBAREP QUICK REFERENCE

Bbarep is invoked by using the "bbarep" command from the shell.
It normally reads data from the "bbadump.data" file (which can
be overridden with the "-d" option, see below). All output,
except errors, are written to stdout; errors go to stderr.

Usage:

   bbarep [ options ] [ file | function ... ]


Options to bbarep:

   -S Print only the percentage of coverage, the number
      of branches, and the number of ignored branches.
      This option may be used with style options
      "-s", "-l", "-b", "-a" and "-D*".

   -s Print a summary of coverage information for each
      function.  This is the default.  This option may
      be used with style options "-S" and "-D*".

   -l Print the line numbers of unexecuted code for each
      function.  This option may be used with style
      options "-S" and "-D*".

   -b Print <number> lines prior to the line which generated
      the branch that was never taken.  A value of 0 will
      print out only the control statement.  This option may
      be used with style options "-S", "-aN" and "-D*".
```

Figure 5-1. Quick Reference To "bbarep"

```
-a <number> Print <number> lines after the first line
   that was never executed.  A value of 0 will print only
   the first line.  If "-b" is also specified, the printout
   will also include all lines from the control statement
   thru the unexecuted lines.  This option may be used
   with style options "-S", "-bN" and "-D*".

-D[ftv] These options are helpful when documenting which
   files and versions were used in the testing.  This
   option may be used with any of the previous style options.
   The documentation options are:

   f - list all files used to generate a report, the
       modification date/time of the files, and which
       -DBBA_OPTO= options were used when the files
       were compiled.

   t - list total number of compiled files, included
       files, functions, and branches.

   v - report version of "bbacpp" used when files were
       compiled, and current version of "bbarep".

The following options change some aspect of the report, but
not the style of the report:

-F Do not print the explanatory footnotes at the end of
   the report.

-d <file> Use <file> as the dumpfile instead of the
   default bbadump.data.

-u <usefile> Only include files or functions whose
   names are in <usefile>.  Note that only one function
   name or file name should be on each line of <usefile>.

-i <ignorefile> The <ignorefile> is a file that contains
   control statements, file names, and/or function names
   (one per line).  In addition to code which contains the
   BBA_IGNORE pragma, the BBA analyzer will ignore code
   whose function name, file name, or control statement
   appears in this file.

-p Print the column numbers in addition to line numbers
   of unexecuted code for each function.  Note that this
   is useful only if "-l" was used.
```

Figure 5-1. Quick Reference To "bbarep" (Cont'd)

BEST AVAILABLE COPY

```
-o Retain data associated with older sources in the
   dumpfile.  Normally, if the dumpfile contains data
   from older sources, the old data is ignored (and a
   warning is printed to stderr).  If this is used, however,
   the BBA analyzer will attempt to retain the old data.

-e <tabs> Expand tabs to <tabs> tabstops.  The default
   is one tabstop every 8 spaces.  For example, -e2
   will set tabstops every 2 spaces.


Examples:

   bbarep
   bbarep -l -d old.data -Df
   bbarep -a4 -b4 -e2 procl file2.c
   bbarep -S
   bbarep -s -Dtvf
```

Figure 5-1. Quick Reference To "bbarep" (Cont'd)

WHAT BBAREP DOES

Bbarep reads the dump file that the bbaunload command(s) generated, and generates any of several reports based on the data. For most reports, the "mapfiles" (which are usually generated when bbacpp runs) are also used, and for the source-reference reports, the source files are also used.

If there are file names or function names on the command line, only those functions listed (or functions within the listed files) will show up in the report. Refer to the discussion of the [illegible] option, later in this chapter.

The "bbadump.data" files (which are created by bbaunload in the emulator) are ASCII files. You may catenate them together if you wish. In fact, the bbaunload command normally appends data to data already in the bbadump.data file. Also, you may add lines to the bbadump.data files as long as they do not begin with a colon (:) in the first column. Lines that do not start with a colon are ignored by bbarep.

Normally, results from multiple bbaunload commands are ORed together to form a single report. However, if a file has been modified and compiled between bbaunload commands, the data from the newest version is retained and the data from the oldest is skipped. Refer to the discussion of the -o option for a way to override this, if desired.

Each of the following sections describes one of the options that bbarep will accept, what it does, and some reasons you might want to use it. You cannot combine some of the options (such as [illegible] and -aN). If you want reports with multiple styles of output, run bbarep with each style as an option. See the man page to determine legal combinations of command-line flags (or bbarep will warn you

BEST AVAILABLE COPY if you use an illegal combination). The options -D[ftv], -S, -F, -d<file>, -u<usefile>, -i<ignorefile>, -I and -e<tabs> can be combined with any of the other options.

DETAILS OF THE -S OPTION

This option prints only a short summary of the results, including the percentage of coverage, the number of branches, and the number of alert/ignored branches (if the mapping files are available). See figure 5-2.

```
22 out of 33 retained branches executed (66.67%)
[ 24 branches were ignored ]
```

Figure 5-2. Example Of bbarep -S Output

This shows that out of 33 branches that were supposed to be executed (i.e., 33 branches were not ignored), 22 were executed, for a 66.67% coverage. There were 24 branches that were ignored (i.e., out of 57 branches, 24 were ignored either because their control statement/function name occurred in an ignore file, or because they had #pragma BBA_IGNORE in the source file).

This output format is useful for quickly getting a measurement of how well the complete set of software is being tested.

DETAILS OF THE -s OPTION

This option prints a function-by-function summary of the results, showing the percentage of coverage (and number of branches) for each function.

This is the default report, which means that if no options are given to bbarep, it is equivalent to bbarep -s. Note, however, that if you want to combine the -s option with (for example), the -Dt option, you must include the -s.

The -s report also includes the information provided by the -S option, at the end of the listing.

BEST AVAILABLE COPY

```
_hit__total___%___IA___function___________file ________________________
   8 /   12 ( 66.67) * keyconvert          convert.c
   6 /    9 ( 66.67)   bitpos              convert.c
   3 /    5 ( 60.00)  *getkeyvalue         getkey.c
   5 /    7 ( 71.43)   twobits             multibits.c
22 out of 33 retained branches executed (66.67%)
[ 24 branches were ignored ]

NOTE:
A '*' in the 'I' column means this function had one or more
   branches that were ignored
A '*' in the 'A' column means this function had a BBA_ALERT which
   was executed
```

Figure 5-3. Example Of bbarep -s Output

Figure 5-3 shows four functions (keyconvert, bitpos, getkeyvalue, and twobits) that are in three files (convert.c, getkey.c, and multibits.c).

In keyconvert, for example, 8 branches out of a total of 12 retained branches were executed (we know that there were some ignored branches in keyconvert, because a star (*) appears in the I column next to keyconvert's name.) That came to 66.67% coverage for the function keyconvert. If there had been a star (*) in the A column, we would know that at least one BBA_ALERT branch in keyconvert had been executed (as there was in getkeyvalue).

The footnotes - explaining what the stars meant - can be disabled by using the -F option (discussed later in this chapter).

This output format is useful when you know you want to enhance your test suite, and want to find out what functions have a low coverage (on the idea that it is better to have all functions tested at N% instead of some functions tested at 100% and some at 0%, even though that might result in the same over-all coverage).

DETAILS OF THE -l OPTION

This option prints the line numbers and types of branches for each "outer unexecuted" branch. Only the outer one is printed to avoid tons of meaningless output. For example, consider a function with 300 branches in it. If the function is never called, you might get 300 lines of output! By using the -l option, you would just get one line, telling you that the function was never called, but you would be notified that there were 300 branches beneath it (see the function bonzo, in figure 5-4, below).

BEST AVAILABLE COPY

```
range_of_code____#_explanation__________________________

bonzo         globals.c
  12 -> 345    300 function was never called

keyconvert   convert.c
  37 -> 37        1 'then' part of 'if' was never executed
  44 -> 44    c   1 conditional of 'if' was never FALSE (no 'else' statement)
  49 -> 49    c   1 conditional of 'do while' was never TRUE
  49 -> 52    ***   code with BBA_ALERT was executed

bitpos   convert.c
  77 -> 87        5 'case' code was never executed
 194 -> 198       2 'then' part of 'if' was never executed
```

Figure 5-4. Example Of bbarep -l Output

The listing in figure 5-4 shows that the function "bonzo" (which is in file "globals.c") was never called, and that there were 300 branches in that function.

The "range of code" (which is 12 through 345 for "bonzo") identifies the line numbers which contain the code that was not executed.

If a "c" is between the line numbers and the number of branches (such as in "keyconvert", line 44), the line numbers refer to the controlling statement, not the lines of unexecuted code. This is necessary, for example, in order to clearly report about an 'if' statement which had no 'else' when the condition of the 'if' was never TRUE.

The three stars (for lines 49 through 52 of function keyconvert) indicate that these lines were a block of code that had a BBA_ALERT pragma in them, and that code was executed. The stars should make it easy to catch your attention.

The numbers in the '#' column indicate the number of branches that were never executed. The number in this column can be greater than one when the branch listed has other branches nested within it. For example, consider the code fragment in figure 5-5.

```
if (a == 0)
{
   if (b == 0)
   {
      c++;
   }
   else
   {
      c--;
   }
}
```

Figure 5-5. Sample Code Fragment To Explain The # Column a was always non-zero, you would get a line in the report that looks like:

```
22 -> 30       3 'then' part of 'if' was never executed
```

The '#' column shows the following three branches:

1. One for the `if (a == 0)` statement itself.
2. One for the `if (b == 0)` statement (which could not be executed, because `a` was never `0`).
3. One for the `else` associated with the `if (b == 0)` statement.

This output is useful when you want to increase test coverage for a large routine. It identifies the branches that "hide" the most branches (so you can concentrate on those branches first). It is also useful if you want to quickly find the executed "BBA_ALERT" branches.

If you have several instrumented branches on a single line, the `-p` option to bbarep is useful. Refer to the discussion of DETAILS OF THE -p OPTION, later in this chapter for more information.

Note that if a branch is "ignored", it will not show up in this listing unless it was also a "BBA_ALERT" branch and the branch was executed.

EXPLANATION LINES FOR -l, -bN, AND -aN OPTIONS

The explanations shown with the `-l` option are usually the same as the explanations shown with the `-aN` and `-bN` options (see below).

Here is a complete list of explanation strings, and their meanings:

```
function was never called
```
The function referenced was never called. Obvious?

```
conditional of 'if' was never TRUE
'then' part of 'if' was never executed
```
Both of these tell you that the conditional of an 'if' statement was never evaluated to be TRUE; however, in the second case, the line numbers refer to the unexecuted code, and in the first case, the line numbers refer to the 'if' statement itself. The first form of the message will be used whenever the `-bN` is used without the `-aN` option. The second form will be used for all other reports.

```
conditional of 'if' was never FALSE ('else' never executed)
'else' part of 'if' was never executed
```
Both of these tell you that the conditional of an 'if' statement was never evaluated to be FALSE; however, in the second case, the line numbers refer to the unexecuted code, and in the first case, the line numbers refer to the 'if' statement itself.

```
conditional of 'if' was never FALSE (no 'else' statement)
```
This tells you that the file was compiled with the `-DBBA_OPTO=1` option. The lines referenced were an 'if' statement that had no 'else'. Further, the conditional of the 'if' statement was never evaluated to be FALSE (so the 'then' part of the 'if' statement was never unexecuted).

```
switch never went to 'case'
```

BEST AVAILABLE COPY

```
switch never went to 'default'
switch never went to 'inner case'
switch never went to 'inner default'
'case' code was never executed
'default' code was never executed
```

All six of these refer to 'case' or 'default' statements inside a 'switch' statement. In the first two, the lines refer to unexecuted code. In the last four, the lines refer to the 'case' or 'default' statement itself. The 'inner case' mentioned in the third message refers to a 'case' statement that is within the scope of another case statement. An 'inner case' example is shown in figure 5-6.

```
switch(a)
{
case 1 : if (i == 4)
         {
            case 2: i++;
            j--;
            default: k++;
         }
}
```

Figure 5-6. Explanation Of 'inner case' And 'inner default'

If figure 5-6, `case 1` is a normal case, while `case 2` is an 'inner case', and the `default` is an 'inner default'.

```
switch never went to 'case' (no executable statements)
switch never went to 'default' (no executable statements)
```

In these two messages, the referenced 'case' or 'default' had no executable statements, but the file was compiled with the `-DBBA_OPTO=e` option so the BBA analyzer detected that the 'switch' statement was never executed with a value that caused it to go to the specified 'case' or 'default'.

```
switch never went to 'default' (code executed by fall-thru)
switch never went to 'case' (code executed by fall-thru)
switch never went to 'inner default' (code executed by fall-thru)
switch never went to 'inner case' (code executed by fall-thru)
```

These four messages advise you that although the code associated with a 'case' or a 'default' was executed, the switch statement never went to the 'case' or 'default'. This happens when a previous 'case' or 'default' was not followed by a 'break' statement. This is detected when the `-DBBA_OPTO=e` option is used. Refer to the paragraph associated with figure 5-6 for an explanation of 'inner case' and 'inner default'.

```
switch went to 'default' (default not defined in code)
```

This shows that even though a 'switch' statement did not have a 'default' statement within it, the 'switch' was entered with a value that did not match any of the 'case' statements. This is detectable only when the `-DBBA_OPTO=s` option is used when compiling the file.

```
conditional of 'while' was never TRUE
body of 'while' loop was never executed
```

Both of these describe what happens when the conditional of a 'while' statement was never TRUE. The first has line numbers that refer to the 'while' statement itself. The line numbers in the second message refer to the unexecuted code controlled by the 'while' statement.

BEST AVAILABLE COPY

```
conditional of 'while' was never false first time thru
body of 'while' loop was never skipped
```

These both refer to cases where the body of a 'while' loop was always executed at least once. For the first message, the lines refer to the 'while' statement itself; for the second message, the lines refer to the unexecuted code controlled by the 'while' statement. This case can only be detected when the file was compiled with the -DBBA_OPTO=w option.

```
conditional of 'for' was never TRUE
body of 'for' loop was never executed
```

Both of these describe what happens when the conditional in a 'for' statement is never TRUE; however, in the second case, the line numbers refer to the unexecuted code; and in the first case, the line numbers refer to the 'for' statement itself.

```
3rd expression of 'for' was never executed
```

This means that the third expression in a 'for' command was never reached. This can happen, for example, when a 'return' statement inside a for loop is always executed the first time the 'for' is executed. This can only be detected when the file was compiled with the -DBBA_OPTO=f option.

```
conditional of 'conditional assignment' was never TRUE
true part of 'conditional assignment' was never executed
```

Both of these describe what happens when the conditional in a conditional assignment statement is never TRUE. (The conditional is the part prior to the question mark). In the second case, the line numbers refer to the unexecuted code; and in the first case, the line numbers refer to the 'for' statement itself.

```
conditional of 'conditional assignment' was never FALSE
false part of 'conditional assignment' was never executed
```

Both of these describe what happens when the conditional in a conditional assignment statement is never FALSE; however, in the second case, the line numbers refer to the unexecuted code: and in the first case, the line numbers refer to the 'for' statement itself.

```
conditional of 'do while' was never TRUE
conditional of 'do while' was never FALSE
```

Pretty clear - the line numbers always refer to the line(s) that that carry the 'while' statement. It is only possible to get this if the file was compiled with the -DBBA_OPTO=d option.

DETAILS OF THE -bN OPTION

This option requests N lines to be printed before the line(s) which have the controlling statement. If you use -b0, only the line(s) of the controlling statement will be printed.

For example, refer to the code fragment in figure 5-7.

BEST AVAILABLE COPY

```
15        /* execute if we have not timed out yet */
16       timer_count++;
17       if (timer_count < TIME_OUT)
18         {
19            int i;
20            for (i = 0; i < active_ports; i++)
21               *port[i] = NO_IO;
22         }
```

Figure 5-7. Example Code Fragment

If `timer_count` was never less than `TIME_OUT`, these are the reports that different -bN values will give you:

"-b0"

```
  (2) conditional of 'if' was never TRUE
17 ->       if (timer_count < TIME_OUT)
```

The "explanation text" precedes the actual source reference. The number in parenthesis indicates the number of branches that were never executed (i.e., they are identical to the numbers in the "#" column for the -i report).

The line numbers being printed are to the left; the line referred to in the "explanation" text is highlighted with an arrow (pretty useless in the case where only one line is printed, but very useful for the case where multiple lines are printed.)

Any tabs in the source file are expanded as per the -eN option, described later in this chapter.

"-b2"

```
  (2) conditional of 'if' was never TRUE
15         /* execute if we have not timed out yet */
16       timer_count++;
17 ->      if (timer_count < TIME_OUT)
```

Each time the output changes from one file or function to another, a line is printed showing the function and file before the first condition.

When code containing the "BBA_ALERT" pragma was executed, the output will have stars in the first column. Again, this is done to make it easy to see these cases. For example:

```
  *** code with BBA_ALERT was executed
*18          array[i]--;
*19 ->       if (array[0] == 1)
```

BEST AVAILABLE COPY

If there are two or more branches of the type referenced in the explanation, the branch of interest will be pointed out by carets (^) printed beneath the line:

"-b3"

```
  (1) conditional of 'if' was never TRUE
25          /* execute if we have not timed out yet */
27 ->       if (j < k) { j++; } else {if (k > q) q--; else k++; }
         ^^^^^
```

The listing above indicates that j was never less than k.

The -bN output is useful when you know you want to execute branches, and don't care what actions are taken within the branch that wasn't previously executed.

DETAILS OF THE -aN OPTION

This option requests N lines to be printed after the first line which was not executed. If you use -a0, only the first unexecuted line will be printed.

For the following examples, refer to the code fragment shown in figure 5-7. Here are some example listings:

"-a0"

```
  (2) 'then' part of 'if' was never executed
20   ->          for (i = 0; i < active_ports; i++)
```

"-a2"

```
  (2) 'then' part of 'if' was never executed
20   ->          for (i = 0; i < active_ports; i++)
21                 *port[i] = NO_IO;
22          }
```

Again, the "explanation text" precedes the source reference. The number in parenthesis indicates the number of branches that were never executed (i.e., they are identical to the numbers in the = column for the -l report).

Note that the output may contain lines that were executed (consider the report you would have if you used -a15, and an unexecuted branch only controlled three lines.

If there are fewer than N lines in the file after the first unexecuted line, (eof) will be printed at the end of the listing. Chapter 2 shows an example of this occurrence.

Again, any executed code which had a "BBA_ALERT" pragma will be highlighted by stars:

BEST AVAILABLE COPY

```
 *** code with BBA_ALERT was executed
*21 ->         i++;
*22     #      pragma BBA_ALERT /* Shouldn't get here for version 1.5! */
*23            }
```

Carets are also used to avoid confusion when two or more branches of the same type are on one line:

"-a1"

```
 (1) true part of 'conditional assignment' was never executed
20   ->       j = (i < 0) ? ++i : (i < 30) ? i-- : 0;
                            ^^^

21          /* what a mess!  check I/O ports to see if
```

The output obtained by "-aN" is useful to see the code that was not executed (and therefore, the program behaviors that were not tested).

DETAILS OF ACTIONS WHEN -bN AND -aN OPTIONS ARE COMBINED

When you use both the -bN and -aN options, the listing includes lines before the control statement, after the first unexecuted statement, and some lines in between. The number of lines printed that are "between" the control statement and first executable statement is about the same as the smallest N value used for -a or -b. For example:

"-a2 -b2"

```
 (2) 'then' part of 'if' was never executed
15          /* execute if we have not timed out yet */
16        timer_count++;
17        if (timer_count < TIME_OUT)
18          {
19             int i;
20   ->          for (i = 0; i < active_ports; i++)
21                *port[i] = NO_IO;
22          }
```

In this example:

1. Two lines prior to the controlling statement are printed (lines 15 and 16).
2. The controlling statement is printed (line 17).
3. Two lines between the controlling statement and the first executable statement are printed (lines 18 and 19).
4. The first unexecuted statement was printed (line 20).
5. Two lines after the first unexecuted statement are printed (lines 21 and 22).

BEST AVAILABLE COPY

Note that the arrow points at the line referenced in the explanation. Compare this with the examples discussing the -bN option, earlier in this chapter.

This is, perhaps, the most useful output because it shows not only which conditions must occur for a branch to be executed, but also what the unexecuted code would have done.

DETAILS OF THE -p OPTION

This option is only useful when the -i option is used. It causes the character positions in addition to the line numbers to be printed to the left of the explanation for each outer unexecuted branch. See figure 5-8.

```
___range_of_code________#_explanation_________________

main   dump1.c
    15/3 -> 17/2        1 'then' part of 'if' was never executed
    24/4 -> 26/3        1 'then' part of 'if' was never executed
```

Figure 5-8. Example Report Using -p Option

Figure 5-8 shows that the 'then' code for the first unexecuted branch started in character position 3 on line 15, and ended in character position 2 on line 17. Character positions are defined to be the number of characters (not number of columns!) from the start of the line. Each tab counts as a character (regardless of how it expands when printed). The first character on a line is character position 1 (not 0).

DETAILS OF THE -i <ignorefile> OPTION

This option provides another method of ignoring branches (in addition to the BBA_IGNORE pragma). It also provides a method of ignoring macros (which can't be done with the BBA_IGNORE pragma), as well as a convenient method for ignoring all functions in a file.

To use the option, you must have a file (the "ignorefile") which contains lines defining what is to be ignored. There are four types of lines that can be put in an ignore file:

1. File names (ignore all functions in the named file).
2. Function names (ignore all branches in the named function).
3. Macro names (ignore all branches generated by the named macro).
4. Conditions (ignore all branches controlled by the condition).

How To Ignore All Functions In A File

File name is contained on this line. This is usually is an "absolute path" name, i.e., a file name beginning with a slash ("/"). However, if the files do not begin with a slash, they are assumed to be paths relative to the directory where the bbarep command is presently running.

Examples:

```
file1.c
/proc1/src/omega.c
test_src/gamma.c
```

The first line requests that all functions in the file "<cwd>/file1.c" be ignored; <cwd> is the directory where bbarep is presently running.

The second line requests that all functions in the file "/proc1/src/omega.c" be ignored.

The third line requests that all functions in the file "<cwd>/test_src/gamma.c" be ignored; <cwd> is the directory where bbarep is presently running.

How To Ignore A Function

This is done by entry of a line that contains a function name. It is exactly equivalent to having a BBA_IGNORE pragma before a function. However, this entry will ignore ALL functions that have the name (a function name can be duplicated if no more than one of the instances of the function name is declared `static`).

Examples:

```
function1
main
```

These two lines cause all branches in the functions "function1" and "main" to be ignored.

How To Ignore All Branches Generated By A Macro

This is done by entering a macro name on a line. This will only cause those branches that are generated by "outer invocations" of the macro to be ignored. Any macro which is not invoked inside another macro is an "outer invocation".

For example, consider the macro definitions, and macro invocations shown in figure 5-9, and in the following subparagraphs.

BEST AVAILABLE COPY

```
11      # define MAC1(a)        if (a == 0) j++; else j--;
12      # define MAC2(b,c)    if (b != c) MAC1(c) else MAC1(b)
13      # define MAC3(a)       (a == 0) ? -1 : 1;
14
15      func(j,k,l,m)
16      {
17         MAC1(j);
18         MAC2(k,l);
19         m = MAC3(j);
20         MAC2(MAC3(j), k)
```

Figure 5-9. Macro Definitions

If an "ignorefile" contains the following line:

```
MAC1
```

then the branches generated on line 17 of figure 5-9 will both be ignored. However, although MAC1 is invoked indirectly on lines 18 and 20, those branches will not be ignored.

If an "ignorefile" contains the following line:

```
MAC2
```

then all of the branches generated on lines 18 and 20 will be ignored because MAC2 is the "outer macro".

If an "ignorefile" contains the following line:

```
MAC3
```

then the branches on line 19 will be ignored (assuming you compiled your source files with the -DBBA_OPTO=A option!). Although MAC3 is mentioned on line 20, it is not the "outer invocation" so the ignorefile will not ignore it.

You could ignore all branches on lines 17 through 20 by an ignorefile that looks like:

```
MAC1
MAC2
MAC3
```

BEST AVAILABLE COPY

How To Ignore All Branches Controlled By A Specific Statement

This is done by entering a control statement (or part of it) in the ignorefile. In all files and functions, branches which are controlled by that statement will be ignored. For example, if an ignorefile contains

```
if (a == 0)
```

then all if statements that compare a with 0 will be ignored. Note that this might make the BBA analyzer ignore lots of important branches. On the other hand, if you commonly have code which is only executed under circumstances that you don't want to test (such as a "maintenance mode"), this can be very useful.

Further, lines in an ignorefile are compared against both the pre-processed and post-processed C source lines (i.e., they are compared both against the text you wrote, and against the results of any macro expansion). Used with care, this might ignore specific branches of macros.

Even if the source line that is the control code spans several lines, the lines must be reduced to one line for each control statement in the ignore file. White space in C language programs (i.e. spaces, tabs, and comments) is ignored when comparing each control statement in the source files with the line in the ignore file.

For example, consider the following code fragment:

```
if (beta(8) <
        omega(90))
{
    printf("oops\n");
}

j = (k == 9) ? /* degenerate case */ 0 : 9;
```

All branches in the above code fragment can be ignored by using the following ignore file:

```
if (  beta(8)  <omega(90))   /* don't really care */
(k==9)?
```

The following examples and explanations will help you to decide exactly what text to insert into an ignore file for each type of branch.

IGNORING AN 'if' STATEMENT (AND 'else' STATEMENT). The text to ignore an 'if' statement starts with the 'if' text and stops with the closing parenthesis of the 'if's condition.

Examples:

```
if (j++ <= omicron(890 + falsetto))
if (MAC3(j) == 4)
```

SPECIAL NOTE. When an 'if' statement appears in an ignorefile, the 'else' statement is also ignored. There is no way to specify ignoring only the 'else' or only the 'then' part of an 'if' statement. However, you can ignore just one of these by using the BBA_IGNORE pragma, discussed in Chapter 3 of this manual.

BEST AVAILABLE COPY

IGNORING 'case' AND 'default' STATEMENTS. The text to ignore a 'case' statement starts with the word 'case' and ends with the cases's colon (:).

Examples:

```
case 28:
case HELP_CHARACTER:
case 'Q' :
```

IGNORING AN INSERTED DEFAULT. Defaults are inserted by using the -DBBA_OPTO=s option. The entry required to ignore a default that isn't defined in the code (but was generated when the file was compiled with the -DBBA_OPTO=s option) is the name of the switch statement that didn't have the default. It starts with the word 'switch' and ends with closing parenthesis of the switch's condition.

Examples:

```
switch (input_character)
switch(j)
```

IGNORING A 'while' STATEMENT The text required in an ignore file to ignore branches generated by a 'while' statement begins with the word 'while' and ends with the closing parenthesis of the 'while's condition.

Examples:

```
while (b != 0)
while(payment > stocks)
```

IGNORING 'do-while' STATEMENTS The text required to ignore the branches in a 'do-while' statement is only the condition of the while (no other text). To ignore branches in the following statement:

```
do { j++; } while (j < 5);
```

the ignorefile's line is:

```
j < 5
```

IGNORING A 'conditional assignment' STATEMENT. The text required to ignore a conditional assignment starts with the opening parenthesis of the conditional assignment's condition, and closes with the question-mark (?).

Examples:

```
(j == 4) ?
( k <= j)?
```

BEST AVAILABLE COPY

NOTE

There is no way in an ignorefile to ignore only the TRUE or FALSE portions of a conditional assignment. If a conditional assignment is specified in an ignorefile, both the TRUE and FALSE branches will be ignored. The BBA_IGNORE pragma, however, can be used to selectively ignore the TRUE or FALSE branch.

IGNORING A 'for' LOOP. The text required in an ignorefile to ignore the body of a 'for' loop begins with the word 'for' and ends with the closing parenthesis.

Examples:

```
for (i = 0; i < sizeof(array); i++)
for (/* no init*/; j <= omega; j+= 45)
```

When compiling with the `-DBBA_OPTO=f` option, you may ignore whether or not the third expression of a 'for' statement is executed by inserting the controlling code into the ignorefile. For example, to ignore both the `i++` and `j+=45` shown above, the ignorefile should contain:

```
i < sizeof ( array )
j <= omega
```

DETAILS OF THE -u <usefile> OPTION

This option specifies a file that contains names of files or functions that are to be included in a report. Only those files or functions named in the `<usefile>` will be in the report.

The effect is identical to having the files or functions on the command line, but it may be easier to put the list in a `<usefile>` than to type it on the command line.

The format of the `<usefile>` is simple. Each line contains the name of a function or file. File names are assumed to be relative to the directory where the bbarep program is running, unless they begin with a slash (/).

For example, if the file "myfiles" contains:

```
gram/lex.c
gram/parse.c
parseerror
```

then the command

```
bbarep -u myfiles
```

would report on all functions in the files `<cwd>/gram/lex.c` and `<cwd>/gram/parse.c` (`<cwd>` is the directory where bbarep is being run), and all functions named parseerror.

BEST AVAILABLE COPY

This is useful when several people are working on a single program, but you only want a report on the files for which you are responsible.

DETAILS OF THE -d <file> OPTION

This option tells bbarep to use the file `<file>` instead of the file "bbadump.data" to obtain the data for the report. Normally, the emulation bbaunload command writes the coverage data to a file named "bbadump.data". This can be overridden.

Example:

```
bbarep -a5 -b5 -d mydata
```

requests bbarep to generate a source reference listing using data contained in the file `mydata` instead of bbadump.data.

HOW TO OBTAIN SEPARATE REPORTS PER TEST SUITE, AND THEN COMBINE THEM

You may want to save the coverage from one test set and then run another test-set, and get separate reports on each of them. Perhaps, you might want another report that merges both sets of coverage data). To do this, you might:

1. Remove the old bbadump.data files (to avoid inadvertent merging of coverage information). Use a command such as:

```
rm bbadump.data coverage.1 coverage.2
```

2. Run your first test suite, and use the `bbaunload` command to store the coverage data into a file named `coverage.1`.

3. Reload your program (to set the coverage data arrays to 0). Then run your second test suite Use the `bbaunload` command to save the data in a file named `coverage.2`.

4. Run bbarep twice, once for each `bbaunload` command given:

```
bbarep -d coverage.1    # get report on first test-suite's coverage
bbarep -d coverage.2    # get report on second test suite's coverage
```

5. To get a merged report (i.e., with the coverage from both test suites ORed together), create a file which is a combination of `coverage.1` and `coverage.2`, using the HP-UX `cat` command:

```
cat coverage.1 coverage.2 > coverage
```

and to get the report of the merged data by using the following command:

```
bbarep -d coverage
```

BEST AVAILABLE COPY

DETAILS OF THE -e <tabs> OPTION

When the -aN and -bN options are used, your source files are printed out (in addition to other information). When a tab character is found in your source code, it is expanded the same way that "vi" (and other HP-UX utilities) would expand it.

With the -e <tabs> option, you can set the number of columns between tabstops (-eN equivalent to the vi command :set tabs=N command).

In order to make the bbarep listing have the same indentation as your source file when it is displayed in your editor, you will want to set the <tabs> to be the same value your editor uses. The default value for <tabs> is 8 (i.e., there is a tabstop every 8 characters).

For example, to cause bbarep to expand tabs as if there were tabstops every four columns, use the following command:

```
bbarep -a3 -b5 -e4
```

DETAILS OF THE -o OPTION

This option disables some of the error checking that bbarep does when reading a bbadump.data file prior to generating the reports.

In the bbadump.data file, the data from each file also has the modification date of that file (detected at the time bbacpp was run) associated with it. Normally, bbarep does not combine data when it detects two bbaunload's with different modification dates in the same bbadump.data file. However, the -o option tells bbarep to go ahead and combine the data.

If the number of branches has changed (for identical -DBBA_OPTO= options), the -o option is ineffective. You have made a significant change and the data cannot be reliably merged. In this case, the data associated with the newest file modification time will be retained and you will be notified via a warning message.

This option is useful when you have inadvertently changed the files modification date, but have not changed the branches. For example, if you added a comment, or changed the name of a variable, you might still want to combine old coverage data with new coverage data.

Example of use:

1. File "hello.c" is compiled with the -b option. The absolute file is created, run, and a bbaunload command is given.
2. File "hello.c" is edited, changing only a comment.
3. File "hello.c" is compiled and linked. The absolute is loaded into the emulator and run, and a bbaunload command is given.

Normally, running bbarep will result in the warning:

```
bbarep: warning: skipping data from older version of [illegible]
```

```
date of skipped file is 11/01/87 12:32:48
```

and the coverage data from the first run of "hello.c" is not used in creating the report. However, if the -o option is used, the warning:

```
bbarep: warning: using data from multiple versions of file hello.c
```

is given, but the data from both runs is ORed together to form the report.

DETAILS OF THE -F OPTION

This option suppresses the footnotes, which are printed after -s, -aN, -bN, and -l listings. If you use bbarep often, you may feel that the footnotes are not necesary. For a new user, they help in understanding the output.

This option is useful to generate listings with a minimum of extraneous output.

DETAILS OF THE -D[fvt] OPTION

This option causes bbarep to append various information after all of the previous options output. This information is useful when you wish to archive information about the test to make it easier to repeat the test, or to define exactly what was tested.

All of the options (-Df, -Dv, and -Dt) may be combined. The following paragraphs describe the output of each option and how to interpret the listings.

The -Dt Option

This causes a listing of "totals" to be printed to stdout. The following is an example of this list:

```
Number of compiled files: 3
Number of included files: 1
Number of functions: 7
Number of branches (including ignored branches): 56
```

The above list shows the following information:

1. Data for three files were contained in the bbadump.data file from which bbarep generated the report. This implies that these three files are .c files that had been compiled with the -a option to cc68020.

2. The three files had included (via the #include <file> directive) one file. The "Number of included files" is the number of unique files were included. In this example, either one, two, or three of the compiled files had included the same file.

3. There were a total of seven functions defined in the three compiled files

BEST AVAILABLE COPY

4. There were a total of 56 branches, including any branches that were "ignored".

The -Df Option

This option gives a listing for each file that was in "bbadump.data". An example output is shown in figure 5-10.

```
file__________modification date__options__branches__unloads___full path of file
dump1.c         10/14/1987 17:13  a  fi      23         7        /hp/dump1.c

Included files:
dumper.h        10/10/1987 09:58                                  /hp/dumper.h
```

Figure 5-10. Report Of bbadump.data Content

For each .c file, figure 5-10 shows the following:

1. The basename of the file (the file's full path is in the last column).
2. The modification date of the file (i.e., the last date/time that the file was modified).
3. The -DBBA_OPTO= options that were used when the file was compiled.
4. The number of branches (including "ignored" branches) in the file that were instrumented.
5. The number of emulation bbaunload commands that were given where the file was present.

For each included (.h) file, figure 5-10 shows:

1. The basename of the file (the file's full path is in the last column).
2. The modification date of the file (i.e., the last date/time that the file was modified).

Since the "dumper.h" file was included (via the #include directive), perhaps in several files, no other data can be shown. The #unloads and -DBBA_OPTO= options are determined by the file it was included in.

In cases where multiple runs were made with different -DBBA_OPTO= options, the output may look like figure 5-11.

```
file__________modification date__options__branches__unloads___full path of file
dump2.c         10/14/1987 17:13              9          2        /hp/dump2.c
                                  a          11          3
                                     fi      13          2
```

Figure 5-11. Reports Of Multiple Runs, Different -DBBA_OPTO= Options

BEST AVAILABLE COPY

Figure 5-11 shows that dump2.c was compiled three times (once with no -dBBA_OPTO= option, instrumenting nine branches, once with -DBBA_OPTO=a options, instrumenting 11 branches, and once with -DBBA_OPTO=fi options, instrumenting 13 branches).

Further, the version that was compiled with no -DBBA_OPTO= options was unloaded twice, the version that was compiled with -DBBA_OPTO=a was unloaded three times, and the version that was compiled with -DBBA_OPTO=fi was unloaded twice (which implies that the same test suite had NOT been executed with all three versions).

If you used the -o option to bbarep, and a file had multiple modification dates, the date field shows with a star (*), and a line is added in the report showing the modification dates. See figure 5-12.

```
bbarep: warning: using data from multiple versions of file dump1.c

file__________modification date__options__branches__unloads___full path of file
dump1.c        11/04/1987 15:01              12        2         /hp/dump1.c
                                  a          12        3
                  *                  fi      19        2
* = 11/04/1987 15:01, 10/31/1987 15:00
```

Figure 5-12. Report On Files With Multiple Modification Dates

Figure 5-12 shows that the file dump1.c was compiled twice with the -DBBA_OPTO=fi option, and was edited between compilations. Therefore, there were two modification dates: 11/04/1987 and 10/31/1987.

Only the first modification date for an included file is retained. Therefore, only one date will be displayed beside it.

The -Dv Option

By itself, the -Dv option simply prints the version of bbarep.

When used with -Df, it prints the version number of the bbacpp used to compile the files. Again, this option is designed to make it easier to document the environment in which the tests were executed.

BEST AVAILABLE COPY

NOTES

BEST AVAILABLE COPY

Chapter 6

TIPS ON MORE EFFECTIVE TESTING

INTRODUCTION

This chapter discusses "Makefiles". It shows you how to create them, and how to use them. This chapter also discusses regression testing. Finally, this chapter shows you how to use command files to run Makefiles and perform automatic regression testing.

MAKEFILES (MAKE)

The most common use of Makefiles is to list all of the files that must be included in an absolute file, and let the computer decide which files are newer than the absolute file, and, therefore, need to be recompiled and linked in order to update the absolute file.

This chapter is not intended to completely explain what `make` is capable of doing or how it works. This chapter is only provided to help you use Makefiles with the BBA analyzer. See the HP-UX manual entry on `make` (in section 1 of the HP-UX manual set) for a more complete description of `make`.

The HP-UX program `make` looks for a file of the name "Makefile" or "makefile" in your current directory, and reads it in order to determine what actions to take.

NOTE

---

If you use "Makefile" as your file's name, the file will show up first in any directory listing where the rest of the file's names are in lower case. This is useful, because it makes it clear to everybody who looks in the directory that a Makefile has already been written for that directory.

---

The following paragraphs describe how to create a Makefile, and how to use it to perform tasks.

In the discussion of Makefiles, the following terms will be used: "macros", "targets", "dependencies", and "actions". These terms are defined as follows:

1. Macros - identified by a token beginning in column 1 and followed by an equals (=) and value. Macros are referenced by $(<token>), which replaces the $(<token>) with its value. Both [illegible] and cc in figure 6-1 are macros.

2. Target - generally anything beginning in column 1, and followed by a colon. In figure 6-1, program is a target.

BEST AVAILABLE COPY

3. Dependency - whatever follows the colon after a target (objects and $(COBJ)). Dependencies are what the associated target depends on. In Figure 6-1, program depends on the expansion of $(COBJ). Also, there may be implied dependencies. For example, make understands that a <file>.o depends on a <file>.c.

4. Action - anything that doesn't begin in column 1 (preceded by at least one tab), and follows a target. These are the actions to take when the target is found to be out of date with respect to its dependencies. Actions must be preceded by tabs, NOT SPACES.

Makefile Without Branch-Analysis Capability

A simple Makefile is shown in figure 6-1. It will give you an idea of how make works. The "Makefile" in figure 6-1 is a Makefile without branch-analysis entries. It simply automates the task of making an up-to-date executable file. It will check to see if any of the object files are older than their corresponding source files, and it will compile new object files for any it finds that have more recent source files. Then it will link all object files together and deliver an up-to-date executable file.

To execute this form of makefile and obtain the executable file, all you need to do is type make on the command line and press RETURN. See figure 6-1.

```
COBJ= cprog.o csub.o
CC=cc68020
CFLAGS= -h
SHELL=/bin/sh

program : $(COBJ)
        $(CC) $(CFLAGS) -o program $(COBJ)
```

Figure 6-1. Example Makefile Without Branch-Analysis Entries

Make will go through the following actions:

1. The file shown in figure 6-1 will be read in.

a. The macro COBJ is defined to be the string cprog.o csub.o.

b. The macro CC is defined to be the string cc68020. It happens that the macro CC is used in make's default rule for creating .o files from .c files. Refer to letter "a" under number 2. below.

c. The macro CFLAGS is defined to be the string -h. It happens that the macro CFLAGS is used in make's default rule for creating .o files from .c files. Refer to letter "a" under number 2. below.

d. The macro SHELL is defined to be the string /bin/sh. It happens that the macro SHELL is the shell used by make when it executes commands.

e. The target program is found. It depends on the files cprog.o and csub.o (because the COBJ macro was expanded). Further, because this is the first target found, this is the default target, which is what will be made when no targets are mentioned on the make's command line.

f. The action for the target program is read in. It is the string

```
cc68020 -h -o program cprog.o csub.o
```

because the cc macro was expanded to become cc68020, the CFLAGS macro expanded to "-h", and COBJ was expanded to the object file names.

2. Make seeks to create its target (program).

a. The first dependency of program is cprog.o. Now Make tries to figure out if cprog.o depends on anything. Although there is no explicit rule (i.e., cprog.o is not a target in this makefile), make has a built-in rule that says "<any_file>.o depends on <any_file>.c". Now Make looks for the file cprog.c. When it finds cprog.c, it compares the modification dates of cprog.o and cprog.c. If cprog.o is older than cprog.c, make will execute its default rule for creating a .o from a .c file. The default rule is:

```
$(CC) $(CFLAGS) -c <any_file>.c
```

Therefore, in this case, the command

```
cc68020 -h -c cprog.c
```

is executed. After that, cprog.o is declared to be up-to-date with respect to all of its dependencies (cprog.c).

b. The second dependency of program is csub.o. The same rules are followed as in step a above. When they are finished, csub.o is declared to be up-to-date with respect to all of its dependencies.

c. Now the modification date of the file program is compared with the modification dates of cprog.o and csub.o. If program is newer, no action is taken. If program is older than either (or both) of its dependencies, the defined action is executed (i.e., the following command is executed):

```
cc68020 -h -o program cprog.o csub.o
```

When this command is executed, make is finished.

Makefile With Simple Branch-Analysis Capabilities

When you are ready to test your program using the BBA analyzer, you can simply modify your makefile. The appropriate modifications for the Makefile shown in figure 6-1 are illustrated in figure 6-2.

BEST AVAILABLE COPY

```
COBJ= cprog.o csub.o
CFLAGS= -h -b -DBBA_OPTO=A
CC=68020
SHELL=/bin/sh

program : $(COBJ)
        $(CC) $(CFLAGS) -o program $(COBJ)
```

Figure 6-2. Example Makefile Configured For Branch Analysis

In figure 6-2 above, CFLAGS was modified to add the -b option. This causes cc68020 to use the branch-analysis preprocessor. Also, -DBBA_OPTO=A was added. This will be passed to bbacpp, requesting that all branches be instrumented.

If you have previously compiled cprog.o and csub.o, you will need to force their .o files to appear to be "out of date" (with respect to their source files) in order to get make to recompile the files with the branch analysis information. There are two popular ways to do this:

1. Remove the .o files with a command like:

```
rm *.o
```

This actually removes ALL .o files in your current directory.

2. You can "touch" the .c files so they appear to have been edited. The following is a command to touch the files:

```
touch cprog.c csub.c
```

No matter which method you use, when make is run, it will execute the following commands:

```
cc68020 -h -b -DBBA_OPTO=A -c cprog.c
cc68020 -h -b -DBBA_OPTO=A -c csub.c
cc68020 -h -b -DBBA_OPTO=A -o program cprog.o csub.o
```

Note that the text created by expanding macro CFLAGS is used in of the invocations of cc68020. This is because of the default rule used to convert .c files to .o files, and because $(CFLAGS) was used on the action line to create program.

In this instance, neither -b nor -DBBA_OPTO=A were needed in the command to link the file. On the other hand the presence of -b and -DBBA_OPTO=A didn't hurt (it is considered good practice to use $(CFLAGS) wherever $(CC) is used.

When you have finished doing your testing with branch analysis, you need to remove the branch-analysis structures from your makefile. This returns the file to its former arrangement (figure 6-1).

Makefile With And Without Branch-Analysis Capabilities

Figure 6-3 shows an example makefile that can be used to make an executable file with or without the branch-analysis structures. Figure 6-3 makes the object files with different CFLAGS.

depending on whether or not you want to make an executable file that has branch analysis, or one that has no branch analysis.

It is almost as simple to write this makefile as it is to write the preceding two makefiles (figures 6-1 and 6-2). You can use it to make an executable file that includes all of the branch-analysis structures, and then use it again to create an executable file that has none of the branch-analysis features. You don't have to make any changes to the content of this makefile to obtain either one of the executable files. All you have to do is change the command you type on the command line when you invoke the makefile, depending on the kind of executable file you want.

If you want an executable file that has no branch-analysis features, type: make RETURN. The make routine will search for the first target in the makefile (the default), and make the executable file according to that target. The first target is program, which produces an executable file with no branch-analysis features.

If you want an executable file that has all of the branch-analysis features, type: "make bba" RETURN. The make routine will find your makefile and search through it until it finds the bba target. Then it will do whatever work is necessary to get the bba target up-to-date with respect to its dependencies. The commands under the bba target make the executable file with branch-analysis features:

```
#    Target      Action
#    program     creates 'program' without branch analysis
#    bba         creates 'program' with branch analysis
#    object      forces the .o files to be up-to-date with the .c files

COBJ= cprog.o csub.o
CC=cc68020
CFLAGS= -h
SHELL=/bin/sh

program : objects
        $(CC) $(CFLAGS) -o program $(COBJ)


objects : $(COBJ)

bba :
        $(MAKE) CFLAGS="$(CFLAGS) -b -DBBA_OPTO=A" objects
        $(CC) $(CFLAGS) -o program $(COBJ)
```

Figure 6-3. Example Makefile That Makes Either Executable File Desired

The Makefile in figure 6-3 shows the following new ideas:

1. Any text following a pound sign (#) is a comment.

2. A target (bba) can have no dependencies. In this case, make assumes that the target is up-to-date if its file exists (and its actions are not run). If the file does not exist, the actions are executed.

BEST AVAILABLE COPY

3. It is OK to invoke make from within make, as long as you avoid infinite recursion. In this case, the re-invocation of make occurs when "bba" is the target to be made. The macro MAKE is (by default) the text "make" so when "make bba" is executed, the first action taken is:

```
make CFLAGS="-h -b -DBBA_OPTO=A" objects
```

This causes another make to do the actions necessary to get "objects" up-to-date with respect to its dependencies. This leads to the next "new idea".

4. A target (objects) which is never created is assumed to always be out of date with respect to its dependencies. In this case, trying to get objects up to date causes cprog.o and csub.c to be recompiled (assuming they need to be) - but adding -b -DBBA_OPTO=A to CFLAGS!

From the above discussion, you know that in order for this makefile to work correctly, you need to force the .o files to become out of date with respect to their .c files (via touch, for example) whenever you have been compiling for one target and want to switch to another target. The advantage of this is that if you make changes and want to compile again using the same target, it's easy to do so. The disadvantage is that if you forget to touch the .c source files when you switch to the other target, you might get annoyed with the result.

Another disadvantage of the Makefile in figure 6-3 is that when the make bba command is given, the following commands will always be executed:

```
make CFLAGS="-h -b -DBBA_OPTO=A" objects
cc68020 -h -o program cprog.o csub.o
```

even if none of the .c files have been modified.

Automatic Makefile With And Without Branch-Analysis Capabilities

The following Makefile will 'remember' whether you compiled with branch analysis or without branch analysis the last time that make was run. This means that you can just type make bba if you want the branch analysis version and not have to worry about whether or not to touch your source files, etc.

BEST AVAILABLE COPY

```
#   Target      Action
#   program      creates 'program' without branch analysis
#   bba         creates 'program' with branch analysis
#   object      forces the .o files to be up-to-date with the .c files

CSRC= cprog.c csub.c
COBJ= $(CSRC:.c=.o)
CC=cc68020
CFLAGS= -h
SHELL=/bin/sh

program ::
        if [ ! -f .NORMOBJ ]; then rm *.o ; touch .NORMOBJ; fi

program :: objects
        $(CC) $(CFLAGS) -o program $(COBJ)

bba ::
        if [ ! -f .BBAOBJ ]; then rm *.o ; touch .BBAOBJ; fi
        $(MAKE) CFLAGS="$(CFLAGS) -b -DBBA_OPTO=A" objects

bba ::    objects
        $(CC) $(CFLAGS) -o program $(COBJ)
        touch bba

objects : $(COBJ)
```

Figure 6-4. Example Makefile #4

The Makefile shown in figure 6-4 has three new ideas:

1. There is a primitive macro-replacement facility in make. In the case of figure 6-4, the macro CSRC was defined to be our C source files, and COBJ was defined to be the text of CSRC, but with the ".c" entries replaced with ".o" entries.

2. If a target is followed by two colons (e.g., program ::), then make will permit multiple instances of that target; each instance of the target is executed sequentially.

3. The full power of the HP-UX shell is available in the actions; in this case, the shell's if statement and file-existence test ([ -f <file> ] is a shell command to return TRUE if <file> exists; Refer to the HP-UX manual pages on sh and test, both in section 1, for more information).

When make bba is executed, the command

```
if [ ! -f .BBAOBJ ]; then rm *.o ; touch .BBAOBJ; fi
```

is executed. It checks for the existence of the file .BBAOBJ. If it does not exist, then all .o files are deleted, and the file .BBAOBJ is created. This is done so that the next time make bba is executed, the file .BBAOBJ will exist and the .o files will not be deleted. The files .BBAOBJ and .NORMOBJ are used to remember which CFLAGS were last used during compilation. These two file names begin with a dot (.) so that they don't clutter up a normal listing (but you can force ls to show them by using the -a flag. Refer to the HP-UX manual page on ls, in section 1).

Then the line

```
make CFLAGS="-h -b -DBBA_OPTO=A" objects
```

is executed, which causes any out-of-date .o files to be made.

Finally, the modification date of the bba file is compared with the modification dates of cprog.o and csub.o. If they are newer, the following commands are executed:

```
cc68020 -h -o program cprog.o csub.o
touch bba
```

The first line causes program to be relinked, and the second causes the file bba to be touched so that if another make bba command is given (without any source files having been changed) another link is avoided.

The only problem with the makefile in figure 6-4 is that if you frequently go between non-branch-analysis links and branch-analysis links, you will be recompiling ALL of your source files each time you do so.

Automatic And Efficient Makefile With And Without Branch-Analysis Capabilities The Makefile shown in figure 6-5 has several advantages:

1. It will minimize the number of compilations done for each target (non-bba and bba).

2. It will automatically re-compile files that have been changed since the last time they were compiled for the same target (non-bba and bba).

The automatic Makefile also has the disadvantage of potentially using a lot of disc space!

```
#   Automatic Makefile Example.
#   Target        Action
#   program        compiles & links without bba
#   bba           compiles & links with bba

CSRC=cprog.c csub.c      # list of source files
COBJ=$(CSRC:.c=.o)      # list of object files we want (der  ed from source list)
CC=cc68020
CFLAGS= -h
SHELL=/bin/sh

program ::
   if [ ! -f .NORMOBJ ]; then \
      if [ -f .BBAOBJ ] ; then \
         rm .bbaobj/*.o ; ln *.o .bbaobj; rm .BBAOBJ; \
      fi; rm *.o ; ln .normobj/*.o; touch .NORMOBJ; \
   fi; exit 0

program :: objects
   $(CC) $(CFLAGS) -o program $(COBJ)

bba   ::
   if [ ! -f .BBAOBJ ]; then \
      if [ -f .NORMOBJ ] ; then \
         rm .normobj/*.o ; ln *.o .normobj; rm .NORMOBJ; \
      fi; rm *.o ; ln .bbaobj/*.o; touch .BBAOBJ; \
   fi; exit 0

bba ::
   $(MAKE) CFLAGS="$(CFLAGS) -b -DBBA_OPTO=A" objects
   $(CC) $(CFLAGS) -o program $(COBJ)

objects : $(COBJ)
```

Figure 6-5. Fully Automatic Makefile

The Makefile shown in figure 6-5 uses two subdirectories: `.bbaobj`, and `.normobj`. When you go from using branch analysis to not using it, for example, the current `.o` files (which were created with branch analysis) are copied to the directory `.bbaobj`, then removed from the current directory. The file `.BBAOBJ` is removed, preventing any further copying of files down to `.bbaobj`.

The `.o` files in `.normobj` are copied to the working directory, and the `.NORMOBJ` file is created.

If the next `make` command creates `program`, the file `.NORMOBJ` exists, so the only actions are to update the `.o` files and perhaps re-link.

BEST AVAILABLE COPY

AUTOMATIC REGRESSION TESTING

The problem of verifying that software is correct grows geometrically with the size and complexity of the program under development. You can increase the coverage of your tests by doing module-based testing. This form of testing can be more precise, and cover more possibilities. The traditional method of testing code is to wait until the code is complete and then test it as a whole. This makes it difficult, if not impossible, to measure the performance of sections of the code that are embedded deep within the program. For example, if a module of code is intended to convert the values of a Gray-code counter to a linear count, and then send the result to an LED display, you can only test its performance by putting different values into the Gray-code hardware and then observing the display. This is time consuming and prone to error.

The following paragraphs will show you a way to (1) isolate such modules (or functions) for testing, and also (2) to automate the testing process itself.

The programmability of HP-UX and the controlling power inherent in an emulator make test automation easy. In fact, you can create "regression tests" that start when nobody is around and store the results for reporting later. This means changes in one section of code that cause unexpected behavior in another section of code can be detected and fixed early in the project.

The basis of this test method is to write the tests at the same time you write the code module. In this way, the tests tend to be more complete because you are most familiar with the code module when you are writing it. This is called "white-box testing". Also, writing tests for a single module at the same time as writing the module itself is relatively painless when compared with the task of writing all of the tests at the end of the project.

The tests are written in the form of HP-UX shell scripts combined with HP64000-UX command files.

The HP64000-UX command files do the following tasks:
1. Load the program (or perhaps a portion of the program).
2. Set up the initial test data.
3. Run the program from the start of the module to the end of the module.
4. Write the resulting data out to a file.
5. Repeat the preceding test with new data. This repetition continues until the module under test has operated on a sufficient variety of data to give a high degree of confidence in its performance. (i.e., bbarep shows a sufficiently high coverage percentage).

The HP-UX shell script executes HP64000-UX command files, and compares the outputs generated with 'known good' output.

Alternatively, a Makefile can be written to execute the HP64000-UX command files and compare the outputs.

When combined with the HP-UX "crontab" command, the HP-UX shell scripts can be automatically run on a regular schedule, and the results "mailed" to you (or to a group of people) via HP-UX "mail".

BEST AVAILABLE COPY

DETAILED EXAMPLE - AUTOMATIC REGRESSION TESTING

Suppose you are writing a function to convert a 64-bit integer into a decimal string. Call the function "I64toa". Your function is normally invoked after an A/D has sampled a line, then added an offset factor, and then multiplied the result by a scale factor. To test this function, you decide to send it a series of selected values, and check that the output is correct for each value. You choose inputs that will inspect the boundary conditions (or, perhaps, you start with some input data and let bbarep guide you in creating more complete data):

| input, hex | output, ASCII |
|---|---|
| 0000000000000000 | 0 |
| 0000000000000001 | 1 |
| 0000000000007FFF | 32767 |
| 0000000000008000 | 32768 |
| 0000000000008FFF | 36863 |
| 000000000000FFFF | 65535 |
| 0000000000010000 | 65536 |
| 0000000000100000 | 1048576 |
| . | . |
| . | . |
| . | . |
| 1000000000000000 | 1152921504606846976 |
| 7FFFFFFFFFFFFFFF | 9223372036854775087 |
| 8000000000000000 | 9223372036854775088 |
| FFFFFFFFFFFFFFFF | 18446744073709551615 |

Figure 6-6. Input/Output Selected For Example Test

If you were testing without an emulator, you would have to figure out what voltage to send to the A/D, and determine the appropriate scale factors to use in order to test this function. By having an emulator in your test equipment, you can simply set the necessary values in the data areas read by i64toa, and let the module run.

Figure 6-7 shows an example HP64000-UX command file that could be used to make the example test with data in figure 6-6.

BEST AVAILABLE COPY

```
# FILE: i64toa.cmd
#
load memory bigprog            # load in the big program
# input value is 0000000000000000H
modify memory i64toa_msword to 0
modify memory i64toa_mshword to 0
modify memory i64toa_mslword to 0
modify memory i64toa_lsword to 0
run from i64toa until i64toa end
wait measurement_complete
copy memory i64toa_ascii thru i64toa_ascii + 20 absolute bytes
               to i64toa.lst.2

# input value is 0000000000000001H
modify memory i64toa_msword to 0
modify memory i64toa_mshword to 0
modify memory i64toa_mslword to 0
modify memory i64toa_lsword to 1
run from i64toa until i64toa end
wait measurement_complete
copy memory i64toa_ascii thru i64toa_ascii + 20 absolute bytes
               to i64toa.lst.2
```

... and so on.

Figure 6-7. Command File To Run Example Test

BEST AVAILABLE COPY

HP-UX SCRIPTS TO RUN HP64000-UX COMMAND FILES

Figure 6-8 shows an example HP-UX shell script that runs the example test.

```
# FILE: i64toa
#
#       test the i640toa program
#
#       The z80 emulator is in measurement system 'testsys', and
#       is called 'z80'

rm -f i64toa.lst.2              # remove old attempt

# Start the emulator, telling it to execute commands from
# the i64toa command file:
echo "i64toa.cmd" | testsys z80        # run the test command files

# compare the 'known good' output with what we just got:
# Put the comparison results in a temporary file so we can
# print them without having to run diff again ....

diff i64toa.lst i64toa.lst.2 > .tmpdiff$$ 2>&1

# If the diff program found a difference, print an error message;
# else report that the program completed successfully
if [ $? != 0 ]
then
     echo "ERROR: i64toa.cmd: the 64-bit to ASCII conversion
                        function failed!"
       cat .tmpdiff$$
else
       echo "OK: i64toa.cmd: the 64-bit to ASCII conversion
                        function passed!"
fi
rm -f .tmpdiff$$
```

Figure 6-8. HP-UX Script To Run The Example Command File

Note that the example HP-UX shell script in figure 6-8 uses the same format, no matter which modules are being tested. To create new shell scripts when you need them, you can probably copy your most recent shell script and change the names to identify the new command files. After you have finished testing a module, you can include its test in the master-testing file (test_master) which is run automatically each day. Figure 6-9 shows an example of a master-test shell script.

```
# FILE: test_master
#
#       This file invokes all regression tests.
#       It is run from cron each night and the results
#       are mailed to me each morning

        i64offset           # test offset function
        i64scale            # test the scaling system
        i64toa              # test conversion to ASCII
```

Figure 6-9. Master-Test Shell Script Example

MAKEFILE TO RUN HP64000-UX COMMAND FILES

You can also use a Makefile to run the tests and compare output. This method tends to hold the tests together better (i.e., centralize and standardize the tests, because everybody knows how to run make).

Figure 6-10 shows a Makefile that is analogous to both the test_master and i64toa files used in this example (figures 6-7 and 6-8).

BEST AVAILABLE COPY

```
#   Testing Makefile
#   target      action
#   all         execute all tests
#   i64toa      test the function i64toa()

MSYS=testsys   # measurement system's name
EMUL=z80        # emulator's name
DIFF=diff      # text comparitor program
SHELL=/bin/sh

all : i64toa i64offset i64scale

i64toa :
   rm -f i64toa.lst.2      # remove old attempt
   echo "i64toa.cmd" | $(MSYS) $(EMUL)      # execute command file
   if $(DIFF) i64toa.lst i64toa.lst.2 > .tmpdiff; then \
      echo "i64toa.cmd: the 64-bit to ASCII conversion function passed!"; \ else
      echo "i64toa.cmd: the 64-bit to ASCII conversion function failed!";
           cat .tmpdiff; fi
```

Figure 6-10. Example Makefile To Run HP64000-UX Command Files

Note that, when you add new tests, all you have to do is copy the actions of i64toa and change the text i64toa to the name of the new test; very easy in most editors!

ADVANTAGES OF AUTOMATIC REGRESSION TESTING

Performing automatic regression testing during the software-development phase of a project offers several advantages. These are listed below:

1. Tests are written as code is developed, increasing test coverage.
2. The risk of propagating undetected defects is decreased.
3. The effort of designing tests is spread out over the entire project instead of piling up at the end.
4. Unexpected side effects of code changes are detected quickly.
5. The task of developing a quality-assurance test routine for the entire program is greatly simplified.

BEST AVAILABLE COPY

NOTES

BEST AVAILABLE COPY

Appendix A

ERROR AND WARNING MESSAGES

INTRODUCTION

This appendix contains a list of error and warning messages that you may see when using the BBA analyzer. The list in this chapter is separated into the following three sections:

1. Messages that may be generated during preprocessing.
2. Status-line messages that may appear while using the bbaunload command.
3. Messages that may be generated when running bbarep.

Conventions used in this chapter are described below:

1. <sfx> stands for a specific single character. In the actual error message it will be replaced by the actual suffix.
2. <mapfile> stands for the name of a map file (such as /hp/goodyear/blimp.M).
3. <file> stands for a file name. The type of file depends on the context of the message.
4. <flag> stands for a command-line flag (such as -DBBA_OPTS).
5. <num> stands for a decimal integer (such as 64).
6. <line> stands for a line number in <file>.
7. <sym> stands for a C symbol.
8. <date> stands for a date and time, in the current time zone.

BBACPP MESSAGES

Bbacpp68020 always sends its messages to stderr. In addition to the error messages that cpp68020 can generate, bbacpp68020 can generate the following messages:

```
"<file>", <line>: Illegal operand type combination for '?:'.
```

This message actually comes from cc68020. If you do not normally see this message when you compile your program, refer to Chapter 3 for more information about "the -DBBA_OPTO=a option".

```
<file>: <line>: ERROR: cscanorigtext: unexpected \\0 when looking for a \\002
```

This message should never happen. It implies that the temporary file was truncated between passes.

BEST AVAILABLE COPY

`<file>: <line>: No string delimeter`

A string was started (with either a single quote or double quote), and an end-of-line was found before the matching quote was found. Note that you can end a line with a backslash (\\) and continue a string on a following line with no problems.

`<file>: <line>: Out of push-back-line memory; use -DBBA_OPTpNNN, where NNN is greater than <num>`

Refer to Chapter 3 for more information about DETAILS OF THE -DBBA_OPTpNNN OPTION.

`<file>: <line>: Syntax error` bbacpp68020 has detected a syntax error in `<file>` at line `<line>`. Use the cc68020 compiler without the `-b` option for a more complete syntax/semantic check (bbacpp68020 does not do a semantic check).

`<file>: <line>: Too many syntax errors` bbacpp68020 detected too many syntax errors, and is giving up its attempt to parse the file.

`<file>: <line>: Unexpected end of comment`

The end of the C source file was found before the end of a comment.

`<file>: <line>: Unknown preprocessor directive`

A line beginning with `#` was found that bbacpp68020 could not parse. Note that

```
# pragma <anything>
```

is always legal!

`<file>: <line>: symbol '<sym>' conflicts with bba symbol`

The symbol `<sym>` begins with `_bA_`, which is reserved for use by the BBA analyzer. You can either change the name of the symbol, or choose not to use bbacpp on files that reference that symbol.

BEST AVAILABLE COPY

```
<file>: <line>: Yacc stack overflow
```

This message indicates that an expression on line <line> has become too complex. Simplify your expression.

```
bbacpp68020: ERROR: cgets: unexpected EOF while searching for a \003
```

This message can happen if you have the legal characters ^A, ^B, or ^C in your file (probably in comments or strings).

```
bbacpp68020: cannot generate map file '<mapfile>' because that would overwrite an
   unknown-type file (use the -DBBA_OPTM<suffix> to choose a suffix different from '<sfx>'
```

This message is warning you that the mapfile will not be generated. Refer to Chapter 3 for the discussion of the DETAILS OF THE -DBBA_OPTS OPTION for the implications of not having a map file. The mapfile is not generated because a file already exists that has the same name as the mapfile, and this already existing file is not a BBA analyzer mapfile.

```
bbacpp68020: cannot generate map file '<mapfile>' because that would overwrite the
   source file (use the -DBBA_OPTM<suffix> to choose a suffix different from 'c')
```

This message warns you that the mapfile will not be generated. Refer to Chapter 3 for the discussion of DETAILS OF THE -DBBA_OPTS OPTION for the implications of not having a map file.

```
bbacpp68020: cannot generate map file because file name '<file>'
   is too long to append .<sfx>
```

This message warns you that the mapfile will not be generated. Refer to Chapter 3 for the discussion of DETAILS OF THE -DBBA_OPTS OPTION for the implications of not having a map file. The mapfile is not generated because the file has no extension and there are not enough characters left in the file name to uniquely append a suffix.

```
bbacpp68020: cannot open map file <mapfile> for output
```

This message warns you that the mapfile will not be generated. Refer to Chapter 3 for the discussion of DETAILS OF THE -DBBA_OPTS OPTION for the implications of not having a map file. The mapfile is not generated because a file already exists that has the same name as the mapfile, but the permissions of the existing file will not allow bbacpp to write to it.

Basis Branch Analysis
Error And Warning Messages

BEST AVAILABLE COPY

`bbacpp68020: cannot read file offset`

This message should never happen. It implies that the temporary file was truncated between passes. If this occurs, somebody else probably deleted the file accidently while you were running bbacpp68020. Try again.

`bbacpp68020: cannot reposition input`

This message should never happen. It implies that the temporary file was truncated between passes.

`bbacpp68020: could not open <file> for output`

The file post-cpp file that bbacpp68020 was requested to create is write protected. This should not happen, since cc68020 requests output to a file in /usr/tmp or /tmp (and temporary files should never be write protected).

`bbacpp68020: exceeded maximum scoping (<num>)`

This message states that more nested blocks were found than could be handled by bbacpp68020. This should not happen because bbacpp68020 can handle the same number of nesting as cc68020.

`bbacpp68020: incorrect parent process`

A command other than `cc68020 -b` attempted to invoke bbacpp68020.

`bbacpp68020: pass2 could not open pass1's output file` bbacpp68020 operates in two passes. The first pass does the cpp processing, and the second pass parses the post-cpp output. The output of the first pass is stored in a temporary file in the directory /usr/tmp or /tmp. If this message appears, it implies that something has deleted the temporary file (which should never happen).

`bbacpp68020: unable to write output file` bbacpp68020 attempted to write to a file and failed, either due to the file system being full or to a hardware (disk I/O) error.

BEST AVAILABLE COPY

```
bbacpp68020: unknown flag <flag>
```

An unknown flag was used on the command line and passed to bbacpp68020. This does not affect processing. It is an advisory message, only.

BEST AVAILABLE COPY

BBAUNLOAD MESSAGES

The bbaunload command in emulation always sends its error messages to the status line.

`<file> can't be appended`

The file "bbadump.data" file `<file>` is write protected.

`<file> can't be opened`

This shows that <file> (which is your absolute file) could not be opened. Since it must be valid for the emulator to have loaded your absolute, either you have entered an incorrect file name, or the file has been deleted.

`Can't look up name of symbol (<sym>)`

This should not happen. It shows that the symbol database is corrupt.

`Can't search the symbol database`

This should not happen. It shows that the symbol database is corrupt.

`Incorrectly formatted dump file`

The file "bbadump.data" file `<file>` is either not a "bbadump.data" file, or parts of the file have been deleted.

`No root symbol`

This should not happen. It shows that the symbol database is corrupt.

`dump protocol <num> is newer than known protocol <num>`

The version of bbacpp is newer than the version of your emulator. You must get a new version of the emulator software (or use an older version of bbacpp).

`insert protocol <num> is newer than known protocol <num>`

The version of bbacpp is newer than the version of your emulator. You must get a new version of the emulator software (or use an older version of bbacpp).

`spec file is corrupt`

The file /usr/hp64000/lib/68020/bbacpp.spec has been modified. Reload it from the product tape.

`insert protocol <num> is newer than known protocol <num>`

The version of bbacpp is newer than the version of your emulator. You must get a new version of the emulator software (or use an older version of bbacpp).

`spec file is corrupt`

The file /usr/hp64000/lib/68020/bbacpp.spec has been modified. Reload it from the product tape.

BEST AVAILABLE COPY

BBAREP MESSAGES

Bbarep always sends its error messages to stderr.

```
bbarep: <file>: <line>: error in dump time
```

This shows that the bbadump.data file <file> became corrupt between the time the emulation command 'bbaunload' wrote it, and bbarep tried to read it. bbarep cannot generate any reports when this happens.

```
bbarep: <file>: <line>: expected ':array' line; did not find it
```

This shows that the bbadump.data file <file> became corrupt between the time the emulation command 'bbaunload' wrote it, and bbarep tried to read it. bbarep cannot generate any reports when this happens.

```
bbarep: <file>: <line>: illegal ':array' line
```

This shows that the bbadump.data file <file> became corrupt between the time the emulation command 'bbaunload' wrote it, and bbarep tried to read it. bbarep cannot generate any reports when this happens.

```
bbarep: <file>: <line>: illegal ':dump' line
```

This shows that the bbadump.data file <file> became corrupt between the time the emulation command 'bbaunload' wrote it, and bbarep tried to read it. bbarep cannot generate any reports when this happens.

```
bbarep: <file>: <line>: illegal ':file' line
```

This shows that the bbadump.data file <file> became corrupt between the time the emulation command 'bbaunload' wrote it, and bbarep tried to read it. bbarep cannot generate any reports when this happens.

```
bbarep: <file>: <line>: no ':dump' line
```

This shows that the bbadump.data file <file> became corrupt between the time the emulation command 'bbaunload' wrote it, and bbarep tried to read it. bbarep cannot generate any reports when this happens.

BEST AVAILABLE COPY bbarep: <file>: <line>: no ':dump' line, or ':dump' line out of order This shows that the bbadump.data file <file> became corrupt between the time the emulation command 'bbaunload' wrote it, and bbarep tried to read it. bbarep cannot generate any reports when this happens.

bbarep: <file>: <line>: no ':file' lines; no branch data in dump file

This shows that the bbadump.data file <file> became corrupt between the time the emulation command 'bbaunload' wrote it, and bbarep tried to read it. bbarep cannot generate any reports when this happens.

bbarep: <file>: <line>: unexpected :array line

This shows that the bbadump.data file <file> became corrupt between the time the emulation command 'bbaunload' wrote it, and bbarep tried to read it. bbarep cannot generate any reports when this happens.

bbarep: <file>: <line>: unexpected end of file

This shows that the bbadump.data file <file> became corrupt between the time the emulation command 'bbaunload' wrote it, and bbarep tried to read it. bbarep cannot generate any reports when this happens.

bbarep: <file>: <line>: unknown line

This shows that the bbadump.data file <file> became corrupt between the time the emulation command 'bbaunload' wrote it, and bbarep tried to read it. bbarep cannot generate any reports when this happens.

bbarep: <mapfile>: <line>: error in modification date

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

BEST AVAILABLE COPY

`bbarep: <mapfile>: <line>: illegal ':option' line`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: <mapfile>: <line>: illegal ':probe' line`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: <mapfile>: <line>: illegal ':source' line`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: <mapfile>: <line>: missing at least one :probe line`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: <mapfile>: <line>: no ':options' line`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: <mapfile>: <line>: no ':protocol' line, or ':protocol' line out of order`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: <mapfile>: <line>: unknown control line`

This shows that the mapfile became corrupt between the time bbacpp wrote it and bbarep tried to read it. This causes bbarep to act as if the <mapfile> does not exist. Refer to Chapter 3 for the discussion on DETAILS OF THE -DBBA_OPTS OPTION for the implications of not having a map file.

`bbarep: Unable to read protocol level (<num>) of dump file <file>`
`(current maximum protocol level for dumpfiles is <num>)`

This shows that the bbaunload emulation command generated a dumpfile that bbarep could not read because the emulator is a newer version than bbarep.

`bbarep: Unable to read protocol level (<num>) of map file <mapfile>`
`(current maximum protocol level for mapfiles is <num>)`

This shows that bbacpp generated a mapfile that bbarep could not read because bbacpp is a newer version than bbarep. This causes bbarep to act as if the <mapfile> does not exist (because you did not invoke bbarep with the -o option). Refer to Chapter 3 for the discussion on DETAILS OF THE -DBBA_OPTS OPTION for the implications of not having a map file.

`bbarep: cannot derive a mapping file name for <file>`

This message warns you that bbacpp was run on a file for which no mapping file could be generated (you would have also been warned of this while bbacpp was running).

`bbarep: cannot find <mapfile>, or it is not a mapping file`

This implies that the mapfile either does not exist, is not readable, or is not of the correct type.

`bbarep: cannot open <file>, or it is not a Basis Branch Analysis dumpfile`

Either <file> does not exist, it is not readable, or it is not the correct format for a bbadump.data file.

`bbarep: error: cannot merge data for <file>`
`(different -O= options have identical map-suffixes; no analysis done for file)`

The bbadump.data file contains at least two entries for <file> which show different -DBBA_OPTO= options, but the map suffix for different -DBBA_OPTO= options are identical. This means that one of the mapfiles was overwritten, so there is no reliable way to merge the data. Bbarep will act as if the file was not compiled using bbacpp.

BEST AVAILABLE COPY

```
bbarep: error: cannot merge data for <file>
(no map-suffix information; no analysis done for file)
```

The bbadump.data file contains at least two entries for <file> which show different -DBBA_OPTO= options. However, at least one of the mapfiles does not exist (or isn't readable), so there is no reliable way to merge the data. Bbarep will act as if the file was not compiled using bbacpp.

```
bbarep: warning: ignoring mapsuffix of '<sfx>' for source file '<file>'
```

The bbadump.data file contains at least two entries for <file>. Both of these entries show that <file> had the same -DBBA_OPTO= options, both have the same number of branches, and both have the same modification date, but they have different mapfile suffixes. In this case, bbarep will search for a mapfile with the first suffix, and ignore the mapfile with the second suffix.

```
bbarep: warning: mapfile '<mapfile>' has different number of probes
than the dump file shows; some functions disallowed for <file>
```

This shows that <mapfile> is out-of-date with respect to data in the bbadump.data file. This causes bbarep to act as if the <mapfile> does not exist. Refer to Chapter 3 for the discussion on DETAILS OF THE -DBBA_OPTS OPTION for the implications of not having a map file.

```
bbarep: warning: mapfile '<mapfile>' shows different source date than dumpfile
```

The source modification date stored in the <mapfile> is different from the date stored in the dumpfile; however, the number of branches detected and the options used to create the mapfile are the same. This warns you that some data may not be correct, but you invoked bbarep with the -o option (forcing it to retain the old data).

```
bbarep: warning: mapfile '<mapfile>' shows different source date than dumpfile
some functions disallowed for <file>
```

The source modification date stored in the <mapfile> is different from the date stored in the dumpfile; however, the number of branches detected and the options used to create the mapfile are the same. This causes bbarep to act as if the <mapfile> does not exist (because you did not invoke bbarep with the -o option). Refer to Chapter 3 for the discussion on DETAILS OF THE -DBBA_OPTS OPTION for the implications of not having a map file.

BEST AVAILABLE COPY

`bbarep: warning: skipping data from file <file> showing <num> branches`
`date of both files is the same`

The bbadump.data file contains at least two entries for <file>. Both of these entries show that <file> had the same -DBBA_OPTO= options, and both have the same modification date, but they have a different number of branches. In this case, the data associated with the fewer number of branches is ignored.

`bbarep: warning: skipping data from file <file> showing <num> branches`
`date of file skipped is <date>`

The bbadump.data file contains at least two entries for <file>. Both of these entries show that <file> had the same -DBBA_OPTO= options, but they have different branches and the source file has different modification dates. In this case, the data associated with the oldest modification date is ignored.

`bbarep: warning: using data from multiple version of file <file>`

The bbadump.data file contains at least two entries for <file>. Both of these entries show that <file> had the same -DBBA_OPTO= options, both have the same number of branches, but they have different source modification dates. This warns you that some data may not be correct, but you invoked bbarep with the -o option (forcing it to retain the old data).

NOTES

BEST AVAILABLE COPY

Appendix B

FILES IN THE DEMO2/START DIRECTORY

INTRODUCTION

The /usr/hp64000/demo/bbacpp/demo2/start directory contains eight files that are used during the first portion of the Getting Started procedure in Chapter 2. The listings of these files are contained in this appendix. Line numbers have been added to the listings for your convenience.

```
Makefile        Makefile.old    convert.c       driver.c        getkey.c
input           keymap.h        multibits.c
```

Basis Branch Analysis
Files In The DEMO2/START D. tory

BEST AVAILABLE COPY start/Makefile

```
#   Example Makefile
#
#   target      action
#   runtest      creates test program (runtest) w/o bba
#   bbatest      creates test program (bbatest) w/bba
#
#   NOTE: the file .NORMAL is present if the last compile did not use bba
#   the file .BBA is present if the last compile did use bba

BBACMD= -b
BBAOPT= -DBBA_OPTO=A
CFLAGS= -ghw
SHELL=/bin/sh
CC=cc68020
#   Source files
CSRC = convert.c driver.c getkey.c multibits.c
#   Object files
COBJ = $(CSRC:.c=.o)

#   Normal make
#   First check to see if the last time we compiled we
#   used bba.  If so, delete the object files and remind
#   ourselves that we are compiling without bba.
runtest ::
	-if [ ! -f .NORMAL ] ; then rm $(COBJ) .BBA; touch .NORMAL; fi

#   Now compile any out-of-date object files
runtest :: $(COBJ)
	# link the object files into the file 'runtest'
	$(CC) $(CFLAGS) -o runtest $(COBJ)

#   Bba make
#   If last time we compiled without bba remove all .o files;
#   then compile any out-of-date files.
bbatest ::
	-if [ ! -f .BBA ] ; then rm $(COBJ) .NORMAL; touch .BBA; fi
	$(MAKE) CFLAGS="$(CFLAGS) $(BBACMD) $(BBAOPT)" runobjs

bbatest :: $(COBJ)
	$(CC) $(CFLAGS) -o bbatest $(COBJ)


runobjs :   $(COBJ)
	touch runobjs
```

BEST AVAILABLE COPY start/Makefile.old

```
#   Example Makefile
#
#   target      action
#   runtest      creates test program (runtest)
#

CFLAGS= -g
CC=cc68020
SHELL=/bin/sh

#   Source files
CSRC = convert.c driver.c getkey.c multibits.c
#   Object files
COBJ = $(CSRC:.c=.o)

#   Main target.  Create a program to test the 'getkey.c' file.
runtest : $(COBJ)
    $(CC) $(CFLAGS) -o runtest $(COBJ)
```

BEST AVAILABLE COPY start/convert.c

```
/*   Example program for use with Branch Analysis */

/* Routines to convert a single key to it's KEY_ definition
   (see keymap.h for KEY_ definitions)
*/

#include "keymap.h"      /* include file of definitions */

/* FUNCTION */
int
keyconvert(horiz, vert)
short horiz;      /* horizontal bit map */
short vert;         /* vertical bit map */

/*
 *      We now know that only one key is being pressed.
 *      Convert it & return it!
 */
{
   int keycode;      /* keycode we will return */

   /* Do different actions based on the column he has pressed */
   switch(vert)
   {
   case 1:   /* pressing first column of keys */
      keycode = bitpos(horiz) + KEY_A;
      break;
   case 2:   /* pressing second column of keys */
      keycode = bitpos(horiz) + KEY_F;
      break;
   case 4:   /* Pressing third column of keys */
      keycode = bitpos(horiz) + KEY_1;
      break;
   case 8:   /* pressing fourth column of keys */
      keycode = bitpos(horiz) + KEY_6;
      if (keycode > KEY_9)      /* special case for 0 key */
         keycode = KEY_0;
      break;
   case 16:   /* pressing fifth column of keys */
      keycode = KEY_RUN;
      do
      {
         /* If lowest bit is set, return it's keycode */
         if (horiz == 1)
            return(keycode);
         horiz = horiz >> 1;
         keycode++;
      }
      while (horiz != 0);
   }
```

```
    return(keycode);
}

/* FUNCTION */
int bitpos(array)
short array;      /* array with a bit set */

/*
 *      This routine returns which bit (0-7) was set
 *      in 'array'
 */
{
    switch(array)
    {
    case 1 :
        return(0);
    case 2 :
        return(1);
    case 4 :
        return(2);
    case 8 :
        return(3);
    case 16 :
        return(4);
    case 32 :
        return(5);
    case 64 :
        return(6);
    case 128 :
        return(7);
    }
}
```

start/driver.c

```
/*   Example program for use with Branch Analysis */

/* This program is used to read values of "horiz" and
   "vert" from a file via SIM I/O, present the values to
   the getkeyvalue() procedure, and print the keycode we got
   out to a file.

   The input file name is "input", and the output file name
   is "output".  Original, huh?
*/
#include <stdio.h>

/* FORWARDS declarations */
extern char *findnum();

/* FUNCTION */
main()
/*
 *      This opens the file "input" to read lines of the form
 *          <horiz-value> <vert-value>
 *      and prints the keycode relating to the input values to
 *      the file "output".
 *
 *      The output format shows the input values and the returned
 *      keycode, so it's easy to relate the input with the output.
 *
 */
#pragma   BBA_IGNORE /* this is only for testing */
{
   FILE *in;                 /* input file stream */
   FILE *out;                /* output file stream */
   short horiz, vert;        /* horizontal and vertical values */
   char inline[80];          /* line that read from the file */
   int keycode;              /* keycode that horiz, vert convert to */
   char *ptr;

   /* Open the input file and output file.  If any error is encountered,
      print an error message and abort the test.
   */

   in = fopen("input", "r");       /* "input" is opened for reading */
   if (in == NULL)
   {
      printf("FAILED to open the file 'input'! (aborting test)\n");
      exit(1);
   }

   if ((out = fopen("output", "w")) == NULL)
   {
      printf("FAILED to open the file 'output'! (aborting test)\n");
      exit(1);
```

BEST AVAILABLE COPY

```
    }

    while (1)       /* do loop forever */
    {
       inline[0] = '\0';
       fgets(inline, sizeof(inline), in);
       if (inline[0] == '\n')
          continue;       /* Try again - an empty line */

       if (inline[0] == '\0')
          exit(0);          /* Finished - hit the end of the file */

       /* Find first numeric (0-9) */
       ptr = inline;
       ptr = findnum(ptr);

       if (ptr == NULL)
       {
          error(inline);
          continue;          /* you didn't enter a numeric! */
       }

       /* Convert the first number to "horiz" */

       horiz = cvtnum(&ptr);       /* convert to an integer */

       /* Convert the second number fo "vert" */
       ptr = findnum(ptr);

       if (ptr == NULL)
       {
          error(inline);
          continue;          /* you didn't enter a numeric! */
       }

       vert = cvtnum(&ptr);       /* convert to an integer */

       /* Call getkeyvalue() with horiz and vert! */
       keycode = getkeyvalue(horiz, vert);

       /* Print the resuls to the output file */
       fprintf(out, "(%2u, %2u) -> %d\n", horiz, vert, keycode);
    }
}

/* FUNCTION */

error(instring)
char *instring;       /* string we got */
/*
 *       Print an error message...
 */
{
    printf("Input should be of the form 'dd,dd', where 'dd' ...
```

```
   printf("You entered '%s'; please try again\n", instring);
}

/* FUNCTION */

char *
findnum(ptr)
register char *ptr;
/*
 *      Find the first decimal character in the string, starting
 *      at 'ptr'.  This returns NULL if we find the end of the string
 *      before we find the character...
 */
{
#pragma   BBA_IGNORE /* this is only for testing */
   while (*ptr != '\0')
   {
      if ((*ptr >= '0') && (*ptr <= '9'))
         return(ptr);      /* found it! */
      ptr++;      /* move on to next character */
   }

   return(NULL);      /* found end of string before a decimal */
}

/* FUNCTION */

int
cvtnum(rptr)
char **rptr;      /* pointer to character pointer of number */

/*
 *      This routine returns the value of what *rptr points to
 *      as it's return value, and increments rptr to point to
 *      the first character beyond the last digit in the number.
 *
 *      On entrance, it expects *rptr to be a digit.
 */
{
   char c;            /* character *rptr points to */
   int value = 0;      /* value we will return */

   while (((c = **rptr) >= '0') && (c <= '9'))
   {
      value *= 10;
      value += c - '0';
      (*rptr)++;      /* increment pointer */
   }

   return(value);
#pragma   BBA_IGNORE /* this is only for testing */
}
```

start/getkey.c

```
/*   Example program for use with Branch Analysis */

/* This program is designed works with a 5 by 5 array
   of keys.  This program should return the keycode
   that is pressed, according to the following map:

    0   1   2   3   4          <- bits set in "vert"
    0   a   f   1   6   run
    1   b   g   2   7   halt
    2   c   h   3   8   <illegal>
    3   d   i   4   9   <illegal>
    4   e   j   5   0   abort

    ^
    |- bits set in "horiz"

    The program is passed two 8-bit integers (vert and horiz)
    which have bits set showing what lines are down.  Some
    examples:
      horiz   vert      key
        8       1        d
       16       4        5
        3       3        ? (could be "ag", "fb", "abg", etc...)

   Now, we could simply have a large array of possible values,
   or a simple switch statement with all possible values, but
   that wouldn't make a very interesting example program,
   would it?

*/

#include "keymap.h"       /* include file of definitions */

/* FUNCTION */
int
getkeyvalue(horiz, vert)
short horiz;      /* horizontal bit map */
short vert;          /* vertical bit map */

/*
 *      This routine is called by the OS to get what key
 *      is pressed.  This returns KEY_NONE if no key were
 *      pressed, or it too many keys are pressed to figure
 *      out what is happening.  If it is a number key, return
 *      the number pressed; if it is a-j, return 10-19 (KEY_A thru KEY_J)
 *      run is KEY_RUN, HALT is KEY_HALT, and abort is KEY_ABORT.
 *      Returne KEY_NONE if any of the illegal keys is pressed, too.
 */
{
    int keycode;        /* keycode we will return */

```

```
    /* First test: if both horiz and vert are 0, just return KEY_NONE */
    if ((horiz == 0) && (vert == 0))
    {
        return(KEY_NONE);
    }

    /* Second: if more than one key pressed, return an error */
    if ((twobits(horiz) != 0) || (twobits(vert) != 0))
        return(KEY_NONE);

    /* Do the conversion! */
    keycode = keyconvert(horiz, vert);

    return(keycode);
}
```

start/input

```
1,1
2,1
4,1
8,1
16,1
1,2
1,4
1,8
1,16
```

start/keymap.h

```
/* Example header file for use with Branch Analysis */

#define KEY_NONE   -1        /* no key pressed */

/* Numeric keys */
#define KEY_0      0
#define KEY_1      1
#define KEY_2      2
#define KEY_3      3
#define KEY_4      4
#define KEY_5      5
#define KEY_6      6
#define KEY_7      7
#define KEY_8      8
#define KEY_9      9

/* numeric keys */
#define KEY_A      10
#define KEY_B      11
#define KEY_C      12
#define KEY_D      13
#define KEY_E      14
#define KEY_F      15
#define KEY_G      16
#define KEY_H      17
#define KEY_I      18
#define KEY_K      19

/* Special keys */
#define KEY_RUN   20
#define KEY_HALT   21
/* values 22 & 23 are illegal */
#define KEY_ABORT   24
```

BEST AVAILABLE COPY start/multibits.c

```
/*   Example program for use with Branch Analysis */

/* This file contains the routines necessary to detect
   if more than one bit in the passed integer is set
*/

#include "keymap.h"      /* include file of definitions */

/* FUNCTION */
int
twobits(bitmap)
short bitmap;       /* bitmap to check */
/*
 *      This routine returns 0 if only one bit is
 *      set in it; it returns 1 if two or more are set.
 *
 */
{
   int numbits = 0;      /* count of bits set */

   /* This loop continues only while there is at least
      one more bit set in bitmap
   */
   while (bitmap != 0)
   {
      if ((bitmap & 1) != 0)
         numbits++;      /* increment count of bits that are set */
      bitmap = bitmap >> 1;   /* test next bit */
   }

   /* return zero if the number of bits set was "1"; else
      return a one
   */
   return((numbits == 1) ? 0 : 1);
}
```

BEST AVAILABLE COPY

Appendix C

FILES IN THE DEMO2/FINISH DIRECTORY

INTRODUCTION

The /usr/hp64000/demo/bbacpp/demo2/finish directory contains ten files that are used in the demonstrations in the Getting Started procedure in Chapter 2. The listings of these files are contained in this appendix. Line numbers have been added to the listings for your convenience.

```
Makefile    convert.c   driver.c     getkey.c    ignorelist
input       keymap.h    multibits.c  output      output.good
```

BEST AVAILABLE COPY finish/Makefile

```
#   Example Makefile
#
#   target      action
#   runtest      creates test program (runtest) w/o bba
#   bbatest      creates test program (bbatest) w/bba
#
#   NOTE: the file .NORMAL is present if the last compile did not use bba
#   the file .BBA is present if the last compile did use bba

BBACMD= -b
BBAOPT= -DBBA_OPTO=A

CFLAGS= -ghw
CC=cc68020
SHELL=/bin/sh

#   Source files
CSRC = convert.c driver.c getkey.c multibits.c
#   Object files
COBJ = $(CSRC:.c=.o)

#   Normal make
#   First check to see if the last time we compiled we
#   used bba.  If so, delete the object files and remind
#   ourselves that we are compiling without bba.
runtest ::
	-if [ ! -f .NORMAL ] ; then rm $(COBJ) .BBA; touch .NORMAL; fi

#   Now compile any out-of-date object files
runtest :: $(COBJ)
	# link the object files into the file 'runtest'
	$(CC) $(CFLAGS) -o runtest $(COBJ)

#   Bba make
#   If last time we compiled without bba remove all .o files;
#   then compile any out-of-date files.
bbatest ::
	-if [ ! -f .BBA ] ; then rm $(COBJ) .NORMAL; touch .BBA; fi
	$(MAKE) CFLAGS="$(CFLAGS) $(BBACMD) $(BBAOPT)" runobjs

bbatest :: $(COBJ)
	$(CC) $(CFLAGS) -o bbatest $(COBJ)


runobjs :   $(COBJ)
	touch runobjs
```

finish/convert.c

```
/*   Example program for use with Branch Analysis */

/* Routines to convert a single key to it's KEY_ definition
   (see keymap.h for KEY_ definitions)
*/

#include "keymap.h"      /* include file of definitions */

/* FUNCTION */
int
keyconvert(horiz, vert)
short horiz;      /* horizontal bit map */
short vert;         /* vertical bit map */

/*
 *       We now know that only one key is being pressed.
 *       Convert it & return it!
 */
{
   int keycode;      /* keycode we will return */

   /* Do different actions based on the column he has pressed */
   switch(vert)
   {
   case 1:   /* pressing first column of keys */
      keycode = bitpos(horiz) + KEY_A;
      break;
   case 2:   /* pressing second column of keys */
      keycode = bitpos(horiz) + KEY_F;
      break;
   case 4:   /* Pressing third column of keys */
      keycode = bitpos(horiz) + KEY_1;
      break;
   case 8:   /* pressing fourth column of keys */
      keycode = bitpos(horiz) + KEY_6;
      if (keycode > KEY_9)      /* special case for 0 key */
         keycode = KEY_0;
      break;
   case 16:   /* pressing fifth column of keys */
      keycode = bitpos(horiz) + KEY_RUN;
   }

   return(keycode);
}

/* FUNCTION */
int bitpos(array)
short array;      /* array with a bit set */

/*
 *       This routine returns which bit (0-7) was set
```

BEST AVAILABLE COPY

Basis Branch Analysis
Files In The DEMO2/FINISH Directory

```
*       in 'array'
*/
{
   switch(array)
   {
   case 1 :
      return(0);
   case 2 :
      return(1);
   case 4 :
      return(2);
   case 8 :
      return(3);
   case 16 :
      return(4);
   case 32 :
      return(5);
   case 64 :
      return(6);
   case 128 :
      return(7);
   }
}
```

BEST AVAILABLE COPY finish/driver.c

```
/*   Example program for use with Branch Analysis */

/* This program is used to read values of "horiz" and
   "vert" from a file via SIM I/O, present the values to
   the getkeyvalue() procedure, and print the keycode we got
   out to a file.

   The input file name is "input", and the output file name
   is "output".  Original, huh?
*/
#include <stdio.h>

/* FORWARDS declarations */
extern char *findnum();

/* FUNCTION */
main()
/*
 *       This opens the file "input" to read lines of the form
 *           <horiz-value> <vert-value>
 *       and prints the keycode relating to the input values to
 *       the file "output".
 *
 *       The output format shows the input values and the returned
 *       keycode, so it's easy to relate the input with the output.
 *
 */
#pragma   BBA_IGNORE /* this is only for testing */
{
   FILE *in;               /* input file stream */
   FILE *out;               /* output file stream */
   short horiz, vert;      /* horizontal and vertical values */
   char inline[80];         /* line that read from the file */
   int keycode;            /* keycode that horiz, vert convert to */
   char *ptr;

   /* Open the input file and output file.  If any error is encountered,
      print an error message and abort the test.
   */

   in = fopen("input", "r");      /* "input" is opened for reading */
   if (in == NULL)
   {
      printf("FAILED to open the file 'input'! (aborting test)\n");
      exit(1);
   }

   if ((out = fopen("output", "w")) == NULL)
   {
      printf("FAILED to open the file 'output'! (aborting test)\n");
      exit(1);
```

BEST AVAILABLE COPY

```
    }

    while (1)       /* do loop forever */
    {
       inline[0] = '\0';
       fgets(inline, sizeof(inline), in);
       if (inline[0] == '\n')
          continue;       /* Try again - an empty line */

       if (inline[0] == '\0')
          exit(0);          /* Finished - hit the end of the file */

       /* Find first numeric (0-9) */
       ptr = inline;
       ptr = findnum(ptr);

       if (ptr == NULL)
       {
          error(inline);
          continue;          /* you didn't enter a numeric! */
       }

       /* Convert the first number to "horiz" */

       horiz = cvtnum(&ptr);       /* convert to an integer */

       /* Convert the second number fo "vert" */
       ptr = findnum(ptr);

       if (ptr == NULL)
       {
          error(inline);
          continue;          /* you didn't enter a numeric! */
       }

       vert = cvtnum(&ptr);       /* convert to an integer */

       /* Call getkeyvalue() with horiz and vert! */
       keycode = getkeyvalue(horiz, vert);

       /* Print the resuls to the output file */
       fprintf(out, "(%2u, %2u) -> %d\n", horiz, vert, keycode);
    }
}

/* FUNCTION */

error(instring)
char *instring;       /* string we got */
/*
 *       Print an error message...
 */
{
#pragma   BBA_IGNORE /* this is only for testing *
```

BEST AVAILABLE COPY

```
    printf("Input should be of the form 'dd,dd', where 'dd' is a decimal number.\n");
    printf("You entered '%s'; please try again\n", instring);
}

/* FUNCTION */

char *
findnum(ptr)
register char *ptr;
/*
 *      Find the first decimal character in the string, starting
 *      at 'ptr'.  This returns NULL if we find the end of the string
 *      before we find the character...
 */
{
#pragma   SBA_IGNORE /* this is only for testing */
    while (*ptr != '\0')
    {
        if ((*ptr >= '0') && (*ptr <= '9'))
            return(ptr);        /* found it! */
        ptr++;       /* move on to next character */
    }

    return(NULL);       /* found end of string before a decimal */
}

/* FUNCTION */

int
cvtnum(rptr)
char **rptr;       /* pointer to character pointer of number */

/*
 *      This routine returns the value of what *rptr points to
 *      as it's return value, and increments rptr to point to
 *      the first character beyond the last digit in the number.
 *
 *      On entrance, it expects *rptr to be a digit.
 */
{
    char c;             /* character *rptr points to */
    int value = 0;       /* value we will return */

    while (((c = **rptr) >= '0') && (c <= '9'))
    {
        value *= 10;
        value += c - '0';
        (*rptr)++;       /* increment pointer */
    }

    return(value);
#pragma   SBA_IGNORE /* this is only for testing */
}
```

BEST AVAILABLE COPY finish/getkey.c

```
/*   Example program for use with Branch Analysis */

/* This program is designed works with a 5 by 5 array
   of keys.  This program should return the keycode
   that is pressed, according to the following map:

    0   1   2   3   4          <- bits set in "vert"
    0   a   f   1   6   run
    1   b   g   2   7   halt
    2   c   h   3   8   <illegal>
    3   d   i   4   9   <illegal>
    4   e   j   5   0   abort

    ^
    |- bits set in "horiz"

    The program is passed two 8-bit integers (vert and horiz)
    which have bits set showing what lines are down.  Some
    examples:
      horiz   vert      key
        8       1        d
       16       4        5
        3       3        ? (could be "ag", "fb", "abg", etc...)

   Now, we could simply have a large array of possible values,
   or a simple switch statement with all possible values, but
   that wouldn't make a very interesting example program,
   would it?

*/

#include "keymap.h"        /* include file of definitions */

/* FUNCTION */
int
getkeyvalue(horiz, vert)
short horiz;       /* horizontal bit map */
short vert;          /* vertical bit map */

/*
 *       This routine is called by the OS to get what key
 *       is pressed.  This returns KEY_NONE if no key were
 *       pressed, or it too many keys are pressed to figure
 *       out what is happening.  If it is a number key, return
 *       the number pressed; if it is a-j, return 10-19 (KEY_A thru KEY_J)
 *       run is KEY_RUN, HALT is KEY_HALT, and abort is KEY_ABORT.
 *       Returne KEY_NONE if any of the illegal keys is pressed, too.
 */
{
    int keycode;        /* keycode we will return */
```

```
    /* First test: if both horiz and vert are 0, just return KEY_NONE */
    if ((horiz == 0) && (vert == 0))
    {
       return(KEY_NONE);
    }

    /* Second: if more than one key pressed, return an error */
    if ((twobits(horiz) != 0) || (twobits(vert) != 0))
       return(KEY_NONE);

    /* Do the conversion! */
    keycode = keyconvert(horiz, vert);

    return(keycode);
}
```

finish/ignorelist

```
case 32:
case 64:
case 128:
while (bitmap != 0)
```

finish/input

```
1,1
2,1
4,1
8,1
16,1
1,2
1,4
1,8
1,16
0,0
3,1
2,7
16,8
2,16
16,16
```

BEST AVAILABLE COPY finish/keymap.h

```
/* Example header file for use with Branch Analysis */

#define KEY_NONE   -1      /* no key pressed */

/* Numeric keys */
#define KEY_0      0
#define KEY_1      1
#define KEY_2      2
#define KEY_3      3
#define KEY_4      4
#define KEY_5      5
#define KEY_6      6
#define KEY_7      7
#define KEY_8      8
#define KEY_9      9

/* numeric keys */
#define KEY_A      10
#define KEY_B      11
#define KEY_C      12
#define KEY_D      13
#define KEY_E      14
#define KEY_F      15
#define KEY_G      16
#define KEY_H      17
#define KEY_I      18
#define KEY_K      19

/* Special keys */
#define KEY_RUN   20
#define KEY_HALT   21
/* values 22 & 23 are illegal */
#define KEY_ABORT   24
```

finish/multibits.c

```
/*   Example program for use with Branch Analysis */

/* This file contains the routines necessary to detect
   if more than one bit in the passed integer is set
*/

#include "keymap.h"      /* include file of definitions */

/* FUNCTION */
int
twobits(bitmap)
short bitmap;      /* bitmap to check */
/*
 *      This routine returns "0" if exactly one bit is
 *      set in it; it returns "1" if two or more are set,
 *      or if none are set.
 *
 */
{
   int numbits = 0;      /* count of bits set */

   /* This loop continues only while there is at least
      one more bit set in bitmap
   */
   while (bitmap != 0)
   {
      if ((bitmap & 1) != 0)
         numbits++;      /* increment count of bits that are set */
      bitmap = bitmap >> 1;   /* test next bit */
   }

   /* return zero if the number of bits set was "1"; else
      return a one
   */
   return((numbits == 1) ? 0 : 1);
}
```

BEST AVAILABLE COPY finish/output

```
1   ( 1,  1) -> 10
2   ( 2,  1) -> 11
3   ( 4,  1) -> 12
4   ( 8,  1) -> 13
5   (16,  1) -> 14
6   ( 1,  2) -> 15
7   ( 1,  4) -> 1
8   ( 1,  8) -> 6
9   ( 1, 16) -> 20
10  ( 0,  0) -> -1
11  ( 3,  1) -> -1
12  ( 2,  7) -> -1
13  (16,  8) -> 0
14  ( 2, 16) -> 21
15  (16, 16) -> 24
```

finish/output.good

```
1   ( 1,  1) -> 10
2   ( 2,  1) -> 11
3   ( 4,  1) -> 12
4   ( 8,  1) -> 13
5   (16,  1) -> 14
6   ( 1,  2) -> 15
7   ( 1,  4) -> 1
8   ( 1,  8) -> 6
9   ( 1, 16) -> 20
10  ( 0,  0) -> -1
11  ( 3,  1) -> -1
12  ( 2,  7) -> -1
13  (16,  8) -> 0
14  ( 2, 16) -> 21
15  (16, 16) -> 24
```

BEST AVAILABLE COPY

INDEX a amount of code added ........ 3-3
automating regression testing ........ 6-10
avoiding manual re-verification of known-good results (walkthrough) ........ 2-10 b

BBA_IGNORE and else statements ........ 3-22
BBACPP ........ 1-2
bbacpp quick reference ........ 3-1
bbacpp's error and warning messages ........ A-1
BBAMERGE ........ 1-2
BBAREP ........ 1-2
bbarep default report (walkthrough) ........ 2-7
bbarep with old files' data (walkthrough) ........ 2-8
bbarep source-reference report (walkthrough) ........ 2-9
bbarep and ignore files (walkthrough) ........ 2-14
bbarep quick reference ........ 5-1
bbarep's error and warning messages ........ A-8
BBAUNLOAD ........ 1-2
bbaunload quick reference ........ 4-1
bbaunload's error and warning messages ........ A-6
benefits of bba (walkthrough) ........ 2-21
body of while loop was never executed (bbarep) ........ 5-8
body of while loop was never skipped (bbarep) ........ 5-9
body of for loop was never executed (bbarep) ........ 5-9
branches instrumented by default (bbacpp) ........ 3-13
branches instrumented with -DBBA_OPTO=a (bbacpp) ........ 3-15
branches instrumented with -DBBA_OPTO=d (bbacpp) ........ 3-16
branches instrumented with -DBBA_OPTO=e (bbacpp) ........ 3-17
branches instrumented with -DBBA_OPTO=i (bbacpp) ........ 3-17
branches instrumented with -DBBA_OPTO=s (bbacpp) ........ 3-18
branches instrumented with -DBBA_OPTO=f (bbacpp) ........ 3-18
branches instrumented with -DBBA_OPTO=w (bbacpp) ........ 3-19 c case code was never executed (bbarep) ........ 5-7
cc68020 -h option (bbacpp) ........ 3-24
cc68020 -s option (bbacpp) ........ 3-25
cc68020 -u option (bbacpp) ........ 3-25
cc68020 linking (bbaunload) ........ 4-2
changing the mapfile's suffix from .M ........ 3-7
changing the name of the constant data section (bbacpp) ........ 3-10
changing the name of the data data section (bbacpp) ........ 3-10
combining -DBBA_OPTO= options ........ 3-13
combining -aN and -bN (bbarep) ........ 5-12

INDEX (Cont'd)

conditional of if was never TRUE (bbarep) ............ 5-7
conditional of if was never FALSE (else never executed) (bbarep) ............ 5-7
conditional of if was never FALSE (no else statement) (bbarep) ............ 5-7
conditional of while was never TRUE (bbarep) ............ 5-8
conditional of while was never false first time thru (bbarep) ............ 5-9
conditional of for was never TRUE (bbarep) ............ 5-9
conditional of conditional assignment was never TRUE (bbarep) ............ 5-9
conditional of conditional assignment was never FALSE (bbarep) ............ 5-9
conditional of do while was never TRUE (bbarep) ............ 5-9
conditional of do while was never FALSE (bbarep) ............ 5-9
copying demonstration files (walkthrough) ............ 2-1 d dealing with the 'Out of push-back-line memory' error ............ 3-9
default code was never executed (bbarep) ............ 5-7
definition of branches ............ 1-1
definition of pragma ............ 3-21
demonstration files and directories (walkthrough) ............ 2-1
diff (walkthrough) ............ 2-10
documenting the test environment ............ 5-21
driver routine (walkthrough) ............ 2-2 e else part of if was never executed (bbarep) ............ 5-7
example of bbacpp insertions ............ 3-4
example of the -eN option (bbarep) ............ 5-10
expansion of code space ............ 3-3 f false part of conditional assignment was never executed (bbarep) ............ 5-9
function summary (bbarep) ............ 5-4
function was never called (bbarep) ............ 5-7 h how to get coverage data (bbaunload) ............ 4-1

INDEX (Cont'd)

i ignoring branches without BBA_IGNORE pragma (walkthrough) ........ 2-14
ignoring a function (bbacpp) ........ 3-21
ignoring specific statements (bbacpp) ........ 3-21
ignoring all functions in a file (bbarep) ........ 5-14
ignoring a function (bbarep) ........ 5-14
ignoring a macro (bbarep) ........ 5-14
ignoring specific statements (bbarep) ........ 5-16
instrumenting functions (bbacpp) ........ 3-13
instrumenting if statements (bbacpp) ........ 3-13
instrumenting else statements (bbacpp) ........ 3-13
instrumenting while statements (bbacpp) ........ 3-13
instrumenting for statements (bbacpp) ........ 3-13
instrumenting case and default statements (bbacpp) ........ 3-13
instrumenting switch statements (bbacpp) ........ 3-13
instrumenting conditional assignments (bbacpp) ........ 3-15
instrumenting conditional expression (bbacpp) ........ 3-15
instrumenting : ? statements (bbacpp) ........ 3-15
instrumenting do-while loops (bbacpp) ........ 3-16
instrumenting fall-through case and default statements (bbacpp) ........ 3-17
instrumenting if statements with no else (bbacpp) ........ 3-17
instrumenting else-less if statements (bbacpp) ........ 3-17
instrumenting switch statements with no default (bbacpp) ........ 3-18
instrumenting third expression of a for loop (bbacpp) ........ 3-18
instrumenting while loops (bbacpp) ........ 3-19 l line numbers (bbarep) ........ 5-5
link command file (bbaunload) ........ 4-2
linking array and data sections ........ 3-25
linking <constname> and <dataname> sections ........ 3-25
logically dead code (walkthrough) ........ 2-15 m makefile without bba (walkthrough) ........ 2-2
makefile with bba (walkthrough) ........ 2-3
manual organization ........ viii
multiple dumps in a single bbadump.data file ........ 5-3 n no -DBBA_OPTO= options (bbacpp) ........ 3-13
not initializing data area (bbacpp) ........ 3-25

BEST AVAILABLE COPY

INDEX (Cont'd)

o overview of bbacpp ........ 1-2
overview of bbaunload ........ 1-2
overview of bbamerge ........ 1-2
overview of makefiles ........ 6-1 p permitting the use of old data (bbarep) ........ 5-20
preventing creation of the mapfile ........ 3-8
printing version of bbarep ........ 5-23
printing version of bbacpp ........ 5-23
purpose of branch analysis ........ 1-1
purpose of bba ........ 1-1 r removing symbols from the absolute (bbacpp) ........ 3-25
reporting only specific files (bbarep) ........ 5-3
reporting only specific files (bbarep) ........ 5-18
reserved symbols (bbacpp) ........ 3-24 s setting tabs for source-reference reports (bbarep) ........ 5-20
short summary (bbarep) ........ 5-4
specifying the dump file's name ........ 5-19
suppressing footnotes (bbarep) ........ 5-21
switch never went to case (bbarep) ........ 5-7
switch never went to inner case (bbarep) ........ 5-7
switch never went to default (bbarep) ........ 5-7
switch never went to inner default (bbarep) ........ 5-7
switch never went to case (no executable statements) (bbarep) ........ 5-8
switch never went to default (no executable statements) (bbarep) ........ 5-8
switch never went to inner case (no executable statements) (bbarep) ........ 5-8
switch never went to inner default (no executable statements) (bbarep) ........ 5-8
switch never went to default (code executed by fall-thru) (bbarep) ........ 5-8
switch never went to case (code executed by fall-thru) (bbarep) ........ 5-8
switch never went to inner default (code executed by fall-thru) (bbarep) ........ 5-8
switch never went to inner case (code executed by fall-thru) (bbarep) ........ 5-8
switch went to default (default not defined in code) (bbarep) ........ 5-8

INDEX (Cont'd)

t the -aN option (bbarep) .... 5-11
the -bN option (bbarep) .... 5-9
the -DBBA_OPTM option (bbacpp) .... 3-7
the -DBBA_OPTS option (bbacpp) .... 3-8
the -DBBA_OPTp<lines> option (bbacpp) .... 3-9
the -DBBA_OPTc<constname> option (bbacpp) .... 3-10
the -DBBA_OPTd<dataname> option (bbacpp) .... 3-10
the -d <file> option (bbarep) .... 5-19
the -Dt option (bbarep) .... 5-21
the -Df option (bbarep) .... 5-22
the -Dv option (bbarep) .... 5-23
the -e<tabs> option (bbarep) .... 5-20
the -F option (bbarep) .... 5-21
the -i <ignorefile> option (bbarep) .... 5-13
the -l option (bbarep) .... 5-5
the -o option (bbarep) .... 5-20
the -p option (bbarep) .... 5-13
the -S option (bbarep) .... 5-4
the -s option (bbarep) .... 5-4
the -u<usefile> option (bbarep) .... 5-18
the ASM pragma (bbacpp) .... 3-25
the BBA_IGNORE pragma (bbacpp) .... 3-21
the BBA_ALERT pragma (bbacpp) .... 3-23
the bbadump.data files .... 5-3
the BBA_ALERT pragma and bbarep -l (bbarep) .... 5-10
the BBA_ALERT pragma and bbarep -aN or -bN (bbarep) .... 5-11
then part of if was never executed (bbarep) .... 5-7
Third expression of for was never executed (bbarep) .... 5-9
true part of conditional assignment was never executed (bbarep) .... 5-9 u using this manual .... viii
using bba (walkthrough) .... 2-1
using bbacpp from the command line .... 3-7
using BBA_IGNORE to ignore functions .... 3-21
using BBA_IGNORE (bbacpp) .... 3-23
using BBA_ALERT pragma (bbacpp) .... 3-24

BEST AVAILABLE COPY

INDEX (Cont'd)

w what bbacpp inserts into your code ....................3-3
what bbaunload does ....................4-1
what instrumented means ....................3-11
what the array is for (bbacpp) ....................3-3
what the assignment statement is for (bbacpp) ....................3-3
what the mapfile is for (bbacpp) ....................3-3
what the constant data is for (bbacpp) ....................3-3
what to do when out of memory ....................3-19
where to link <dataname> and <constname> sections (bbaunload) ....................4-2 other

_bA_ symbols (bbacpp) ....................3-24

What is claimed is:

1. A tool for developing software, said software to be used to test a predetermined system which is designed so as to be controlled by a predetermined microprocessor, said microprocessor to be embedded in said system, said tool comprising:

emulation means for replacing and emulating said microprocessor of said system;

computer means, connected to said emulation means, for controlling said replacing and emulating and for compilation of said software;

preprocessing means, connected at least to said computer means, for inserting executable branch analysis statements in said software prior to compilation and execution of said software;

processing means, connected at least to said preprocessing means, for determining whether said branch analysis statements were executed during execution of said software;

report means, connected at least to said processing means, for reporting to a user of said tool whether said branch analysis statements were executed during execution of said software.

2. A method for analyzing branch statements in software, said software to be used to test a predetermined system which is designed so as to be controlled by a predetermined microprocessor, said microprocessor to be embedded in said system, comprising the steps of:

emulating said microprocessor with a microprocessor-emulator;

preprocessing said software such that executable branch analysis statements are inserted at user-determined locations within the branch statements within said software;

generating a mapfile of said preprocessed software such that said locations of said inserted branch analysis statements within said software can be determined;

compiling and linking said preprocessed software:

generating symbol tables for said preprocessed software;

generating executable binary code corresponding to said preprocessed software;

execution of said binary code on said system such that execution-data-results are produced;

processing said execution-data-results such that it can be determined whether said inserted branch analysis statements were executed during execution of said binary code;

reporting to a user whether said inserted branch analysis statements were executed during execution of said binary code.

* * * * *